US011222173B2

(12) United States Patent
Kim et al.

(10) Patent No.: US 11,222,173 B2
(45) Date of Patent: *Jan. 11, 2022

(54) METHOD AND APPARATUS FOR PROVIDING CALENDAR DISPLAYING WORK HISTORY OF DOCUMENT

(71) Applicant: SAMSUNG ELECTRONICS CO., LTD., Suwon-si (KR)

(72) Inventors: Young-jae Kim, Seoul (KR); Moon-joo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,255

(22) Filed: Dec. 17, 2019

(65) Prior Publication Data

US 2020/0117853 A1 Apr. 16, 2020

Related U.S. Application Data

(63) Continuation of application No. 14/838,400, filed on Aug. 28, 2015, now Pat. No. 10,540,429, which is a (Continued)

(30) Foreign Application Priority Data

Mar. 12, 2014 (KR) ........................ 10-2014-0029258
May 26, 2014 (KR) ........................ 10-2014-0063114
Dec. 24, 2014 (KR) ........................ 10-2014-0188640

(51) Int. Cl.
*G06F 17/00* (2019.01)
*G06F 40/197* (2020.01)

(Continued)

(52) U.S. Cl.
CPC .......... *G06F 40/197* (2020.01); *G06F 40/166* (2020.01); *G06Q 10/10* (2013.01);

(Continued)

(58) Field of Classification Search
CPC ..... G06F 40/197; G06F 40/166; G06Q 10/10; G06Q 10/1091; H04L 65/403; H04L 67/22

(Continued)

(56) References Cited

U.S. PATENT DOCUMENTS 6,085,205 A 7/2000 Peairs
7,747,966 B2 6/2010 Leukart et al.

(Continued)

FOREIGN PATENT DOCUMENTS

CN 101211369 A 7/2008
CN 102855052 A 1/2013

(Continued)

OTHER PUBLICATIONS

Communication dated Aug. 9, 2019 issued by the State Intellectual Property Office of P.R. China in counterpart Chinese Application No. 201510105570.1.

(Continued)

*Primary Examiner* — Jason T Edwards
(74) *Attorney, Agent, or Firm* — Sughrue Mion, PLLC

(57) ABSTRACT

Provided are a server for managing history information of a document work, a device for viewing the history information, and a system including the same. The server includes: a transceiver configured to receive, from at least one first device of a user, work history information of a document on the at least one first device; and a controller configured to arrange the received work history information in a calendar form by using time information included in the received work history information, wherein the transceiver provides (Continued)

the work history information in the calendar form to a second device.

14 Claims, 183 Drawing Sheets

Related U.S. Application Data continuation of application No. 14/616,253, filed on Feb. 6, 2015, now Pat. No. 10,540,428.

(51) Int. Cl.
*G06Q 10/10* (2012.01)
*G06F 40/166* (2020.01)
*H04L 29/08* (2006.01)
*H04L 29/06* (2006.01)

(52) U.S. Cl.
CPC ....... *G06Q 10/1091* (2013.01); *H04L 65/403* (2013.01); *H04L 67/22* (2013.01)

(58) Field of Classification Search
USPC .......................................................... 715/229
See application file for complete search history.

(56) References Cited

U.S. PATENT DOCUMENTS

| | | | | |
|---|---|---|---|---|
| 7,812,860 | B2 | 10/2010 | King et al. | |
| 8,095,406 | B2 | 1/2012 | Nakamura et al. | |
| 8,874,525 | B2 | 10/2014 | Grossman | |
| 2004/0172450 | A1* | 9/2004 | Edelstein | G06Q 10/10 709/205 |
| 2005/0165740 | A1 | 7/2005 | Kerr et al. | |
| 2005/0289202 | A1 | 12/2005 | S | |
| 2007/0033187 | A1 | 2/2007 | Friedman | |
| 2007/0192423 | A1 | 8/2007 | Karlson | |
| 2007/0233786 | A1 | 10/2007 | Rothley | |
| 2008/0235595 | A1 | 9/2008 | Krantz | |
| 2009/0097361 | A1 | 4/2009 | Nakamura et al. | |
| 2009/0241048 | A1* | 9/2009 | Augustine | G06Q 10/10 715/769 |
| 2010/0223575 | A1 | 9/2010 | Leukart et al. | |
| 2010/0306265 | A1 | 12/2010 | Jones, III | |
| 2011/0055177 | A1* | 3/2011 | Chakra | G06Q 10/109 707/695 |
| 2011/0113348 | A1* | 5/2011 | Twiss | G06Q 10/10 715/753 |
| 2012/0158849 | A1* | 6/2012 | Yoakum | H04L 12/1822 709/205 |
| 2012/0233137 | A1 | 9/2012 | Jakobson | |
| 2013/0007648 | A1 | 1/2013 | Gamon et al. | |
| 2013/0246901 | A1* | 9/2013 | Massand | G06Q 10/10 715/229 |
| 2014/0059463 | A1 | 2/2014 | Wu | |
| 2015/0199411 | A1* | 7/2015 | Greenspan | G06F 16/93 715/229 |

FOREIGN PATENT DOCUMENTS

| | | | |
|---|---|---|---|
| CN | 103106574 | A | 5/2013 |
| JP | 2002-041964 | A | 2/2002 |
| KR | 10-2008-0063205 | A | 7/2008 |
| KR | 10-2010-0079370 | A | 7/2010 |
| KR | 10-2011-0065921 | A | 6/2011 |
| KR | 10-2012-0038826 | A | 4/2012 |
| WO | 2004/081793 | A1 | 9/2004 |
| WO | 2012068570 | A1 | 5/2012 |

OTHER PUBLICATIONS

Communication dated Mar. 8, 2019 issued by the State Intellectual Property Office of P.R. China in counterpart Chinese Application No. 201510105570.1.

Communication dated May 17, 2019 issued by the European Intellectual Property Office in counterpart European Application No. 15158871.2.

Communication dated Apr. 21, 2015 issued by the International Searching Authority in counterpart International Patent Application No. PCT/KR2015/000868.

Communication dated Jul. 20, 2015, issued by the European Patent Office, in counterpart European Application No. 15158871.2.

Communication dated Jul. 10, 2020 issued by the State Intellectual Property Office of P.R. China in counterpart Chinese Application No. 201510105570.1.

Communication dated Oct. 27, 2020 issued by the Indian Patent Office in Indian Application No. 720/MUM/2015.

* cited by examiner

| WORK HISTORY INFORMATION | | | | | | | |
|---|---|---|---|---|---|---|---|
| DOCUMENT TITLE (1311) | DOCUMENT TYPE (1312) | WORK PROGRAM TITLE (1313) | WORK DEVICE TITLE (1314) | USER (1315) | WORK TYPE (1316) | WORK DATE AND TIME (1317) | FILE SIZE (1318) |
| abc.doc | TEXT | FIRST PROGRAM | FIRST DEVICE | FIRST USER | CREATING OF DOCUMENT | 2014. 05. 12, PM 12:28:04 | 54 KB |
| abcd.xls | TEXT | SECOND PROGRAM | SECOND DEVICE | FIRST USER | CREATING OF DOCUMENT | 2014. 04. 22, PM 02:25:56 | 47 KB |
| xyz.doc | TEXT | FIRST PROGRAM | THIRD DEVICE | FIRST USER | CREATING OF DOCUMENT | 2014. 02. 12, PM 11:18:14 | 1084 KB |
| ... | ... | ... | ... | ... | ... | ... | ... |
| kkk.ppt | TEXT | SECOND PROGRAM | NTH DEVICE | FIRST USER | CREATING OF DOCUMENT | 2013. 01. 01, AM 02:21:04 | 2387 KB |

| 1411 | 1412 | 1413 | 1414 | 1415 | 1416 | 1417 | 1418 |
|---|---|---|---|---|---|---|---|
| WORK HISTORY INFORMATION | | | | | | | |
| WORK DEVICE TITLE | DOCUMENT TYPE | WORK PROGRAM TITLE | DOCUMENT TITLE | WORK TYPE | USER WORKED ON | WORK DATE AND TIME | FILE SIZE |
| FIRST DEVICE | TEXT | FIRST PROGRAM | abc.doc | CREATING OF DOCUMENT | FIRST USER | 2014. 05. 12, PM 12:28:04 | 54 KB |
| SECONF DEVICE | TEXT | SECOND PROGRAM | abcd.xls | CREATING OF DOCUMENT | FIRST USER | 2014. 04. 22, PM 02:25:56 | 47 KB |
| FOURTH DEVICE | TEXT | FIRST PROGRAM | xyz.doc | CREATING OF DOCUMENT | FIRST USER | 2014. 02. 12, PM 11:18:14 | 1084 KB |
| ... | ... | ... | ... | ... | ... | ... | ... |
| NTH DEVICE | TEXT | THIRD PROGRAM | kkk.ppt | CREATING OF DOCUMENT | FIRST USER | 2013. 01. 01, AM 02:21:04 | 2387 KB |

| WORK HISTORY INFORMATION | | | | | | | |
|---|---|---|---|---|---|---|---|
| DOCUMENT TITLE | DOCUMENT TYPE | WORK PROGRAM TITLE | USER WORKED ON | WORK DEVICE TITLE | WORK TYPE | WORK DATE AND TIME | FILE SIZE |
| abc.doc | TEXT | FIRST PROGRAM | FIRST USER | FIRST DEVICE | CREATING OF DOCUMENT | 2014. 05. 12, PM 12:28:04 | 54 KB |
| | | | FIRST USER | SECOND DEVICE | READING OF DOCUMENT | 2014. 05. 20, PM 08:46:11 | 54 KB |
| abcd.xls | TEXT | SECOND PROGRAM | FIRST USER | THIRD DEVICE | CREATING OF DOCUMENT | 2014. 04. 22, PM 02:25:56 | 47 KB |
| xyz.doc | TEXT | FIRST PROGRAM | FIRST USER | FOURTH DEVICE | CREATING OF DOCUMENT | 2014. 02. 12, PM 11:18:14 | 1084 KB |
| ... | ... | ... | ... | ... | ... | ... | ... |
| kkk.ppt | TEXT | THIRD PROGRAM | FIRST USER | NTH DEVICE | CREATING OF DOCUMENT | 2013. 01. 01,AM 2:21:04 | 2387 KB |
| | | | FIRST USER | THIRD DEVICE | READING OF DOCUMENT | 2014. 05. 28,PM 08:21:11 | 2387 KB |

WORK HISTORY INFORMATION

| WORK DEVICE TITLE | DOCUMENT TYPE | WORK PROGRAM TITLE | DOCUMENT TITLE | WORK TYPE | USER WORKED ON | WORK DATE AND TIME | FILE SIZE |
|---|---|---|---|---|---|---|---|
| FIRST DEVICE | TEXT | FIRST PROGRAM | abc.doc | CREATING OF DOCUMENT | FIRST USER | 2014. 05. 12, PM 12:28:04 | 54 KB |
| SECOND DEVICE | TEXT | SECOND PROGRAM | abcd.xls | CREATING OF DOCUMENT | FIRST USER | 2014. 04. 22, PM 02:25:56 | 47 KB |
| | | | abc.doc | READING OF DOCUMENT | FIRST USER | 2014. 05. 20 PM 08:46:11 | 54 KB |
| THIRD DEVICE | TEXT | THIRD PROGRAM | kkk.ppt | READING OF DOCUMENT | FIRST USER | 2014. 05. 28, PM 08:21:11 | 2387 KB |
| FOURTH DEVICE | TEXT | FIRST PROGRAM | xyz.doc | CREATING OF DOCUMENT | FIRST USER | 2014. 02. 12, PM 11:18:14 | 1084 KB |
| ⋮ | ⋮ | ⋮ | ⋮ | ⋮ | ⋮ | ⋮ | ⋮ |
| NTH DEVICE | TEXT | THIRD PROGRAM | kkk.ppt | CREATING OF DOCUMENT | FIRST USER | 2013. 01. 01, AM 02:21:04 | 2387 KB |

DAY

| WORK HISTORY INFORMATION | | | | | | | |
|---|---|---|---|---|---|---|---|
| DOCUMENT TITLE | DOCUMENT TYPE | WORK PROGRAM TITLE | USER WORKED ON | WORK DEVICE TITLE | WORK TYPE | WORK DATE AND TIME | FILE SIZE |
| abc.doc | TEXT | FIRST PROGRAM | FIRST USER<br>FIRST USER | FIRST DEVICE<br>SECOND DEVICE | CREATING OF DOCUMENT<br>EDITING OF DOCUMENT | 2014. 05. 12. PM 12:28:04<br>2014. 05. 14 PM 09:11:43 | 54 KB<br>105 KB |
| abcd.xls | TEXT | SECOND PROGRAM | FIRST USER | SECOND DEVICE | CREATING OF DOCUMENT | 2014. 04. 22, PM 02:25:56 | 47 KB |
| xyz.doc | TEXT | FIRST PROGRAM | FIRST USER | FOURTH DEVICE<br>THIRD DEVICE | CREATING OF DOCUMENT<br>EDITING OF DOCUMENT | 2014. 02. 12, PM 11:18:14<br>2014. 05. 14 PM 09:14:03 | 1084 KB<br>962 KB |
| ... | | ... | | ... | | ... | ... |
| kkk.ppt | TEXT | THIRD PROGRAM | FIRST USER | NTH DEVICE | CREATING OF DOCUMENT | 2013. 01. 01,AM 2:21:04 | 2387 KB |

| WORK HISTORY INFORMATION | | | | | | | |
|---|---|---|---|---|---|---|---|
| WORK DEVICE TITLE | DOCUMENT TYPE | WORK PROGRAM TITLE | DOCUMENT TITLE | WORK TYPE | USER WORKED ON | WORK DATE AND TIME | FILE SIZE |
| FIRST DEVICE | TEXT | FIRST PROGRAM | abc.doc | CREATING OF DOCUMENT | FIRST USER | 2014. 05. 12, PM 12:28:04 | 54 KB |
| SECOND DEVICE | TEXT | SECOND PROGRAM | abcd.xls<br>abc.doc | CREATING OF DOCUMENT<br>EDITING OF DOCUMENT | FIRST USER<br>FIRST USER | 2014. 04. 22, PM 02:25:56<br>2014. 05. 14, PM 09:11:43 | 47 KB<br>105 KB |
| THIRD DEVICE | TEXT | FIRST PROGRAM | xyz.doc | EDITING OF DOCUMENT | FIRST USER | 2014. 05. 14, AM 09:14:03 | 2387 KB |
| FOURTH DEVICE | TEXT | FIRST PROGRAM | xyz.doc | CREATING OF DOCUMENT | FIRST USER | 2014. 02. 12, PM 11:18:14 | 1084 KB |
| ⋮ | ⋮ | ⋮ | ⋮ | ⋮ | ⋮ | ⋮ | ⋮ |
| NTH DEVICE | TEXT | THIRD PROGRAM | kkk.ppt | CREATING OF DOCUMENT | FIRST USER | 2013. 01. 01, AM 02:21:04 | 2387 KB |

| WORK HISTORY INFORMATION | | | | | | | |
|---|---|---|---|---|---|---|---|
| DOCUMENT TITLE | DOCUMENT TYPE | WORK PROGRAM TITLE | USER WORKED ON | WORK DEVICE TITLE | WORK TYPE | WORK DATE AND TIME | FILE SIZE |
| abc.doc | TEXT | Word | FIRST USER<br>FIRST USER<br>FIRST USER | FIRST DEVICE<br>SECOND DEVICE<br>FIRST DEVICE | CREATING OF DOCUMENT<br>EDITING OF DOCUMENT<br>READING OF DOCUMENT | 2014. 05. 12, PM 12:28:04<br>2014. 05. 14 PM 09:11:43<br>2014. 05. 20, PM 08:46:11 | 54 KB<br>105 KB<br>105 KB |
| abcd.xls | TEXT | Excel | FIRST USER | SECOND DEVICE | CREATING OF DOCUMENT | 2014. 04. 22, PM 02:25:56 | 47 KB |
| xyz.doc | TEXT | Word | FIRST USER | FOURTH DEVICE<br>THIRD DEVICE | CREATING OF DOCUMENT<br>EDITING OF DOCUMENT | 2014. 02. 12, PM 11:18:14<br>2014. 05. 14 PM 09:14:03 | 1084 KB<br>962 KB |
| ... | ... | ... | ... | ... | ... | ... | ... |
| kkk.ppt | TEXT | PowerPoint | FIRST USER<br>FIRST USER | NTH DEVICE<br>THIRD DEVICE | CREATING OF DOCUMENT<br>READING OF DOCUMENT | 2013. 01. 01,AM 2:21:04<br>2014. 05. 28, PM 08:21:11 | 2387 KB<br>2387 KB |

| WORK HISTORY INFORMATION | | | | | | | |
|---|---|---|---|---|---|---|---|
| WORK DEVICE TITLE | DOCUMENT TYPE | WORK PROGRAM TITLE | DOCUMENT TITLE | WORK TYPE | USER WORKED ON | WORK DATE AND TIME | FILE SIZE |
| FIRST DEVICE | TEXT | Word<br>Word | abc.doc<br>abc.doc | CREATING OF DOCUMENT<br>READING OF DOCUMENT | FIRST USER<br>FIRST USER | 2014. 05. 12, PM 12:28:04<br>2014. 05. 20, PM 08:46:11 | 54 KB<br>105 KB |
| SECOND DEVICE | TEXT | Excel<br>Word | abcd.xls<br>abcd.doc | CREATING OF DOCUMENT<br>READING OF DOCUMENT | FIRST USER<br>FIRST USER | 2014. 04. 22, PM 02:25:56<br>2014. 05. 14, PM 09:11:43 | 47 KB<br>105 KB |
| THIRD DEVICE | TEXT | Word | xyz.doc<br>kkk.ppt | READING OF DOCUMENT<br>READING OF DOCUMENT | FIRST USER<br>FIRST USER | 2014. 05. 14, AM 09:14:03<br>2014. 05. 28, PM 08:21:11 | 2387 KB<br>2387 KB |
| ... | ... | ... | ... | ... | ... | ... | ... |
| NTH DEVICE | TEXT | PowerPoint | kkk.ppt | CREATING OF DOCUMENT | FIRST USER | 2013. 01. 01, AM 02:21:04 | 2387 KB |

WORK HISTORY INFORMATION

| DOCUMENT TITLE (10811) | DOCUMENT TYPE (10812) | WORK PROGRAM TITLE (10813) | WORK DEVICE TITLE (10814) | USER WORKED ON (10815) | WORK TYPE (10816) | WORK DATE AND TIME (10817) | FILE SIZE (10818) |
|---|---|---|---|---|---|---|---|
| abc.doc | TEXT | FOURTH PROGRAM | FIRST DEVICE | FIRST USER | CREATING OF DOCUMENT | 2014. 05. 12, PM 12:28:04 | 54 KB |
| abcd.xls | TEXT | FOURTH PROGRAM | SECOND DEVICE | FIRST USER | CREATING OF DOCUMENT | 2014. 04. 22, PM 02:25:56 | 47 KB |
| xyz.doc | TEXT | FOURTH PROGRAM | FOURTH DEVICE | FIRST USER | CREATING OF DOCUMENT | 2014. 02. 12, PM 11:18:14 | 1084 KB |
| ... | ... | | ... | | ... | | ... |
| kkk.ppt | TEXT | FOURTH PROGRAM | NTH DEVICE | FIRST USER | CREATING OF DOCUMENT | 2013. 01. 01, AM 2:21:04 | 2387 KB |

FIG. 109

10910 WORK HISTORY INFORMATION

| WORK DEVICE TITLE (10911) | DOCUMENT TYPE (10912) | WORK PROGRAM TITLE (10913) | DOCUMENT TITLE (10914) | USER WORKED ON (10915) | WORK TYPE (10916) | WORK DATE AND TIME (10917) | FILE SIZE (10918) |
|---|---|---|---|---|---|---|---|
| FIRST DEVICE | TEXT | FOURTH PROGRAM | abc.doc | FIRST USER | CREATING OF DOCUMENT | 2014. 05. 12, PM 12:28:04 | 54 KB |
| SECOND DEVICE | TEXT | FOURTH PROGRAM | abcd.xls | FIRST USER | CREATING OF DOCUMENT | 2014. 04. 22, PM 02:25:56 | 47 KB |
| FOURTH DEVICE | TEXT | FOURTH PROGRAM | xyz.doc | FIRST USER | CREATING OF DOCUMENT | 2014. 02. 12, PM 11:18:14 | 1084 KB |
| ... | | ... | ... | | | ... | ... |
| NTH DEVICE | TEXT | FOURTH PROGRAM | kkk.ppt | FIRST USER | CREATING OF DOCUMENT | 2013. 01. 01,AM 2:21:04 | 2387 KB |

| WORK HISTORY INFORMATION | | | | | | | |
|---|---|---|---|---|---|---|---|
| DOCUMENT TITLE | DOCUMENT TYPE | WORK PROGRAM TITLE | USER WORKED ON | WORK DEVICE TITLE | WORK TYPE | WORK DATE AND TIME | FILE SIZE |
| abc.doc | TEXT | FOURTH PROGRAM | FIRST USER<br>FIRST USER | FIRST DEVICE<br>SECOND DEVICE | CREATING OF DOCUMENT<br>READING OF DOCUMENT | 2014. 05. 12. PM 12:28:04<br>2014. 05. 20 PM 08:46:11 | 54 KB<br>54 KB |
| abcd.xls | TEXT | FOURTH PROGRAM | FIRST USER | SECOND DEVICE | CREATING OF DOCUMENT | 2014. 04. 22, PM 02:25:56 | 47 KB |
| xyz.doc | TEXT | FOURTH PROGRAM | FIRST USER | FOURTH DEVICE | CREATING OF DOCUMENT | 2014. 02. 12, PM 11:18:14 | 1084 KB |
| ... | | ... | | ... | | ... | ... |
| kkk.ppt | TEXT | FOURTH PROGRAM | FIRST USER<br>FIRST USER | NTH DEVICE<br>THIRD DEVICE | CREATING OF DOCUMENT<br>READING OF DOCUMENT | 2013. 01. 01, AM 2:21:04<br>2014. 05. 28, PM 08:21:11 | 2387 KB<br>2387 KB |

| WORK HISTORY INFORMATION | | | | | | | |
|---|---|---|---|---|---|---|---|
| WORK DEVICE TITLE | DOCUMENT TYPE | WORK PROGRAM TITLE | DOCUMENT TITLE | WORK TYPE | USER WORKED ON | WORK DATE AND TIME | FILE SIZE |
| FIRST DEVICE | TEXT | FOURTH PROGRAM | abc.doc | CREATING OF DOCUMENT | FIRST USER | 2014. 05. 12, PM 12:28:04 | 54 KB |
| SECOND DEVICE | TEXT | FOURTH PROGRAM | abcd.xls<br>abc.doc | CREATING OF DOCUMENT<br>READING OF DOCUMENT | FIRST USER<br>FIRST USER | 2014. 04. 22, PM 02:25:56<br>2014. 05. 20 PM 08:46:11 | 47 KB<br>54 KB |
| THIRD DEVICE | TEXT | FOURTH PROGRAM | kkk.ppt | READING OF DOCUMENT | FIRST USER | 2014. 05. 28, PM 08:21:11 | 2387 KB |
| FOURTH DEVICE | TEXT | FOURTH PROGRAM | xyz.doc | CREATING OF DOCUMENT | FIRST USER | 2014. 02. 12, PM 11:18:14 | 1084 KB |
| ... | | ... | ... | | | ... | ... |
| NTH DEVICE | TEXT | FOURTH PROGRAM | kkk.ppt | CREATING OF DOCUMENT | FIRST USER | 2013. 01. 01, AM 2:21:04 | 2387 KB |

| WORK HISTORY INFORMATION | | | | | | | |
|---|---|---|---|---|---|---|---|
| DOCUMENT TITLE | DOCUMENT TYPE | WORK PROGRAM TITLE | USER WORKED ON | WORK DEVICE TITLE | WORK TYPE | WORK DATE AND TIME | FILE SIZE |
| abc.doc | TEXT | FOURTH PROGRAM | FIRST USER<br>FIRST USER | FIRST DEVICE<br>SECOND DEVICE | CREATING OF DOCUMENT<br>EDITING OF DOCUMENT | 2014. 05. 12, PM 12:28:04<br>2014. 05. 14 PM 09:11:43 | 54 KB<br>105 KB |
| abcd.xls | TEXT | FOURTH PROGRAM | FIRST USER | SECOND DEVICE | CREATING OF DOCUMENT | 2014. 04. 22, PM 02:25:56 | 47 KB |
| xyz.doc | TEXT | FOURTH PROGRAM | FIRST USER | FOURTH DEVICE<br>THIRD DEVICE | CREATING OF DOCUMENT<br>EDITING OF DOCUMENT | 2014. 02. 12, PM 11:18:14<br>2014. 05. 14 PM 09:14:03 | 1084 KB<br>962 KB |
| ... | | ... | | ... | | ... | ... |
| kkk.ppt | TEXT | FOURTH PROGRAM | FIRST USER | NTH DEVICE | CREATING OF DOCUMENT | 2013. 01. 01, AM 2:21:04 | 2387 KB |

| WORK HISTORY INFORMATION | | | | | | | |
|---|---|---|---|---|---|---|---|
| WORK DEVICE TITLE | DOCUMENT TYPE | WORK PROGRAM TITLE | DOCUMENT TITLE | WORK TYPE | USER WORKED ON | WORK DATE AND TIME | FILE SIZE |
| FIRST DEVICE | TEXT | FOURTH PROGRAM | abc.doc | CREATING OF DOCUMENT | FIRST USER | 2014. 05. 12, PM 12:28:04 | 54 KB |
| SECOND DEVICE | TEXT | FOURTH PROGRAM | abcd.xls<br>abc.doc | CREATING OF DOCUMENT<br>EDITING OF DOCUMENT | FIRST USER<br>FIRST USER | 2014. 04. 22, PM 02:25:56<br>2014. 05. 14, PM 09:11:43 | 47 KB<br>105 KB |
| THIRD DEVICE | TEXT | FOURTH PROGRAM | xyz.doc | EDITING OF DOCUMENT | FIRST USER | 2014. 05. 14, AM 09:14:03 | 2387 KB |
| FOURTH DEVICE | TEXT | FOURTH PROGRAM | xyz.doc | CREATING OF DOCUMENT | FIRST USER | 2014. 02. 12, PM 11:18:14 | 1084 KB |
| ... | | ... | ... | | | ... | ... |
| NTH DEVICE | TEXT | FOURTH PROGRAM | kkk.ppt | CREATING OF DOCUMENT | FIRST USER | 2013. 01. 01,AM 2:21:04 | 2387 KB |

13730

(a)

(b)

METHOD AND APPARATUS FOR PROVIDING CALENDAR DISPLAYING WORK HISTORY OF DOCUMENT

CROSS-REFERENCE TO RELATED APPLICATIONS

This application is a continuation of U.S. patent application Ser. No. 14/838,400, filed Aug. 28, 2015, which is a continuation of U.S. patent application Ser. No. 14/616,253, filed on Feb. 6, 2015, which claims priority from Korean Patent Application No. 10-2014-0029258, filed on Mar. 12, 2014 in the Korean Intellectual Property Office, Korean Patent Application No. 10-2014-0063114, filed on May 26, 2014 in the Korean Intellectual Property Office, and Korean Patent Application No. 10-2014-0188640, filed on Dec. 24, 2014 in the Korean Intellectual Property Office, the disclosures of which are incorporated herein in their entireties by reference.

BACKGROUND

1. Field

Apparatuses and methods consistent with exemplary embodiments relate to providing a calendar that displays a work history of a document.

2. Description of the Related Art

Due to the convenience of distributing, storing, and editing a document and the development of electronic document processing programs that provide various operations for document processing, electronic document work using a computer has recently been invigorated.

According to the advancements in electronic document work using a computer, a single user frequently processes and edits a plurality of electronic documents simultaneously.

However, since a related art electronic document processing program focuses on an operation of merely storing and editing a processed document, it is inconvenient of a user to personally manage a work history of the document. Thus, a benefit of an operation for managing an electronic document is emerging.

SUMMARY

One or more exemplary embodiments provide a method and apparatus for providing a calendar that displays a work history of a document.

According to an aspect of an exemplary embodiment, there is provided a server for managing work history information of a document, the server including: a transceiver configured to receive, from at least one first device of a user, work history information of a document on the at least one first device; and a controller configured to arrange the received work history information in a calendar form by using time information included in the received work history information, wherein the transceiver provides the work history information in the calendar form to a second device.

An indicator representing the work history information of the document may be provided at a corresponding date in the calendar form.

When the indicator is selected, the transceiver may provide, to the second device, the work history information of the document corresponding to the selected indicator.

The controller may operate to provide, to the second device, the document corresponding to the selected indicator.

The controller may instruct the at least one first device to transmit the document to the second device.

The controller may control the transceiver to receive the document from the at least one first device and to transmit the received document to the second device.

In response to receiving, from the second device, a selection of a least one of a user, a document type, a document, and a device, the server may filter the work history information in the calendar form according to the selection and provides the filtered work history information to the second device.

The server may further include a database configured to store the received work history information and the document corresponding to the work history information, wherein the transceiver may receive the document from the at least one first device.

The indicator may include an identification value of the user who works on the document on the corresponding date.

The indicator may include an identification value of the at least one first device which transmits the work history information.

The work history information may include at least one of time corresponding to work on the document, a title of the document, a type of the document, a type of a work on the document, an identification value of the user, an identification value of the at least one first device, and a title of a program used to perform the work.

The type of the work may include at least one of creating of the document, reading of the document, and editing of the document.

According to an aspect of another exemplary embodiment, there is provided a device for viewing work history information of a document, the device including: a transceiver configured to communicate with a server; and a controller configured to output, at a corresponding date in a calendar form based on information received from the server, an indicator of the work history information of the document, and to control the transceiver to request, from the server, the work history information of the document in response to a selection of the indicator.

The work history information of the document may correspond to work performed on the document by another device.

The controller may control the transceiver to receive the document from the server.

The controller may generate the work history information in response to a predetermined event with respect to the document.

The predetermined event may be at least one of a creating of the document, a saving of the document, and a closing of the document.

The controller may be configured to output filtered indicators in the calendar form, filtered according to a selection of a least one of a user, a document type, a document, and a device.

The indicator may include at least one of an identification value of a user who works on the document on the corresponding date, and an identification value of a corresponding device for the document.

According to an aspect of another exemplary embodiment, there is provided a system for managing work history information of a document, the system including: a first device configured to generate the work history information, the first device including: a first controller configured to generate the work history based on a work on the document, and a first transceiver configured to transmit the generated work history information; and a server configured to store the work history information of the document, the server including: a second transceiver configured to receive, from the first device, the transmitted work history information; and a second controller configured to arrange the received work history information in a calendar form by using time information included in the received work history information.

The second transceiver may provide the work history information in the calendar form to a second device.

The first controller may be configured to output, at a corresponding date in the calendar form based on information received from the server, an indicator of the work history information of the document, and to control the first transceiver to request, from the server, the work history information of the document in response to a selection of the indicator.

According to an aspect of another exemplary embodiment, there is provided a non-transitory computer-readable recording medium having embodied thereon a program for executing the method described above is included.

BRIEF DESCRIPTION OF THE DRAWINGS

These and/or other aspects will become apparent and more readily appreciated from the following description of exemplary embodiments, taken in conjunction with the accompanying drawings in which:

FIGS. 13 and 14 are tables illustrating examples of work history information obtained by a server according to an exemplary embodiment;

FIGS. 35 and 36 are tables illustrating examples of work history information of a document according to an exemplary embodiment;

FIGS. 53 and 54 are tables illustrating examples of work history information of a document according to an exemplary embodiment;

FIGS. 67 and 68 are tables illustrating examples of work history information of a document according to an exemplary embodiment;

FIGS. 108 and 109 are tables illustrating examples of work history information of a document according to an exemplary embodiment;

FIGS. 126 and 127 are tables illustrating examples of work history information of a document according to an exemplary embodiment;

FIGS. 136 and 137 are tables illustrating examples of work history information of a document according to an exemplary embodiment;

FIG. 148 is a flowchart of another example in which a server interworks work history information with a calendar of a user according to an exemplary embodiment;

FIG. 149 is a flowchart of an example in which when a server performs a document work according to a document work request of a first device, the server interworks work history information with a calendar of a first user according to an exemplary embodiment;

FIG. 150 is a diagram for explaining an example in which when devices perform cooperation authoring on a document, a server interworks work history information with a calendar of a user according to an exemplary embodiment;

FIG. 151 is a flowchart of an example in which a server interworks work history information with a calendar of a user according to an exemplary embodiment;

FIGS. 152A through 152C are flowcharts of examples in which when a first device and a second device perform cooperation authoring, a server interworks work history information with a calendar of a user according to an exemplary embodiment;

FIG. 153 is a diagram for explaining an example in which a server creates a document according to an exemplary embodiment;

FIG. 154 is a diagram for explaining an example of documents and work history information of the documents created by a server according to an exemplary embodiment;

FIG. 155 is a diagram for explaining an example of a process of combining documents through cooperation authoring performed by devices according to an exemplary embodiment;

FIG. 156 is a diagram for explaining another example of a process of combining documents through cooperation authoring performed by devices according to an exemplary embodiment;

FIGS. 157A through 157C are flowcharts of an example in which when a first device and a second device perform cooperation authoring, a server interworks work history information with a calendar of a user according to an exemplary embodiment;

FIG. 158 is a diagram for explaining another example of a process of combining documents through cooperation authoring performed by devices according to an exemplary embodiment;

FIG. 159 is a diagram for explaining an example of creating a final document through cooperation authoring performed by first, second, and Nth devices according to an exemplary embodiment;

Figure 160:
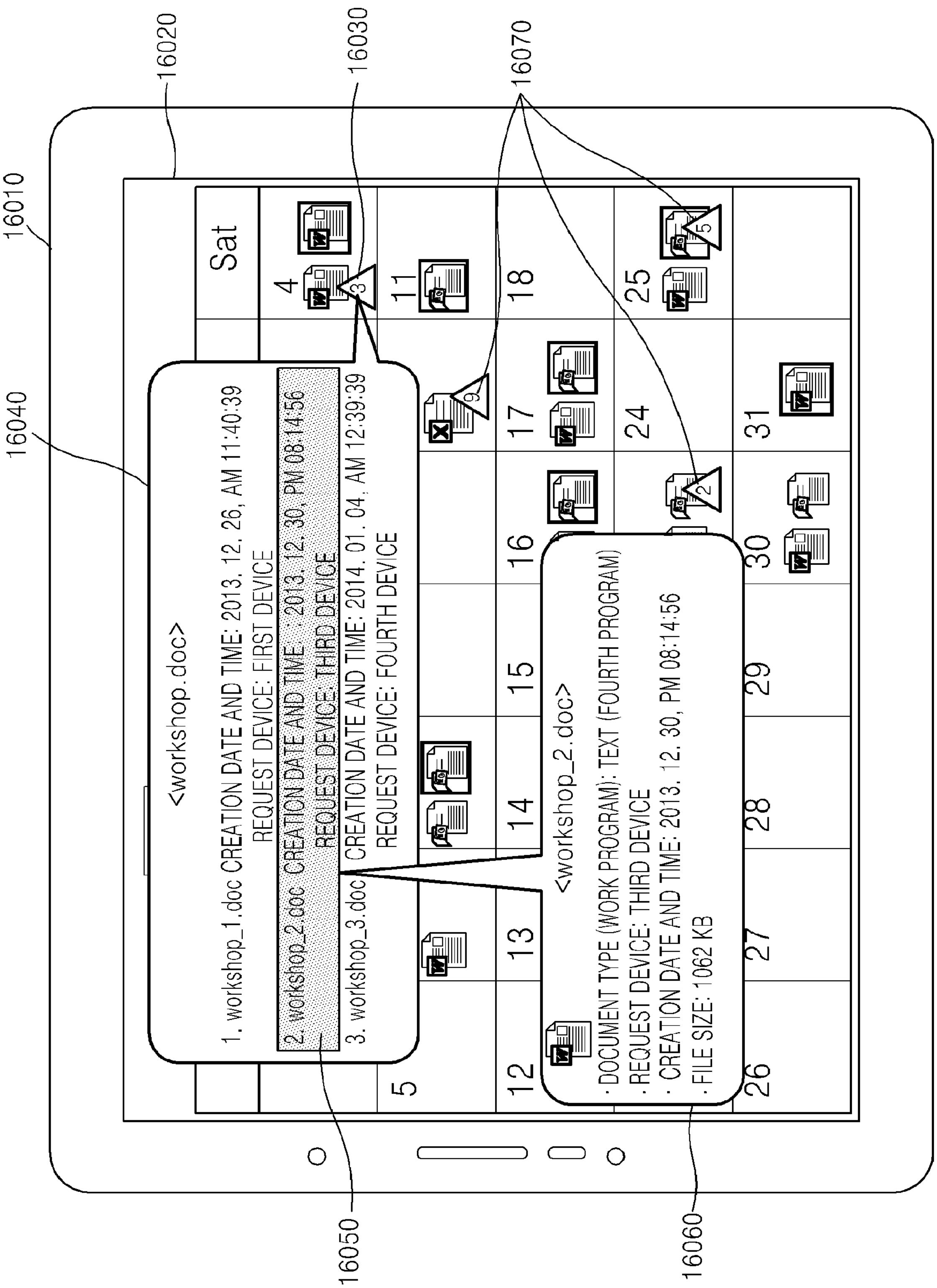
Figure 161:
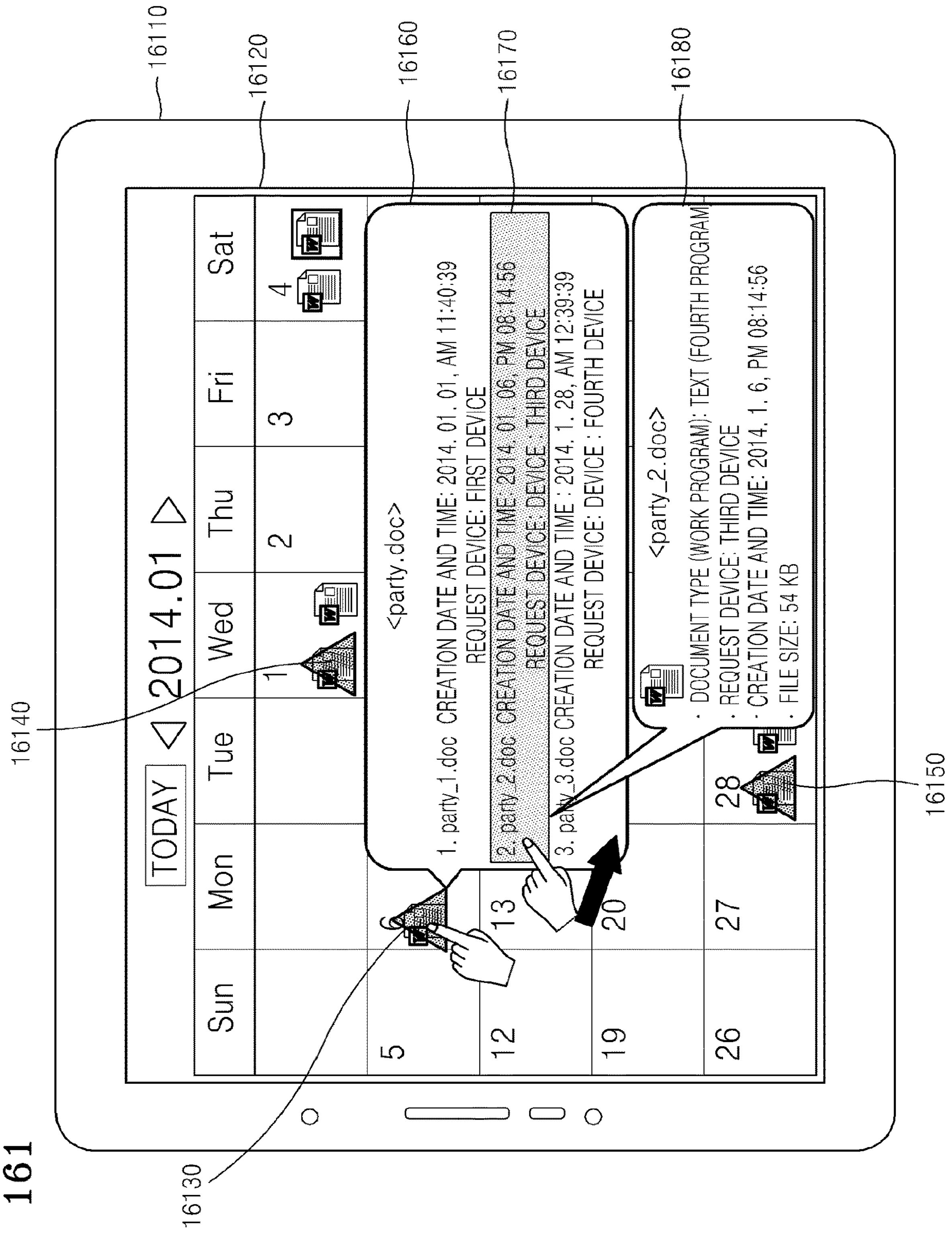
Figure 162:
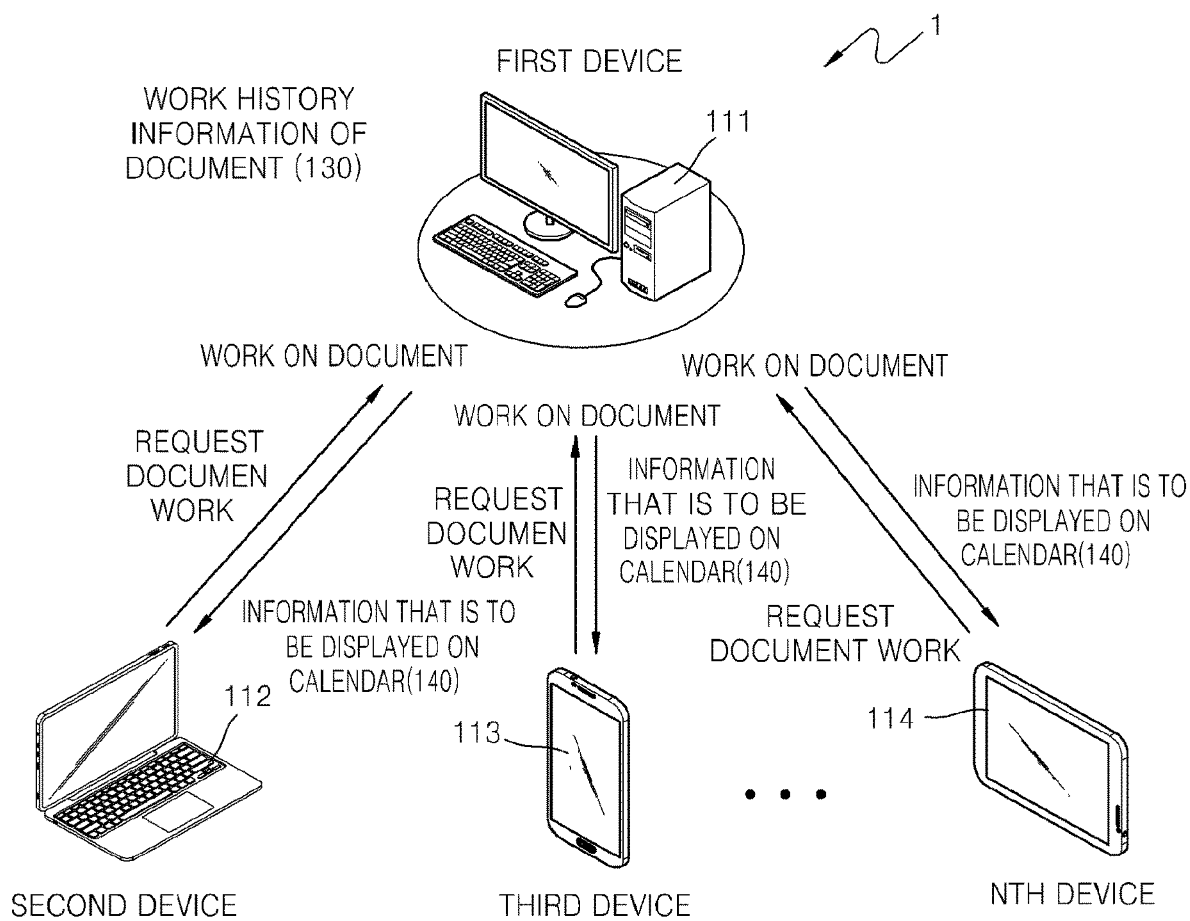
Figure 163:
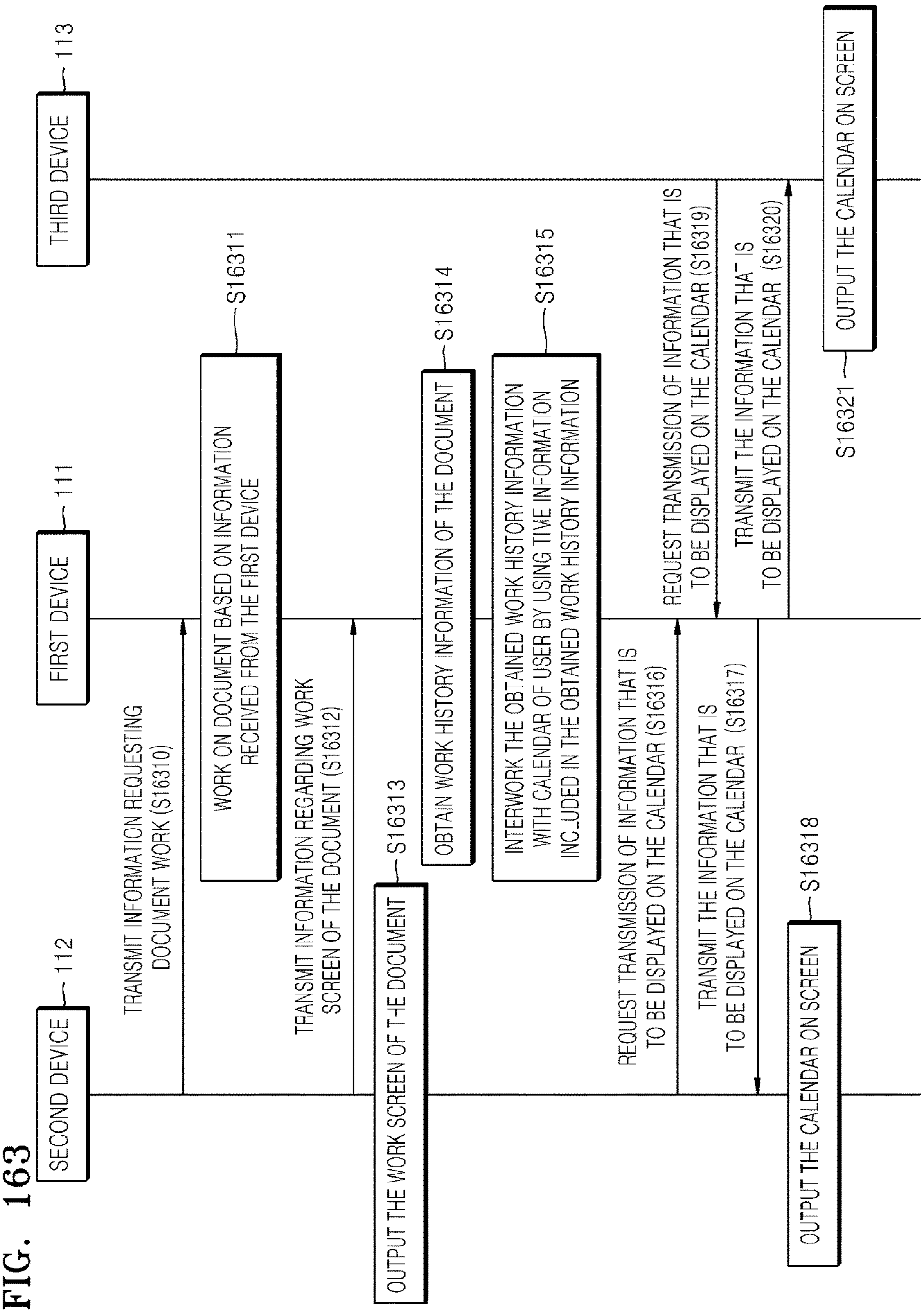
Figure 164:
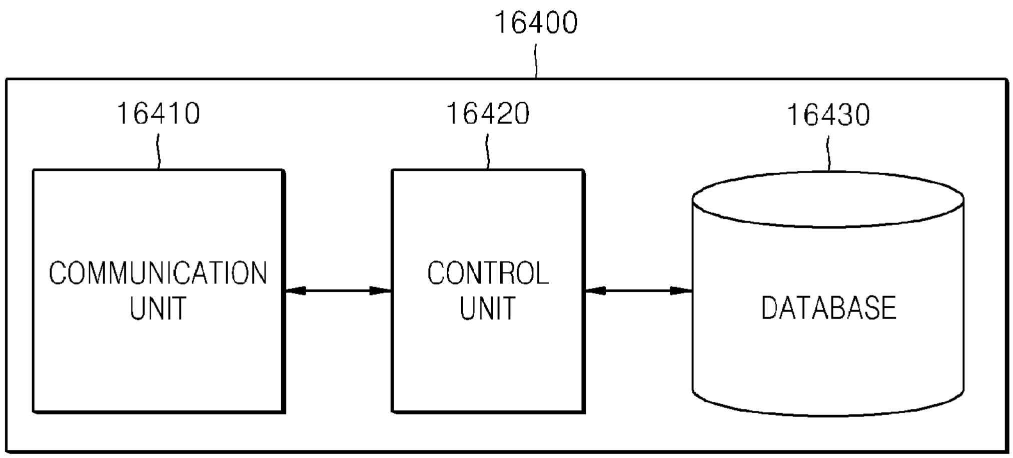
Figure 165:
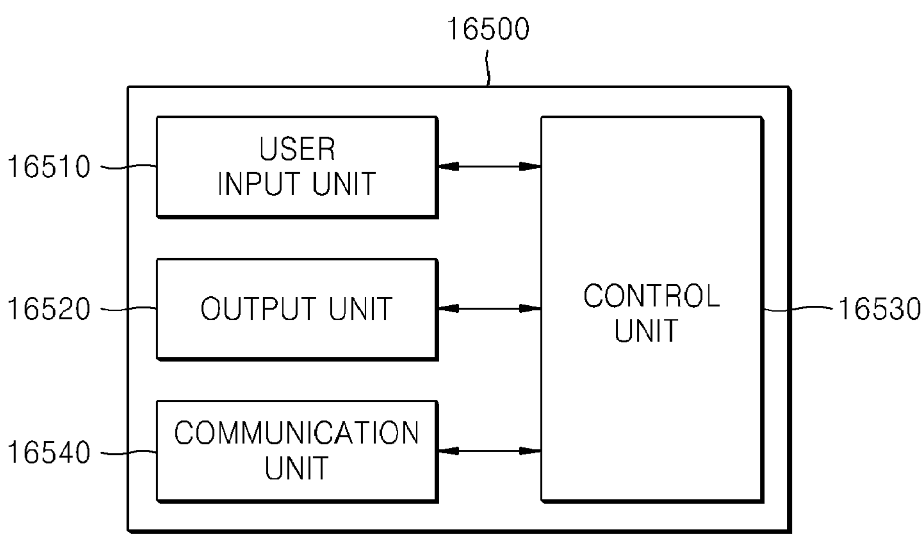
Figure 166:
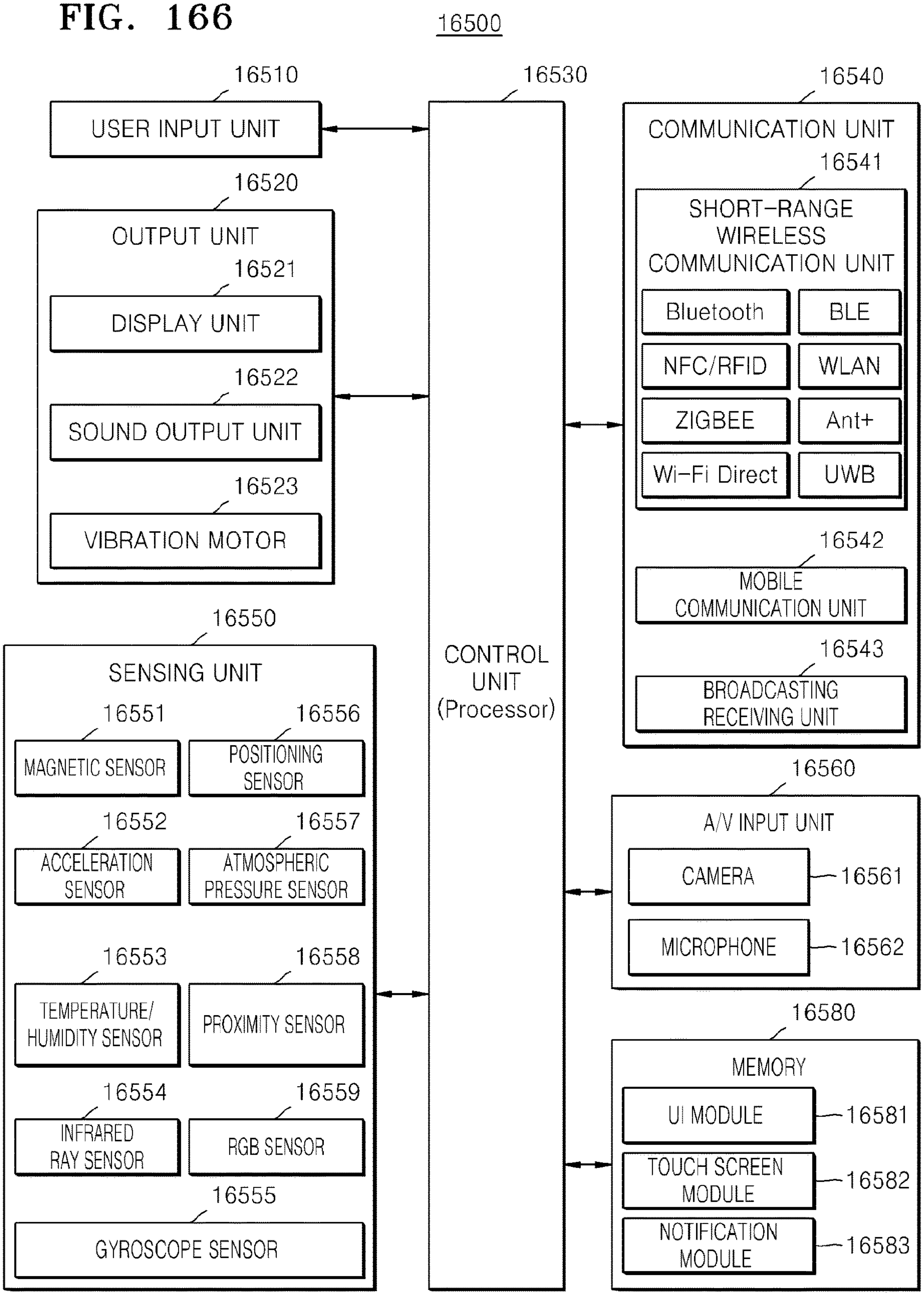

FIG. 160 illustrates an example of displaying histories of documents created through cooperation authoring on a monthly calendar displayed on a screen of a device according to an exemplary embodiment;

FIG. 161 illustrates another example of displaying histories of documents created through cooperation authoring on a monthly calendar displayed on a screen of a device according to an exemplary embodiment;

FIG. 162 is a diagram for an example in which when at least one of devices corresponds to a server, and a device that acts as the server perform a document work based on requests of the devices, the device that acts as the server interworks work history information with a calendar of a user according to an exemplary embodiment;

FIG. 163 is a flowchart of an example in which when a second device and a third device perform a document work, a first device interworks work history information with a calendar of a user according to an exemplary embodiment;

FIG. 164 is a block diagram of a server according to an exemplary embodiment; and FIGS. 165 and 166 are block diagrams of a device according to an exemplary embodiment.

DETAILED DESCRIPTION OF EXEMPLARY EMBODIMENTS

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" to another element, it may be directly connected to the other element or may be indirectly connected to the other element with other element(s) interposed therebetween. It will also be understood that the terms "comprises", "includes", and "has", when used herein, specify the presence of stated elements, but do not preclude the presence or addition of other elements, unless otherwise defined.

Throughout the specification, a term "gesture" refers to a user's action used to control a terminal. For example, a gesture described in the specification includes tap, touch and hold, double tap, drag, panning, flick, drag and drop, hand shaking, etc.

Throughout the specification, "outputting of a screen of a device" means displaying of a specific screen on the screen of the device. Thus, "outputting of a screen of a device" includes "displaying of a screen of a device".

Also, throughout the specification, "database" means a set of data containing predetermined information and storage in which the set of data is stored.

Hereinafter, exemplary embodiments will be described in detail with reference to the accompanying drawings.

Figure 1:
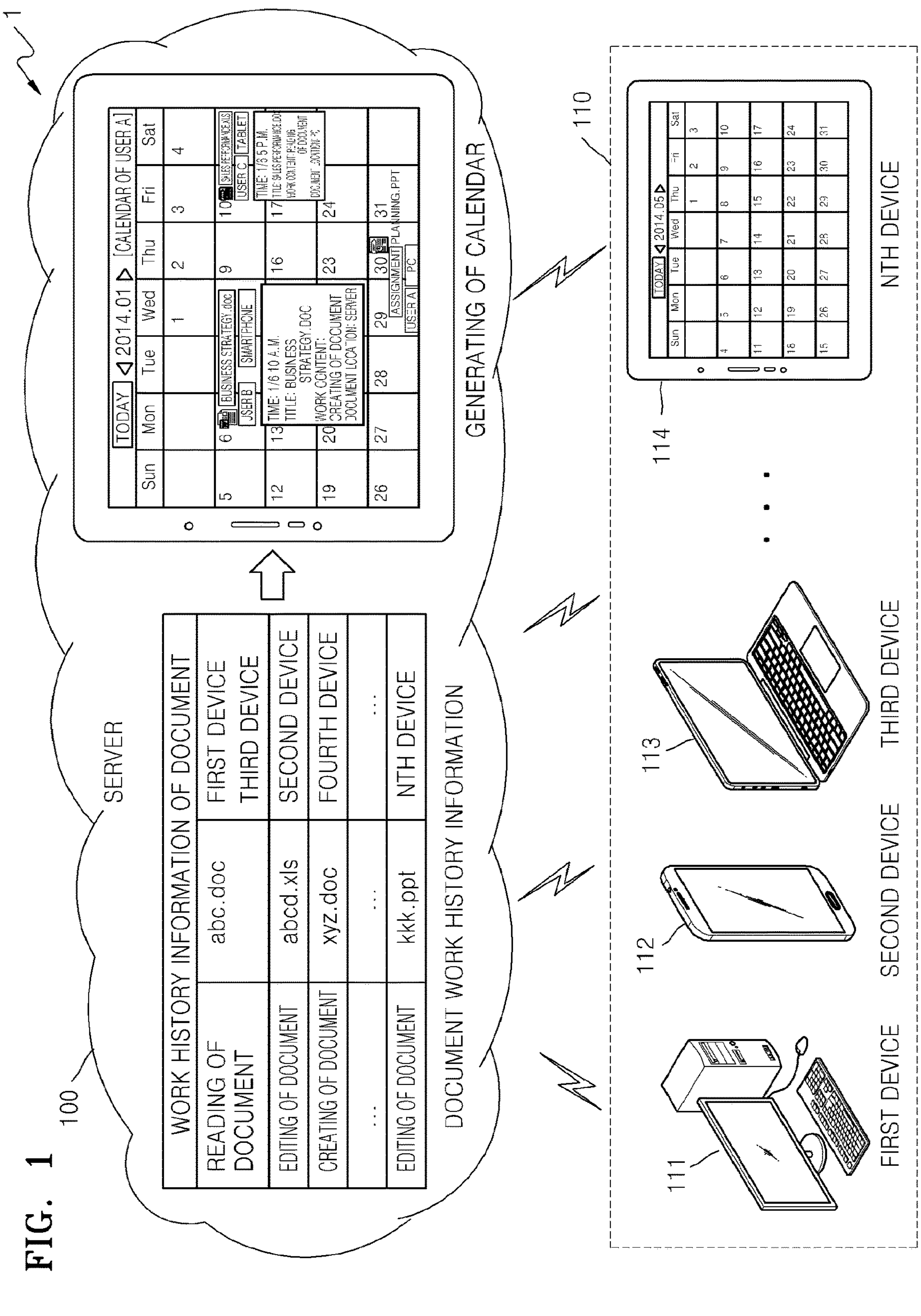
FIG. 1 illustrates a system that interworks work history information with a calendar of a user according to an exemplary embodiment.

FIG. 1 illustrates a system 1 that interworks work history information with a calendar of a user according to an exemplary embodiment.

Referring to FIG. 1, the system 1 includes a server 100 and devices 110. The server 100 and the devices 110 may transmit and receive data based on a wired and/or wireless communication method.

The server 100 interworks the work history information with the calendar of the user by using time information included in the work history information of a document received from at least one of the devices 110. In this regard, the time information refers to information indicating a time (e.g., at least one of a time duration, a starting time, an ending time, etc.) that at least one of the devices 110 works on the document. The calendar refers to an object showing schedule information of the user. For example, if the user works on the document by using a first device 111, the first device 111 generates work history information when work on the document is performed. The first device 111 transmits the generated work history information to the server 100, and the server 100 extracts information indicating a time taken to work on the document from the work history information received from the first device 111. The server 100 interworks the work history information received from the first device 111 with the calendar of the user by using the extracted information indicating the time.

Examples in which the first device 111 transmits the work history information to the server 100 are as follows. For example, the first device 111 may simultaneously generate the work history information and transmit the same to the server 100. As another example, the first device 111 stores the generated work history information in a memory 16580 and may transmit all of the work history information stored in the memory 16580. As another example, the first device 111 generates the work history information and stores the generated work history information in the memory 16580. If an interworking request is received from the server 100, the work history information stored in the memory 16580 may be transmitted to the server 100.

If the work history information is generated when the user has logged into the server 100, the first device 111 may immediately transmit the work history information to the server 100. Meanwhile, when the user works on the document work by using the first device 111 without logging into the server 100, the first device 111 may first store the work history information in the memory 16580. When the user logs into the server 100 at a later time, the first device 111 may transmit, to the server 100, the work history information that is previously stored in the memory 16580. In this case, the first device 111 may automatically transmit the work history information that is previously stored in the memory 16580 to the server 100, but may transmit the work history information that is previously stored in the memory 16580 to the server 100 after a request for transmitting the work history information is received from the user.

In addition, the user may create a certain folder in the first device 111 and may set the created folder to be connected to the server 100. In this case, work history information of a document included in the folder is transmitted to the server 100, but work history information of a document which is not included in the folder may not be stored in the server 100. The work history information of documents may be immediately transmitted to the server 100 when the user has logged into the server 100. Work history information which is generated when the user does not log into the server 100 may be transmitted to the server 100 at a point in time when the user logs into the server 100 at a later time.

The server 100 interworks the work history information with the calendar of the user by reflecting or adding the work history information to the calendar (or in calendar form) of the user. Examples of reflecting the work history information to the calendar of the user are as follows.

For example, the server 100 may store the work history information in a database 16430 according to a work date. In other words, when the server 100 stores the work history information in the database 16430, the server 100 may store the work history information according to a work date when the device works on a document. For example, if it is assumed that the work history information received from the first device 111 includes time information of "May 14, 2014, 09:04:42 a.m.", the server 100 may store first work history information in a field of the database 16430 which corresponds to "May 14, 2014, 09:04:42 a.m.". In this case, the database 16430 may be included in the server 100 or in a device separate from the server 100. The server 100 accesses the database 16430 via a calendar program installed in the server 100 and may perform reading, editing, adding, etc. of the work history information.

As another example, the server 100 stores the work history information in the database 16430 and may extract the work history information that is previously stored via the calendar program installed in the server 100 so that the extracted work history information may be displayed on a calendar UI. For example, if it is assumed that the first work history information is information worked on in May 2014 among all of the work history information stored in the database 16430, the server 100 extracts the first work history information from the database 16430 and may display the extracted first work history information on a calendar UI corresponding to May 2014. In this case, the server 100 generates an indicator indicating the first work history information and may display the generated indicator on the calendar UI.

As another example, the server 100 may immediately reflect the work history information received from at least one of the devices 110 to the calendar via the calendar program installed in the server 100. For example, if it is assumed that work history information regarding work performed on May 14, 2014 is received from the first device 111, the server 100 may reflect the work history information to a calendar corresponding to May 2014 via the calendar program. Then, the server 100 may store the calendar, to which the work history information is reflected, in the database 16430.

The server 100 may reflect the work history information in the calendar of the user or may display the work history information on the calendar UI by generating an indicator indicating the work history information or a document worked on. Here, the indicator refers to an object displayed on the calendar. For example, the indicator may include an icon, a symbol, a popup window, etc. Here, when a device opens and/or outputs a calendar (e.g., a calendar application, a calendar widget, a calendar form, etc.), the server 100 may transmit the generated indicator or information corresponding to the generated indicator (e.g., metadata) so that the device may output the indicator on the calendar.

As an example, the server 100 interworking work history information with a calendar of a user may include the server 100 transmitting the work history information corresponding to an indicator to a device when the user of the device selects the indicator displayed on the calendar output on the device. Thus, the device may receive the transmitted work history information corresponding to the selected indicator, and may output the received work history information on a screen.

As another example, the server 100 interworking work history information with a calendar of a user may include the server 100 transmitting a document corresponding to an indicator or screen information indicating the document to a device when the user selects the indicator displayed on the calendar output on the device. Thus, the device may output the document corresponding to the selected indicator on the screen.

The device requests the server 100 to transmit information to be displayed on the calendar, and the server 100 transmits the information to be displayed on the calendar based on the request.

The device outputs the calendar of the user on the screen based on the information received from the server 100. Examples of outputting the calendar of the user on the screen are as follows.

For example, a calendar program for clients (or an application) (hereinafter, referred to as a first calendar program) is installed in the devices 110, and a calendar program for a server (or an application) (hereinafter, referred to as a second calendar program) may be installed in the server 100. In this case, the first device 111 generates a calendar UI by using the first calendar program and may store the generated calendar UI in the memory 16580. When work history information to be displayed by date on the calendar UI is received from the server 100, the first device 111 may output the calendar UI stored in the memory 16580 as well as the work history information (or an indicator) received from the server 100. For example, when the first device 111 requests the server 100 to transmit the information to be displayed on the calendar, the server may transmit the work history information (or the indicator) stored in the database 16430. The first device 111 may extract the calendar UI stored in the memory 16580. The first device 111 may output the calendar on the screen by displaying the work history information (or the indicator) transmitted by the server 100 on the extracted calendar UI. Alternatively, the first device 111 receives a screen of the second calendar program from the server 100 and then may output (mirror) the received screen on the screen of the first device 111. Therefore, the first device 111 may output the calendar of the user on the screen.

As another example, when the server 100 generates the calendar and stores the generated calendar in the database 16430, and when the first device 111 requests the server 100 to transmit the information to be displayed on the calendar, the server 100 may transmit the calendar to the first device 111 in a webpage form. In this regard, a calendar UI and an indicator to be displayed on the calendar UI are included in the calendar generated by the server 100. In this case, the first device 111 uses a web browser to access a webpage generated by the server 100 and may display the calendar on the screen. For example, when the first device 111 requests the server 100 to transmit the information to be displayed on the calendar and transmits account information of a user to the server 100, the server may authenticate the user by using the account information of the user. The server 100 extracts the calendar stored in the database 16430 and generates a webpage by using the extracted calendar. The first device 111 uses the web browser to access the webpage generated by the server 100 and may output the calendar on the screen. Therefore, the first device 111 may output a calendar of the user on the screen.

As described above, the server 100 transmits the information to the first device 111 when the first device 111 requests the server 100 to transmit the information to be displayed on the calendar. In other words, when the first device 111 executes the first calendar program and selects a certain year, month, day, or time, or when the first device 111 transmits the account information of the user to the server 100, the server 100 transmits the information to the first device 111. However, the inventive concept is not limited thereto.

For example, the first device 111 may periodically interwork the information to be displayed on the calendar with the server 100. As another example, even if there is no request from the devices 110, the server 100 may periodically transmit the information to be displayed on the calendar to the first device 111.

As described above, the device outputs the calendar of the user on the screen. However, the inventive concept is not limited thereto. In other words, the server 100 may output the calendar of the user. For example, if a display is included in the server 100, the server 100 may output the calendar of the user via the display. Also, if the server 100 is connected to a device of an administrator, the calendar of the user may be output via a screen of the device of the administrator. In this case, the server 100 may output the calendar via a webpage or a screen of a second calendar program.

According to an exemplary embodiment, the first device 111 may transmit all of the work history information, or only a portion of the work history information to the server 100. Examples in which the device transmits a portion of the work history information are as follows.

As an example, if it is assumed that the first device 111 works on first through third documents, the first device 111 may transmit only work history information of the first document to the server 100.

An another example, if it is assumed that the first device 111 creates and edits the first document, the first device 111 may transmit only work history information generated by editing the first document to the server 100.

As another example, when a document output on the screen stops being displayed, the first device 111 may display an indicator asking whether to transmit the work history information to the server 100. In this case, only when a user input which requests the transmission of the work history information to the server 100 via the user input device 16510 is received, the first device 111 may transmit the work history information the server 100.

As another example, the first device 111 may transmit work history information of a document worked on during a certain period to the server 100. For example, the first device 11 may transmit work history information of a document worked on between 1 May 2014, 00:00:00 a.m. and 5 May 2014, 11:59:59 p.m. In addition, the first device 111 may transmit work history information of a document worked on between 09:00:00 a.m. and 05:59:59 p.m.

As another example, the user may designate a device among the devices 110 for transmitting the work history information to the server 100, and the designated device may transmit the work history information to the server 100. For example, if it is assumed that the user designates the first device 111 among the devices 110, the first device 111 may only transmit the work history information to the server 100.

The server 100 may interwork a portion of the work history information received from the first device 111 with the calendar of the user. In other words, the amount of work history information transmitted to the server 100 and the amount of work history information interworking with the calendar of the user may be different from each other. The number of pieces of the work history information transmitted to the server 100 and the number of pieces of the work history information interworking with the calendar of the user are described below.

As an example, if it is assumed that the first device 111 transmits work history information of the first through third documents to the server 100, the server 100 may interwork only the work history information of the first document with the calendar of the user.

As another example, if it is assumed that the first device 111 transmits, to the server 100, work history information generated by creating the first document and work history information generated by editing the first document, the server 100 may interwork only the work history information generated by editing the first document with the calendar of the user.

If the user works on the document by using the first device 111 through an Nth device 114, each of the first device 111 through the Nth device 114 generates the work history information when the document is worked on. In other words, the first device 111 generates first work history information, and the Nth device 114 generates Nth work history information. The first device 111 through the Nth device 114 transmit the work history information to the server 100. The server 100 extracts time information indicating time taken to work on the document from the first through Nth work history information received from the first device 111 through the Nth device 114. The server 100 interworks the work history information received from the first device 111 through the Nth device 114 with the calendar of the user by using the extracted time information.

In this regard, each of the first device 111 through the Nth device 114 may transmit all of the work history information, or only a portion of the work history information or may interwork a portion of the work history information received by the server 100 with the calendar of the user as described above.

In the above-described example, the user refers to a subject who works on the document by using at least one of the devices 110. For example, the devices 110 may be devices of a same user or devices of different users.

In the above-described example, the user may work on the document using at least one of the devices 110 by using a program installed in at least one of the devices 110, although it is understood that one or more other exemplary embodiments are not limited thereto. For example, the user may work on the document by using a program installed in the server 100 via at least one of the devices 110.

In the above-described example, the user works on the document by using at least one of the devices 110, although it is understood that one or more other exemplary embodiments are not limited thereto. For example, the user may work on a content by using at least one of the devices 110.

The document may include a text document or a multimedia document. For example, the document may include an object worked on by using a word processing program (e.g., MICROSOFT WORD), a spreadsheet processing program (e.g., MICROSOFT EXCEL), a presentation program (e.g., MICROSOFT POWERPOINT), etc., that are installed in the devices 110 or the server 100.

Content may include photos, images, moving images, music, etc. For example, content may include an object worked on by using a dictionary execution program, an image execution program, a moving image execution program, a music execution program, etc., that are installed in one or more of the devices 110 and/or the server 100.

The document work may include at least one of creating, reading, viewing, opening, printing, deleting, editing, transmitting, copying, moving, changing properties (e.g., metadata), etc., of the document. For example, the first device 111 performing the document work may include at least one of the first device 111 creating the document, the first device 111 reading the document, the first device 111 editing the document, etc.

In this regard, the first device 111 reading the document includes the first device 111 outputting the document on a screen. The first device 111 editing the document includes the first device 111 adding new content to content of a previously created document or deleting the content of the previously created document. The first device 111 viewing the document includes the first device 111 viewing the document or a portion thereof in a preview application or a viewer application (e.g., a third party viewer application).

When the indicator is selected according to a user input received through a user input device 16510 (e.g., user input unit) of a device, the device may output the work history information on the screen. For example, at least one of a type or a title of the document, an identification value of the user, an identification value of the device, etc., may be displayed on the indicator. In this regard, the identification value of the user may include a title (i.e., name), a symbol, an abbreviation, an image, etc., of the user, and the identification value of the device may include a title (i.e., name), a model, a serial number, a symbol, an image, a label, etc., of the device.

When the indicator is selected, at least one of the work history information of the document and the document itself may be output. For example, when the indicator is selected a first time or according to a first type of input selection (e.g., a single click or touch selection), the work history information may be output, and when the indicator is selected a second time or according to a second type of input selection (e.g., a double click or touch selection), the document worked on may be output. According to another exemplary embodiment, when the indicator is selected, the work history information may be output, and when another indicator included in the output work history information is selected, the document worked on may be output.

The work history information refers to information generated when at least one of the devices 110 performs the document work. For example, the work history information may include at least one of time taken to work on the document, a starting time of work on the document, an ending time of work on the document, a title of the document worked on, a type of the document worked on, a type of the document work, the identification value of the user, the identification value of the device, a title of a program used to work on the document, a size of the document, a directory information of the document, etc.

According to an exemplary embodiment, the server 100 may transmit, to one or more of the devices 110, all or some of the work history of a document when the server 100 transmits the indicator or the information corresponding to the indicator. In this case, the server 100 may transmit the work history of the document to one or more of the devices 110 on at least one of a user basis (e.g., to only devices of one or more users authorized to access the document), on a group basis (e.g., to only devices corresponding to one or more groups authorized to access the document), on a per-request basis (e.g., to only devices that have requested the indicator and/or the work history), on a network basis (e.g., to only devices that are connected to a particular network), on a device type basis (e.g., to only devices of a particular type, such as mobile, persona computer, etc.), etc. According to another exemplary embodiment, the server 100 may transmit, to one or more of the devices 110, all or some of the work history of a document in response to a selection of an indicator by the one or more devices 110.

Furthermore, in one or more exemplary embodiments, a device that receives work history information may display all or some of the received work history information in response to a selection of a corresponding indicator. In this case, the device may display only some of the received work history information according to a filter condition. For example, if the filter condition is for work history information of one or more particular users, the device may display the work history information of only the one or more particular users among all of the work history information for the document.

Moreover, in one or more exemplary embodiments, the server 100 may generate and/or the device may display a plurality of indicators for a same document, each of the indicators respectively corresponding to a different type of work history information (e.g., one indicator corresponding to a program type of the document, and another indicator corresponding to a user of the document). In this regard, the device may generate and/or output different types of indicators according to the work history information and/or according to received information corresponding to the indicators (e.g., metadata). Accordingly, the device may display different calendars corresponding to different types of work history information by, for example, outputting the corresponding indicators for the different types of work history information. By way of example, a device may output a calendar corresponding to one or more users (e.g., a user calendar mode) by outputting only the indicators for work history information of a particular user, or by displaying different indicators respectively for different users. Alternatively, the device may output a calendar corresponding to one or more groups (e.g., a group calendar mode) by outputting only the indicators for work history information of a particular group, or by displaying different indicators respectively for different groups. Also, the device may output a calendar corresponding to one or more projects (e.g., a project calendar mode) by outputting only the indicators for work history information of a particular project, or by displaying different indicators respectively for different projects. It is understood that one or more other exemplary embodiments are not limited to the above-described modes and filter conditions. Moreover, it is understood that the determination of which indicators and/or work history information to generate and/or output may be made at the server 100 or at the device. For example, in response to receiving, from a device, a selection of a least one of a user, a document type, a document, a device, etc., the server 100 may filter the work history information in a calendar form according to the selection and provide the filtered work history information to the second device. Furthermore, this determination of indicators (e.g., filter conditions) may be based on prior or default settings, on user settings, on an application's settings, on a particular calendar's settings, etc.

The server 100 refers to a device that transmits and receives data to and from the devices 110. For example, the server 100 may be a cloud server, a personal server, a network server, etc. In this regard, the personal server may correspond to a device that acts as a server among the devices 110.

The device transmits and receives data to and from the server 100. For example, the device may include a desktop personal computer (PC), a notebook PC, a laptop PC, a smartphone, a tablet PC, a wearable device, a smartphone, a mobile device, a portable device, a portable multimedia player, a television, a display device, etc. Here, the device may transmit both a document and corresponding work history information to the server 100, the work history information without the document to the server 100, or a document including the work history information (e.g., as metadata thereof). By way of example, according to an exemplary embodiment whereby a first device transmits the work history information without the document to the server 100 and a second device selects an indicator corresponding to the work history information and/or the document, the server 100 may instruct the first device to transmit the document to the second device. Alternatively, in response to such selection by the second device, the server 100 may control to receive the document from the first device and transmit the received document to the second device (or provide access to the document via a program executed on the server 100).

Hereinafter, examples in which the server 100 generates the work history information of the document will be described below with reference to FIGS. 2 through 163. Descriptions provided below with reference to FIGS. 2 through 163 correspond to examples of the method of FIG. 1. Therefore, although some descriptions are omitted, the descriptions provided with reference to FIG. 1 may be applied to the descriptions provided with reference to FIGS. 2 through 163.

Figure 83:
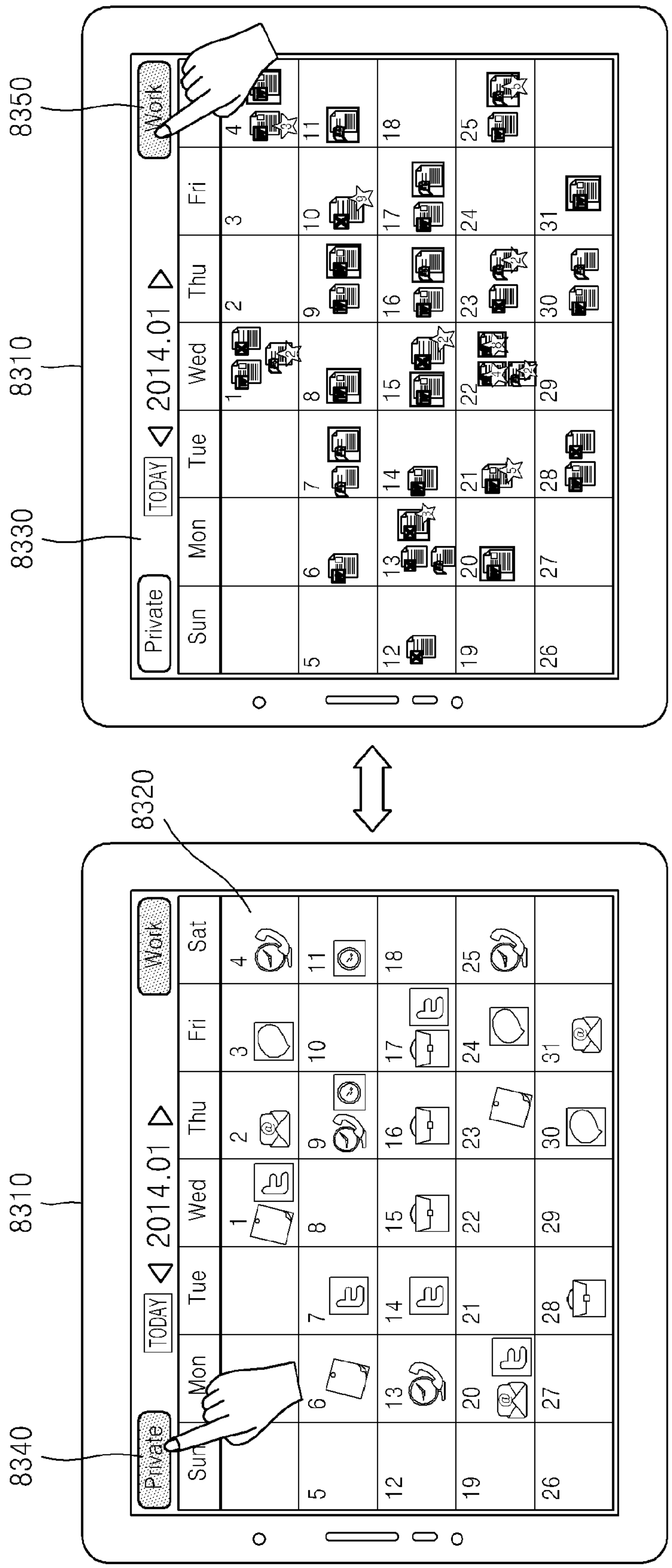
FIG. 83 is diagrams for explaining examples of switching modes of calendars according to an exemplary embodiment.

As an example, when users of the devices 110 are the same, and the devices 110 perform a document work, one or more exemplary embodiments in which the server 100 interworks work history information with a calendar of a user will be described with reference to FIGS. 2 through 83.

As another example, when the users of the devices 110 are different, and the devices 110 perform document works, one or more exemplary embodiments in which the server 100 interworks work history information with a calendar of a user will be described with reference to FIGS. 84 through 86.

As another example, when the devices 110 cooperate in authoring, editing, etc., a document, one or more exemplary embodiments in which the server 100 interworks work history information with a calendar of a user will be described with reference to FIGS. 87 through 98.

As another example, when at least one of the devices 110 corresponds to the server 100, and the devices 110 perform a document work, one or more exemplary embodiments in which the device that performs an operation of the server 100 interworks work history information with a calendar of a user will be described with reference to FIGS. 99 through 100.

As another example, when the users of the devices 110 are the same, and the server 100 performs a document work based on requests of the devices 110, one or more exemplary embodiments in which the server 100 interworks work history information with a calendar of a user will be described with reference to FIGS. 101 through 146.

As another example, when the users of the devices 110 are different, and the server 100 performs a document work based on requests of the devices 110, one or more exemplary embodiments in which the server 100 interworks work history information with a calendar of a user will be described with reference to FIGS. 147 through 149.

As another example, when the server 100 performs authoring on a document based on requests of the devices 110, one or more exemplary embodiments in which the server 100 interworks work history information with a calendar of a user will be described with reference to FIGS. 150 through 161.

As another example, when at least one of the devices 110 corresponds to the server 100, and a device that performs an operation of the server 100 performs a document work based on requests of the devices 110, one or more exemplary embodiments in which the device that performs the operation of the server 100 interworks work history information with a calendar of a user will be described with reference to FIGS. 162 and 163.

Figure 2:
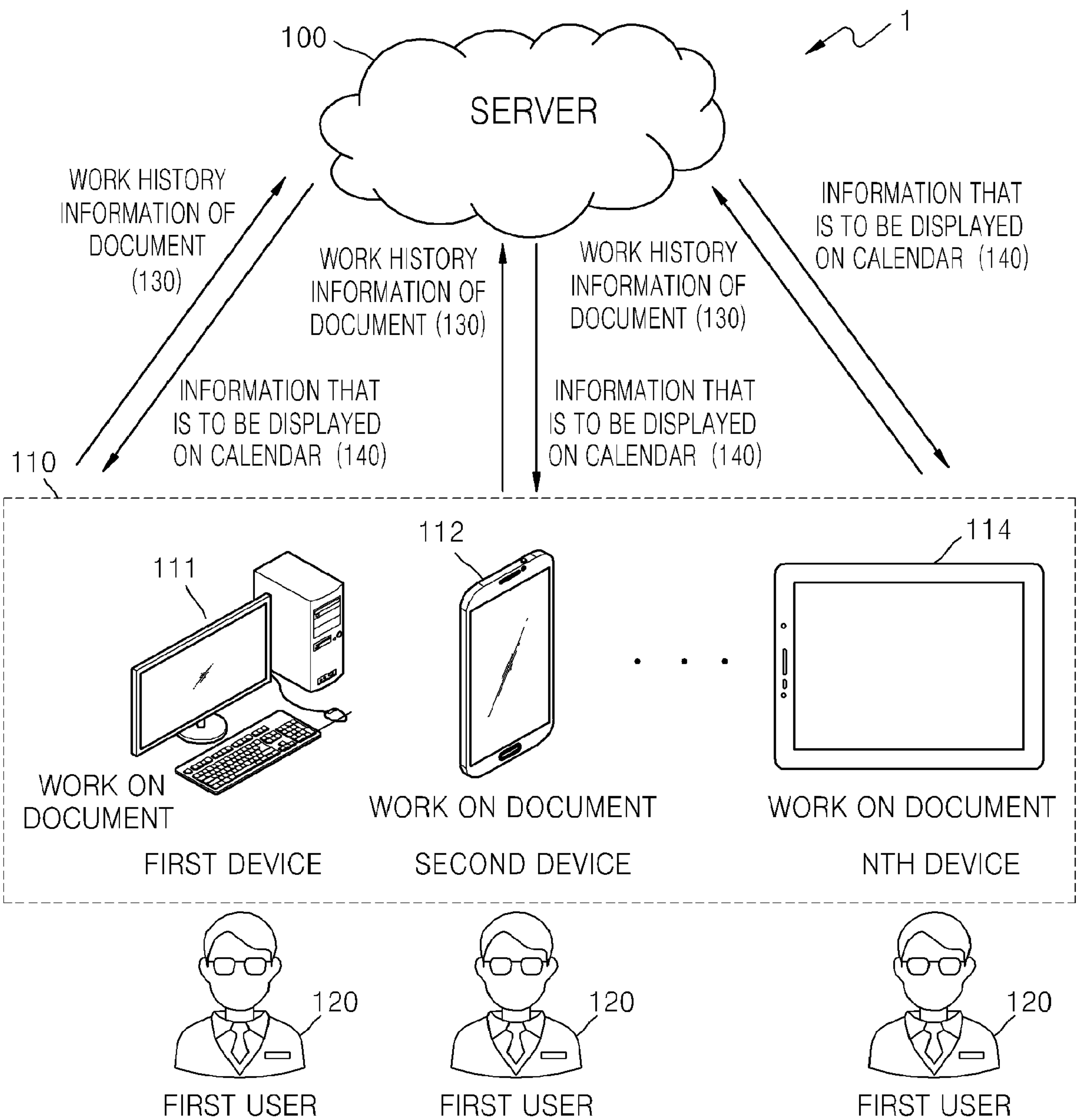
FIG. 2 is a diagram for explaining an example in which when users of devices are the same, and the devices perform a document work, a server interworks work history information with a calendar of a user according to an exemplary embodiment.

FIG. 2 is a diagram for explaining an example in which when users of the devices 110 are the same, and the devices 110 perform a document work, the server 100 interworks work history information 130 with a calendar of a user according to an exemplary embodiment.

Referring to FIG. 2, the system 1 includes the server 100 and the devices 110. In this regard, the devices 110 refer to one, some, or all devices of a first user 120.

At least one of the devices 110 performs the document work and transmits the work history information 130 of a document to the server 100. For example, the first device 111 performs the document work and transmits the work history information 130 of the document to the server 100. In the same manner, a second device 112 through the Nth device 114 may perform the document work and transmit the work history information 130 of the document to the server 100.

The server 100 interworks the work history information 130 transmitted from the devices 110 with the calendar (or a calendar form) of the user. The server 100 transmits information 140 that is to be displayed on the calendar to the devices 110. In this regard, when the calendar is output on a screen of a device, the information 140 that is to be displayed on the calendar is information that is to be displayed on the output calendar (or output calendar form). For example, the information 140 that is to be displayed on the calendar may include work history information that is to be output on the screen of the device when an indicator that is to be displayed on the calendar or an indicator that is displayed on the calendar is selected. According to one or more exemplary embodiments, the output calendar or output calendar form may be provided in a calendar program, a calendar application, an application outputting a calendar or a calendar form, a web page, a widget, etc.

In this regard, the server 100 may transmit the information 140 that is to be displayed on the calendar to only a device that requests the server 100 to transmit the information 140 that is to be displayed on the calendar, among the devices 110. For example, the first device 111 executes a program that outputs the calendar, and may authenticate the first user 120 based on a user account input via the user input device 16510, thereby requesting the server 100 to transmit the information 140 that is to be displayed on a calendar of the first user 120.

Meanwhile, although there is no request from the first device 111, the server 100 may automatically transmit (for example, push) the information 140 that is to be displayed on the calendar to the first device 111. For example, if the first device 111 has previously requested the server 100 to transmit the information 140 that is to be displayed on the calendar of the first user 120, the server 100 may automatically transmit the information 140 that is to be displayed on the calendar of the first user 120 although there is no request from the first device 111 at a later time. According to another example, the server 100 may automatically transmit the information 140 according to a prior setting or a default setting to automatically transmit the information 140 at predetermined time intervals or predetermined time points.

Hereinafter, an example in which the server 100 interworks the work history information 130 with the calendar of the user will now be described with reference to FIG. 3.

Figure 3:
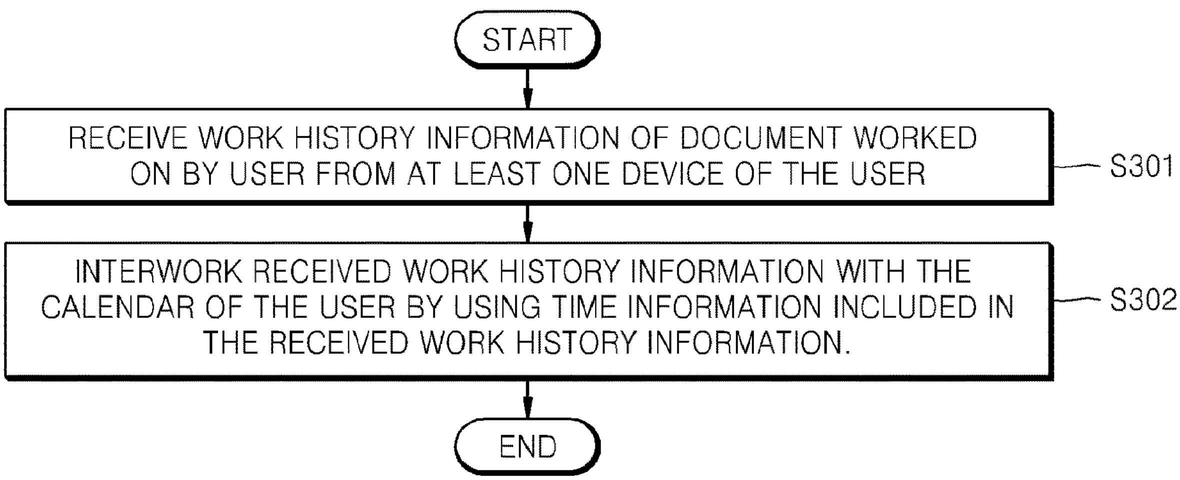
FIG. 3 is a flowchart of an example in which a server interworks work history information with a calendar of a user according to an exemplary embodiment.

FIG. 3 is a flowchart of an example in which the server 100 interworks work history information 130 with a calendar of a user according to an exemplary embodiment.

In operation S301, the server 100 receives the work history information of a document worked on by the user from at least one device of the user. In other words, at least one device of a same user performs a document work and transmits the work history information to the server 100. In this regard, the at least one device may transmit only a portion of the work history information to the server 100 as described above with reference to FIG. 1.

In operation S302, the server 100 interworks the received work history information with the calendar of the user by using time information included in the received work history information. In this regard, the time information may be information indicating time taken for the device to work on a document, although it is understood that one or more other exemplary embodiments are not limited thereto as described above. For example, if it is assumed that the first device 111 of the first user 120 creates a document "abc.doc" at 12:28:04 p.m. on May 12, 2014, the server 100 may generate an indicator that is to be displayed on May 12, 2014 in a calendar of the first user 120, and, when the indicator displayed on May 12, 2014 is selected, may determine work history information that is to be output on a screen of the first device 111 of the first user 120. In this regard, the server 100 may interwork only a portion of the received work history information with the calendar of the user as described above with reference to FIG. 1.

Hereinafter, an example in which when the first device 111 of the first user 120 and the second device 112 of the first user 120 work on a document, the server 100 interworks work history information with a calendar of the first user 120 will now be described with reference to FIG. 4.

Figure 4:
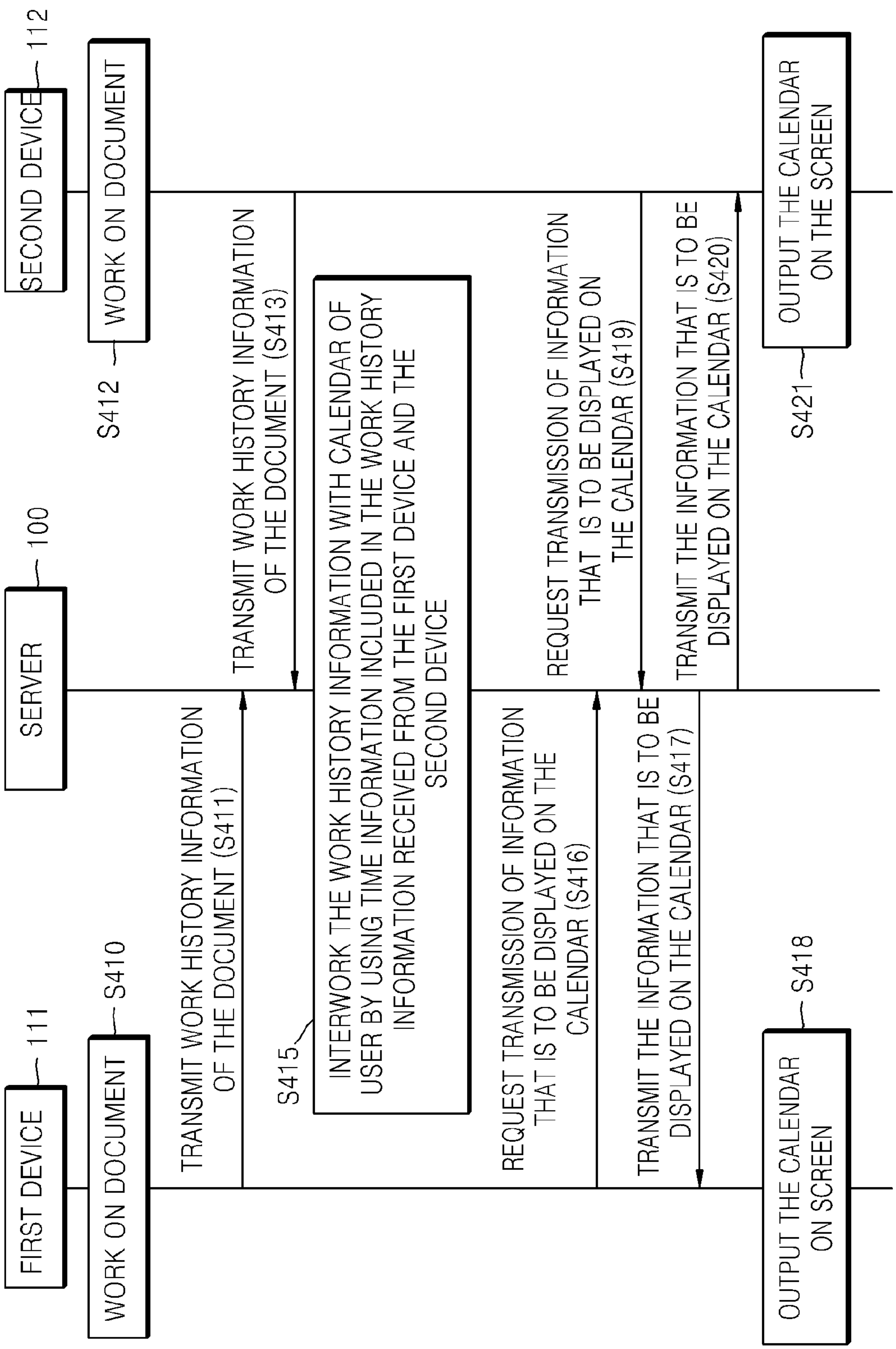
FIG. 4 is a flowchart of an example in which when a first device and a second device work on a document, a server interworks work history information with a calendar of a first user according to an exemplary embodiment.

FIG. 4 is a flowchart of an example in which when the first device 111 and the second device 112 work on a document, the server 100 interworks work history information with a calendar of the first user 120 according to an exemplary embodiment.

While the first device 111 and the second device 112 work on the document in FIG. 4 for convenience of description, but it is understood that one or more other exemplary embodiments are not limited thereto. In other words, there is no limit to the number of devices that work on the document in one or more other exemplary embodiments. If one device works on the document, operations of the second device 112 that will be described below may be performed by the first device 111. If it is assumed that the number of devices that work on the document is N (where N is greater than or equal to three), operations of the second device 112 that will be described below may be performed by at least one of a third device 113 through the Nth device 114.

In operation S410, the first device 111 works on the document. For example, the first device 111 may execute a program used to work on the document and work on the document by using the program. For example, the program used to work on the document may be Microsoft (MS) Office Word for the WINDOWS operating system (OS) which is installed in the first device 111 or PAGES for the MAC OS.

If a document that the first device 111 works on is "abc.doc", and a program used to create, read, edit, etc., "abc.doc" is a first program, the first device 111 may execute the first program and create, read, edit, etc., "abc.doc".

In operation S411, the first device 111 transmits the work history information of the document to the server 100. In this case, it is assumed that the user of the first device 111 logs into the server 100. For example, the first device 111 may transmit the work history information of the document to the server 100 at the time of ending execution of the program used to work on the document or storing (i.e., saving) the document, in response to a predetermined event (e.g., saving, opening, etc., the document), and/or according to a prior setting or a default setting (e.g., transmit the work history information at predetermined time intervals, at predetermined time points, and/or in accordance with a device setting such as only when connected to a local area network). In this case, the first device 111 may transmit work history information of "abc.doc" to the server 100 at the time of storing "abc.doc" or ending execution of the first program.

For example, the first device 111 may transmit the work history information of the document to the server 100 at a point in time when the user of the first device 111 logs into the server 100. For example, methods used by the user of the first device 111 to log into the server 100 may vary, the methods including a method of inputting an ID and passwords.

As another example, when the user of the first device 111 logs into the server 100, and when a separate program for transmitting the work history information to the server 100 is executed, the first device 111 may transmit the work history information of the document to the server 100. For example, when the user of the first device 111 logs into the server 100, a separate window used to ask whether to execute a transmission program may be output on a screen of the first device 111.

As another example, when the first device 111 works on a document, and a function for transmitting the work history information of the document to the server 100 is selected, the first device 111 may transmit the work history information of the document to the server 100. For example, when the user of the first device 111 generates or edits a document and selects a button for storing the document, a separate window used to ask whether to transmit the work history information may be output on the screen of the first device 111. In this case, when the user of the first device 111 requests the transmission of the work history information via the output window, the first device 111 may transmit the work history information of the document to the server 100.

As another example, types of documents whose work history information is to be transmitted may be registered in the server 100. For example, the user of the first device 111 may register a type of a document whose work history information is to be transmitted in the server 100 in advance. The user of the first device 111 may register filename extensions (for example, ".doc", ".xls", ".txt", ".ppt", etc.) of documents in the server 100 or execution programs (for example, MS Word, MS Excel, MS PowerPoint, etc.) for documents. Then, when the first device 111 works on a document whose type is registered in the server 100, the first device 111 may automatically transmit the work history information of the document to the server 100.

Meanwhile, a type of a document whose work history information is to be transmitted may be initially set in the server 100. The type of the document may be set in a manner in which the filename extension or execution program of the document is designated. The user of the first device 111 may edit types of documents set in the server.

In operation S412, the second device 112 works on the document. For example, the second device 112 may execute a program used to work on the document and work on the document by using the program. If a document that the second device 112 works on is "abcd.xls", and a program used to create, read, edit, etc., "abcd.xls" is a second program, the second device 112 may execute the second program and create, read, edit, etc., "abcd.xls".

In operation S413, the second device 112 transmits the work history information of the document to the server 100. For example, the second device 112 may transmit the work history information of the document to the server 100 at the time of ending execution of the program used to work on the document or storing the document, although it is understood that one or more other exemplary embodiments are not limited thereto as described above. For example, the second device 112 may transmit work history information of "abcd.xls" to the server 100 at the time of storing "abcd.xls" or ending execution of the second program.

In operation S415, the server 100 interworks the work history information with the calendar of the user by using time information included in the work history information received from the first device 111 and the second device 112. For example, if it is assumed that the first device 111 stores "abc.doc" at 08:01:42 a.m. on May 18, 2014, and the second device 112 stores "abcd.xls" at 14:29:00 p.m. on May 20, 2014, the server 100 may generate a first indicator that is to be displayed on a field of the calendar corresponding to May 18, 2014 and a second indicator that is to be displayed on a field of the calendar corresponding to May 20, 2014.

In operation S416, the first device 111 requests the server 100 to transmit information that is to be displayed on the calendar (i.e., the output calendar). For example, the first device 111 may request the server 100 to transmit the work history information that is to be output on a screen of the first device 111 when an indicator that is to be displayed on the calendar or an indicator displayed on the calendar is selected. For example, the first device 111 may request the server 100 to transmit the work history information that is to be output on the screen of the first device 111 when the first indicator, the second indicator, or the first and second indicators are selected.

In operation S417, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed. In the latter case, the first device 111 may set or determine which information is to be displayed on the calendar among received information. Here, the first device 111 may determine which information is to be displayed based on a prior setting or a default setting, or based on one or more user inputs (e.g., filter requests).

In operation S418, the first device 111 outputs the calendar on the screen. For example, the first device 111 may output the calendar that displays the first indicator and the second indicator that are transmitted from the server 100 on the screen.

In operation S419, the second device 112 requests the server 100 to transmit information that is to be displayed on the calendar. For example, the second device 112 may request the server 100 to transmit the work history information that is to be output on the screen of the device when the indicator that is to be displayed on the calendar or the indicator displayed on the calendar is selected. For example, the second device 112 may request the server 100 to transmit the work history information that is to be output on the screen of the device when the first indicator, the second indicator, or the first and second indicators are selected.

In operation S420, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In operation S421, the second device 112 outputs the calendar on the screen. For example, the second device 112 may output the calendar that displays the first indicator and the second indicator that are transmitted from the server 100 on the screen.

Hereinafter, an example in which when the first device 111 creates a document, the server 100 interworks work history information with a calendar of a user will now be described with reference to FIGS. 5 through 26B.

Figure 5:
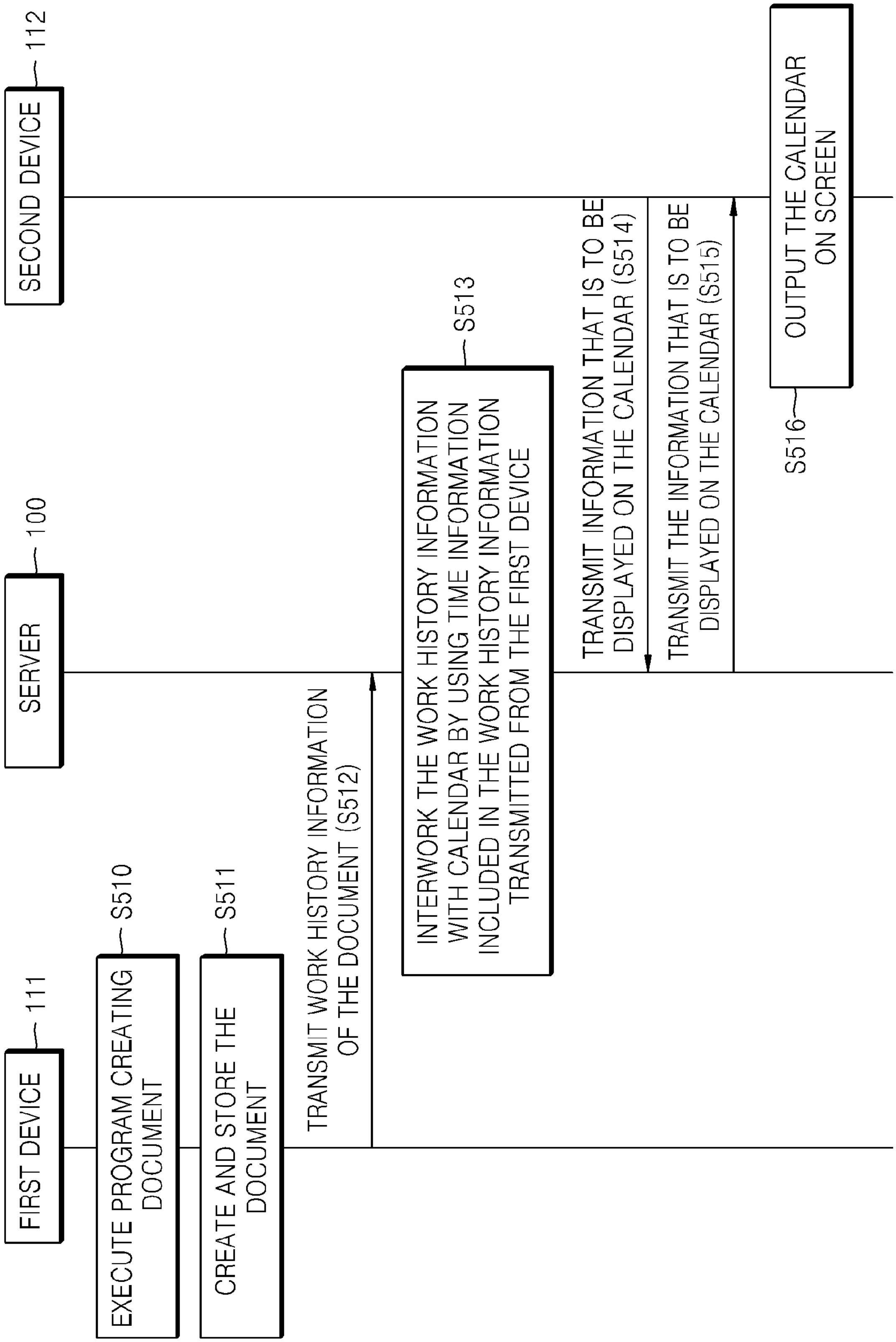
FIG. 5 is a flowchart of an example in which when a first device creates a document, a server interworks work history information with a calendar of a user according to an exemplary embodiment.

FIG. 5 is a flowchart of an example in which when the first device 111 creates a document, the server 100 interworks work history information with a calendar of a user according to an exemplary embodiment.

The first device 111 creates the document and the second device 112 outputs the calendar on a screen in FIG. 5 for convenience of description, although it is understood that one or more other exemplary embodiments are not limited thereto. For example, the first device 111 may create the document, and the first device 111 and the second device 112 may output the calendar on the screen.

Furthermore, it is understood that there is no limit to the number of devices in one or more other exemplary embodiments. If the number of devices that processes the document is N (where N is greater than or equal to three), operations of the first device 111 or operations of the second device 112 that will be described below may be performed by at least one of the third device 113 through the Nth device 114.

In operation S510, the first device 111 executes a program that creates the document. In this regard, the program that creates the document may include a program that creates a text document or a program that creates a multimedia document. For example, the program that creates the document may be a program included in MS-OFFICE.

In operation S511, the first device 111 creates the document and stores the created document.

In operation S512, the first device 111 transmits the work history information of the document to the server 100. In this case, it is assumed that the user of the first device 111 logs into the server 100. Also, examples in which the first device 111 transmits the work history information to the server are the same as the descriptions provided with reference to operation S411 of FIG. 4.

For example, the first device 111 may transmit the work history information of the document to the server 100 at the time of storing the document, although it is understood that one or more other exemplary embodiments are not limited thereto as described above. The work history information of the document may be information generated when the first device 111 creates the document and stores the created document. For example, the work history information may include a title of the document worked on, a document type, time taken to work on the document, a title of a device that performs a document work, a device user, a program used to work on the document, a document size, a work type, etc.

Hereinafter, an example in which when the first device 111 executes a program, creates and stores a document, and transmits work history information of the document to the server 100 will now be described with reference to FIGS. 6A through 11.

Figure 6:
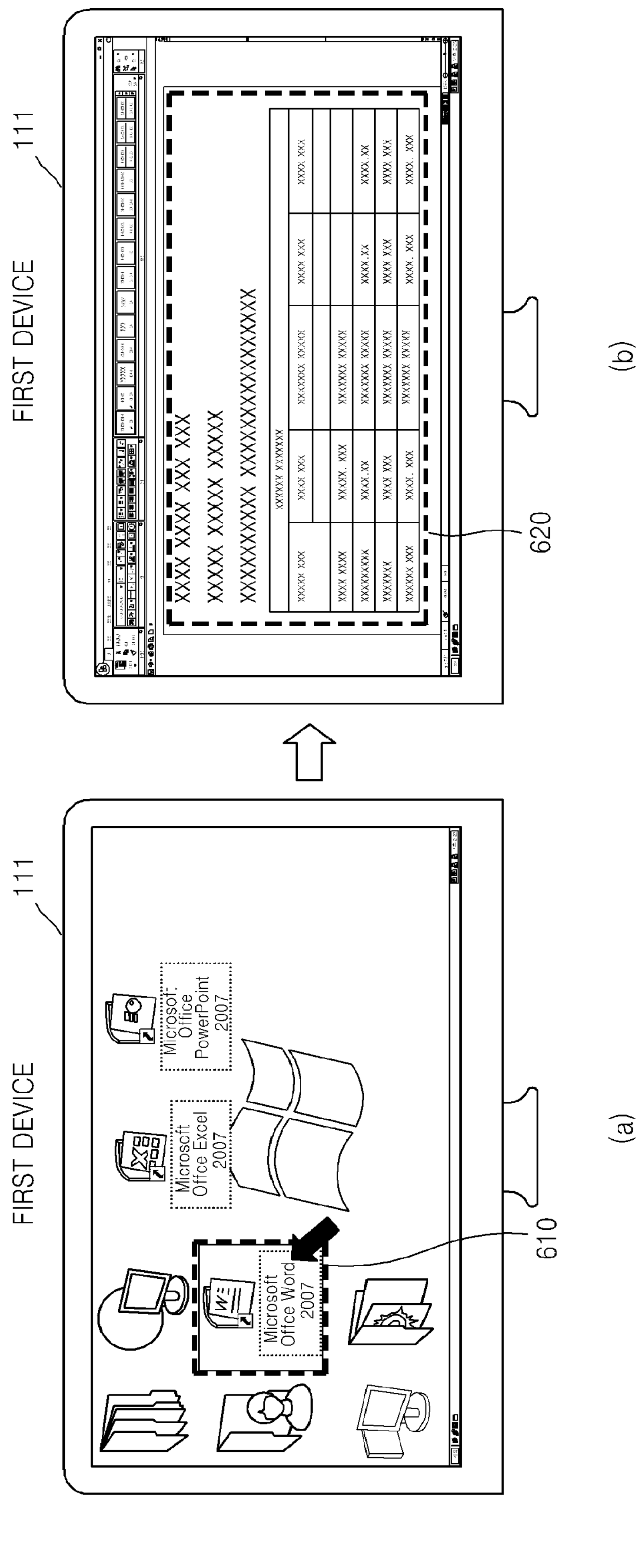
FIGS. 6 through 7 is a diagram for explaining an example in which when a document is a text document, a first device transmits work history information of the document to a server according to an exemplary embodiment.
Figure 7:
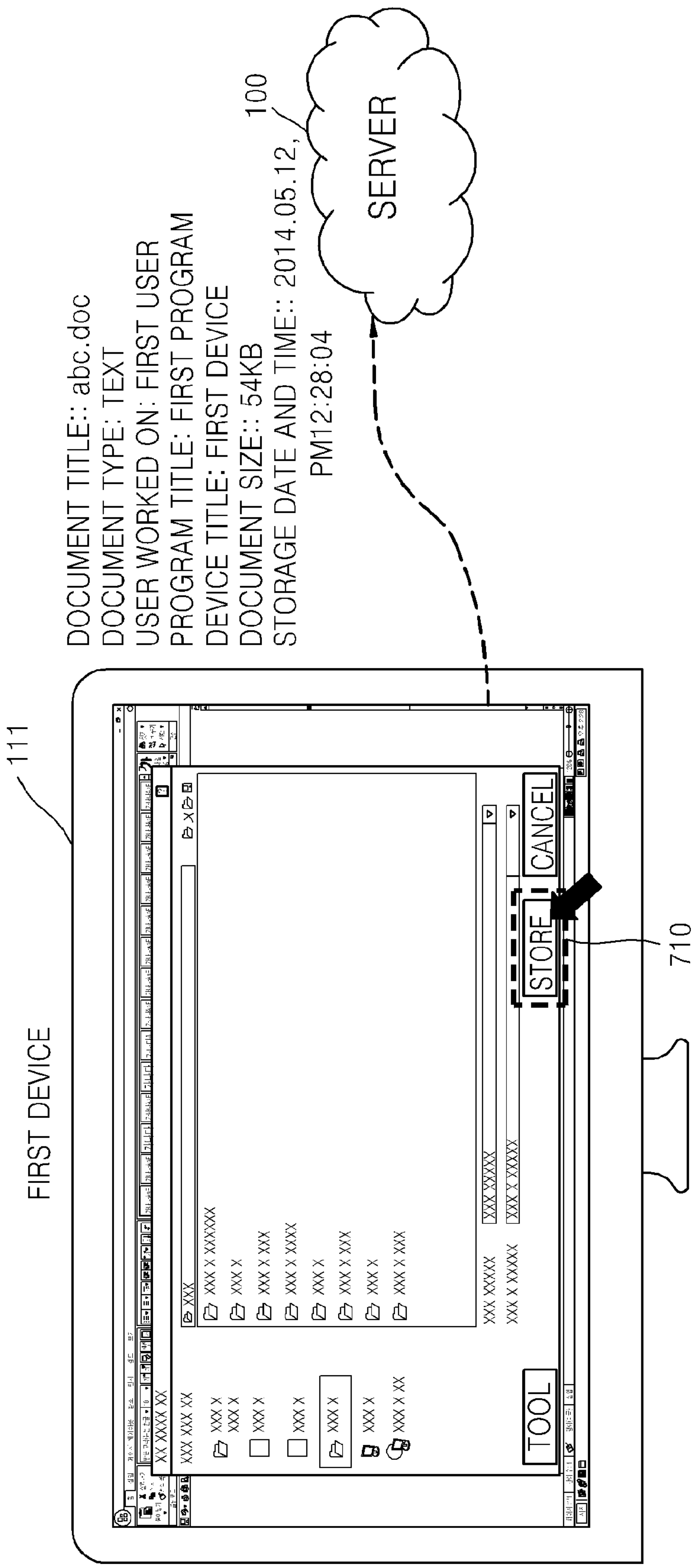

FIGS. 6A through 7 are diagrams for explaining an example in which when a document is a text document, the first device 111 transmits work history information of the document to the server 100 according to an exemplary embodiment.

Referring to FIG. 6A, the first device 111 executes a first program to create the text document. For example, the first device 111 may select an indicator 610 (e.g., an icon, a symbol, etc.) indicating the first program based on a user input received through the user input device 16510. The first device 111 may execute a program corresponding to the selected indicator 610.

Referring to FIG. 6B, the first device 111 creates the text document. For example, the first device 111 may process content 620 included in the text document based on a user input received through the user input device 16510.

Referring to FIG. 7, the first device 111 stores the text document. For example, the first device 111 may select an indicator 710 indicating "storing" of the text document based on the user input received through the user input device 16510. The first device 111 may store the text document.

After storing the text document, the first device 111 transmits the work history information of the text document to the server 100. For example, if it is assumed that the first device 111 stores a document entitled "abc.doc" having a size of 54 KB (kilobytes) at 12:28:04 p.m. on May 12, 2014 by using the first program, the first device 111 may transmit at least one of "abc.doc", text, first program, first device, 12:28:04 p.m. on May 12, 2014, and 54 KB to the server 100.

When a level of security of the stored document needs to be high, the first device 111 may additionally encrypt the work history information and may transmit the encrypted work history information to the server 100.

For example, when the user selects a 'security' option at a point in time when the document is stored, the first device 111 may additionally encrypt the work history information and may transmit the encrypted work history information to the server 100.

As another example, the user may create a certain folder in the first device 111, and a document included in the created folder may be set to have a high level of security.

When work history information of the document included in the created folder is generated, the first device 111 may additionally encrypt the work history information and may transmit the encrypted work history information to the server 100.

The user may access the work history information transmitted to the server 100 after logging into the server 100. However, additional information may be required to access the encrypted work history information. For example, after the user logs into the server 100, it may be necessary to input separate passwords to access the encrypted work history information.

Figure 8:
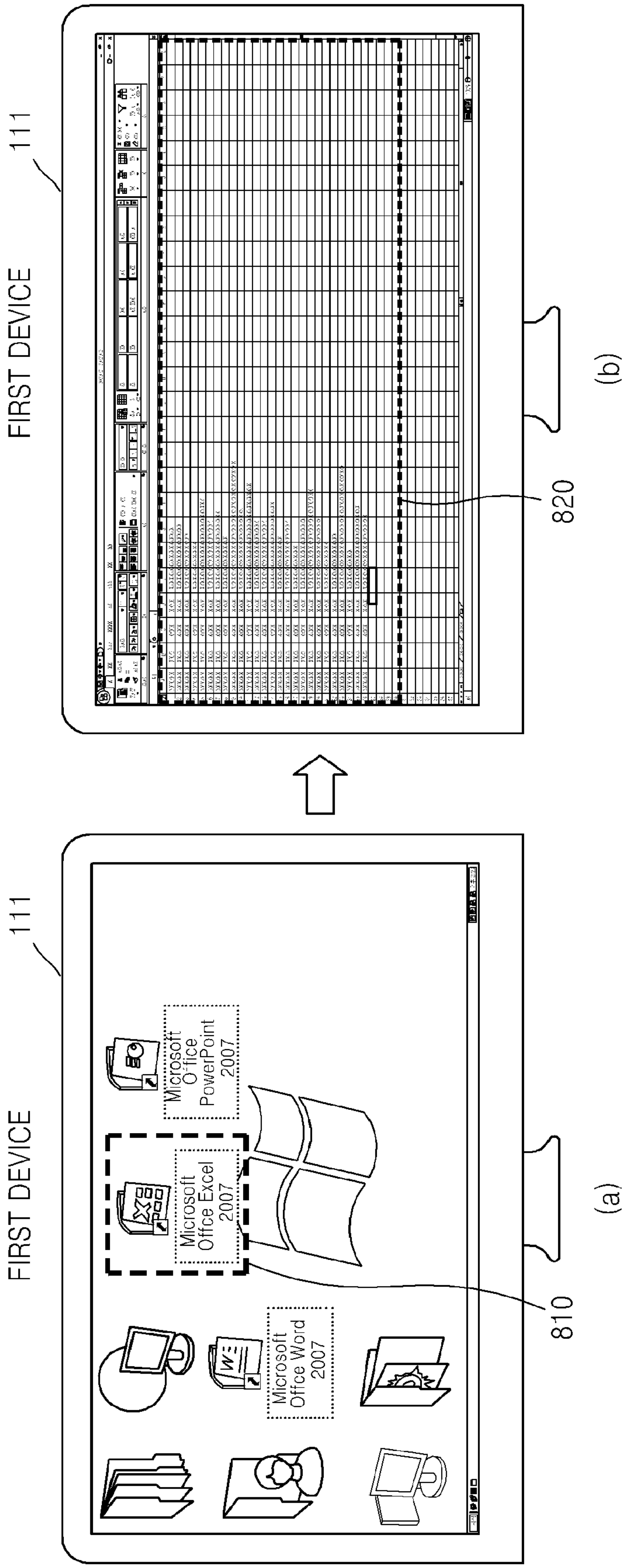
FIGS. 8 and 9 are diagrams for explaining another example in which when a document is a text document, a first device transmits work history information of the document to a server according to an exemplary embodiment.
Figure 9:
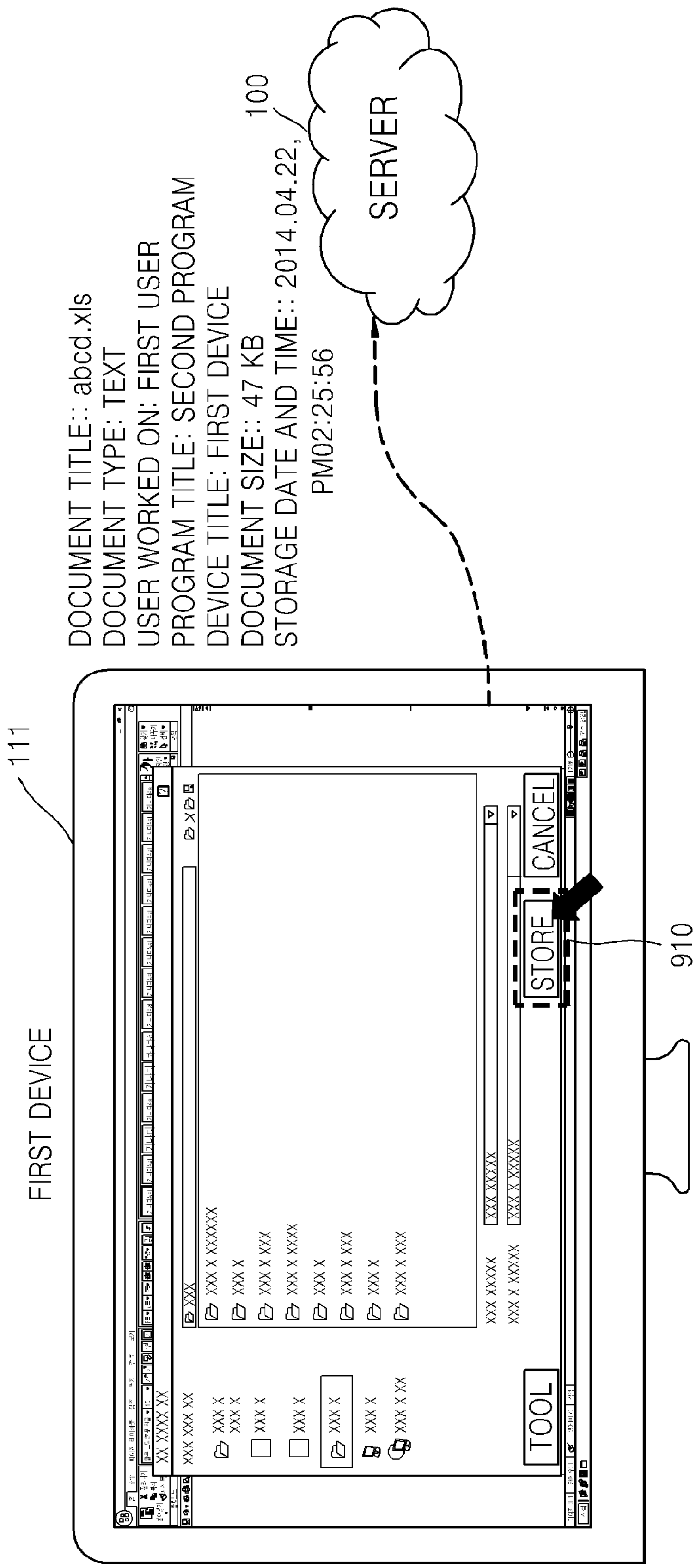

FIGS. 8 and 9 are diagrams for explaining another example in which when a document is a text document, the first device 111 transmits work history information of the document to the server 100 according to an exemplary embodiment.

Referring to (a) of FIG. 8, the first device 111 executes a second program to create the text document. In this regard, the second program executed by the first device 111 may be different from the first program described above with reference to FIG. 6A. In other words, the first device 111 may use various programs to create the text document, and may create various types of text documents by using different programs.

The first device 111 may select an indicator 810 indicating the second program based on a user input received through the user input device 16510. The first device 111 may execute the second program.

Referring to (b) of FIG. 8, the first device 111 creates the text document based on the executed second program. For example, the first device 111 may process content 820 included in the text document based on a user input received through the user input device 16510.

Referring to FIG. 9, the first device 111 stores the text document. For example, the first device 111 may select an indicator 910 indicating "storing" of the text document based on a user input received through the user input device 16510. The first device 111 may store the text document.

After storing the text document, the first device 111 transmits the work history information of the text document to the server 100. For example, if it is assumed that the first device 111 creates a document entitled "abcd.xls" having a size of 47 KB (kilobytes) at 02:25:56 p.m. on Apr. 22, 2014 by using the second program, the first device 111 may transmit at least one of "abcd.xls", text, second program, first device, 02:25:56 p.m. on Apr. 22, 2014, and 47 KB to the server 100.

The encryption of the work history information which requires a high level of security and transmission of the encrypted work history information to the server 100 have been described with reference to FIG. 7.

Figure 10:
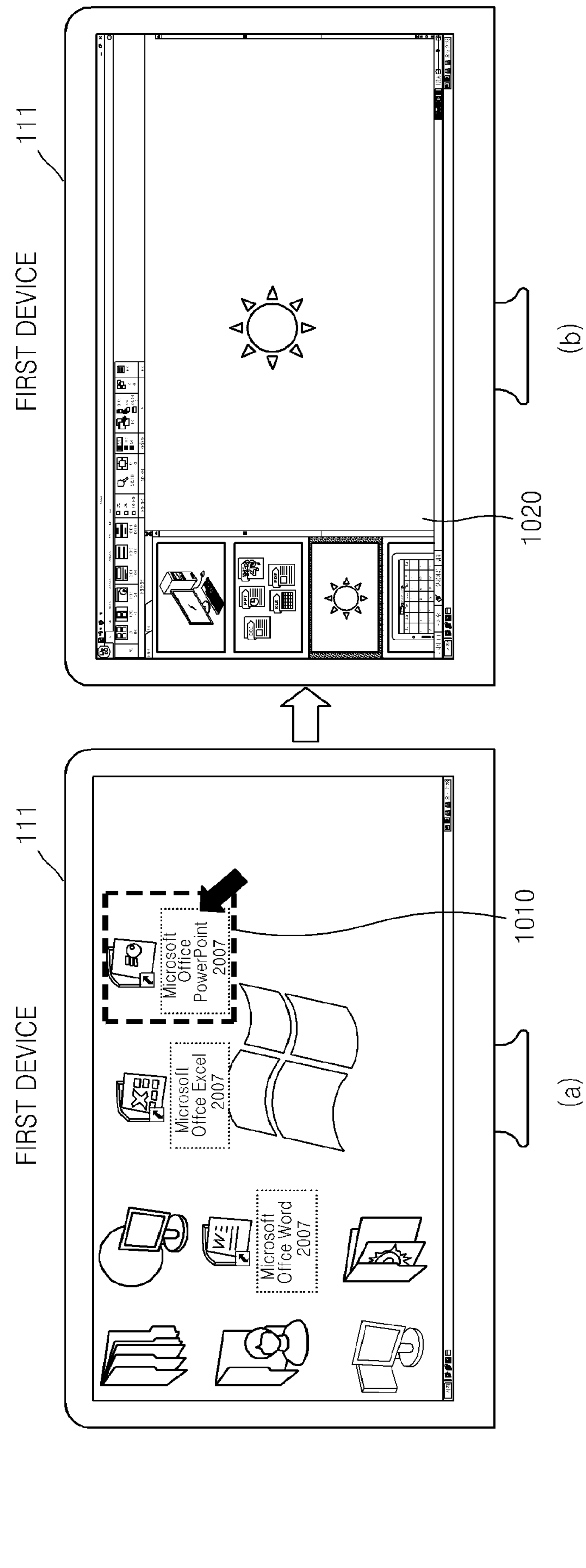
FIGS. 10 and 11 are diagrams for explaining another example in which when a document is a text document, a first device transmits work history information of the document to a server according to an exemplary embodiment.
Figure 11:
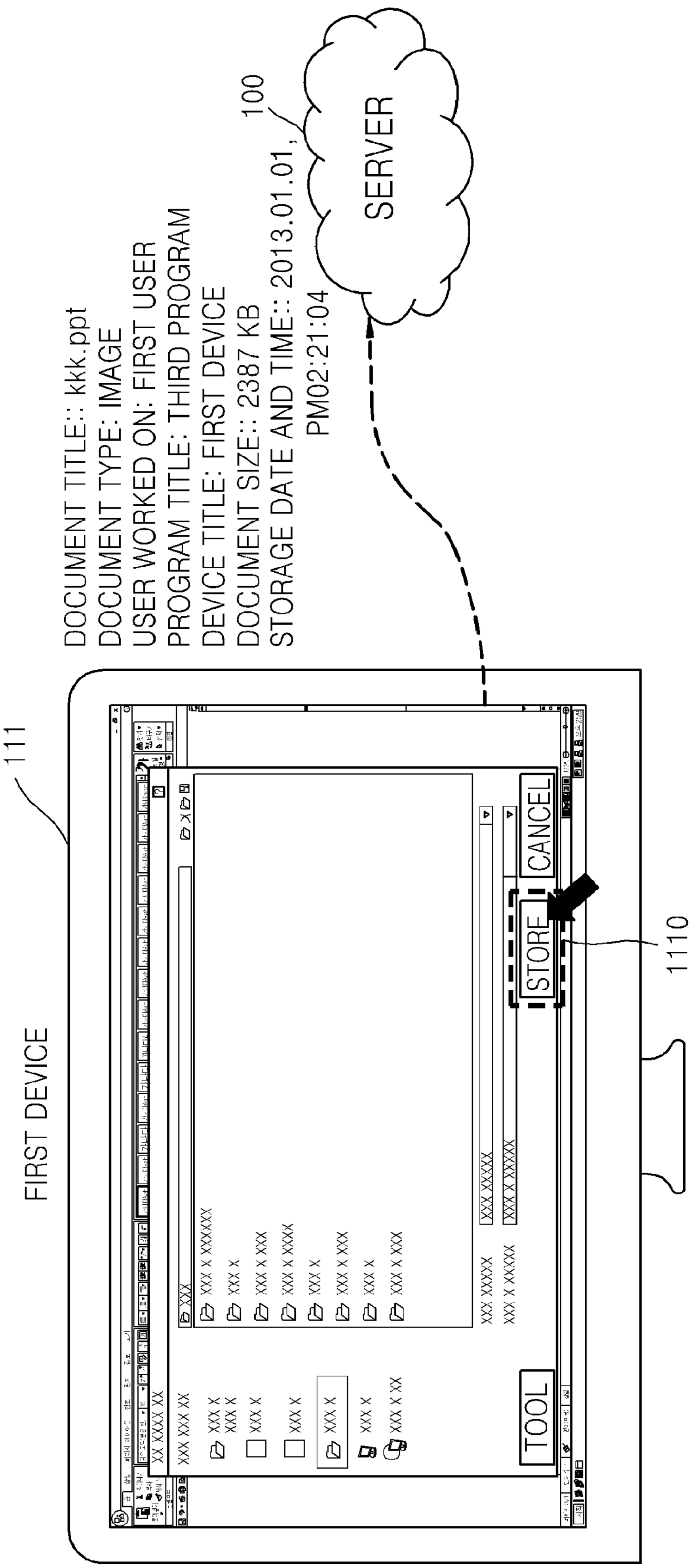

FIGS. 10 and 11 are diagrams for explaining another example in which when a document is a text document, the first device 111 transmits work history information of the document to the server 100 according to an exemplary embodiment.

Referring to (a) of FIG. 10, the first device 111 executes a third program to create the text document. In other words, the first device 111 may create various types of text documents, and may use various programs to create the text documents according to types of the text documents.

The first device 111 may select an indicator 1010 indicating the second program based on a user input received through the user input device 16510. The first device 111 may execute the third program. In this regard, an example in which the first device 111 selects the indicator 1010 and executes a program corresponding to the selected indicator 1010 is the same as or similar to the example described above with reference to FIG. 6A.

Referring to (b) of FIG. 10, the first device 111 creates the text document based on the third program. For example, the first device 111 may process content 1020 included in the text document based on a user input received through the user input device 16510.

Referring to FIG. 11, the first device 111 stores the text document. For example, the first device 111 may select an indicator 1110 indicating "storing" of the text document based on a user input received through the user input device 16510. The first device 111 may store the text document.

After storing the text document, the first device 111 transmits the work history information of the text document to the server 100. For example, if it is assumed that the first device 111 creates a document entitled "kkk.ppt" having a size of 2387 KB (kilobytes) at 02:21:04 p.m. on Jan. 1, 2013 by using the third program, the first device 111 may transmit at least one of "kkk.ppt", image, third program, first device, 02:21:04 p.m. on Jan. 1, 2013, and 2387 KB to the server 100.

The encryption of the work history information which requires a high level of security and transmission of the encrypted work history information to the server 100 have been described with reference to FIG. 7.

Referring back to FIG. 5, in operation S513, the server 100 interworks the work history information transmitted from the first device 111 with the calendar by using time information included in the work history information.

Hereinafter, an example in which the server 100 interworks work history information of a document with a calendar will now be described with reference to FIGS. 12 through 15.

Figure 12:
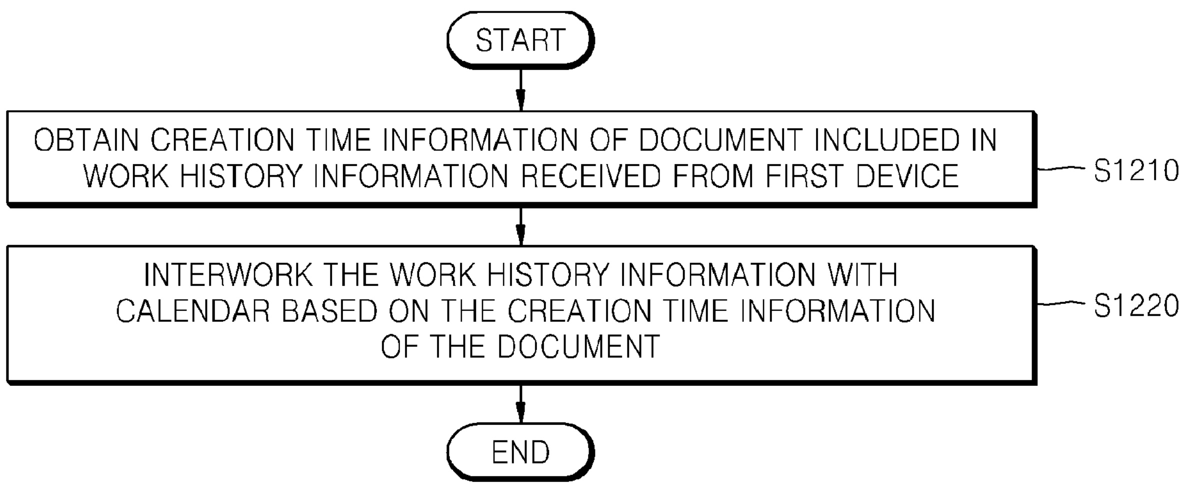
FIG. 12 is a flowchart of an example in which a server interworks work history information of a document with a calendar according to an exemplary embodiment.

FIG. 12 is a flowchart of an example in which the server 100 interworks work history information of a document with a calendar according to an exemplary embodiment.

In operation S1210, the server 100 obtains creation time information of the document included in the work history information received from the first device 111. For example, according to the example described above with reference to FIG. 7, the server 100 obtains "12:28:04 p.m., May 12, 2014" from the work history information received from the first device 111.

Hereinafter, an example of work history information obtained by the server 100 will now be described with reference to FIGS. 13 and 14.

FIGS. 13 and 14 are tables illustrating examples of work history information 1310 and 1410 obtained by the server 100 according to one or more exemplary embodiments.

Referring to FIG. 13, an example of the work history information 1310 of a document is illustrated. In the present example, the work history information 1310 of the document includes a document title 1311, a document type 1312, a work program title 1313, a work device title 1314, a device user 1315, a work type 1316, a work date and time 1317, and a file size 1318, although it is understood that one or more other exemplary embodiments are not limited thereto. In other words, the work history information 1310 of the document may correspond to information without limitation as long as the information may be generated by working on the document.

For example, the server 100 may arrange (or align) the work history information 1310 received from the first device 111 according to the title 1311 of the document, and may store the arranged work history information 1310 in a database 16430.

Referring to FIG. 14, another example of the work history information 1410 of a document is illustrated. The work history information 1310 of FIG. 13 and the work history information 1410 of FIG. 14 include the same type of information. In other words, the work history information 1410 of FIG. 14 includes a document title 1414, a document type 1412, a work program title 1413, a work device title 1411, a device user 1416, a work type 1415, a work date and time 1417, and a file size 1418. For example, the server 100 may arrange the work history information 1410 received from the first device 111 according to the title 1311 of the work device, and may store the arranged work history information 1410 in the database 16430.

Referring back to FIG. 12, in operation S1220, the server 100 interworks the work history information with the calendar of the user based on the creation time information of the document. Hereinafter, an example in which the server 100 interworks work history information with a calendar of a user will now be described with reference to FIG. 15.

Figure 15:
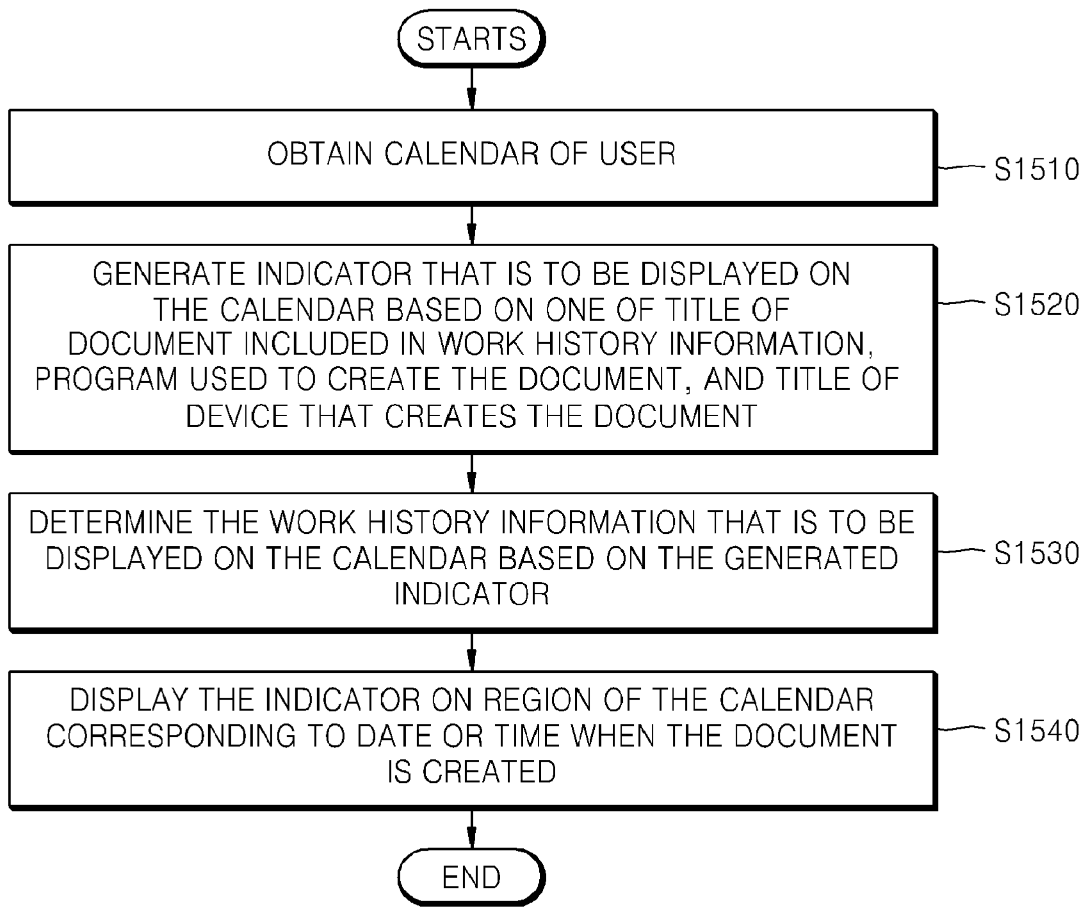
FIG. 15 is a flowchart of an example in which a server interworks work history information with a calendar of a user according to an exemplary embodiment.

FIG. 15 is a flowchart of an example in which the server 100 interworks work history information with a calendar of a user according to an exemplary embodiment.

In operation S1510, the server 100 obtains the calendar of the user. In this regard, the calendar of the user may refer to a form, framework, format, etc., that is to interwork with the work history information of a document. For example, the server 100 may read the calendar of the user that matches with an account of the user and is stored in the database 16430, and may receive the calendar of the user from at least one of the devices 110. For example, the calendar of the user may include a calendar on an hour basis, a day basis, a calendar on a week basis, a calendar on a month basis, a calendar on a year basis, etc.

In operation S1520, the server 100 may generate an indicator that is to be displayed on the calendar based on at least one of a title (i.e., at least one of a name, a symbol, a model number, an abbreviation, etc.) of the document, a program used to create the document, a title of a device that creates the document, etc. In other words, the server 100 may determine at least one of the title of the document, the program used to create the document, the title of the device that creates the document, etc., as an item for the indicator and generates the indicator based on the determined item.

In operation S1530, the server 100 determines the work history information that is to be displayed on the calendar based on the generated indicator.

In operation S1540, the server 100 displays the indicator on a region of the calendar corresponding to a date or a time when the document is created. In this regard, the region of the calendar corresponding to the date or the time refers to a data field or a time field in the calendar.

Referring back to FIG. 5, in operation S514, the second device 112 requests the server 100 to transmit the information that is to be displayed on the calendar. For example, the second device 112 may request the server 100 to transmit the information that is to be displayed on the calendar after executing a calendar output program installed in the second device 112 and/or performing user authentication.

In operation S515, the server 100 transmits the information that is to be displayed on the calendar to the second device 112.

In FIG. 5, when the second device 112 requests the server 100 to transmit the information that is to be displayed on the calendar in operation S514, the server 100 transmits the information that is to be displayed on the calendar to the second device 112 in operation S515, although it is understood that one or more other exemplary embodiments are not limited thereto. For example, according to another exemplary embodiment, even if is no request from the second device 112, the server 100 may transmit (for example, push) the information that is to be displayed on the calendar to the second device 112, as described above. Furthermore, according to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In operation S516, the second device 112 outputs the calendar on the screen.

Hereinafter, examples of a calendar output on a screen of a device will be described with reference to FIGS. 16 through 25. FIGS. 16 through 25 illustrate examples of a calendar on a day basis, a calendar on a month basis, and a calendar on a year basis for convenience of description, although it is understood that one or more other exemplary embodiments are not limited thereto. In other words, the calendar of a user may include various examples of a calendar on a week basis, a calendar on a three day basis, a calendar on a time basis, etc.

Figure 16:
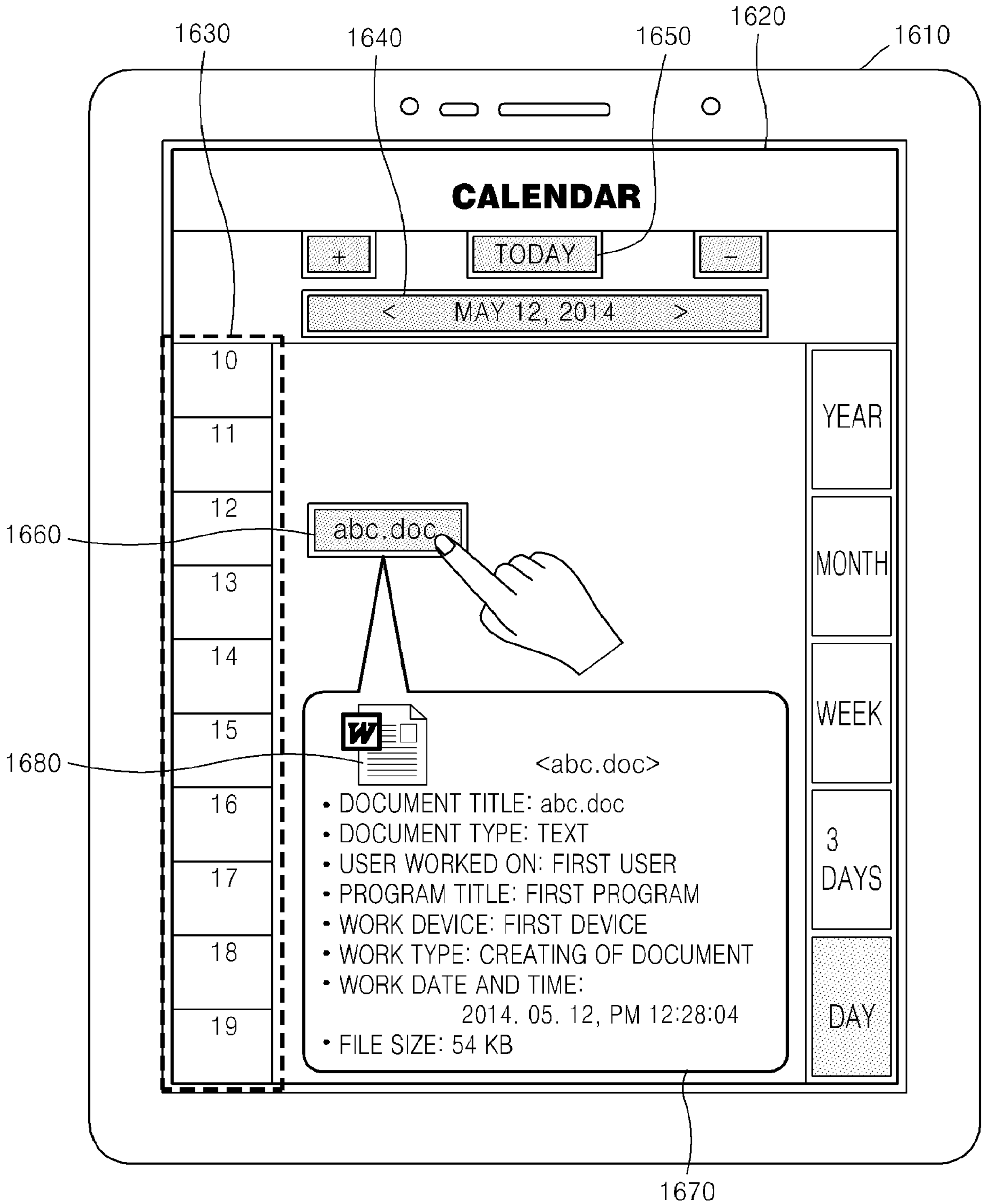
FIG. 16 illustrates an example of a daily calendar displayed on a screen of a device according to an exemplary embodiment.

FIG. 16 illustrates an example of a daily calendar 1620 displayed on a screen of a device 1610 according to an exemplary embodiment.

Referring to FIG. 16, the daily calendar 1620 is output on the screen of the device 1610. The calendar 1620 may include a region 1630 indicating dates and an indicator 1640 that may designate a date desired by a user. The calendar 1620 may also include an indicator 1650 that may display (i.e., in response to a selection thereof) a calendar corresponding to a date of "today". In addition to the above-described indicators 1640 and 1650, the calendar 1620 may include an indicator without limitation as long as the user may use the indicator to control a display type of the calendar.

An indicator 1660 indicating a title of a document may be displayed on the calendar 1620. For example, if it is assumed that the first device 111 creates a document entitled "abc.doc" on May 12, 2014, the first device 111 may display the indicator 1660 indicating "abc.doc" on a region of the calendar 1620 corresponding to May 12, 2014.

The device 1610 may select the indicator 1660 indicating "abc.doc" according to a user input received through the user input device 16510. When the indicator 1660 indicating "abc.doc" is selected, the device 1610 may output work history information 1670 of the document on the screen. For example, if it is assumed that the first device 111 stores the document entitled "abc.doc" having a size of 54 KB (kilobytes) at 12:28:04 p.m. on May 12, 2014 by using a first program, at least one of "abc.doc", text, first program, first device, 12:28:04 p.m. on May 12, 2014, and 54 KB may be output as the work history information 1670. Meanwhile, the device 1610 may output the work history information 1670 of the document on the screen as a popup window, although it is understood that one or more other exemplary embodiments are not limited thereto. For example, the device 1610 may output the document on an entirety of the screen, on a designated region of the screen, etc., in one or more other exemplary embodiments.

An indicator 1680 that may output the document on the screen of the device 1610 may be displayed on the work history information 1670 of the document. For example, when the indicator 1680 that may output the document is selected according to the user input received through the user input device 16510, the device 1610 may output the document created by the first device 111 on the screen as the popup window separately from the calendar 1620, although it is understood that one or more other exemplary embodiments are not limited thereto. For example, the device 1610 may output the document on an entirety of the screen, on a designated region of the screen, etc., in one or more other exemplary embodiments.

Figure 17:
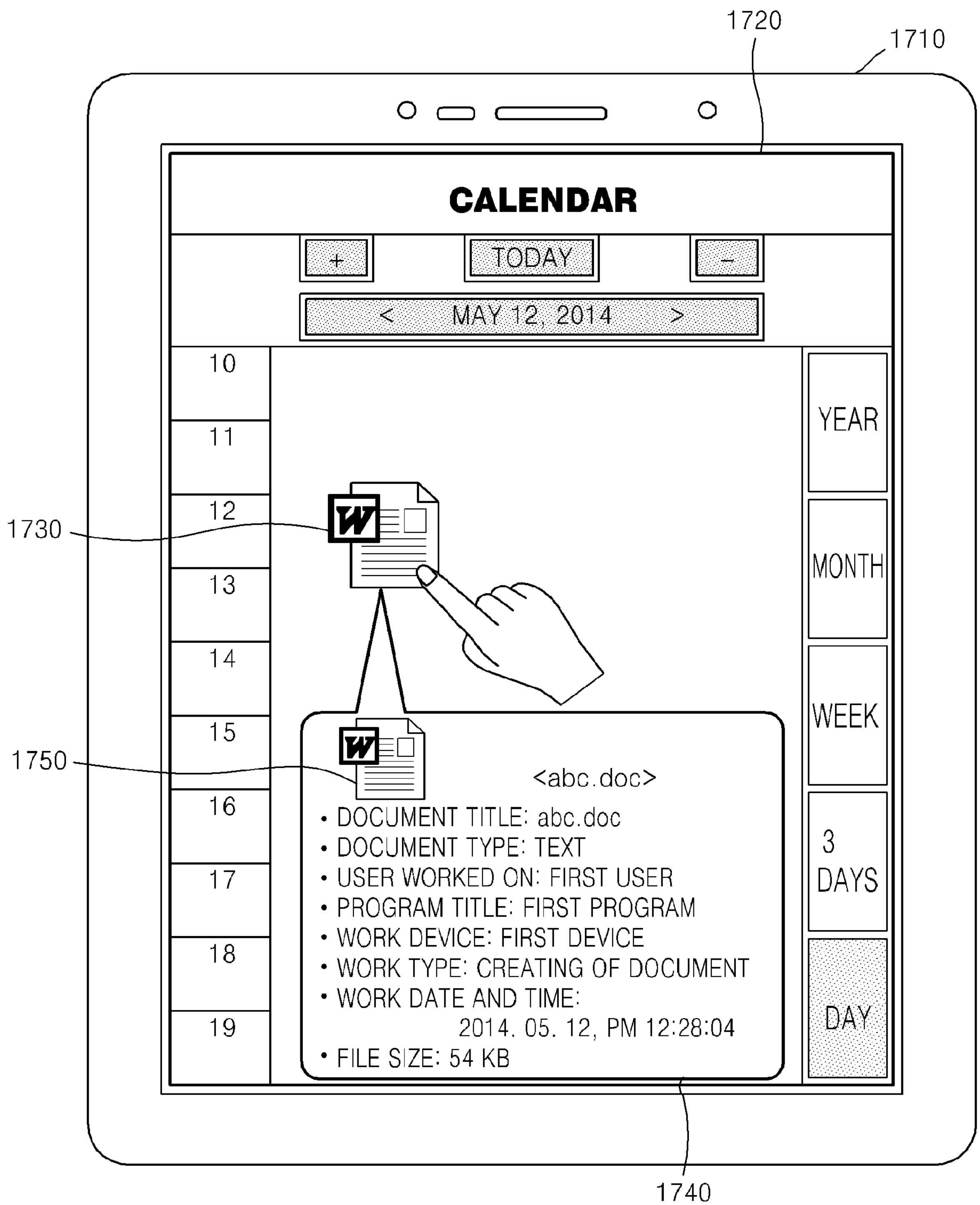
FIG. 17 illustrates another example of a daily calendar displayed on a screen of a device according to an exemplary embodiment.

FIG. 17 illustrates another example of a daily calendar 1720 displayed on a screen of a device 1710 according to an exemplary embodiment.

Referring to FIG. 17, the daily calendar 1720 may be output on the screen of the device 1710. The calendar 1720 of FIG. 17 has the same form as that of the calendar 1620 of FIG. 16. Thus, the descriptions of the indicators provided above with reference to FIG. 16 may apply to indicators that may be displayed on the calendar 1720 of FIG. 17.

An indicator 1730 indicating a program used to work on a document may be displayed on the calendar 1720. For example, if it is assumed that the first device 111 creates a document by using a first program on May 12, 2014, the indicator 1730 indicating the "first program" may be displayed on a region of the calendar 1720 corresponding to May 12, 2014.

The device 1710 may select the indicator 1730 indicating the "first program" according to a user input received through the user input device 16510. When the indicator 1730 indicating the "first program" is selected, the device 1710 may output work history information 1740 of the document on the screen. For example, if it is assumed that the first device 111 stores a document entitled "abc.doc" having a size of 54 KB (kilobytes) at 12:28:04 p.m. on May 12, 2014 by using the first program, at least one of "abc.doc", text, first program, first device, 12:28:04 p.m. on May 12, 2014, and 54 KB may be output as the work history information 1740. Meanwhile, the device 1710 may output the work history information 1740 of the document on the screen as a popup window, although it is understood that one or more other exemplary embodiments are not limited thereto as described above.

An indicator 1750 that may output the document on the screen of the device 1710 may be displayed on the work history information 1740 of the document. For example, when the indicator 1750 that may output the document is selected according to the user input received through the user input device 16510, the device 1710 may output the document created by the first device 111 on the screen as the popup window separately from the calendar 1720, although it is understood that one or more other exemplary embodiments are not limited thereto as described above.

Figure 18:
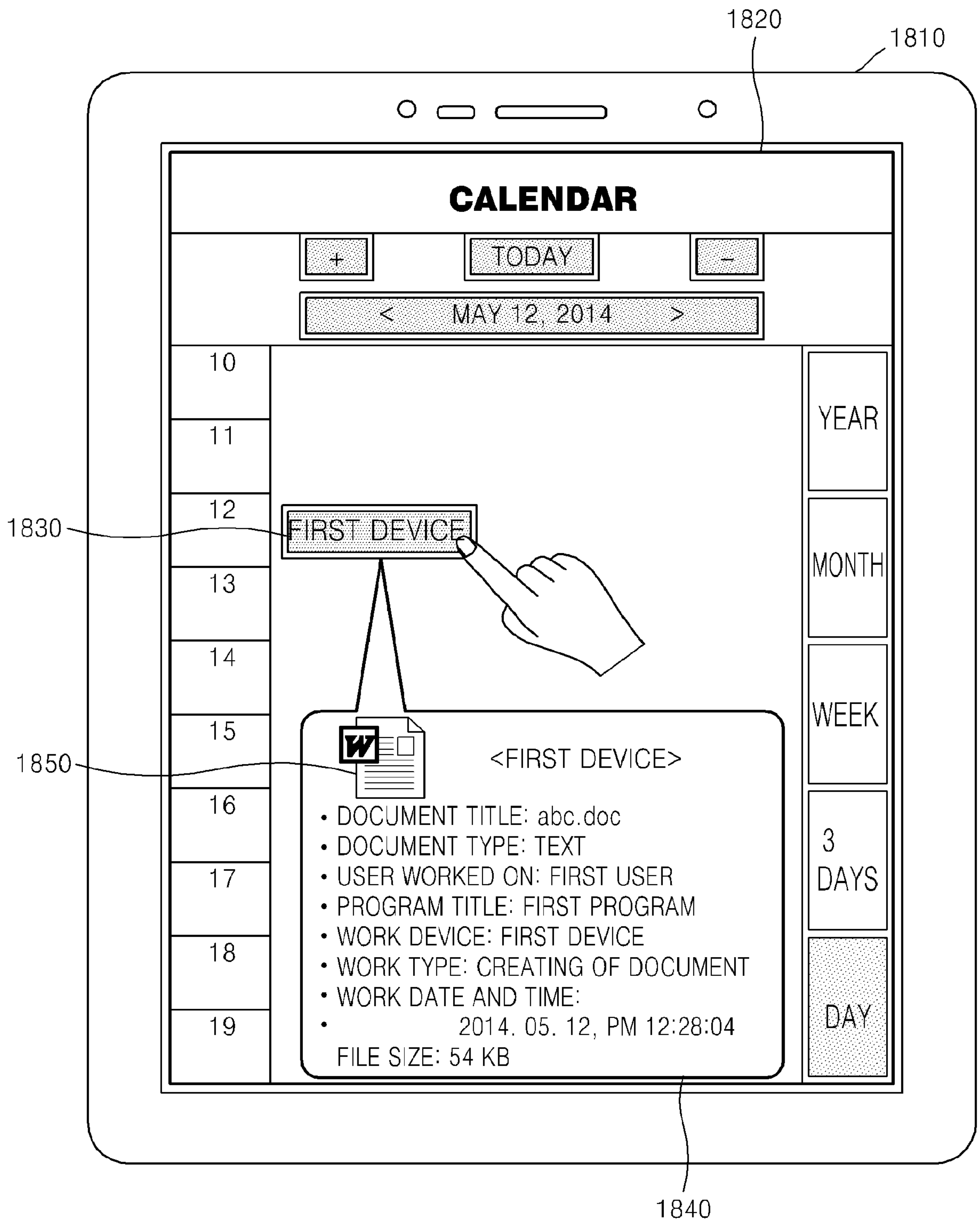
FIG. 18 illustrates another example of a daily calendar displayed on a screen of a device according to an exemplary embodiment.

FIG. 18 illustrates another example of a daily calendar 1820 displayed on a screen of a device 1810 according to an exemplary embodiment.

Referring to FIG. 18, the daily calendar 1820 may be output on the screen of the device 1810. The calendar 1820 of FIG. 18 has the same form as that of the calendar 1620 of FIG. 16. Thus, the descriptions of the indicators provided above with reference to FIG. 16 may apply to indicators that may be displayed on the calendar 1820 of FIG. 18.

An indicator 1830 indicating a title of a device may be displayed on the calendar 1820. For example, if it is assumed that the first device 111 creates a document on May 12, 2014, the indicator 1830 indicating the "first device" may be displayed on a region of the calendar 1820 corresponding to May 12, 2014.

The device 1810 may select an indicator 1840 indicating the "first device" according to a user input received through the user input device 16510. When the indicator 1840 indicating the "first device" is selected, the device 1810 may output work history information 1840 of the document on the screen. For example, if it is assumed that the first device 111 stores a document entitled "abc.doc" having a size of 54 KB (kilobytes) at 12:28:04 p.m. on May 12, 2014 by using the first program, at least one of "abc.doc", text, first program, first device, 12:28:04 p.m. on May 12, 2014, and 54 KB may be output as the work history information 1840. Meanwhile, the device 1810 may output the work history information 1840 of the document on the screen as a popup window, although it is understood that one or more other exemplary embodiments are not limited thereto as described above. For example, the device 1810 may output the work history information 1840 on an entirety of the screen, on a designated region of the screen, etc., in one or more other exemplary embodiments.

An indicator 1850 that may output the document on the screen of the device 1810 may be displayed on the work history information 1840 of the document. For example, when the indicator 1850 that may output the document is selected according to the user input received through the user input device 16510, the device 1810 may output the document created by the first device 111 on the screen as the popup window separately from the calendar 1820, although it is understood that one or more other exemplary embodiments are not limited thereto as described above.

Figure 19:
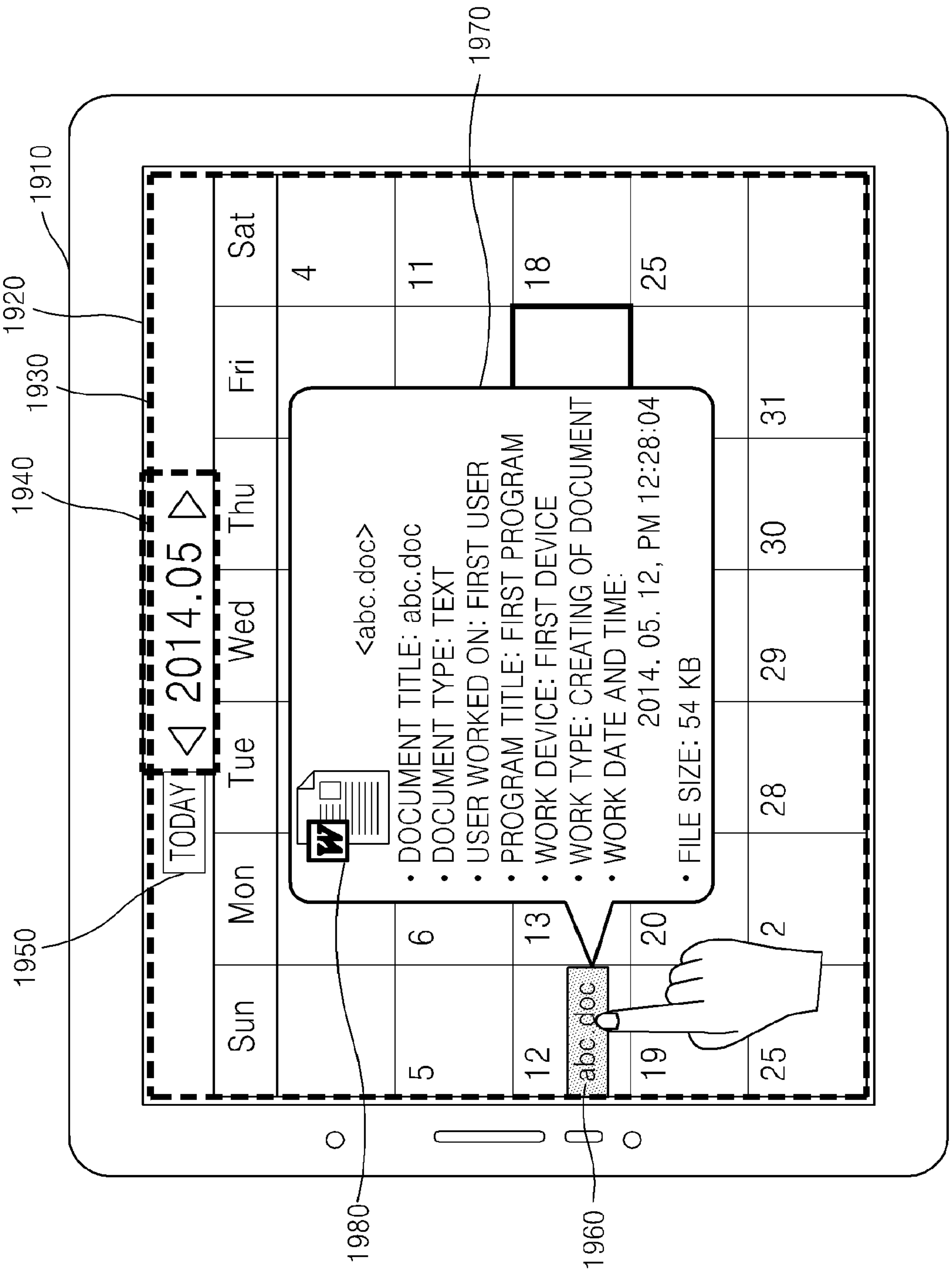
FIG. 19 illustrates an example of a monthly calendar displayed on a screen of a device according to an exemplary embodiment.

FIG. 19 illustrates an example of a monthly calendar 1920 displayed on a screen of a device 1910 according to an exemplary embodiment.

Referring to FIG. 19, the monthly calendar 1920 is output on the screen of the device 1910. The calendar 1920 may include a region 1930 indicating each of dates included in a month and an indicator 1940 that may designate a month desired by a user. The calendar 1920 may also include an indicator 1950 that may display a monthly calendar including a date of "today". In addition to the above-described indicators, the calendar 1920 may include an indicator without limitation as long as the user may use the indicator to control a display type of the calendar.

An indicator 1960 indicating a title of a document may be displayed on the calendar 1920. For example, if it is assumed that the first device 111 creates a document entitled "abc.doc" on May 12, 2014, the first device 111 may display the indicator 1960 indicating "abc.doc" on a region of the calendar 1920 corresponding to May 12, 2014.

The device 1910 may select the indicator 1960 indicating "abc.doc" according to a user input received through the user input device 16510. When the indicator 1660 indicating "abc.doc" is selected, the device 1910 may output work history information 1970 of the document on the screen.

For example, if it is assumed that the first device 111 stores the document entitled "abc.doc" having a size of 54 KB (kilobytes) at 12:28:04 p.m. on May 12, 2014 by using a first program, at least one of "abc.doc", text, first program, first device, 12:28:04 p.m. on May 12, 2014, and 54 KB may be output as the work history information 1970. Meanwhile, the device 1910 may output the work history information 1970 of the document on the screen as a popup window, although it is understood that one or more other exemplary embodiments are not limited thereto as described above.

An indicator 1980 that may output the document on the screen of the device 1910 may be displayed on the work history information 1970 of the document. For example, when the indicator 1980 that may output the document is selected according to a user input received through the user input device 16510, the device 1910 may output the document created by the first device 111 on the screen as the popup window separately from the calendar 1920, although it is understood that one or more other exemplary embodiments are not limited thereto as described above.

Figure 20:
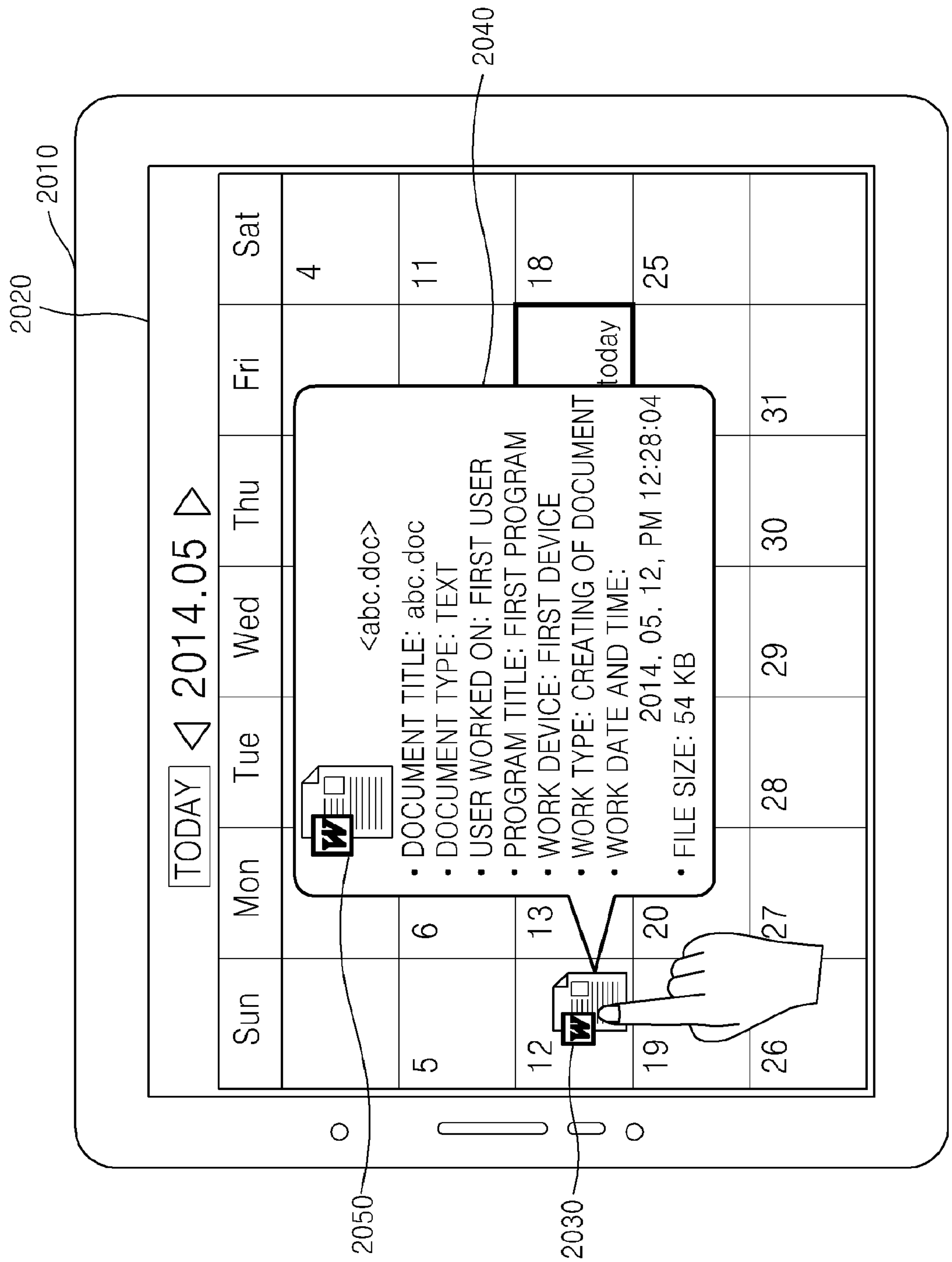
FIG. 20 illustrates another example of a monthly calendar displayed on a screen of a device according to an exemplary embodiment.

FIG. 20 illustrates another example of a monthly calendar 2020 displayed on a screen of a device 2010 according to an exemplary embodiment.

Referring to FIG. 20, the monthly calendar 2020 may be output on the screen of the device 2010. The calendar 2020 of FIG. 20 has the same form as that of the calendar 1920 of FIG. 19. Thus, the descriptions of the indicators provided above with reference to FIG. 19 may apply to indicators that may be displayed on the calendar 2020 of FIG. 20.

An indicator 2030 indicating a program used to work on the document may be displayed on the calendar 2020. For example, if it is assumed that the first device 111 creates a document by using a first program on May 12, 2014, the indicator 2030 indicating the "first program" may be displayed on a region of the calendar 2020 corresponding to May 12, 2014.

The device 2010 may select the indicator 2030 indicating the "first program" according to a user input received through the user input device 16510. When the indicator 2030 indicating the "first program" is selected, the device 2010 may output work history information 2040 of the document on the screen. For example, if it is assumed that the first device 111 stores a document entitled "abc.doc" having a size of 54 KB (kilobytes) at 12:28:04 p.m. on May 12, 2014 by using the first program, at least one of "abc.doc", text, first program, first device, 12:28:04 p.m. on May 12, 2014, and 54 KB may be output as the work history information 2040. Meanwhile, the device 2010 may output the work history information 2040 of the document on the screen as a popup window, although it is understood that one or more other exemplary embodiments are not limited thereto as described above.

An indicator 2050 that may output the document on the screen of the device 2010 may be displayed on the work history information 2040 of the document. For example, when the indicator 2050 that may output the document is selected according to a user input received through the user input device 16510, the device 2010 may output the document created by the first device 111 on the screen as the popup window separately from the calendar 2020, although it is understood that one or more other exemplary embodiments are not limited thereto as described above.

Figure 21:
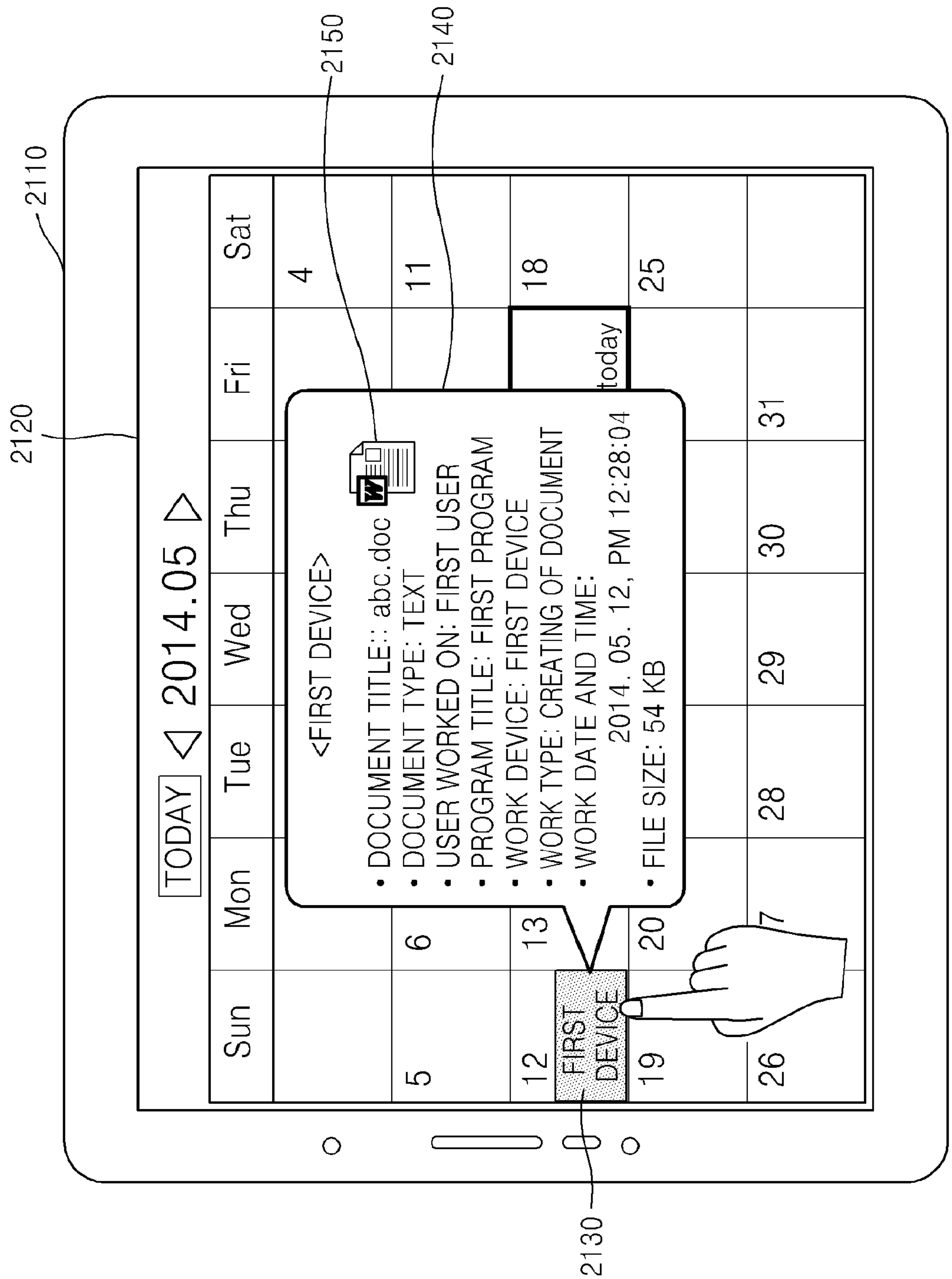
FIG. 21 illustrates another example of a monthly calendar displayed on a screen of a device according to an exemplary embodiment.

FIG. 21 illustrates another example of a monthly calendar 2120 displayed on a screen of a device 2110 according to an exemplary embodiment.

Referring to FIG. 21, the monthly calendar 2120 may be output on the screen of the device 2110. The calendar 2120 of FIG. 21 has the same frame as that of the calendar 1920 of FIG. 19. Thus, the descriptions of the indicators provided above with reference to FIG. 16 may apply to indicators that may be displayed on the calendar 2120 of FIG. 21.

An indicator 2130 indicating a title of a device may be displayed on the calendar 2120. For example, if it is assumed that the first device 111 creates a document on May 12, 2014, the indicator 2130 indicating the "first device" may be displayed on a region of the calendar 2120 corresponding to May 12, 2014.

The device 2110 may select the indicator 2130 indicating the "first device" according to a user input received through the user input device 16510. When the indicator 2130 indicating the "first device" is selected, the device 2110 may output work history information 2140 of the document on the screen. For example, if it is assumed that the first device 111 stores a document entitled "abc.doc" having a size of 54 KB (kilobytes) at 12:28:04 p.m. on May 12, 2014 by using the first program, at least one of "abc.doc," text, first program, first device, 12:28:04 p.m. on May 12, 2014, and 54 KB may be output as the work history information 2140. Meanwhile, the device 2110 may output the work history information 2140 of the document on the screen as a popup window, although it is understood that one or more other exemplary embodiments are not limited thereto as described above.

An indicator 2150 that may output the document on the screen of the device 2110 may be displayed on the work history information 2140 of the document. For example, when the indicator 2150 that may output the document is selected according to a user input received through the user input device 16510, the device 2110 may output the document created by the first device 111 on the screen as the popup window separately from the calendar 2120, although it is understood that one or more other exemplary embodiments are not limited thereto as described above.

FIG. 22 through 25 illustrate examples of annual calendars 2220, 2320, 2420, and 2520 displayed on screens of devices 2210, 2310, 2410, and 2510, respectively, according to an exemplary embodiment.

Figure 22:
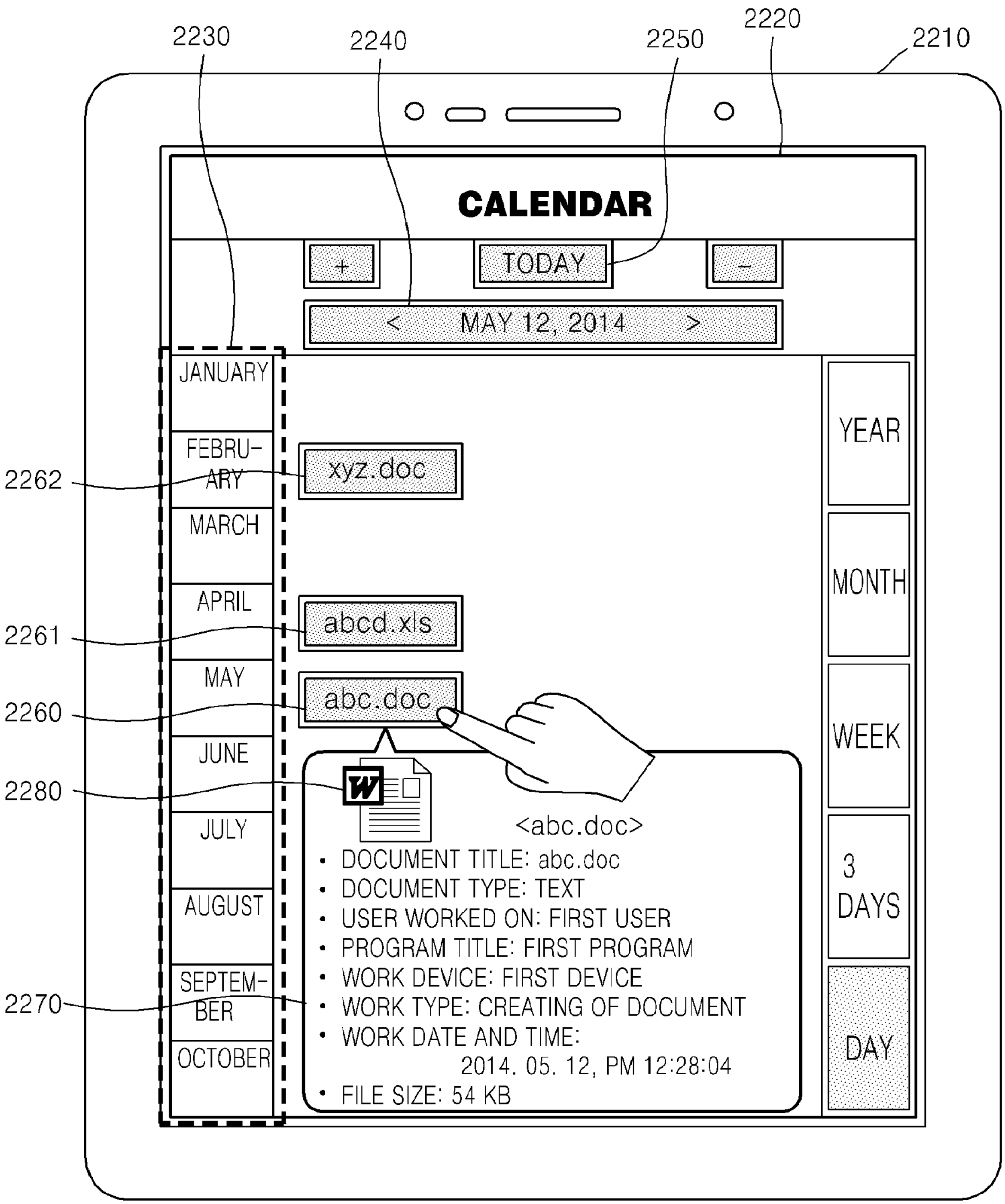
FIG. 22 through 25 illustrate examples of annual calendars displayed on screen of devices according to an exemplary embodiment.

Referring to FIG. 22, the annual calendar 2220 is output on the screen of the device 2210. The calendar 2220 may include a region 2230 displaying months included in a year and an indicator 2240 that may designate a year desired by a user. The calendar 2220 may also include an indicator 2250 that may display a calendar of a year including a date of "today". In addition to the above-described indicators 2240 and 2250, the calendar 2220 may include an indicator without limitation as long as the user may use the indicator to control a display type of the calendar.

Indicators 2260, 2261, and 2262 indicating titles of documents may be displayed on the calendar 2220. For example, if it is assumed that the first device 111 creates a document entitled "xyz.doc" on Feb. 12, 2014, the first device 111 may display the indicator 2262 indicating "xyz.doc" on a region of the calendar 2220 corresponding to February of 2014.

If it is assumed that the first device 111 creates a document entitled "abcd.xls" on Apr. 22, 2014, the first device 111 may display the indicator 2261 indicating "abcd.xls" on a region of the calendar 2220 corresponding to April of 2014. If it is assumed that the first device 111 creates a document entitled "abc.doc" on May 12, 2014, the first device 111 may display the indicator 2260 indicating "abc.doc" on a region of the calendar 2220 corresponding to May of 2014. While "xyz.doc", "abcd.xls", and "abc.doc" are created by the first device 111 in the present example, it is understood that the documents may be created by different devices.

The device 2210 may select the indicators 2260, 2261, and 2262 indicating the titles of the documents according to a user input received through the user input device 16510. When the indicators 2260, 2261, and 2262 indicating the titles of the documents are selected, the device 2210 may output work history information 2270 of the documents on the screen.

For example, it is assumed that the first device 111 stores the document entitled "abc.doc" having a size of 54 KB (kilobytes) at 12:28:04 p.m. on May 12, 2014 by using a first program. In this regard, if the indicator 2260 indicating "abc.doc" is selected, at least one of "abc.doc", text, first program, first device, 12:28:04 p.m. on May 12, 2014, and 54 KB may be output as the work history information 2270. Meanwhile, the device 2210 may output the work history information 2270 of the documents on the screen as a popup window, although it is understood that one or more other exemplary embodiments are not limited thereto as described above.

An indicator 2280 that may output the documents on the screen of the device 2210 may be displayed on the work history information 2270 of the documents. For example, when the indicator 2280 that may output the documents is selected according to the user input received through the user input device 16510, the device 2210 may output the document created by the first device 111 on the screen as the popup window separately from the calendar 2220, although it is understood that one or more other exemplary embodiments are not limited thereto as described above.

Figure 23:
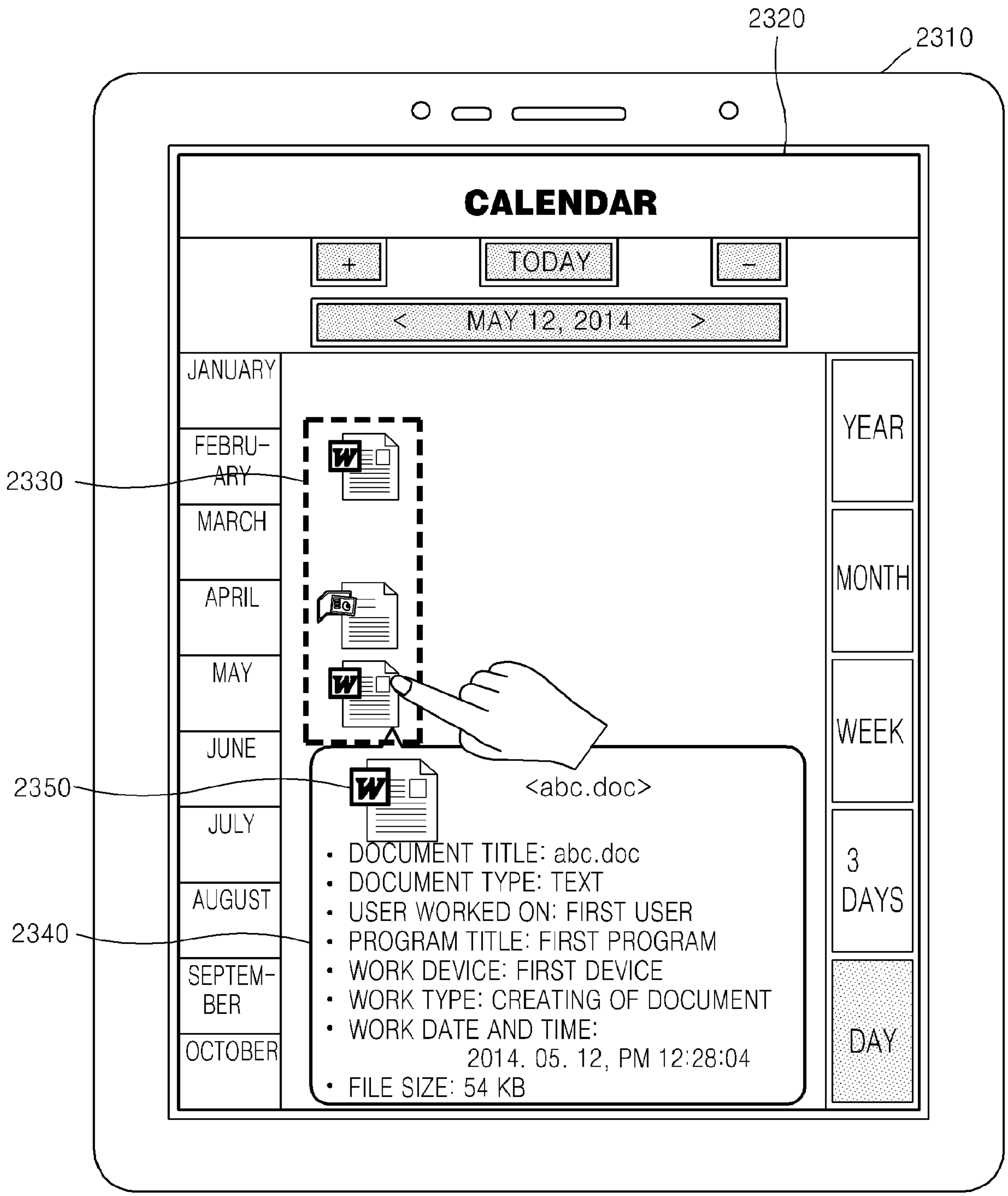

Referring to FIG. 23, the annular calendar 2320 is output on the screen of the device 2310. An indicator 2330 indicating a program used to work on the document is displayed on the calendar 2320. As described above with reference to FIGS. 17 and 20, when the indicator 2330 indicating the program used to work on the document is selected, the device 2310 may output work history information 2340 of a document on the screen. When an indicator 2350 that may output the document is selected from the screen that displays the work history information 2340 of the document, the device 2310 may output the document created by the first device 111 on the screen.

Figure 24:
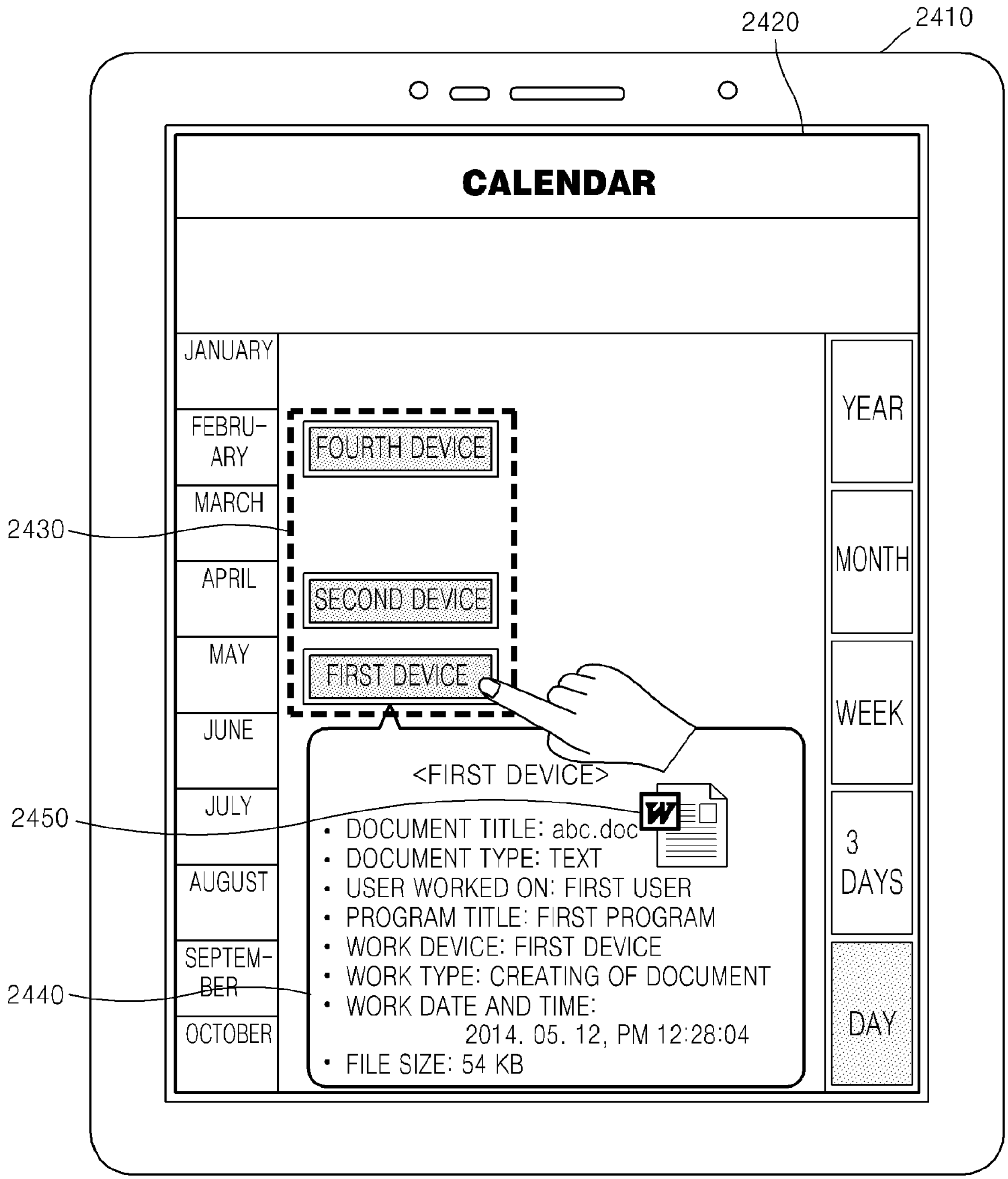

Referring to FIG. 24, the annular calendar 2420 is output on the screen of the device 2410. An indicator 2430 indicating a device is displayed on the calendar 2420. As described above with reference to FIGS. 18 and 21, when the indicator 2430 indicating the device is selected, the device 2410 may output execution history information 2440 of a document on the screen. When an indicator 2450 that may output the document is selected from the screen that displays the execution history information 2440 of the document, the device 2410 may output the document created by the first device 111 on the screen.

Figure 25:
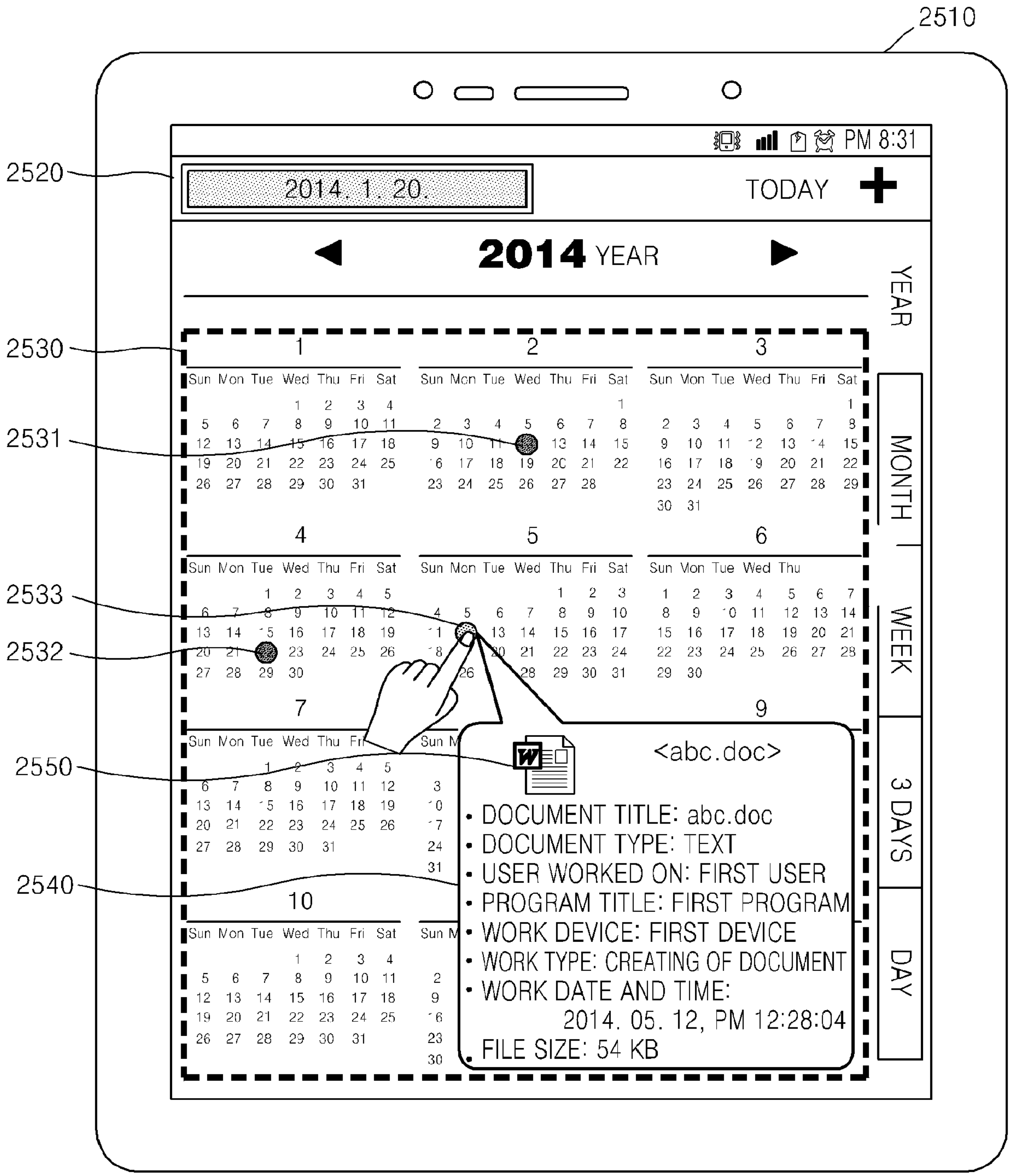

Referring to FIG. 25, the annular calendar 2520 is output on the screen of the device 2510. The annular calendars 2220, 2320, and 2420 of FIGS. 22 through 24 include regions displaying months included in a year, whereas the annular calendar 2520 of FIG. 25 includes a region 2530 displaying days included in a year. In other words, the device 2510 may modify a type of the annular calendar 2520 in various ways to output the annular calendar 2520 on the screen.

Indicators 2531, 2532, and 2533 may be displayed on respective dates of the calendar 2520 on which the documents are worked. For example, if it is assumed that the first device 111 creates a document entitled "xyz.doc" on Feb. 12, 2014, the indicator 2531 indicating "xyz.doc" may be displayed on a region of the calendar 2520 corresponding to Feb. 12, 2014. If it is assumed that the first device 111 creates a document entitled "abcd.xls" on Apr. 22, 2014, the first device 111 may display the indicator 2531 indicating "abcd.xls" on a region of the calendar 2520 corresponding to Apr. 22, 2014. If it is assumed that the first device 111 creates a document entitled "abc.doc" on May 12, 2014, the first device 111 may display the indicator 2533 indicating "abc.doc" on a region of the calendar 2520 corresponding to May 12, 2014. While "xyz.doc", "abcd.xls", and "abc.doc" are created by the first device 111 in the present example, it is understood that the documents may be created by different devices.

As described above with reference to FIGS. 16 and 24, when the indicator 2533 displayed on the calendar 2520 is selected, the device 2510 may output work history information 2540 of a document on the screen. When an indicator 2550 that may output the document is selected from the screen displaying the work history information 2540 of the document, the device 2510 may output the document created by the first device 111 on the screen.

Hereinafter, an example in which when the first device 111 creates a document, and the second device 112 reads the document, the server 100 interworks work history information with a calendar of a user will be described with reference to FIGS. 26A through 47.

Figure 26A:
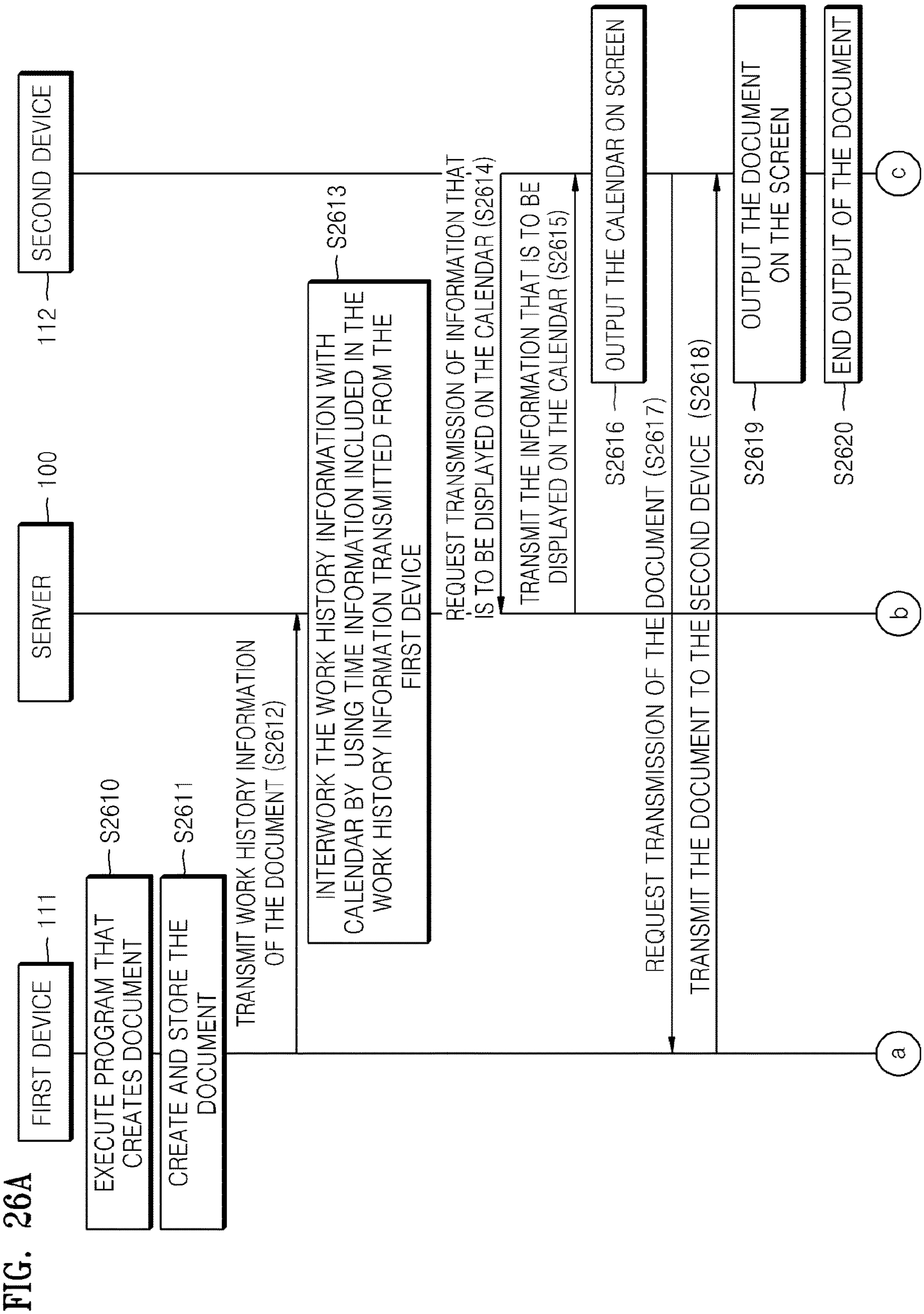
FIGS. 26A and 26B are flowcharts of an example in which when a first device creates a document, and a second device reads the document, a server interworks work history information with a calendar of a user according to an exemplary embodiment.
Figure 26B:
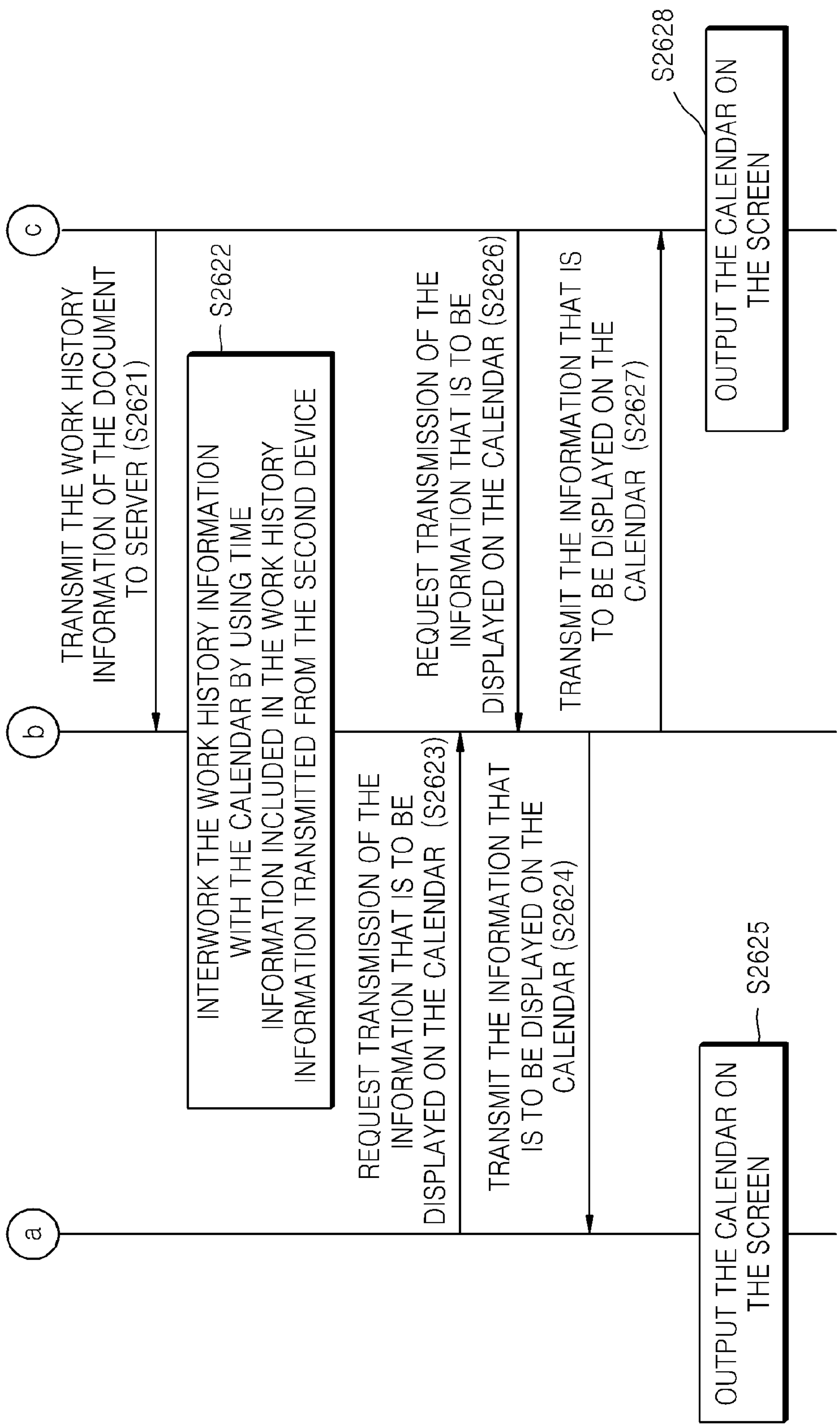

FIGS. 26A and 26B are flowcharts of an example in which when the first device 111 creates a document, and the second device 112 reads the document, the server 100 interworks work history information with a calendar of a user according to an exemplary embodiment.

While the first device 111 creates the document, and the second device 112 reads the document in the present exemplary embodiment of FIGS. 26A and 26B, it is understood that one or more other exemplary embodiments are not limited thereto. For example, according to another exemplary embodiment, the first device 111 may create the document and read the document.

Furthermore, it is understood that, in various exemplary embodiments, there is no limit to the number of devices. If the number of devices that execute the document is N (where N is greater than or equal to three), operations of the first device 111 or operations of the second device 112 that will be described below may be performed by at least one of the third device 113 through the Nth device 114 in one or more other exemplary embodiments.

Operations S2510 through S2616 of FIG. 26A correspond to operations S510 through S516 of FIG. 5, respectively. Thus, although omitted below, the descriptions provided above with reference to FIGS. 5 through 25 may apply to descriptions that will be described with reference to operations S2510 through S2616 of FIG. 26A.

In operation S2610, the first device 111 executes a program that creates the document.

In operation S2611, the first device 111 creates the document and stores the created document.

In operation S2612, the first device 111 transmits the work history information of the document to the server 100. For example, the first device 111 may transmit the work history information of the document at the time of storing the document, although it is understood that one or more other exemplary embodiments are not limited thereto as described above. For example, according to one or more other exemplary embodiments, the first device 111 may transmit the work history information of the document in response to a predetermined event (e.g., saving, opening, etc., the document), and/or according to a prior setting or a default setting (e.g., transmit the work history information at predetermined time intervals, at predetermined time points, and/or in accordance with a device setting such as only when connected to a local area network). In this case, it is assumed that the user of the first device 111 logs into the server 100. Also, examples in which the first device 111 transmits the work history information to the server 100 have been described with reference to operation S411 of FIG. 4.

In operation S2613, the server 100 interworks the work history information with the calendar by using time information included in the work history information transmitted from the first device 111.

In operation S2614, the second device 112 requests the server 100 to transmit information that is to be displayed on the calendar. For example, the second device 112 may request the server 100 to transmit the information that is to be displayed on the calendar after executing a calendar output program installed in the second device 112 and authenticating the user by using an input user account.

In operation S2615, the server 100 transmits the information that is to be displayed on the calendar to the second device 112.

In FIG. 26A, when the second device 112 requests the server 100 to transmit the information that is to be displayed on the calendar in operation S2614, the server 100 transmits the information that is to be displayed on the calendar to the second device 112 in operation S2615, although it is understood that one or more other exemplary embodiments are not limited thereto. For example, although there is no request from the second device 112, the server 100 may transmit (for example, push) the information that is to be displayed on the calendar to the second device 112, as described above. Furthermore, according to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In operation S2616, the second device 112 outputs the calendar on a screen.

In operation S2617, the second device 112 requests the first device 111 to transmit the document. For example, when a predetermined indicator displayed on the calendar is selected according to a user input received by the second device 112, the second device 112 may request the first device 111 to transmit the document. In this case, the predetermined indicator may be the indicator 1680 that may output the document displayed on the calendar 1620 of FIG. 16.

In operation S2618, the first device 111 transmits the document to the second device 112 according to a request of the second device 112.

As an example, the second device 112 may request the first device 111 to transmit the document and receive the document from the first device 111. Alternatively, the second device 112 may request the server 100 to transmit the document and receive the document from the server 100.

As another example, the second device 112 may receive an image indicating the document from the first device 111 or the server 100 in a streaming way.

Hereinafter, an example in which the second device 112 requests the first device 111 to transmit a document and receives the document from the first device 111 will now be described with reference to FIG. 27.

Figure 27:
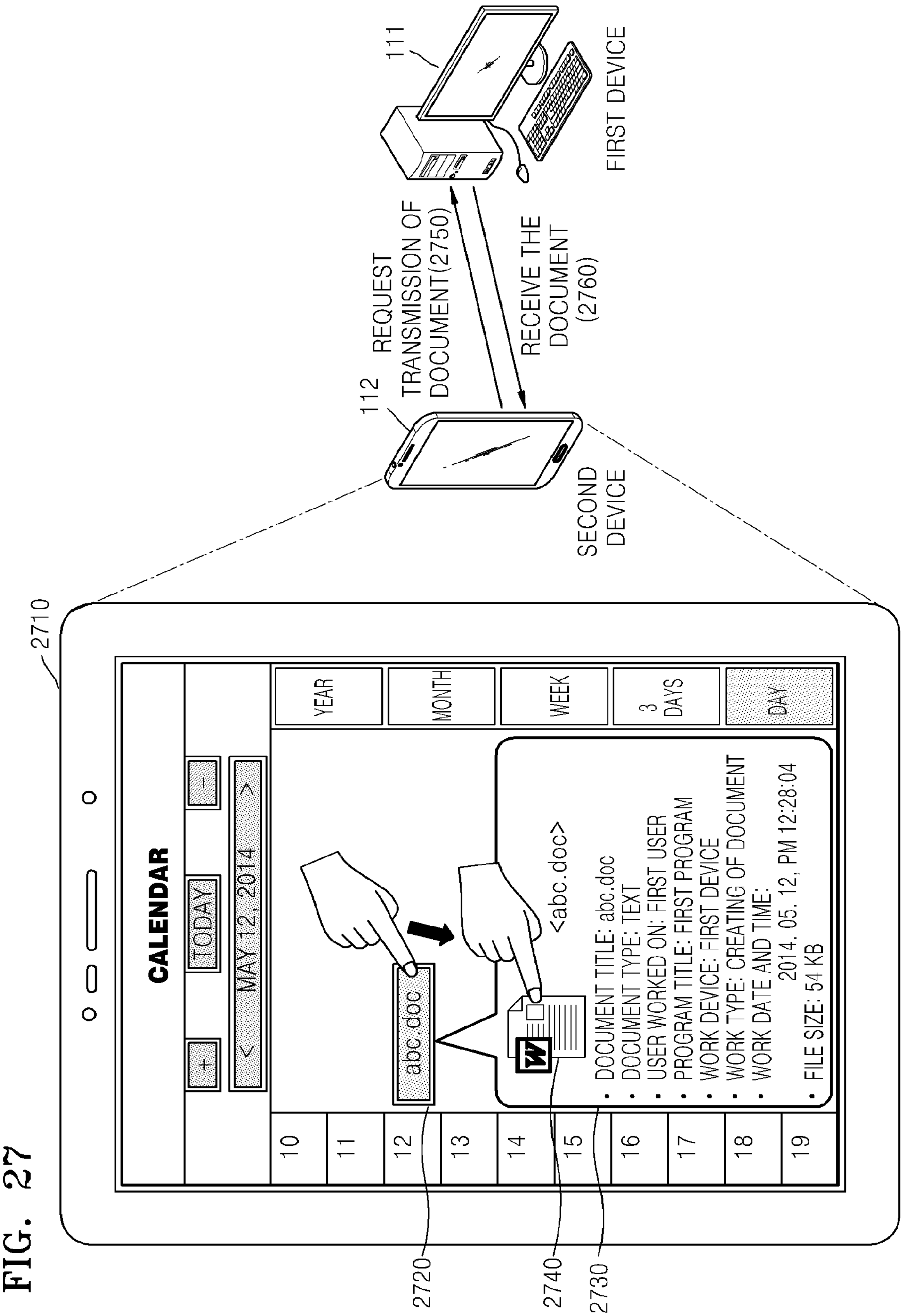
FIG. 27 is a diagram for explaining an example in which a second device requests a first device to transmit a document and receives the document from the first device according to an exemplary embodiment.

FIG. 27 is a diagram for explaining an example in which the second device 112 requests the first device 111 to transmit a document and receives the document from the first device 111 according to an exemplary embodiment.

Referring to FIG. 27, a calendar 2710 output on a screen of the second device 112 is illustrated. In this regard, the calendar 2710 is a calendar output on the screen of the second device 112 as a result of performing operation S2616 of FIG. 26A.

The second device 112 receives a user input that selects an indicator 2620 displayed on the calendar 2710 through the user input device 16510. The second device 112 outputs work history information 2730 of the document on the screen according to the received user input. In this regard, an indicator 2740 that may output the document on the screen of the second device 112 may be displayed on the screen displaying the work history information 2730 of the document.

If the indicator 2740 is selected, a preview screen of the document or a processing screen of the document may be output on the second device 112. As an example, if a user makes a first type of input (e.g., a short touch as an input) on the indicator 2740, the preview screen of the document may be output, and, if the user makes a second type of input (e.g., a long touch as an input) on the indicator 2740, the processing screen of the document may be output. As another example, if a cursor displayed on the screen of the second device 112 moves on the indicator 2740, the preview screen of the document may be output, and, if the user clicks on the indicator 2740, the processing screen of the document may be output.

The second device 112 receives a user input (for example, the long touch or click) that selects the indicator 2740 through the user input device 16510. The second device 112 requests the first device 111 to transmit the document according to the received user input. The first device 111 transmits the document to the second device 112 according to a request of the second device 112.

Referring back to FIG. 26A, in operation S2619, the second device 112 outputs the document transmitted from the first device 111 on the screen.

In operation S2620, the second device 112 ends output of the document. Hereinafter, examples in which the second device 112 ends output of the document will now be described with reference to FIGS. 28 through 30.

Figure 28:
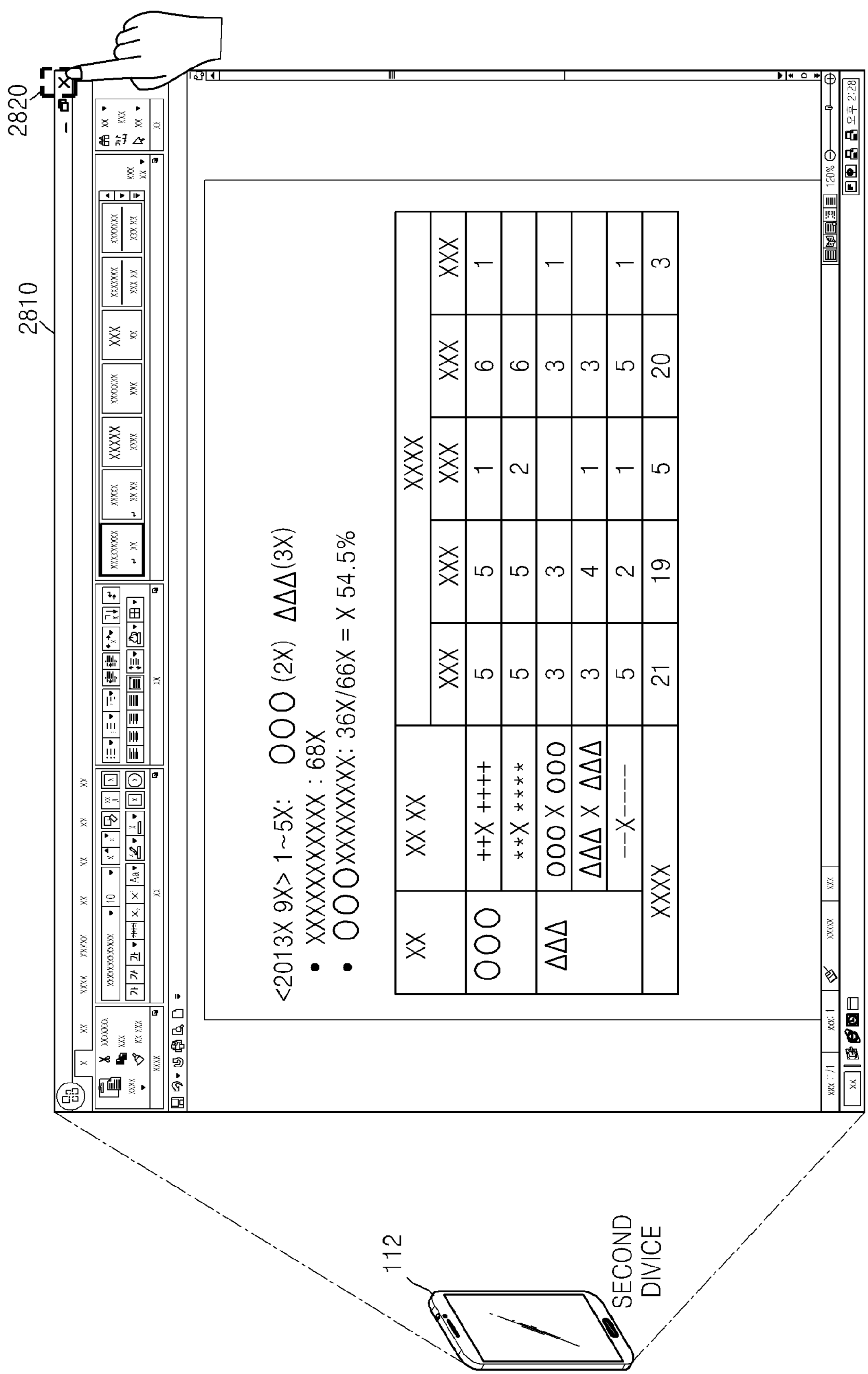
FIGS. 28 through 30 are diagrams for explaining examples in which a second device ends output of a document according to an exemplary embodiment.
Figure 29:
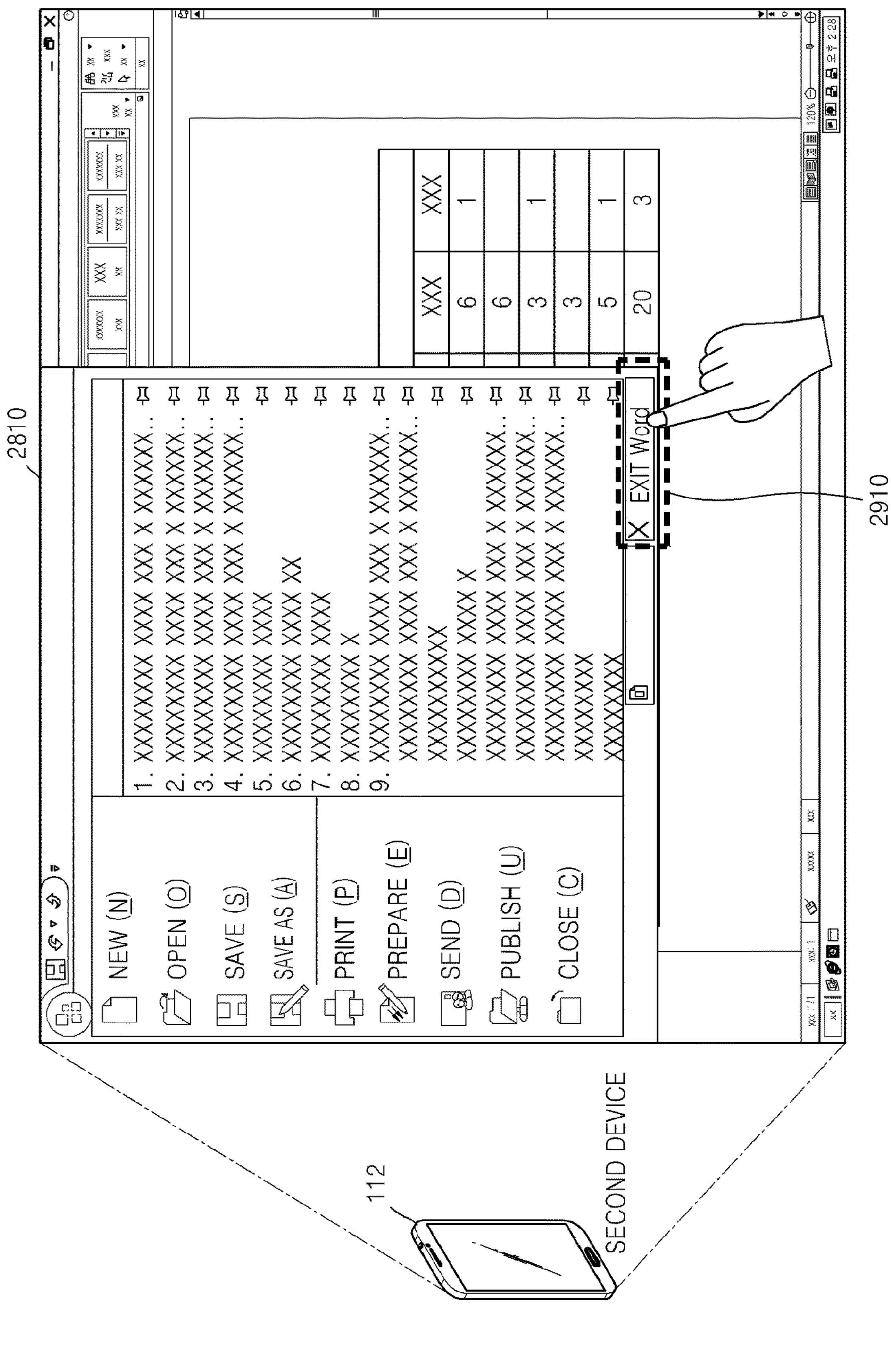
Figure 30:
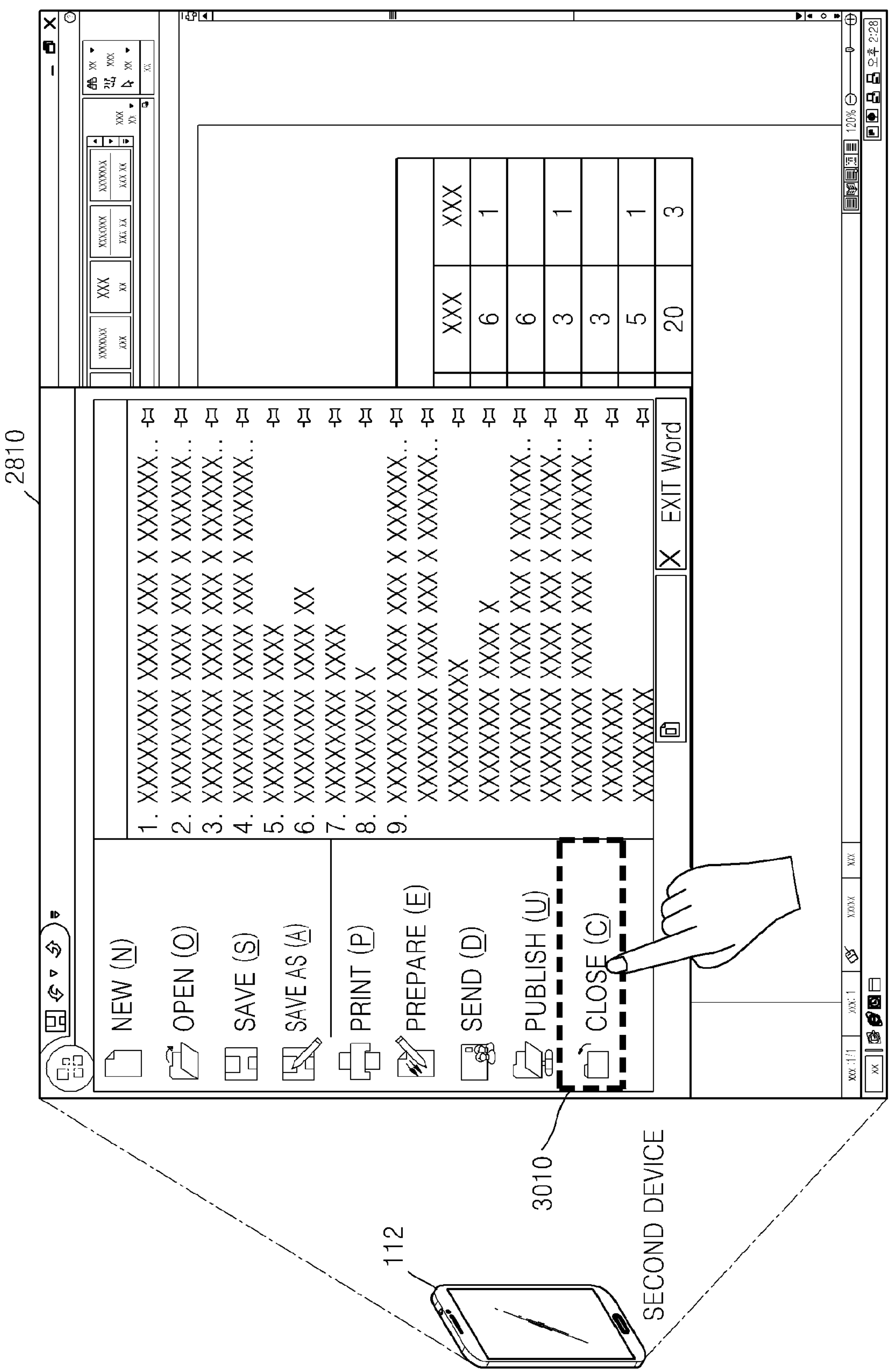

FIGS. 28 through 30 are diagrams for explaining examples in which the second device 112 ends outputting a document according to an exemplary embodiment.

Referring to FIGS. 28 through 30, the document received from the first device 111 is output 2810 on a screen of the second device 112. The second device 112 receives a user input that ends output 2810 of the document through the user input device 16510. For example, the user input may be inputs 2820 and 2910 that end a program for executing the document or an input 3010 that closes a window that outputs the document while maintaining execution of the program.

Referring to FIG. 28, the second device 112 receives a user input that selects an indicator 2820 displayed on the screen. The second device 112 ends the program for executing the document according to the received user input.

Referring to FIG. 29, the second device 112 receives a user input that selects an indicator 2910 displayed on the screen. The second device 112 ends the program for executing the document according to the received user input.

Referring to FIG. 30, the second device 112 receives a user input that selects an indicator 3010 displayed on the screen. The second device 112 closes the window that outputs the document displayed on the screen according to the received user input.

Referring back to FIG. 26B, in operation S2621, the second device 112 transmits the work history information of the document to the server 100. For example, the second device 112 may transmit the work history information of the document to the server 100 at the time of ending execution of the document (i.e., at the time of ending output of the document). Hereinafter, an example in which the second device 112 transmits work history information of a document to the server 100 will now be described with reference to FIG. 31.

Figure 31:
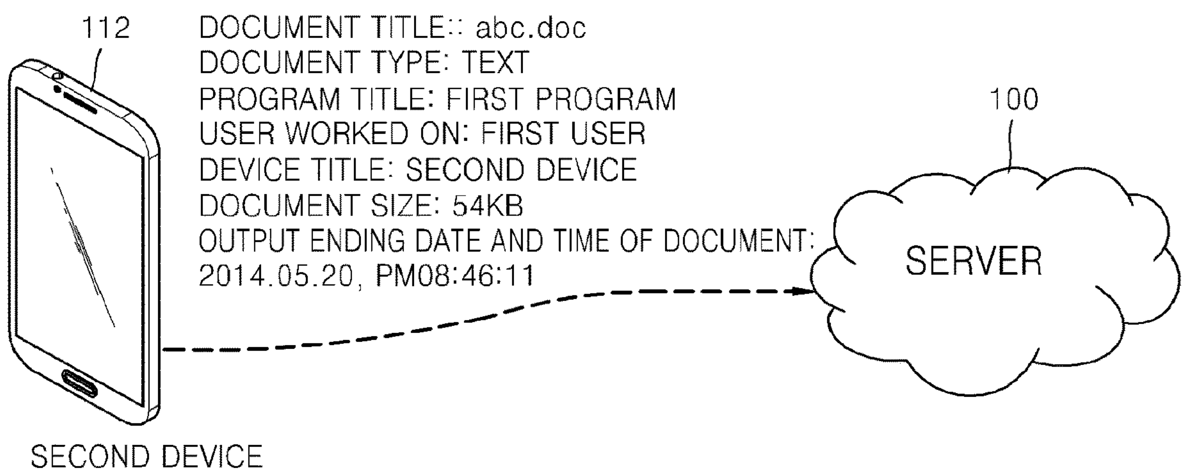
FIG. 31 is a diagram for explaining an example in which a second device transmits work history information of a document to a server according to an exemplary embodiment.

FIG. 31 is a diagram for explaining an example in which the second device 112 transmits work history information of a document to the server 100 according to an exemplary embodiment.

As described above with reference to FIGS. 28 through 30, the second device 112 may end output of the document by ending a program for executing the document or closing a window that outputs the document, although it is understood that one or more other exemplary embodiments are not limited thereto. When the second device 112 ends the program or closes the window that outputs the document by not adding or deleting content of the document, the second device 112 determines that the document is read.

When the program for executing the document ends or the window that outputs the document is closed, the second device 112 transmits the work history information of the document to the server 100. In other words, the second device 112 transmits information generated by reading the document to the server 100.

For example, if it is assumed that the second device 112 executes a document entitled "abc.doc" having a size of 54 KB (kilobytes) by using a first program and ends the first program or closes the window that outputs the document at 08:46:11 p.m. on May 20, 2014, the second device 112 may transmit at least one of "abc.doc", text, first program, first device, 08:46:11 p.m. on May 20, 2014, and 54 KB to the server 100.

The encryption of the work history information which requires a high level of security and transmission of the encrypted work history information to the server 100 have been described with reference to FIG. 7.

Referring back to FIG. 26B, in operation S2622, the server 10 interworks the work history information with the calendar by using the time information included in the work history information transmitted from the second device 112. For example, in operation S2613, the server 100 interworks the work history information received from the first device 111 on the calendar and, in operation S2622, additionally interworks the work history information received from the second device 112 on the calendar.

In operation S2623, the first device 111 requests the server 100 to transmit the information that is to be displayed on the calendar. For example, the first device 111 may request the server 100 to transmit the work history information that is to be displayed on a screen of a device when an indicator that is to be displayed on the calendar or an indicator that is displayed on the calendar is selected.

In operation S2624, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed.

In operation S2625, the first device 111 outputs the calendar on the screen.

In FIG. 26B, when the first device 111 requests the server 100 to transmit the information that is to be displayed on the calendar in operation S2623, the server 100 transmits the information that is to be displayed on the calendar to the first device 111 in operation S2624, although it is understood that one or more other exemplary embodiments are not limited thereto. According to another exemplary embodiment, although there is no request from the first device 111, the server 100 may transmit (for example, push) the information that is to be displayed on the calendar to the first device 111. For example, if the first device 111 has previously requested the server 100 to transmit the information that is to be displayed on the calendar, the server 100 may automatically transmit the information that is to be displayed on the calendar although there is no request from the first device 111 at a later time. According to another example, the server 100 may automatically transmit the information according to a prior setting or a default setting to automatically transmit the information at predetermined time intervals or predetermined time points.

Descriptions that will be provided with reference to operations S2626 through S2628 correspond to the detailed descriptions provided with reference to operations S2623 through S2625, respectively. In other words, the second device 112 requests the server 100 to transmit the information that is to be displayed on the calendar, receives the information that is to be displayed on the calendar from the server 100, and outputs the calendar on the screen. Thus, although omitted below, the descriptions provided above with reference to operations S2623 through S2625 may apply to descriptions that will be described with reference to operations S2626 through S2628.

In operation S2626, the second device 112 requests the server 100 to transmit the information that is to be displayed on the calendar.

In operation S2627, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed.

In operation S2628, the second device 112 outputs the calendar on the screen.

Specific examples of the descriptions provided above with operations S2622 through S2628 of FIG. 26B will be described below with reference to FIGS. 34 through 47.

Meanwhile, in operation S2617, the second device 112 requests the first device 111 to transmit the document, and, in operation S2618, the second device 112 receives the document from the first device 111. However, it is understood that one or more other exemplary embodiments are not limited thereto. For example, according to another exemplary embodiment, the second device 112 may request the server 100 to transmit the document and receive the document from the server 100. Hereinafter, an example in which the second device 112 receives a document from the server 100 will be described with reference to FIGS. 32A and 33.

Figure 32A:
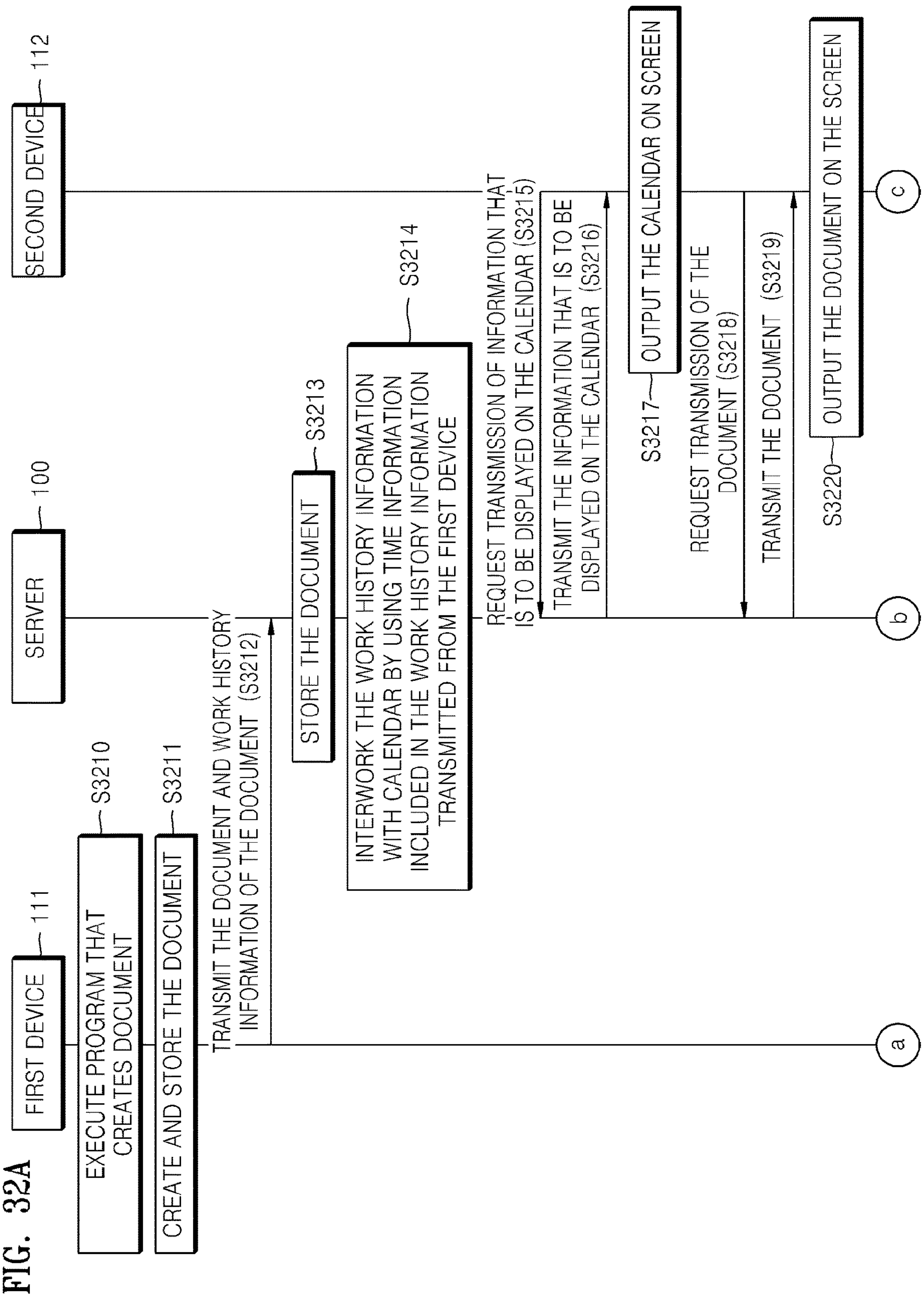
FIGS. 32A and 32B are flowcharts of another example in which when a first device creates a document, and a second device reads the document, a server interworks work history information with a calendar of a user according to an exemplary embodiment.
Figure 32B:
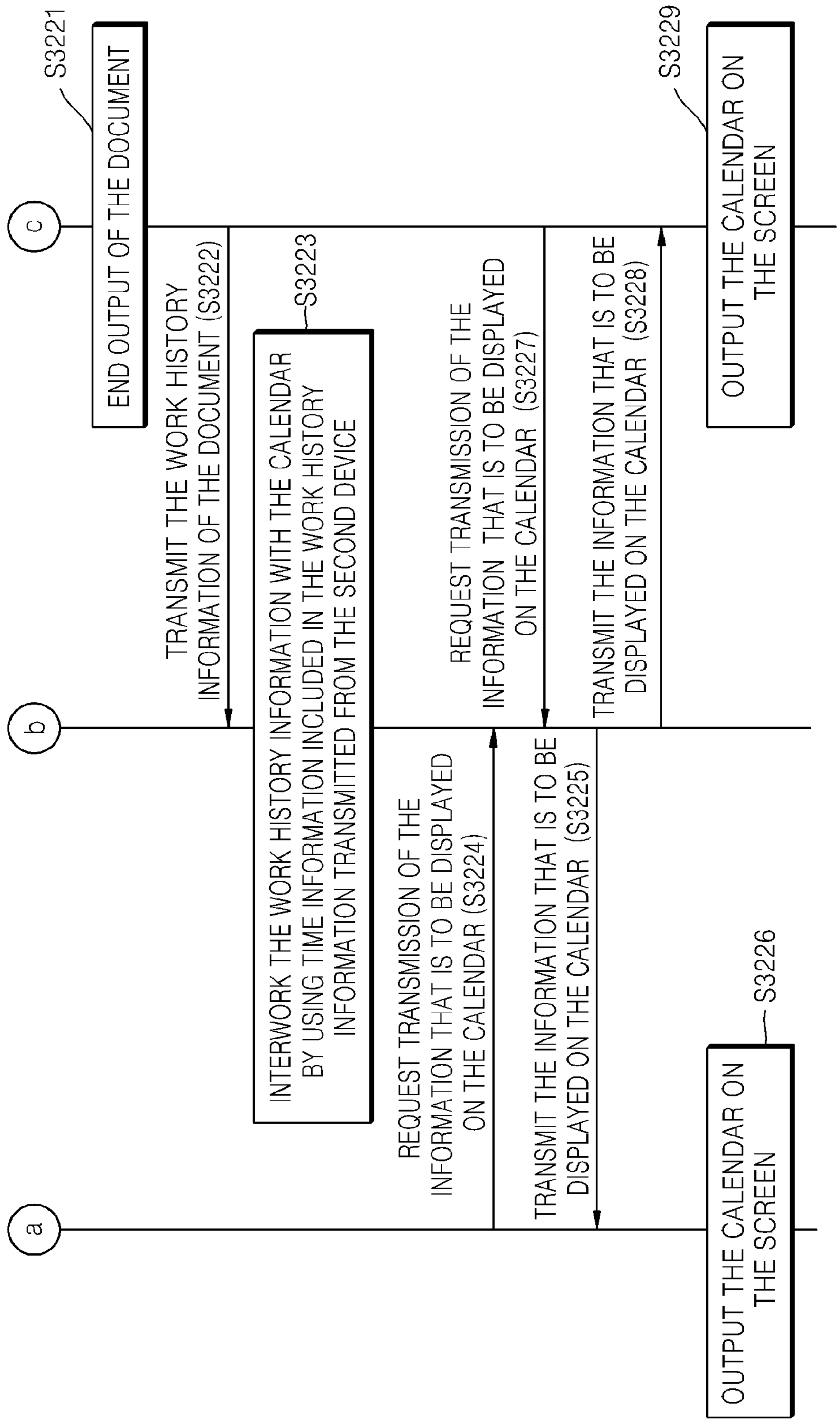

FIGS. 32A and 32B are flowcharts of another example in which when the first device 111 creates a document, and the second device 112 reads the document, the server 100 interworks work history information with a calendar of a user according to an exemplary embodiment.

As compared to the flowcharts of FIGS. 26A and 26B, operations S3210 and S3211 of FIGS. 32A and 32B are the same as or similar to operations S2610 and S2611 of FIGS. 26A and 26B. Operations S3220 through S3229 of FIGS. 32A and 32B are the same as or similar to operations S2619 through S2628 of FIGS. 26A and 26B. Thus, descriptions of operations S3210 and S3211 and operations S3220 through S3229 of FIGS. 32A and 32B are omitted below.

In operation S3212, the first device 111 transmits the document and information regarding execution of the document to the server 100. In other words, the first device 111 transmits, to the server 100, the document and work history information generated by storing the document. In this case, it is assumed that the user of the first device 111 logs into the server 100. Also, examples in which the first device 111 transmits the work history information to the server 100 have been described with reference to operation S411 of FIG. 4.

In operation S3213, the server 100 stores the document received from the first device 111.

In operation S3214, the server 100 interworks the work history information with the calendar by using time information included in the work history information transmitted from the first device 111.

In operation S3215, the second device 112 requests the server 100 to transmit information that is to be displayed on the calendar. For example, the second device 112 may request the server 100 to transmit the information that is to be displayed on the calendar after executing a calendar output program installed in the second device 112 and authenticating the user by using a user account.

In operation S3216, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed.

In operation S3217, the second device 112 outputs the calendar on a screen.

In operation S3218, the second device 112 requests the server 100 to transmit the document. For example, when an indicator that requests execution of the document displayed on the calendar is selected according to a user input to the second device 112, the second device 112 may request the server 100 to transmit the document. In this case, when a predetermined indicator displayed on the calendar is selected according to the user input received by the second device 112, the second device 112 may request the server 100 to transmit the document. For example, the predetermined indicator may be the indicator 1680 that may output the document displayed on the calendar 1620 of FIG. 16.

In operation S3219, the server 100 transmits the document to the second device 112 according to a request of the second device 112.

Hereinafter, an example in which the second device 112 requests the server 100 to transmit a document and receives the document from the server 100 will now be described with reference to FIG. 33.

Figure 33:
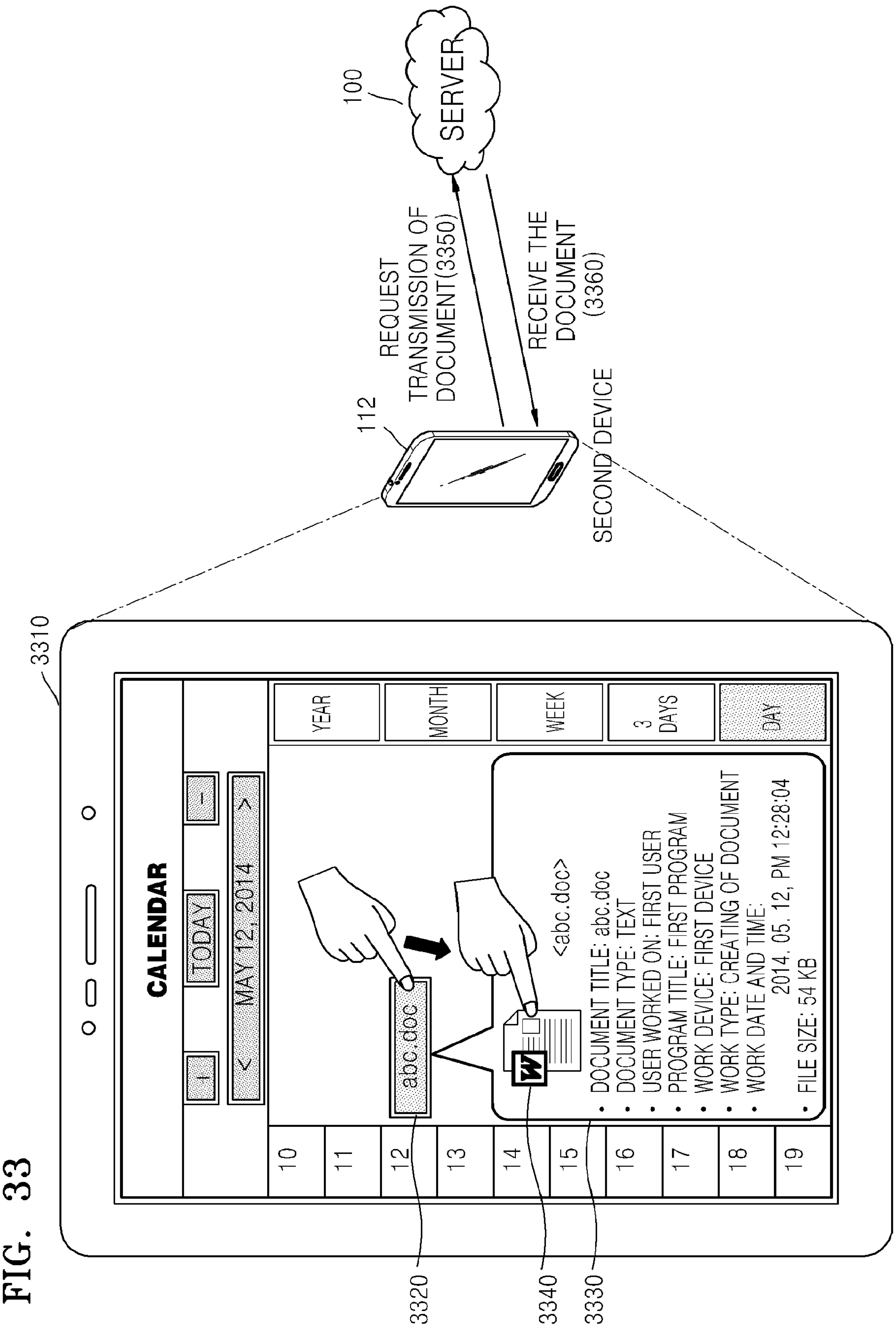
FIG. 33 is a diagram for explaining an example in which a second device requests a server to transmit a document and receives the document from a server according to an exemplary embodiment.

FIG. 33 is a diagram for explaining an example in which the second device 112 requests the server 100 to transmit a document and receives the document from the server 100 according to an exemplary embodiment.

Referring to FIG. 33, a calendar 3310 output on a screen of the second device 112 is illustrated. The second device 112 receives a user input that selects an indicator 3320 displayed on the calendar 3310 through the user input device 16510. The second device 112 outputs work history information 3330 of the document according to the received user input. In this regard, the second device 112 may output the work history information 3330 of the document on the screen as a popup window separately from the calendar 3310, although it is understood that one or more other exemplary embodiments are not limited thereto as described above. An indicator 3340 that may output the document on the screen of the second device 112 may be displayed on the screen displaying the work history information 3330 of the document.

If the indicator 3340 is selected, a preview screen of the document or a processing screen of the document may be output on the second device 112. As an example, if a user makes a first type of input (e.g., a short touch as an input) on the indicator 3340, the preview screen of the document may be output, and, if the user makes a second type of input (e.g., a long touch as an input) on the indicator 3340, the processing screen of the document may be output. As another example, if a cursor displayed on the screen of the second device 112 moves on the indicator 3340, the preview screen of the document may be output, and, if the user clicks on the indicator 3340, the processing screen of the document may be output.

The second device 112 receives a user input (for example, the long touch or click) that selects the indicator 3340 through the user input device 16510. The second device 112 requests 3350 the first device 111 to transmit the document according to the received user input. The first device 111 transmits 3360 the document to the second device 112 according to the request of the second device 112.

Figure 34:
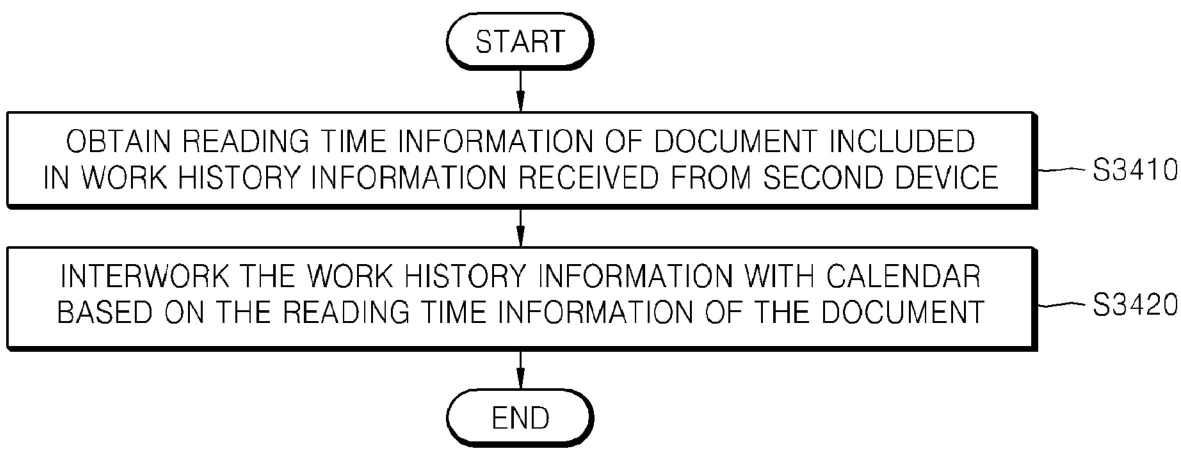
FIG. 34 is a flowchart of an example in which a server interworks work history information of a document with a calendar according to an exemplary embodiment.

FIG. 34 is a flowchart of an example in which the server 100 interworks work history information of a document with a calendar according to an exemplary embodiment.

The flowchart of FIG. 34 corresponds to operation S2622 of FIG. 26B and operation S3223 of FIG. 32B.

In operation S3410, the server 100 obtains reading time information of the document included in work history information received from the second device 112. For example, according to the example described above with reference to FIG. 31, the server 100 obtains "12:28:04 p.m. of May 12, 2014" from the work history information received from the second device 112.

Hereinafter, an example of work history information obtained by the server 100 will now be described with reference to FIGS. 35 and 36.

FIGS. 35 and 36 are tables illustrating examples of work history information 3510 and 3610 of a document according to an exemplary embodiment.

The work history information 3510 of FIG. 35 is generated by updating the work history information 1310 of the document of FIG. 13. In other words, the work history information 1310 of the document of FIG. 13 is generated when a device creates the document. Meanwhile, the work history information 3510 of FIG. 35 is generated by adding new work history information 3520 and 3530 when the device creates the document, and at least one of the devices reads the created document.

Referring to FIG. 35, the server 100 may arrange the work history information 3510, 3520, and 3530 received from the second device 112 according to a title 3511 of the document.

The work history information 3610 of FIG. 36 is generated by updating the work history information 1410 of the document of FIG. 14. In other words, the work history information 1410 of the document of FIG. 14 is generated when a device creates the document. Meanwhile, the work history information 3610 of FIG. 36 is generated by adding new work history information 3620 and 3630 when the device creates the document, and at least one of the devices reads the created document.

Referring to FIG. 36, the server 100 may arrange the work history information 3610, 3620, and 3630 received from the second device 112 according to a title 3611 of a work device.

Referring back to FIG. 34, in operation S3420, the server 100 interworks the work history information with the calendar of the user based on the reading time information of the document. Hereinafter, an example in which the server 100 interworks work history information with a calendar of a user will now be described with reference to FIG. 37.

Figure 37:
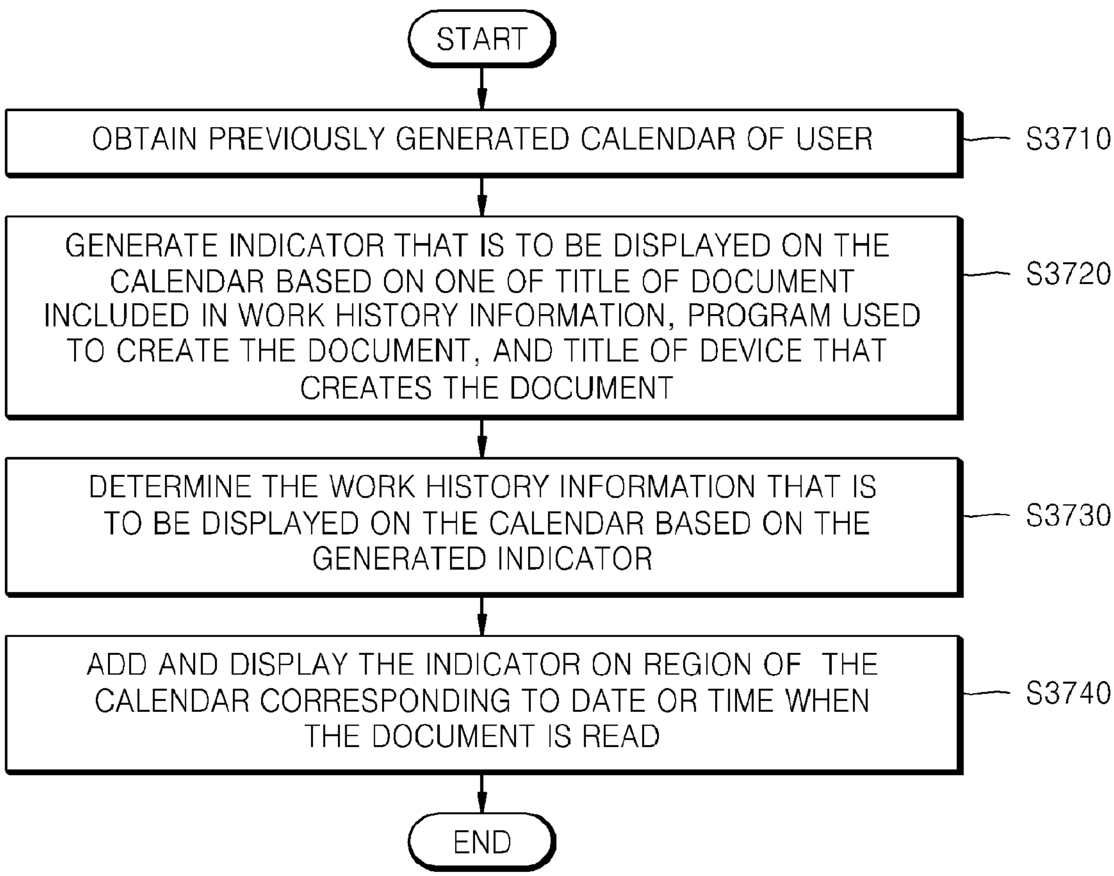
FIG. 37 is a flowchart of an example in which a server interworks work history information with a calendar of a user according to an exemplary embodiment.

FIG. 37 is a flowchart of an example in which the server 100 interworks work history information with a calendar of a user according to an exemplary embodiment.

In operation S3710, the server 100 obtains a previously generated calendar of the user. In this regard, the previously generated calendar of the user may be a calendar generated when the server 100 interworks the work history information transmitted from the first device 111 with the calendar in operation S3214 of FIG. 32B.

In operation S3720, the server 100 generates an indicator that is to be displayed on the calendar based on at least one of a title of the document included in the work history information, a program used to read the document, and a title of a device that reads the document. In this regard, the work history information is received from the second device 112. For example, the server 100 may determine at least one of the title of the document included in the work history information, the program used to read the document, and the title of the device that reads the document as an item indicating an indicator and generate the indicator based on the determined item.

In operation S3730, the server 100 determines the work history information that is to be displayed on the calendar based on the generated indicator.

In operation S3740, the server 100 adds and displays the indicator to and on a region of the calendar corresponding to a date or time when the document is read.

Hereinafter, examples of calendars that are output on devices will be described with reference to FIGS. 38 through 47. The calendars of FIGS. 38 through 47 correspond to updated versions of the calendars of FIGS. 16 through 25. Thus, although omitted below, the descriptions provided above with reference to 16 through 25 may apply to FIGS. 38 through 47.

Figure 38:
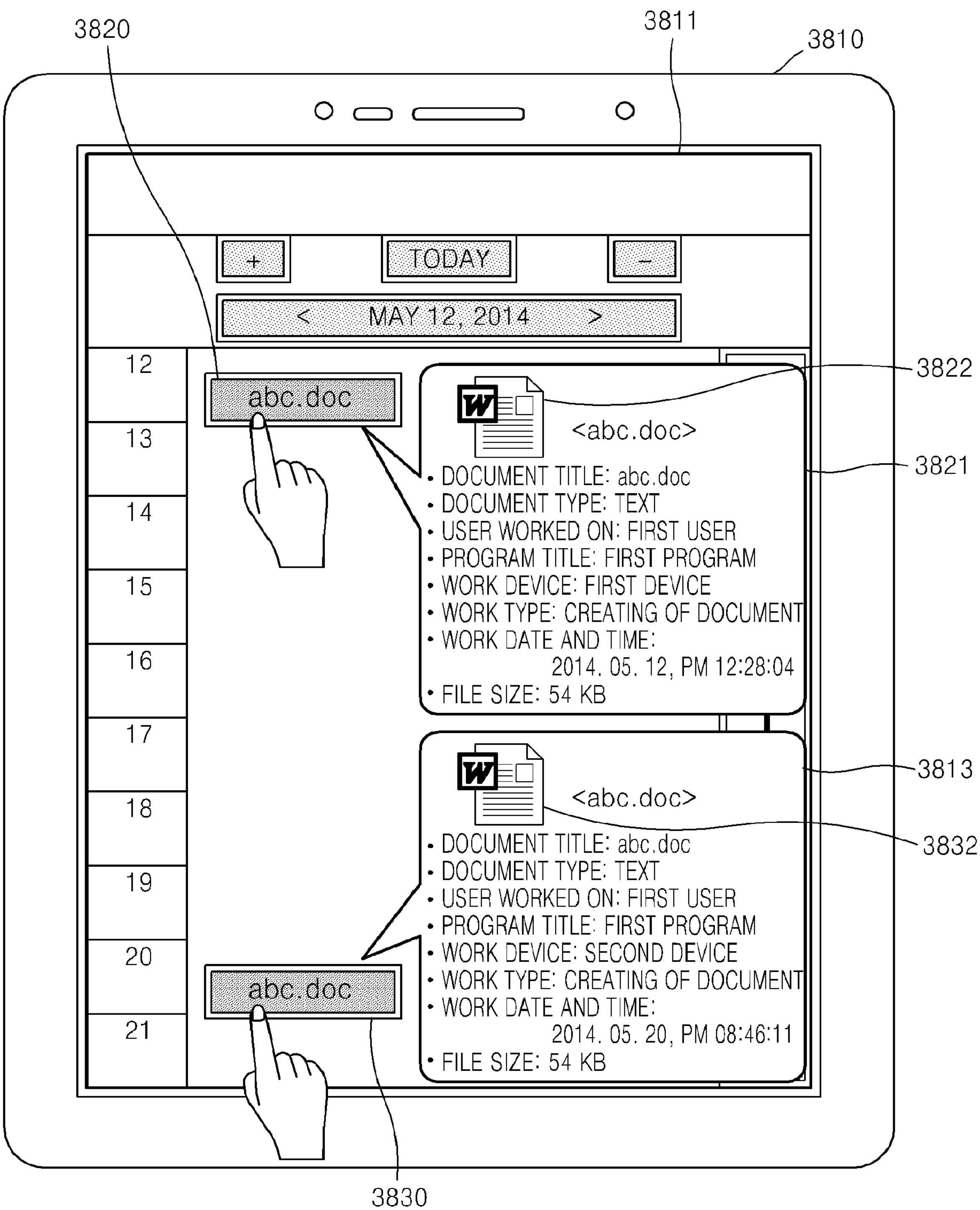
FIGS. 38 through 40 illustrate examples of daily calendars displayed on screens of devices according to an exemplary embodiment.
Figure 39:
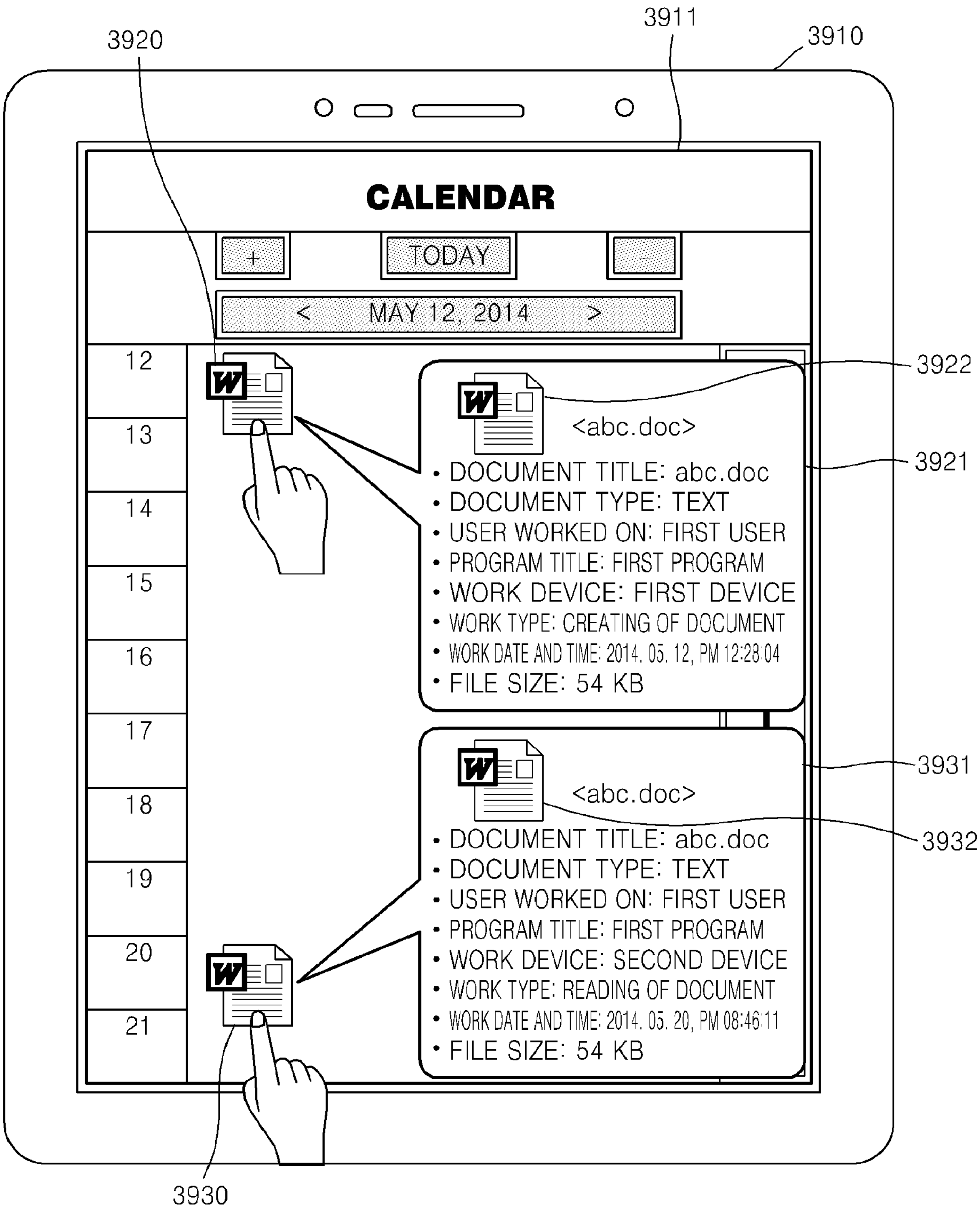
Figure 40:
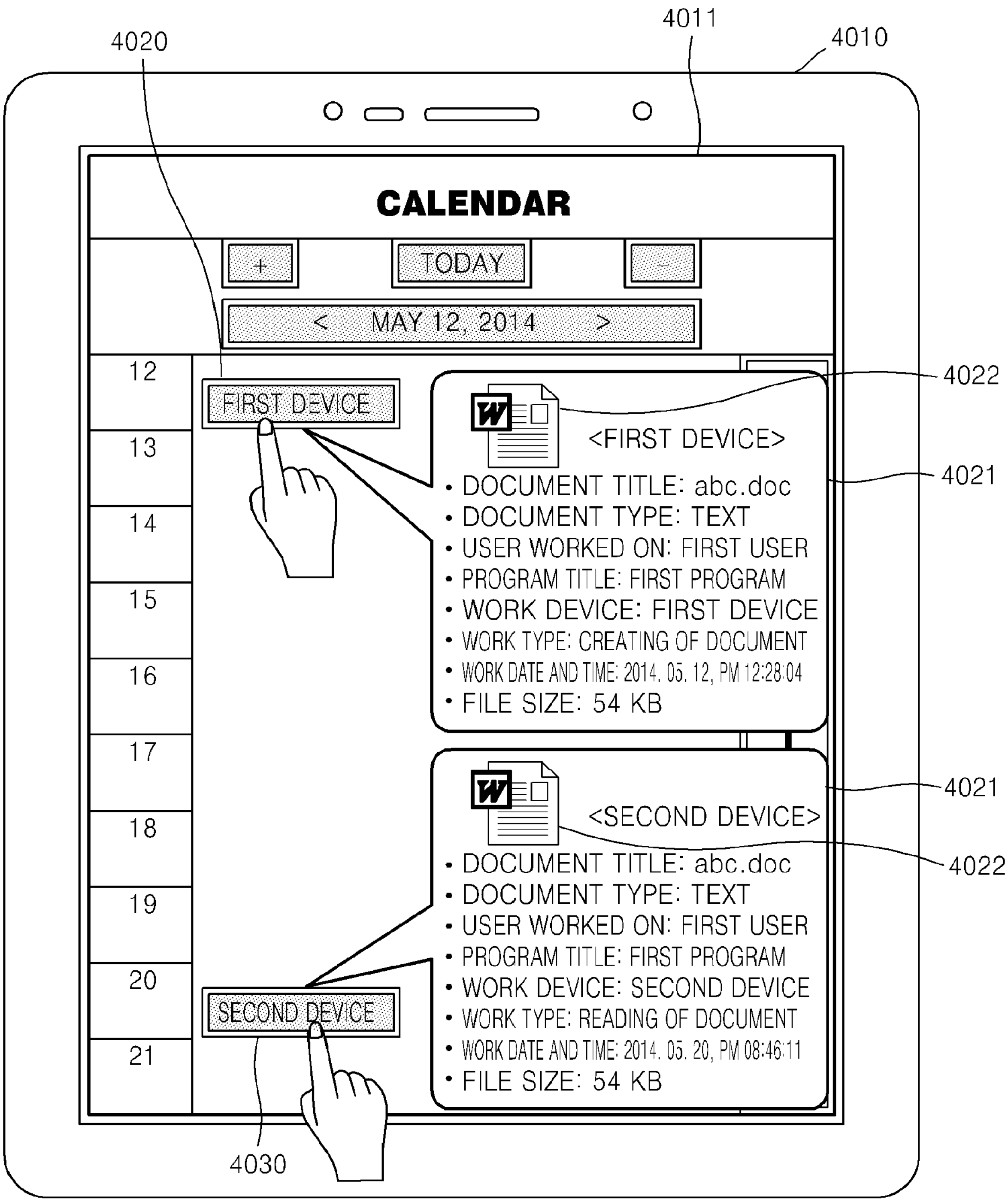

FIGS. 38 through 40 illustrate examples of daily calendars 3811, 3911, and 4011 displayed on screens of devices 3810, 3910, and 4010, respectively, according to an exemplary embodiment.

Referring to FIG. 38, the daily calendar 3811 is output on the screen of the device 3810.

An indicator 3820 displayed on a previously generated calendar and an indicator 3830 added by updating the calendar as well may be displayed on the calendar 3811. In this regard, the indicators 3820 and 3830 may be indicators indicating titles of documents.

For example, if it is assumed that the second device 112 reads a document created by the first device 111 on May 20, 2014, the indicator 3830 indicating “abc.doc” may be additionally displayed on a region of the calendar 3811 corresponding to May 20, 2014.

The device 3810 may select at least one of the indicators 3820 and 3830 according to a user input received through the user input device 16510. The device 3810 may output work history information 3821 and 3831 corresponding to the selected indicator on the screen. Indicators 3822 and 3832 that may output the document on the screen of the device 3810 may be displayed on the screen displaying the work history information 3821 and 3831.

Referring to FIG. 39, the daily calendar 3911 is output on the screen of the device 3910.

An indicator 3920 displayed on a previously generated calendar and an indicator 3930 added by updating the calendar as well may be displayed on the calendar 3911. In this regard, the indicators 3920 and 3930 may be indicators indicating titles of programs used to execute the document.

For example, if it is assumed that the second device 112 reads a document created by the first device 111 on May 20, 2014 by using a first program, the indicator 3930 indicating the “first program” may be additionally displayed on a region of the calendar 3911 corresponding to May 20, 2014.

Work history information 3921 and 3931 and indicators 3922 and 3932 that may output the document on the screen of the device 3910 may be displayed on the screen of the device 3910 according to a user input received through the user input device 16510 as described above with reference to FIG. 38.

Referring to FIG. 40, the daily calendar 4011 is output on the screen of the device 4010.

An indicator 4020 displayed on a previously generated calendar as well as an indicator 4030 added by updating the calendar may be displayed on the calendar 4011. In this regard, the indicators 4020 and 4030 may be indicators indicating titles of devices that execute the document.

For example, if it is assumed that the second device 112 reads a document created by the first device 111 on May 20, 2014, the indicator 4030 indicating a “second device” may be additionally displayed on a region of the calendar 4011 corresponding to May 20, 2014.

Work history information 4021 and 4031 and indicators 4022 and 4032 that may output the document on the screen of the device 4010 may be displayed on the screen of the device 4010 according to a user input received through the user input device 16510 as described above with reference to FIG. 38.

Figure 41:
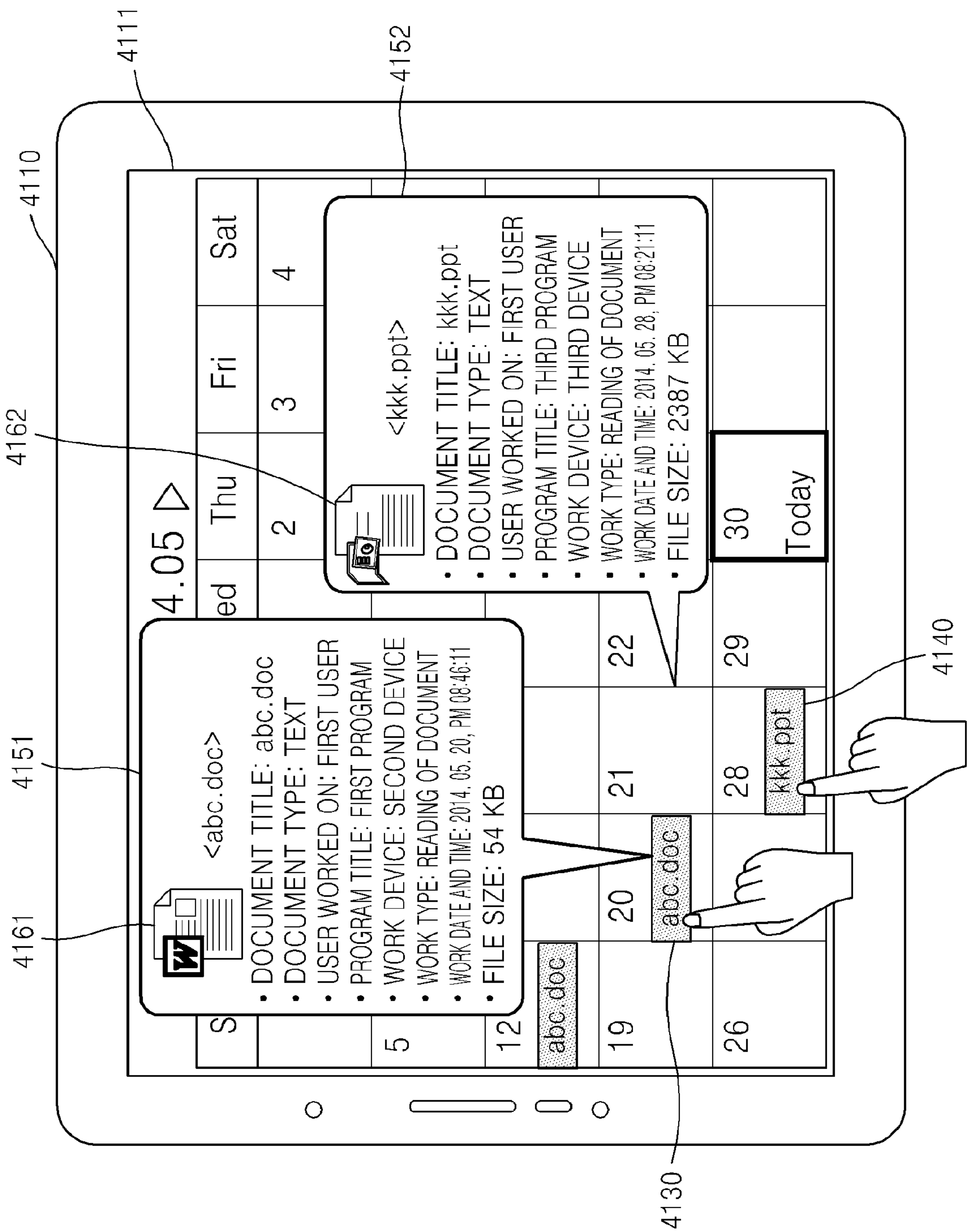
FIGS. 41 through 43 illustrate examples of monthly calendars displayed on screens of devices according to an exemplary embodiment.
Figure 42:
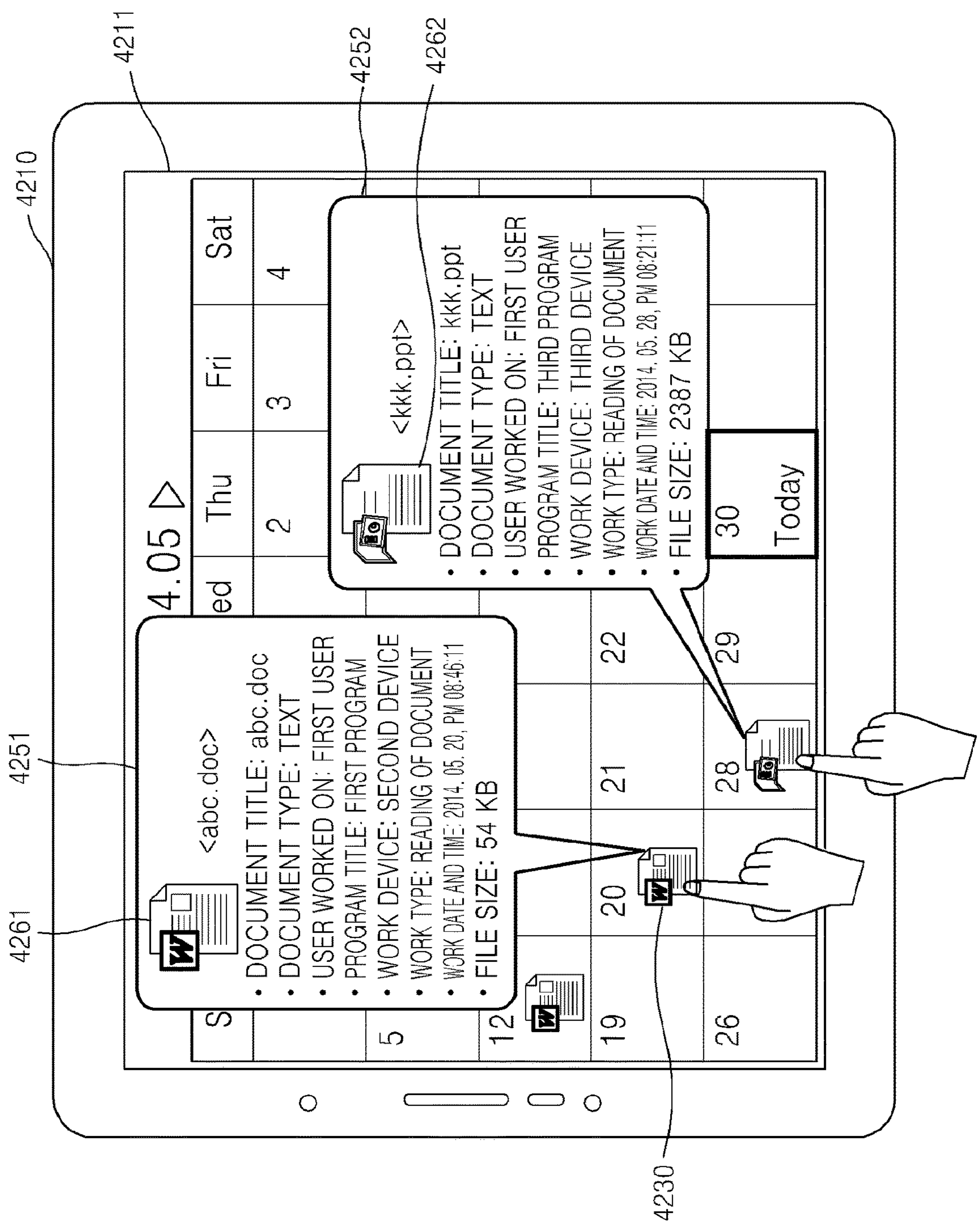
Figure 43:
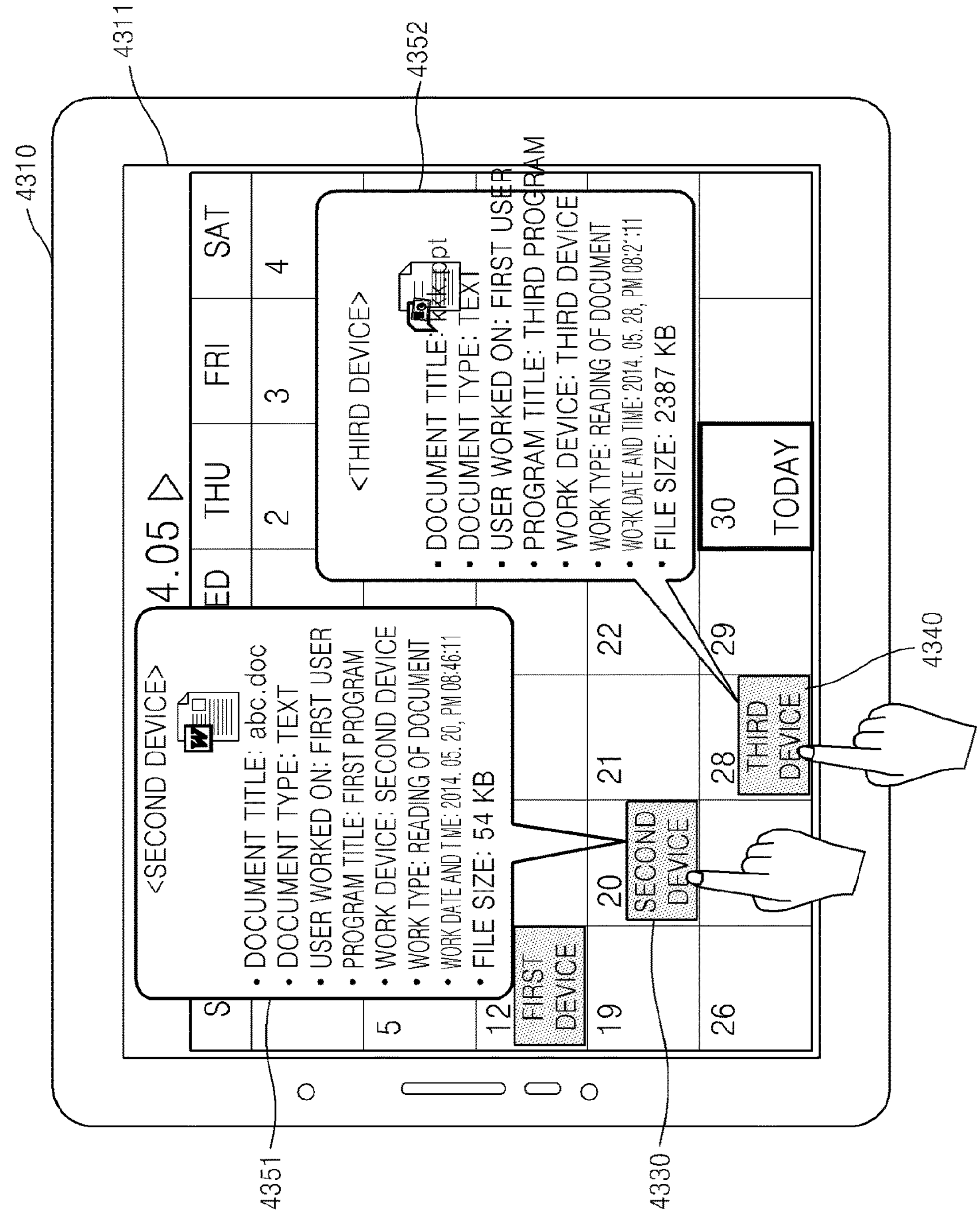

FIGS. 41 through 43 illustrate examples of monthly calendars 4111, 4211, and 4311 displayed on screens of devices 4110, 4210, and 4310, respectively, according to an exemplary embodiment.

Referring to FIG. 41, the monthly calendar 4111 is output on the screen of the device 4110.

An indicator 4120 displayed on a previously generated calendar as well as indicators 4130 and 4140 added by updating the calendar may be displayed on the calendar 4111. In this regard, the indicators 4120, 4130, and 4140 may be indicators indicating titles of documents.

For example, if it is assumed that the second device 112 reads a document created by the first device 111 on May 20, 2014, the indicator 4130 indicating “abc.doc” may be additionally displayed on a region of the calendar 4111 corresponding to May 20, 2014. If it is assumed that the third device 113 reads a document entitled “kkk.ppt” on May 28, 2014, the indicator 4140 indicating “kkk.ppt” may be additionally displayed on a region of the calendar 4111 corresponding to May 28, 2014.

Work history information 4151 and 4152 and indicators 4161 and 4162 that may output (i.e., in response to a selection thereof) the document on the screen of the device 4110 may be displayed on the screen of the device 4110 according to a user input received through the user input device 16510 as described above with reference to FIG. 38.

Referring to FIG. 42, the monthly calendar 4211 is output on the screen of the device 4210.

An indicator displayed on a previously generated calendar as well as indicators 4230 and 4240 added by updating the calendar may be displayed on the calendar 4211. In this regard, the indicators 4230 and 4240 may be indicators indicating titles of programs used to execute the document.

For example, if it is assumed that the second device 112 reads a document created by the first device 111 on May 20, 2014 by using a first program, the indicator 4230 indicating the "first program" may be additionally displayed on a region of the calendar 4211 corresponding to May 20, 2014. If it is assumed that the third device 113 reads a document entitled "kkk.ppt" on May 28, 2014 by using a third program, the indicator 4240 indicating the "third program" may be additionally displayed on a region of the calendar 4211 corresponding to May 28, 2014.

Work history information 4251 and 4252 and indicators 4261 and 4262 that may output the document on the screen of the device 4210 may be displayed on the screen of the device 4210 according to a user input received through the user input device 16510 as described above with reference to FIG. 38.

Referring to FIG. 43, the daily calendar 4311 is output on the screen of the device 4310.

An indicator displayed on a previously generated calendar and indicators 4330 and 4340 added by updating the calendar as well may be displayed on the calendar 4311. In this regard, the indicators 4330 and 4340 may be indicators indicating titles of devices that execute the document.

For example, if it is assumed that the second device 112 reads a document created by the first device 111 on May 20, 2014, the indicator 4330 indicating a "second device" may be additionally displayed on a region of the calendar 4311 corresponding to May 20, 2014. If it is assumed that the third device 113 reads a document entitled "kkk.ppt" on May 28, 2014, the indicator 4340 indicating a "third device" may be additionally displayed on a region of the calendar 4311 corresponding to May 28, 2014.

Work history information 4351 and 4352 and an indicator that may output the document on the screen of the device 4310 may be displayed on the screen of the device 4310 according to a user input received through the user input device 16510 as described above with reference to FIG. 38.

FIGS. 44 through 47 illustrate examples of annual calendars 4411, 4511, 4611, and 4711 displayed on screens of devices 4410, 4510, 4610, and 4710 according to an exemplary embodiment.

Figure 44:
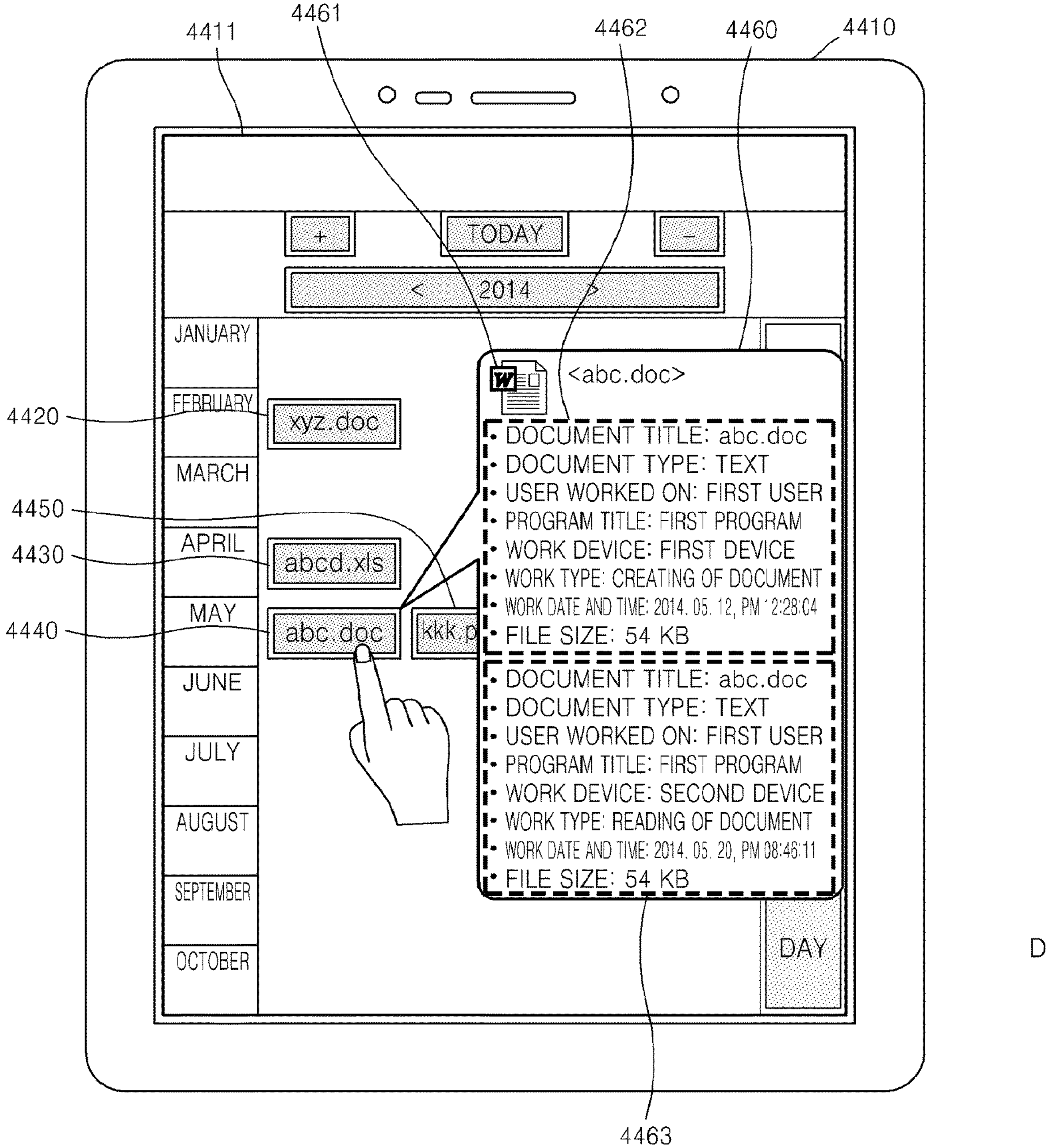
FIGS. 44 through 47 illustrate examples of annual calendars displayed on screens of devices according to an exemplary embodiment.

Referring to FIG. 44, the annual calendar 4411 is output on the screen of the device 4410.

Indicators 4420, 4430, 4440, and 4450 indicating titles of documents may be displayed on the calendar 4411. For example, if it is assumed that the first device 111 creates a document entitled "xyz.doc" on Feb. 12, 2014, the indicator 4420 indicating "xyz.doc" may be displayed on a region of the calendar 4411 corresponding to February of 2014.

If it is assumed that the first device 111 reads a document entitled "abcd.xls" on Apr. 22, 2014, the indicator 4430 indicating "abcd.xls" may be displayed on a region of the calendar 4411 corresponding to April of 2014.

If it is assumed that the first device 111 creates a document entitled "abc.doc" on May 12, 2014, the indicator 4440 indicating "abc.doc" may be displayed on a region of the calendar 4411 corresponding to May of 2014. If it is assumed that the first device 111 creates a document entitled "kkk.ppt" on May 20, 2014, the indicator 4450 indicating "kkk.ppt" may be displayed on a region of the calendar 4411 corresponding to May of 2014.

While "xyz.doc", "abcd.xls", "abc.doc", and "kkk.ppt" are created by the first device 111 in the present example, it is understood that the documents may be created by different devices.

The device 4410 may select the indicators 4420, 4430, 4440, and 4450 indicating the titles of the documents according to a user input received through the user input device 16510. The indicators 4420, 4430, 4440, and 4450 indicating the titles of the documents are selected, the device 4410 may output work history information 4460 of the document on the screen.

For example, it is assumed that the first device 111 stores the document entitled "abc.doc" having a size of 54 KB (kilobytes) at 12:28:04 p.m. on May 12, 2014 by using a first program. It is also assumed, in this example, that the first device 111 reads the document entitled "abc.doc" having the size of 54 KB (kilobytes) at 08:46:11 p.m. on May 20, 2014 by using the first program.

In this case, if the indicator 4440 indicating "abc.doc" is selected, the work history information 4460 including first work history information 4462 and second work history information 4463 may be output. The first work history information 4462 may output at least one of "abc.doc", text, first program, first device, 12:28:04 p.m. on May 12, 2014, and 54 KB. The second work history information 4463 may output at least one of "abc.doc", text, first program, second device, 08:46:11 p.m. on May 20, 2014, and 54 KB. Meanwhile, the device 4410 may output the work history information 4460 of the document on the screen as a popup window, although it is understood that one or more other exemplary embodiments are not limited thereto as described above. For example, the device 4410 may output the work history information 4460 on an entirety of the screen, on a designated region of the screen, etc., in one or more other exemplary embodiments.

An indicator 4461 that may output the document on the screen of the device 4410 may be displayed on the work history information 4460 of the document. For example, when the indicator 4461 that may output the document is selected according to the user input received through the user input device 16510, the device 4410 may output a document created by the first device 111 on the screen as the popup window, although it is understood that one or more other exemplary embodiments are not limited thereto as described above.

Figure 45:
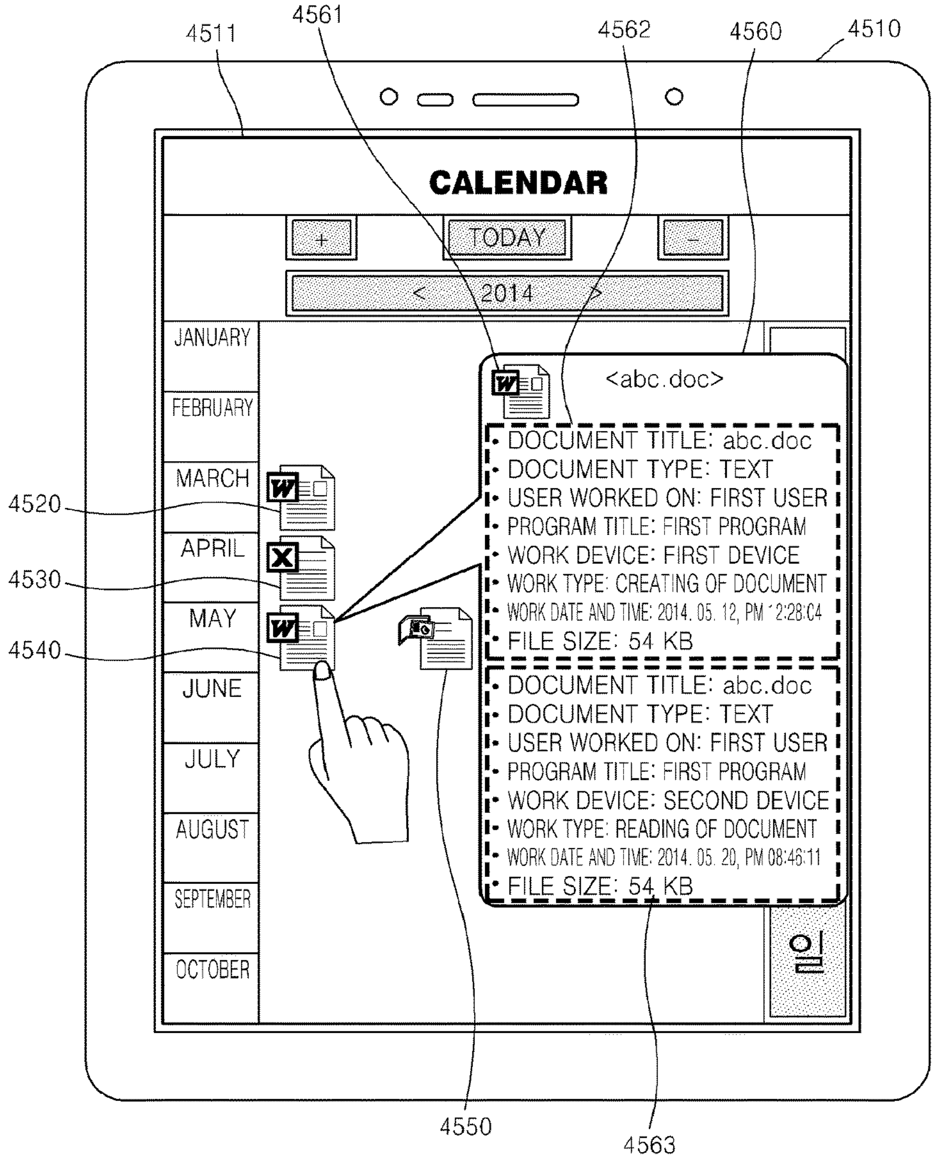

Referring to FIG. 45, the annual calendar 4511 is output on the screen of the device 4510. Indicators 4520, 4530, 4540, and 4550 indicating programs used to work on the document are displayed on the calendar 4511. As described above with reference to FIG. 44, when the indicators 4520, 4530, 4540, and 4550 indicating programs used to work on the document are selected, the device 4510 may output work history information 4560 of the document including first work history information 4562 and second work history information 4563 on the screen. When an indicator 4561 that may output the document is selected on the screen displaying the work history information 4560 of the document, the device 4510 may output the document created by the first device 111 on the screen.

Figure 46:
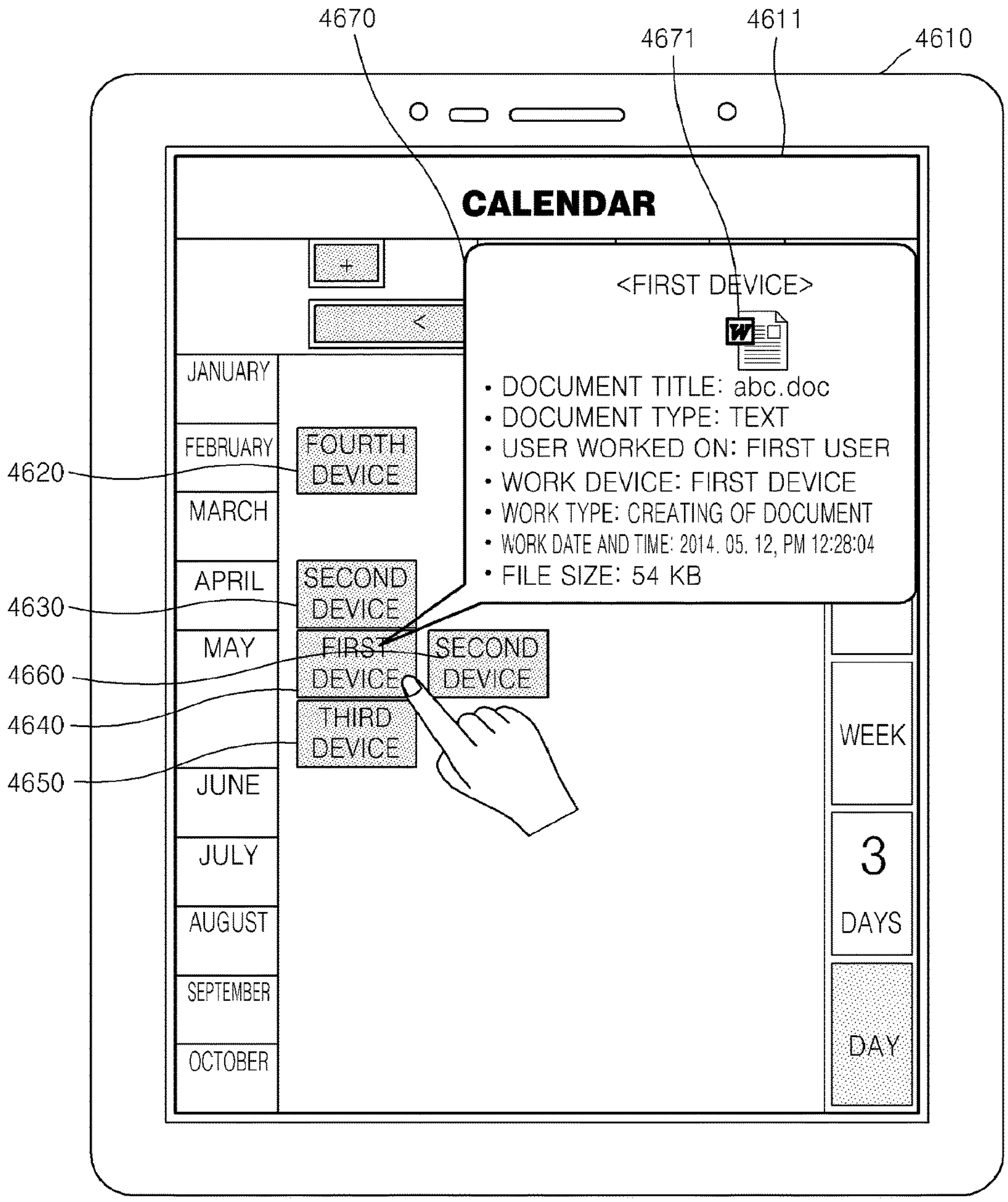

Referring to FIG. 46, the annual calendar 4611 is output on the screen of the device 4610. Indicators 4620, 4630, 4640, and 4650 indicating devices are displayed on the calendar 4611. As described above with reference to FIG. 44, when the indicators 4620, 4630, 4640, and 4650 indicating the devices are selected, the device 4610 may output work history information 4670 of the document on the screen. When an indicator 4671 that may output the document is selected on the screen displaying the work history information 4670 of the document, the device 4610 may output the document created by the first device 111 on the screen.

Figure 47:
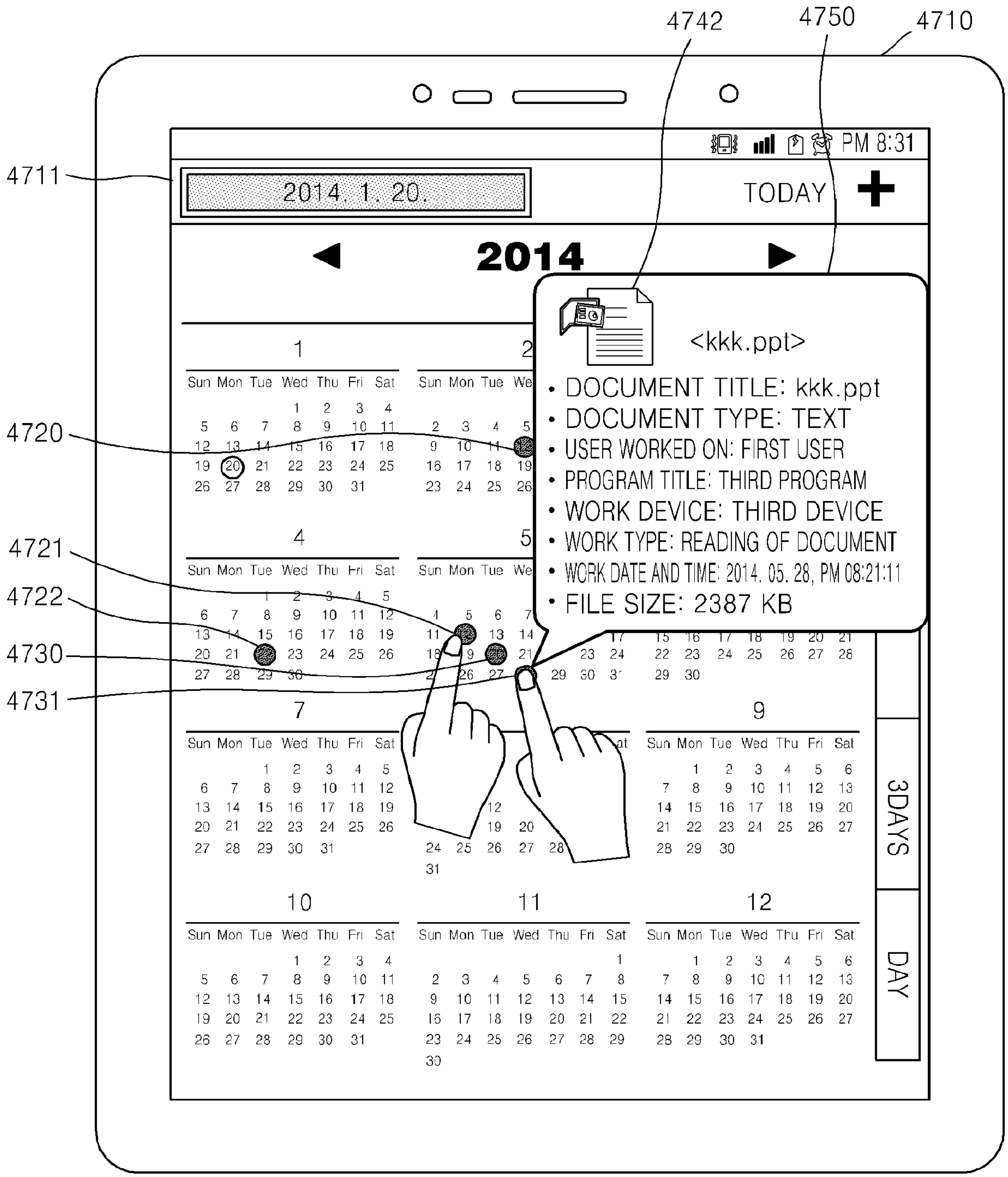

Referring to FIG. 47, the annual calendar 4711 is output on the screen of the device 4710. The annual calendars of FIGS. 44 through 46 include regions displaying months included in a year, whereas the annual calendar 4711 of FIG. 47 includes a region displaying days included in a year. In other words, the device 4710 may modify a type of the annual calendar 4711 in various ways to output the annual calendar 4711 on the screen.

Indicators 4720, 4721, 4722, 4730, and 4731 may be displayed on respective dates of the calendar 4711 on which the document is worked on. For example, if it is assumed that the first device 111 creates a document entitled "xyz.doc" on Feb. 12, 2014, the indicator 4720 indicating "xyz.doc" may be displayed on a region of the calendar 4711 corresponding to the Feb. 12, 2014.

If it is assumed that the first device 111 creates a document entitled "abcd.xls" on Apr. 22, 2014, the indicator 4722 indicating "abcd.xls" may be displayed on a region of the calendar 4711 corresponding to April of 2014.

If it is assumed that the first device 111 creates a document entitled "abc.doc" on May 12, 2014, the indicator 4721 indicating "abc.doc" may be displayed on a region of the calendar 4711 corresponding to May of 2014. If it is assumed that the first device 111 creates a document entitled "kkk.ppt" on May 20, 2014, the indicator 4730 indicating "kkk.ppt" may be displayed on a region of the calendar 4711 corresponding to May of 2014.

While all of "xyz.doc", "abcd.xls", "abc.doc", and "kkk.ppt" are created by the first device 111 in the present example, it is understood that the documents may be created by different devices.

The device 4710 may select the indicators 4720, 4721, 4722, 4730, and 4731 indicating titles of documents according to a user input received through the user input device 16510. For example, it is assumed that the third device 113 reads the document entitled "kkk.ppt" having the size of 54 KB (kilobytes) at 08:21:11 p.m. on May 28, 2014 by using a third program. In this regard, if the indicator 4731 indicating "kkk.ppt" is selected, work history information 4750 may be output. The work history information 4750 may output "kkk.ppt, text, third program, third device, 08:21:11 p.m. on May 28, 2014, and 2387 KB". Meanwhile, the device 4710 may output the work history information 4750 of the document on the screen as a popup window, although it is understood that one or more other exemplary embodiments are not limited thereto as described above.

An indicator 4742 that may output the document is selected on the screen displaying the work history information 4750 of the document, the device 4710 may output the document read by the third device 113 on the screen.

Hereinafter, an example in which when the first device 111 creates a document, and the second device 112 edits the document, the server 100 interworks work history information with a calendar of a user will be described with reference to FIGS. 48A through 65.

Figure 48A:
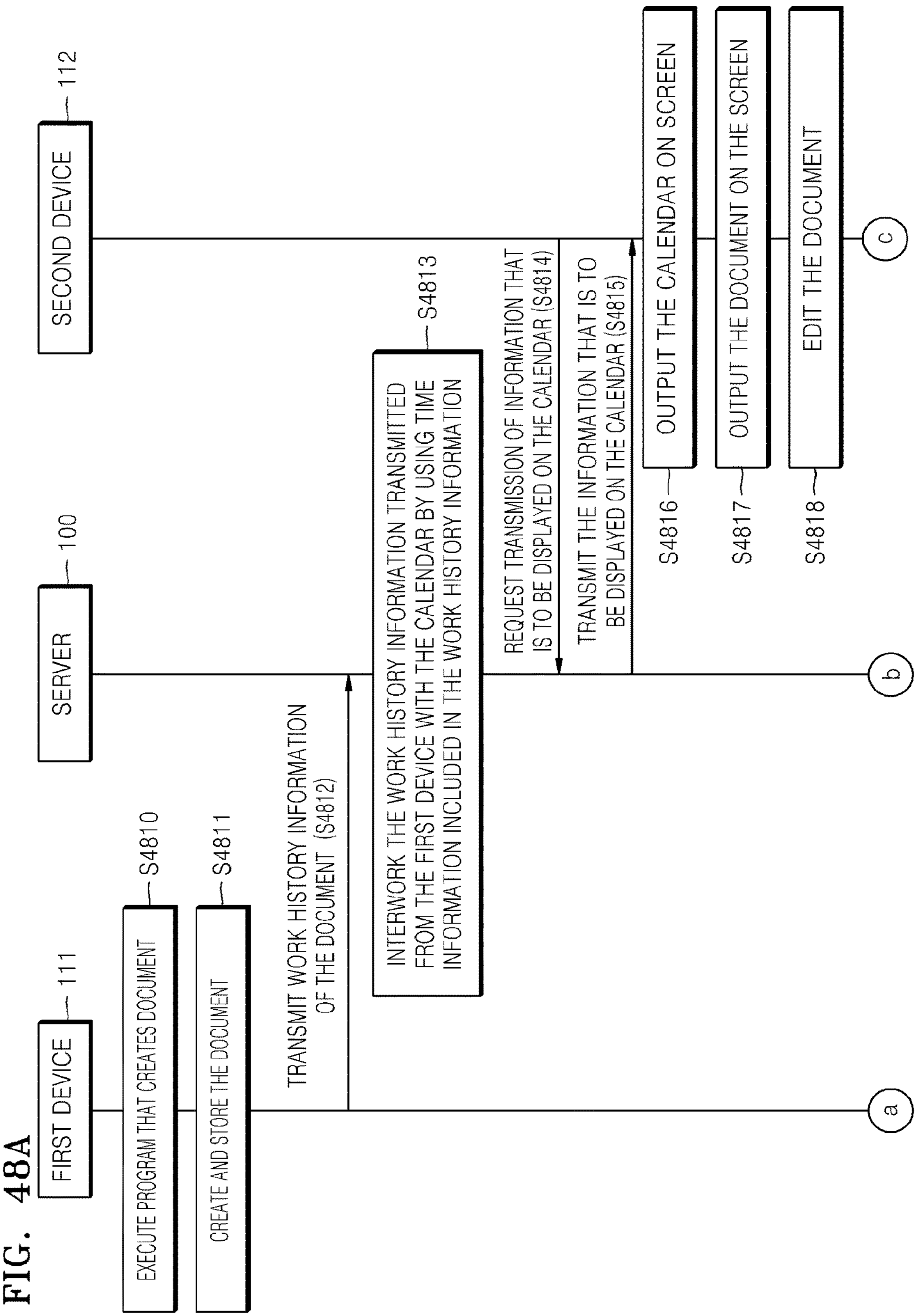
FIGS. 48A and 48B are flowcharts of an example in which when a first device creates a document, and a second device edits the document, a server interworks work history information with a calendar of a user according to an exemplary embodiment.
Figure 48B:
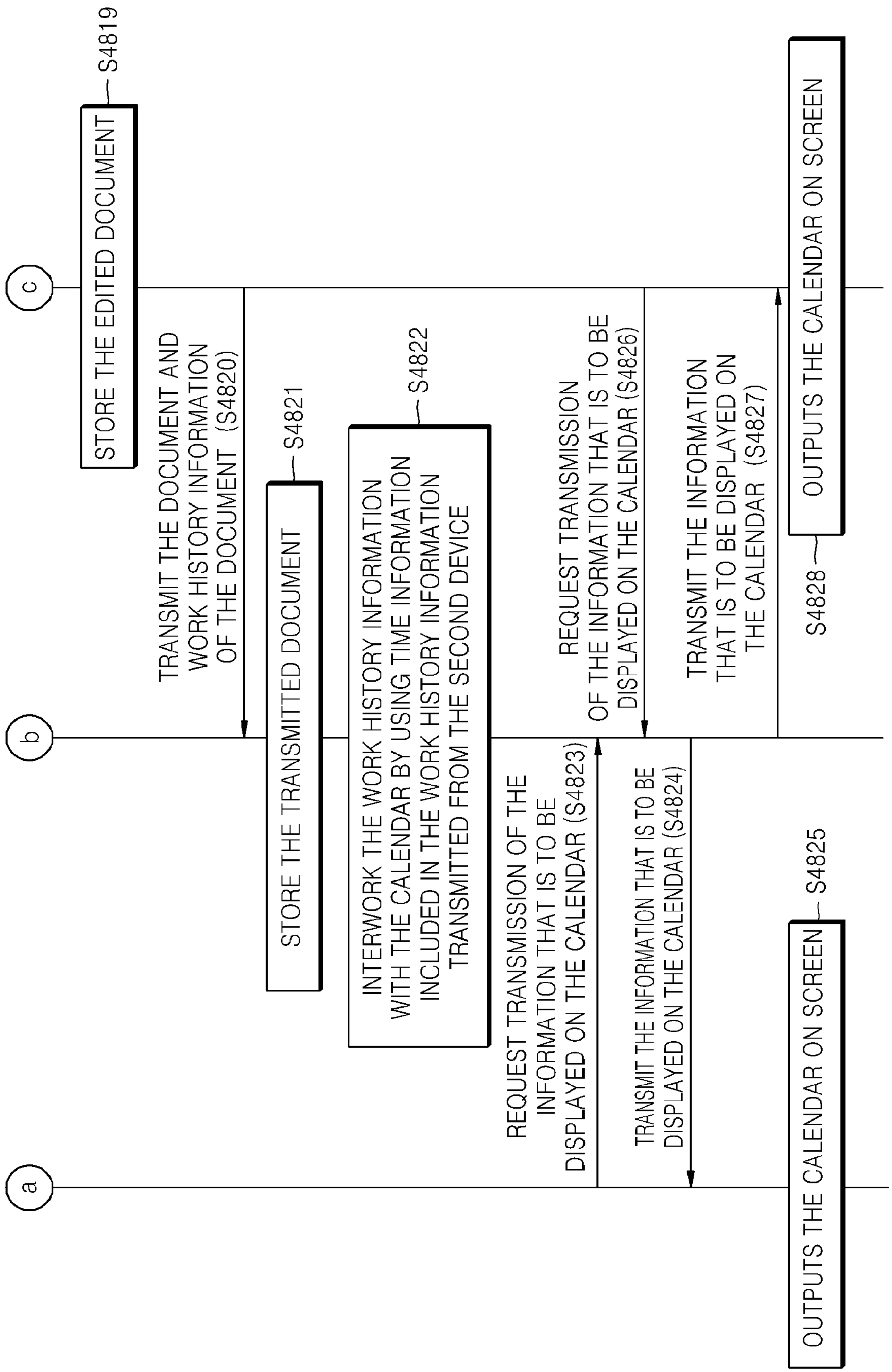

FIGS. 48A and 48B are flowcharts of an example in which when the first device 111 creates a document, and the second device 112 edits the document, the server 100 interworks work history information with a calendar of a user according to an exemplary embodiment.

While the first device 111 creates the document and the second device 112 edits the document in FIGS. 48A and 48B, it is understood that one or more other exemplary embodiments are not limited thereto. For example, according to another exemplary embodiment, the first device 111 may create and edit the document.

There is no limit to the number of devices in various exemplary embodiments. If the number of devices that processes the document is N (where N is greater than or equal to three), operations of the first device 111 or operations of the second device 112 that will be described below may be performed by at least one of the third device 113 through the Nth device 114.

Operations S4810 through S4816 of FIG. 48A correspond to operations S510 through S516. Thus, although omitted below, the descriptions provided above with reference to FIGS. 5 through 25 may apply to descriptions that will be described with reference to operations S4810 through S4816 of FIG. 48A.

In operation S4810, the first device 111 executes a program that creates the document.

In operation S4811, the first device 111 creates the document and stores the created document.

In operation S4812, the first device 111 transmits the work history information of the document to the server 100. For example, the first device 111 may transmit the work history information of the document to the server 100 at the time of storing the document. In this case, it is assumed that the user of the first device 111 logs into the server 100. Also, examples in which the first device 111 transmits the work history information to the server 100 have been described with reference to operation S411 of FIG. 4.

In operation S4813, the server 100 interworks the work history information transmitted from the first device 111 with the calendar by using time information included in the work history information.

In operation S4814, the second device 112 requests the server 100 to transmit information that is to be displayed on the calendar. For example, the second device 112 may request the server 100 to transmit the information that is to be displayed on the calendar after executing a calendar output program installed in the second device 112 and/or authenticating the user by using an input user account.

In operation S4815, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In FIG. 48A, when the second device 112 requests the server 100 to transmit the information that is to be displayed on the calendar in operation S4814, the server 100 transmits the information that is to be displayed on the calendar to the second device 112 in operation S4815, although it is understood that one or more other exemplary embodiments are not limited thereto. According to another exemplary embodiment, although there is no request from the second device 112, the server 100 may transmit (for example, push) the information that is to be displayed on the calendar to the second device 112. For example, if the second device 112 has previously requested the server 100 to transmit the information that is to be displayed on the calendar, the server 100 may automatically transmit the information that is to be displayed on the calendar although there is no request from the second device 112 at a later time. According to another example, the server 100 may automatically transmit the information according to a prior setting or a default setting to automatically transmit the information at predetermined time intervals or predetermined time points.

In operation S4816, the second device 112 outputs the calendar on the screen.

In operation S4817, the second device 112 outputs the document on the screen. As an example, the second device 112 may request the first device 111 to transmit the document and output the document received from the first device 111 on the screen. As another example, the second device 112 may request the server 100 to transmit the document and output the document received from the server 100 on the screen.

In operation S4818, the second device 112 edits the document. Hereinafter, an example in which the second device 112 edits a document will be described with reference to FIGS. 49 and 50.

Figure 49:
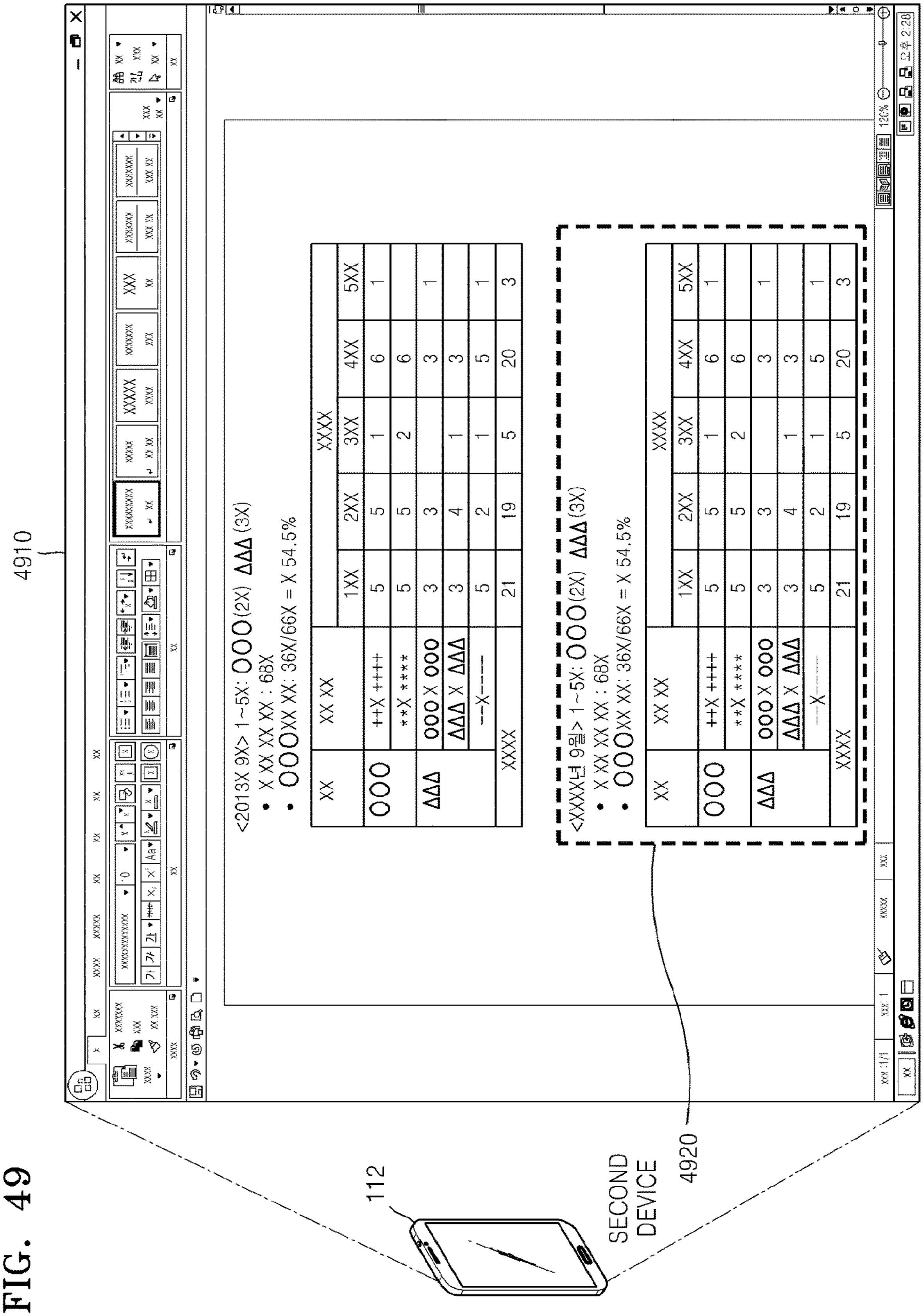
FIGS. 49 and 50 are diagrams for explaining examples in which a second device edits a document according to an exemplary embodiment.
Figure 50:
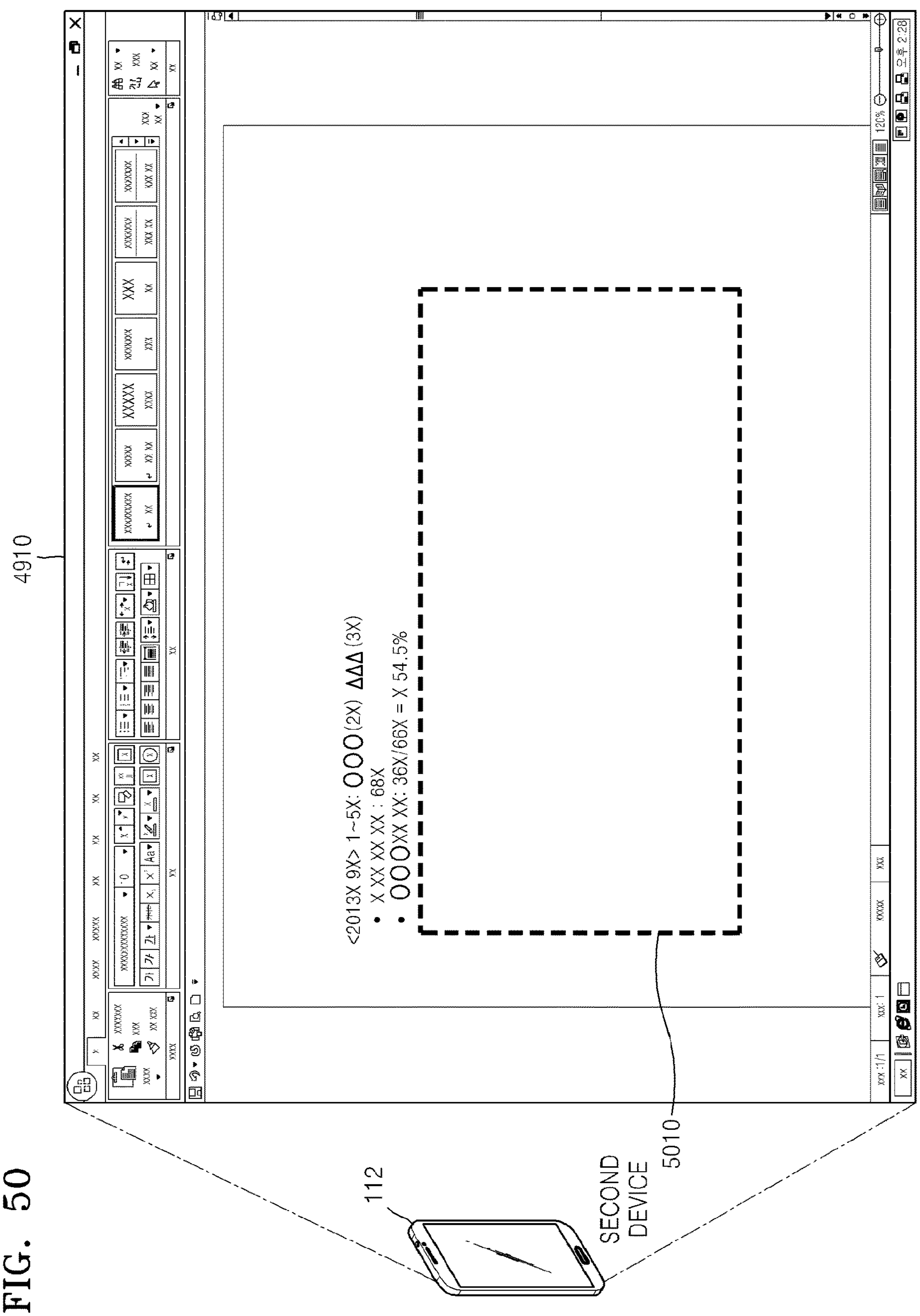

FIGS. 49 and 50 are diagrams for explaining examples in which the second device 112 edits a document according to one or more exemplary embodiments.

Referring to FIGS. 49 and 50, the document received from the first device 111 or the server 100 is output 4910 on a screen of the second device 112. The second device 112 receives a user input that edits the document through the user input device 16510. For example, the user input may be used to add 4920 new content to the document or delete 5010 content of the document partially or wholly. Meanwhile, although not shown, the user input may be used to modify the content of the document partially or wholly.

Referring to FIG. 49, if the second device 112 receives the user input to add the new content to the document, the new content is added 4920 to an output document 4910.

Referring to FIG. 50, if the second device 112 receives the user input to delete the content of the document partially or wholly, the content included in the output document 4910 is partially deleted 5010.

Referring back to FIG. 48B, in operation S4819, the second device 112 stores an edited document.

In operation S4820, the second device 112 transmits the edited and stored document and work history information of the document to the server 100. For example, the second device 112 may transmit the document and the work history information of the document to the server 100 at the time of ending editing of the document (i.e., at the time of storing the document), although it is understood that one or more other exemplary embodiments are not limited thereto as set forth above. Hereinafter, an example in which the second device 112 transmits a document and work history information of the document to the server 100 will now be described with reference to FIG. 51.

Figure 51:
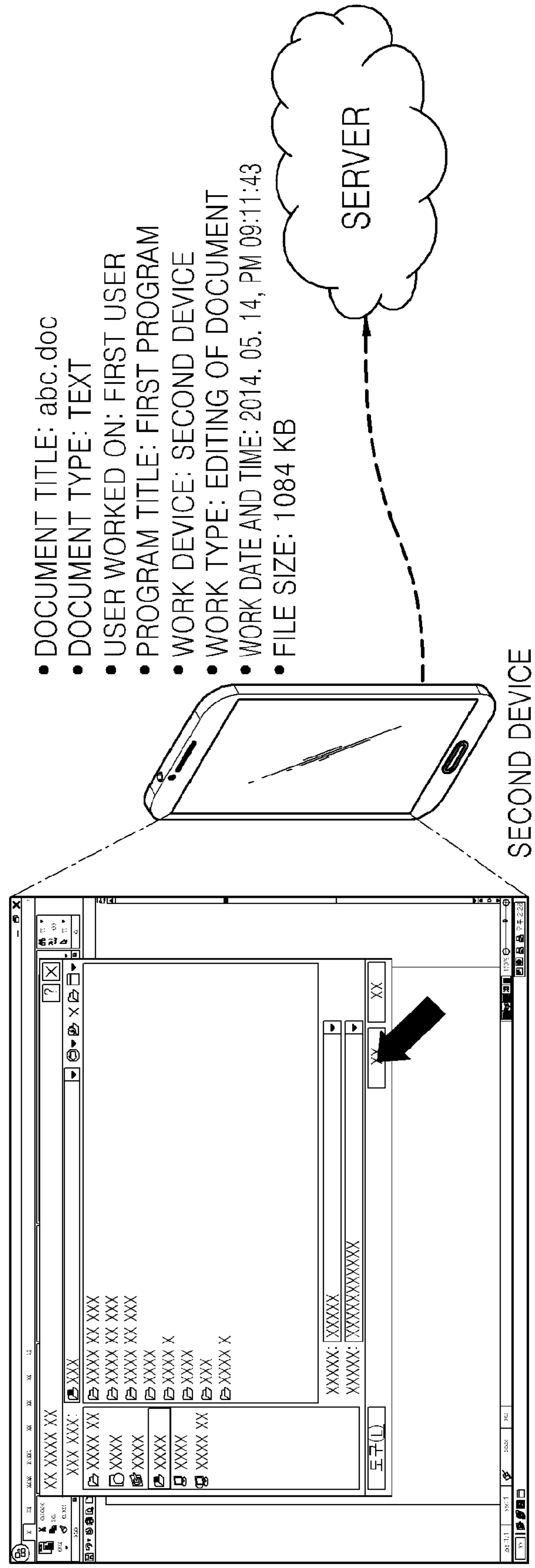
FIG. 51 is a diagram for explaining an example in which a second device transmits a document and work history information of the document to a server according to an exemplary embodiment.

FIG. 51 is a diagram for explaining an example in which the second device 112 transmits a document and work history information of the document to the server 100 according to an exemplary embodiment.

As described with reference to FIGS. 49 and 50, the second device 112 may add new content to the document or partially or wholly modify or delete content of the document if receiving a user input to edit the document. When the second device 112 stores the document after adding the new content to the document or partially or wholly modifying or deleting the content of the document, the second device 112 determines that the document has been edited.

When the document is stored after being edited, the second device 112 transmits the document and the work history information of the document to the server 100. In other words, the second device 112 transmits information generated when editing the document to the server 100.

For example, if the second device 112 executes and edits a document entitled "abc.doc" by using a first program and stores the edited document at 09:11:43 p.m. on May 14, 2014, and a size of the edited and stored document is 1084 KB (kilobytes), the second device 112 may transmit at least one of "abc.doc", text, first program, second device, 09:11:43 p.m. on May 14, 2014, and 1084 KB to the server 100 as the work history information.

The encryption of the work history information which requires a high level of security and transmission of the encrypted work history information to the server 100 have been described with reference to FIG. 7.

Referring back to FIG. 48B, in operation S4821, the server 100 stores the document transmitted from the second device 112.

In operation S4822, the server 100 interworks the work history information with the calendar by using the time information included in the work history information transmitted from the second device 112. For example, the server 100 interworks the work history information received from the first device 111 with the calendar in operation S4813, and additionally interworks the work history information received from the second device 112 with the calendar in operation S4822.

In operation S4823, the first device 111 requests the server 100 to transmit the information that is to be displayed on the calendar. For example, the first device 111 may request the server 100 to transmit work history information that is to be output on the screen of the device when an indicator that is to be displayed on the calendar or an indicator that is displayed on the calendar is selected.

In operation S4824, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed.

In operation S4825, the first device 111 outputs the calendar on the screen.

In FIG. 48B, when the first device 111 requests the server 100 to transmit the information that is to be displayed on the calendar in operation S4823, the server 100 transmits the information that is to be displayed on the calendar to the first device 111 in operation S4824, although it is understood that one or more other exemplary embodiments are not limited thereto. For example, according to another exemplary embodiment, although there is no request from the first device 111, the server 100 may transmit (for example, push) the information that is to be displayed on the calendar to the first device 111, as described above.

Descriptions that will be provided with reference to operations S4826 through S4828 correspond to the descriptions provided above with reference to operations S4823 through S4825, respectively. In other words, the second device 112 requests the server 100 to transmit the information that is to be displayed on the calendar, receives the information that is to be displayed on the calendar from the server 100, and outputs the calendar on the screen. Thus, although omitted below, the descriptions provided above with reference to operations S4823 through S4825 may apply to descriptions that will be described below with reference to operations S4826 through S4828.

In operation S4826, the second device 112 requests the server 100 to transmit the information that is to be displayed on the calendar.

In operation S4827, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In operation S4828, the second device 112 outputs the calendar on the screen.

A specific example of the descriptions provided with reference to FIGS. S4822 through S4828 of FIG. 48B will now be described with reference to FIGS. 52 through 54.

Figure 52:
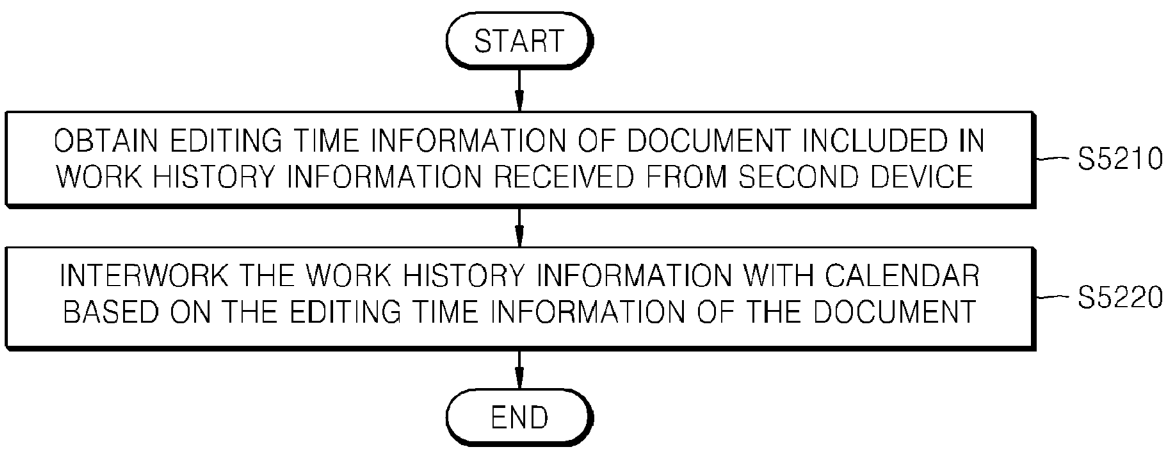
FIG. 52 is a flowchart of an example in which a server interworks work history information of a document with a calendar according to an exemplary embodiment.

FIG. 52 is a flowchart of an example in which the server 100 interworks work history information of a document with a calendar according to an exemplary embodiment.

The flowchart of FIG. 52 corresponds to a detailed flowchart of operation S4822 of FIG. 48B.

In operation S5210, the server 100 obtains editing time information of the document included in the work history information received from the second device 112. For example, the server 100 obtains "May 14, 2014, 09:11:43 p.m." from the work history information received from the second device 112.

Hereinafter, an example of work history information obtained by the server 100 will be described with reference to FIGS. 53 and 54.

FIGS. 53 and 54 are tables illustrating examples of work history information 5310 and 5410, respectively, of a document according to an exemplary embodiment.

The work history information 5310 of the document of FIG. 53 is updated from the work history information 1310 of the document of FIG. 13. In other words, the work history information 1310 of the document of FIG. 13 is generated when a device creates the document. Meanwhile, the work history information 5310 of the document of FIG. 53 is generated by adding new work history information 5320 and 5330 when the device creates the document and at least one of devices edits the created document.

Referring to FIG. 53, the server 100 may arrange the work history information received from the second device 112 according to a title 5311 of the document.

The work history information 5410 of the document of FIG. 54 is updated from the work history information 1410 of the document of FIG. 14. In other words, the work history information 1410 of the document of FIG. 14 is generated when the device creates the document. Meanwhile, the work history information 5410 of the document of FIG. 54 is generated by adding new work history information 5420 and 5430 when the device creates the document and at least one of devices edits the created document.

Referring to FIG. 54, the server 100 may arrange the work history information received from the second device 112 according to a title 5411 of the document.

Referring back to FIG. 52, in operation S5220, the server 100 interworks the work history information with the calendar of the user based on the editing time information of the document. Hereinafter, an example in which the server 100 interworks work history information with a calendar of a user will be described with reference to FIG. 55.

Figure 55:
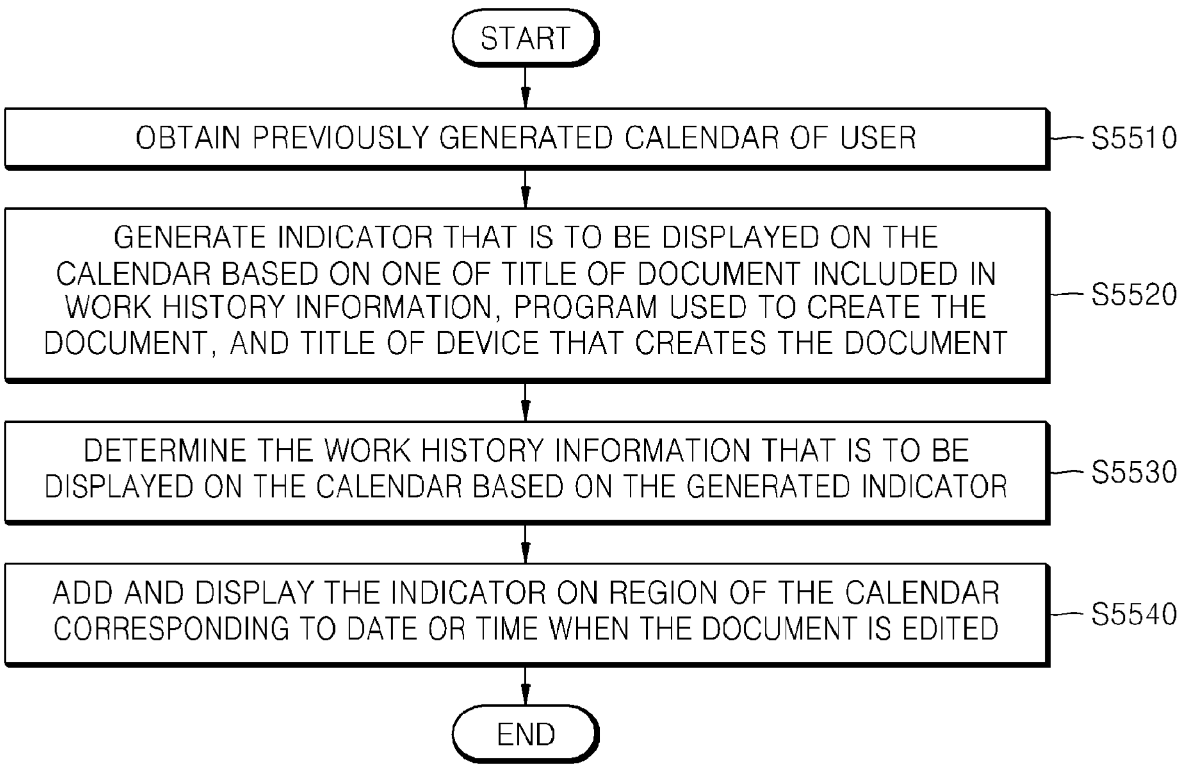
FIG. 55 is a flowchart of an example in which a server interworks work history information with a calendar of a user according to an exemplary embodiment.

FIG. 55 is a flowchart of an example in which the server 100 interworks work history information with a calendar of a user according to an exemplary embodiment.

In operation S5510, the server 100 obtains a previously generated calendar of the user. In this regard, the previously generated calendar of the user may be a calendar generated when the server 100 interworks the work history information transmitted from the first device 111 with the calendar in operation S4813 of FIG. 48A.

In operation S5520, the server 100 generates an indicator that is to be displayed on the calendar based on at least one of a title of a document included in the work history information, a program used to edit the document, and a title of a device that edits the document. In this regard, the work history information is work history information received from the second device 112. For example, the server 100 may determine at least one of the title of the document, the program used to edit the document, and the title of the device that edits the document as an item indicating the indicator and generate the indicator based on the determined item.

In operation S5530, the server 100 determines work history information that is to be displayed on the calendar according to the generated indicator.

In operation S5540, the server 100 adds and displays the indicator to and on a region of the calendar corresponding to a date or time when the document is edited.

Figure 56:
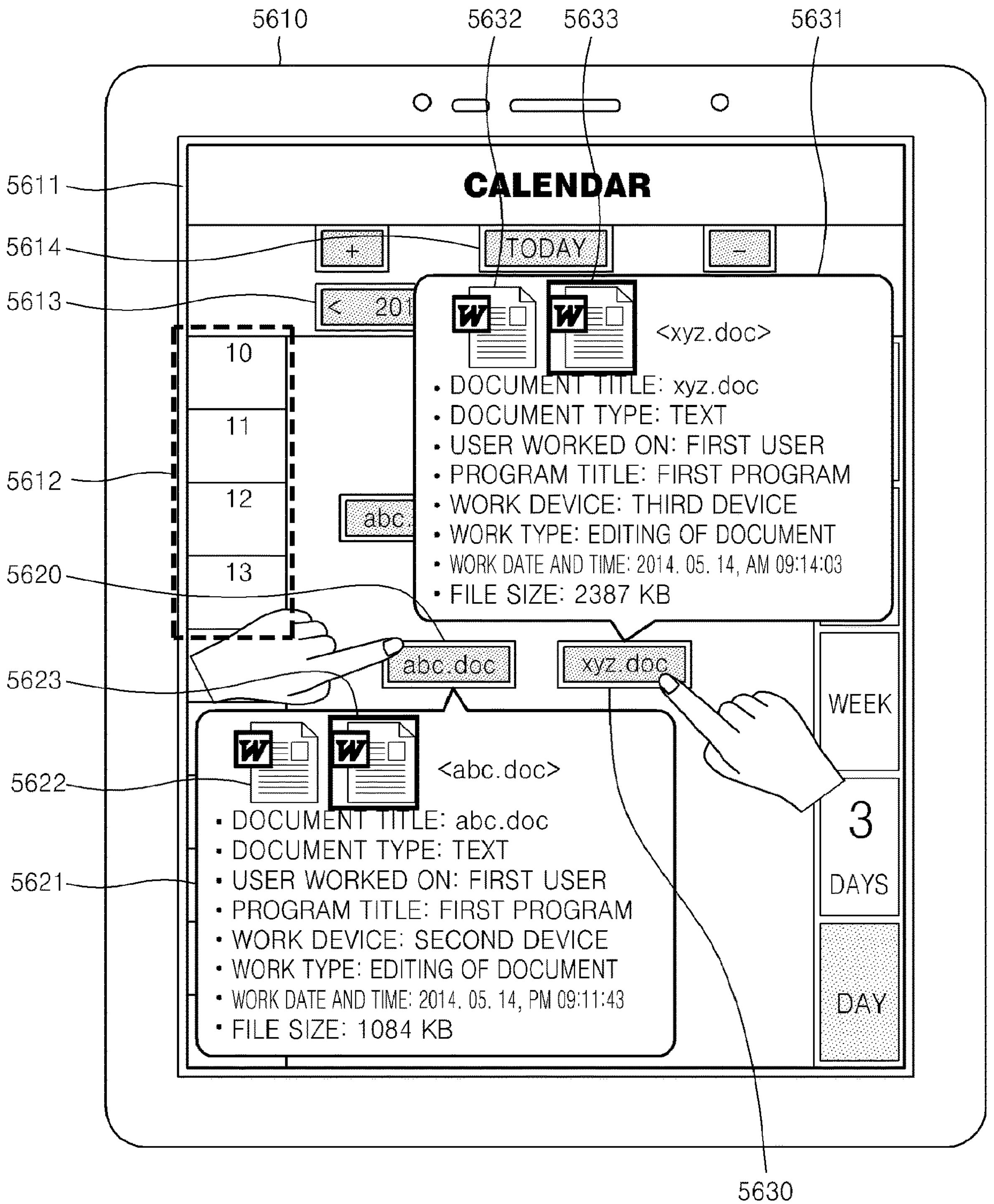
FIG. 56 illustrates an example of a daily calendar displayed on a screen of a device according to an exemplary embodiment.

FIG. 56 illustrates an example of a daily calendar 5611 displayed on a screen of a device 5610 according to an exemplary embodiment.

Referring to FIG. 56, the daily calendar 5611 is output on the screen of the device 5610. The calendar 5611 may include a region 5612 indicating dates and an indicator 5613 that may designate a date desired by a user. The calendar 5611 may also include an indicator 5614 that may display a calendar corresponding to a date "today". In addition to the above-described indicators 5613 and 5614, the calendar 5611 may include an indicator without limitation as long as the user may use the indicator to control a display type of the calendar.

An indicator 5620 indicating a title of a document may be displayed on the calendar 5611. For example, if it is assumed that the first device 111 edits a document entitled "abc.doc" on May 14, 2014, the indicator 5620 indicating "abc.doc" may be displayed on a region of the calendar 5611 corresponding to May 12, 2014.

The device 5610 may select the indicator 5620 indicating "abc.doc" according to a user input received through the user input device 16510. When the indicator 5620 indicating "abc.doc" is selected, the device 5610 may output work history information 5621 of the document on the screen. For example, if it is assumed that the second device 112 edits the document entitled "abc.doc" having a size of 1084 KB (kilobytes) at 09:11:43 p.m. on May 14, 2014 by using a first program, at least one of "abc.doc", text, first program, second device, 09:11:43 p.m. on May 14, 2014, and 1084 KB may be output as the work history information 5621. Meanwhile, the device 5610 may output the work history information 5621 of the document on the screen as a popup window, although it is understood that one or more other exemplary embodiments are not limited thereto as described above. For example, the device 5610 may output the work history information 5621 on an entirety of the screen, on a designated region of the screen, etc., in one or more other exemplary embodiments.

Indicators 5622 and 5623 that may output the document on the screen of the device 5610 may be displayed on the work history information 5621 of the document. The indicator 5622 may indicate an original document at the time of creating the document or a document previous to a current work. The indicator 5623 may indicate a currently editing document.

The indicator 5623 indicating the editing document may be displayed distinguishably from the indicator 5622 indicating the original document or the document previous to the current work. For example, with regard to the indicator 5623 indicating the editing document, a border line may be additionally displayed on the indicator 5622 indicating the original document or the document previous to the current work. For example, when the indicator 5622 or 5623 that may output the document is selected according to the user input received through the user input device 16510, the device 5610 may output the original document or a document edited by the second device 112 on the screen as the popup window separately from the calendar 5611, although it is understood that one or more other exemplary embodiments are not limited thereto as described above.

Likewise, a plurality of indicators indicating titles of documents may be displayed on the single calendar 5611. For example, if it is assumed that the third device 113 edits a document entitled "xyz.doc" on May 12, 2014, an indicator 5630 indicating "xyz.doc" may be displayed on a region of the calendar 5611 corresponding to May 12, 2014.

The device 5610 may select the indicator 5630 indicating "xyz.doc" according to the user input received through the user input device 16510. When the indicator 5630 indicating "xyz.doc" is selected, the device 5610 may output work history information 5631 of the document on the screen. For example, if it is assumed that the third device 113 edits the document entitled "xyz.doc" having a size of 2387 KB (kilobytes) at 09:11:43 a.m. on May 12, 2014 by using a first program, at least one of "xyz.doc", text, first program, third device, 09:11:43 a.m. on May 14, 2014, and 2387 KB may be output as the work history information 5631. Meanwhile, the device 5610 may output the work history information 5631 of the document on the screen as the popup window, although it is understood that one or more other exemplary embodiments are not limited thereto as described above.

Indicators 5632 and 5633 that may output the document on the screen of the device 5610 may be displayed on the work history information 5631 of the document. The indicator 5632 may indicate an original document at the time of creating the document or a document previous to a current work. The indicator 5633 may indicate a currently editing document.

The indicator 5633 indicating the editing document may be displayed distinguishably from the indicator 5632 indicating the original document or the document previous to the current work. For example, with regard to the indicator 5633 indicating the editing document, a border line may be additionally displayed on the indicator 5632 indicating the original document or the document previous to the current work. When the indicator 5632 or 5633 that may output the document is selected according to the user input received through the user input device 16510, the device 5610 may output the original document or a document edited by the third device 113 on the screen as the popup window separately from the calendar 5611, although it is understood that one or more other exemplary embodiments are not limited thereto as described above.

Figure 57:
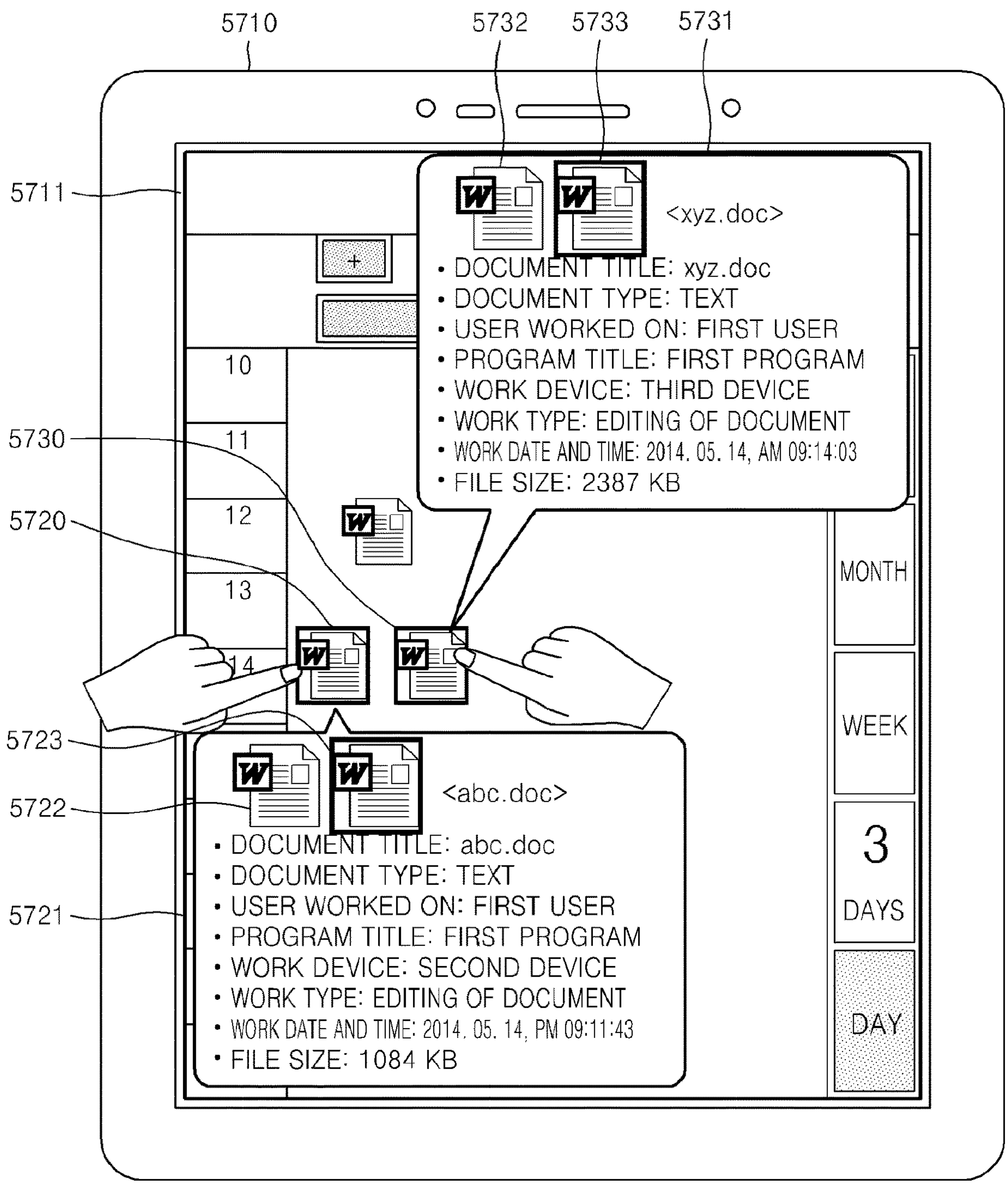
FIG. 57 illustrates another example of a daily calendar displayed on a screen of a device according to an exemplary embodiment.

FIG. 57 illustrates another example of a daily calendar 5711 displayed on a screen of a device 5710 according to an exemplary embodiment.

Referring to FIG. 57, the daily calendar 5711 may be output on the screen of the device 5710. The calendar 5711 of FIG. 57 has the same form as that of the calendar 5611 of FIG. 56. Thus, the descriptions of the indicators provided above with reference to FIG. 56 may apply to indicators that may be displayed on the calendar 5711 of FIG. 57.

An indicator 5720 indicating a program used to work on a document may be displayed on the calendar 5711. For example, if it is assumed that the second device 112 creates a document by using a first program on May 14, 2014, the indicator 5720 indicating the "first program" may be displayed on a region of the calendar 5711 corresponding to May 12, 2014.

The device 5710 may select the indicator 5720 indicating the "first program" according to a user input received through the user input device 16510. When the indicator 5720 indicating the "first program" is selected, the device 5710 may output work history information 5721 of the document on the screen. For example, if it is assumed that the second device 112 edits a document entitled "abc.doc" having a size of 1084 KB (kilobytes) at 09:11:43 p.m. on May 14, 2014 by using the first program, at least one of "abc.doc", text, first program, second device, 09:11:43 p.m. on May 14, 2014, and 1084 KB may be output as the work history information 5721. Meanwhile, the device 5710 may output the work history information 5721 of the document on the screen as a popup window, although it is understood that one or more other exemplary embodiments are not limited thereto as described above.

Indicators 5722 and 5723 that may output the document on the screen of the device 5710 may be displayed on the work history information 5721 of the document. The indicator 5722 may indicate an original document at the time of creating the document or a document previous to a current work. The indicator 5723 may indicate a currently editing document.

The indicator 5723 indicating the editing document may be displayed distinguishably from the indicator 5722 indicating the original document or the document previous to the current work. For example, with regard to the indicator 5723 indicating the editing document, a border line may be additionally displayed on the indicator 5722 indicating the original document or the document previous to the current work. Furthermore, when the indicator 5722 or 5723 that may output the document is selected according to a user input received through the user input device 16510, the device 5710 may output the original document or a document edited by the second device 112 on the screen as the popup window separately from the calendar 5711, although it is understood that one or more other exemplary embodiments are not limited thereto as described above.

Likewise, a plurality of indicators indicating titles of documents may be displayed on the single calendar 5711. For example, if it is assumed that the third device 113 edits a document entitled "xyz.doc" on May 12, 2014, an indicator 5730 indicating the "first program" may be displayed on a region of the calendar 5711 corresponding to May 12, 2014.

The device 5710 may select the indicator 5730 indicating the "first program" according to the user input received through the user input device 16510. When the indicator 5630 indicating the "first program" is selected, the device 5710 may output work history information 5731 of the document on the screen. For example, if it is assumed that the third device 113 edits the document entitled "xyz.doc" having a size of 2384 KB (kilobytes) at 09:14:03 a.m. on May 12, 2014 by using the first program, at least one of "xyz.doc", text, first program, third device, 09:14:03 a.m. on May 12, 2014, and 2387 KB may be output as the work history information 5731. Meanwhile, the device 5710 may output the work history information 5731 of the document on the screen as the popup window, although it is understood that one or more other exemplary embodiments are not limited thereto as described above.

An indicator 5732 that may output the document on the screen of the device 5710 may be displayed on the work history information 5731 of the document. When an indicator 5733 that may output the document is selected according to the user input received through the user input device 16510, the device 5710 may output a document edited by the third device 113 on the screen as the popup window separately from the calendar 5711, although it is understood that one or more other exemplary embodiments are not limited thereto as described above.

Figure 58:
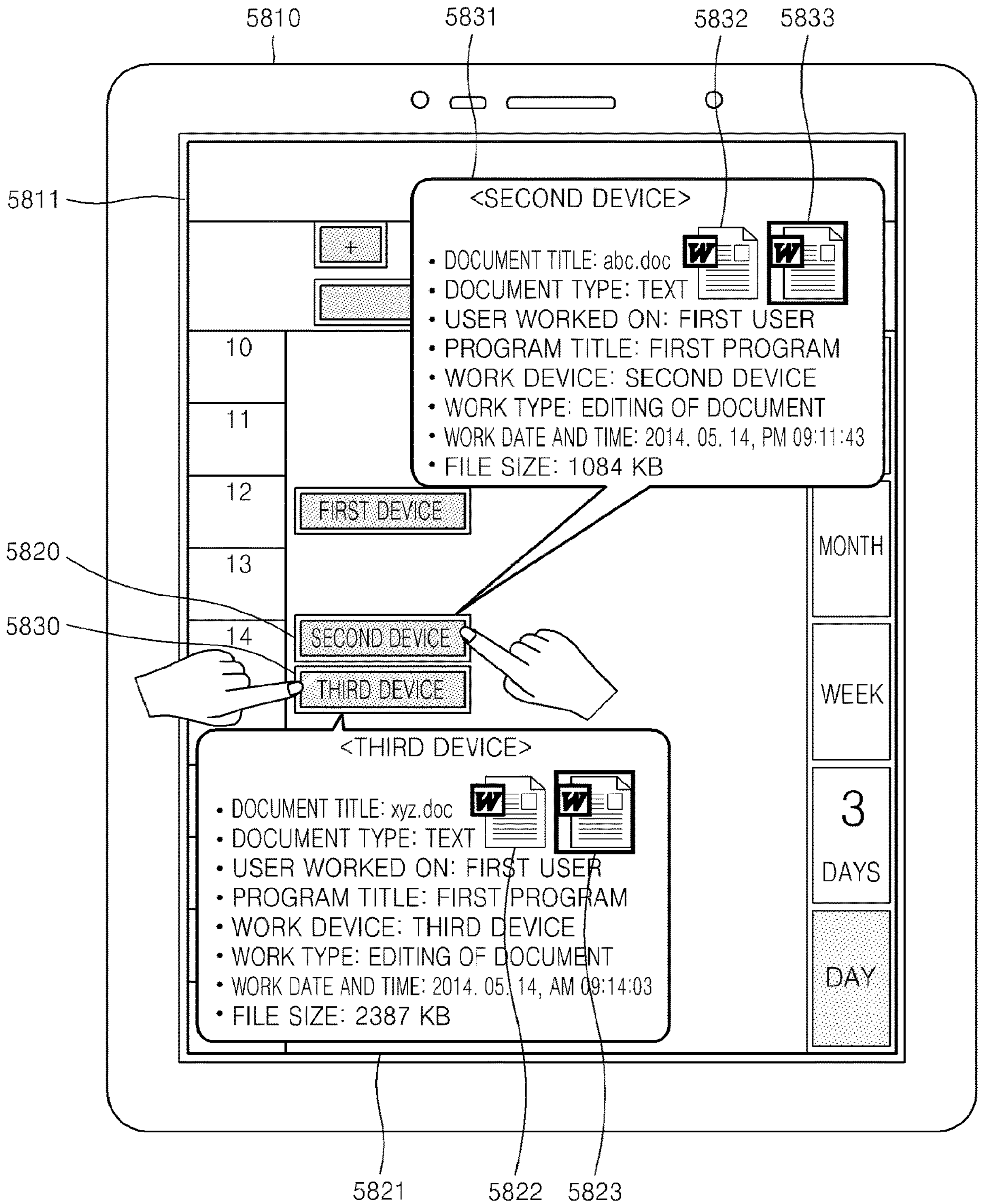
FIG. 58 illustrates another example of a daily calendar displayed on a screen of a device according to an exemplary embodiment.

FIG. 58 illustrates another example of a daily calendar 5811 displayed on a screen of a device 5810 according to an exemplary embodiment.

Referring to FIG. 58, the daily calendar 5811 may be output on the screen of the device 5810. The calendar 5811 of FIG. 58 has the same form as that of the calendar 5611 of FIG. 56. Thus, the descriptions of the indicators provided above with reference to FIG. 56 may apply to indicators that may be displayed on the calendar 5811 of FIG. 58.

An indicator 5820 indicating a title of a device may be displayed on the calendar 5811. For example, if it is assumed that the second device 112 creates a document on May 14, 2014, the indicator 5820 indicating the "second device" may be displayed on a region of the calendar 5811 corresponding to May 12, 2014.

The device 5810 may select the indicator 5820 indicating the "second device" according to a user input received through the user input device 16510. When the indicator 5820 indicating the "second device" is selected, the device 5810 may output work history information 5821 of the document on the screen. For example, if it is assumed that the second device 112 edits a document entitled "abc.doc" having a size of 1084 KB (kilobytes) at 09:11:43 p.m. on May 14, 2014 by using a first program, at least one of "abc.doc", text, first program, second device, 09:11:43 p.m. on May 14, 2014, and 1084 KB may be output as the work history information 5821. Meanwhile, the device 5810 may output the work history information 5821 of the document on the screen as a popup window, although it is understood that one or more other exemplary embodiments are not limited thereto as described above.

Indicators 5822 and 5823 that may output the document on the screen of the device 5810 may be displayed on the work history information 5821 of the document. The indicator 5822 may indicate an original document at the time of creating the document or a document previous to a current work. The indicator 5823 may indicate a currently editing document.

The indicator 5823 indicating the editing document may be displayed distinguishably from the indicator 5822 indicating the original document or the document previous to the current work. For example, with regard to the indicator 5823 indicating the editing document, a border line may be additionally displayed on the indicator 5822 indicating the original document or the document previous to the current work. When the indicator 5822 or 5823 that may output the document is selected according to a user input received through the user input device 16510, the device 5810 may output the original document or a document edited by the second device 112 on the screen as the popup window separately from the calendar 5811, although it is understood that one or more other exemplary embodiments are not limited thereto as described above.

Likewise, a plurality of indicators indicating titles of documents may be displayed on the single calendar 5811. For example, if it is assumed that the third device 113 edits a document entitled "xyz.doc" on May 12, 2014, an indicator 5830 indicating the "third device" may be displayed on a region of the calendar 5811 corresponding to May 12, 2014.

The device 5810 may select the indicator 5830 indicating the "third device" according to the user input received through the user input device 16510. When the indicator 5830 indicating the "third device" is selected, the device 5810 may output work history information 5831 of the document on the screen. For example, if the third device 113 edits the document entitled "xyz.doc" having a size of 2387 KB (kilobytes) at 09:14:03 a.m. on May 12, 2014 by using the first program, at least one of "xyz.doc", text, first program, third device, 09:14:03 a.m. on May 12, 2014, and 2387 KB may be output as the work history information 5831. Meanwhile, the device 5810 may output the work history information 5831 of the document on the screen as the popup window, although it is understood that one or more other exemplary embodiments are not limited thereto as described above.

Indicators 5832 and 5833 that may output the document on the screen of the device 5810 may be displayed on the work history information 5831 of the document. The indicator 5832 may indicate an original document at the time of creating the document or a document previous to a current work. The indicator 5833 may indicate a currently editing document. The indicator 5833 indicating the editing document may be displayed distinguishably from the indicator 5832 indicating the original document or the document previous to the current work. For example, with regard to the indicator 5833 indicating the editing document, a border line may be additionally displayed on the indicator 5832 indicating the original document or the document previous to the current work. When the indicator 5832 or 5833 that may output the document is selected according to the user input received through the user input device 16510, the device 5810 may output the original document or a document edited by the second device 112 on the screen as the popup window separately from the calendar 5811, although it is understood that one or more other exemplary embodiments are not limited thereto as described above.

Figure 59:
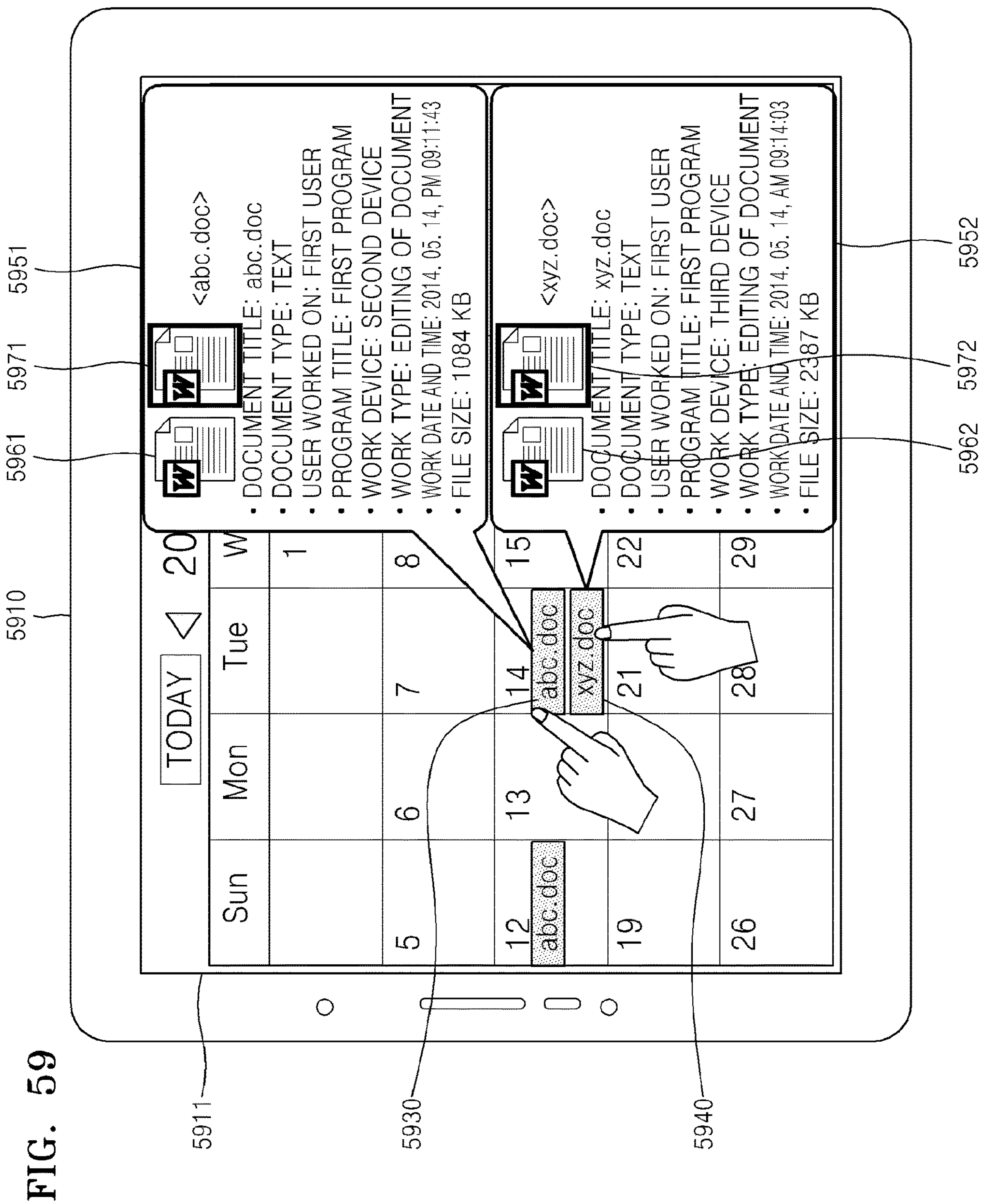
FIG. 59 illustrates an example of a monthly calendar displayed on a screen of a device according to an exemplary embodiment.

FIG. 59 illustrates an example of a monthly calendar 5911 displayed on a screen of a device 5910 according to an exemplary embodiment.

Referring to FIG. 59, the monthly calendar 5911 may be output on the screen of the device 5910. The calendar 5911 of FIG. 59 has the same form as that of the calendar 1920 of FIG. 19. Thus, the descriptions of the indicators provided above with reference to FIG. 19 may apply to objects that may be displayed on the calendar 5911 of FIG. 59.

Indicators 5930 and 5940 indicating titles of documents may be displayed on the calendar 5911. For example, if it is assumed that the second device 112 edits a document entitled "abc.doc" on May 14, 2014, the indicator 5930 indicating "abc.doc" may be displayed on a region of the calendar 5911 corresponding to May 14, 2014. Likewise, if it is assumed that the third device 113 edits a document entitled "xyz.doc" on May 14, 2014, the indicator 5940 indicating "xyz.doc" may be displayed on the region of the calendar 5911 corresponding to May 14, 2014.

The device 5910 may select the indicator 5930 indicating "abc.doc" according to a user input received through the user input device 16510. When the indicator 5930 indicating "abc.doc" is selected, the device 5910 may output work history information 5951 of a document on the screen.

For example, if it is assumed that the second device 112 stores a document entitled "abc.doc" having a size of 1084 KB (kilobytes) at 09:11:43 p.m. on May 14, 2014 by using a first program, at least one of "abc.doc", text, first program, second device, 09:11:43 p.m. on May 14, 2014, and 1084 KB may be output as the work history information 5921. Meanwhile, the device 5910 may output the work history information 5951 of the document on the screen as a popup window, although it is understood that one or more other exemplary embodiments are not limited thereto as described above.

Likewise, the device 5910 may select the indicator 5940 indicating "xyz.doc" according to the user input received through the user input device 16510. When the indicator 5940 indicating "xyz.doc" is selected, the device 5910 may output work history information 5952 of the document on the screen.

For example, if it is assumed that the third device 113 stores a document entitled "xyz.doc" having a size of 2387 KB (kilobytes) at 09:14:03 a.m. on May 14, 2014 by using the first program, at least one of "xyz.doc", text, first program, third device, 09:14:03 a.m. on May 14, 2014, and 2387 KB may be output as the work history information 5952. Meanwhile, the device 5910 may output the work history information 5952 of the document on the screen as the popup window, although it is understood that one or more other exemplary embodiments are not limited thereto as described above.

Indicators 5961 and 5971 that may output the document on the screen of the device 5910 may be displayed on the work history information 5951 of the document. For example, when the indicator 5961 that may output the document is selected according to the user input received through the user input device 16510, the device 5910 may output a document before the document is edited by the second device 112 on the screen as the popup window separately from the calendar 5911. When the indicator 5971 is selected, the device 5910 may output the document edited by the second device 112 on the screen as the popup window separately from the calendar 5911, although it is understood that one or more other exemplary embodiments are not limited thereto as described above.

Likewise, indicators 5962 and 5972 that may output the document on the screen of the device 5910 may be displayed on the work history information 5952 of the document. For example, when the indicator 5962 that may output the document is selected according to the user input received through the user input device 16510, the device 5910 may output a document before the document is edited by the third device 113 on the screen as the popup window separately from the calendar 5911. When the indicator 5972 is selected, the device 5910 may output the document edited by the third device 113 on the screen as the popup window separately from the calendar 5911, although it is understood that one or more other exemplary embodiments are not limited thereto as described above.

Figure 60:
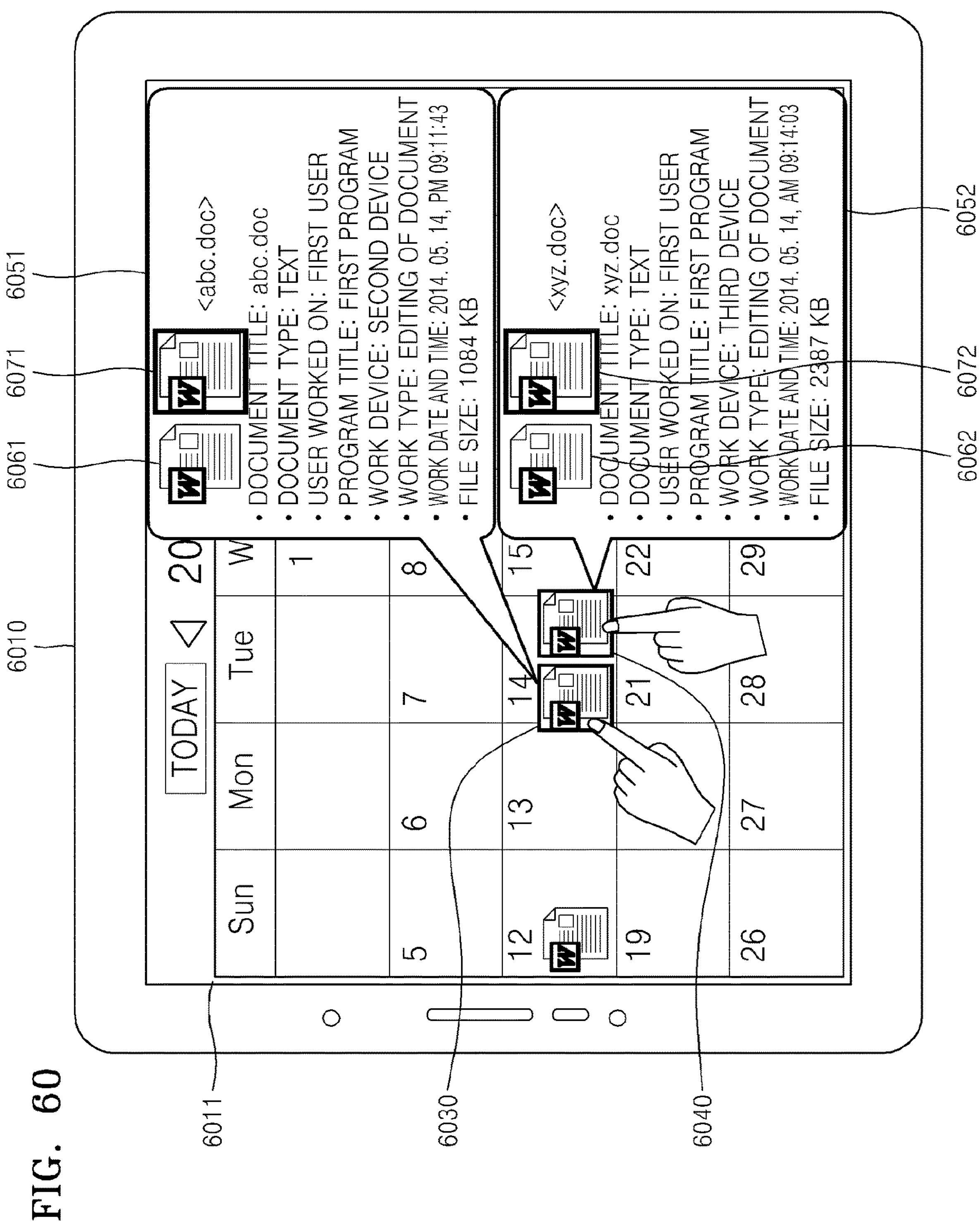
FIG. 60 illustrates another example of a monthly calendar displayed on a screen of a device according to an exemplary embodiment.

FIG. 60 illustrates another example of a monthly calendar 6011 displayed on a screen of a device 6010 according to an exemplary embodiment.

Referring to FIG. 60, the monthly calendar 6011 may be output on the screen of the device 5010. The calendar 6011 of FIG. 60 has the same form as that of the calendar 1920 of FIG. 19. Thus, the descriptions of the indicators provided above with reference to FIG. 19 may apply to objects that may be displayed on the calendar 6011 of FIG. 60.

Indicators 6030 and 6040 indicating programs used to work on a document may be displayed on the calendar 6011. For example, if it is assumed that the second device 112 edits a document on May 14, 2014 by using a first program, the indicator 6030 indicating the "first program" may be displayed on a region of the calendar 6011 corresponding to May 14, 2014. Likewise, if it is assumed that the third device 113 edits the document on May 14, 2014 by using the first program, the indicator 6040 indicating the "first program" may be displayed on the region of the calendar 6011 corresponding to May 14, 2014.

The device 6010 may select the indicator 6030 indicating the "first program" according to a user input received through the user input device 16510. When the indicator 6030 indicating the "first program" is selected, the device 6010 may output work history information 6051 of the document on the screen. For example, if it is assumed that the second device 112 stores a document entitled "abc.doc" having a size of 1084 KB (kilobytes) at 09:11:43 p.m. on May 14, 2014 by using the first program, at least one of "abc.doc", text, first program, second device, 09:11:43 p.m. on May 14, 2014, and 1084 KB may be output as the work history information 6051. Meanwhile, the device 6010 may output the work history information 6051 of the document on the screen as a popup window, although it is understood that one or more other exemplary embodiments are not limited thereto as described above.

Likewise, the device 6010 may select the indicator 6040 indicating the "first program" according to the user input received through the user input device 16510. When the indicator 6040 indicating the "first program" is selected, the device 6010 may output work history information 6052 of the document on the screen. For example, if it is assumed that the third device 113 stores a document entitled "xyz.doc" having a size of 2387 KB (kilobytes) at 09:14:03 a.m. on May 14, 2014 by using the first program, at least one of "xyz.doc", text, first program, third device, 09:14:03 a.m. on May 14, 2014, and 2387 KB may be output as the work history information 6052. Meanwhile, the device 6052 may output the work history information 6052 of the document on the screen as the popup window, although it is understood that one or more other exemplary embodiments are not limited thereto as described above.

Indicators 6061 and 6071 that may output the document on the screen of the device 6010 may be displayed on the work history information 6051 of the document. For example, when the indicator 6061 that may output the document is selected according to a user input received through the user input device 16510, the device 6010 may output a document before the document is edited by the second device 112 on the screen as the popup window separately from the calendar 6011. When the indicator 5971 is selected, the device 5910 may output the document edited by the second device 112 on the screen as the popup window separately from the calendar 6011, although it is understood that one or more other exemplary embodiments are not limited thereto as described above.

Likewise, indicators 6062 and 6072 that may output the document on the screen of the device 6010 may be displayed on the work history information 6052 of the document. For example, when the indicator 6062 that may output the document is selected according to a user input received through the user input device 16510, the device 6010 may output a document before the document is edited by the third device 113 on the screen as the popup window separately from the calendar 6011. When the indicator 6072 is selected, the device 6010 may output the document edited by the third device 113 on the screen as the popup window separately from the calendar 6011, although it is understood that one or more other exemplary embodiments are not limited thereto as described above.

Figure 61:
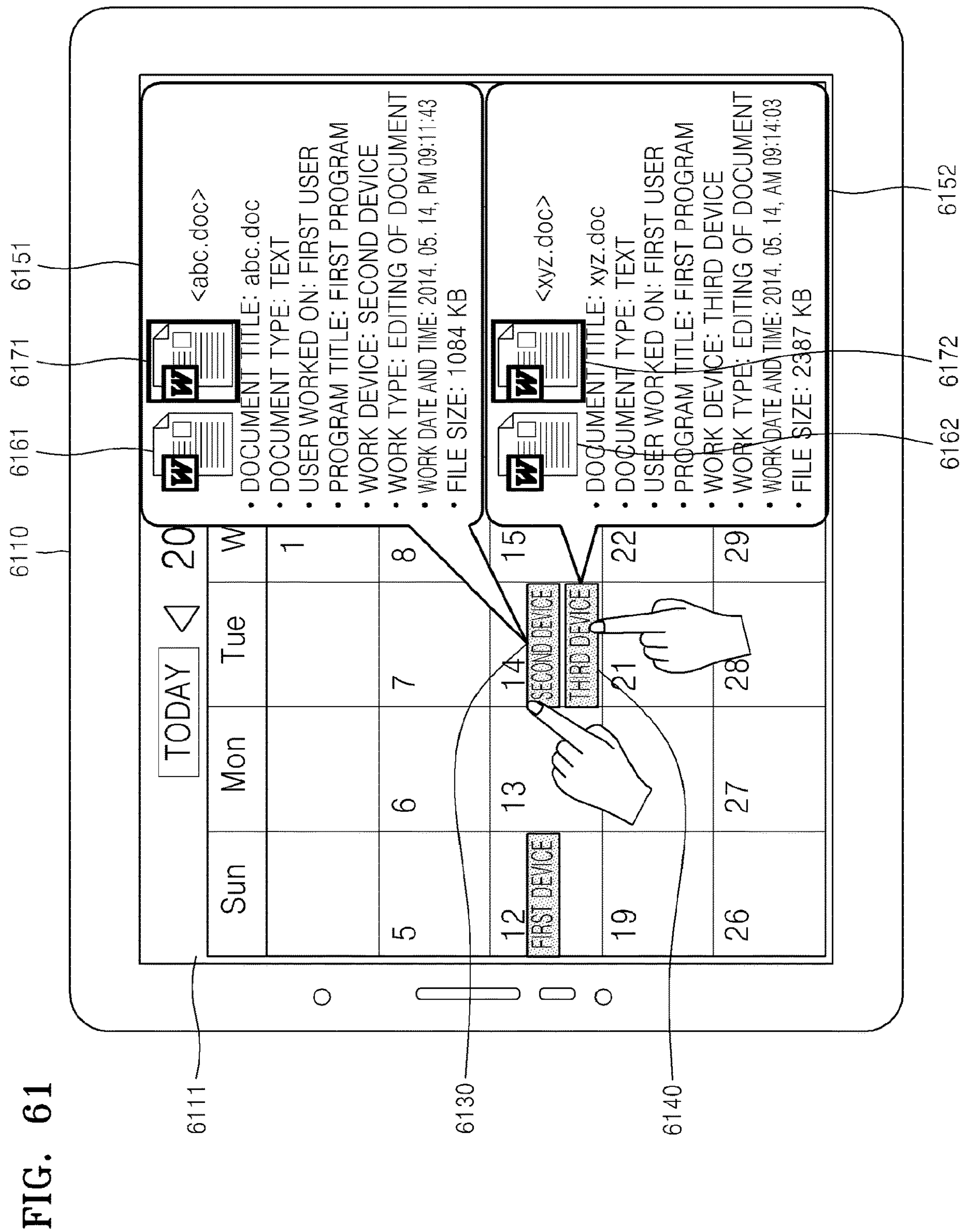
FIG. 61 illustrates another example of a monthly calendar displayed on a screen of a device according to an exemplary embodiment.

FIG. 61 illustrates another example of a monthly calendar 6111 displayed on a screen of a device 6110 according to an exemplary embodiment.

Referring to FIG. 61, the monthly calendar 6111 may be output on the screen of the device 5110. The calendar 6111 of FIG. 61 has the same form as that of the calendar 1920 of FIG. 19. Thus, the descriptions of the indicators provided above with reference to FIG. 19 may apply to objects that may be displayed on the calendar 6111 of FIG. 61.

Indicators 6130 and 6140 indicating titles of devices may be displayed on the calendar 6111. For example, if it is assumed that the second device 112 edits a document on May 14, 2014, the indicator 6130 indicating the "second device" may be displayed on a region of the calendar 6111 corresponding to May 14, 2014. Likewise, if it is assumed that the third device 113 edits the document on May 14, 2014, the indicator 6140 indicating the "third device" may be displayed on the region of the calendar 6111 corresponding to May 14, 2014.

The device 6110 may select the indicator 6130 indicating the "second device" according to a user input received through the user input device 16510. When the indicator 6130 indicating the "second device" is selected, the device 6110 may output work history information 6151 of the document on the screen. For example, if it is assumed that the second device 112 stores a document entitled "abc.doc" having a size of 1084 KB (kilobytes) at 09:11:43 p.m. on May 14, 2014 by using the first program, at least one of "abc.doc", text, first program, second device, 09:11:43 p.m. on May 14, 2014, and 1084 KB may be output as the work history information 6151. Meanwhile, the device 6110 may output the work history information 6151 of the document on the screen as a popup window, although it is understood that one or more other exemplary embodiments are not limited thereto as described above.

Likewise, the device 6110 may select the indicator 6140 indicating a "third device" according to the user input received through the user input device 16510. When the indicator 6140 indicating the "third device" is selected, the device 6110 may output work history information 6152 of the document on the screen. For example, if it is assumed that the third device 113 stores a document entitled "xyz.doc" having a size of 2387 KB (kilobytes) at 09:14:03 a.m. on May 14, 2014 by using the first program, at least one of "xyz.doc", text, first program, third device, 09:14:03 a.m. on May 14, 2014, and 2387 KB may be output as the work history information 6152. Meanwhile, the device 6152 may output the work history information 6152 of the document on the screen as the popup window, although it is understood that one or more other exemplary embodiments are not limited thereto as described above.

Indicators 6161 and 6171 that may output the document on the screen of the device 6110 may be displayed on the work history information 6151 of the document. For example, when the indicator 6161 that may output the document is selected according to the user input received through the user input device 16510, the device 6110 may output a document before the document is edited by the second device 112 on the screen as the popup window separately from the calendar 6111. When the indicator 6171 is selected, the device 6110 may output the document edited by the second device 112 on the screen as the popup window separately from the calendar 6111, although it is understood that one or more other exemplary embodiments are not limited thereto as described above.

Likewise, indicators 6162 and 6172 that may output the document on the screen of the device 6110 may be displayed on the work history information 6152 of the document. For example, when the indicator 6162 that may output the document is selected according to the user input received through the user input device 16510, the device 6110 may output a document before the document is edited by the third device 113 on the screen as the popup window separately from the calendar 6111. When the indicator 6172 is selected, the device 6110 may output the document edited by the third device 113 on the screen as the popup window separately from the calendar 6111, although it is understood that one or more other exemplary embodiments are not limited thereto as described above.

Figure 62:
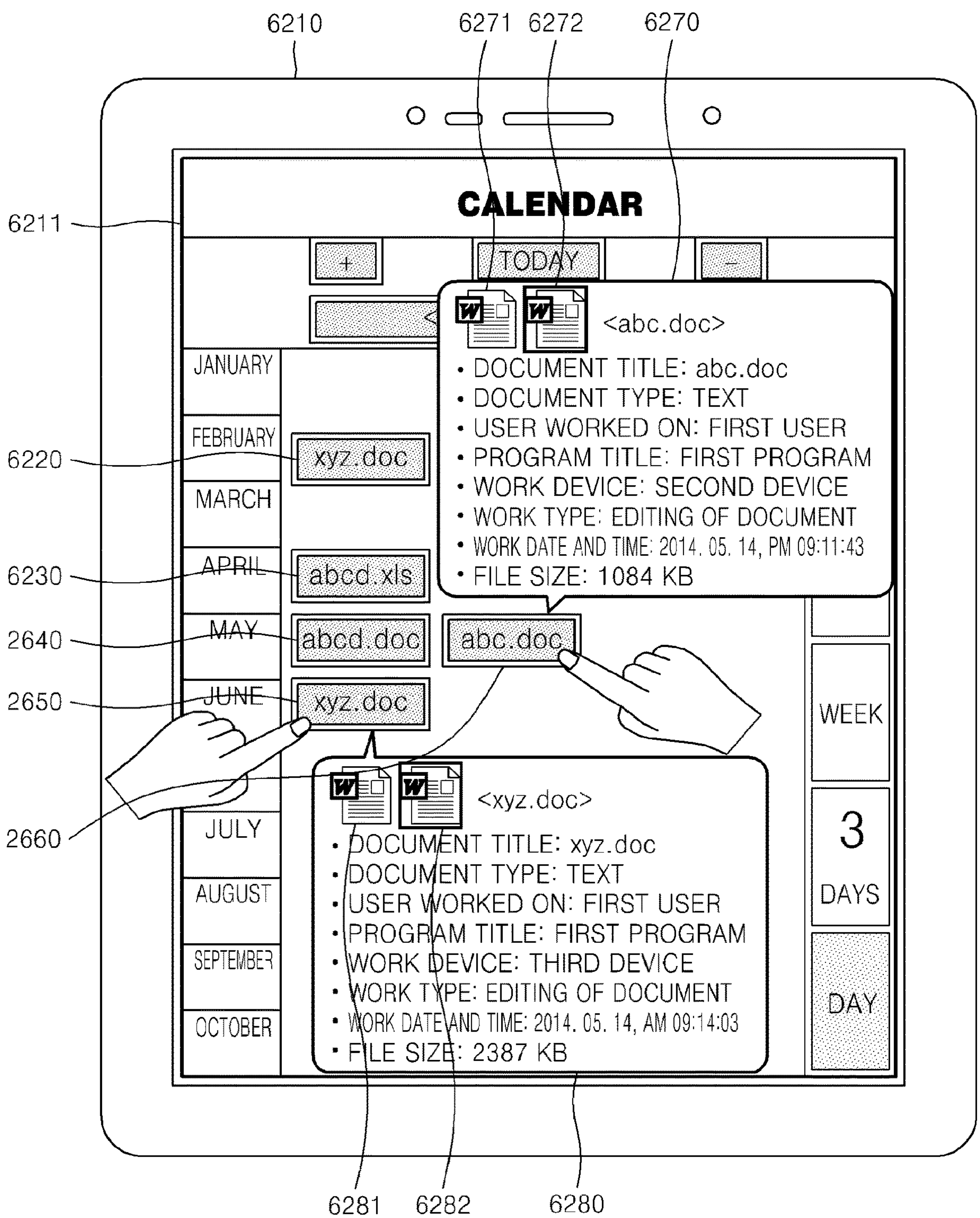
FIG. 62 illustrates an example of an annual calendar displayed on a screen of a device according to an exemplary embodiment.

FIG. 62 illustrates an example of an annual calendar 6211 displayed on a screen of a device 6210 according to an exemplary embodiment.

Referring to FIG. 62, the annual calendar 6211 may be output on the screen of the device 6210. Indicators 6220, 6230, 6240, 6250, and 6260 indicating titles of documents may be displayed on the calendar 6211. For example, if it is assumed that the third device 113 edits a document entitled "xyz.doc" on May 12, 2014, the indicator 6250 indicating "xyz.doc" may be displayed on a region of the calendar 6211 corresponding to May of 2014. If it is assumed that the second device 112 edits a document entitled "abc.doc" on May 14, 2014, the indicator 6260 indicating "abc.doc" may be displayed on the region of the calendar corresponding to May of 2014.

The device 6210 may select the indicators 6220, 6230, 6240, 6250, and 6260 indicating the titles of the documents according to a user input received through the user input device 16510. If the indicators 6220, 6230, 6240, 6250, and 6260 indicating the titles of the documents are selected, the device 6210 may output work history information 6270 and 6280 of the documents. For example, it is assumed that the third device 113 edits a document entitled "xyz.doc" having a size of 2387 KB (kilobytes) at 09:14:03 a.m. on May 12, 2014 by using a first program. In this regard, if the indicator 6250 indicating "xyz.doc" is selected, at least one of "xyz.doc", text, first program, third device, 09:14:03 a.m. on May 12, 2014, and 2387 KB may be output as the work history information 6280. For example, it is assumed that the second device 112 edits the document entitled "abc.doc" having a size of 1084 KB (kilobytes) at 09:11:43 p.m. on May 14, 2014 by using the first program. In this regard, if the indicator 6260 indicating "abc.doc" is selected, at least one of "abc.doc", text, first program, second device, 09:11:43 p.m. on May 14, 2014, and 1084 KB may be output as the work history information 6270. Meanwhile, the device 6210 may output the work history information 6270 and 6280 of the documents on the screen as popup windows, although it is understood that one or more other exemplary embodiments are not limited thereto as described above.

Indicators 6271, 6272, 6281, and 6282 that may output the documents on the screen of the device 6210 may be displayed on the work history information 6270 and 6280 of the documents. The indicator 6271 may be an indicator that may output an original document of "abc.doc" on the screen of the device 6210. The indicator 6281 may be an indicator that may output an original document of "xyz.doc" on the screen of the device 6210. The indicator 6272 may be an indicator that may output an edited document of "abc.doc" on the screen of the device 6210. The indicator 6282 may be an indicator that may output an edited document of "xyz.doc" on the screen of the device 6210. For example, when the indicator 6272 that may output the document is selected according to a user input received through the user input device 16510, the device 6210 may output the document "abc.doc" edited by the second device 112 on the screen as a popup window, although it is understood that one or more other exemplary embodiments are not limited thereto as described above.

Figure 63:
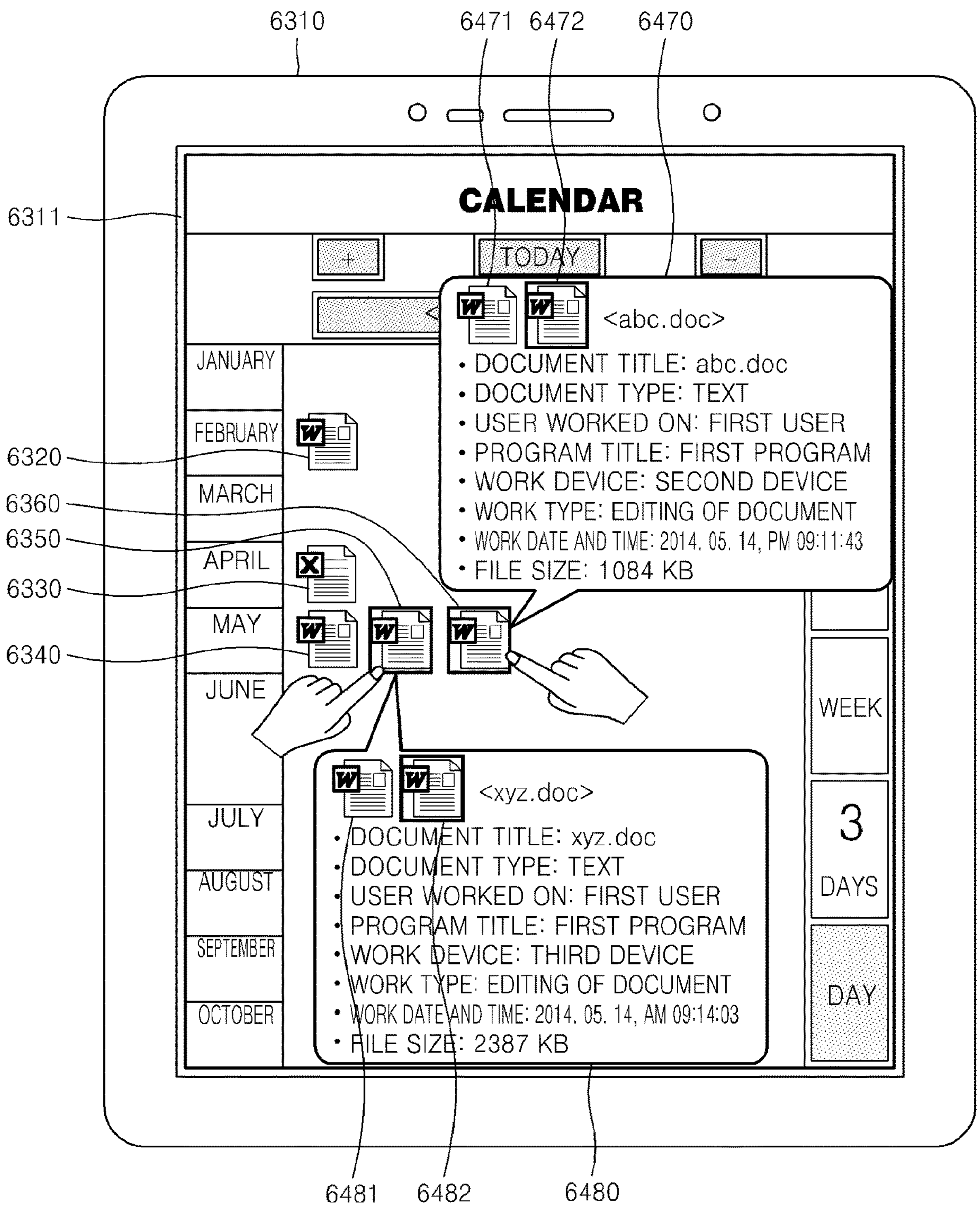
FIG. 63 illustrates another example of an annual calendar displayed on a screen of a device according to an exemplary embodiment.

FIG. 63 illustrates another example of an annual calendar 6311 displayed on a screen of a device 6310 according to an exemplary embodiment.

Referring to FIG. 63, the annual calendar 6311 may be output on the screen of the device 6310. Indicators 6320, 6330, 6340, 6350, and 6360 indicating programs used to work on a document may be displayed on the calendar 6311. As described above with reference to FIGS. 57 and 60, when the indicators 6350 and 6360 indicating the programs used to work on the document are selected, the device 6310 may output work history information 6370 and 6380 of documents on the screen. When indicators 6471, 6472, 6481, and 6482 that may output the documents are selected on the screen displaying the work history information 6370 and 6380 of documents, the documents indicated by the corresponding indicators may be output. For example, when the indicator 6472 is selected, the device 6310 may output a document "abc.doc" edited by the second device 112 on the screen.

Figure 64:
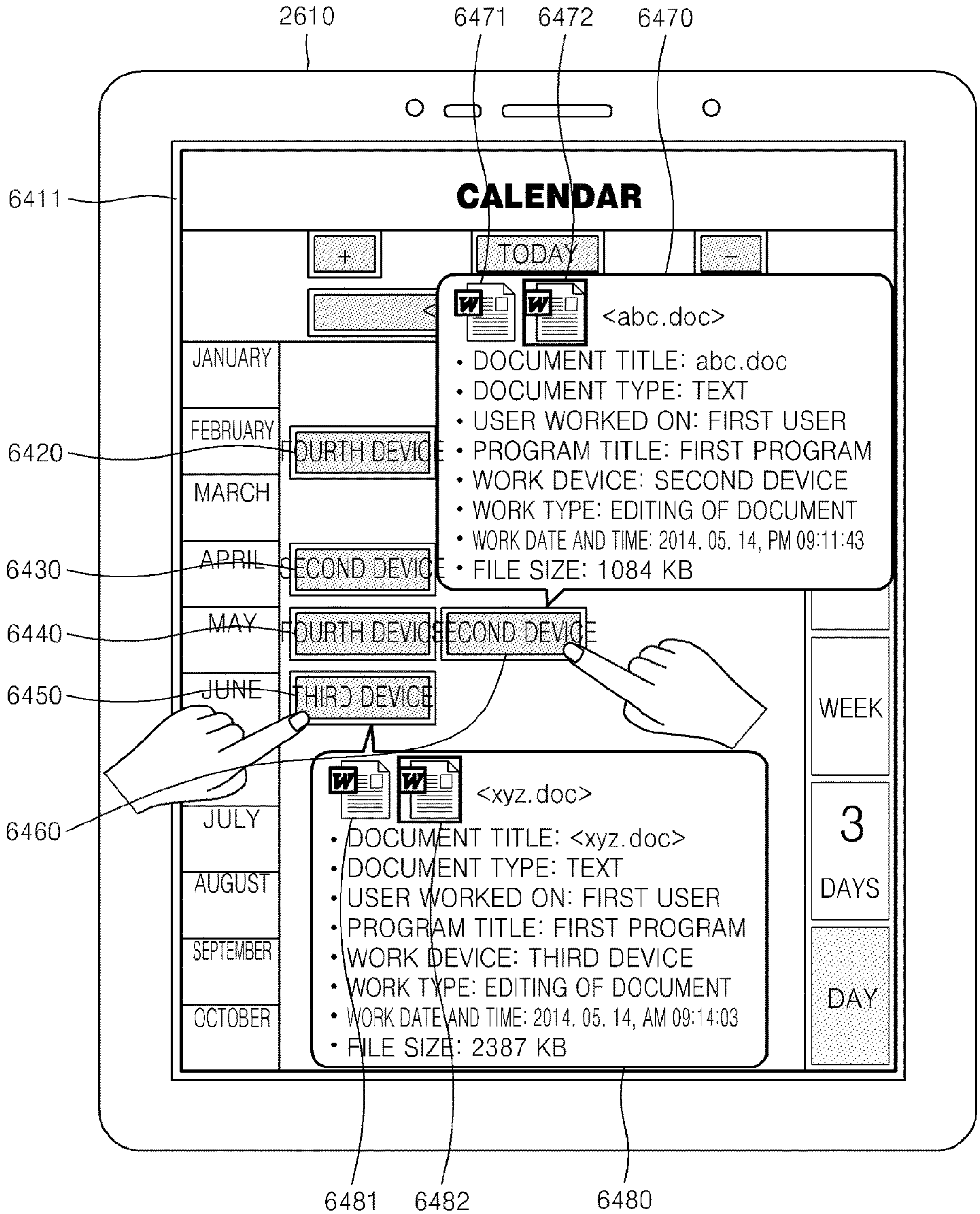
FIG. 64 illustrates another example of an annual calendar displayed on a screen of a device according to an exemplary embodiment.

FIG. 64 illustrates another example of an annual calendar 6411 displayed on a screen of a device 6400 according to an exemplary embodiment.

Referring to FIG. 64, the annual calendar 6411 may be output on the screen of the device 6410. Indicators 6420, 6430, 6440, 6450, and 6460 indicating devices may be displayed on the calendar 6411. As described above with reference to FIG. 62, when the indicator 6450 indicating the device is selected, the device 6410 may output processing history information 6480 of a document on the screen. As described above with reference to FIG. 62, when indicators 6471, 6472, 6481, and 6482 that may output documents are selected on the screen displaying the processing history information 6470 and 6480 of the documents, the device 6410 may output a document created by the first device 111 on the screen.

Figure 65:
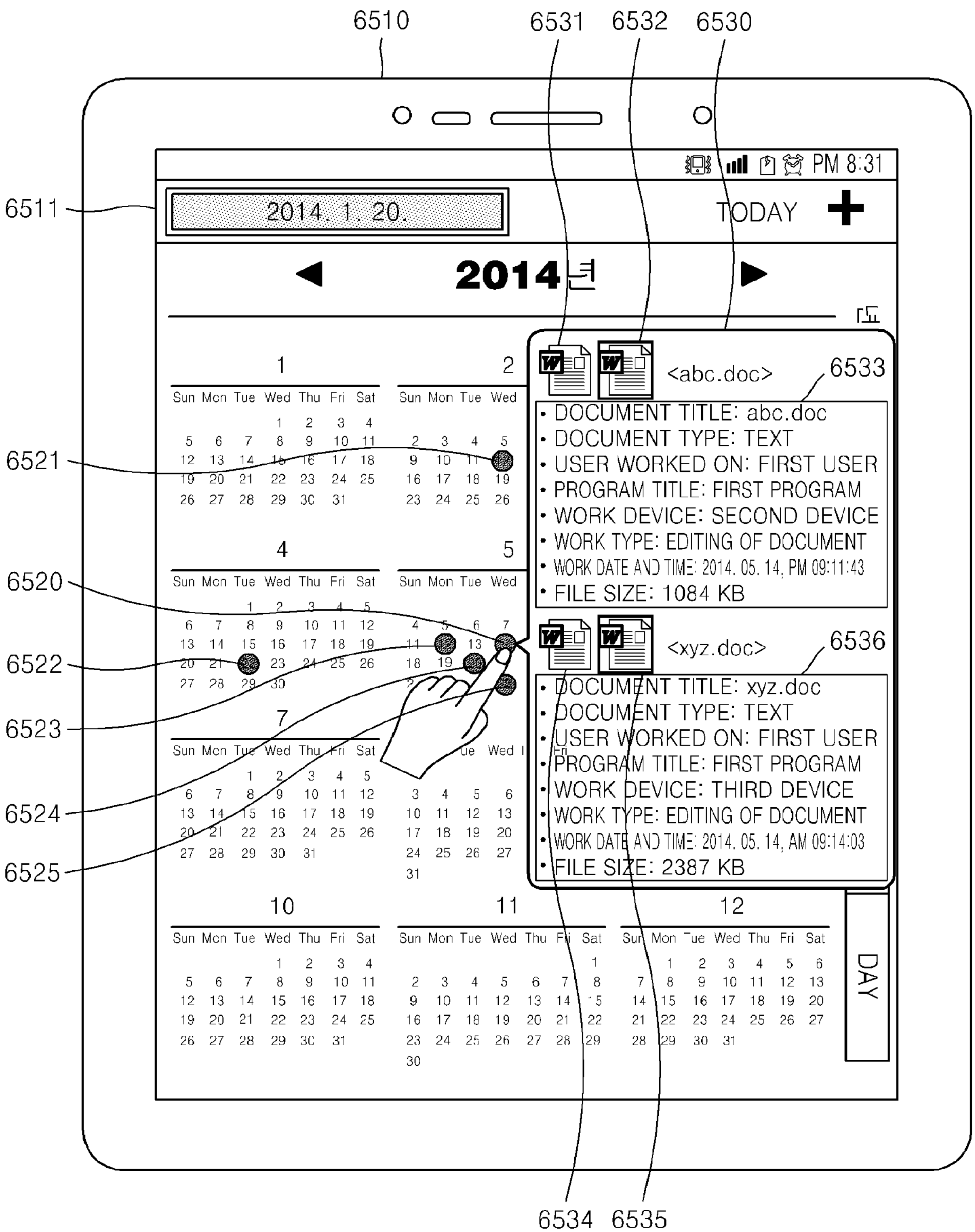
FIG. 65 illustrates another example of an annual calendar displayed on a screen of a device according to an exemplary embodiment.

FIG. 65 illustrates another example of an annual calendar 6511 displayed on a screen of a device 6510 according to an exemplary embodiment.

Referring to FIG. 65, the annual calendar 6511 may be output on the screen of the device 6510. The annular calendars 6211, 6311, and 6411 of FIGS. 62 through 64 include regions displaying months included in a year, whereas the annular calendar 6511 of FIG. 65 includes a region displaying days included in a year. In other words, the device 6510 may modify a type of the annular calendar 6511 in various ways to output the annular calendar 6511 on the screen.

Indicators 6520 through 6525 may be displayed on respective dates of the calendar 6511 on which the documents are worked. For example, if it is assumed that the second device 112 edits a document entitled "abc.doc" on May 14, 2014, the indicator 6520 indicating "abc.doc" may be displayed on a region of the calendar 6511 corresponding to May 14, 2014. If it is assumed that the third device 113 edits a document entitled "xyz.doc" on May 14, 2014, the indicator 6520 may be displayed as an indicator indicating editing of "xyz.doc".

As described above with reference to FIG. 62, when the indicator 6520 displayed on the calendar 6511 is selected, the device 6510 may output work history information 6530 of a document on the screen. The work history information 6530 may include first work history information 6533 displaying work history information of "abc.doc", and second work history information 6536 displaying work history information of "xyz.doc". When indicators 6531, 6532, 6534, and 6535 that may output the documents are selected on the screen displaying the work history information 6530 of the document, the device 6510 may output the corresponding documents on the screen.

Figure 66A:
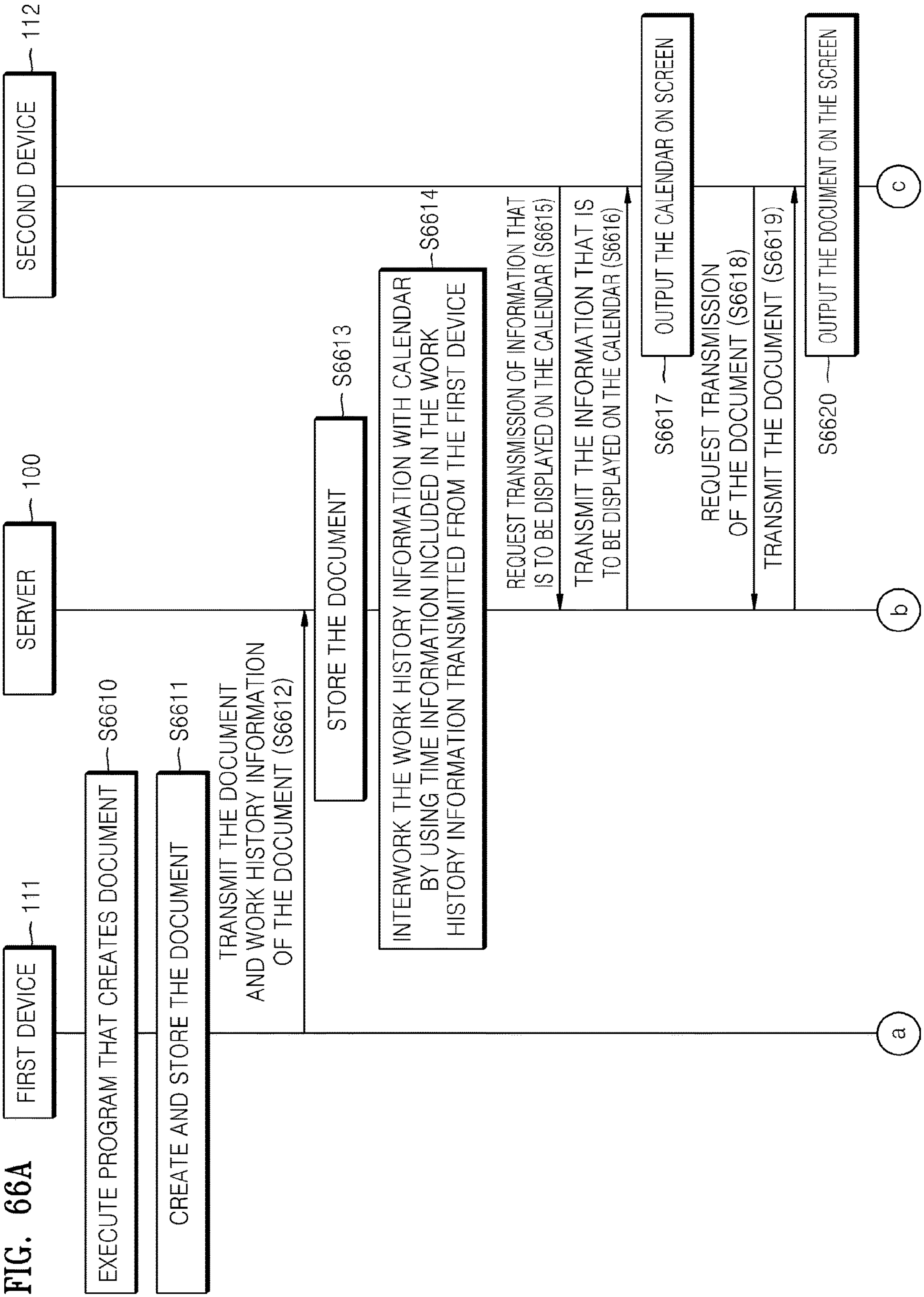
FIGS. 66A through 66C are flowcharts of another example in which when a first device creates a document, and a second device reads and edits the document, a server interworks work history information with a calendar of a user according to an exemplary embodiment.
Figure 66B:
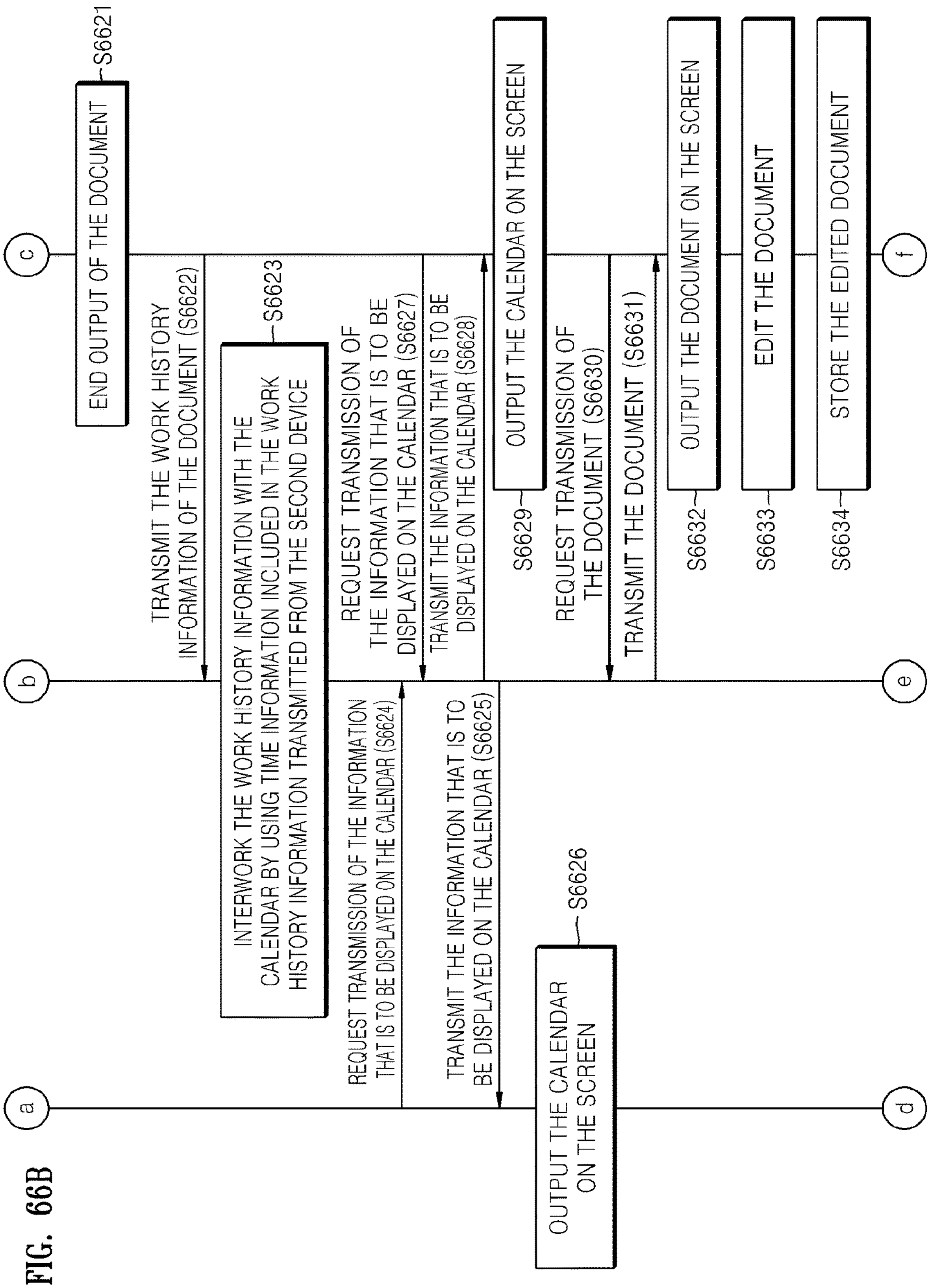
Figure 66C:
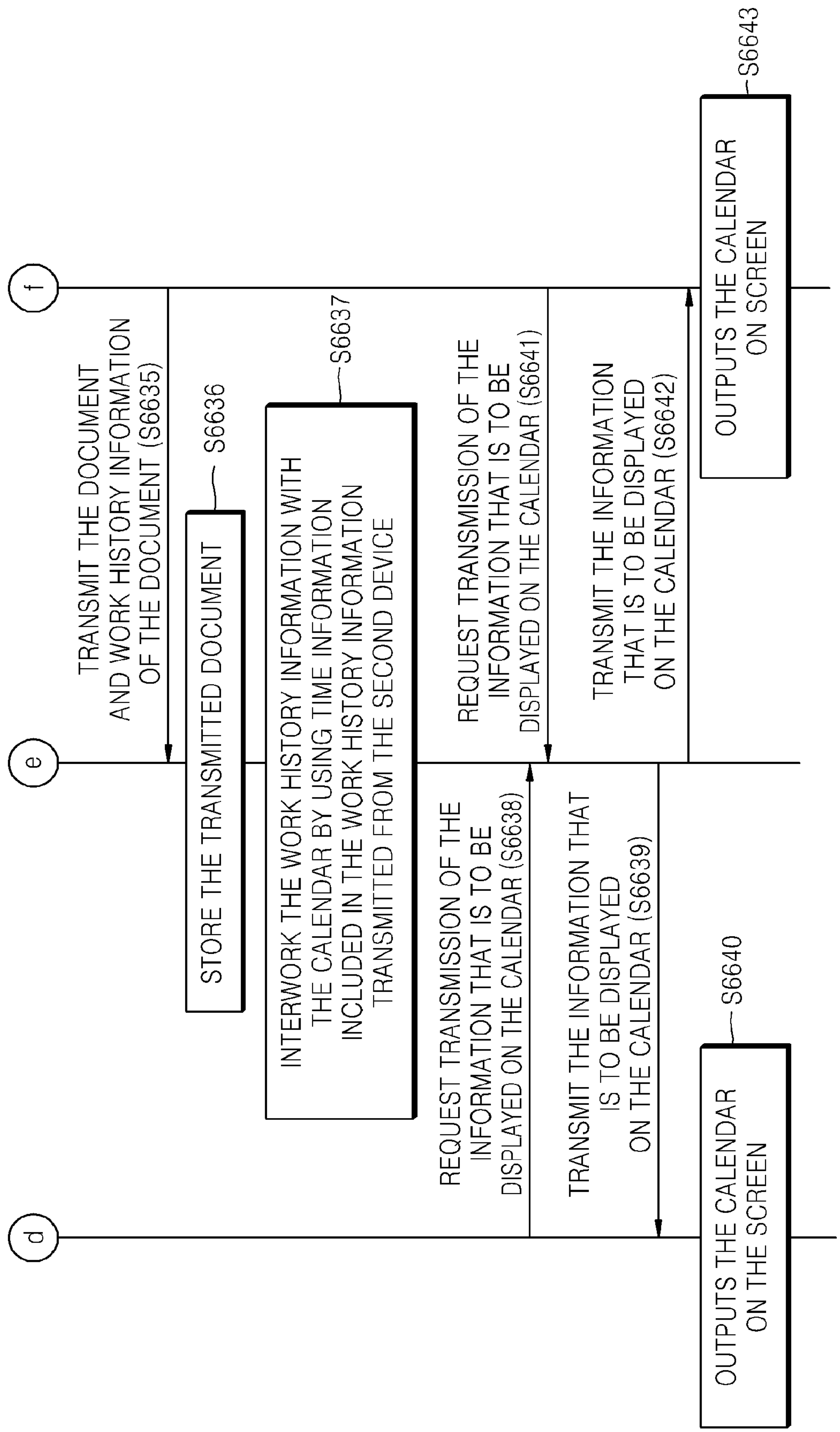

FIGS. 66A through 66C are flowcharts of another example in which when the first device 111 creates a document, and the second device 112 reads and edits the document, the server 100 interworks work history information with a calendar of a user according to an exemplary embodiment.

Operations S6610 through S6629 of FIGS. 66A through 66C relate to a process in which the server 100 interworks the work history information with the calendar of the user when the document is read and are the same as or similar to operations S3210 through S3229 of FIGS. 32A and 32B. Thus, detailed descriptions of operations S6610 through S6629 of FIGS. 66A through 66C are omitted below.

After the document is completely read and the work history information completely interworks the work history information with the calendar of the user, in operation S6630, the second device 112 requests the server 100 to transmit the document. In operation S6631, the server 100 transmits the document to the second device 112.

Operations S6632 through S6643 of FIGS. 66A through 66C relate to a process in which the server 100 interworks the work history information with the calendar of the user when the document is edited, and are the same as or similar to operations S4817 through S4828 of FIGS. 45A and 48B. Thus, detailed descriptions of operations S6632 through S6643 of FIGS. 66A through 66C are omitted below.

Hereinafter, an example of work history information obtained by the server 100 will be described with reference to FIGS. 66B and 66C.

FIGS. 67 and 68 are tables illustrating examples of work history information 6710 and 6810, respectively, of a document according to an exemplary embodiment.

The work history information 6710 of the document of FIG. 67 is updated from the work history information 1310 of FIG. 13. In other words, the work history information 1310 of FIG. 13 is generated when a device creates the document. Meanwhile, the work history information 6710 of the document of FIG. 67 is generated by adding new work history information 6720, 6730, and 6740 when the device creates the document, and at least one of devices reads and edits the created document.

Referring to FIG. 67, the server 100 may arrange the work history information 6710 received from the second device 112 according to a title 6711 of the document.

The work history information 6810 of the document of FIG. 68 is updated from the work history information 1410 of FIG. 14. In other words, the work history information 1410 of FIG. 14 is generated when a device creates the document. Meanwhile, the work history information 6810 of the document of FIG. 68 is generated by adding new work history information 6820, 6830, and 6840 when the device creates the document, and at least one of devices reads and edits the created document.

Referring to FIG. 68, the server 100 may arrange the work history information 6810 received from the second device 112 according to a title 6811 of the document.

Figure 69:
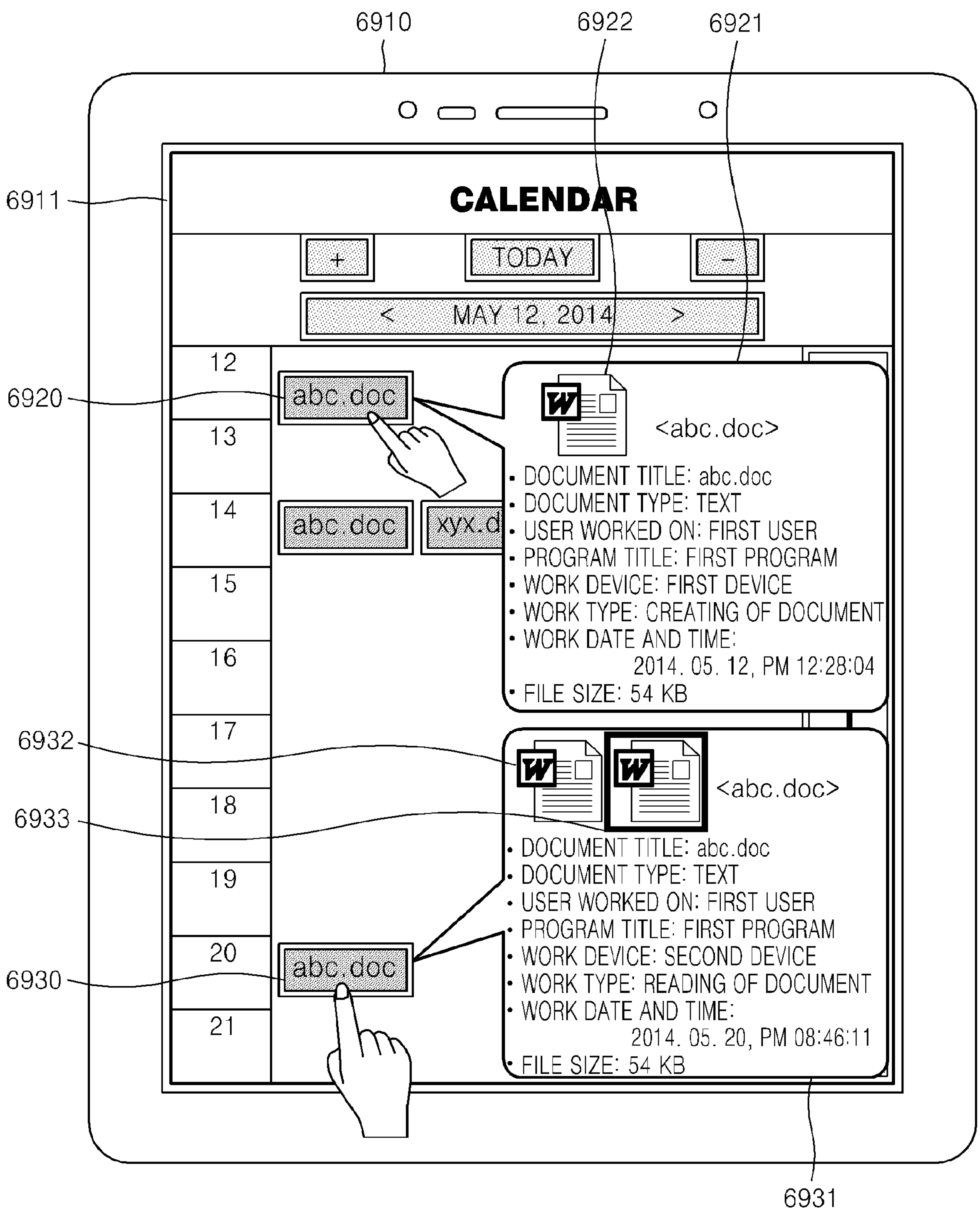
FIG. 69 illustrates an example of a daily calendar displayed on a screen of a device according to an exemplary embodiment.

FIG. 69 illustrates an example of a daily calendar 6911 displayed on a screen of a device 6910 according to an exemplary embodiment.

Referring to FIG. 69, the daily calendar 6911 may be output on the screen of the device 6910. An indicator 6920 indicating a title of a document may be displayed on the calendar 6911. For example, if it is assumed that the first device 111 creates a document entitled "abc.doc" on May 12, 2014, the indicator 6920 indicating "abc.doc" may be displayed on a region of the calendar 6911 corresponding to May 12, 2014.

The device 6910 may select the indicator 6920 indicating "abc.doc" according to a user input received through the user input device 16510. When the indicator 6920 indicating "abc.doc" is selected, the device 6910 may output work history information 6921 of the document on the screen. For example, if it is assumed that the first device 111 stores the document entitled "abc.doc" having a size of 54 KB (kilobytes) at 12:28:04 p.m. on May 12, 2014 by using a first program, at least one of "abc.doc", text, first program, first device, 12:28:04 p.m. on May 12, 2014, and 54 KB may be output as the work history information 6921. Meanwhile, the device 6910 may output the work history information 6921 of the document on the screen as a popup window, although it is understood that one or more other exemplary embodiments are not limited thereto as described above.

An indicator 6922 that may output the document on the screen of the device 6910 may be displayed on the work history information 6921 of the document. For example, when the indicator 6922 that may output the document is selected according to a user input received through the user input device 16510, the device 6910 may output the document created by the first device 111 on the screen as a popup window separately from the calendar 6911, although it is understood that one or more other exemplary embodiments are not limited thereto as described above.

Likewise, a plurality of indicators indicating titles of documents may be displayed on the single calendar 6911. For example, if it is assumed that the second device 112 reads the document entitled "abc.doc" on May 20, 2014, an indicator 6930 indicating "abc.doc" may be displayed on a region of the calendar 6911 corresponding to May 12, 2014.

The device 6910 may select the indicator 6930 indicating "abc.doc" according to a user input received through the user input device 16510. When the indicator 6930 indicating "abc.doc" is selected, the device 6910 may output work history information 6931 of the document on the screen. For example, if it is assumed that the second device 112 reads the document entitled "abc.doc" having the size of 54 KB (kilobytes) at 08:46:11 p.m. on May 20, 2014 by using a first program, at least one of "abc.doc", text, first program, second device, 08:46:11 p.m. on May 20, 2014, and 54 KB may be output as the work history information 6931. Meanwhile, the device 6910 may output the work history information 6931 of the document on the screen as the popup window, although it is understood that one or more other exemplary embodiments are not limited thereto as described above.

Indicators 6932 and 6933 that may output the document on the screen of the device 6910 may be displayed on the work history information 6931 of the document. The indicator 6932 may indicate an original document at the time of creating the document or a document previous to a current work. The indicator 6933 may indicate a currently editing document.

The indicator 6933 indicating the editing document may be displayed distinguishably from the indicator 6932 indicating the original document or the document previous to the current work. For example, with regard to the indicator 6933 indicating the editing document, a border line may be additionally displayed on the indicator 6932 indicating the original document or the document previous to the current work. When the indicator 6932 or 6933 that may output the document is selected according to the user input received through the user input device 16510, the device 6910 may output the original document or a document edited by the second device 112 on the screen as the popup window separately from the calendar 6911, although it is understood that one or more other exemplary embodiments are not limited thereto as described above.

Figure 70:
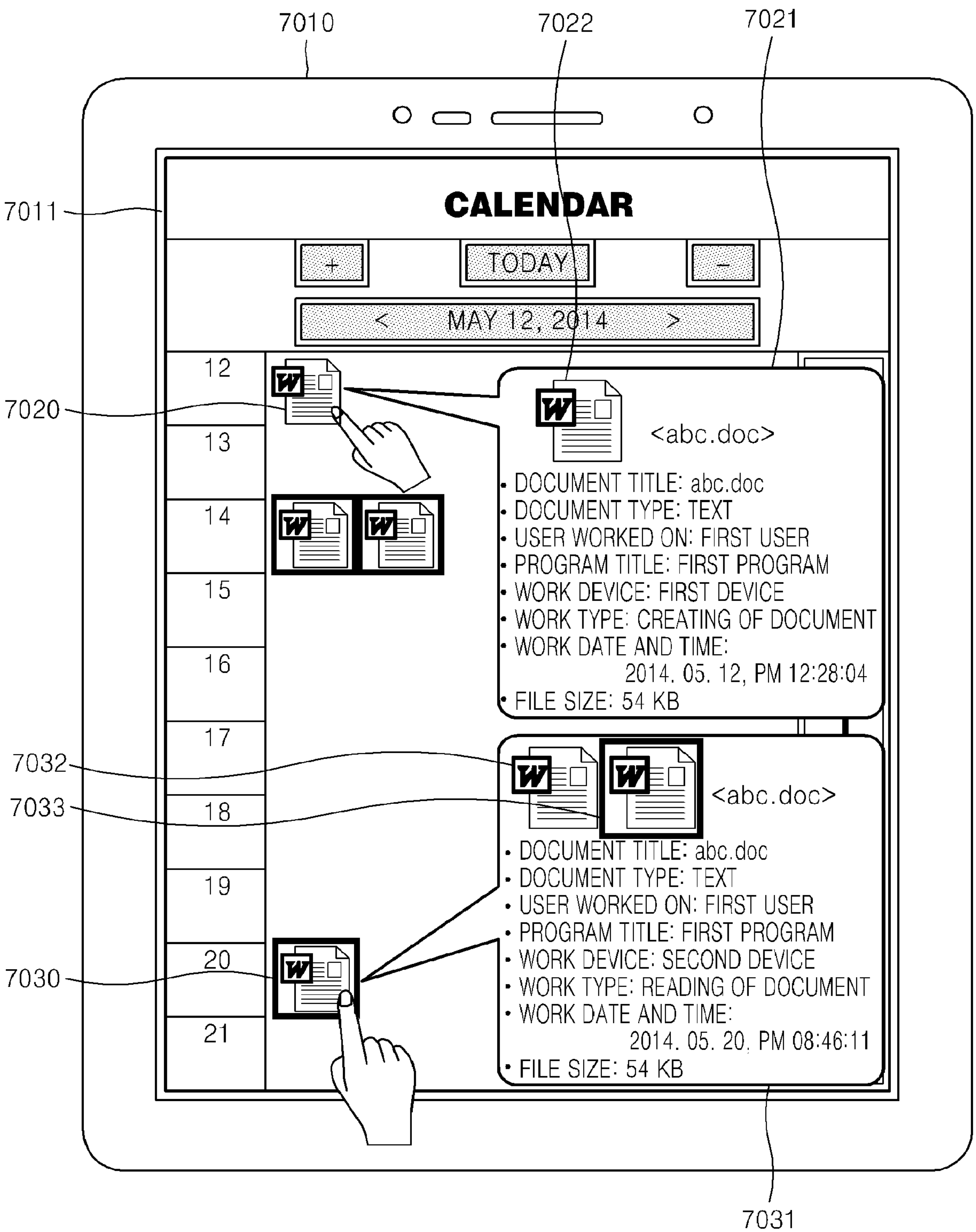
FIG. 70 illustrates another example of a daily calendar displayed on a screen of a device according to an exemplary embodiment.

FIG. 70 illustrates another example of a daily calendar 7011 displayed on a screen of a device 7010 according to an exemplary embodiment.

Referring to FIG. 70, the daily calendar 7011 may be output on the screen of the device 7010. The calendar 7011 of FIG. 70 has the same form as that of the calendar 6911 of FIG. 69. Thus, the descriptions of objects provided above with reference to FIG. 69 may apply to objects that may be displayed on the calendar 7011 of FIG. 70.

An indicator 7020 indicating a program used to work on a document may be displayed on the calendar 7011. For example, if it is assumed that the first device 111 creates the document on May 12, 2014 by using a first program, the indicator 7020 indicating the "first program" may be displayed on a region of the calendar 7011 corresponding to May 12, 2014.

The device 7010 may select the indicator 7020 indicating the "first program" according to a user input received through the user input device 16510. When the indicator 7020 indicating the "first program" is selected, the device 7010 may output work history information 7021 of the document on the screen. For example, if it is assumed that the first device 111 creates a document entitled "abc.doc" having a size of 54 KB (kilobytes) at 12:28:04 p.m. on May 12, 2014 by using the first program, at least one of "abc.doc", text, first program, first device, 12:28:04 p.m. on May 12, 2014, and 54 KB may be output as the work history information 7021. Meanwhile, the device 7010 may output the work history information 7021 of the document on the screen as a popup window, although it is understood that one or more other exemplary embodiments are not limited thereto as described above. For example, the device 7010 may output the work history information 7021 on an entirety of the screen, on a designated region of the screen, etc., in one or more other exemplary embodiments.

An indicator 7022 that may output the document on the screen of the device 7010 may be displayed on the work history information 7021 of the document. For example, when the indicator 7022 that may output the document is selected according to the user input received through the user input device 16510, the device 7010 may output the document created by the first device 111 on the screen as a popup window separately from the calendar 7011, although it is understood that one or more other exemplary embodiments are not limited thereto as described above.

Likewise, a plurality of indicators indicating programs may be displayed on the single calendar 7011. For example, if it is assumed that the second device 112 reads the document entitled "abc.doc" on May 20, 2014, an indicator 7030 indicating the "first program" may be displayed on the region of the calendar 7011 corresponding to May 12, 2014.

The device 7010 may select the indicator 7030 indicating the "first program" according to the user input received through the user input device 16510. When the indicator 7030 indicating the "first program" is selected, the device 7010 may output work history information 7031 of the document on the screen. For example, if it is assumed that the second device 112 reads the document entitled "abc.doc" having the size of 54 KB (kilobytes) at 08:46:11 p.m. on May 20, 2014 by using the first program, at least one of "abc.doc", text, first program, second device, 08:46:11 p.m. on May 20, 2014, and 54 KB may be output as the work history information 7031. Meanwhile, the device 7010 may output the work history information 7031 of the document on the screen as the popup window, although it is understood that one or more other exemplary embodiments are not limited thereto as described above.

Indicators 7032 and 7033 that may output the document on the screen of the device 7010 may be displayed on the work history information 7031 of the document. The indicator 7032 may indicate an original document at the time of creating the document or a document previous to a current work. The indicator 7033 may indicate a currently editing document.

The indicator 7033 indicating the editing document may be displayed distinguishably from the indicator 7032 indicating the original document or the document previous to the current work. For example, with regard to the indicator 7033 indicating the editing document, a border line may be additionally displayed on the indicator 7032 indicating the original document or the document previous to the current work. When the indicator 7032 or 7033 that may output the document is selected according to the user input received through the user input device 16510, the device 7010 may output the original document or a document edited by the second device 112 on the screen as the popup window separately from the calendar 7011, although it is understood that one or more other exemplary embodiments are not limited thereto as described above.

Figure 71:
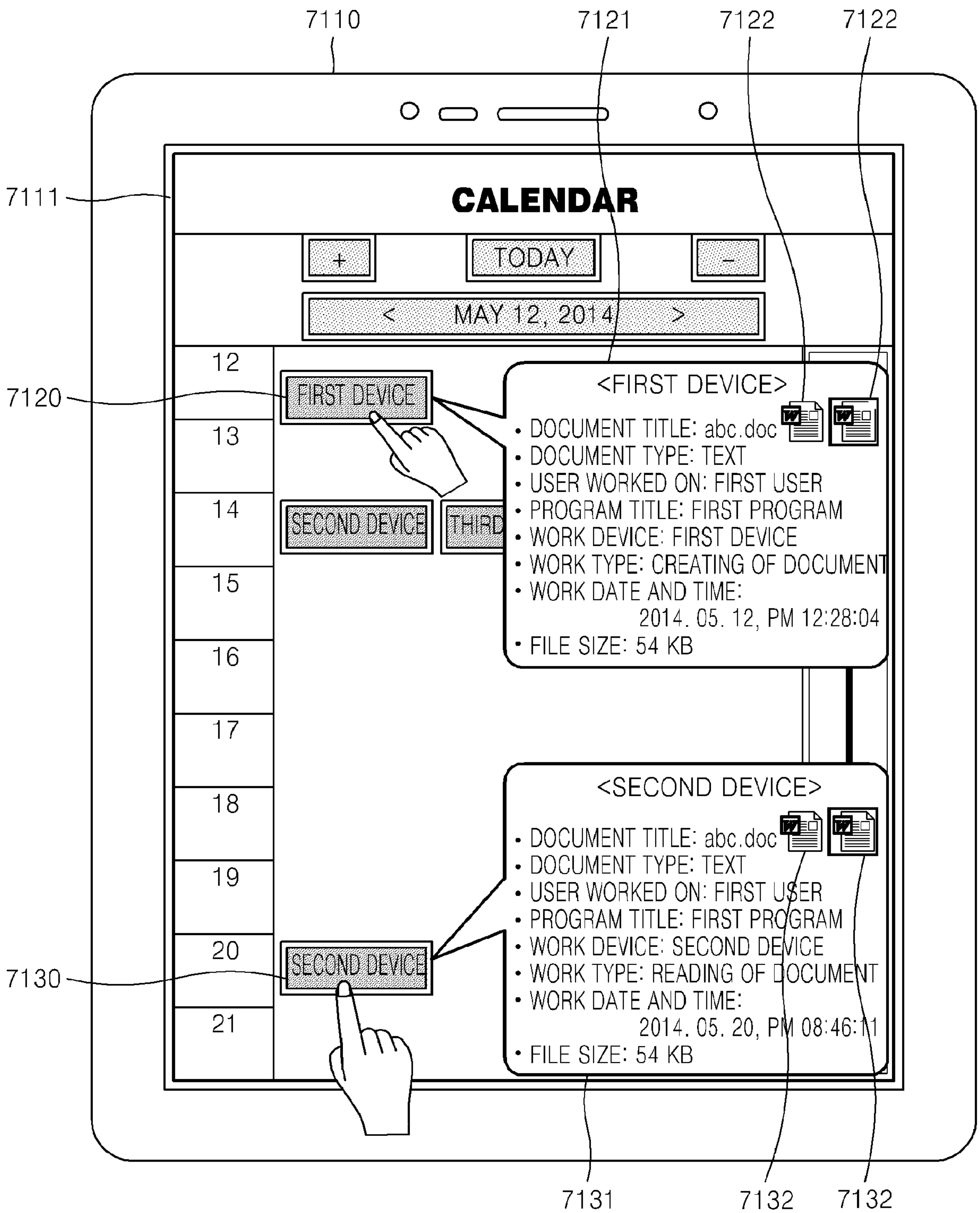
FIG. 71 illustrates another example of a daily calendar displayed on a screen of a device according to an exemplary embodiment.

FIG. 71 illustrates another example of a daily calendar 7111 displayed on a screen of a device 7110 according to an exemplary embodiment.

Referring to FIG. 71, the daily calendar 7111 may be output on the screen of the device 7110. The calendar 7111 of FIG. 71 has the same form as that of the calendar 6911 of FIG. 69. Thus, the descriptions of indicators provided above with reference to FIG. 69 may apply to indicators that may be displayed on the calendar 7111 of FIG. 71.

An indicator 7120 indicating a title of a document may be displayed on the calendar 7111. For example, if it is assumed that the first device 111 creates the document on May 12, 2014, the indicator 7120 indicating the "first device" may be displayed on a region of the calendar 7111 corresponding to May 12, 2014.

The device 7110 may select the indicator 7120 indicating the "first device" according to a user input received through the user input device 16510. When the indicator 7120 indicating the "first device" is selected, the device 7110 may output work history information 7121 of the document on the screen. For example, if it is assumed that the first device 111 stores a document entitled "abc.doc" having a size of 54 KB (kilobytes) at 12:28:04 p.m. on May 12, 2014 by using a first program, at least one of "abc.doc", text, first program, first device, 12:28:04 p.m. on May 12, 2014, and 54 KB may be output as the work history information 7121. Meanwhile, the device 7110 may output the work history information 7121 of the document on the screen as a popup window, although it is understood that one or more other exemplary embodiments are not limited thereto as described above.

Indicators 7122 and 7123 that may output the document on the screen of the device 7110 may be displayed on the work history information 7121 of the document. The indicator 7122 may indicate an original document at the time of creating the document or a document previous to a current work. The indicator 7123 may indicate a currently editing document.

The indicator 7123 indicating the editing document may be displayed distinguishably from the indicator 7122 indicating the original document or the document previous to the current work. For example, with regard to the indicator 7123 indicating the editing document, a border line may be additionally displayed on the indicator 7122 indicating the original document or the document previous to the current work. When the indicator 7122 or 7123 that may output the document is selected according to the user input received through the user input device 16510, the device 7110 may output the original document or an edited document on the screen as the popup window separately from the calendar 7111, although it is understood that one or more other exemplary embodiments are not limited thereto as described above.

Likewise, a plurality of indicators indicating titles of devices may be displayed on the single calendar 7111. For example, if it is assumed that the second device 112 reads a document entitled "abc.doc" on May 20, 2014, an indicator 7130 indicating the "second device" may be displayed on the region of the calendar 7111 corresponding to May 12, 2014.

The device 7110 may select the indicator 7130 indicating the "second device" according to the user input received through the user input device 16510. When the indicator 7130 indicating the "second device" is selected, the device 7110 may output work history information 7131 of the document on the screen. For example, if it is assumed that the second device 112 reads the document entitled "abc.doc" having the size of 54 KB (kilobytes) at 08:46:11 p.m. on May 20, 2014 by using the first program, at least one of "abc.doc", text, first program, second device, 08:46:11 p.m. on May 20, 2014, and 54 KB may be output as the work history information 7131. Meanwhile, the device 7110 may output the work history information 7131 of the document on the screen as the popup window, although it is understood that one or more other exemplary embodiments are not limited thereto as described above.

Indicators 7132 and 7133 that may output the document on the screen of the device 7110 may be displayed on the work history information 7131 of the document. The indicator 7132 may indicate an original document at the time of creating the document or a document previous to a current work. The indicator 7133 may indicate a currently editing document.

The indicator 7133 indicating the editing document may be displayed distinguishably from the indicator 7132 indicating the original document or the document previous to the current work. For example, with regard to the indicator 7133 indicating the editing document, a border line may be additionally displayed on the indicator 7132 indicating the original document or the document previous to the current work. When the indicator 7132 or 7133 that may output the document is selected according to the user input received through the user input device 16510, the device 7110 may output the original document or an edited document on the screen as the popup window separately from the calendar 7111, although it is understood that one or more other exemplary embodiments are not limited thereto as described above.

Figure 72:
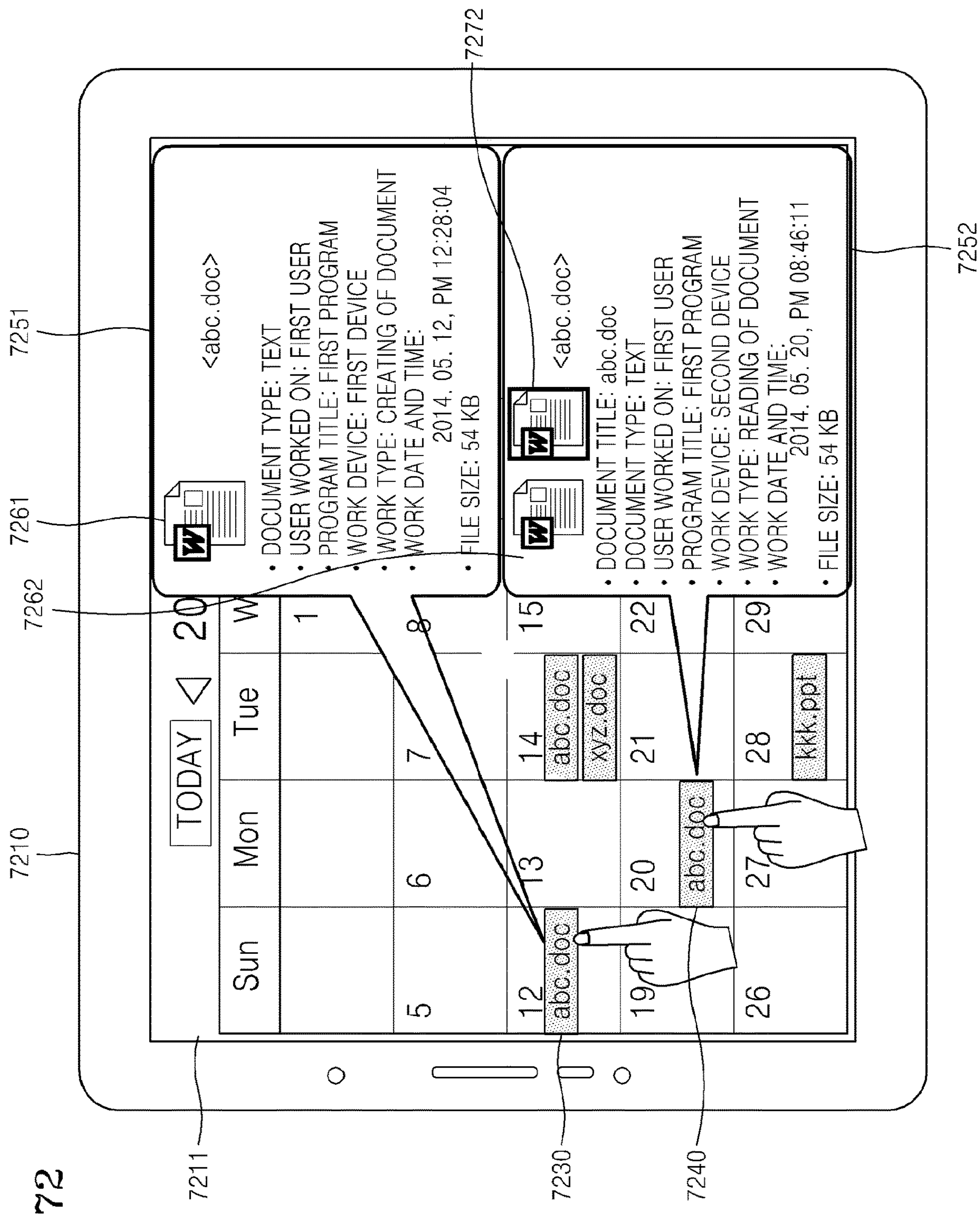
FIG. 72 illustrates an example of a monthly calendar displayed on a screen of a device according to an exemplary embodiment.

FIG. 72 illustrates an example of a monthly calendar 7211 displayed on a screen of a device 7210 according to an exemplary embodiment.

Referring to FIG. 72, the monthly calendar 7211 may be output on the screen of the device 7210. The calendar 7211 of FIG. 72 has the same form as that of the calendar 1920 of FIG. 19. Thus, the descriptions of indicators provided above with reference to FIG. 19 may apply to indicators that may be displayed on the calendar 7211 of FIG. 72.

An indicator 7230 indicating a title of a document may be displayed on the calendar 7211. For example, if it is assumed that the first device 111 creates a document entitled "abc.doc" on May 12, 2014, the indicator 7230 indicating "abc.doc" may be displayed on a region of the calendar 7211 corresponding to May 12, 2014. Likewise, if it is assumed that the second device 112 reads the document entitled "abc.doc" on May 20, 2014, an indicator 7240 indicating "abc.doc" may be displayed on a region of the calendar 7211 corresponding to May 20, 2014.

The device 7210 may select the indicator 7230 indicating "abc.doc" according to a user input received through the user input device 16510. When the indicator 7230 indicating "abc.doc" is selected, the device 7210 may output work history information 7251 of the document on the screen.

For example, if it is assumed that the first device 111 stores the document entitled "abc.doc" having a size of 54 KB (kilobytes) at 12:28:04 p.m. on May 12, 2014 by using a first program, at least one of "abc.doc", text, first program, first device, 12:28:04 p.m. on May 12, 2014, and 54 KB may be output as the work history information 7251. Meanwhile, the device 7210 may output the work history information 7251 of the document on the screen as a popup window, although it is understood that one or more other exemplary embodiments are not limited thereto as described above.

Likewise, the device 7210 may select the indicator 7240 indicating "abc.doc" according to the user input received through the user input device 16510. When the indicator 7240 indicating "abc.doc" is selected, the device 7210 may output work history information 7252 of the document on the screen.

For example, if it is assumed that the second device 112 reads the document entitled "abc.doc" having the size of 54 KB (kilobytes) at 08:46:11 p.m. on May 20, 2014 by using the first program, at least one of "abc.doc", text, first program, second device, 08:46:11 p.m. on May 20, 2014, and 54 KB may be output as the work history information 7252. Meanwhile, the device 7210 may output the work history information 7252 of the document on the screen as the popup window, although it is understood that one or more other exemplary embodiments are not limited thereto as described above.

An indicator 7261 that may output the document on the screen of the device 7210 may be displayed on the work history information 7251 of the document. For example, when the indicator 7261 that may output the document is selected according to the user input received through the user input device 16510, the device 7210 may output the document created by the first device 111 on the screen as a popup window separately from the calendar 7211, although it is understood that one or more other exemplary embodiments are not limited thereto as described above.

Likewise, indicators 7262 and 7272 that may output the document on the screen of the device 7210 may be displayed on the work history information 7252 of the document. For example, when the indicator 7262 that may output the document is selected according to the user input received through the user input device 16510, the device 7210 may output the original document on the screen as the popup window separately from the calendar 7211. When the indicator 7272 is selected, the device 7210 may output an edited document on the screen as the popup window separately from the calendar 7211, although it is understood that one or more other exemplary embodiments are not limited thereto as described above. For example, the device 7210 may output the edited document on an entirety of the screen, on a designated region of the screen, etc., in one or more other exemplary embodiments.

Figure 73:
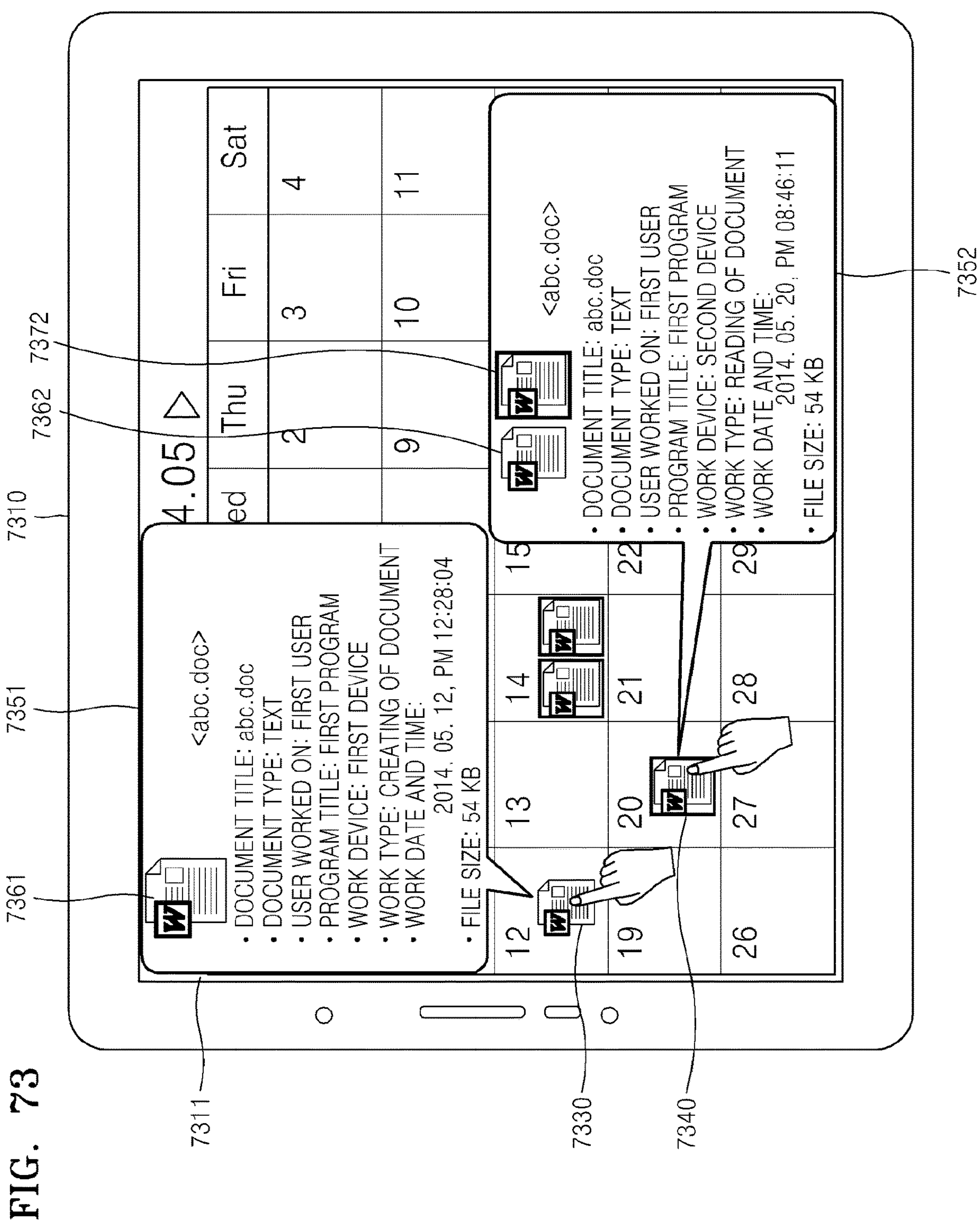
FIG. 73 illustrates another example of a monthly calendar displayed on a screen of a device according to an exemplary embodiment.

FIG. 73 illustrates another example of a monthly calendar 7311 displayed on a screen of a device 7310 according to an exemplary embodiment.

Referring to FIG. 73, the monthly calendar 7311 may be output on the screen of the device 7310. The calendar 7311 of FIG. 73 has the same form as that of the calendar 1920 of FIG. 19. Thus, the descriptions of objects provided above with reference to FIG. 19 may apply to objects that may be displayed on the calendar 7311 of FIG. 73.

Indicators 7330 and 7340 indicating programs used to work on a document may be displayed on the calendar 7311. For example, if it is assumed that the first device 111 creates the document on May 12, 2014 by using a first program, the indicator 7330 indicating the "first program" may be displayed on a region of the calendar 7320 corresponding to May 12, 2014. Likewise, if it is assumed that the second device 112 reads the document on May 20, 2014 by using the first program, the indicator 7340 indicating the "first program" may be displayed on a region of the calendar 7311 corresponding to May 20, 2014.

The device 7310 may select the indicator 7330 indicating the "first program" according to a user input received through the user input device 16510. When the indicator 7330 indicating the "first program" is selected, the device 7310 may output work history information 7351 of the document on the screen. For example, if it is assumed that the first device 111 stores a document entitled "abc.doc" having a size of 54 KB (kilobytes) at 12:28:04 p.m. on May 12, 2014 by using the first program, at least one of "abc.doc", text, first program, first device, 12:28:04 p.m. on May 12, 2014, and 54 KB may be output as the work history information 7351. Meanwhile, the device 7310 may output the work history information 7351 of the document on the screen as a popup window, although it is understood that one or more other exemplary embodiments are not limited thereto as described above.

Likewise, the device 7310 may select the indicator 7340 indicating the "first program" according to the user input received through the user input device 16510. When the indicator 7340 indicating the "first program" is selected, the device 7310 may output work history information 7352 of the document on the screen. For example, if it is assumed that the second device 112 reads the document entitled "abc.doc" having the size of 54 KB (kilobytes) at 08:46:11 p.m. on May 20, 2014 by using the first program, at least one of "abc.doc", text, first program, second device, 08:46:11 p.m. on May 20, 2014, and 54 KB may be output as the work history information 7351. Meanwhile, the device 7310 may output the work history information 7352 of the document on the screen as the popup window, although it is understood that one or more other exemplary embodiments are not limited thereto as described above.

An indicator 7361 that may output the document on the screen of the device 7310 may be displayed on the work history information 7351 of the document. For example, when the indicator 7361 that may output the document is selected according to the user input received through the user input device 16510, the device 7310 may output the document created by the first device 111 on the screen as a popup window separately from the calendar 7311, although it is understood that one or more other exemplary embodiments are not limited thereto as described above.

Indicators 7362 and 7372 that may output the document on the screen of the device 7310 may be displayed on the work history information 7352 of the document. For example, when the indicator 7362 that may output the document is selected according to the user input received through the user input device 16510, the device 7310 may output the original document on the screen as the popup window separately from the calendar 7311. When the indicator 7372 is selected, the device 7310 may output an edited document on the screen as the popup window separately from the calendar 7311, although it is understood that one or more other exemplary embodiments are not limited thereto as described above.

Figure 74:
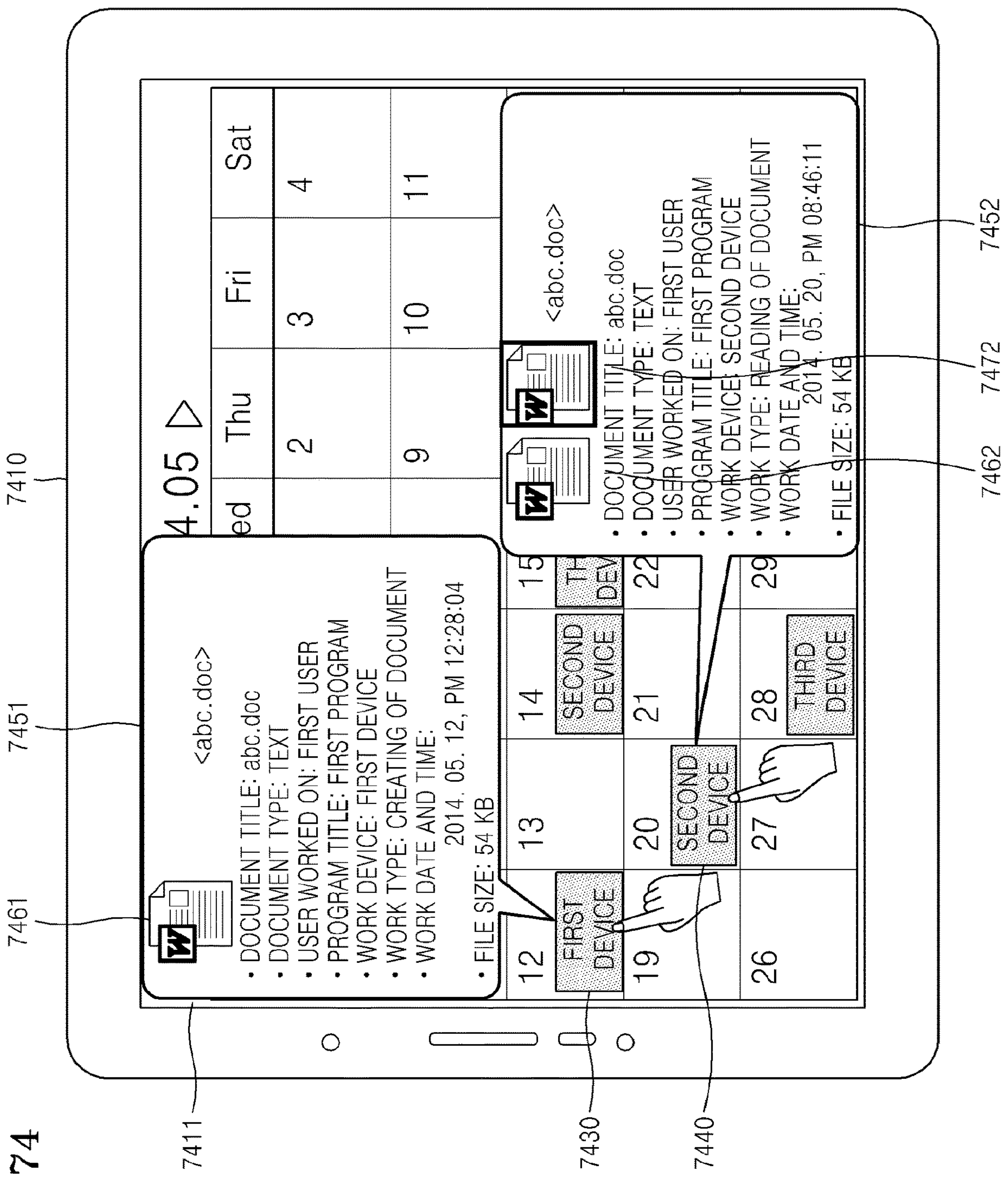
FIG. 74 illustrates another example of a monthly calendar displayed on a screen of a device according to an exemplary embodiment.

FIG. 74 illustrates another example of a monthly calendar 7411 displayed on a screen of a device 7410 according to an exemplary embodiment.

Referring to FIG. 74, the monthly calendar 7411 may be output on the screen of the device 7410. The calendar 7411 of FIG. 74 has the same form as that of the calendar 1910 of FIG. 19. Thus, the descriptions of objects provided above with reference to FIG. 19 may apply to indicators that may be displayed on the calendar 7411 of FIG. 74.

Indicators 7430 and 7440 indicating titles of devices may be displayed on the calendar 7411. For example, if it is assumed that the first device 111 creates a document on May 12, 2014, the indicator 7430 indicating the "first device" may be displayed on a region of the calendar 7411 corresponding to May 12, 2014. Likewise, if it is assumed that the second device 112 reads the document on May 20, 2014, the indicator 7440 indicating the "second device" may be displayed on a region of the calendar 7411 corresponding to May 20, 2014.

The device 7410 may select the indicator 7430 indicating the "first device" according to a user input received through the user input device 16510. When the indicator 7430 indicating the "first device" is selected, the device 7410 may output work history information 7451 of the document on the screen. For example, if it is assumed that the first device 111 stores a document entitled "abc.doc" having a size of 54 KB (kilobytes) at 12:28:04 p.m. on May 12, 2014 by using a first program, at least one of "abc.doc", text, first program, first device, 12:28:04 p.m. on May 12, 2014, and 54 KB may be output as the work history information 7451. Meanwhile, the device 7410 may output the work history information 7451 of the document on the screen as a popup window, although it is understood that one or more other exemplary embodiments are not limited thereto as described above.

Likewise, the device 7410 may select the indicator 7440 indicating the "second device" according to the user input received through the user input device 16510. When the indicator 7440 indicating the "second device" is selected, the device 7410 may output work history information 7452 of the document on the screen. For example, if it is assumed that the second device 112 reads the document entitled "abc.doc" having the size of 54 KB (kilobytes) at 08:46:11 p.m. on May 20, 2014 by using the first program, at least one of "abc.doc", text, first program, second device, 08:46:11 p.m. on May 20, 2014, and 54 KB may be output as the work history information 7452. Meanwhile, the device 7410 may output the work history information 7452 of the document on the screen as the popup window, although it is understood that one or more other exemplary embodiments are not limited thereto as described above.

An indicator 7461 that may output the document on the screen of the device 7410 may be displayed on the work history information 7451 of the document. For example, when the indicator 7461 that may output the document is selected according to the user input received through the user input device 16510, the device 7410 may output the document created by the first device 111 on the screen as the popup window, although it is understood that one or more other exemplary embodiments are not limited thereto as described above.

Likewise, indicators 7462 and 7472 that may output the document on the screen of the device 7410 may be displayed on the work history information 7452 of the document. For example, when the indicator 7462 that may output the document is selected according to the user input received through the user input device 16510, the device 7410 may output an original document on the screen as the popup window separately from the calendar 7411. When the indicator 7472 is selected, the device 7411 may output an edited document on the screen as the popup window separately from the calendar 7411, although it is understood that one or more other exemplary embodiments are not limited thereto as described above.

Figure 75:
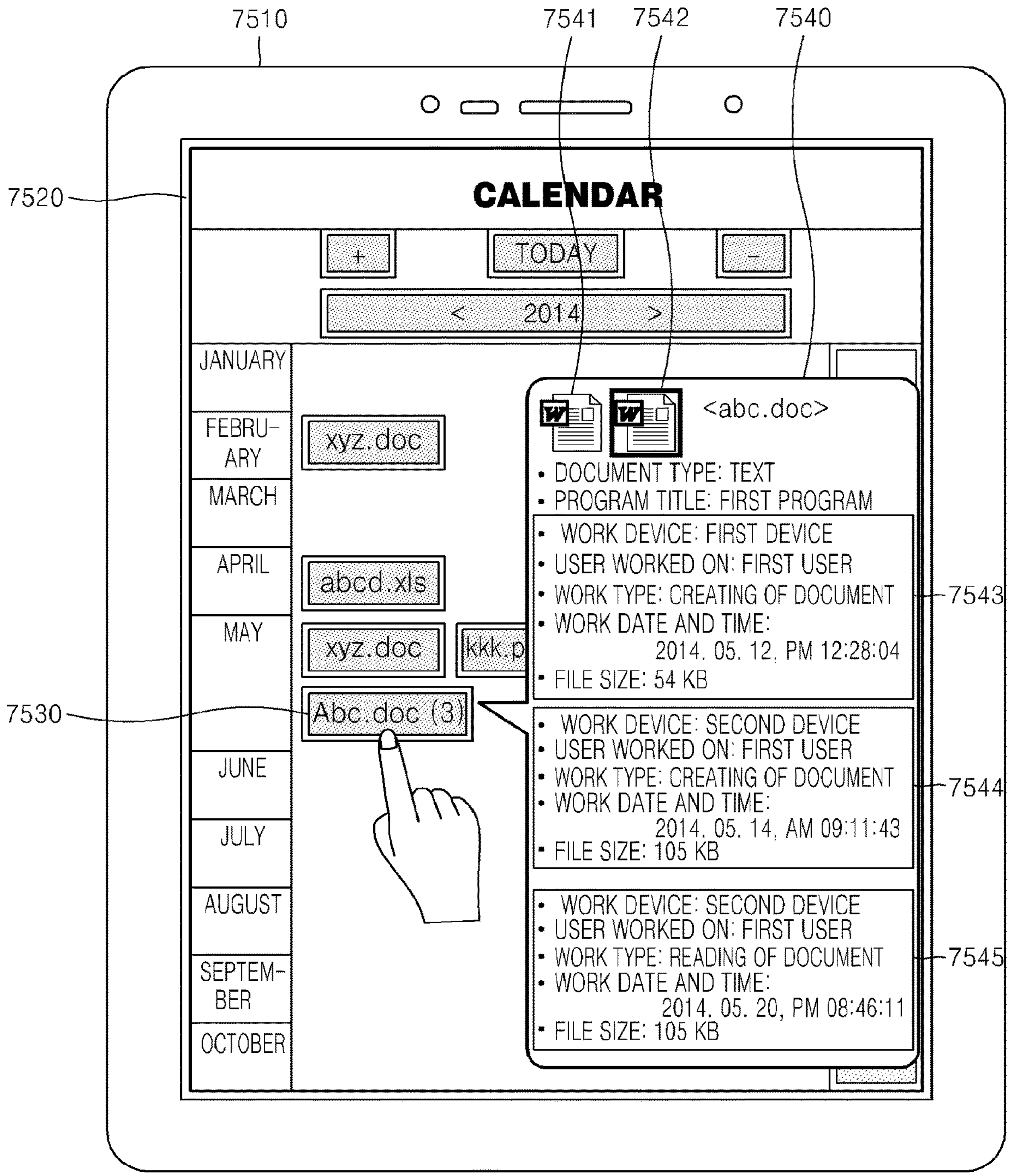
FIG. 75 illustrates an example of an annual calendar displayed on a screen of a device according to an exemplary embodiment.

FIG. 75 illustrates an example of an annual calendar 7520 displayed on a screen of a device 7510 according to an exemplary embodiment.

Referring to FIG. 75, the annual calendar 7520 may be output on the screen of the device 7510.

An indicator 7530 indicating a title of a document may be displayed on the calendar 7520. For example, if it is assumed that the first device 111 creates a document entitled "abc.doc" on May 12, 2014, and, the second device 112 creates the document entitled "abc.doc" on May 14, 2014 and reads the same document on May 20, 2014, the indicator 7530 indicating "abc.doc" may be displayed on a region of the calendar 7520 corresponding to May of 2014. The number of work history information of the document may be included and displayed on the indicator 7530. As described above by way of example, when "abc.doc" is created and read by the first device 111 and the second device 112 three times on May, the number of work history information "(3)" and the title of the document "abc.doc" as well may be displayed on the indicator 7530.

The device 7510 may select the indicator 7530 indicating the title of the document according to a user input received through the user input device 16510. When the indicator 7530 indicating the title of the document is selected, the device 7510 may output work history information 7540 of the document on the screen.

For example, it is assumed that the first device 111 stores the document entitled "abc.doc" having a size of 54 KB (kilobytes) at 12:28:04 p.m. on May 12, 2014 by using a first program, and, the second device 112 creates a document entitled "abc.doc" having a size of 105 KB (kilobytes) at 09:11:43 p.m. on May 14, 2014 by using the first program and reads the same document at 08:46:11 p.m. on May 20, 2014.

In this regard, if the indicator 7530 indicating "abc.doc" is selected, the work history information 7540 may include first work history information 7543, second work history information 7544, and third work history information 7545. In this case, at least one of "abc.doc", text, and first program may be displayed on the work history information 7540.

The "first device, creation of document, 12:28:04 p.m. on May 12, 2014, and 54 KB" may be output as the first work history information 7543. The "second device, creation of document, 09:11:43 p.m. on May 14, and 105 KB" may be output as the second work history information 7544. The "second device, reading of document, 08:46:11 p.m. on May 20, 2014, and 105 KB" may be output as the third work history information 7545. Meanwhile, the device 7510 may output the work history information 7540 of the document as a popup window, although it is understood that one or more other exemplary embodiments are not limited thereto as described above.

Indicators 7541 and 7542 that may output the document on the screen of the device 7510 may be displayed on the work history information 7540 of the document. The indicator 7541 may be an indicator that may output an original document of "abc.doc" on the screen of the device 7510. The indicator 7542 may be an indicator that may output an edited document of "abc.doc" on the screen of the device 7510.

For example, when the indicator 7541 that may output the document is selected according to a user input received through the user input device 16510, the device 7510 may output the document created by the first device 111 on the screen as the popup window separately from the calendar 7520, although it is understood that one or more other exemplary embodiments are not limited thereto as described above. For example, the device 7510 may output the document on an entirety of the screen, on a designated region of the screen, etc., in one or more other exemplary embodiments.

Figure 76:
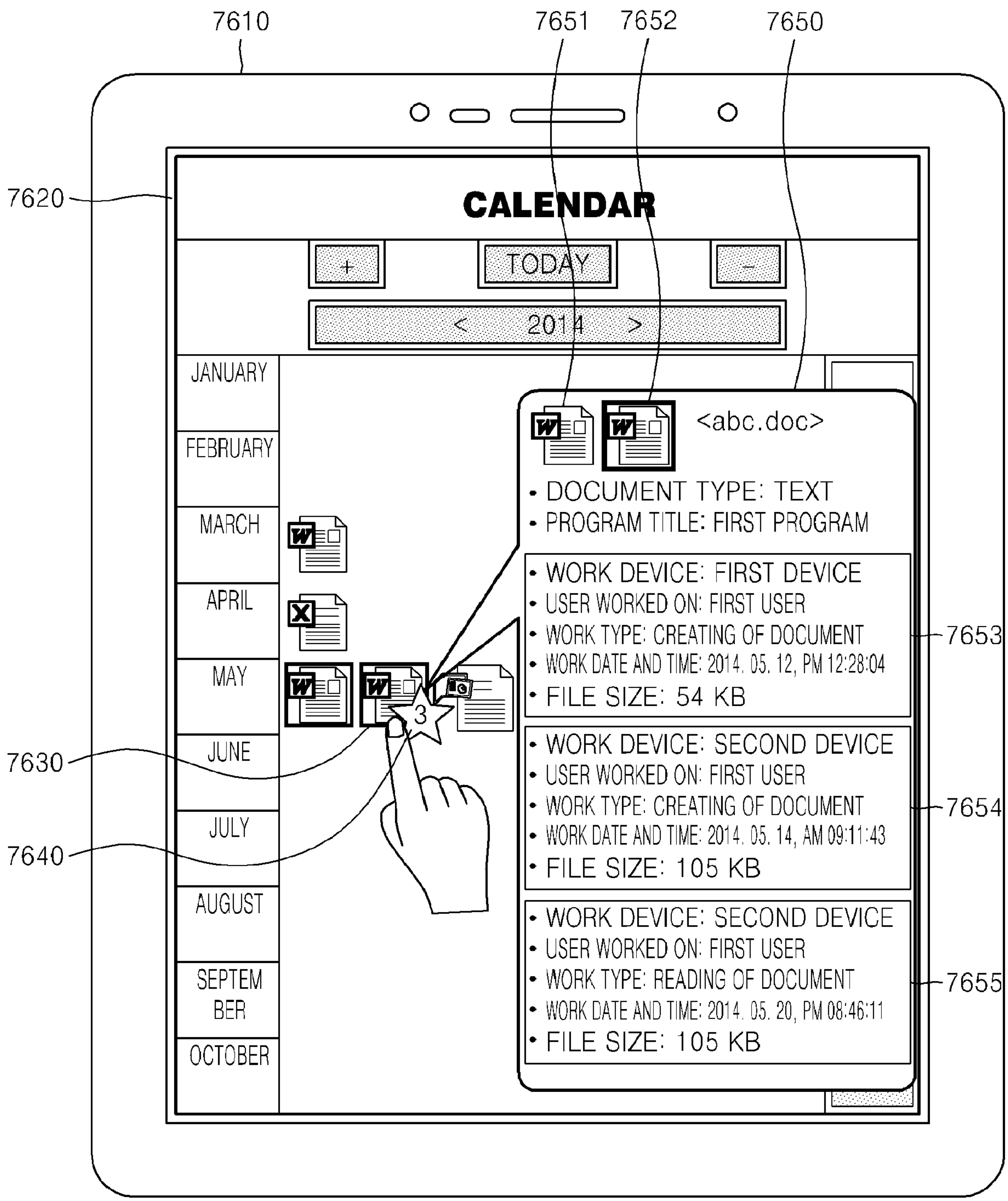
FIG. 76 illustrates another example of an annual calendar displayed on a screen of a device according to an exemplary embodiment.

FIG. 76 illustrates another example of an annual calendar 7620 displayed on a screen of a device 7610 according to an exemplary embodiment.

Referring to FIG. 76, the annual calendar 7620 may be output on the screen of the device 7610. An indicator 7630 indicating a program used to work on a document may be displayed on the calendar 7620. As described above with reference to FIG. 75, the number 7640 of work history information may be displayed on the indicator 7630. As described above with reference to FIG. 75, when the indicator 7630 indicating the program used to work on the document is selected, the device 7610 may output work history information 7650 of the document on the screen. When indicators 7651 and 7652 that may output the document are selected on the screen displaying the work history information 7650 of the document, the device 7610 may output the document indicated by the corresponding indicators 7651 and 7652 on the screen.

Figure 77:
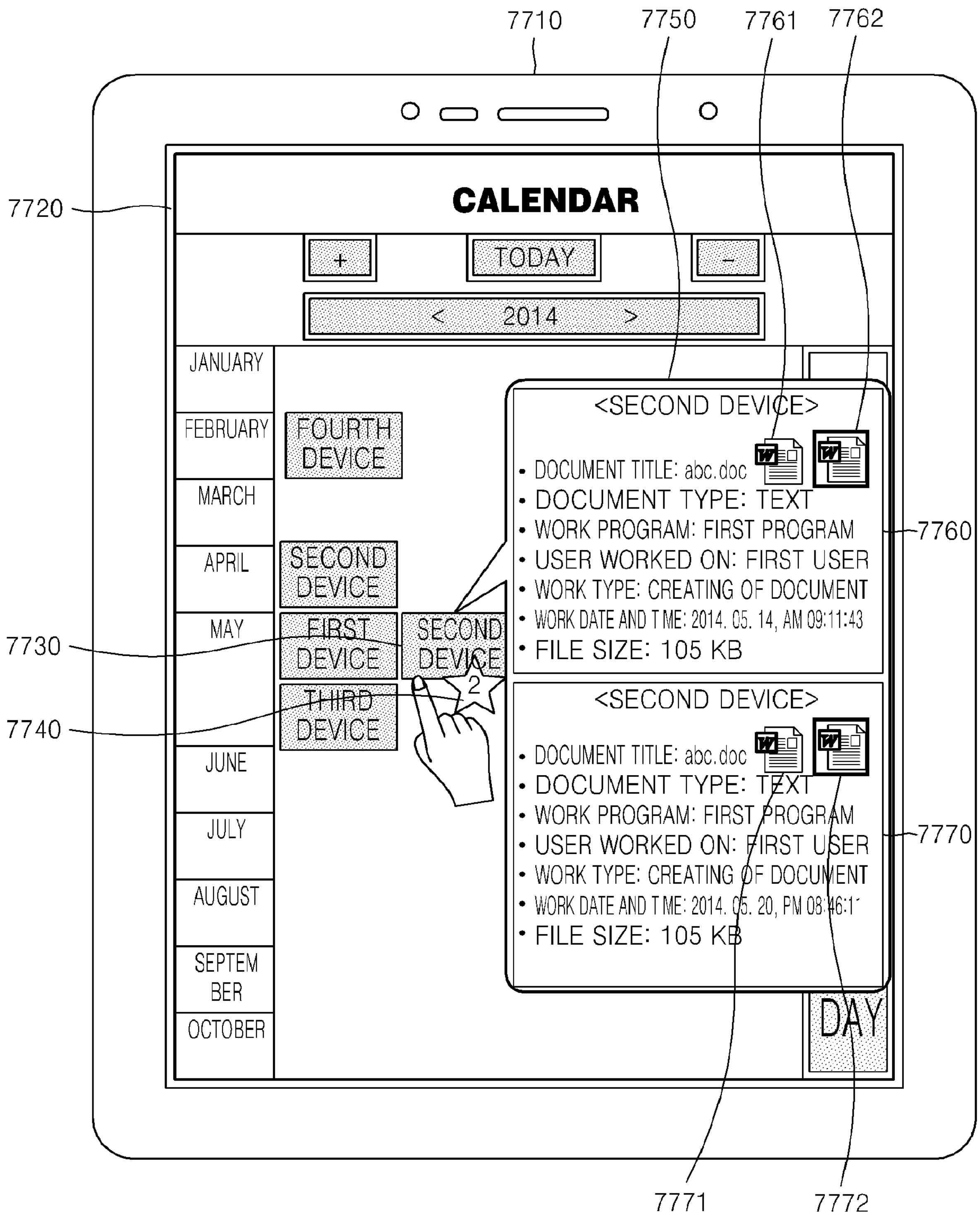
FIG. 77 illustrates another example of an annual calendar displayed on a screen of a device according to an exemplary embodiment.

FIG. 77 illustrates another example of an annual calendar 7720 displayed on a screen of a device 7710 according to an exemplary embodiment.

Referring to FIG. 77, the annual calendar 7720 may be output on the screen of the device 7710. An indicator 7730 indicating a device may be displayed on the calendar 7720. As described above with reference to FIG. 75, the number 7740 of work history information may be displayed on the indicator 7730.

As described above with reference to FIG. 75, when the indicator 7730 indicating the device is selected, the device 7710 may output processing history information 7750 of a document on the screen. For example, it is assumed that the second device 112 creates a document entitled "abc.doc" having a size of 105 KB (kilobytes) at 09:11:43 a.m. on May 14, 2014 by using a first program and reads the same document at 08:46:11 p.m. on May 20, 2014.

The work history information 7750 may include first work history information 7760 and second work history information 7770. The "abc.doc, text, first program, creation of document, 09:11:43 a.m. on May 14, 2014, and 105 KB" may be output as the first work history information 7760. The "abc.doc, text, first program, reading of document, 08:46:11 p.m. on May 20, 2014, and 105 KB" may be output as the third work history information 7770. Meanwhile, the device 7710 may output the work history information 7750 of the document as a popup window, although it is understood that one or more other exemplary embodiments are not limited thereto as described above.

As described with reference to FIG. 62, when indicators 7761, 7761, 7771, and 7772 that may output the document are selected on the screen displaying the processing history information 7750 of the document, the device 7710 may output the corresponding document on the screen.

Figure 78:
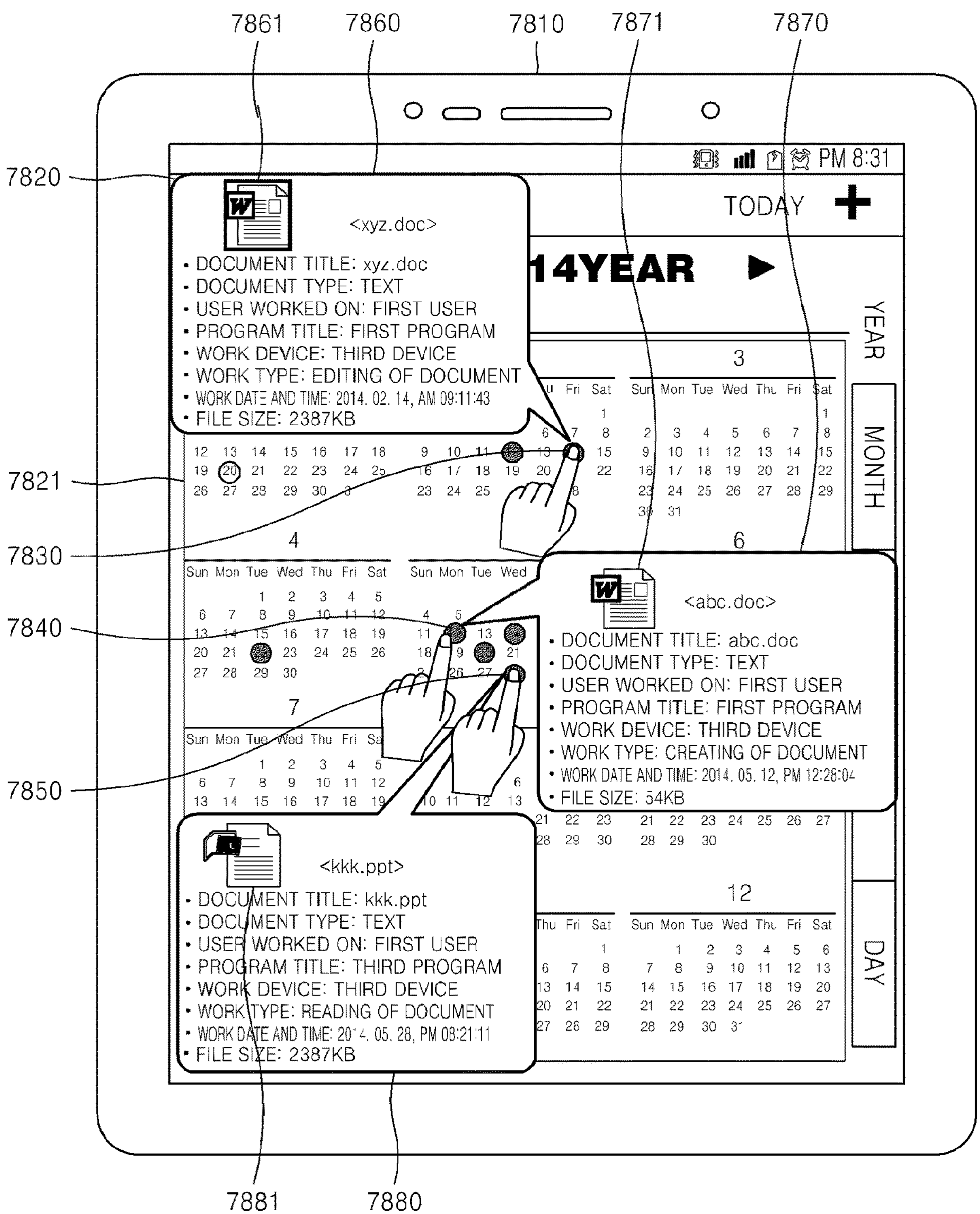
FIG. 78 illustrates another example of an annual calendar displayed on a screen of a device according to an exemplary embodiment.

FIG. 78 illustrates another example of an annual calendar 7820 displayed on a screen of a device 7810 according to an exemplary embodiment.

The annular calendars 7520, 7620, and 7720 of FIGS. 75 through 77 include regions displaying months included in a year, whereas the annular calendar 7820 of FIG. 78 includes a region 7821 displaying days included in a year. In other words, the device 7810 may modify a type of the annular calendar 7820 in various ways to output the annular calendar 7820 on the screen.

Indicators 7830, 7840, and 7850 may be displayed on respective dates of the calendar 7820 on which documents are worked. For example, if it is assumed that the third device 113 creates a document entitled "xyz.doc" on Feb. 12, 2014, the indicator 7830 indicating "xyz.doc" may be displayed on a region of the calendar 7820 corresponding to Feb. 12, 2014.

If it is assumed that the third device 113 creates a document entitled "abc.doc" on May 12, 2014, the indicator 7840 indicating "abc.doc" may be displayed on a region of the calendar 7820 corresponding to May 12, 2014.

If it is assumed that the third device 113 creates a document entitled "kkk.ppt" on May 28, 2014, the indicator 7850 indicating "kkk.ppt" may be displayed on a region of the calendar 7820 corresponding to May 28, 2014.

To distinguish the indicators 7830, 7840, and 7850 from each other, the indicators 7830, 7840, and 7850 may have different colors, shapes, etc. While all of "xyz.doc", "abc.doc", and "kkk.ppt" are created by the third device 113 in the present example, it is understood that the documents may be created by different devices.

As described above with reference to FIG. 75, when the indicators 7830, 7840, and 7850 displayed on the calendar 7820 are selected, the device 7810 may output work history information 7860, 7870, and 7880, respectively, of the documents on the screen. As described above with reference to FIG. 62, when indicators 7861, 7871, and 7881 that may output the document are selected from the screen displaying the work history information 7860, 7870, and 7880, respectively, of the documents, the device 7810 may output the corresponding documents on the screen.

Figure 79:
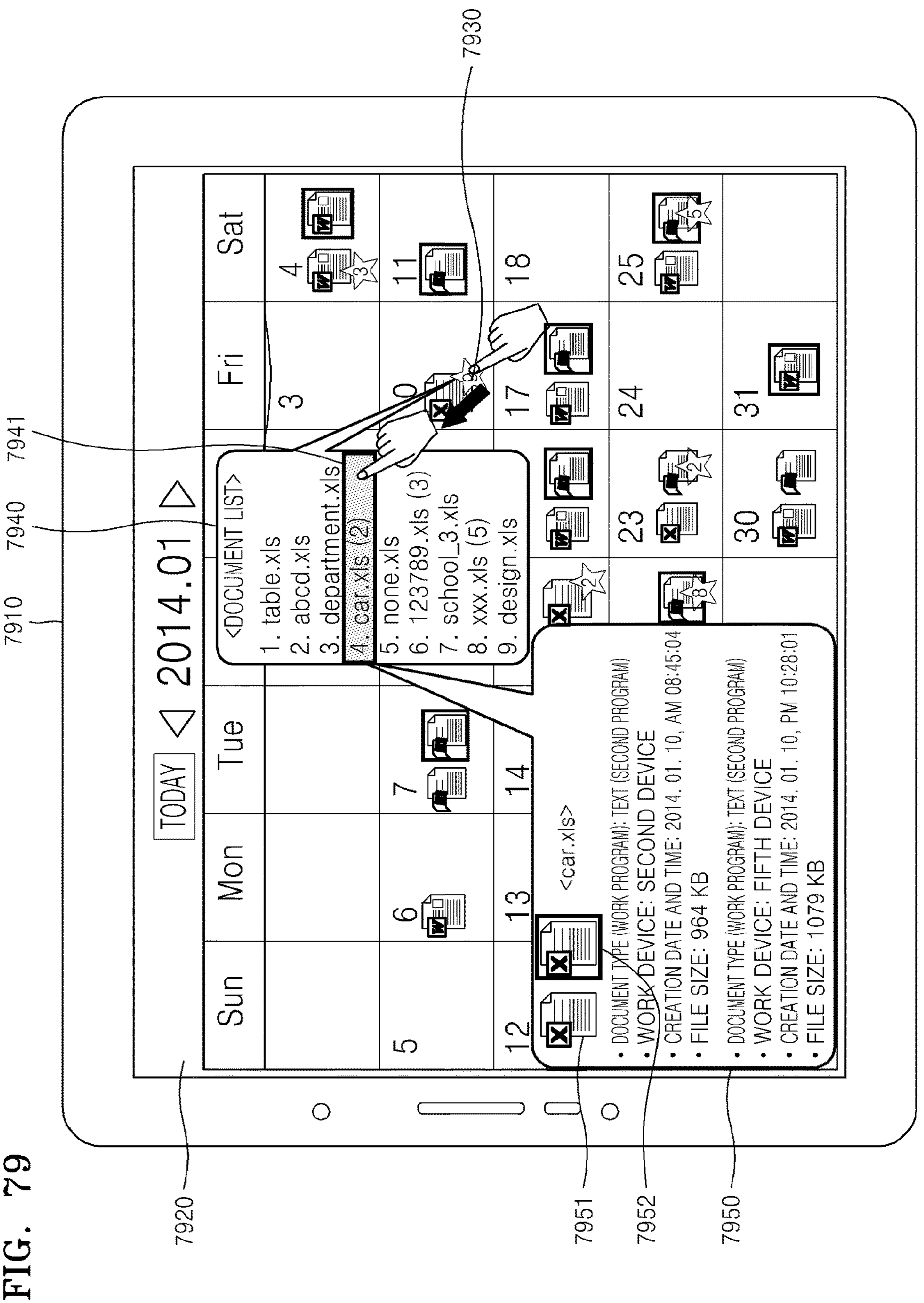
FIGS. 79 and 80 illustrate examples of calendars output on screens of devices according to an exemplary embodiment.
Figure 80:
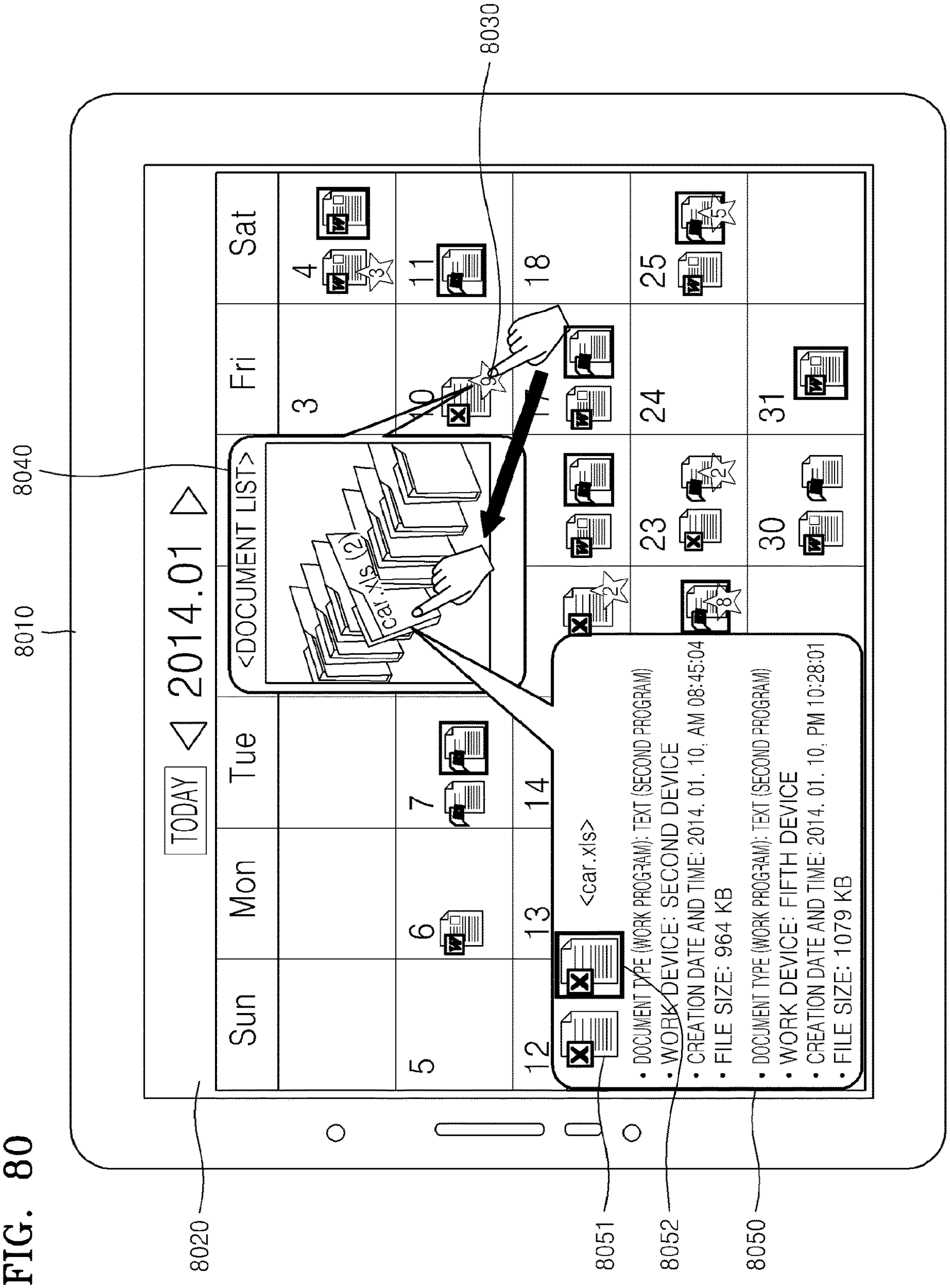

FIGS. 79 and 80 illustrate examples of calendars 7920 and 8020 output on screens of devices 7910 and 8010, respectively, according to an exemplary embodiment.

Referring to FIG. 79, an example of the calendar 7920 output on the screen of the device 7910 is illustrated. While the monthly calendar 7920 is output on the screen of the device 7910 in FIG. 79, it is understood that one or more other exemplary embodiments are not limited thereto. For example, other types of calendars may be displayed in one or more other exemplary embodiments.

When a plurality of documents are worked on a same date, an indicator 7930 indicating a number of the documents worked on may be displayed on the calendar 7920. For example, if it is assumed that at least one of the devices 111 works on a total number of 9 documents on Jan. 10, 2014, the indicator 7930 indicating that the 9 documents have been worked on may be displayed on a region of the calendar 7920 showing Jan. 10, 2014.

The device 7910 may select the indicator 7930 indicating the number of the documents worked on according to a user input received through the user input device 16510. When the indicator 7930 indicating the number of the documents worked on is selected, the device 7910 may output a list 7940 of the documents worked on the screen.

After the list 7940 of the documents worked on is output, when one 7941 of the documents included in the list 7940 is selected, the device 7910 may output wok history information 7950 of the selected document 7941 on the screen. Indicators 7951 and 7952 that may output the document 7941 on the screen of the device 7910 may be displayed on the work history information 7950 of the document 7941. In this regard, the indicator 7951 may indicate an original document at the time of creating the document 7941 or a document previous to a current work. The indicator 7952 may indicate a currently editing document.

Referring to FIG. 80, another example of the calendar 8020 output on the screen of the device 8010 is illustrated. A list 8040 of documents of the calendar 8020 of FIG. 80 may have a different shape from that of the list 7940 of the documents of the calendar 7920 of FIG. 79. For example, the list 8040 of the documents, work history information 8050 of the documents, and indicators 8030, 8051, and 8052 that may be output on the screen of the device 8010 may have various shapes or colors in various exemplary embodiments.

Figure 81:
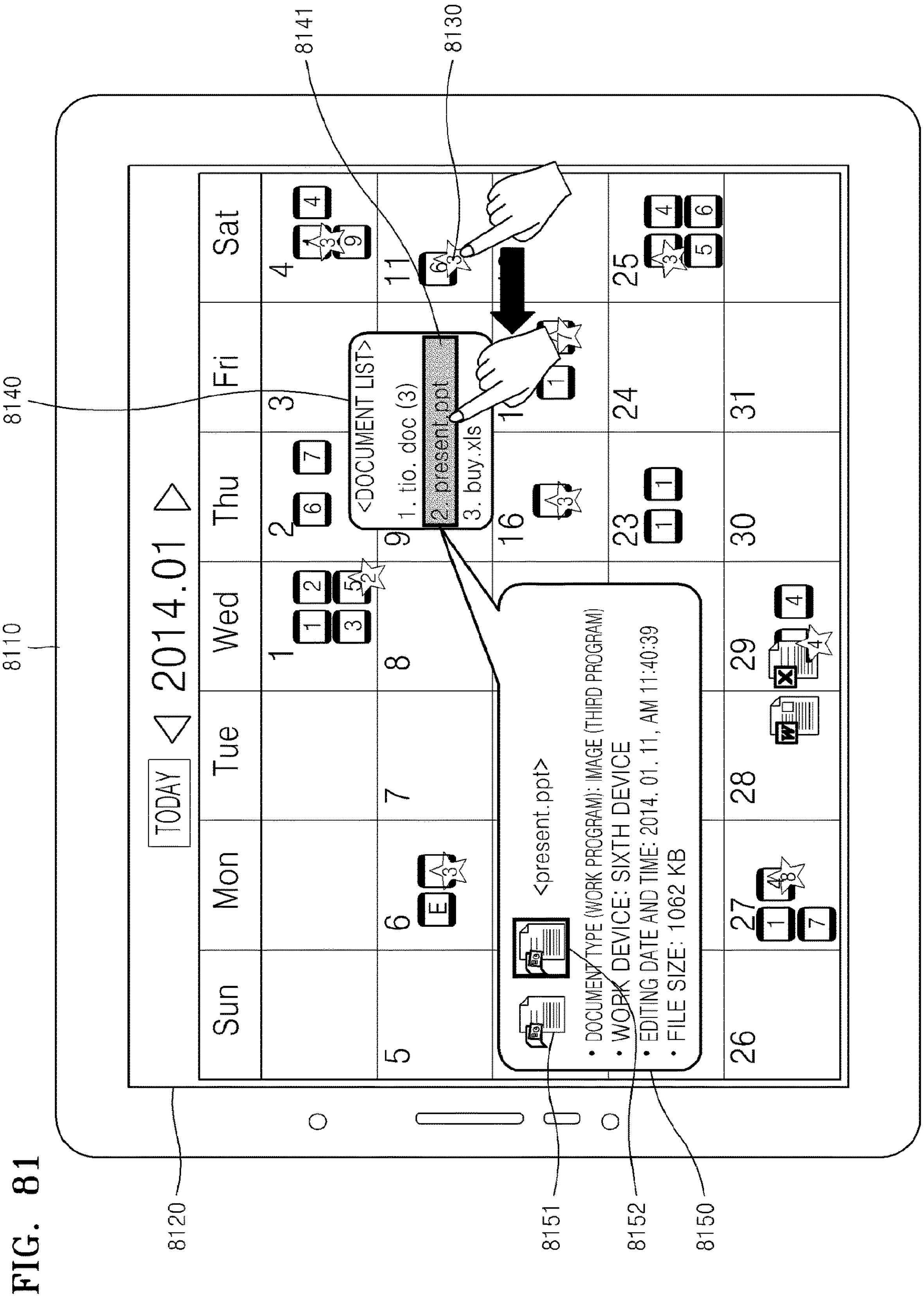
FIGS. 81 and 82 illustrate other examples of calendars output on screens of devices according to an exemplary embodiment.
Figure 82:
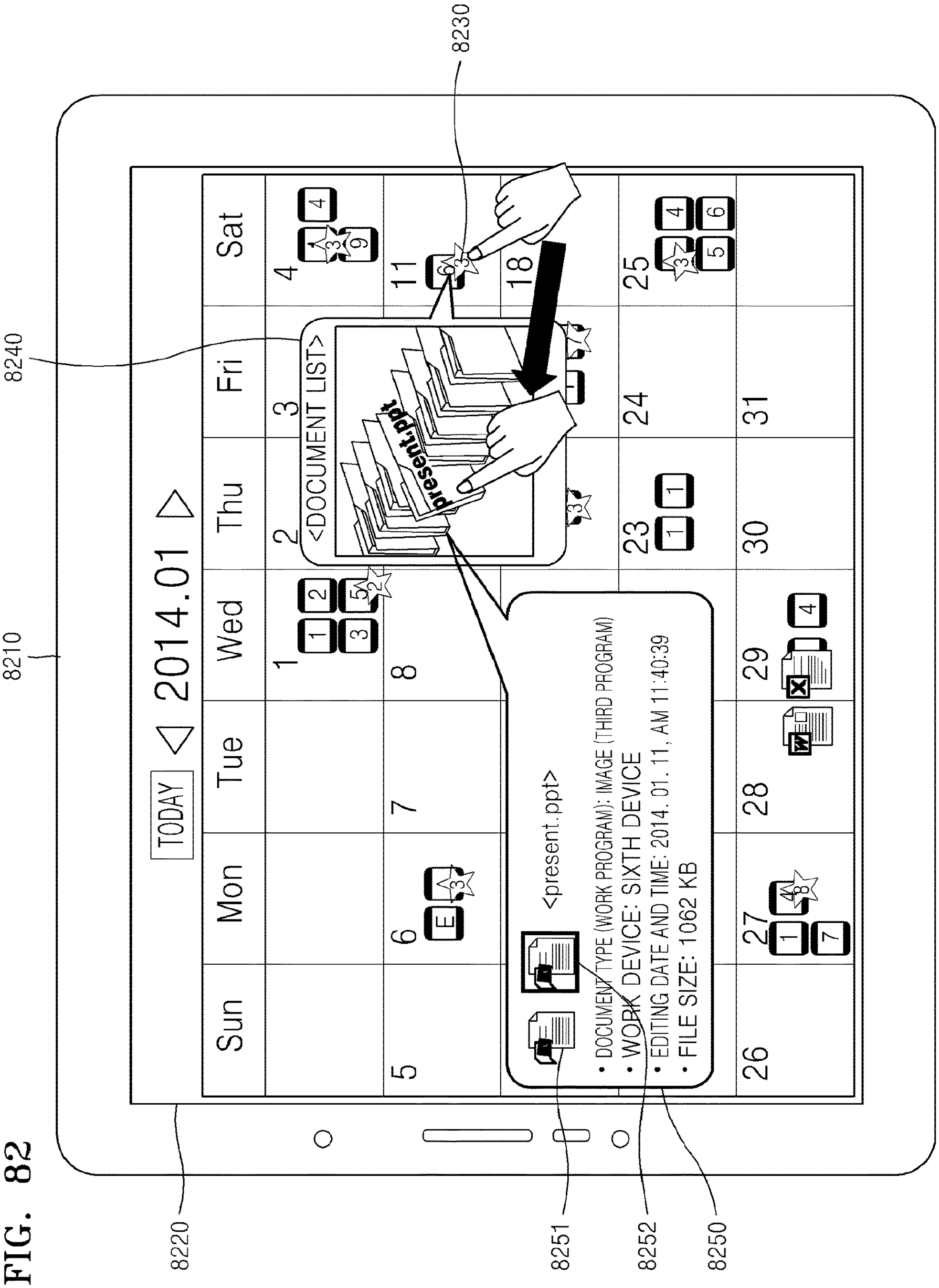

FIGS. 81 and 82 illustrate other examples of calendars 8120 and 8220 output on screens of devices 8110 and 8210, respectively, according to an exemplary embodiment.

Referring to FIG. 81, an example of the calendar 8120 output on the screen of the device 8110 is illustrated. While the monthly calendar 8120 is output on the screen of the device 8110 in FIG. 81 for convenience of description, it is understood that one or more other exemplary embodiments are not limited thereto. For example, other types of calendars may be displayed in one or more other exemplary embodiments.

When a same device works on a plurality of documents on a same date, an indicator 8030 indicating a number of the documents worked on may be displayed on the calendar 8120. For example, if it is assumed that the first device 111 works on a total number of 3 documents on Jan. 11, 2014, the indicator 8130 indicating that the 3 documents have been worked on may be displayed on a region of the calendar 8120 showing Jan. 11, 2014.

The device 8110 may select the indicator 8130 according to a user input received through the user input device 16510. When the indicator 8130 is selected, the device 8110 may output a list 8140 of the documents worked on the screen.

After the list 8140 of the documents worked on is output, when one 8141 of the documents included in the list 8140 is selected, the device 8110 may output wok history information 8150 of the selected document 8141 on the screen. Indicators 8151 and 8152 that may output the document 8141 on the screen of the device 8110 may be displayed on the work history information 8150 of the document 8141. In this regard, the indicator 8151 may indicate an original document at the time of creating the document 8141 or a document previous to a current work. The indicator 8152 may indicate a currently editing document.

Referring to FIG. 82, another example of the calendar 8220 output on the screen of the device 8210 is illustrated. A list 8240 of documents of the calendar 8220 of FIG. 82 may have a different shape from that of the list 8140 of the documents of the calendar 8120 of FIG. 81. For example, the list 8240 of the documents, work history information 8250 of the documents, and indicators 8230, 8251, and 8252 that may be output on the screen of the device 8210 may have various shapes or colors in various exemplary embodiments.

FIGS. 83A and 83B are diagrams for explaining examples of switching modes of calendars according to an exemplary embodiment.

Referring to FIG. 83A, an example of a first mode calendar 8320 output on a screen of a device 8310 is illustrated. In this regard, the first mode calendar 8320 may interwork with information related to a user's daily life. For example, the first mode calendar 8320 may interwork with information relating to a user's schedule or plan. The first mode calendar 8320 may interwork with history information of a function of the device 8310 used by a user. For example, the first mode calendar 8320 may interwork with a history of calls that the user makes by using the device 8310, a history of photographing performed by using a camera included in the device 8310, a history of memos generated by using a memo program installed in the device 8310, a history of messages or emails transmitted and received by using the device 8310, a history of a social networking service (SNS) used by using an SNS program installed in the device 8310, etc.

Referring to FIG. 83B, an example of a second mode calendar 8330 output on the screen of the device 8310 is illustrated. In this regard, the second mode calendar 8330 may interwork with work history information of a document.

Indicators 8340 and 8350 that may switch modes of the calendars 8320 and 8330 may be displayed on the calendars 8320 and 8330 that are output on the device 8310. For example, the indicator 8340 that requests output of the first mode calendar 8320 and the indicator 8350 that requests output of the second mode calendar 8330 may be displayed on the screen of the device 8310.

Schedule information relating to the work history information displayed on the second mode calendar 8330 may be displayed on the first mode calendar 8320 output on the device 8310. For example, it is assumed that the user works on a document "performance report of 2013.doc" on Dec. 23, 2013, and has a conference schedule relating to the document "performance report of 2013.doc" on Jan. 3, 2014. In this case, an indicator informing the user of reviewing "performance report of 2013.doc" may be displayed on a field of Jan. 2, 2014 of the first mode calendar 8320.

As described above, the work history information of the document may interwork with a calendar of a user, and thus the user may intuitively determine a work history of a document. The document may be displayed on a screen of a device through an indicator (for example, an icon, a symbol, an image, etc.) displayed on the calendar, and thus the user may easily read or edit the document.

A calendar displaying a personal schedule of the user and a calendar displaying a document work history of the user may be switched, thereby increasing convenience of the user.

Hereinafter, an example in which when users of the devices 110 are different, and the devices 110 perform a document work, the server 100 interworks work history information with calendars of users will be described with reference to FIGS. 84 through 86.

Figure 84:
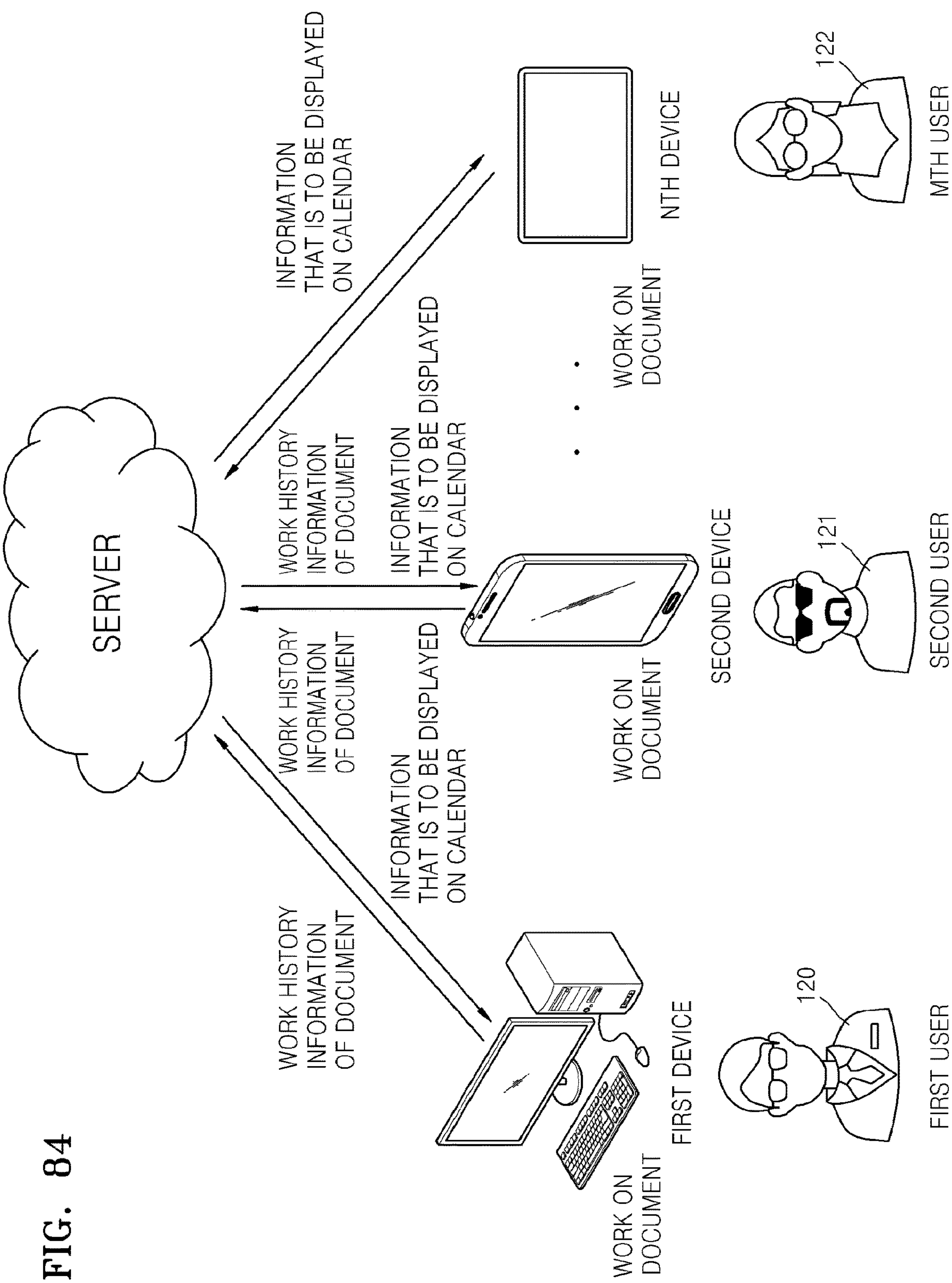
FIG. 84 is a diagram for explaining an example in which when users of devices are different, and the devices perform a document work, a server interworks work history information with calendars of users according to an exemplary embodiment.

FIG. 84 is a diagram for explaining an example in which when users of the devices 110 are different, and the devices 110 perform a document work, the server 100 interworks work history information with a calendar of a user according to an exemplary embodiment.

Referring to FIG. 84, the system 1 includes the server 100 and the devices 110. In this regard, the devices 110 mean devices of different users. For example, the first device 111 may be a device of the first user 120 the second device 112 may be a device of a second user 121, and the Nth device 114 may be a device of an Nth user 122.

At least one of the devices 110 performs the document work and transmits work history information 130 of a document to the server 100. For example, the first device 111 performs the document work and transmits the work history information 130 of the document to the server 100. In the same manner, the second device 112 through the Nth device 114 perform the document work and transmit the work history information 130 of the document to the server 100.

The server 100 interworks the work history information 130 transmitted from the devices 110 with the calendar of the user. The server 100 transmits the information 140 that is to be displayed on the calendar to the devices 110. In this regard, when the calendar is output on a screen of a device, the information 140 that is to be displayed on the calendar is information that is to be displayed on the output calendar. For example, the information 140 that is to be displayed on the calendar may include work history information that is to be output on the screen of the device when an indicator that is to be displayed on the calendar or an indicator that is displayed on the calendar is selected. According to various exemplary embodiments, the server 100 may transmit only the information, among the work history information, that is to be displayed on the calendar, or may transmit more of the work history information that that which is to be displayed. In the latter case, devices 110 may set or determine which information is to be displayed on the calendar among received information. Here, the devices 110 may determine which information is to be displayed based on a prior setting or a default setting, or based on one or more user inputs (e.g., filter requests).

In this regard, the server 100 may transmit the information 140 that is to be displayed on the calendar to only a device that requests the server 100 to transmit the information 140 that is to be displayed on the calendar, among the devices 110, although it is understood that one or more other exemplary embodiments are not limited thereto. For example, the first device 111 executes a program that outputs the calendar, and authenticates the first user 120 based on a user account input via the user input device 16510, thereby requesting the server 100 to transmit the information 140 that is to be displayed on a calendar of the first user 120.

Meanwhile, although there is no request from the first device 111, the server 100 may automatically transmit (for example, push) the information 140 that is to be displayed on the calendar to the first device 111. For example, if the first device 111 has previously requested the server 100 to transmit the information 140 that is to be displayed on the calendar of the first user 120, the server 100 may automatically transmit the information 140 that is to be displayed on the calendar of the first user 120 although there is no request from the first device 111 at a later time. According to another example, the server 100 may automatically transmit the information according to a prior setting or a default setting to automatically transmit the information at predetermined time intervals or predetermined time points.

Hereinafter, an example in which the server 100 interworks work history information with a calendar of a user will be described with reference to FIG. 85.

Figure 85:
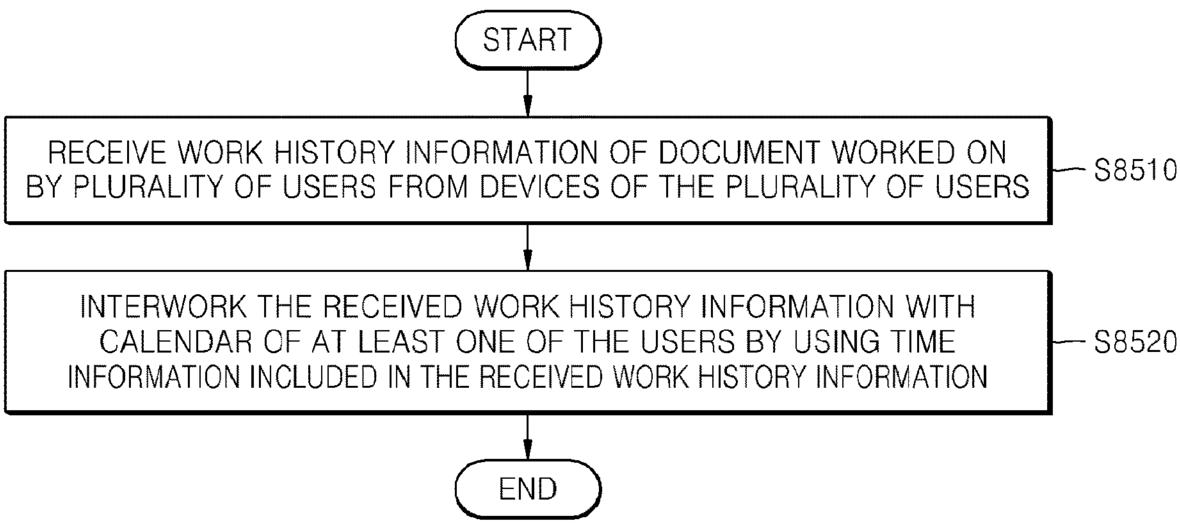
FIG. 85 is a flowchart of an example in which a server interworks work history information with a calendar of a user according to an exemplary embodiment.

FIG. 85 is a flowchart of an example in which the server 100 interworks work history information with a calendar of a user according to an exemplary embodiment.

In operation S8510, the server 100 receives the work history information of a document worked on by a plurality of users from devices of the plurality of users. In other words, devices of at least two users transmit respective document works and transmit work history information to the server 100. In this regard, the devices may transmit only a portion of the work history information to the server 100 as described above with reference to FIG. 1.

In operation S8520, the server 100 interworks the received work history information with a calendar of at least one of the users by using time information included in the received work history information. In this regard, the time information is information indicating time taken for the device to work on the document. For example, if it is assumed that the first device 111 of the first user 120 creates a document "abc.doc" at 12:28:04 p.m. of May 12, 2014, when an indicator that is to be displayed on May 12, 2014 is generated in the calendar of the user, and the indicator displayed on May 12, 2014 is selected, the server 100 may determine work history information that is to be output on a screen of the second device 112 of the second user 121. In this regard, the server 100 may interwork only a portion of the work history information received from the devices with the calendar of the at least one of the users as described above with reference to FIG. 1.

Hereinafter, an example in which when the first device 111 of the first user 120 and the second device 112 of the second user 121 work on a document, the server 100 interworks work history information with a calendar of the first user 120 will now be described with reference to FIG. 86.

Figure 86:
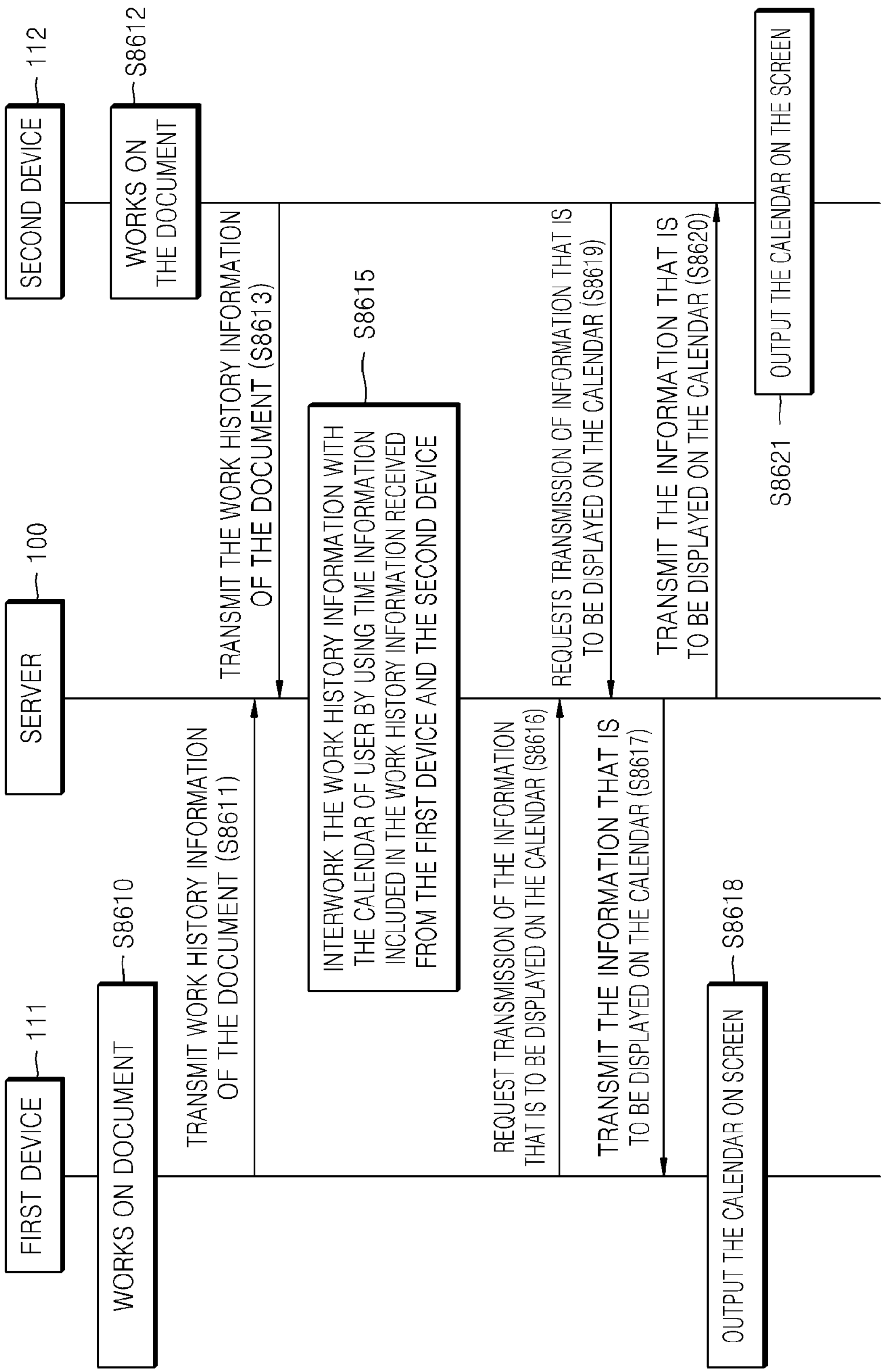
FIG. 86 is a flowchart of an example in which when a first device and a second device work on a document, a server interworks work history information with a calendar of a first user according to an exemplary embodiment.

FIG. 86 is a flowchart of an example in which when the first device 111 and the second device 112 work on a document, the server 100 interworks work history information with a calendar of the first user 120 according to an exemplary embodiment.

While the first device 111 and the second device 112 work on the document in FIG. 86, it is understood that one or more other exemplary embodiments are not limited thereto. In other words, there is no limit to the number of devices that work on the document in one or more other exemplary embodiments. If one device works on the document, all operations of the second device 112 that will be described below may be performed by the first device 111. If the number of devices that work on the document is N (where N is greater than or equal to three), the operations of the second device 112 that will be described below may be performed by at least one of the third device 113 through the Nth device 114.

In operation S8610, the first device 111 works on the document. For example, the first device 111 may execute a program used to work on the document and work on the document by using the program. For example, the program used to work on the document may be MS OFFICE WORD for the WINDOWS OS installed in the first device 111 or PAGES for the MAC OS.

If a document that the first device 111 works on is "abc.doc", and a program used to create, read, or edit "abc.doc" is a first program, the first device 111 may execute the first program and create, read, or edit "abc.doc".

In operation S8611, the first device 111 transmits the work history information of the document to the server 100. For example, the first device 111 may transmit the work history information of the document to the server 100 at the time of ending execution of the program used to work on the document or storing the document. For example, the first device 111 may transmit work history information of "abc.doc" to the server 100 at the time of storing "abc.doc" or ending execution of the first program.

In operation S8612, the second device 112 works on the document. For example, the second device 112 may execute a program used to work on the document and work on the document by using the program. If a document that the second device 112 works on is "abcd.xls", and a program used to create, read, or edit "abcd.xls" is a second program, the second device 112 may execute the second program and create, read, or edit "abcd.xls".

In operation S8613, the second device 112 transmits the work history information of the document to the server 100. For example, the second device 112 may transmit the work history information of the document to the server 100 at the time of ending execution of the program used to work on the document or storing the document. For example, the second device 112 may transmit work history information of "abcd.xls" to the server 100 at the time of storing "abcd.xls" or ending execution of the second program, although it is understood that one or more other exemplary embodiments are not limited thereto as described above. For example, according to one or more other exemplary embodiments, the second device 112 may transmit the work history information of the document in response to a predetermined event (e.g., saving, opening, etc., the document), and/or according to a prior setting or a default setting (e.g., transmit the work history information at predetermined time intervals, at predetermined time points, and/or in accordance with a device setting such as only when connected to a local area network).

In operation S8615, the server 100 interworks the work history information with the calendar of the user by using time information included in the work history information received from the first device 111 and the second device 112. For example, if it is assumed that the first device 111 stores "abc.doc" at 08:01:42 a.m. of May 18, 2014, and the second device 112 stores "abcd.xls" at 14:29:00 p.m. of May 20, 2014, the server 100 may generate a first indicator that is to be displayed on a region of the calendar corresponding to May 18, 2014 and a second calendar that is to be displayed on a region of the calendar corresponding to May 20, 2014.

In operation S8616, the first device 111 requests the server 100 to transmit information that is to be displayed on the calendar. For example, the first device 111 may request the server 100 to transmit the work history information that is to be output on a screen of a device when an indicator that is to be displayed on the calendar or an indicator displayed on the calendar is selected. For example, the first device 111 may request the server 100 to transmit the work history information that is to be output on the screen of the device when the first indicator, the second indicator, or the first and second indicators are selected.

In operation S8617, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed.

In operation S8618, the first device 111 outputs the calendar on the screen. For example, the first device 111 may output the calendar that displays the first indicator and the second indicator that are transmitted from the server 100 on the screen.

In operation S8619, the second device 112 requests the server 100 to transmit information that is to be displayed on the calendar. For example, the second device 112 may request the server 100 to transmit the work history information that is to be output on the screen of the device when the indicator that is to be displayed on the calendar or the indicator displayed on the calendar is selected. For example, the second device 112 may request the server 100 to transmit the work history information that is to be output on the screen of the device when the first indicator, the second indicator, or the first and second indicators are selected.

In operation S8620, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed.

In operation S8621, the second device 112 outputs the calendar on the screen. For example, the second device 112 may output the calendar that displays the first indicator and the second indicator that are transmitted from the server 100 on the screen.

Hereinafter, an example in which when the devices 110 perform cooperation authoring on a document, the server 100 interworks work history information with a calendar of a user will now be described with reference to FIGS. 87 through 98.

Figure 87:
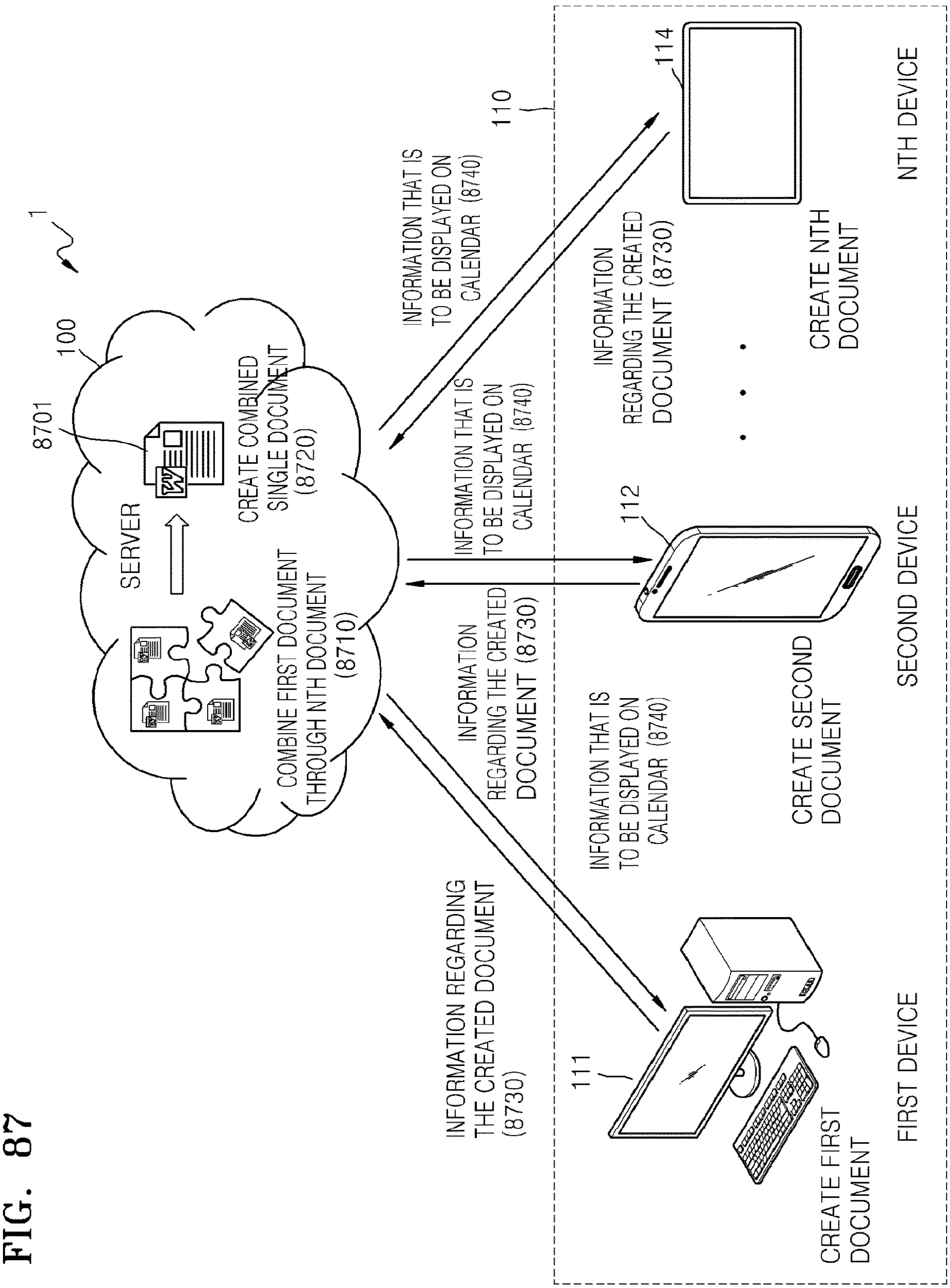
FIG. 87 is a flowchart of an example in which when devices perform cooperation authoring on a document, a server interworks work history information with a calendar of a user according to an exemplary embodiment.

FIG. 87 is a flowchart of an example in which when the first through Nth devices 111 through 114 perform cooperation authoring on a document, the server 100 interworks work history information with a calendar of a user according to an exemplary embodiment.

Referring to FIG. 87, the system 1 includes the server 100, the first device 11, the second device 112, and the Nth device 114. In this regard, the devices 110 correspond to devices used by the first user 120, the second user 121, and the Nth user 122. Alternatively, the devices 110 may correspond to devices by a same user (for example, the first user 120). That is, the number of users who use the devices 111 is not limited by one of the users.

The first device 111 creates a first document by using a program installed in the first device 111. The second device 112 creates a second document by using a program installed in the second device 112. The Nth device 114 creates an Nth document by using a program installed in the Nth device 114. In this regard, programs installed by the devices 111 may correspond to a Word program, an Excel program, a PowerPoint program, etc.

Each of the devices 111 transmits information 8730 regarding the created document to the server 100. For example, the first device 111 transmits information regarding the created first document to the server 100, the second device 112 transmits information regarding the created second document to the server 100, and the Nth device 114 transmits information regarding the created Nth document to the server 100.

As described above, the first device 111 through the Nth device 114 transmit the information 8730 regarding the created first through Nth documents to the server 100, thereby performing cooperation authoring.

Cooperation authoring refers to an activity of creating, editing, modifying, etc., a single document 8701 by a plurality of devices 110. In other words, cooperation authoring refers to creating of contents that are to be included in the single document 8701 by using the devices 110.

For example, when cooperation authoring is performed, a portion of the contents that are to be included in the single document 8701 may be contents included in the first document created by the first device 111, and the other parts thereof may be contents included in the second document created by the second device 112.

The server 100 creates 8720 the single document 8701 by combining 8710 the first document through the Nth document received from the devices 110. Thus, all of contents of the first document, contents of the second document, and contents of the Nth document may be included in the single document 8701.

When the single document 8701 is created, the server 100 may transmit creation history information of the single document 8701 to each of the devices 110 that join cooperation authoring of the single document 8701. The server 100 transmits information 8740 that is to be displayed on the calendar to the devices 110. In this regard, when the calendar is output on a screen of a device, the information 8740 that is to be displayed on the calendar is information that is to be displayed on the output calendar. For example, the work history information that is to be output on the screen of the device may be included in the information 8740 that is to be displayed on the calendar when an indicator that is to be displayed on the calendar or an indicator displayed on the calendar is selected. In this regard, the work history information may include the creation history information of the single document 8701.

The server 100 may transmit the information 8740 that is to be displayed on the calendar to only a device that requests the server 100 to transmit the information 8740 that is to be displayed on the calendar, among the devices 110. For example, the first device 111 executes a program that outputs the calendar, and authenticates the first user 120 based on a user account input via the user input device 16510, thereby requesting the server 100 to transmit the information 8740 that is to be displayed on a calendar of the first user 120.

Meanwhile, although there is no request from the first device 111, the server 100 may automatically transmit (for example, push) the information 8740 that is to be displayed on the calendar to the first device 111. For example, if the first device 111 has previously requested the server 100 to transmit the information 8740 that is to be displayed on the calendar of the first user 120, the server 100 may automatically transmit the information 8740 that is to be displayed on the calendar of the first user 120 although there is no request from the first device 111 at a later time. According to another example, the server 100 may automatically transmit the information according to a prior setting or a default setting to automatically transmit the information at predetermined time intervals or predetermined time points.

Figure 88:
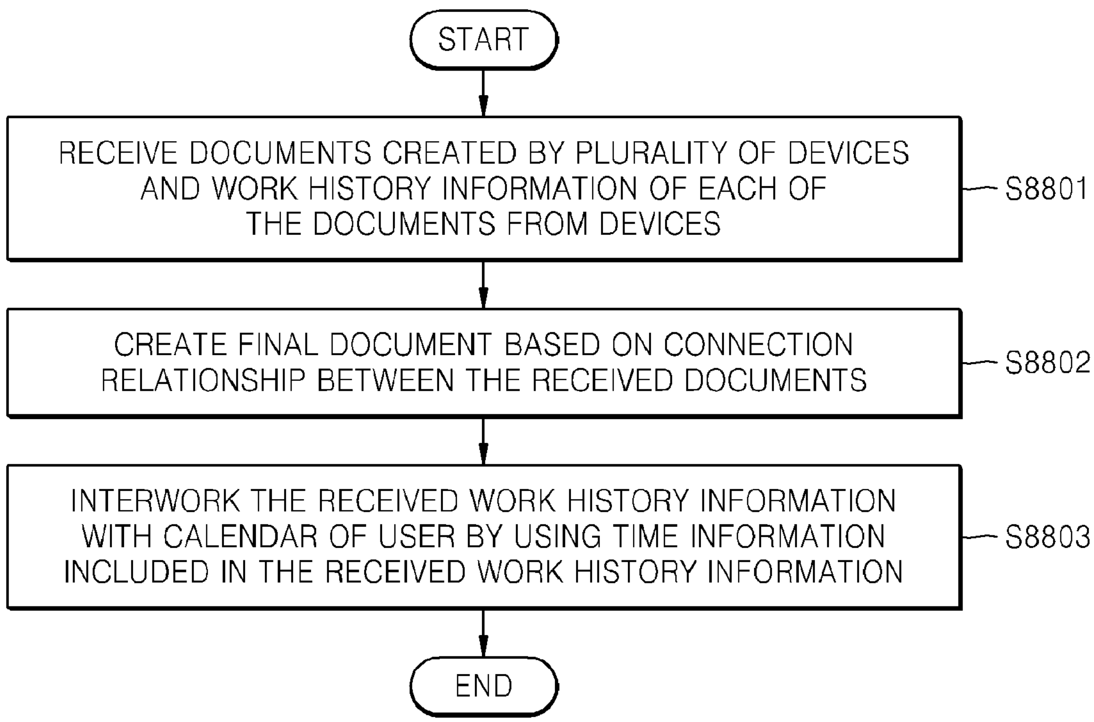
FIG. 88 is a flowchart of an example in which a server interworks work history information with a calendar of a user according to an exemplary embodiment.

FIG. 88 is a flowchart of an example in which the server 100 interworks work history information with a calendar of a user according to an exemplary embodiment.

In operation S8801, the server 100 receives documents created by the plurality of devices 110 and work history information of each of the documents from the devices 110. For example, the server 100 may receive first through Nth devices and work history information of each of the first through Nth devices from the devices 110. In this regard, the devices 100 may transmit only a portion of the work history information to the server 100 as described above with reference to FIG. 1.

In operation S8802, the server 100 creates a final document based on a connection relationship between the received documents. In this regard, the final document may correspond to the single document 8701 described with reference to FIG. 87. The connection relationship between the documents, which will be described below, is an order of seed documents that are to be connected and combined as the final document, for example, an order of a table of contents, an order of storage dates and time, etc.

In operation S8803, the server 100 interworks the received work history information with the calendar of the user by using time information included in the received work history information. In this regard, the time information is information indicating time taken for a device to work on a document. For example, if it is assumed that the first device 111 creates a document "abc.doc" at 12:28:04 p.m. of May 12, 2014, the server 100 may create an indicator that is to be displayed on May 12, 2014 of the calendar of a user of the first device 111, and, when the indicator displayed on May 12, 2014 is selected, determine work history information that is to be output on a screen of the first device 111. In this regard, the server 100 may interwork only a portion of the work history information received from the devices 110 with the calendar of the user as described above with reference to FIG. 1.

Hereinafter, examples in which when the first device 111 and the second device 112 perform cooperation authoring, the server 100 interworks work history information with a calendar of a user will now be described with reference to FIGS. 89A and 89B.

Figure 89A:
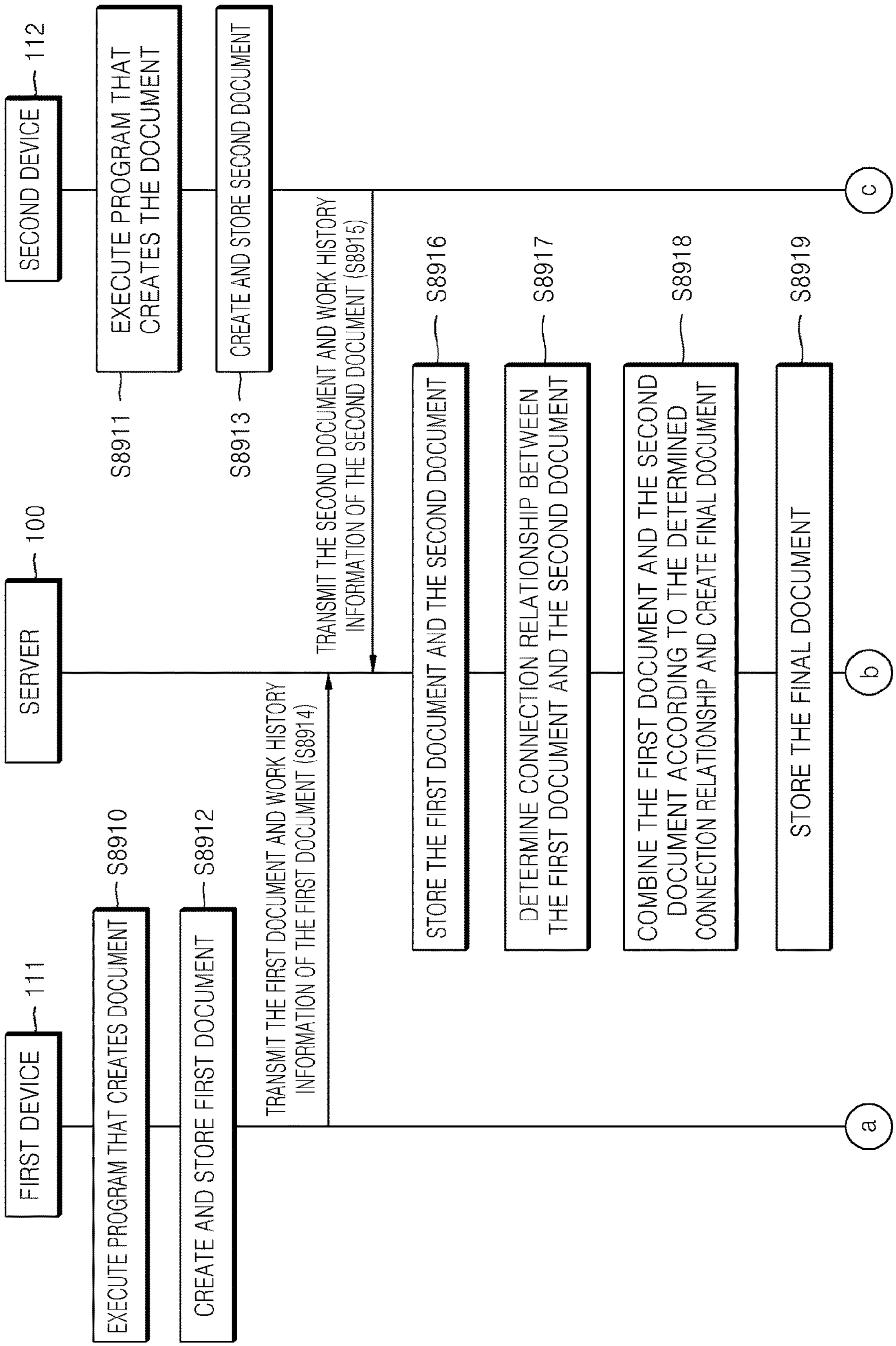
FIGS. 89A and 89B are flowcharts of examples in which when a first device and a second device perform cooperation authoring, a server interworks work history information with a calendar of a user according to an exemplary embodiment.
Figure 89B:
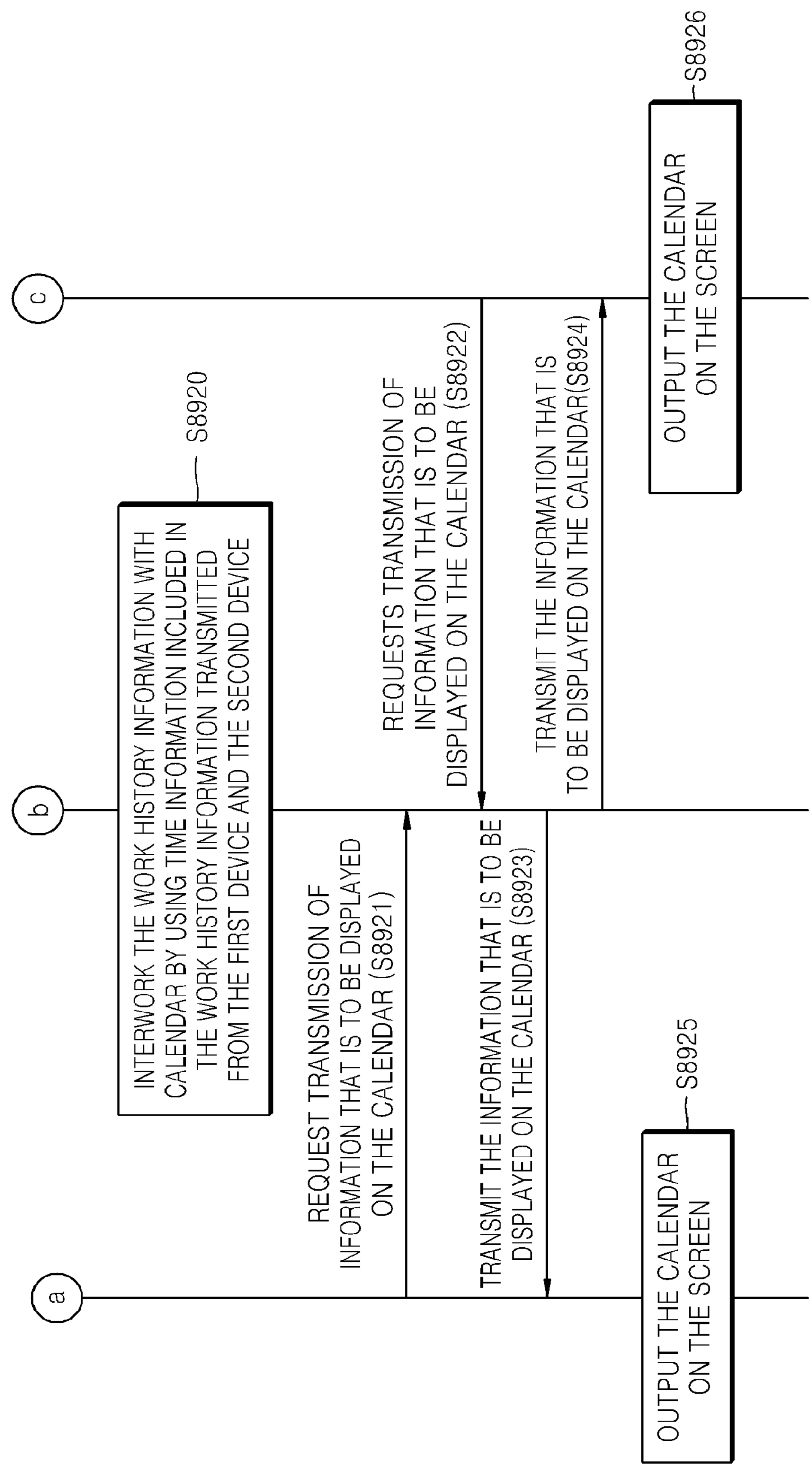

FIGS. 89A and 89B are flowcharts of examples in which when the first device 111 and the second device 112 perform cooperation authoring, the server 100 interworks work history information with a calendar of a user according to an exemplary embodiment.

While only two devices, i.e., the first device 111 and the second device 112, are illustrated in FIGS. 89A and 89B, it is understood that one or more other exemplary embodiments are not limited thereto, and any number of devices may be used. If the number of devices is N (where N is greater than or equal to three), operations of the first device 111 or operations of the second device 112 that will be described below may be performed by at least one of the third device 113 through the Nth device 114.

In operation S8910, the first device 111 executes a program that creates the document. In this regard, the program that creates the document includes a program that creates a text document or a program that creates a multimedia document. For example, the program that creates the document may be a program included in MS-OFFICE.

In operation S8911, the second device 112 executes a program that creates the document.

In operation S8912, the first device 111 creates a first document and stores the created first document.

In operation S8913, the second device 112 creates a second document and stores the created second document.

In operation S8914, the first device 111 transmits the first document and work history information of the first document to the server 100. For example, the first device 111 may transmit the work history information of the first document to the server 100 at the time of storing the first document. The work history information of the first document may be information generated when the first device 111 creates and stores the first document. For example, the work history information may include at least one of a title of the document worked on, a document type, time taken to work on the document, a title of a device that performs a document work, a device user, a program used to work on the document, a document size, and a work type. In this case, it is assumed that the user of the first device 111 logs into the server 100. Also, examples in which the first device 111 transmits the work history information to the server 100 have been described with reference to operation S411 of FIG. 4.

In operation S8915, the second device 112 transmits the second document and work history information of the second document to the server 100. For example, the second device 112 may transmit the work history information of the second document to the server 100 at the time of storing the second document. In this case, it is assumed that the user of the second device 112 logs into the server 100. Also, examples in which the second device 112 transmits the work history information of the document the server 100 have been described with reference to operation S411 of FIG. 4.

Meanwhile, an order of operations S8910 through S8915 may vary in one or more other exemplary embodiments. For example, after the second device 112 executes the program that creates the document (operation S8911), the first device 111 may execute the program that creates the document (operation S8910).

In operation S8916, the server 100 stores the first document and the second document.

In operation S8917, the server 100 determines a connection relationship between the first document and the second document. In this regard, the connection relationship between the first document and the second document may refer to an order of the first document and the second document that are to be connected and combined as a final document, for example, an order between a table of contents of the first document and a table of contents of the second document, an order between a storage date and time of the first document and a storage date and time of the second document, etc.

In operation S8918, the server 100 combines the first document and the second document according to the determined connection relationship and creates the final document.

In operation S8919, the server 100 stores the final document.

In operation S8920, the server 100 interworks the work history information with the calendar by using time information included in the work history information transmitted from the first device 111 and the second device 112.

In operation S8921, the first device 111 requests the server 100 to transmit information that is to be displayed on the calendar. For example, the first device 111 may request the server 100 to transmit the information that is to be displayed on the calendar after executing a calendar output program installed in the first device 111 and authenticating the user.

In operation S8922, the second device 112 requests the server 100 to transmit information that is to be displayed on the calendar. For example, the second device 112 may request the server 100 to transmit the information that is to be displayed on the calendar after executing a calendar output program installed in the second device 112 and authenticating the user.

In operation S8923, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed. In the latter case, the first device 111 may set or determine which information is to be displayed on the calendar among received information. Here, the first device 111 may determine which information is to be displayed based on a prior setting or a default setting, or based on one or more user inputs (e.g., filter requests).

In operation S8924, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

Meanwhile, an order of operations S8921 through S8924 may vary in one or more other exemplary embodiments.

In FIG. 89A, when the first device 111 and the second device 112 transmit the information that is to be displayed on the calendar to the server 100 in operations S8921 and S8922, respectively, the server 100 transmits the information that is to be displayed on the calendar to the first device 111 and the second device 112 in operations S8923 and S8924, although it is understood that one or more other exemplary embodiments are not limited thereto. According to another exemplary embodiment, although there is no request from the first device 111 or the second device 112, the server 100 may automatically transmit (for example, push) the information that is to be displayed on the calendar to the first device 111 or the second device 112. For example, if the first device 111 or the second device 112 has previously requested the server 100 to transmit the information that is to be displayed on the calendar, the server 100 may automatically transmit the information that is to be displayed on the calendar although there is no request from the first device 111 or the second device 112 at a later time. According to another example, the server 100 may automatically transmit the information according to a prior setting or a default setting to automatically transmit the information at predetermined time intervals or predetermined time points.

In operation S8925, the first device 111 outputs the calendar on the screen.

In operation S8922, the second device 112 outputs the calendar on the screen.

Figure 90:
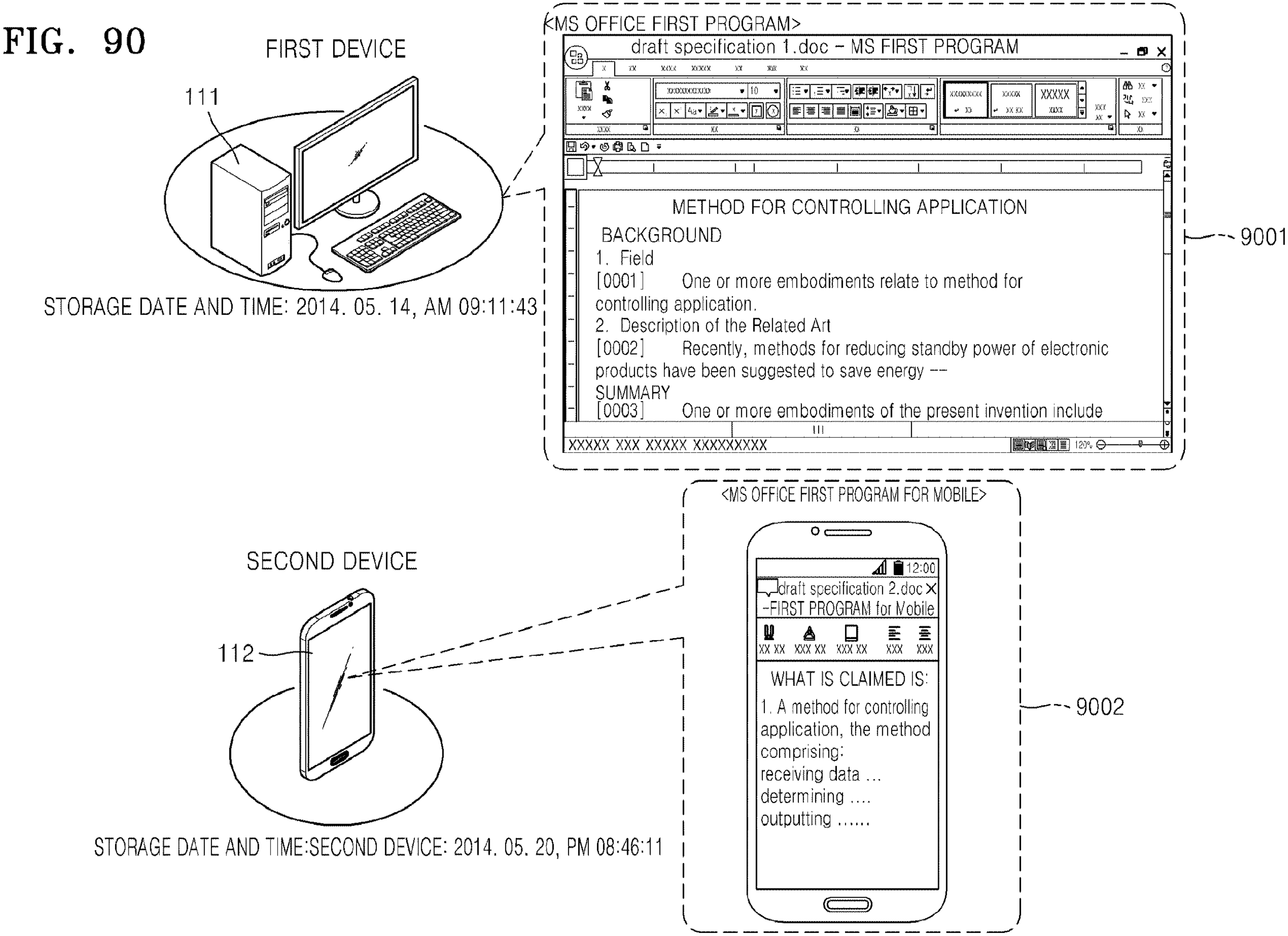
FIG. 90 is a diagram for explaining an example in which a first device and a second device create a document according to an exemplary embodiment.

FIG. 90 is a diagram for explaining an example in which the first device 111 and the second device 112 create a document according to an exemplary embodiment.

The first device 111 executes a program 9001 that creates the document. For example, the program 9001 that creates the document may be a MS OFFICE WORD program for a WINDOWS operating system (OS) or a PAGE program for a MC OS that is installed in the first device 111.

A user may prepare texts by using the program 9001 executed in the first device 111. For example, the first device 111 may create some contents of a patent specification entitled, "Method For Controlling Application", and prepared by the user through the program 9001. When the patent specification is completely created, the first device 111 may store a document named "draft specification 1.doc". In this regard, a date and time of storing the document "draft specification 1.doc" may be, for example, "09:11:43 a.m., May 14, 2014".

Meanwhile, with regard to the second device 112, the second device 112 executes a program 9002 that is installed in the second device 112 and creates the document. For example, the program 9002 that creates the document may be a MS OFFICE WORD application for a mobile OS installed in the second device 112. That is, since the second device 112 is assumed as a mobile device in FIG. 90, the program 9002 installed in the second device 112 may correspond to a mobile version of the program 9001 installed in the first device 111. However, if the second device 112 is a PC, the program 9002 installed in the second device 112 may be the MS OFFICE WORD program for the WINDOWS OS or the PAGE program.

The user may prepare texts by using the program 9002 executed in the second device 112. For example, the second device 112 may generate claims of a patent specification prepared by the user through the program 9002. When the claims of the patent specification are completely generated, the second device 112 may store a document named "draft specification 2.doc". In this regard, a date and time of storing the document "draft specification 2.doc" may be, for example, "08:46:11 p.m., May 20, 2014".

Figure 91:
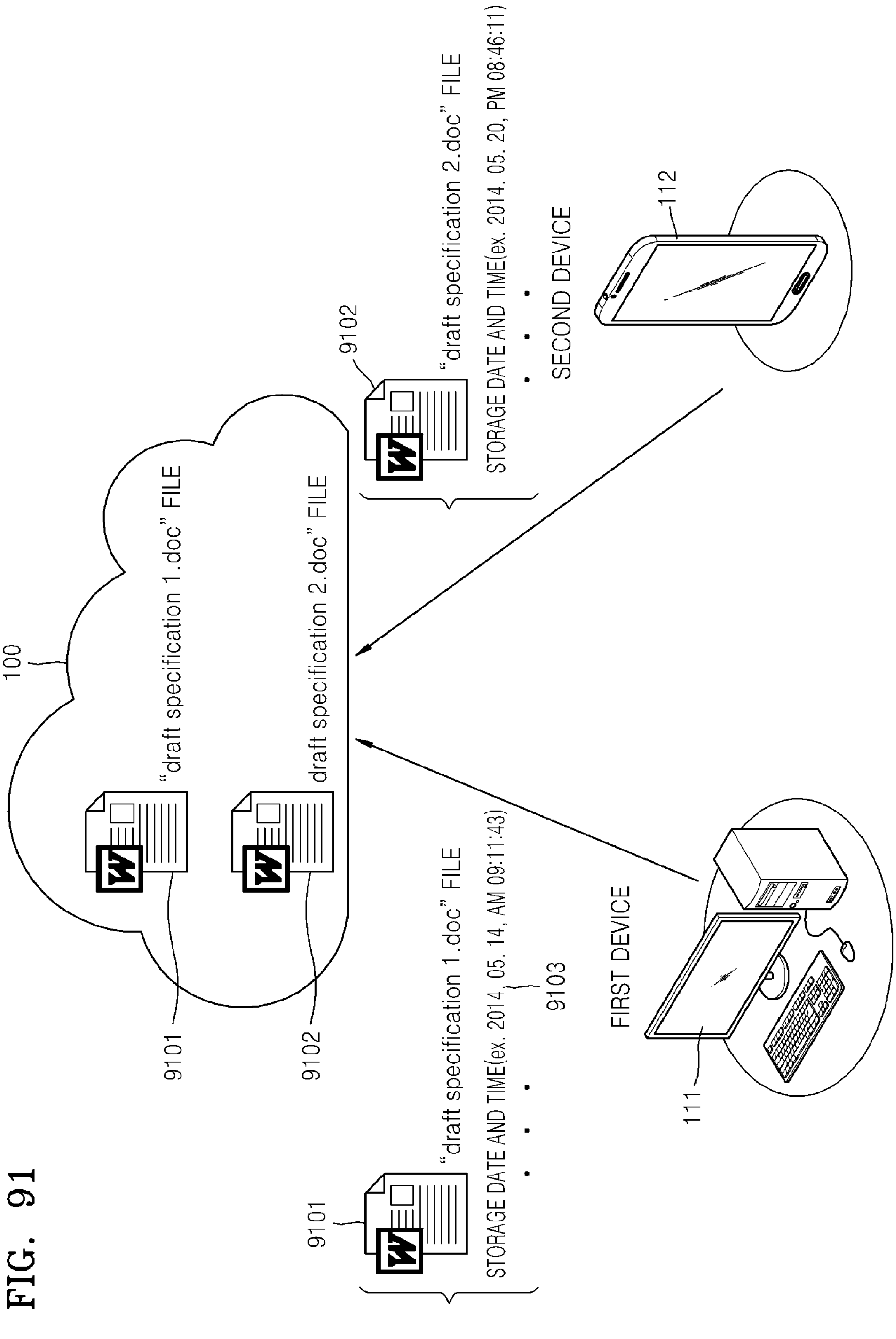
FIG. 91 is a diagram for explaining an example in which a first device and a second device transmit created documents and work history information of the documents to a server according to an exemplary embodiment.

FIG. 91 is a diagram for explaining an example in which the first device 111 and the second device 112 transmit created documents and work history information of the documents to the server 100 according to an exemplary embodiment.

As described above with reference to FIG. 90, the first device 111 stores a first document 9101 "draft specification 1.doc" at a date and time of "09:11:43 a.m., May 14, 2014". The second device 112 stores a second document 9102 "draft specification 2.doc" at a date and time of "08:46:11 p.m., May 20, 2014".

The first document 9101 "draft specification 1.doc" and the second document 9102 "draft specification 2.doc" are documents created for cooperation authoring performed by the first device 111 and the second device 112.

To combine the first document 9101 and the second document 9102 and perform cooperation authoring, the first device 111 transmits the first document 9101 "draft specification 1.doc" and work history information 9103 of the first document 9101 "draft specification 1.doc" to the server 100, and the second device 112 transmits the second document 9102 "draft specification 2.doc" and work history information 9104 of the second document 9102 "draft specification 2.doc" to the server 100.

In this regard, the work history information 9103 of the first document 9101 "draft specification 1.doc" may include the date and time of "09:11:43 a.m., May 14, 2014" of the document 9101 "draft specification 1.doc", a device title, a document creator, document information of a table of contents, etc. The work history information 9104 of the second document 9102 "draft specification 2.doc" may include the date and time of "08:46:11 p.m., May 20, 2014", a device title, a document creator, document information of the table of contents, etc.

The server 100 stores the first document 9101 "draft specification 1.doc" and work history information 9103 of the first document 9101 "draft specification 1.doc" that are transmitted from the first device 111, and the second document 9102 "draft specification 2.doc" and the work history information 9104 of the second document 9102 "draft specification 2.doc" that are transmitted from the second device 112.

The encryption of the work history information which requires a high level of security and transmission of the encrypted work history information to the server 100 have been described with reference to FIG. 7.

Figure 92:
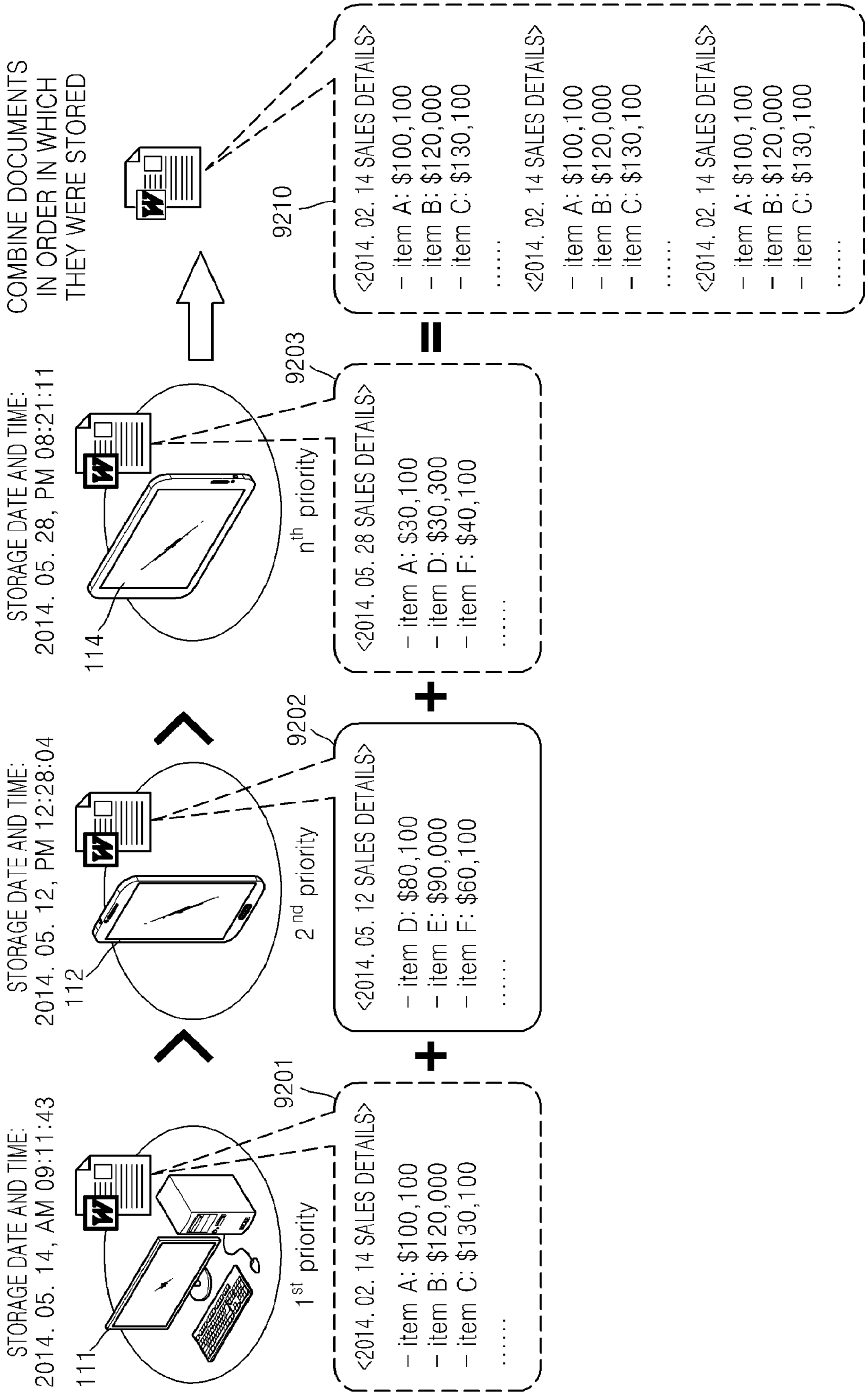
FIG. 92 is a diagram for explaining an example of a process of combining documents through cooperation authoring performed by devices according to an exemplary embodiment.

FIG. 92 is a diagram for explaining an example of a process of combining documents through cooperation authoring performed by the first device 111, the second device 112, and the Nth device 114 according to an exemplary embodiment.

The first device 111, the second device 112, and the Nth device 114 create documents for cooperation authoring by using programs that are installed in the first device 111, the second device 112, and the Nth device 114 and create the documents. In more detail, the first device 111 may create a document 9201 regarding content of <sales details of May 14, 2014> stored at a date and time of "09:11:43 a.m., May 14, 2014", the second device 112 may create a document 9202 regarding content of <sales details of May 12, 2014> stored at a date and time of "12:28:04 p.m., May 12, 2014", and the Nth device 114 may create a document 9203 regarding content of <sales details of May 28, 2014> stored at a date and time of "08:21:11 p.m., May 28, 2014".

The first device 111, the second device 112, and the Nth device 114 transmit the created documents 9201, 9202, and 9203, respectively, to the server 100.

The server 100 determines a connection relationship between the documents 9201, 9202, and 9203. In FIG. 92, the connection relationship is based on the dates and times for storing the documents 9201, 9202, and 9203.

The document 9201 is the first to be stored in the first device 111 at the date and time of "09:11:43 a.m., May 14, 2014" among the documents 9201, 9202, and 9203, and thus the document 9201 has a first priority. The document 9202 is the second to be stored in the second device 112 at the date and time of "12:28:04 p.m., May 12, 2014" among the documents 9201, 9202, and 9203, and thus the document 9202 has a second priority. The document 9203 is the last to be stored in the Nth device 114 at the date and time of "08:21:11 p.m., May 28, 2014" among the documents 9201, 9202, and 9203, and thus the document 9203 has an Nth priority (where N is a natural number). Thus, the server 100 may determine that the connection relationship between the documents 9201, 9202, and 9203 is an order of the documents 9201, 9202, and 9203.

The server 100 creates a final document 9210 as a result of cooperation authoring performed by the first device 111, the second device 112, and the Nth device 114. In more detail, the server 100 may create the final document 9210 by combining the documents 9201, 9202, and 9203 by using the determined connection relationship between the documents 9201, 9202, and 9203. That is, the server 100 may create the final document 9210 by combining contents of the documents 9201, 9202, and 9203 in an order of the document 9201 having the first priority, the document 9202 having the second priority, and the document 9203 having the Nth priority.

Thus, the server 100 may create the final document 9210 that sequentially combines the content of <sales details of May 14, 2014>, the content of <sales details of May 12, 2014>, and the content <sales details of May 28, 2014> through cooperation authoring.

Figure 93:
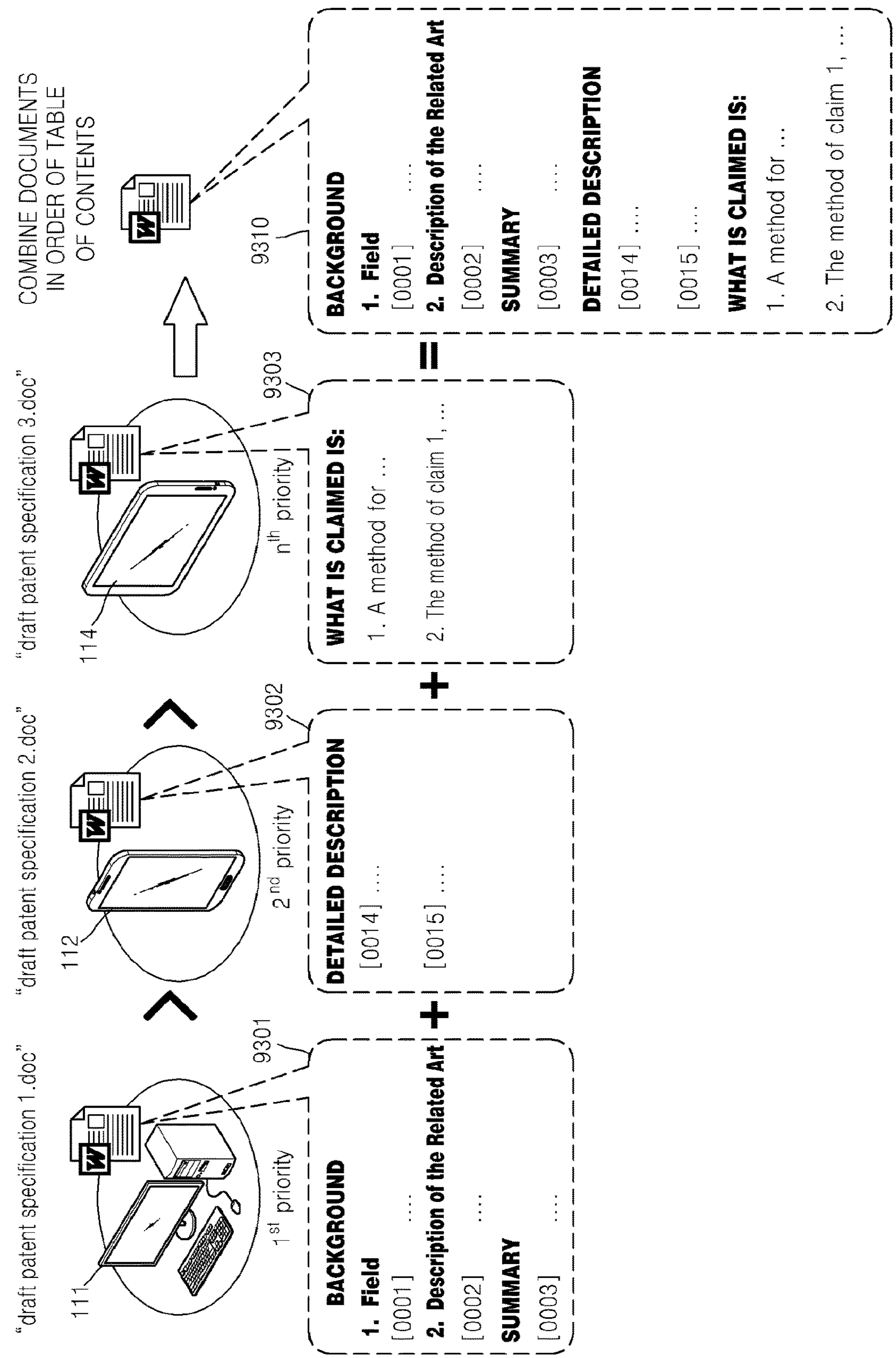
FIG. 93 is a diagram for explaining another example of a process of combining documents through cooperation authoring performed by devices according to an exemplary embodiment.

FIG. 93 is a diagram for explaining another example of a process of combining documents through cooperation authoring performed by the first device 111, the second device 112, and the Nth device 114 according to an exemplary embodiment.

The first device 111, the second device 112, and the Nth device 114 create documents for cooperation authoring by using programs that are installed in the first device 111, the second device 112, and the Nth device 114 and create the documents. In FIG. 93, an example in which the first device 111, the second device 112, and the Nth device 114 perform cooperation authoring on a document of a patent specification will now be described. In general, an order of a table of contents is determined in the patent specification in advance. For example, the order of the table of contents of the patent specification is known as "BACKGROUND", "SUMMARY", . . . , "DETAILED DESCRIPTION", . . . and, "WHAT IS CLAIMED IS:", and the example is described based on the order stated above.

The first device 111 may create a document 9301 "draft patent specification 1.doc" of "BACKGROUND" and "SUMMARY" of the patent specification. The second device 112 may create a document 9302 "draft patent specification 2.doc" of "DETAILED DESCRIPTION" of the patent specification. The Nth device 114 may create a document 9303 "draft patent specification 3.doc" of "WHAT IS CLAIMED IS:" of the patent specification.

The first device 111, the second device 112, and the Nth device 114 transmit the created documents 9301, 9302, and 9303, respectively, to the server 100.

The server 100 determines a connection relationship between the documents 9301, 9302, and 9303. In FIG. 93, the connection relationship is based on the table of contents contained in the documents 9301, 9302, and 9303.

The document 9301 contains content of a first table of contents "BACKGROUND" and "SUMMARY" compared to the documents 9302 and 9303, and thus the document 9301 has a first priority. The document 9302 contains content of a next table of contents "DETAILED DESCRIPTION", and thus the document 9302 has a second priority. The document 9303 contains content of a next table of contents "WHAT IS CLAIMED IS:", and thus the document 9203 has an Nth priority. Thus, the server 100 may determine that the connection relationship between the documents 9301, 9302, and 9303 is an order of the documents 9301, 9302, and 9303.

The server 100 creates a final document 9310 as a result of cooperation authoring performed by the first device 111, the second device 112, and the Nth device 114. In more detail, the server 100 may create the final document 9310 by combining the documents 9301, 9302, and 9303 by using the determined connection relationship between the documents 9301, 9302, and 9303. That is, the server 100 may create the final document 9310 by combining contents of the documents 9301, 9302, and 9303 in an order of the document 9301 having the first priority, the document 9302 having the second priority, and the document 9303 having the Nth priority.

Thus, the server 100 may create the final document 9310 of the patent specification that sequentially combines the contents of "BACKGROUND", "SUMMARY", . . . , "DETAILED DESCRIPTION", . . . and, "WHAT IS CLAIMED IS:" through cooperation authoring.

Figure 94A:
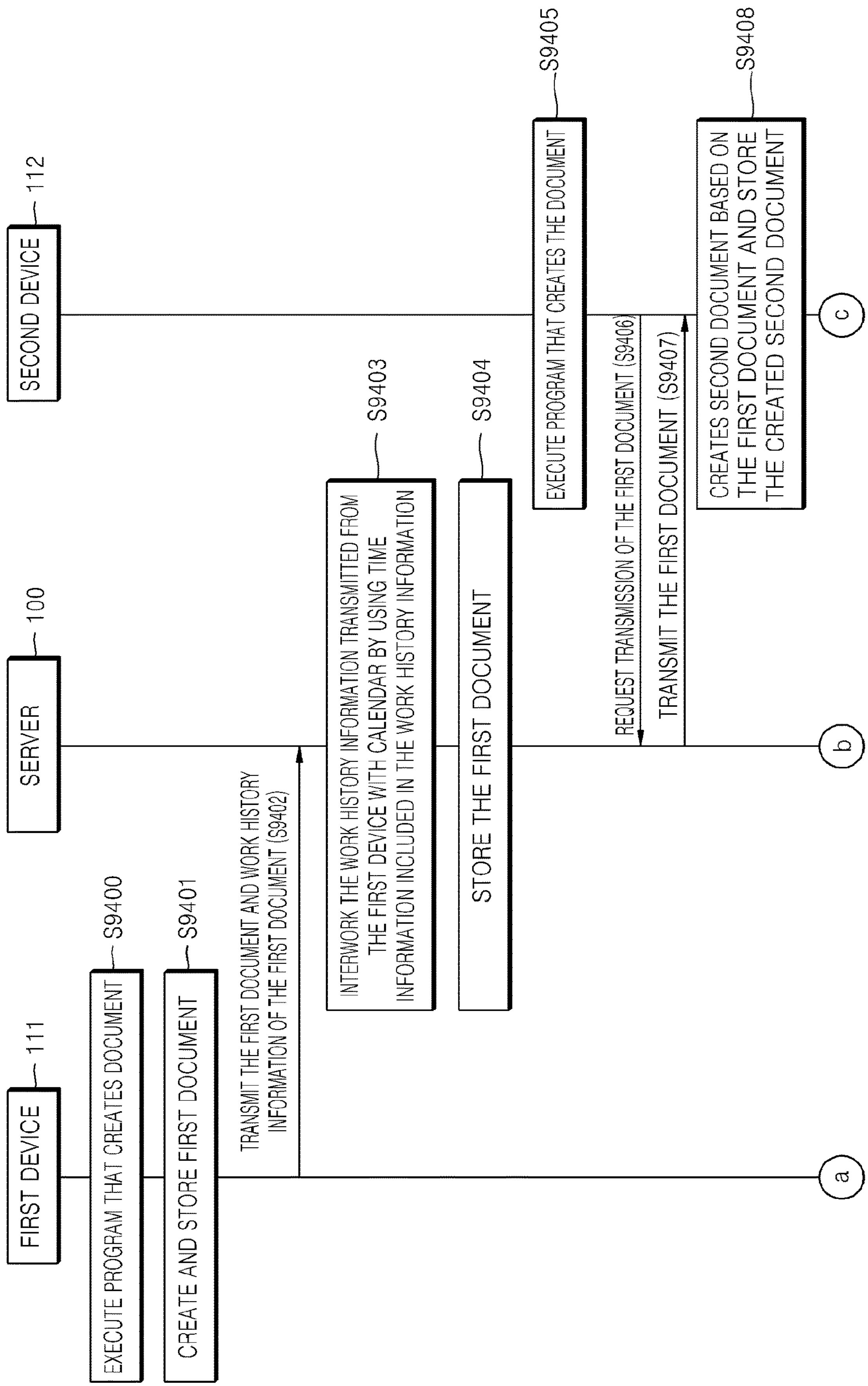
FIGS. 94A and 94B are flowcharts of another example in which when a first device and a second device perform cooperation authoring, a server interworks work history information with a calendar of a user according to an exemplary embodiment.
Figure 94B:
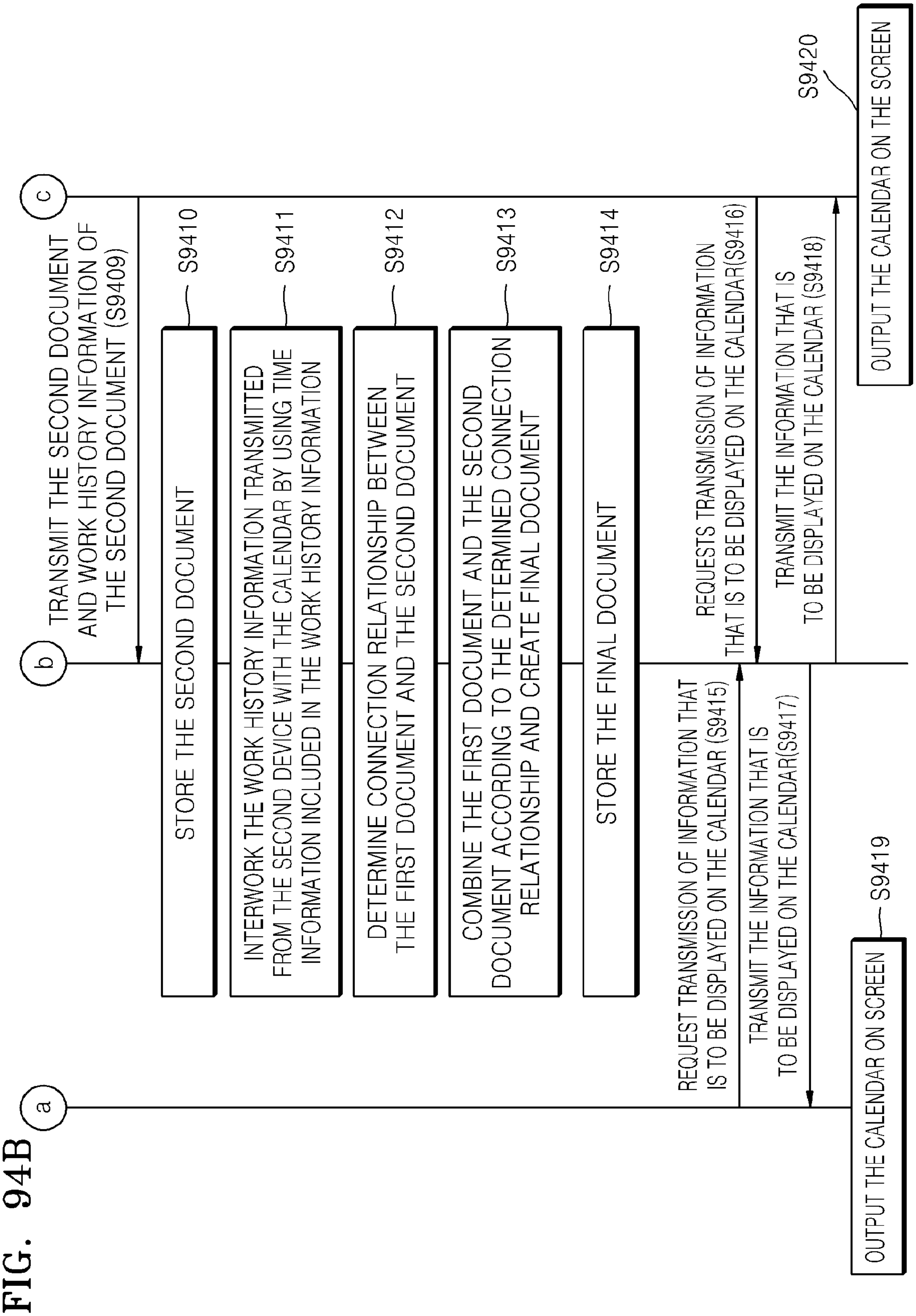

FIGS. 94A and 94B are flowcharts of another example in which when the first device 111 and the second device 112 perform cooperation authoring, the server 100 interworks work history information with a calendar of a user according to an exemplary embodiment.

While only two devices, i.e., the first device 111 and the second device 112, are illustrated in FIGS. 94A and 94B, it is understood that one or more other exemplary embodiments are not limited thereto, and any number of devices may be used. If the number of devices is N (where N is greater than or equal to three), operations of the first device 111 or operations of the second device 112 that will be described below may be performed by at least one of the third device 113 through the Nth device 114.

In operation S9400, the first device 111 executes a program that creates the document. In this regard, the program that creates the document includes a program that creates a text document or a program that creates a multimedia document. For example, the program that creates the document may be a program included in MS-OFFICE.

In operation S9401, the first device 111 creates a first document and stores the created first document.

In operation S9402, the first device 111 transmits the first document and work history information of the first document to the server 100. For example, the first device 111 may transmit the work history information of the first document to the server 100 at the time of storing the first document. The work history information of the first document is information generated when the first device 111 creates and stores the first document. For example, the work history information may include a title of the document worked on, a document type, time taken to work on the document, a title of a device that performs a document work, a device user, a program used to work on the document, a document size, and a work type. In this case, it is assumed that the user of the first device 111 logs into the server 100. Also, examples in which the first device 111 transmits the work history information of the document to the server 100 have been described with reference to operation S411 of FIG. 4.

In operation S9403, the server 100 interworks the work history information transmitted from the first device 111 with the calendar by using time information included in the work history information.

In operation S9404, the server 100 stores the first document.

In operation S9405, the second device 112 executes a program that creates the document.

In operation S9406, the second device 112 requests the server 100 to transmit the first document.

In operation S9407, the server 100 transmits the first document to the second device 112.

In operation S9408, the second device 112 creates a second document based on the first document and stores the created second document.

In operation S9409, the second device 112 transmits the second document and work history information of the second document to the server 100. For example, the second device 112 may transmit the work history information of the second document to the server 100 at the time of storing the second document. The work history information of the second document is information generated when the second device 112 creates and stores the second document. In this case, it is assumed that the user of the second device 112 logs into the server 100. Also, examples in which the second device 112 transmits the work history information of the document to the server 100 have been described with reference to operation S411 of FIG. 4.

In operation S9410, the server 100 stores the second document.

In operation S9411, the server 100 interworks the work history information transmitted from the second device 112 with the calendar by using time information included in the work history information.

In operation S9412, the server 100 determines a connection relationship between the first document and the second document. In this regard, the connection relationship between the first document and the second document may refer to an order of the first document and the second document that are to be connected and combined as a final document, for example, an order between a table of contents of the first document and a table of contents of the second document, an order between a storage date and time of the first document and a storage date and time of the second document, etc.

In operation S9413, the server 100 combines the first document and the second document according to the determined connection relationship and creates the final document.

In operation S9414, the server 100 stores the final document.

In operation S9415, the first device 111 requests the server 100 to transmit information that is to be displayed on the calendar. For example, the first device 111 may request the server 100 to transmit the information that is to be displayed on the calendar after executing a calendar output program installed in the first device 111 and authenticating the user.

In operation S9416, the second device 112 requests the server 100 to transmit information that is to be displayed on the calendar. For example, the second device 112 may request the server 100 to transmit the information that is to be displayed on the calendar after executing a calendar output program installed in the second device 112 and authenticating the user.

In operation S9417, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed. In the latter case, the first device 111 may set or determine which information is to be displayed on the calendar among received information. Here, the first device 111 may determine which information is to be displayed based on a prior setting or a default setting, or based on one or more user inputs (e.g., filter requests).

In operation S9418, the server 100 transmits the information that is to be displayed on the calendar to the second device 112.

An order of operations S9415 through S9418 may vary in one or more other exemplary embodiments.

In FIG. 94B, when the first device 111 and the second device 112 transmit the information that is to be displayed on the calendar to the server 100 in operations S9415 and S9416, respectively, the server 100 transmits the information that is to be displayed on the calendar to the first device 111 and the second device 112 in operations S9417 and S9418, although it is understood that one or more other exemplary embodiments are not limited thereto. According to another exemplary embodiment, although there is no request from the first device 111 or the second device 112, the server 100 may automatically transmit (for example, push) the information that is to be displayed on the calendar to the first device 111 or the second device 112, as described above.

In operation S9419, the first device 111 outputs the calendar on the screen.

In operation S9420, the second device 112 outputs the calendar on the screen.

Figure 95:
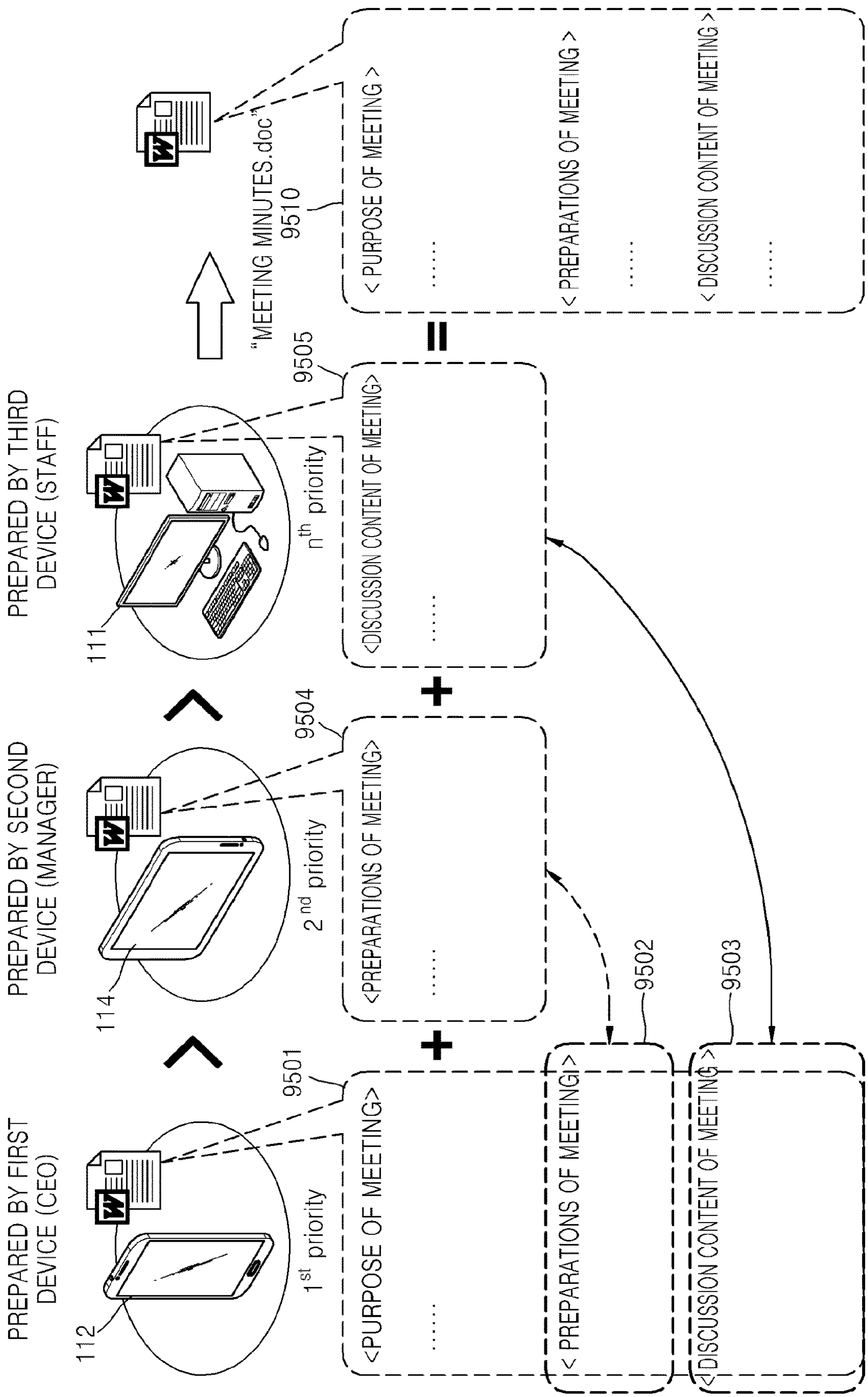
FIG. 95 is a diagram for explaining another example of a process of combining documents through cooperation authoring performed by devices according to an exemplary embodiment.

FIG. 95 is a diagram for explaining another example of a process of combining documents through cooperation authoring performed by the first device 111, the second device 112, and the Nth device 114 according to an exemplary embodiment.

The first device 111, the second device 112, and the Nth device 114 create documents for cooperation authoring by using programs that are installed in the first device 111, the second device 112, and the Nth device 114 and create the documents. In FIG. 95, an example in which the first device 111, the second device 112, and the Nth device 114 perform cooperation authoring on minutes of a meeting will now be described. In FIG. 95, it is assumed that a table of contents of the minutes is determined in an order of <purpose of meeting>, <preparations of meeting> 9502, and <discussion content of meeting> 9503. Furthermore, it is assumed that the second device 112 is used by a Chief Executive Officer (CEO) of a company, the Nth device 114 is used by a manager of the company, and the first device 111 is used by a staff of the company.

The CEO may create a document 9501 in which the table of contents of the meeting minutes is arranged by using the second device 112 of the CEO to hold the meeting for the <purpose of meeting> of a specific subject.

The document 9501 created by the second device 112 may be transmitted to the server 100. For example, as described above with reference to operations 9400 through S9407 of FIG. 94A, the document 9501 may be transmitted to the Nth device 114 of the manager and the first device 111 of the staff from the second device 112 through the server 100.

If the <purpose of meeting> is determined by the CEO, contents that are to be included in the other items of the meeting minutes, the <preparations of meeting> 9502 and the <discussion contents of meeting> 9503, may be prepared by staff of the CEO.

When the document 9501 is transmitted to the N device 114 of the manager through the server 100, the manager may create a document 9504 regarding the <preparations of meeting> 9502 by using the Nth device 114. When the document 9501 is transmitted to the first device 111 of the staff through the server 100, the staff may create a document 9505 regarding the <discussion content of meeting> 9503 by using the first device 111.

The first device 111 and the Nth device 114 transmit the created documents 9504 and 9505, respectively, to the server 100.

The server 100 determines a connection relationship between the documents 9501, 9504, and 9505. In FIG. 95, the connection relationship is based on a table of contents contained in the documents 9501, 9504, and 9505.

The document 9501 contains content of the first table of contents <purpose of meeting> compared to the documents 9504 and 9505, and thus the document 9501 has a first priority. The document 9504 contains content of the next table of contents <preparations of meeting> 9502, and thus the document 9504 has a second priority. The document 9505 contains content of the next table of contents <discussion content of meeting> 9503, and thus the document 9505 has an Nth priority. Thus, the server 100 may determine that the connection relationship between the documents 9501, 9504, and 9505 is an order of the documents 9501, 9504, and 9505.

The server 100 creates a final document 9510 as a result of cooperation authoring performed by the first device 111, the second device 112, and the Nth device 114. In more detail, the server 100 may create the final document 9510 by combining the documents 9501, 9504, and 9505 by using the determined connection relationship between the documents 9501, 9504, and 9505. That is, the server 100 may create the final document 9510 by combining contents of the documents 9501, 9504, and 9505 in an order of the document 9501 having the first priority, the document 9502 having the second priority, and the document 9503 having the Nth priority.

Thus, the server 100 may create the final document 9510 of the minutes of the meeting that sequentially combines the contents of "<purpose of meeting>, <preparations of meeting> 9502, and <discussion content of meeting> 9503 through cooperation authoring.

Meanwhile, the server 100 may determine that the connection relationship between the documents 9501, 9504, and 9505 is based on ranks of writers who create the documents 9501, 9504, and 9505.

In more detail, the document 9501 is created by the CEO with the highest rank compared to the documents 9504 and 9505, and thus the document 9501 has the first priority. The document 9504 is created by the manager with a next rank, and thus the document 9504 has the second priority. The document 9505 is created by the staff with a next rank, and thus the document 9505 has the Nth priority. Thus, the server 100 may determine that the connection relationship between the documents 9501, 9504, and 9505 is the order of the documents 9501, 9504, and 9505. Accordingly, the server 100 may create the final document 9510 that sequentially combines contents of the documents 9501, 9504, and 9505 in an order of the document 9510 having the first priority, the document 9504 having the second priority, and the document 9505 having the Nth priority.

Figure 96:
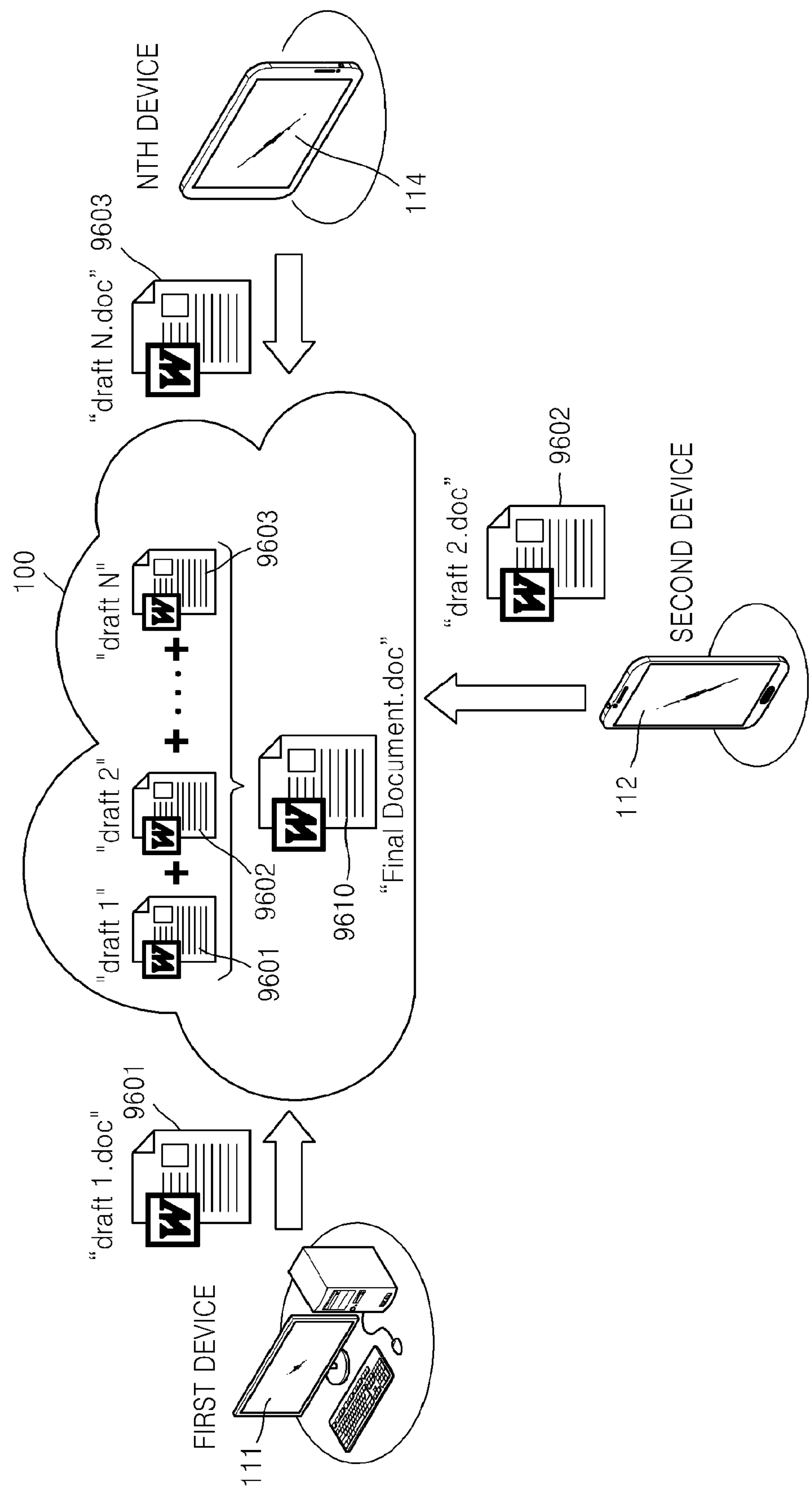
FIG. 96 is a diagram for explaining an example of creating a final document through cooperation authoring performed by devices according to an exemplary embodiment.

FIG. 96 is a diagram for explaining an example of creating a final document 9610 through cooperation authoring performed by the first device 111, the second device 112, and the Nth device 114 according to an exemplary embodiment.

To perform cooperation authoring, the first device 111 transmits a first document 9601 "draft 1.doc" to the server 100, the second device 112 transmits a second document 9602 "draft 2.doc" to the server 100, and the Nth device 114 transmits an Nth document 9603 "draft N.doc" to the server 100.

The server 100 determines a connection relationship between the first document 9601 through the Nth document 9603. In this regard, the connection relationship between the first document 9610 through the Nth document 9603 may refer to an order of the document 9601 through the Nth document 9603 that are to be connected and combined as the final document 9610, which was described in the examples above.

The server 100 creates the final document 9601 that combines the first document 9601 through the Nth document 9603 according to the determined connection relationship and stores the final document 9610.

Figure 97:
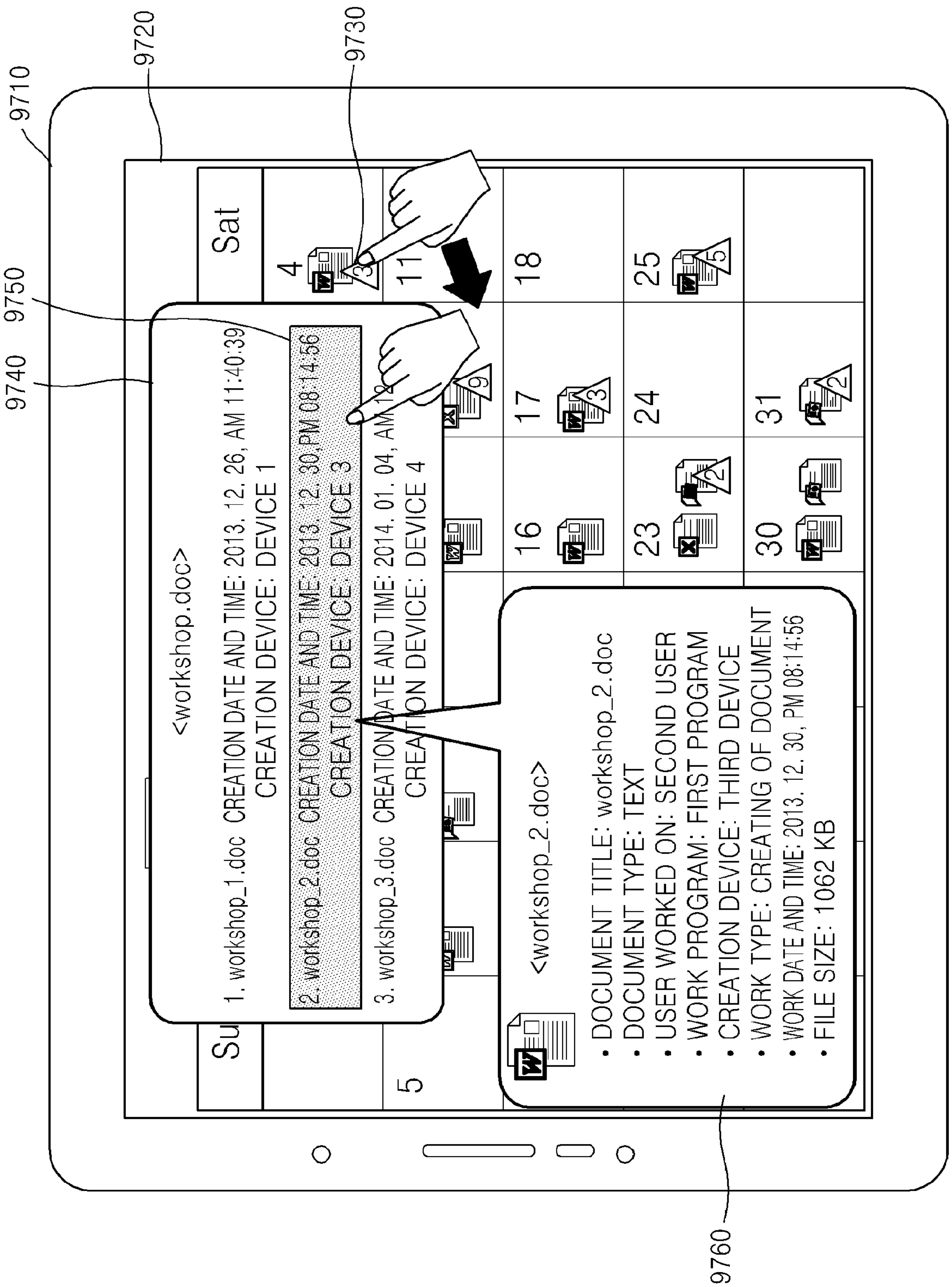
FIG. 97 illustrates an example of displaying histories of documents created through cooperation authoring on a monthly calendar displayed on a screen of a device according to an exemplary embodiment.

FIG. 97 illustrates an example of displaying histories of documents created through cooperation authoring on a monthly calendar 9720 displayed on a screen of a device 9710 according to an exemplary embodiment.

Referring to FIG. 97, the monthly calendar 9720 is output on the screen of the device 9710. An indicator 9730 in a shape of "A" indicating a cooperation authoring document may be displayed on the calendar 9720. A number included in the shape "A" of the indicator 9730 may refer to a number of documents combined for cooperation authoring. For example, the indicator 9730 displayed on May 4, 2014 of the calendar 9720 may indicate 3 documents combined through cooperation authoring.

The device 9710 may select the indicator 9730 in the shape of "A" according to a user input received through the user input device 16510. When the indicator 9730 is selected, the device 9710 may output work history information 9740 of the cooperation authoring document on the screen.

The work history information 9740 of the cooperation authoring document includes information regarding a file name of the cooperation authoring document "workshop.doc" and information of a list of documents combined through cooperation authoring, "workshop_1.doc", "workshop_2.doc", and "workshop_3.doc". The work history information 9740 of the cooperation authoring document may also include information regarding dates and times when "workshop_1.doc", "workshop_2.doc", and "workshop_3.doc" are created, devices that create "workshop_1.doc", "workshop_2.doc", and "workshop_3.doc", etc. For example, the work history information 9740 of the cooperation authoring document may include information that a creation date and time of "workshop_2.doc" is "11:40:39 a.m., Dec. 26, 2013" and a device that creates "workshop_2.doc" is the first device 111.

The device 9710 may select an item 9750 of "workshop_2.doc" that is a portion of the cooperation authoring document according to the user input received through the user input device 16510. When the item 9750 is selected, the device 9710 may output work history information 9760 of "workshop_2.doc" corresponding to the item 9750 on the screen.

Meanwhile, work history information of the cooperation authoring document may be displayed in the same manner as described above with respect to another indicator 9770.

Figure 98:
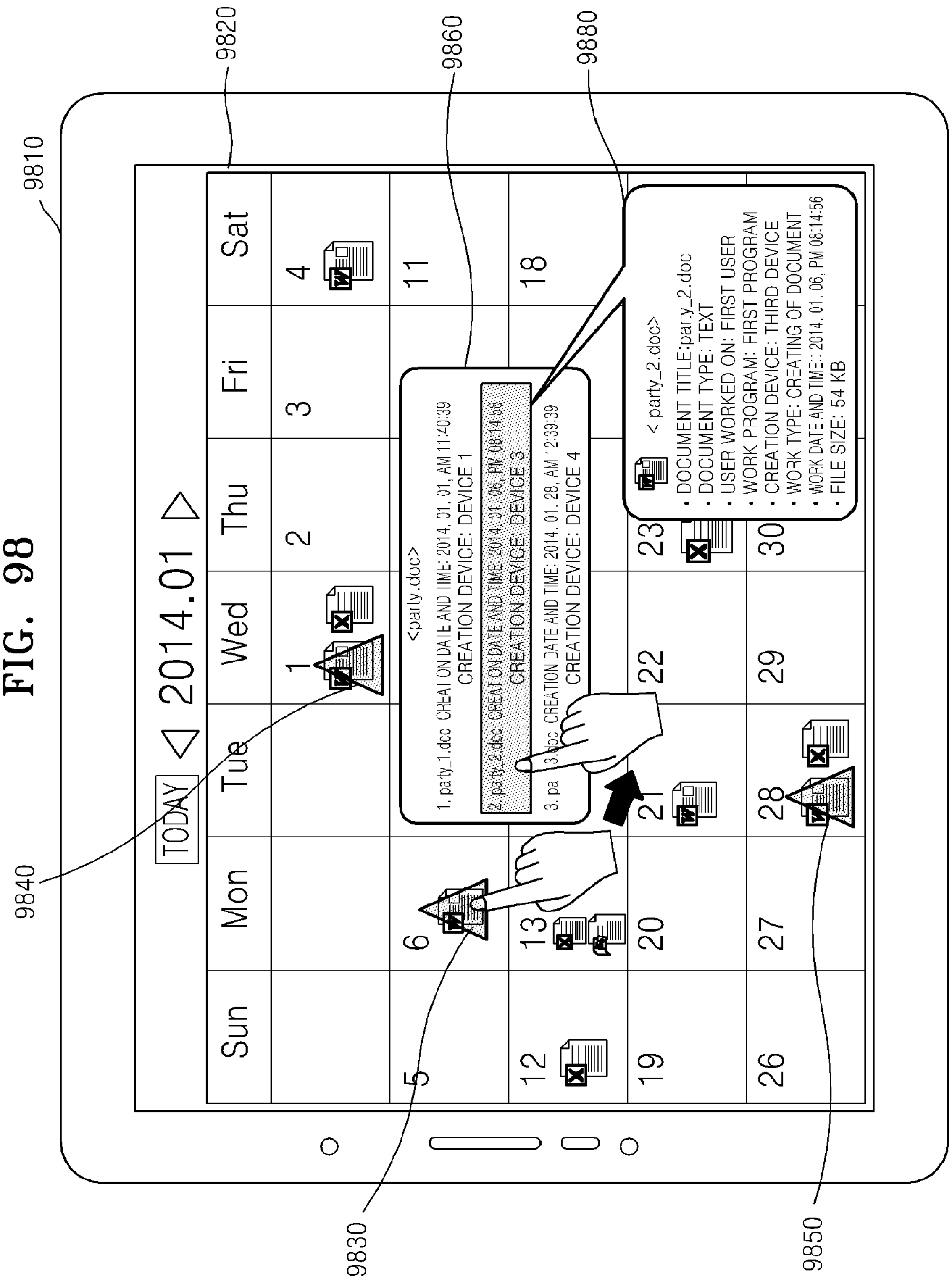
FIG. 98 illustrates another example of displaying histories of documents created through cooperation authoring on a monthly calendar displayed on a screen of a device according to an exemplary embodiment.

FIG. 98 illustrates another example of displaying histories of documents created through cooperation authoring on a monthly calendar 9820 displayed on a screen of a device 9810 according to an exemplary embodiment.

Referring to FIG. 98, the monthly calendar 9820 may be output on the screen of the device 9810.

The device 9810 may select an indicator 9830 in the shape of "Δ" displayed on Jan. 6, 2014 of the calendar 9820 according to a user input received through the user input device 16510. When the indicator 9830 is selected, the device 9810 displays an indicator 9840 on a date of Jan. 1, 2014 and displays an indicator 9850 on a date of Jan. 28, 2014.

When the indicator 9830 is selected, the indicators 9840 and 9850 displayed with the indicator 9830 are displayed to distinguish a document designated by the indicator 9830 with a cooperation authoring document. That is, the document designated by the indicator 9830 displayed on Jan. 6, 2014 is used to perform cooperation authoring, along with a document designated by the indicator 9840 displayed on Jan. 1, 2014 and the indicator 9850 displayed on Jan. 28, 2014.

Meanwhile, when the indicator 9830 is selected, the device 9810 may output work history information 9860 of the cooperation authoring document on the screen.

The work history information 9860 of the cooperation authoring document includes information regarding "party.doc" a file name of the cooperation authoring document, and information regarding of a list of documents combined for cooperation authoring "party_1.doc", "party_2.doc", and "party_3.doc". The work history information 9860 of the cooperation authoring document may also include information regarding dates and times when "party_1.doc", "party_2.doc", and "party_3.doc" are created, devices that create "party_1.doc", "party_2.doc", and "party_3.doc", etc. For example, the work history information 9860 of the cooperation authoring document may include information that a creation date and time of "party_2.doc" is "08:14:56 p.m., Jan. 6, 2014" and a device that creates "party_2.doc" is the third device 113.

The device 9810 may select an item 9870 of "party_2.doc" that is a portion of the cooperation authoring document according to the user input received through the user input device 16510. When the item 9870 is selected, the device 9810 may output work history information 9880 of "party_2.doc" corresponding to the item 9870 on the screen.

As described above, when a plurality of users create a document through cooperation authoring, work history information relating to cooperation authoring performed on the document may interwork with a calendar, thereby effectively managing and utilizing the document.

Hereinafter, examples in which when at least one of the devices 110 corresponds to the server 100, and the devices 110 perform a document work, the at least one device that acts as the server 100 interworks work history information with a calendar of a user will be described with reference to FIGS. 99 and 100.

Figure 99:
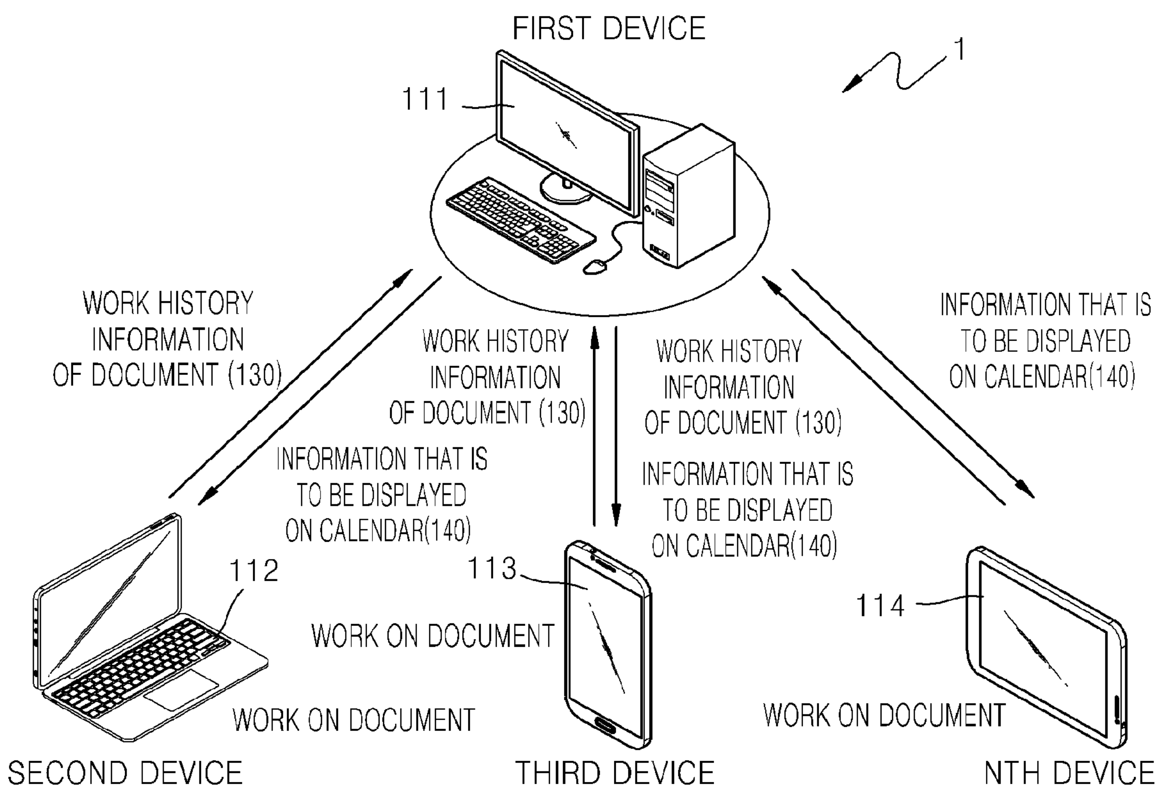
FIG. 99 is a diagram for an example in which when at least one of devices corresponds to a server, and the devices perform a document work, the at least one device that acts as the server interworks work history information with a calendar of a user according to an exemplary embodiment.

FIG. 99 is a diagram for an example in which when at least one of the devices 110 corresponds to the server 100, and the devices 110 perform a document work, the at least one device that acts as the server 100 interworks work history information with a calendar of a user according to an exemplary embodiment.

Referring to FIG. 99, the system 1 includes the first device 111 and the second device 112 through the Nth device 114. In this regard, the first device 111 is a device acting as the server 100 of FIG. 2.

At least one of the second device 112 through the Nth device 114 performs a document work and transmits work history information 130 of the document to the first device 111. For example, the second device 112 performs the document work and work history information of the document to the first device 111. In the same manner, the third device 113 through the Nth device 114 perform the document work and transmit the work history information 130 of the document to the first device 111.

The first device 111 interworks the work history information 130 transmitted from the second device 112 through the Nth device 114 with the calendar of the user. The first device 111 transmits information that is to be displayed on the calendar to at least one of the second device 112 through the Nth device 114. In this regard, when the calendar is output on a screen of a device, the information that is to be displayed on the calendar is information that is to be displayed on the output calendar. For example, the information that is to be displayed on the calendar may include work history information that is to be output on the screen of the device when an indicator that is to be displayed on the calendar or an indicator that is displayed on the calendar is selected.

In this regard, the first device 111 may transmit the information that is to be displayed on the calendar to only a device that requests the first device 111 to transmit the information that is to be displayed on the calendar, among the second device 112 through the Nth device 114. For example, the second device 112 executes a program that outputs the calendar, and authenticates the user based on a user account input via the user input device 16510, thereby requesting the first device 111 transmit the information that is to be displayed on a calendar of the user.

Meanwhile, although there is no request from the second device 112, the first device 111 may automatically transmit (for example, push) the information that is to be displayed on the calendar to the second device 112. For example, if the second device 112 has previously requested the first device 111 to transmit the information that is to be displayed on the calendar, the first device 111 may automatically transmit the information that is to be displayed on the calendar although there is no request from the second device 112 at a later time. According to another example, the first device 111 may automatically transmit the information according to a prior setting or a default setting to automatically transmit the information at predetermined time intervals or predetermined time points.

Hereinafter, an example in which when the second device 112 and the third device 113 perform a document work, the first device 111 interworks work history information with a calendar of a user will be described with reference to FIG. 100.

Figure 100:
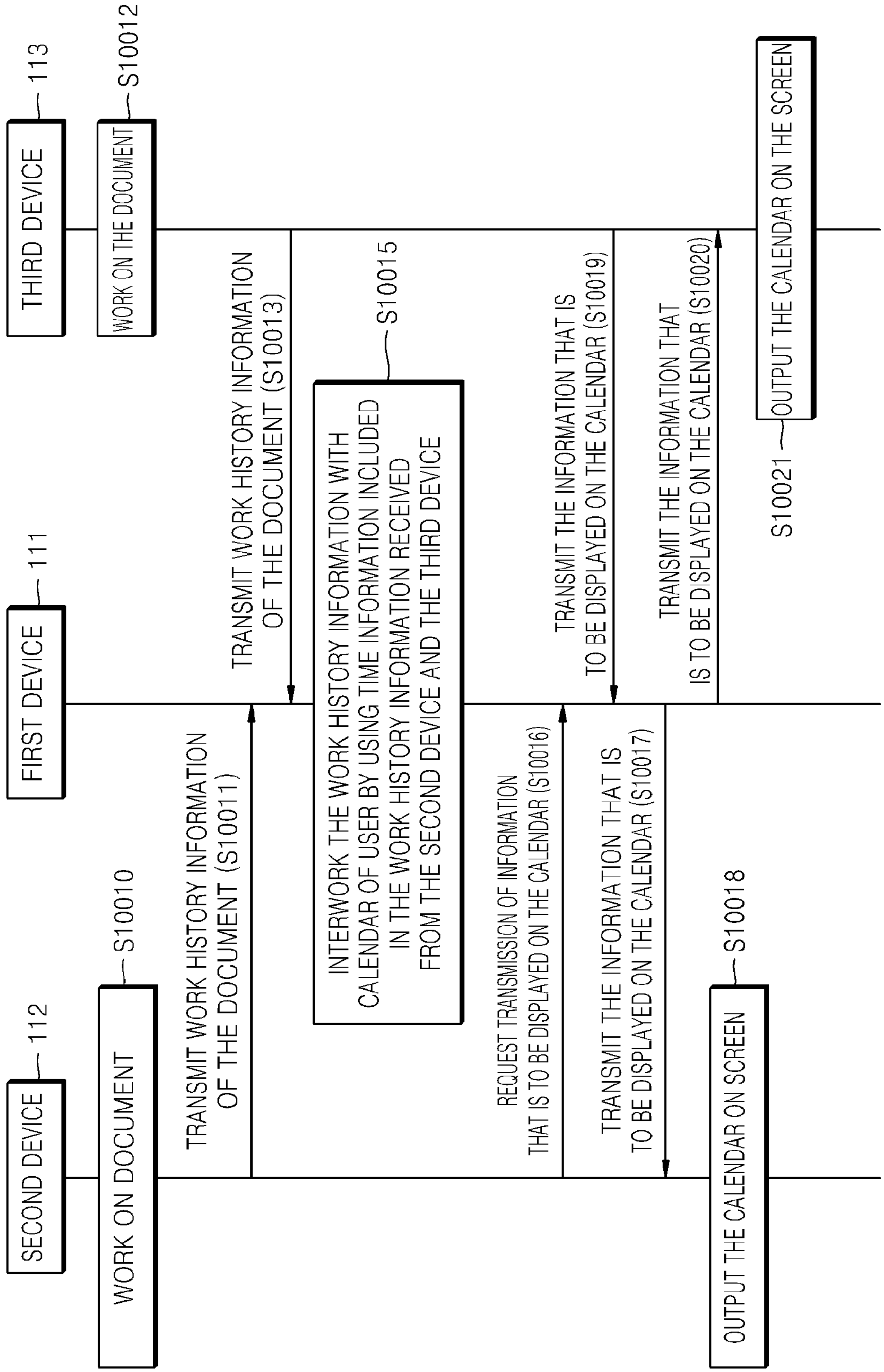
FIG. 100 is a flowchart of an example in which when a second device and a third device perform a document work, a first device interworks work history information with a calendar of a user according to an exemplary embodiment.

FIG. 100 is a flowchart of an example in which when the second device 112 and the third device 113 perform a document work, the first device 111 interworks work history information with a calendar of a user according to an exemplary embodiment.

While the second device 112 and the third device 113 work on the document in FIG. 100, it is understood that one or more other exemplary embodiments are not limited thereto. In other words, there is no limit to the number of devices that work on the document in one or more other exemplary embodiments. If one device works on the document, all operations of the third device 113 that will be described below may be performed by the second device 112. If it is assumed that the number of devices that work on the document is N (where N is greater than or equal to three), the operations of the third device 113 that will be described below may be performed by at least one of a fourth device through the Nth device 114.

In operation S10010, the second device 112 works on the document. For example, the second device 112 may execute a program used to work on the document in the second device 112 and work on the document by using the program executed in the second device 112. For example, the program used to work on the document may be MS OFFICE WORD for the WINDOWS OS or PAGES for the MAC OS installed in the second device 112.

If a document that the second device 112 works on is "abc.doc", and a program used to create, read, or edit "abc.doc" is a second program, the second device 112 may execute the second program and create, read, or edit "abc.doc".

In operation S10011, the second device 112 transmits the work history information of the document to the first device 111. For example, the second device 112 may transmit the work history information of the document to the first device 111 at the time of ending execution of the program used to work on the document or storing the document. For example, the second device 112 may transmit work history information of "abc.doc" to the first device 111 at the time of storing "abc.doc" or ending execution of the second program. In this case, it is assumed that the user of the second device 112 logs into the server 100. Also, examples in which the second device 112 transmits the work history information of the document to the first device 111 have been described with reference to operation S411 of FIG. 4.

In operation S10012, the third device 113 works on the document. For example, the third device 113 may execute a program used to work on the document and work on the document by using the program. For example, the program used to work on the document may be MS OFFICE WORD for the WINDOWS OS or PAGES for the MAC OS installed in the third device 113. In this case, it is assumed that a user of the third device 113 logs into the first device 111. Also, examples in which the third device 113 transmits the work history information to the first device 111 have been described with reference to operation S411 of FIG. 4.

If a document that the third device 113 works on is "abcd.xls", and a program used to create, read, or edit "abcd.xls" is the second program, the second device 112 may execute the second program and create, read, or edit "abcd.xls".

In operation S10013, the third device 113 transmits the work history information of the document to the first device 111. For example, the third device 113 may transmit the work history information of the document to the first device 111 at the time of ending execution of the program used to work on the document or storing the document. For example, the third device 113 may transmit work history information of "abcd.xls" to the first device 111 at the time of storing "abcd.xls" or ending execution of the second program, although it is understood that one or more other exemplary embodiments are not limited thereto as described above. For example, according to one or more other exemplary embodiments, the third device 113 may transmit the work history information of the document in response to a predetermined event (e.g., saving, opening, etc., the document), and/or according to a prior setting or a default setting (e.g., transmit the work history information at predetermined time intervals, at predetermined time points, and/or in accordance with a device setting such as only when connected to a local area network).

In operation S10015, the first device 111 interworks the work history information with the calendar of the user by using time information included in the work history information received from the second device 112 and the third device 113. For example, if it is assumed that the second device 112 stores "abc.doc" at 08:01:42 a.m. of May 18, 2014, and the third device 113 stores "abcd.xls" at 14:29:00 p.m. of May 20, 2014, the first device 111 may generate a first indicator that is to be displayed on a region of the calendar corresponding to May 18, 2014 and a second calendar that is to be displayed on a region of the calendar corresponding to May 20, 2014.

In operation S10016, the second device 112 requests the first device 111 to transmit information that is to be displayed on the calendar. For example, the second device 112 may request the first device 111 to transmit the work history information that is to be output on a screen of a device when an indicator that is to be displayed on the calendar or an indicator displayed on the calendar is selected. For example, the second device 112 may request the first device 111 to transmit the work history information that is to be output on the screen of the device when the first indicator, the second indicator, or the first and second indicators are selected.

In operation S10017, the first device 111 transmits the information that is to be displayed on the calendar to the second device 112.

In operation S10018, the second device 112 outputs the calendar on the screen. For example, the second device 112 may output the calendar that displays the first indicator and the second indicator that are transmitted from the first device 111 on the screen.

In operation S10019, the third device 113 requests the first device 111 to transmit information that is to be displayed on the calendar. For example, the third device 113 may request the first device 111 to transmit the work history information that is to be output on the screen of the device when the indicator that is to be displayed on the calendar or the indicator displayed on the calendar is selected. In this case, the third device 113 may request the first device 111 to transmit the work history information that is to be output on the screen of the device when the first indicator, the second indicator, or the first and second indicators are selected.

In operation S10020, the first device 111 transmits the information that is to be displayed on the calendar to the third device 113.

In operation S10021, the third device 113 outputs the calendar on the screen. For example, the third device 113 may output the calendar that displays the first indicator and the second indicator that are transmitted from the first device 111 on the screen.

As described above, a device may act as a server, thereby resulting in a personal network system without an intervention of an external server.

Hereinafter, an example in which when users of the devices 110 are the same, the server 100 performs a document work based on requests of the devices 110, the server 100 interworks work history information with a calendar of a user will be described with reference to FIGS. 101 through 146.

Figure 101:
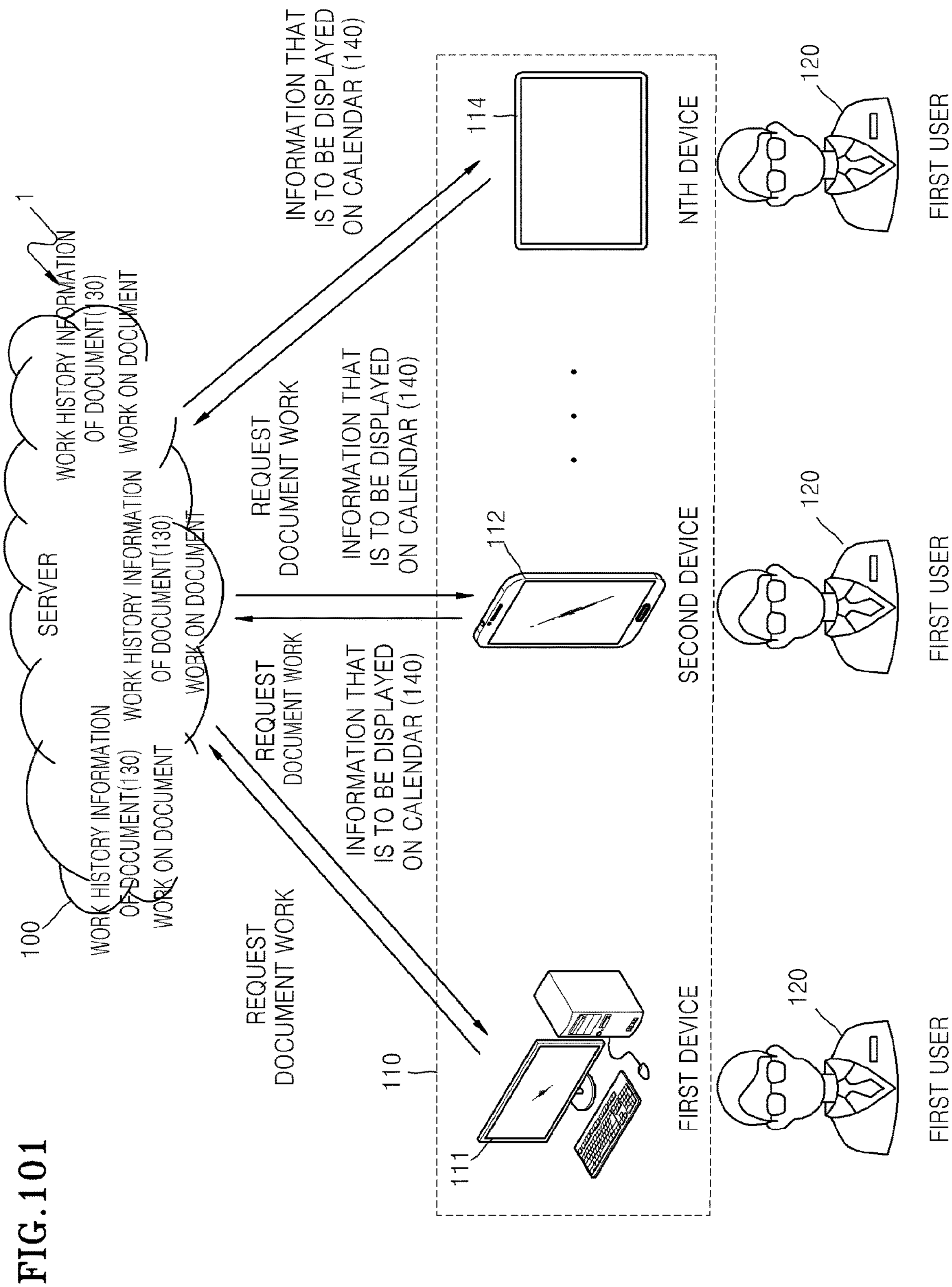
FIG. 101 is a diagram for explaining an example in which when users of devices are the same, a server performs a document work based on requests of the devices, the server interworks work history information with calendars of users according to an exemplary embodiment.

FIG. 101 is a diagram for explaining an example in which when users of the devices 110 are the same, the server 100 performs a document work based on requests of the devices 110, the server 100 interworks work history information with calendars of users according to an exemplary embodiment.

Referring to FIG. 101, the system 1 includes the server 100 and the devices 110. In this regard, the devices 110 mean all devices of the first user 120.

As compared to the example described above with reference to FIG. 2, a subject that performs the document work in FIG. 101 is not the devices 110, but the server 100. In other words, the program used to work on the document is executed by the devices 110 in FIG. 2, whereas a program used to work on a document is executed by the server 100 in FIG. 101.

The server 100 of FIG. 101 executes the program that is installed in the server 100 and is used to work on the document. Thus, although the program used to work on the document is not installed in a device, the first user 120 may perform the document work by accessing the server 100 in the device. A subject that performs the document work is the server 100, and thus the server 100 may not receive work history information of the document from the devices 110 but may obtain the work history information of the document from the server 100. However, it is understood that one or more other exemplary embodiments are not limited thereto. That is, according to one or more other exemplary embodiments, the server 100 may receive at least some of the work history information (e.g., user information, device information, time zone information, etc.) of the document from the devices 110.

Meanwhile, the devices 110 of FIG. 101 do not perform the document work but request the server 100 to perform the document work. At least one of the devices 110 requests the server 100 to perform the document work. For example, the first device 111 requests the server 100 to perform the document work. In the same manner, the second device 112 through the Nth device 114 may request the server 100 to perform the document work.

The server 100 receives a request for the document work from at least one of the devices 110 and performs the document work. The server 100 obtains the work history information 130 of the document after completely performing the document work, although it is understood that one or more other exemplary embodiments are not limited thereto. For example, according to one or more other exemplary embodiments, the server 100 may obtain the work history information 130 of the document at predetermined intervals, in response to one or more predetermined events (e.g., a saving of the document work, a printing of the document work, an emailing of the document work, etc.), in response to a user request to obtain the work history information, etc.

The server 100 interworks the obtained work history information 130 of the document with the calendar of the user. The server 100 transmits the information 140 that is to be displayed on the calendar to the devices 110. In this regard, when the calendar is output on a screen of a device, the information 140 that is to be displayed on the calendar is information that is to be displayed on the output calendar. For example, the information 140 that is to be displayed on the calendar may include work history information that is to be output on the screen of the device when an indicator that is to be displayed on the calendar or an indicator that is displayed on the calendar is selected. According to various exemplary embodiments, the server 100 may transmit only the information, among the work history information, that is to be displayed on the calendar of the device, or may transmit more of the work history information that that which is to be displayed. In the latter case, the device may set or determine which information is to be displayed on the calendar among received information. Here, the device may determine which information is to be displayed based on a prior setting or a default setting, or based on one or more user inputs (e.g., filter requests).

Furthermore, the server 100 may transmit the information 140 that is to be displayed on the calendar to only a device that requests the server 100 to transmit the information 140 that is to be displayed on the calendar, among the devices 110. For example, the first device 111 executes a program that outputs the calendar, and authenticates the first user 120 based on a user account input via the user input device 16510, thereby requesting the server 100 to transmit the information 140 that is to be displayed on a calendar of the first user 120.

Meanwhile, although there is no request from the first device 111, the server 100 may automatically transmit (for example, push) the information 140 that is to be displayed on the calendar to the first device 111. For example, if the first device 111 has previously requested the server 100 to transmit the information 140 that is to be displayed on the calendar of the first user 120, the server 100 may automatically transmit the information 140 that is to be displayed on the calendar of the first user 120 although there is no request from the first device 111 at a later time. According to another example, the server 100 may automatically transmit the information according to a prior setting or a default setting to automatically transmit the information at predetermined time intervals or predetermined time points.

Figure 102:
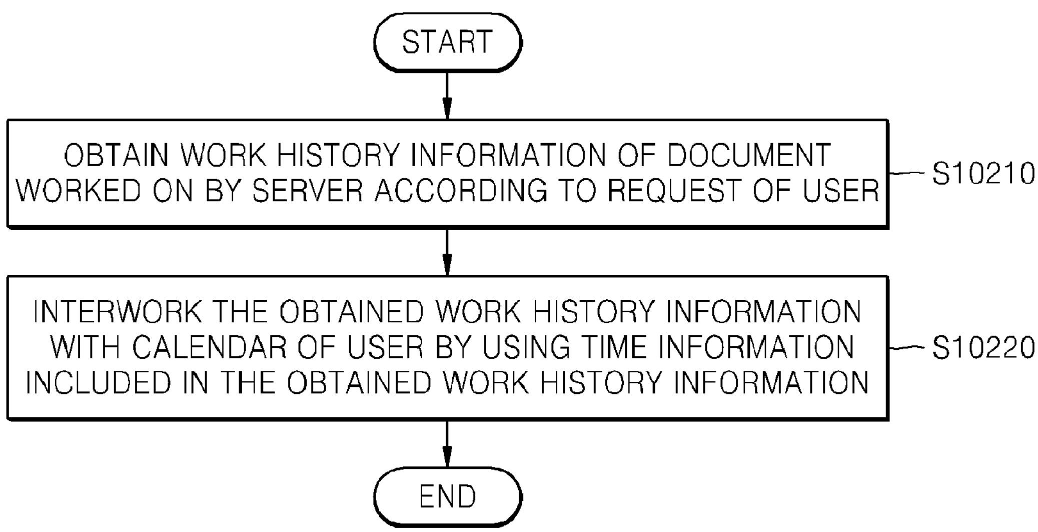
FIG. 102 is a flowchart of another example in which a server interworks work history information with a calendar of a user according to an exemplary embodiment.

FIGS. 102 through 163 show that the server 100 works on a document by using a fourth program. For example, the fourth program may be a document work program based on cloud storage, for example, MS OFFICE 365, GOOGLE DOCS, etc.

Also, FIGS. 102 through 163 show that a device transmits the information requesting the document work to the server 100 by executing a server access program (for example, a web access program). In other words, a user of the device accesses a predetermined webpage (for example, a webpage via which the server 100 accesses a program used to work on a document) and then logs onto the webpage. The user of the device works on the document on the webpage into which the user logs. In this regard, the device may transmit an input of the user who works on the document to the server 100, and the server 100 may work on the document based on the input. The server transmits a work screen of the document to the device in a webpage form, and the device may output the transmitted work screen onto a screen of the device. However, the inventive concept is not limited thereto.

For example, when the device executes a work program (or an application) installed therein, the device may transmit the information requesting the document work to the server 100. In other words, the user of the device executes the work program installed in the device and works on the document. In this case, the device transmits an input of the user who works on the document, and the server 100 may work on the document based on the transmitted input. The server 100 transmits information regarding the document worked on to the device, and the device may output the received information onto the screen.

Hereinafter, an example in which the server 100 interworks work history information with a calendar of a user will be described with reference to FIG. 102.

FIG. 102 is a flowchart of another example in which the server 100 interworks work history information with a calendar of a user according to an exemplary embodiment.

In operation S10201, the server 100 obtains the work history information of a document worked on by the server 100 according to a request of the user. In other words, the server 100 receives a request for a document work from at least one device of a same user, performs the document work, and obtains the work history information.

In operation S10202, the server 100 interworks the obtained work history information with the calendar of the user by using time information included in the obtained work history information. In this regard, the time information is information indicating time taken for the server 100 to work on a document. For example, if it is assumed that the first device 111 creates a document "abc.doc" at 12:28:04 p.m. of May 12, 2014 according to a request of the first device 111, the server 100 may generate an indicator that is to be displayed on May 12, 2014 of a calendar of a user of the first device 111, and, when the indicator displayed on May 12, 2014 is selected, may determine work history information that is to be output on a screen of the first device 111. In this regard, the server 100 may interwork only a portion of the work history information obtained in operation S10210 with the calendar of the user as described above with reference to FIG. 1.

Hereinafter, an example in which when the server 100 performs a document work according to a document work request of the first device 111, the server 100 interworks work history information with a calendar of a first user will be described with reference to FIG. 103.

Figure 103:
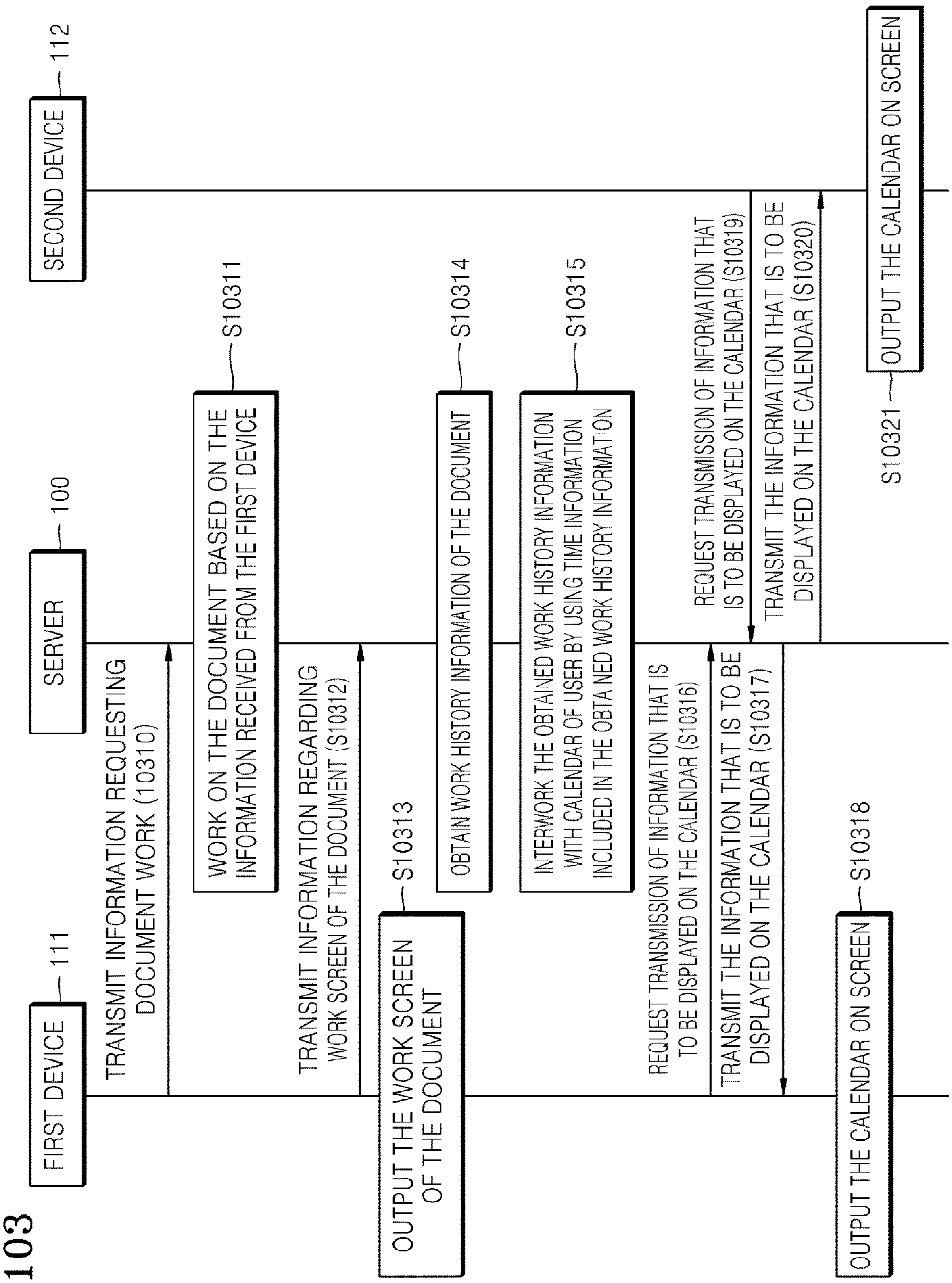
FIG. 103 is a flowchart of an example in which when a server performs a document work according to a document work request of a first device, the server interworks work history information with a calendar of a first user according to an exemplary embodiment.

FIG. 103 is a flowchart of an example in which when the server 100 performs a document work according to a document work request of the first device 111, the server 100 interworks work history information with a calendar of a first user according to an exemplary embodiment.

While the server 100 works on a document according to the document work request of the first device 111 in FIG. 103, it is understood that one or more other exemplary embodiments are not limited thereto. In other words, there is no limit to the number of devices that request the document work in one or more other exemplary embodiments. There is also no limit to the number of devices that request the server 100 to transmit information that is to be displayed on the calendar in one or more other exemplary embodiments.

In operation S10310, the first device 111 transmits information requesting the document work to the server 100. For example, as the user of the first device 111 executes and logs into the fourth program, the first device 111 may transmit information used to request a document work to the server 100. In this case, methods used by the user of the first device 111 to log into the fourth device may vary, the methods including a method of inputting an ID and passwords.

In operation S10311, the server 100 works on the document based on the information received from the first device 111. For example, the server 100 may execute a program used to work on the document and work on the document by using the program executed in the server 100. If it is assumed that a document that the server 100 works on is "abc.doc", and a program used to create, read, or edit "abc.doc" is a fourth program, the server 100 may execute the fourth program and create, read, or edit "abc.doc".

In operation S10312, the server 100 transmits information regarding a work screen of the document to the first device 111. For example, every time the server 100 works on the document based on the information received from the first device 111, the server 100 may transmit the information regarding the work screen of the document to the first device 111. In other words, the server 100 may transmit the information regarding the work screen of the document that is modified every time the document is worked on by using the program executed in the server 100 to the first device 111.

In operation S10313, the first device 111 outputs the work screen of the document. For example, the first device 111 may output the work screen of the document based on the information regarding the work screen of the document transmitted from the server 100.

In operation S10314, the server 100 obtains the work history information of the document. For example, the server 100 may obtain the work history information of the document at the time of ending execution of the program used to work on the document or storing the document. For example, the server 100 may obtain work history information of "abc.doc" at the time of storing "abc.doc" or ending execution of the fourth program. For example, the server 100 may store the obtained work history information in storage corresponding to the account of the user of the first device 111.

In operation S10315, the server 100 interworks the obtained work history information with the calendar of the user by using time information included in the obtained work history information. For example, if it is assumed that the server 100 stores "abc.doc" at 12:28:04 p.m. of May 12, 2014, the server 100 may generate an indicator that is to be displayed on a region of the calendar corresponding to May 12, 2014.

In operation S10316, the first device 111 requests the server 100 to transmit information that is to be displayed on the calendar. For example, the first device 111 may request the server 100 to transmit work history information that is to be output on a screen of a device when an indicator that is to be displayed on the calendar or an indicator displayed on the calendar is selected.

In operation S10317, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed. In the latter case, the first device 111 may set or determine which information is to be displayed on the calendar among received information. Here, the first device 111 may determine which information is to be displayed based on a prior setting or a default setting, or based on one or more user inputs (e.g., filter requests).

In operation S10318, the first device 111 outputs the calendar on the screen. For example, the first device 111 may output the calendar that displays the transmitted indicator on the screen.

In operation S10319, the second device 112 requests the server 100 to transmit information that is to be displayed on the calendar. For example, the second device 112 may request the server 100 to transmit the work history information that is to be output on the screen of the device when the indicator that is to be displayed on the calendar or the indicator displayed on the calendar is selected.

In operation S10320, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In operation S10321, the second device 112 outputs the calendar on the screen. For example, the second device 112 may output the calendar that displays the transmitted indicator on the screen.

Hereinafter, an example in which when the server 100 creates a document, the server 100 interworks work history information with a calendar of a user will be described with reference to FIGS. 104 through 120.

Figure 104:
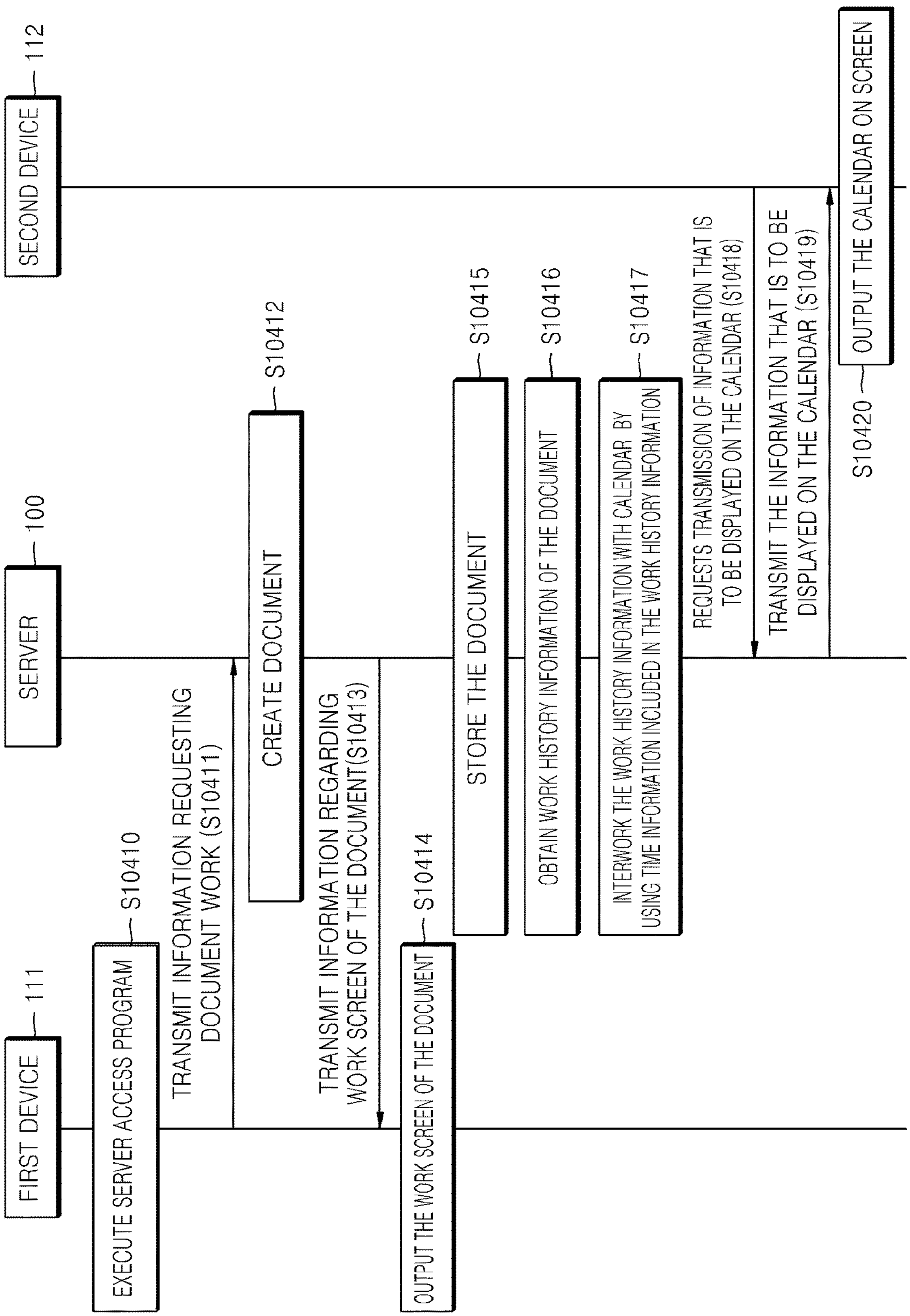
FIG. 104 is a flowchart of an example in which when a server creates a document, the server interworks work history information with a calendar of a user according to an exemplary embodiment.

FIG. 104 is a flowchart of an example in which when the server 100 creates a document, the server 100 interworks work history information with a calendar of a user according to an exemplary embodiment.

While the server 100 creates the document according to a document work request of the first device 111, and the second device 112 outputs the calendar on a screen in FIG. 104, it is understood that one or more other exemplary embodiments are not limited thereto. For example, according to another exemplary embodiment, the server 100 may create the document according to the document work request of the first device 111, and the first device 111 and the second device 112 output the calendar on the screen.

There is no limit to the number of devices in various exemplary embodiments. If the number of devices that request a document work is N (where N is greater than or equal to three), operations of the first device 111 or operations of the second device 112 that will be described below may be performed by at least one of the third device 113 through the Nth device 114.

In operation S10410, the first device 111 executes a server access program. In order for the user to request the server 100 to work on the document, the first device 111 may execute the server access program. For example, the user of the first device 111 executes the server access program and may input the ID and passwords of the user.

In operation S10411, the first device 111 transmits information requesting the document work to the server 100.

In operation S10412, the server 100 creates the document. For example, the server 100 may execute a program used to work on the document and work on the document by using the program executed in the server 100. If it is assumed that a document created by the server 100 is "abc.doc", and a program used to create, read, or edit "abc.doc" is a fourth program, the server 100 may execute the fourth program and create, read, or edit "abc.doc".

In operation S10413, the server 100 transmits information regarding a work screen of the document to the first device 111. For example, when the server 100 creates the document by using the program executed in the server 100, the server 100 may transmit the information regarding the work screen of the created document to the first device 111.

In operation S10414, the first device 111 outputs the work screen of the document. The first device 111 may output the work screen of the document based on the transmitted information regarding the work screen of the document.

In operation S10415, the server 100 stores the document. For example, the server 100 may receive a request to store the document from the user on the work screen of the document output on the first device 111 and store the created document.

In operation S10416, the server 100 obtains the work history information of the document. For example, the server 100 may obtain the work history information of the document at the time of storing the document. The work history information of the document is information generated when the server 100 creates and stores the document. For example, the work history information may include a title of the document worked on, a document type, time taken to work on the document, a title of a device that performs a document work, a device user, a program used to work on the document, a document size, and a work type. For example, the server 100 may store the obtained work history information in the storage corresponding to the account of the user of the first user 111.

Hereinafter, an example in which the server 100 executes a program, creates and stores a document, and obtains work history information of the document will be described with reference to FIGS. 105 and 106.

Figure 105:
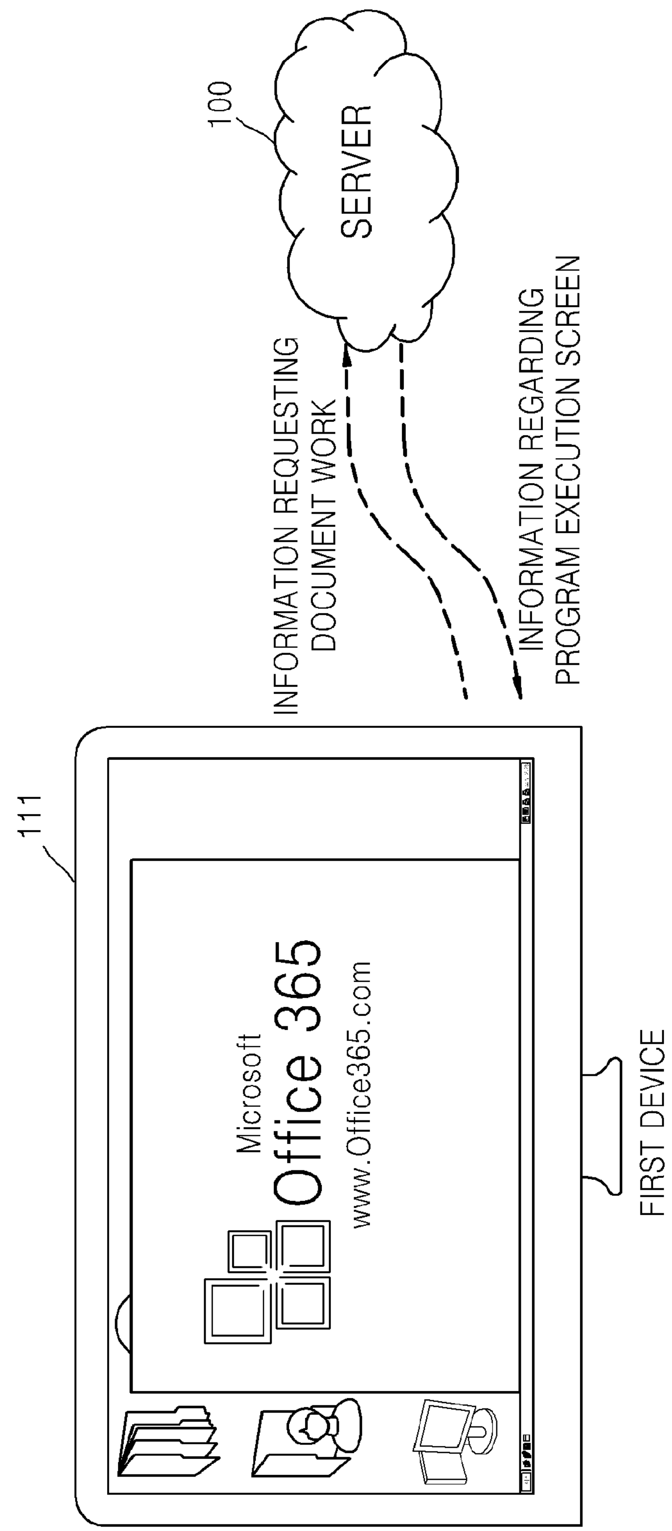
FIGS. 105 and 106 are diagrams for explaining an example in which a server executes a program, creates and stores a document, and obtains work history information of the document according to an exemplary embodiment.
Figure 106:
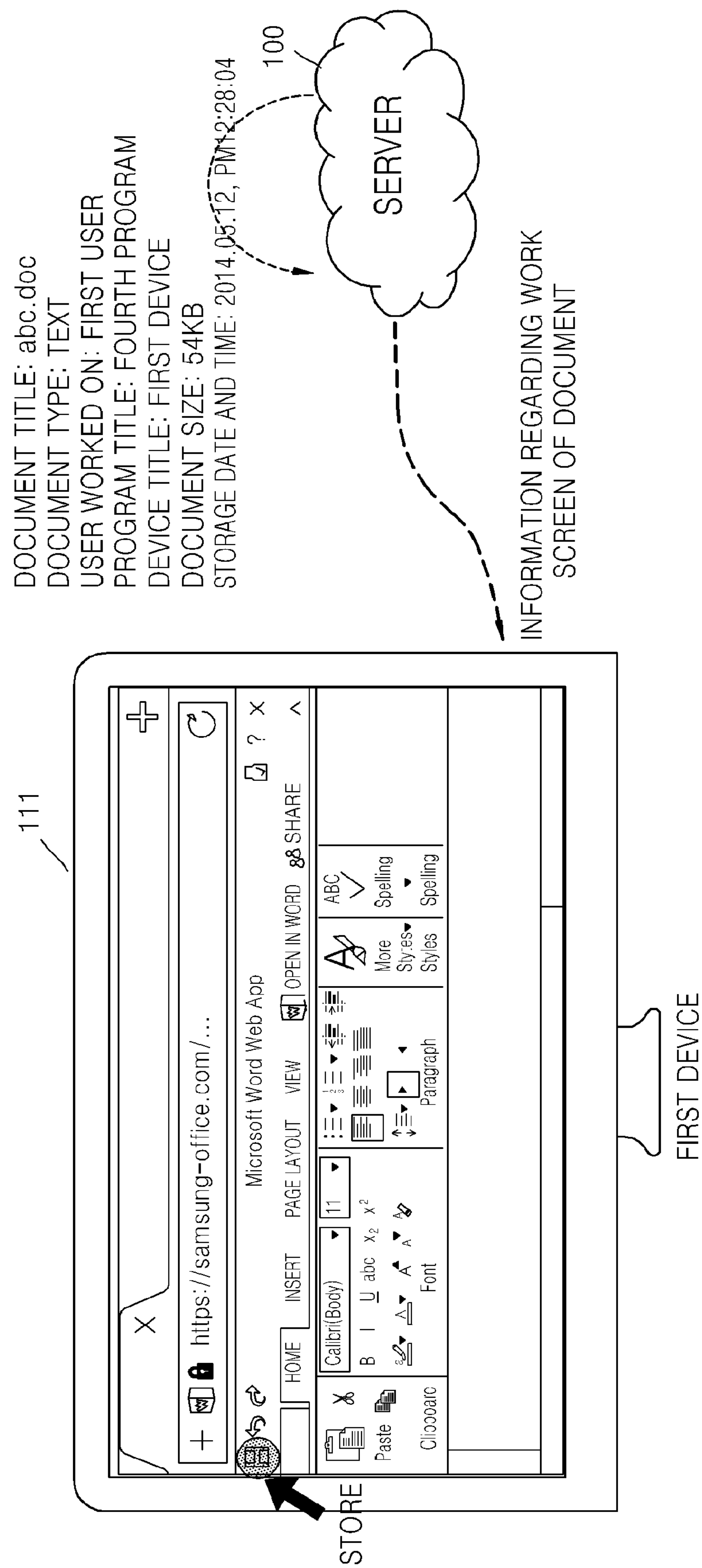

FIGS. 105 and 106 are diagrams for explaining an example in which the server 100 executes a program, creates and stores a document, and obtains work history information of the document according to an exemplary embodiment.

Referring to FIG. 105, the first device 111 executes a server access program. For example, the first device 111 may select an indicator indicating the server access program based on a user input received through the user input device 16510. The first device 111 may execute the server access program corresponding to the selected indicator. The server access program may be a Web browser. An Internet address of a server may be input to an address window of the Web browser.

Referring to FIG. 105, if the first device 111 executes the server access program, the server 100 transmits information regarding a server access program work screen to the first device 111. The first device 111 transmits information requesting a document work to the server 100 through the server access program. In this regard, the information requesting the document work may be information requesting creation of the document.

Referring to FIG. 106, the first device 111 outputs a work screen of the document based on information regarding the work screen of the document. The first device 111 may select an indicator requesting "storage" of a text document based on a user input received through the user input device 16510. The first device 111 may request the server 100 to store the text document.

After storing the text document, the server 100 obtains work history information of the document. For example, if it is assumed that the server 100 stores a document entitled "abc.doc" having a size of 54 KB (kilobytes) at 12:28:04 p.m. on May 12, 2014 by using a fourth program, the server 100 may obtain at least one of "abc.doc", text, fourth program, first device, 12:28:04 p.m. on May 12, 2014, and 54 KB.

Meanwhile, since the stored information requires a level of security, the server 100 may additionally encrypt the work history information and may store the encrypted work history information.

For example, when the user selects a 'security' option at a point in time when the user stores the document, the server 100 may additionally encrypt the work history information.

As another example, the user creates a certain folder, and a document included in the created folder may be set to have a high level of security. When work history information of the document included in the created folder is generated, the server 100 may additionally encrypt the work history information.

After the user logs into the server 100, the user may access the work history information transmitted to the server 100. However, it may be necessary to input additional information in order to access the encrypted work history information. For example, after the user logs into the server 100 by inputting the passwords and ID, additional passwords may be necessary to access the encrypted work history information.

FIG. 106 shows an example in which the server 100 obtains work history information of a document when the document is a text document according to an exemplary embodiment but a type of the document is not limited thereto.

Referring back to FIG. 104, in operation S10417, the server 100 interworks the work history information with the calendar by using time information included in the work history information.

Hereinafter, an example in which the server 100 interworks work history information with a calendar will be described with reference to FIGS. 107 through 110.

Figure 107:
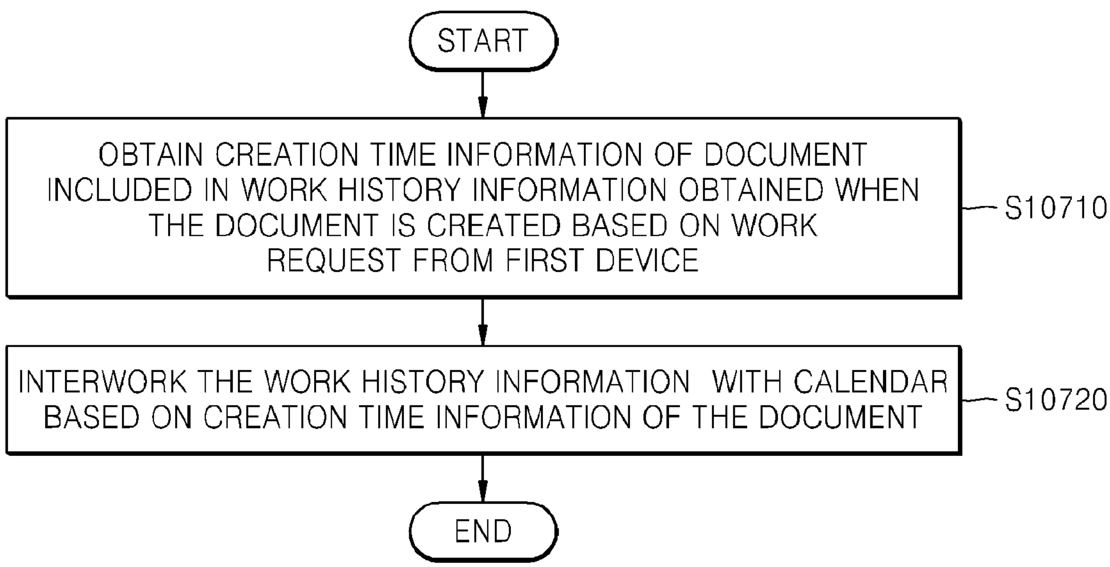
FIG. 107 is a flowchart of an example in which a server interworks work history information of a document with a calendar according to an exemplary embodiment.

FIG. 107 is a flowchart of an example in which the server 100 interworks work history information of a document with a calendar according to an exemplary embodiment.

In operation S10710, the server 100 obtains creation time information of the document included in work history information obtained when the document is created based on a work request from the first device 111. For example, according to the example described above with reference to FIG. 106, the server 100 obtains "12:28:04 p.m. on May 12, 2014" from the work history information obtained when the document is created based on the work request from the first device 111.

Hereinafter, an example of work history information obtained by the server 100 will be described with reference to FIGS. 108 and 109.

FIGS. 108 and 109 illustrate examples of work history information 10810 and 10910 of a document according to an exemplary embodiment.

Referring to FIG. 108, an example of the work history information 10810 of the document is illustrated. For example, the work history information 10810 of the document includes a document title 10811, a document type 10812, a work program title 10813, a title 10814 of a work request device, a device user 10815, a work type 10816, a work date and time 10817, and a file size 10818 but is not limited thereto. In other words, the work history information 10810 of the document may correspond to information as long as the information may be generated by performing a document work.

For example, the server 100 may arrange the obtained work history information 10810 according to the title 10811 of the document, and may store the arranged work history information 10810 in the database 16430.

Referring to FIG. 109, another example of the work history information 10910 of a document is illustrated. The work history information 10810 of FIG. 108 and the work history information 10910 of FIG. 109 include the same information. In other words, the work history information 10910 of FIG. 109 includes a document title 10914, a document type 10912, a work program title 10913, a title 10911 of a work request device, a device user 10916, a work type 10915, a work date and time 10917, and a file size 10918. For example, the server 100 may arrange the obtained work history information 10910 according to the title 10911 of the work device, and may store the arranged work history information 10910 in the database 16430.

Referring back to FIG. 107, in operation S10720, the server 100 interworks the work history information with the calendar of the user based on the creation time information of the document. Hereinafter, an example in which the server 100 interworks work history information with a calendar of a user will now be described with reference to FIG. 110.

Figure 110:
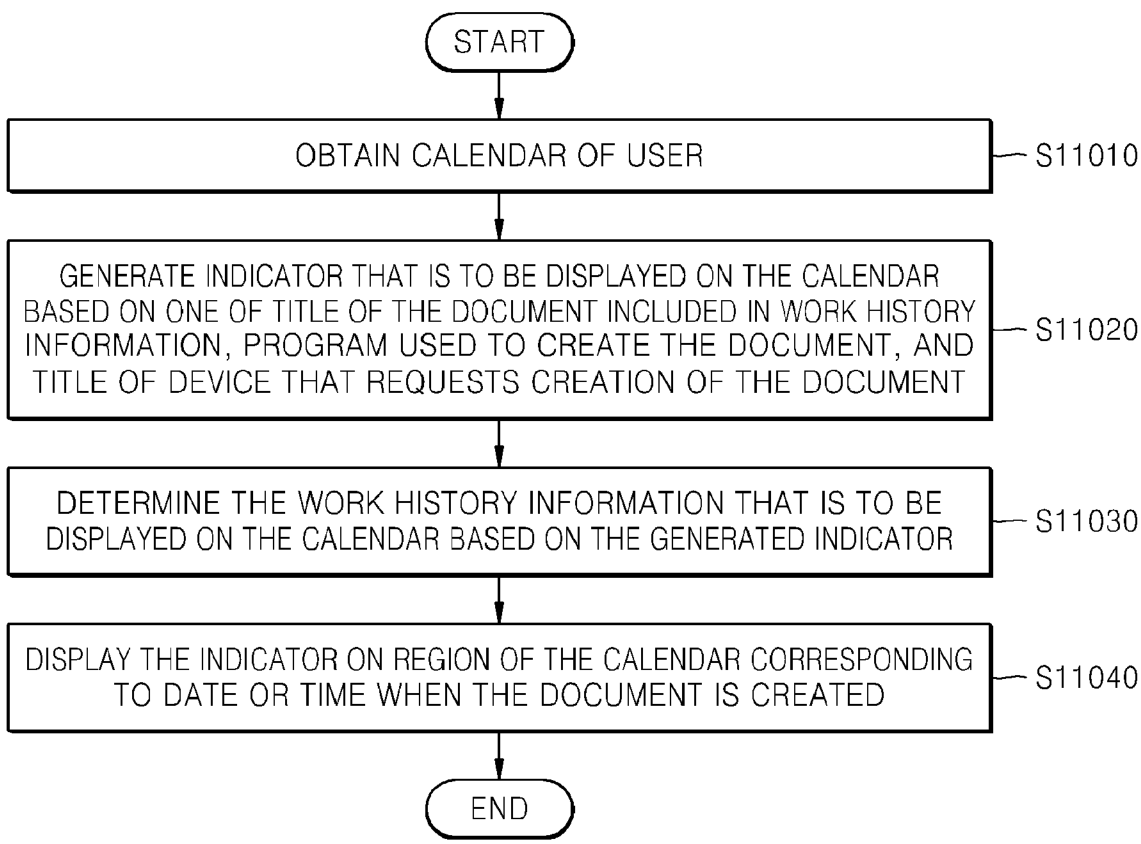
FIG. 110 is a flowchart of an example in which a server interworks work history information with a calendar of a user according to an exemplary embodiment.

FIG. 110 is a flowchart of an example in which the server 100 interworks work history information with a calendar of a user according to an exemplary embodiment.

In operation S11010, the server 100 obtains the calendar of the user. In this regard, the calendar of the user refers to a form that is to interwork with the work history information of a document. For example, the server 100 may read the calendar of the user that matches with an account of the user and is stored in the database 16430, and may receive the calendar of the user from at least one of the devices 110. For example, the calendar of the user may include a calendar on a day basis, a calendar on a week basis, a calendar on a month basis, or a calendar on a year basis.

In operation S11020, the server 100 may generate an indicator that is to be displayed on the calendar based on at least one of a title of the document included in the work history information, a program used to create the document, and a title of a device that requests creation of the document. In other words, the server 100 determines one of the title of the document, the program used to create the document, and the title of the device that requests creation of the document as an item indicating the indicator and generates the indicator based on the determined item.

In operation S11030, the server 100 determines the work history information that is to be displayed on the calendar based on the generated indicator.

In operation S11040, the server 100 displays the indicator on a region of the calendar corresponding to a date or time when the document is created.

Referring back to FIG. 104, in operation S10418, the second device 112 requests the server 100 to transmit the information that is to be displayed on the calendar. For example, the second device 112 may request the server 100 to transmit the information that is to be displayed on the calendar after executing a calendar output program installed in the second device 112 and performing user authentication.

In operation S10419, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed.

In FIG. 104, when the second device 112 requests the server 100 to transmit the information that is to be displayed on the calendar in operation S10418, the server 100 transmits the information that is to be displayed on the calendar to the second device 112 in operation S10419, although it is understood that one or more other exemplary embodiments are not limited thereto. According to another exemplary embodiment, although there is no request from the second device 112, the server 100 may transmit (for example, push) the information that is to be displayed on the calendar to the second device 112. For example, if the second device 112 has previously requested the server 100 to transmit the information that is to be displayed on the calendar, the server 100 may automatically transmit the information that is to be displayed on the calendar although there is no request from the second device 112 at a later time. According to another example, the server 100 may automatically transmit the information according to a prior setting or a default setting to automatically transmit the information at predetermined time intervals or predetermined time points.

In operation S10420, the second device 112 outputs the calendar on the screen.

Figure 111:
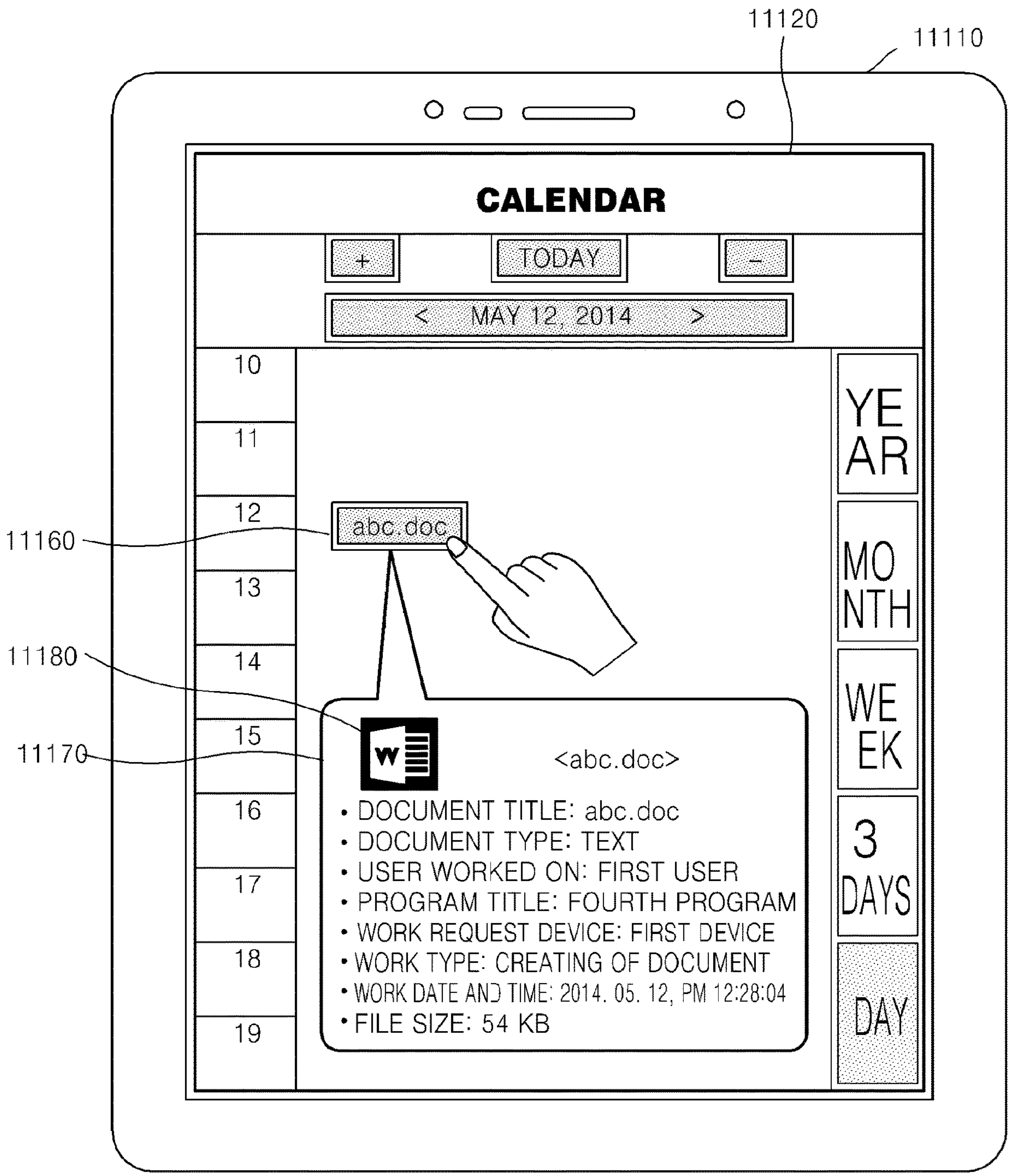
FIG. 111 illustrates an example of a daily calendar displayed on a screen of a device according to an exemplary embodiment.

FIG. 111 illustrates an example of a daily calendar 11120 displayed on a screen of a device 11110 according to an exemplary embodiment.

Referring to FIG. 111, the daily calendar 11120 is output on the screen of the device 11110. An indicator 11160 indicating a title of a document may be displayed on the calendar 11120. For example, if it is assumed that the server 100 creates a document entitled "abc.doc" on May 12, 2014 by using a fourth program according to a request of the first device 111, the indicator 11160 indicating "abc.doc" may be displayed on a region of the calendar 11120 corresponding to May 12, 2014.

The device 11110 may select the indicator 11160 indicating "abc.doc" according to a user input received through the user input device 16510. When the indicator 11160 indicating "abc.doc" is selected, the device 11110 may output work history information 11170 of the document on the screen. For example, if it is assumed that the server 100 stores the document entitled "abc.doc" having a size of 54 KB (kilobytes) at 12:28:04 p.m. on May 12, 2014 by using the fourth program according to the request of the first device 111, at least one of "abc.doc", text, fourth program, first device, 12:28:04 p.m. on May 12, 2014, and 54 KB may be output as the work history information 11170. Meanwhile, the device 11110 may output the work history information 11170 of the document on the screen as a popup window, although it is understood that one or more other exemplary embodiments are not limited thereto as described above. For example, the device 11110 may output the work history information 11170 on an entirety of the screen, on a designated region of the screen, etc., in one or more other exemplary embodiments.

An indicator 11180 that may output the document on the screen of the device 11110 may be displayed on the work history information 11170 of the document. For example, when the indicator 11180 that may output the document is selected according to the user input received through the user input device 16510, the device 11110 may output the document on the screen as the popup window separately from the calendar 11120, although it is understood that one or more other exemplary embodiments are not limited thereto as described above.

Figure 112:
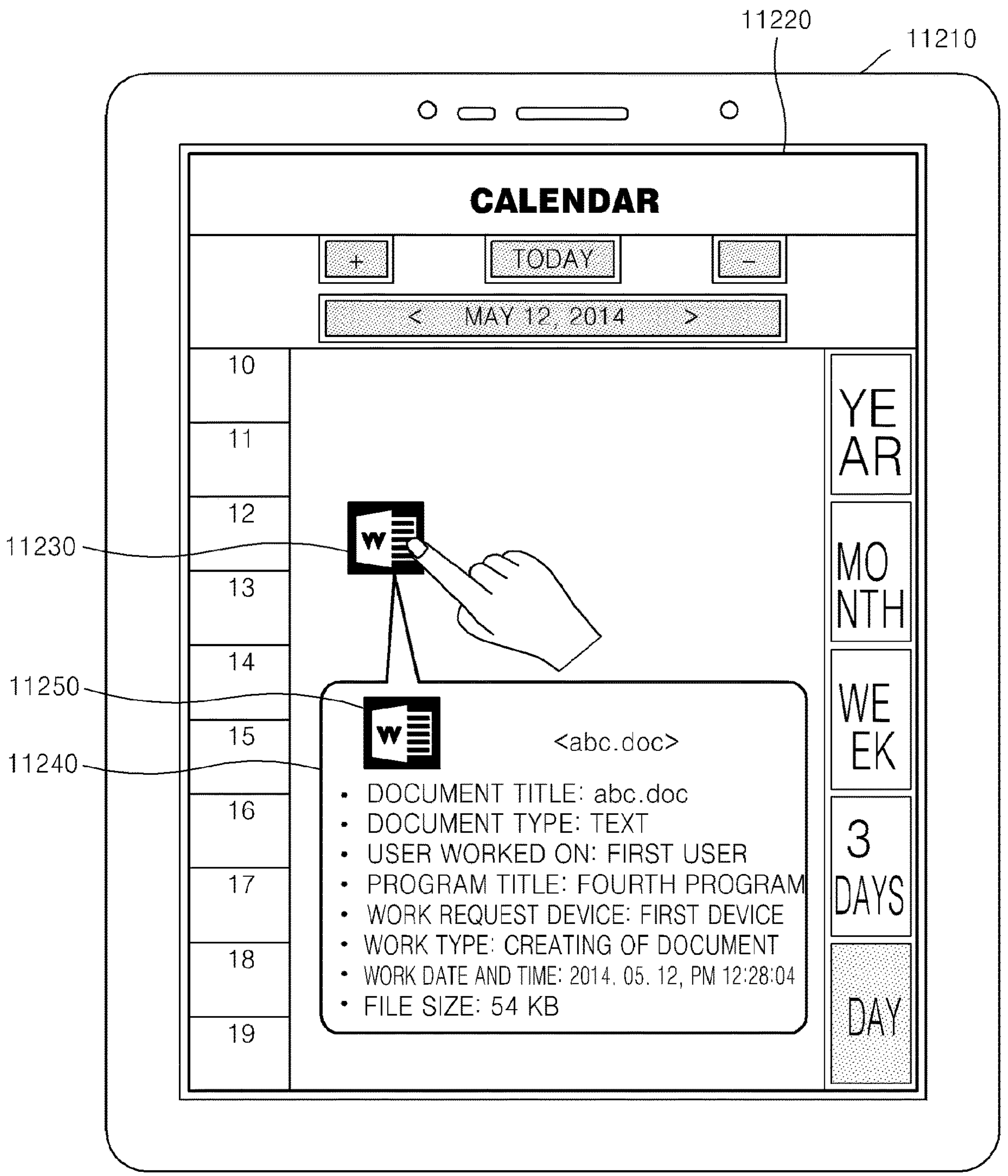
FIG. 112 illustrates another example of a daily calendar displayed on a screen of a device according to an exemplary embodiment.

FIG. 112 illustrates another example of a daily calendar 11220 displayed on a screen of a device 11210 according to an exemplary embodiment.

Referring to FIG. 112, the daily calendar 11220 may be output on the screen of the device 11210. The calendar 11220 of FIG. 112 has the same form as that of the calendar 11120 of FIG. 111. Thus, the descriptions of the indicators provided above with reference to FIG. 111 may apply to indicators that may be displayed on the calendar 11220 of FIG. 112.

An indicator 11230 indicating a program used to work on a document may be displayed on the calendar 11220. For example, if it is assumed that the server 100 creates a document on May 12, 2014 by using a fourth program according to a request of the first device 111, the indicator 11230 indicating the "fourth program" may be displayed on a region of the calendar 11220 corresponding to May 12, 2014.

The device 11210 may select the indicator 11230 indicating the "fourth program" according to a user input received through the user input device 16510. When the indicator 11230 indicating the "fourth program" is selected, the device 11210 may output work history information 11240 of the document on the screen. For example, if it is assumed that the server 100 stores a document entitled "abc.doc" having a size of 54 KB (kilobytes) at 12:28:04 p.m. on May 12, 2014 by using the fourth program according to the request of the first device 111, at least one of "abc.doc", text, fourth program, first device, 12:28:04 p.m. on May 12, 2014, and 54 KB may be output as the work history information 11240. Meanwhile, the device 11210 may output the work history information 11240 of the document on the screen as a popup window, although it is understood that one or more other exemplary embodiments are not limited thereto as described above.

An indicator 11250 that may output the document on the screen of the device 11210 may be displayed on the work history information 11240 of the document. For example, when the indicator 11250 that may output the document is selected according to the user input received through the user input device 16510, the device 11210 may output the document on the screen as the popup window separately from the calendar 11220, although it is understood that one or more other exemplary embodiments are not limited thereto as described above.

Figure 113:
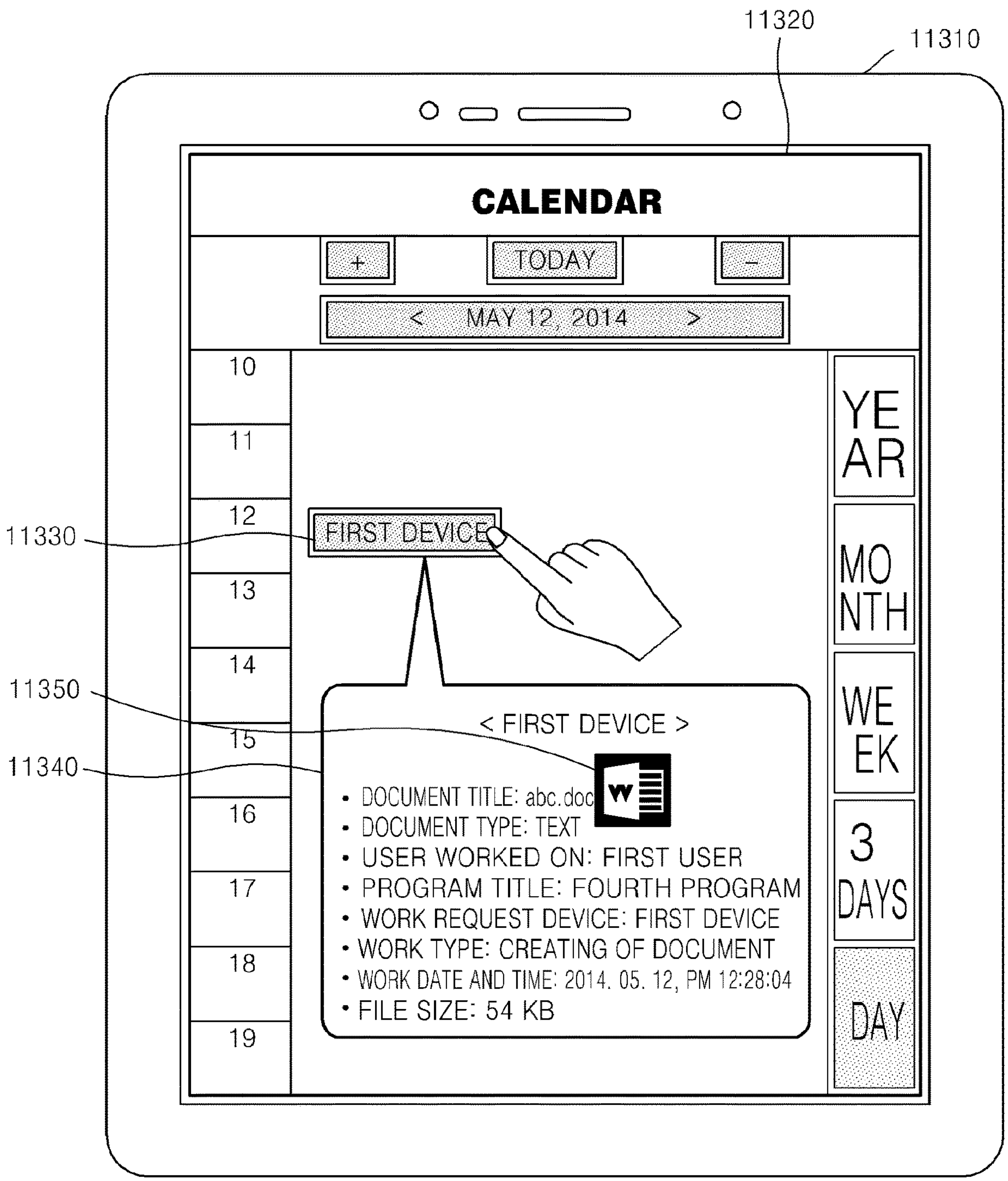
FIG. 113 illustrates another example of a daily calendar displayed on a screen of a device according to an exemplary embodiment.

FIG. 113 illustrates another example of a daily calendar 11320 displayed on a screen of a device 11310 according to an exemplary embodiment.

Referring to FIG. 113, the daily calendar 11320 may be output on the screen of the device 11310. The calendar 11320 of FIG. 113 has the same form as that of the calendar 11120 of FIG. 111. Thus, the descriptions of the indicators provided above with reference to FIG. 111 may apply to indicators that may be displayed on the calendar 11320 of FIG. 113.

An indicator 11330 indicating a title of a device may be displayed on the calendar 11320. For example, if it is assumed that the server 100 creates a document on May 12, 2014 by using a fourth program according to a request of the first device 111, the indicator 11340 indicating the "first device" may be displayed on a region of the calendar 11320 corresponding to May 12, 2014.

The device 11310 may select an indicator 11330 indicating the "first device" according to a user input received through the user input device 16510. When the indicator 11330 indicating the "first device" is selected, the device 11310 may output work history information 11340 of the document on the screen. For example, if it is assumed that the server 100 stores a document entitled "abc.doc" having a size of 54 KB (kilobytes) at 12:28:04 p.m. on May 12, 2014 by using the fourth program according to the request of the first device 111, at least one of "abc.doc", text, fourth program, first device, 12:28:04 p.m. on May 12, 2014, and 54 KB may be output as the work history information 11340. Meanwhile, the device 11310 may output the work history information 11340 of the document on the screen as a popup window, although it is understood that one or more other exemplary embodiments are not limited thereto as described above.

An indicator 11350 that may output the document on the screen of the device 11310 may be displayed on the work history information 11340 of the document. For example, when the indicator 11350 that may output the document is selected according to the user input received through the user input device 16510, the device 11310 may output the document on the screen as the popup window separately from the calendar 11320, although it is understood that one or more other exemplary embodiments are not limited thereto as described above.

Figure 114:
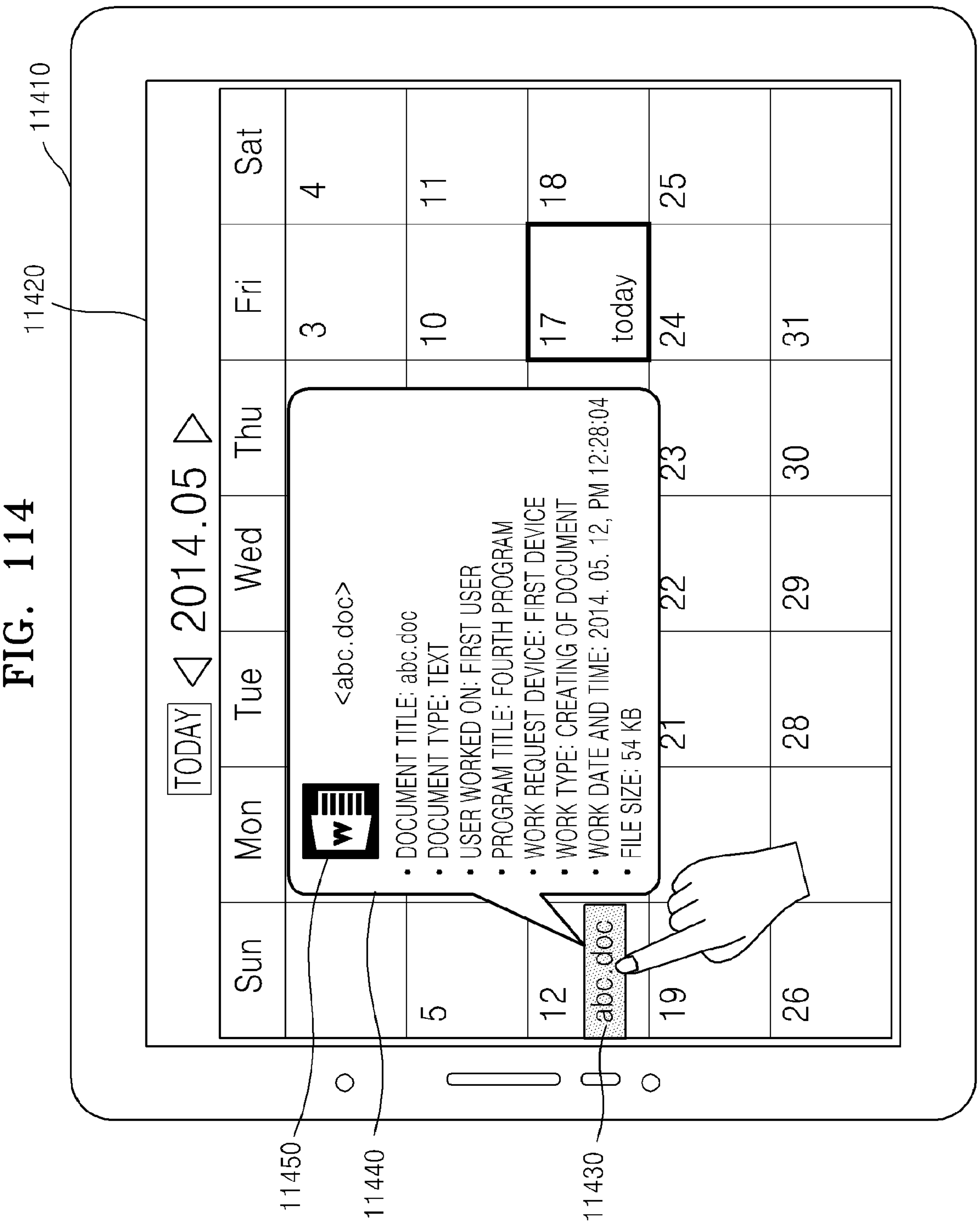
FIG. 114 illustrates an example of a monthly calendar displayed on a screen of a device according to an exemplary embodiment.

FIG. 114 illustrates an example of a monthly calendar 11420 displayed on a screen of a device 11410 according to an exemplary embodiment.

Referring to FIG. 114, the monthly calendar 11420 is output on the screen of the device 11410. The calendar 11420 of FIG. 114 has the same form as that of the calendar 1920 of FIG. 19. Thus, the descriptions of the indicators provided above with reference to FIG. 19 may apply to indicators that may be displayed on the calendar 11420 of FIG. 114. An indicator 11430 indicating a title of a document may be displayed on the calendar 11420. For example, if it is assumed that the server 100 creates a document entitled "abc.doc" on May 12, 2014 according to a request of the first device 111, the indicator 11430 indicating "abc.doc" may be displayed on a region of the calendar 11420 corresponding to May 12, 2014.

The device 11410 may select the indicator 11430 indicating "abc.doc" according to a user input received through the user input device 16510. When the indicator 11430 indicating "abc.doc" is selected, the device 11410 may output work history information 11440 of the document on the screen.

For example, if it is assumed that the server 100 stores the document entitled "abc.doc" having a size of 54 KB (kilobytes) at 12:28:04 p.m. on May 12, 2014 by using a fourth program according to the request of the first device 111, at least one of "abc.doc", text, fourth program, first device, 12:28:04 p.m. on May 12, 2014, and 54 KB may be output as the work history information 11440. Meanwhile, the device 11410 may output the work history information 11440 of the document on the screen as a popup window, although it is understood that one or more other exemplary embodiments are not limited thereto as described above.

An indicator 11450 that may output the document on the screen of the device 11410 may be displayed on the work history information 11440 of the document. For example, when the indicator 11450 that may output the document is selected according to the user input received through the user input device 16510, the device 11410 may output the document created by the first device 111 on the screen as the popup window separately from the calendar 11420, although it is understood that one or more other exemplary embodiments are not limited thereto as described above.

Figure 115:
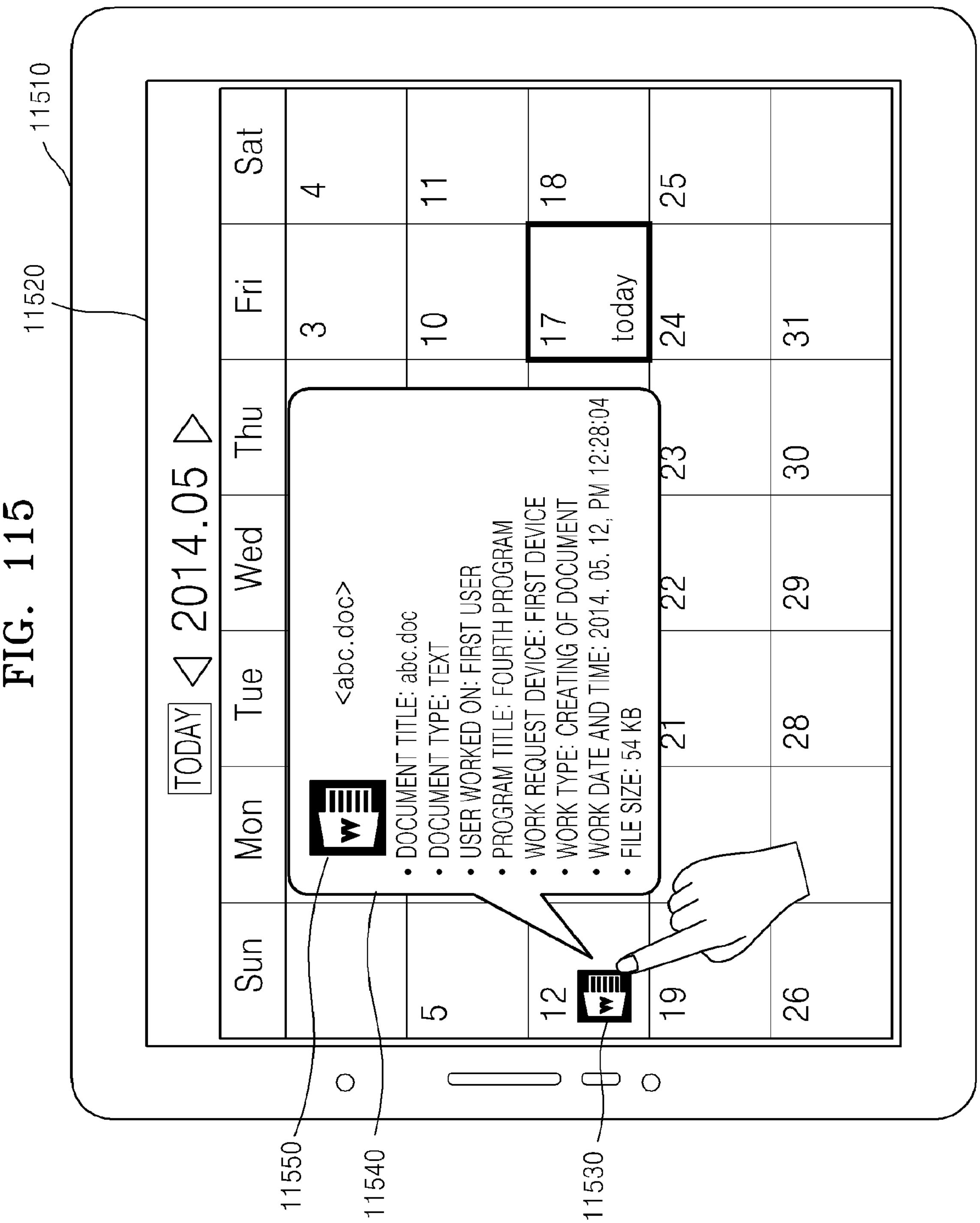
FIG. 115 illustrates another example of a monthly calendar displayed on a screen of a device according to an exemplary embodiment.

FIG. 115 illustrates another example of a monthly calendar 11520 displayed on a screen of a device 1510 according to an exemplary embodiment.

Referring to FIG. 115, the monthly calendar 11520 may be output on the screen of the device 11510. The calendar 11520 of FIG. 115 has the same form as that of the calendar 1920 of FIG. 19. Thus, the descriptions of the objects provided above with reference to FIG. 19 may apply to objects that may be displayed on the calendar 11520 of FIG. 115.

An indicator 11530 indicating a program used to work on the document may be displayed on the calendar 11520. For example, if it is assumed that the server 100 creates a document on May 12, 2014 by using a fourth program according to a request of the first document 111, the indicator 11530 indicating the "fourth program" may be displayed on a region of the calendar 150 corresponding to May 12, 2014.

The device 11510 may select the indicator 11530 indicating the "fourth program" according to a user input received through the user input device 16510. When the indicator 11530 indicating the "fourth program" is selected, the device 11510 may output work history information 11540 of the document on the screen. For example, if it is assumed that the server 100 stores a document entitled "abc.doc" having a size of 54 KB (kilobytes) at 12:28:04 p.m. on May 12, 2014 by using the fourth program according to a request of the first document 111, at least one of "abc.doc", text, fourth program, first device, 12:28:04 p.m. on May 12, 2014, and 54 KB may be output as the work history information 2040. Meanwhile, the device 11510 may output the work history information 11540 of the document on the screen as a popup window, although it is understood that one or more other exemplary embodiments are not limited thereto as described above. For example, the device 11510 may output the work history information 11540 on an entirety of the screen, on a designated region of the screen, etc., in one or more other exemplary embodiments.

An indicator 11550 that may output the document on the screen of the device 11510 may be displayed on the work history information 11540 of the document. For example, when the indicator 11550 that may output the document is selected according to the user input received through the user input device 16510, the device 11510 may output the document created by the first device 111 on the screen as the popup window separately from the calendar 11520, although it is understood that one or more other exemplary embodiments are not limited thereto as described above.

Figure 116:
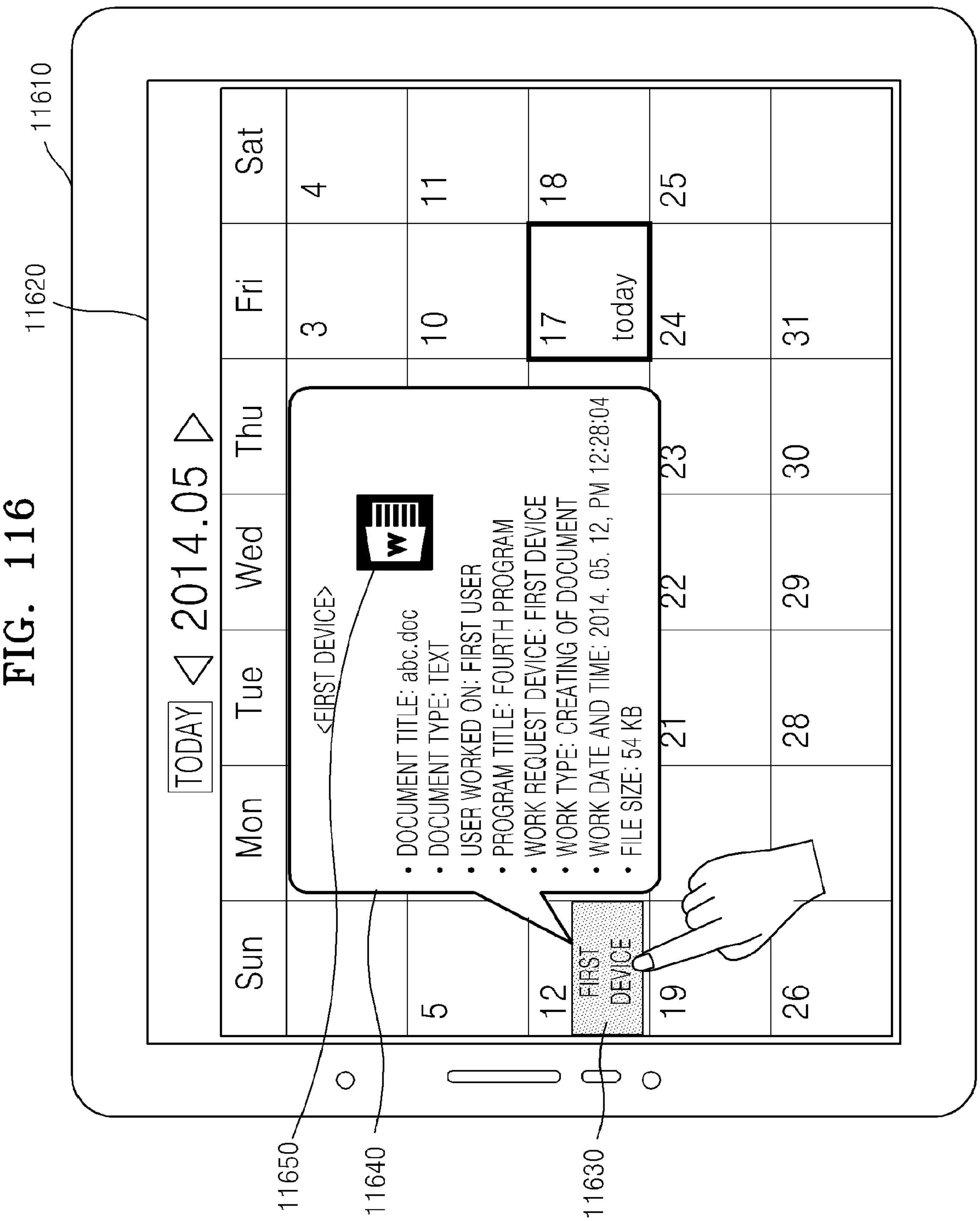
FIG. 116 illustrates another example of a monthly calendar displayed on a screen of a device according to an exemplary embodiment.

FIG. 116 illustrates another example of a monthly calendar 11620 displayed on a screen of a device 11610 according to an exemplary embodiment.

Referring to FIG. 116, the monthly calendar 11620 may be output on the screen of the device 11610. The calendar 11620 of FIG. 116 has the same form as that of the calendar 1920 of FIG. 19. Thus, the descriptions of the indicators provided above with reference to FIG. 16 may apply to indicators that may be displayed on the calendar 11620 of FIG. 116.

An indicator 11630 indicating a title of a device may be displayed on the calendar 11620. For example, if it is assumed that the server 100 creates a document on May 12, 2014 according to a request of the first device 111, the indicator 11630 indicating the "first device" may be displayed on a region of the calendar 11620 corresponding to May 12, 2014.

The device 11610 may select the indicator 11630 indicating the "first device" according to a user input received through the user input device 16510. When the indicator 11630 indicating the "first device" is selected, the device 11610 may output work history information 11640 of the document on the screen. For example, if it is assumed that the server 100 stores a document entitled "abc.doc" having a size of 54 KB (kilobytes) at 12:28:04 p.m. on May 12, 2014 by using a fourth program according to the request of the first device 111, at least one of "abc.doc", text, fourth program, first device, 12:28:04 p.m. on May 12, 2014, and 54 KB may be output as the work history information 11640. Meanwhile, the device 11610 may output the work history information 11640 of the document on the screen as a popup window, although it is understood that one or more other exemplary embodiments are not limited thereto as described above.

An indicator 11650 that may output the document on the screen of the device 11610 may be displayed on the work history information 11640 of the document. For example, when the indicator 11650 that may output the document is selected according to the user input received through the user input device 16510, the device 11610 may output the document created by the first device 111 on the screen as the popup window separately from the calendar 11620, although it is understood that one or more other exemplary embodiments are not limited thereto as described above.

Figure 117:
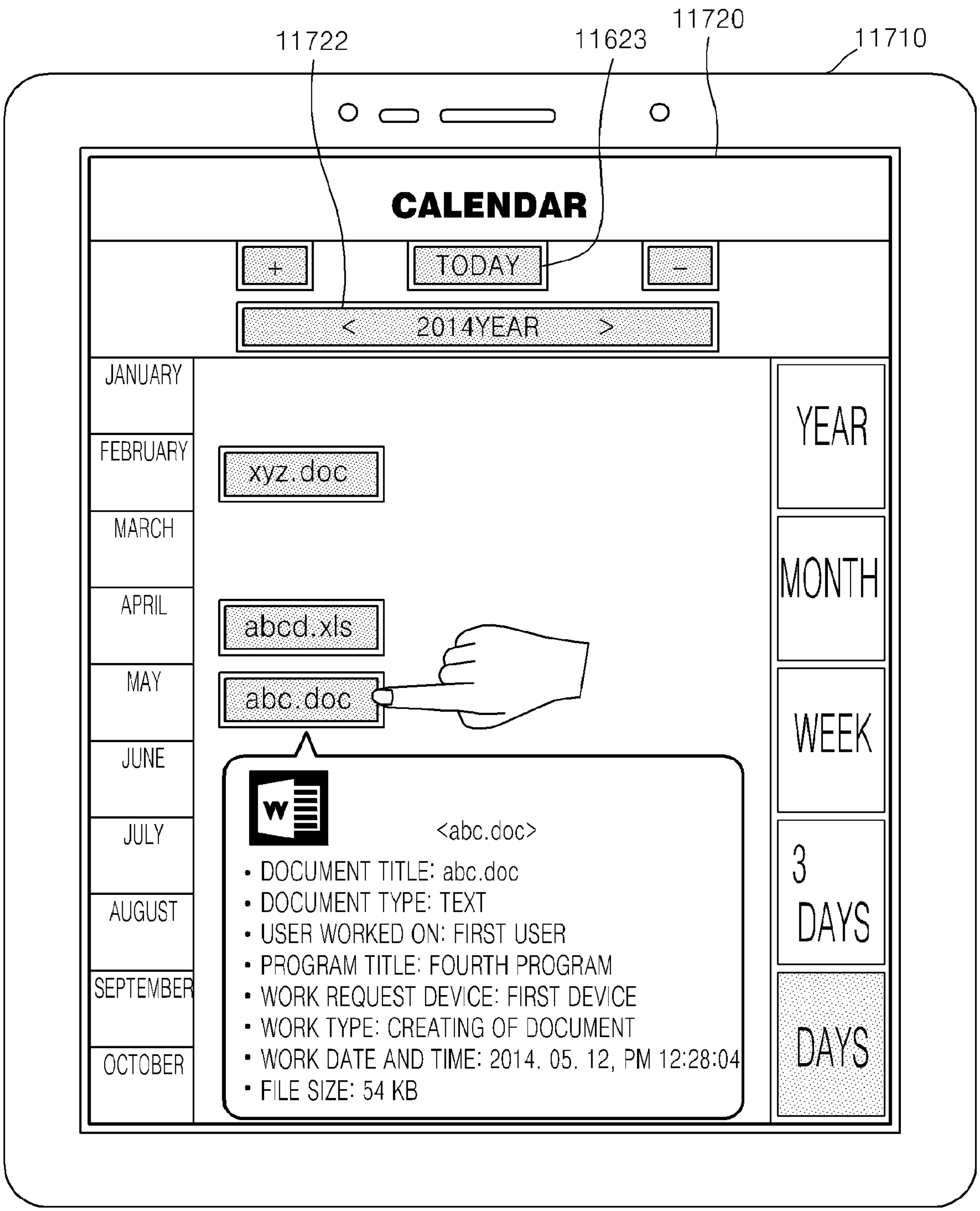
FIG. 117 illustrates an example of an annual calendar displayed on a screen of a device according to an exemplary embodiment.

FIG. 117 illustrates an example of an annual calendar 11720 displayed on a screen of a device 11710 according to an exemplary embodiment.

Referring to FIG. 117, the annual calendar 11720 is output on the screen of the device 11710. As described above with reference to FIG. 22, the calendar 11720 may include a region 11721 displaying months included in a year and an indicator 11722 that may designate a year desired by a user. The calendar 11720 may also include an indicator 11723 that may display a calendar of a year including a date of "today". In addition to the above-described indicators 11722 and 11723, the calendar 11720 may include an indicator without limitation as long as the user may use the indicator to control a display type of the calendar.

Indicators 11730, 11740, and 17750 indicating titles of documents may be displayed on the calendar 11720. For example, if it is assumed that the server 100 creates a document entitled "xyz.doc" on Feb. 12, 2014 according to a request of the first device 111, the indicator 11730 indicating "xyz.doc" may be displayed on a region of the calendar 11720 corresponding to February of 2014.

If it is assumed that the server 100 creates a document entitled "abcd.xls" on Apr. 22, 2014 according to the request of the first device 111, the indicator 11740 indicating "abcd.xls" may be displayed on a region of the calendar 11720 corresponding to April of 2014.

If it is assumed that the server 100 creates a document entitled "abc.doc" on May 12, 2014 by using a fourth program according to the request of the first device 111, the indicator 11750 indicating "abc.doc" may be displayed on a region of the calendar 11720 corresponding to May of 2014.

While all of "xyz.doc", "abcd.xls", and "abc.doc" are created by the server 100 in the present example, it is understood that the documents may be created by different devices.

The device 11710 may select the indicators 11730, 11740, and 11750 indicating the titles of the documents according to a user input received through the user input device 16510. When the indicators 11730, 11740, and 17750 indicating the titles of the documents are selected, the device 11710 may output work history information 11760 of the documents on the screen.

For example, it is assumed that the server 100 stores the document entitled "abc.doc" having the size of 54 KB (kilobytes) at 12:28:04 p.m. on May 12, 2014 by using the fourth program according to the request of the first device 111. In this regard, if the indicator 11750 indicating "abc. doc" is selected, at least one of "abc.doc", text, fourth program, first device, 12:28:04 p.m. on May 12, 2014, and 54 KB may be output as the work history information 11760. Meanwhile, the device 11710 may output the work history information 11760 of the documents on the screen as a popup window, although it is understood that one or more other exemplary embodiments are not limited thereto as described above.

An indicator 11770 that may output the documents on the screen of the device 11710 may be displayed on the work history information 11760 of the documents. For example, when the indicator 11770 that may output the documents is selected according to the user input received through the user input device 16510, the device 11710 may output the document created by the first device 111 on the screen as the popup window separately from the calendar 11720, although it is understood that one or more other exemplary embodiments are not limited thereto as described above.

Figure 118:
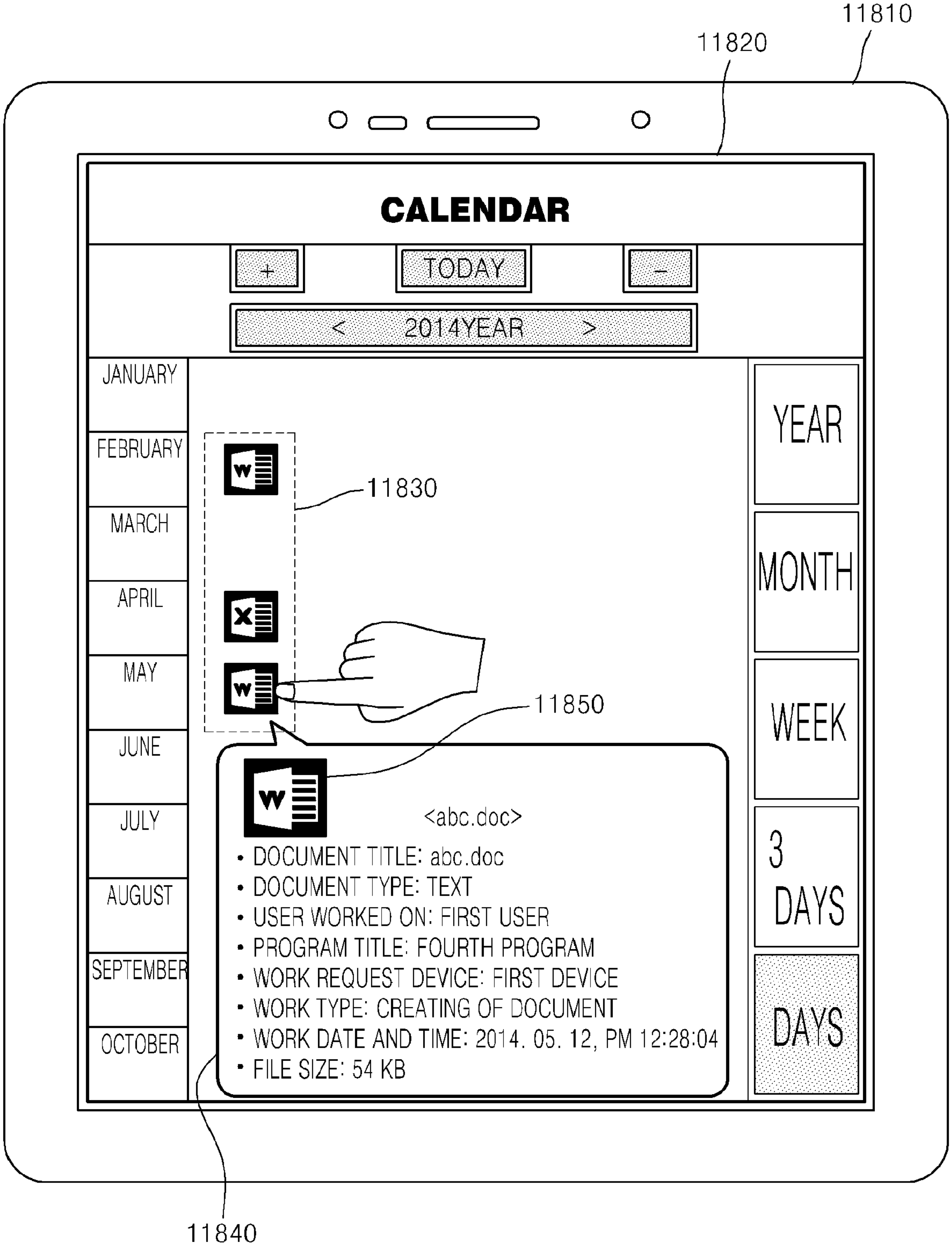
FIG. 118 illustrates another example of an annual calendar displayed on a screen of a device according to an exemplary embodiment.

FIG. 118 illustrates another example of an annual calendar 11820 displayed on a screen of a device 11810 according to an exemplary embodiment.

Referring to FIG. 118, the annual calendar 11820 is output on the screen of the device 11810. An indicator 11830 indicating a program (for example, a fourth program) used to work on a document is displayed on the calendar 11820.

As described above with reference to FIG. 117, when the indicator 11830 indicating the program used to work on the document is selected, the device 11810 may output work history information 11840 of the document on the screen. When an indicator 11850 that may output the document is selected from the screen that displays the work history information 11840 of the document, the device 11810 may output the document created by the first device 111 on the screen.

Figure 119:
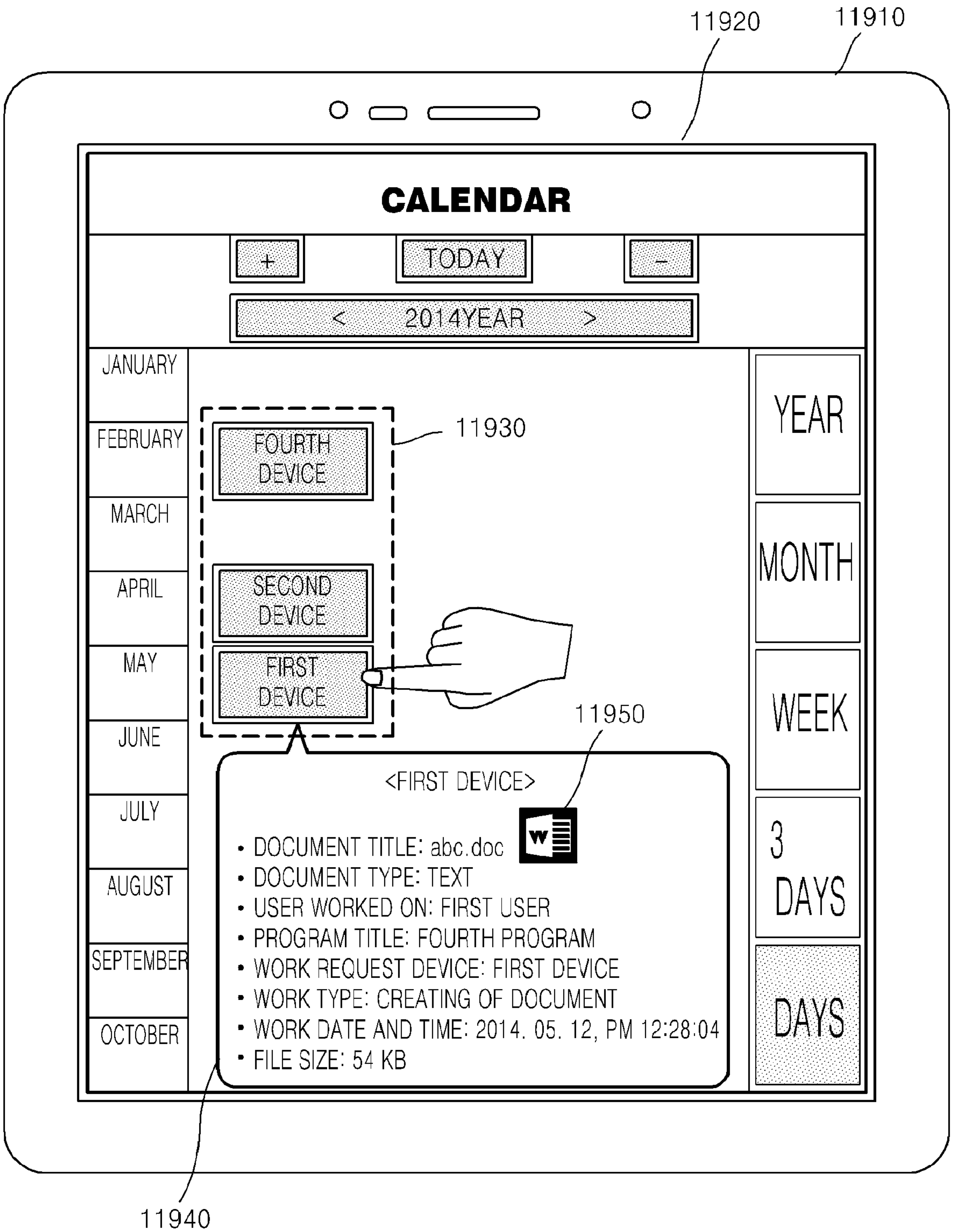
FIG. 119 illustrates another example of an annual calendar displayed on a screen of a device according to an exemplary embodiment.

FIG. 119 illustrates another example of an annual calendar 11920 displayed on a screen of a device 11910 according to an exemplary embodiment.

Referring to FIG. 1194, the annular calendar 11920 is output on the screen of the device 11910. An indicator 11930 indicating a device is displayed on the calendar 11920. As described above with reference to FIG. 117, when the indicator 11930 indicating the device is selected, the device 11910 may output execution history information 11940 of a document on the screen. When an indicator 11950 that may output the document is selected from the screen that displays the execution history information 11940 of the document, the device 11910 may output the document created by the first device 111 on the screen.

Figure 120:
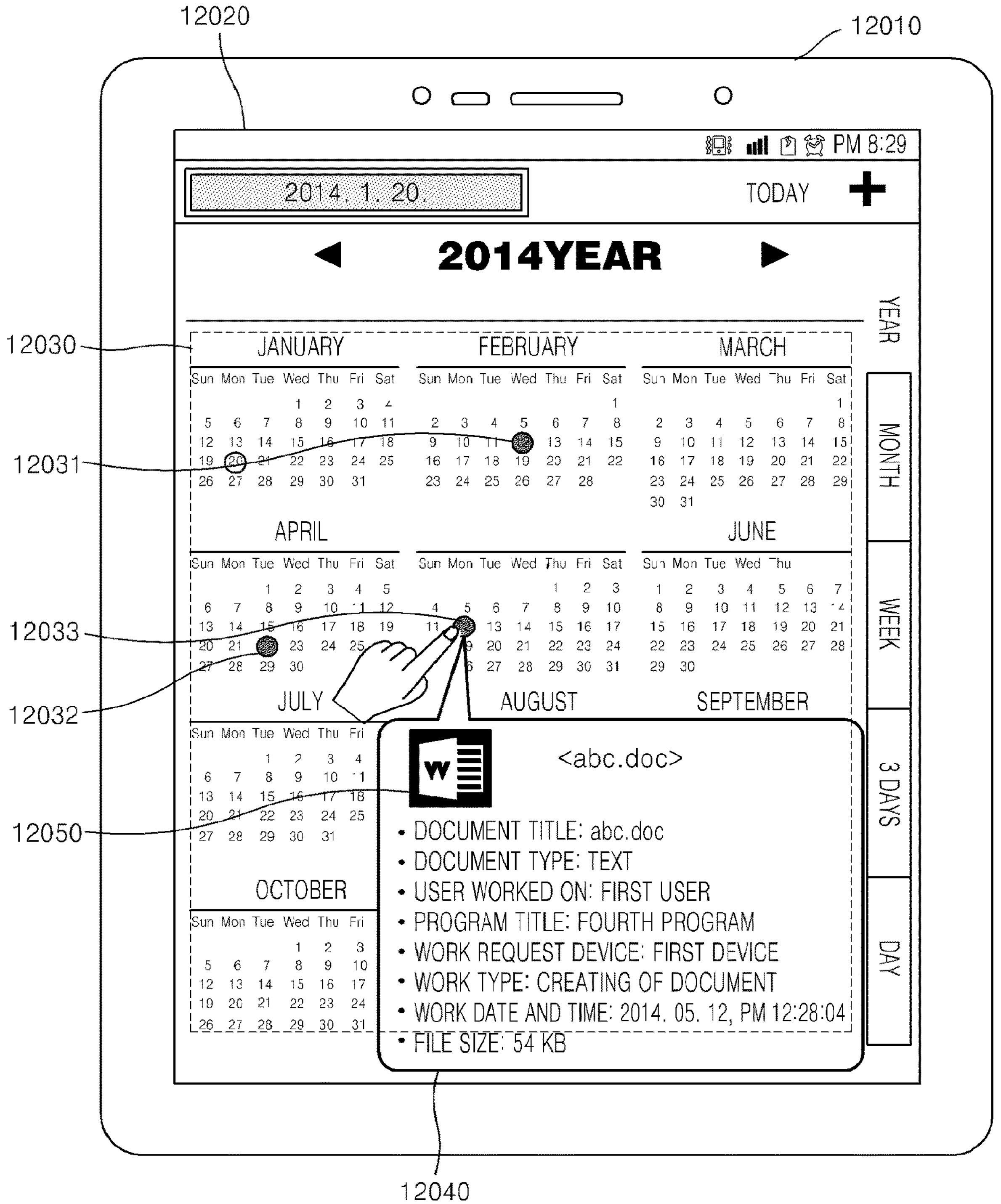
FIG. 120 illustrates another example of an annual calendar displayed on a screen of a device according to an exemplary embodiment.

FIG. 120 illustrates another example of an annual calendar 12020 displayed on a screen of a device 12010 according to an exemplary embodiment.

Referring to FIG. 120, the annular calendar 12020 is output on the screen of the device 12010. The annular calendars 11720, 11820, and 11920 of FIGS. 117 through 119 include regions displaying months included in a year, whereas the annular calendar 12020 of FIG. 120 includes a region 12030 displaying days included in a year. In other words, the device 12010 may modify a type of the annular calendar 12020 in various ways to output the annular calendar 12020 on the screen.

Indicators 12031, 12032, and 12033 may be displayed on respective dates of the calendar 12020 on which the documents are worked. For example, if it is assumed that the server 100 creates a document entitled "xyz.doc" on Feb. 12, 2014 according to a request of the first device 111, the indicator 12031 indicating "xyz.doc" may be displayed on a region of the calendar 12020 corresponding to Feb. 12, 2014.

If it is assumed that the server 100 creates a document entitled "abcd.xls" on Apr. 22, 2014 according to the request of the first device 111, the indicator 12032 indicating "abcd.xls" may be displayed on a region of the calendar 12020 corresponding to Apr. 22, 2014.

If it is assumed that the server 100 creates a document entitled "abc.doc" on May 12, 2014 by using a fourth program according to the request of the first device 111, the indicator 12033 indicating "abc.doc" may be displayed on a region of the calendar 12020 corresponding to May 12, 2014.

While all of "xyz.doc", "abcd.xls", and "abc.doc" are created by the server 100 in the present example, it is understood that the documents may be created by different devices.

As described above with reference to FIG. 117, when the indicator 12033 displayed on the calendar 12020 is selected, the device 12010 may output work history information 12040 of a document on the screen. For example, "abc.doc, text, fourth program, first device, 12:28:04 p.m. on May 12, 2014, and 54 KB" may be output as the work history information 12040. When an indicator 12050 that may output the document is selected from the screen displaying the work history information 12040 of the document, the device 12010 may output the document created by the first device 111 on the screen.

Figure 121A:
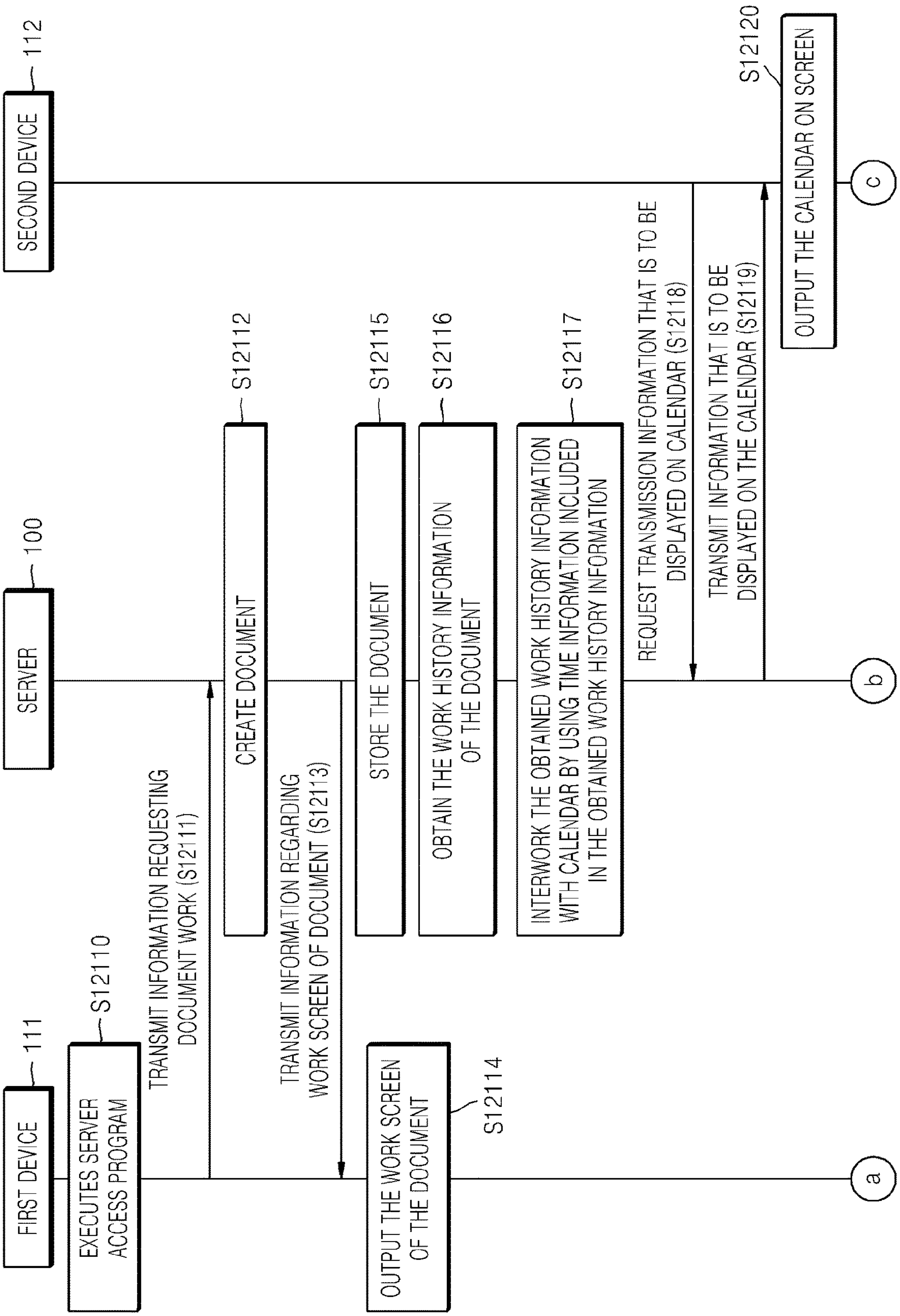
FIGS. 121A through 121C are flowcharts of examples in which when a server performs a document work according to a document work request of a first device, and a second device reads the document, the server interworks work history information with a calendar of a first user according to an exemplary embodiment.
Figure 121B:
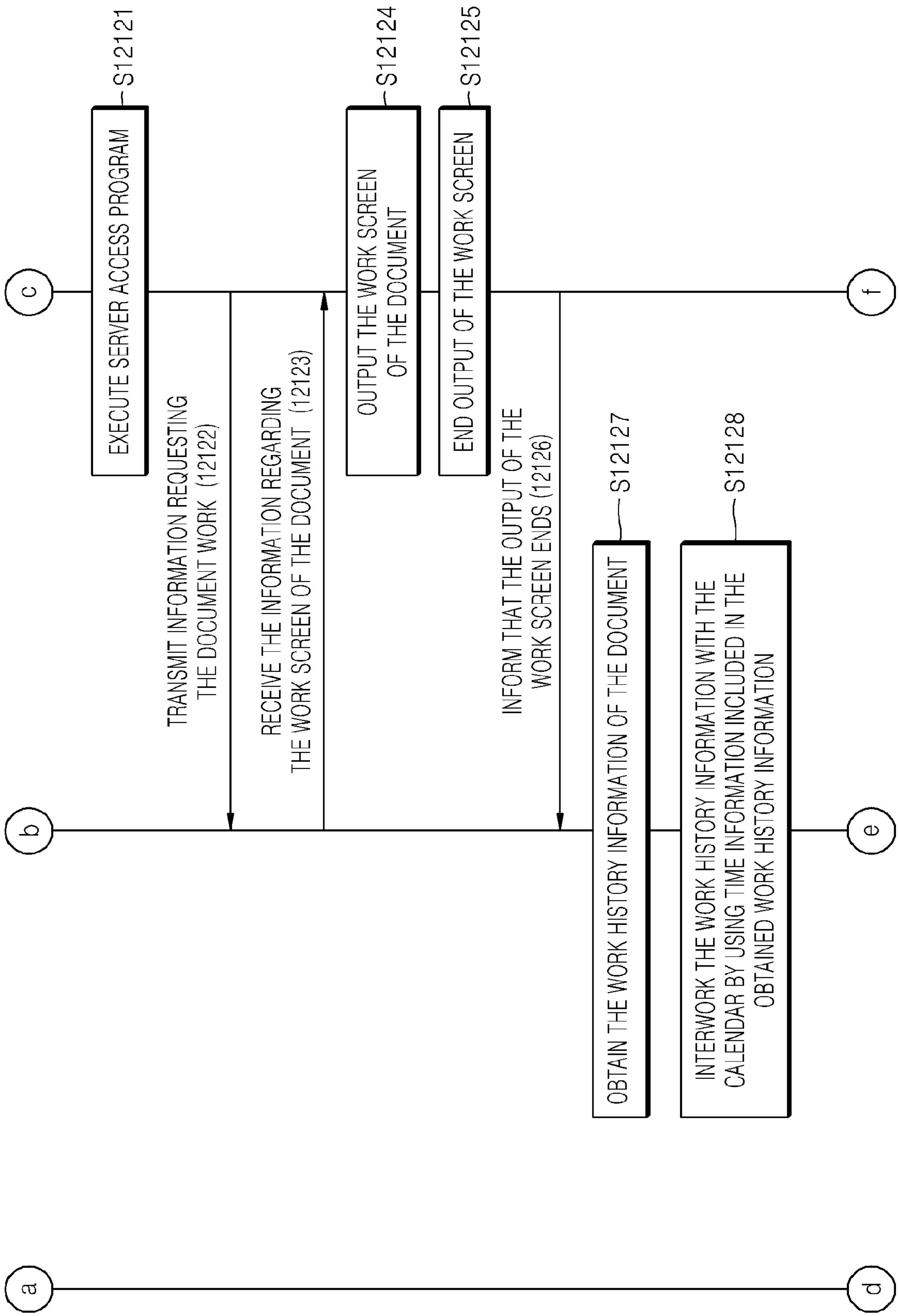
Figure 121C:
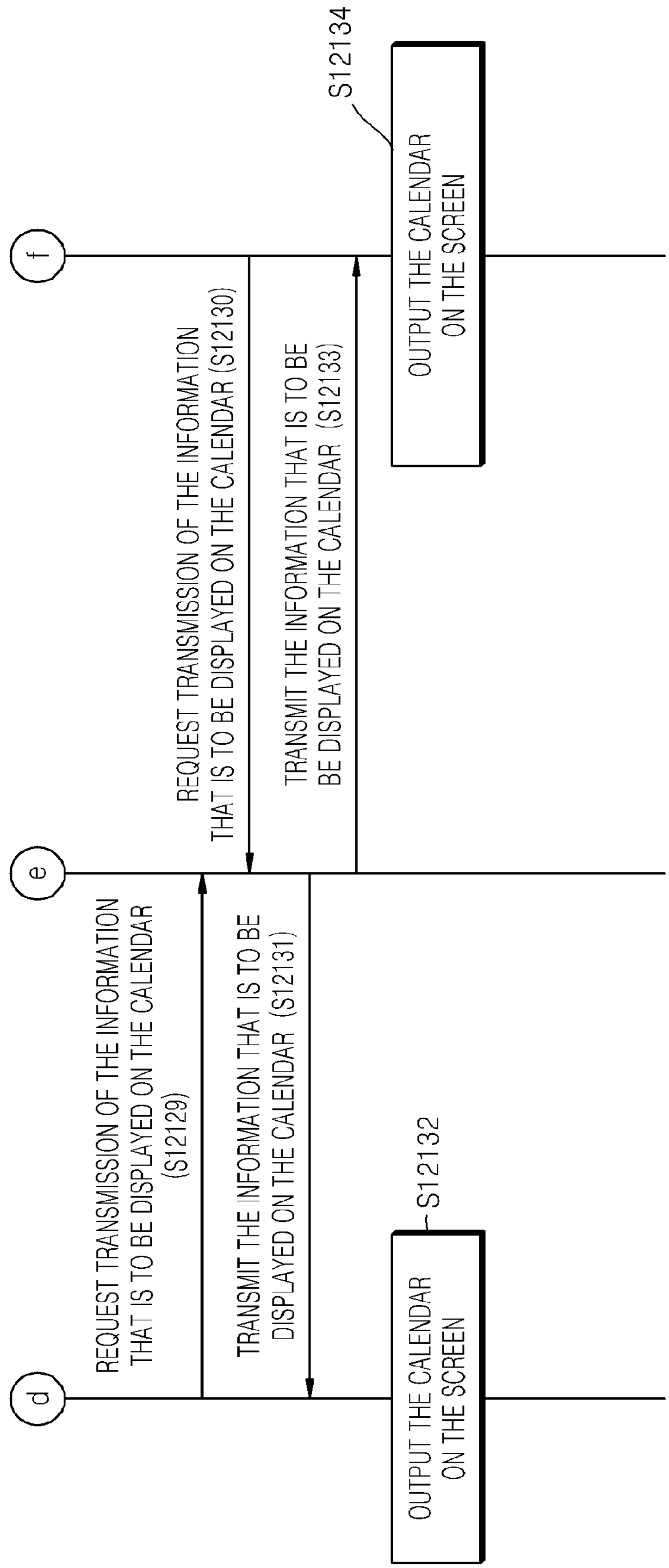

FIGS. 121A through 121C are flowcharts of examples in which when the server 100 performs a document work according to a document work request of the first device 111, and the second device 112 reads the document, the server 100 interworks work history information with a calendar of a first user according to an exemplary embodiment.

While the server 100 works on a document according to the document work request of the first device 111 in FIGS. 121A through 121C, it is understood that one or more other exemplary embodiments are not limited thereto. In other words, there is no limit to the number of devices that request the document work in one or more other exemplary embodiments. There is also no limit to the number of devices that request the server 100 to transmit information that is to be displayed on the calendar in one or more other exemplary embodiments.

In operation S12110, the first device 111 executes a server access program. In order for a user to request the server 100 to work on the document, the first device 111 may execute the server access program. For example, the user of the first device 111 executes the server access program and may input the ID and passwords of the user.

In operation S12111, the first device 111 transmits information requesting the document work to the server 100.

In operation S12112, the server 100 creates the document. The server 100 creates the document based on the information received from the first device 111. For example, the server 100 may execute a program used to create the document and create the document by using the program executed in the server 100.

For example, if it is assumed that a document created by the server 100 is "abc.doc", and a program used to create "abc.doc" is a fourth program, the server 100 may execute the fourth program and create, read, or edit "abc.doc".

In operation S12113, the server 100 transmits information regarding a work screen of the document to the first device 111. For example, every time the server 100 works on the document based on the information received from the first device 111, the server 100 may transmit the information regarding the work screen of the document to the first device 111. In other words, the server 100 may transmit the information regarding the work screen of the document that is modified every time the document is worked on by using the program executed in the server 100 to the first device 111.

In operation S12114, the first device 111 outputs the work screen of the document. For example, the first device 111 may output the work screen of the document based on the information regarding the work screen of the document transmitted from the server 100.

In operation S12115, the server 100 stores the document. The server 100 stores the document if the document work is complete.

In operation S12116, the server 100 obtains the work history information of the document. For example, the server 100 may obtain the work history information of the document at the time of ending execution of the program used to work on the document or storing the document. For example, the server 100 may obtain work history information of "abc.doc" at the time of storing "abc.doc" or ending execution of the fourth program, although it is understood that one or more other exemplary embodiments are not limited thereto as described above. For example, the server 100 may store the obtained work history information in the storage corresponding to the account of the user of the first device 111.

In operation S12117, the server 100 interworks the obtained work history information with the calendar of the user by using time information included in the obtained work history information. For example, if it is assumed that the server 100 stores "abc.doc" at 12:28:04 p.m. of May 12, 2014, the server 100 may generate an indicator that is to be displayed on a region of the calendar corresponding to May 12, 2014.

In operation S12118, the second device 112 requests the server 100 to transmit information that is to be displayed on the calendar. For example, the second device 112 may request the server 100 to transmit work history information that is to be output on a screen of a device when an indicator that is to be displayed on the calendar or an indicator displayed on the calendar is selected. The second device 112 may request the server 100 to transmit the information that is to be displayed on the calendar after executing a calendar output program installed in the second device 112 and authenticating the user by using an input user account.

In operation S12119, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed.

In FIG. 121A, when the second device 112 requests the server 100 to transmit the information that is to be displayed on the calendar in operations S12118, the server 100 transmits the information that is to be displayed on the calendar to the second device 112 in operation S12119, although it is understood that one or more other exemplary embodiments are not limited thereto. According to another exemplary embodiment, although there is no request from the second device 112, the server 100 may automatically transmit (for example, push) the information that is to be displayed on the calendar to the second device 112. For example, if the second device 112 has previously requested the server 100 to transmit the information that is to be displayed on the calendar, the server 100 may automatically transmit the information that is to be displayed on the calendar although there is no request from the second device 112 at a later time. According to another example, the server 100 may automatically transmit the information according to a prior setting or a default setting to automatically transmit the information at predetermined time intervals or predetermined time points.

In operation S12120, the second device 112 outputs the calendar on the screen. For example, the second device 112 may output the calendar that displays an indicator transmitted from the server 100 on the screen.

In operation S12121, the second device 112 executes a server access program. In order for the user to request the server 100 to work on the document, the second device 112 may execute the server access program. For example, the user of the second device 112 executes the server access program and may input the ID and passwords of the user.

In operation S12122, the second device 112 transmits the information requesting the document work to the server 100.

In operation S12123, the second device 112 receives the information regarding the work screen of the document from the server 100.

In operation S12124, the second device 112 outputs the work screen of the document.

In operation S12125, the second device 112 ends output of the work screen.

In operation S12126, the second device 112 informs the server 100 of having ending the output of the work screen.

In operation S12127, the server 100 obtains the work history information of the document. For example, the server 100 may store the obtained work history information in the storage corresponding to the account of the user of the second device 112.

In operation S12128, the server 100 interworks the work history information with the calendar by using time information included in the obtained work history information.

In operation S12129, the first device 111 requests the server 100 to transmit the information that is to be displayed on the calendar. For example, the first device 111 may request the server 100 to transmit the work history information that is to be output on the screen of the device when the indicator that is to be displayed on the calendar or the indicator displayed on the calendar is selected.

In operation S12130, the second device 112 requests the server 100 to transmit the information that is to be displayed on the calendar.

In operation S12131, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed. In the latter case, the first device 111 may set or determine which information is to be displayed on the calendar among received information. Here, the first device 111 may determine which information is to be displayed based on a prior setting or a default setting, or based on one or more user inputs (e.g., filter requests).

In operation S12132, the first device 111 outputs the calendar on the screen. For example, the first device 111 may output the calendar that displays the indicator transmitted from the server 100 on the screen.

In operation S12133, the server 100 transmits the information that is to be displayed on the calendar to the second device 112.

In operation S12134, the second device 112 outputs the calendar on the screen. Hereinafter, an example in which the second device 112 requests the server 100 to work on a document and receives information regarding a work screen from the server 100 will be described with reference to FIG. 122.

Figure 122:
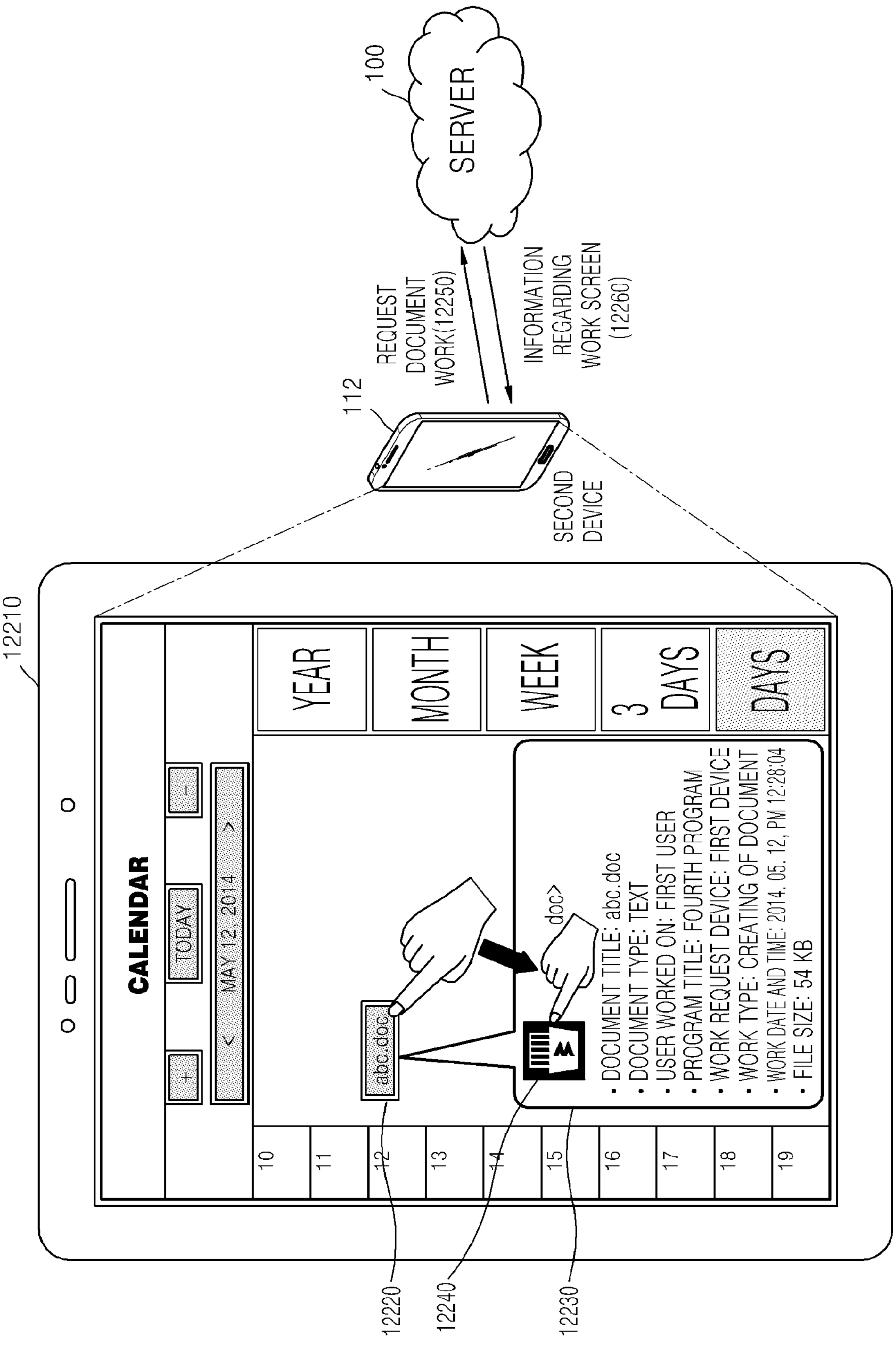
FIG. 122 illustrates an example in which a second device requests a server to work on a document and receives information regarding a work screen from the server according to an exemplary embodiment.

FIG. 122 illustrates an example in which the second device 112 requests the server 100 to work on a document and receives information regarding a work screen from the server 100 according to an exemplary embodiment.

Referring to FIG. 122, a calendar 12210 output on a screen of the second device 112 is illustrated. In this regard, the calendar 12210 is a calendar output on the screen of the second device 112 as a result of performing operation S12120 of FIG. 121A.

The second device 1112 receives a user input that selects an indicator 12220 displayed on the calendar 12210 through the user input device 16510. The second device 112 outputs work history information 12230 of the document on the screen according to the received user input. In this regard, an indicator 12240 that may output the document on the screen of the second device 112 may be displayed on the screen displaying the work history information 12230 of the document.

The second device 112 receives a user input that selects the indicator 12240 through the user input device 16510. The second device 112 requests 12250 the server 100 to work on the document according to the received user input. The server 100 transmits 12260 information regarding a work screen to the second device 112 according to a request of the second device 112.

Referring back to FIG. 122, in operation S12224, the second device 112 outputs the work screen of the document transmitted from the server 100 on the screen.

In operation S12225, the second device 112 ends output of the work screen. Hereinafter, an example in which the second device 112 ends output of a work screen will now be described with reference to FIG. 123.

Figure 123:
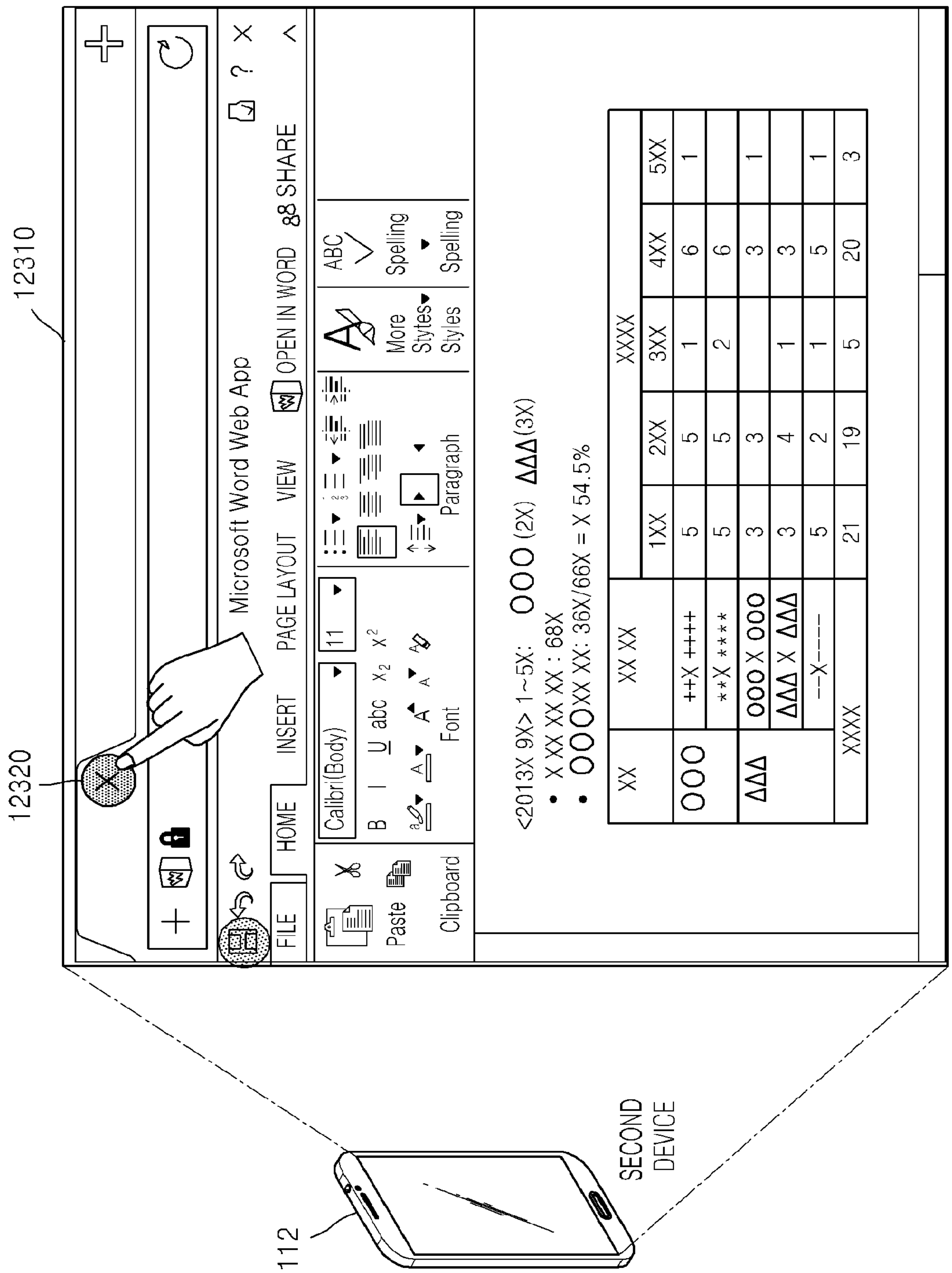
FIG. 123 is a diagram for explaining an example in which a second device ends output of a work screen according to an exemplary embodiment.

FIG. 123 is a diagram for explaining an example in which the second device 112 ends output of a work screen according to an exemplary embodiment.

Referring to FIG. 123, the work screen received from the server 100 is output 12310 on a screen of the second device 112. The second device 112 receives a user input that ends output 12310 of the work screen through the user input device 16510. For example, the user input may be an input 12320 that ends execution of a program used to work on a document.

Referring to FIG. 123, the second device 112 receives a user input that selects an indicator 12320 displayed on the screen. The second device 112 ends the program used to work on the document according to the received user input.

Figure 124:
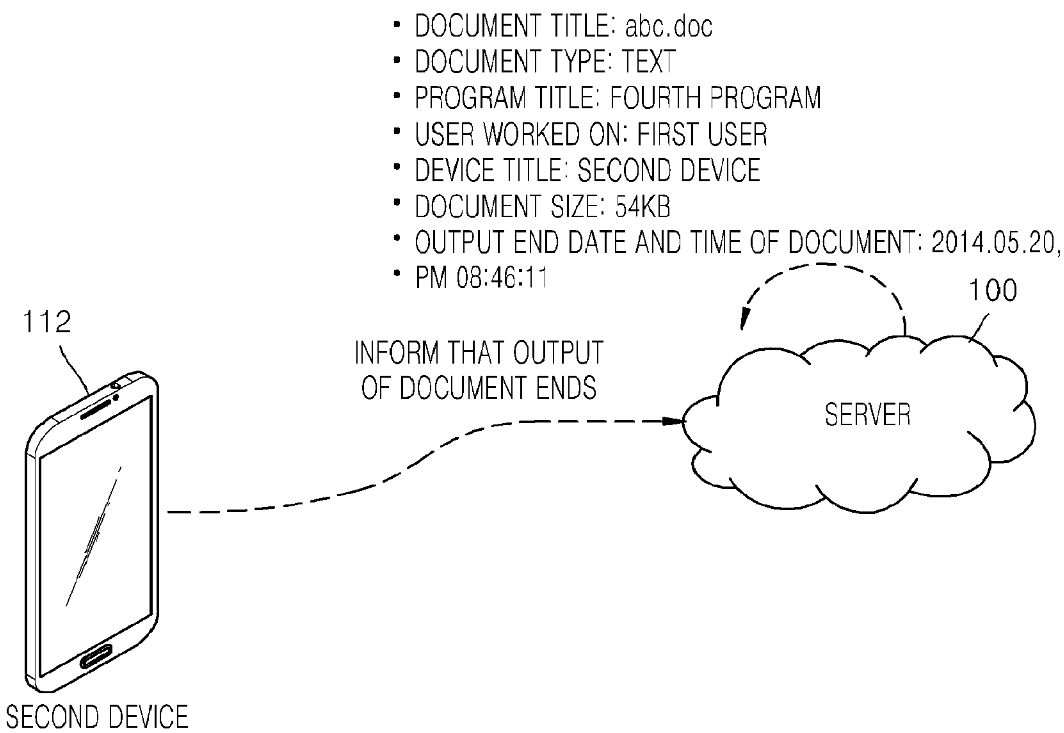
FIG. 124 is a diagram for explaining an example in which a second device transmits work history information of a document to a server according to an exemplary embodiment.

FIG. 124 is a diagram for explaining an example in which the second device 112 transmits work history information of a document to the server 100 according to an exemplary embodiment.

Referring to FIG. 124, the second device 112 informs the server 100 of ending output of the document, and the server receives the work history information of the document from the second device 112.

The server 100 obtains work history information of a text document after storing the text document. For example, if it is assumed that the second device 112 stores a document entitled "abc.doc" having a size of 54 KB (kilobytes) at 08:46:11 p.m. on May 20, 2014 by using a fourth program, the server 100 may obtain at least one of "abc.doc", text, fourth program, second device, 08:46:11 p.m. on May 20, 2014, and 54 KB.

The encryption and storage of the work history information which requires a high level of security have been described with reference to FIG. 106.

Figure 125:
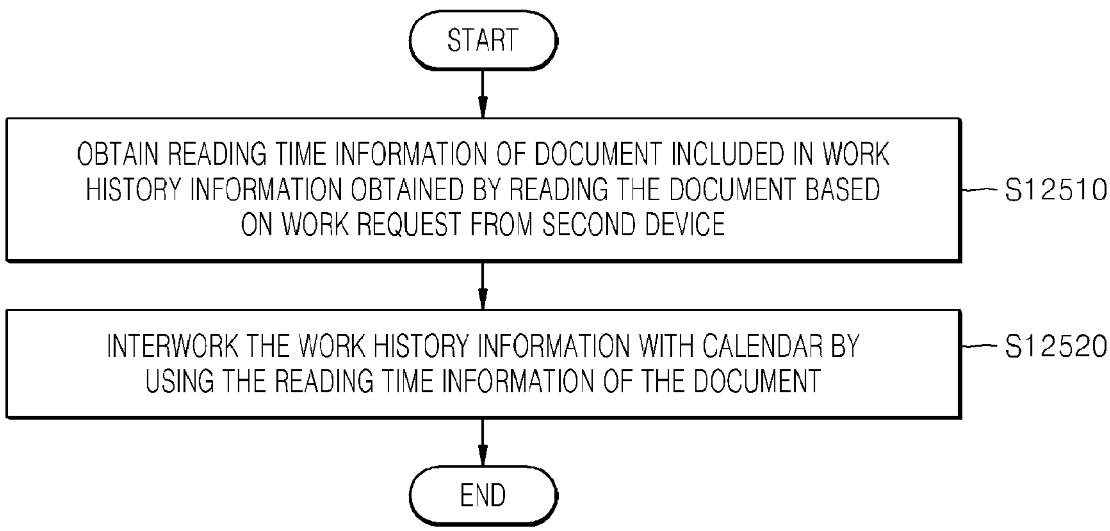
FIG. 125 is a flowchart of an example in which a server interworks work history information of a document with a calendar according to an exemplary embodiment.

FIG. 125 is a flowchart of an example in which the server 100 interworks work history information of a document with a calendar according to an exemplary embodiment.

In operation S12510, the server 100 obtains reading time information of the document included in work history information obtained by reading the document based on a work request from the second device 112. For example, according to the example described above with reference to FIG. 124, the server 100 obtains "08:46:11 p.m. of May 20, 2014" from the work history information obtained by reading the document based on the work request from the second device 112.

FIGS. 126 and 127 are tables illustrating examples of work history information 12610 and 12710 of a document according to an exemplary embodiment.

Referring to FIG. 126, the work history information 12610 of the document is illustrated. For example, the work history information 12610 of the document includes a document title 12611, a document type, a work program title, a user who work on the document, a work device title, a work type, a work date and time, and a file size but is not limited thereto. In other words, the work history information 12610 of the document may correspond to information without limitation as long as the information may be generated by working on the document.

The work history information 12610 of the document of FIG. 126 is generated by updating the work history information 10810 of the document of FIG. 108. In other words, the work history information 12610 of the document of FIG. 126 is generated when a device creates the document.

Meanwhile, the work history information 12610 of the document of FIG. 126 is generated by adding new work history information 12620 when the first device 111 creates the document, and the second device 112 reads the document. In more detail, FIG. 126 shows an example in which the first device 111 creates a document "abc.doc" at 12:28:04 p.m. on May 12, 2014, and the second device 112 adds the new work history information 12620 by reading the document "abc.doc" at 08:46:11 p.m. on May 20, 2014.

The work history information 12610 of the document of FIG. 126 is generated by adding new work history information 12630 when the Nth device 114 creates the document, and the third device 113 reads the document. In more detail, FIG. 126 shows an example in which a first user creates a document "kkk.ppt" at 02:21:04 a.m. on Jan. 1, 2013 by using the Nth device 114, and adds the new work history information 12630 by reading the document "kkk.ppt" at 08:21:11 p.m. on May 28, 2014 by using the third device 113.

Referring to FIG. 127, the work history information 12710 of the document is illustrated. The work history information 12710 of the document of FIG. 126 and the work history information 12610 of the document of FIG. 126 include the same information. In other words, the work history information 12710 of the document of FIG. 127 includes a work device request title 12711, a document type, a work program title, a document title, a work type, a user who work on the document, a work date and time, and a file size.

The work history information 12710 of the document of FIG. 126 is generated by updating the work history information 10910 of the document of FIG. 109. In other words, the work history information 12710 of the document of FIG. 126 is generated when a device creates the document. Meanwhile, the work history information 12710 of the document of FIG. 126 is generated by adding new work history information 12720 and 12730 when at least one of devices reads the created document.

The work history information 12710 of the document of FIG. 126 is generated by adding the new work history information 12720 when the second device 112 reads a document "abc.doc". In more detail, FIG. 127 shows an example in which the new work history information 12720 is added when the second device 112 reads the document "abc.doc" at 08:46:11 p.m. of May 20, 2014.

The work history information 12710 of the document of FIG. 127 is generated by adding the new work history information 12730 when the third device 113 reads a document "kkk.ppt". In more detail, FIG. 127 shows an example in which the new work history information 12730 is added when the third device 113 reads the document "kkk.ppt" at 08:21:11 p.m. on May 28, 2014.

Figure 128:
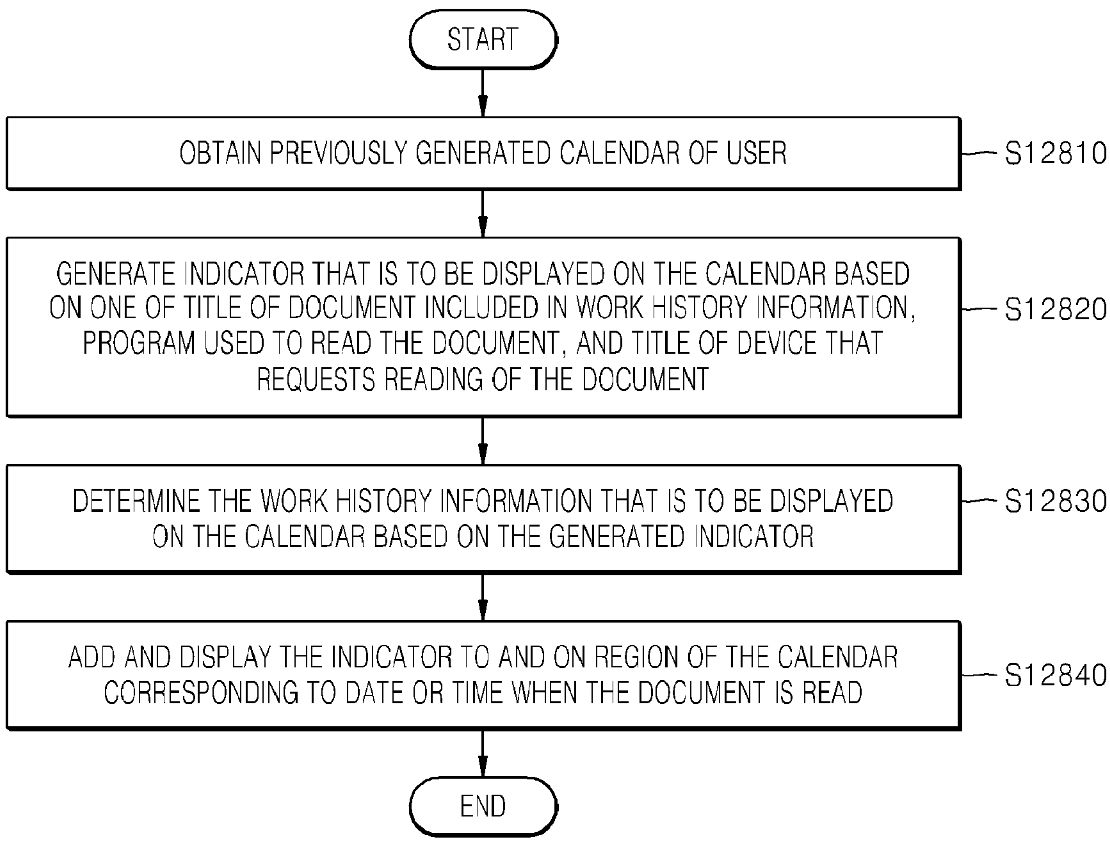
FIG. 128 is a flowchart of an example in which a server interworks work history information with a calendar of a user according to an exemplary embodiment.

FIG. 128 is a flowchart of an example in which the server 100 interworks work history information with a calendar of a user according to an exemplary embodiment.

In operation S12810, the server 100 obtains a previously generated calendar of the user. In this regard, the previously generated calendar of the user is a form that is to interwork with the work history information of a document. For example, the server 100 may read the calendar of the user that matches with an account of the user and is stored in the database 16430, and may receive the calendar of the user from at least one of the devices 110. For example, the calendar of the user may include a calendar on a day basis, a calendar on a week basis, a calendar on a month basis, or a calendar on a year basis.

In operation S12820, the server 100 may generate an indicator that is to be displayed on the calendar based on at least one of a title of the document included in the work history information, a program used to read the document, and a title of a device that requests reading of the document. In other words, the server 100 determines one of the title of the document, the program used to read the document, and the title of the device that requests reading of the document as an item indicating the indicator and generates the indicator based on the determined item.

In operation S12830, the server 100 determines the work history information that is to be displayed on the calendar based on the generated indicator.

In operation S12840, the server 100 adds and displays the indicator to and on a region of the calendar corresponding to a date or time when the document is read.

Figure 129:
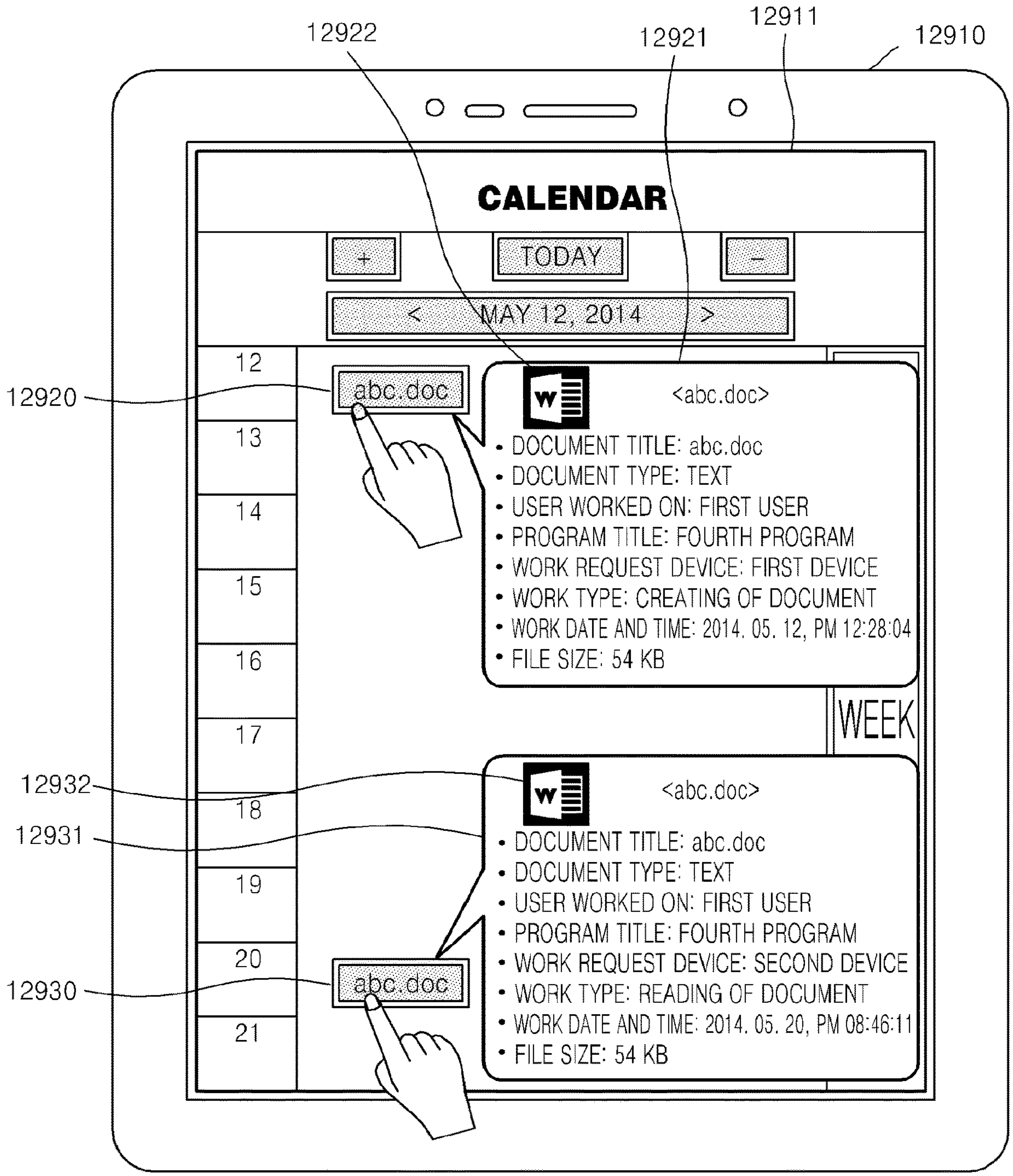
FIG. 129 illustrates an example of a daily calendar displayed on a screen of a device according to an exemplary embodiment.

FIG. 129 illustrates an example of a daily calendar 12911 displayed on a screen of a device 12910 according to an exemplary embodiment.

Referring to FIG. 129, the daily calendar 12911 is output on the screen of the device 12910. An indicator 12920 indicating a title of a document may be displayed on the calendar 12911. For example, if it is assumed that the server 100 creates a document entitled "abc.doc" on May 12, 2014 according to a request of the first device 111, the indicator 12920 indicating "abc.doc" may be displayed on a region of the calendar 12911 corresponding to May 12, 2014.

The device 12910 may select the indicator 12920 indicating "abc.doc" according to a user input received through the user input device 16510. When the indicator 12920 indicating "abc.doc" is selected, the device 12910 may output work history information 12921 of the document on the screen. For example, if it is assumed that the server 100 stores the document entitled "abc.doc" having a size of 54 KB (kilobytes) at 12:28:04 p.m. on May 12, 2014 by using a fourth program according to the request of the first device 111, at least one of "abc.doc", text, fourth program, first device, 12:28:04 p.m. on May 12, 2014, and 54 KB may be output as the work history information 12921. Meanwhile, the device 12910 may output the work history information 12921 of the document on the screen as a popup window, although it is understood that one or more other exemplary embodiments are not limited thereto as described above. For example, the device 12910 may output the work history information 12921 on an entirety of the screen, on a designated region of the screen, etc., in one or more other exemplary embodiments.

An indicator 12922 that may output the document on the screen of the device 12910 may be displayed on the work history information 12921 of the document. For example, when the indicator 12922 that may output the document is selected according to the user input received through the user input device 16510, the device 12910 may output the document created by the first device 111 on the screen as the popup window separately from the calendar 12911, although it is understood that one or more other exemplary embodiments are not limited thereto as described above.

Likewise, a plurality of indicators indicating titles of documents may be displayed on the single calendar 12911. For example, if it is assumed that the server 100 reads the document entitled "abc.doc" on May 20, 2014 according to a request of the second device 112, an indicator 12930 indicating the "abc.doc" may be displayed on a region of the calendar 12911 corresponding to May 20, 2014.

The device 12910 may select the indicator 12930 indicating the "abc.doc" according to the user input received through the user input device 16510. When the indicator 12930 indicating the "abc.doc" is selected, the device 12910 may output work history information 12931 of the document on the screen. For example, if the server 100 reads the document entitled "abc.doc" having the size of 54 KB (kilobytes) at 08:46:11 p.m. on May 20, 2014 by using the fourth program according to the request of the second device 112, at least one of "abc.doc", text, fourth program, second device, 08:46:11 p.m. on May 20, 2014, and 54 KB may be output as the work history information 12931. Meanwhile, the device 12910 may output the work history information 12931 of the document on the screen as the popup window, although it is understood that one or more other exemplary embodiments are not limited thereto as described above.

An indicator 12932 that may output the document on the screen of the device 12910 may be displayed on the work history information 12931 of the document. When an indicator 12932 that may output the document is selected according to the user input received through the user input device 16510, the device 12910 may output the document read by the second device 112 on the screen as the popup window separately from the calendar 12911, although it is understood that one or more other exemplary embodiments are not limited thereto as described above.

Figure 130:
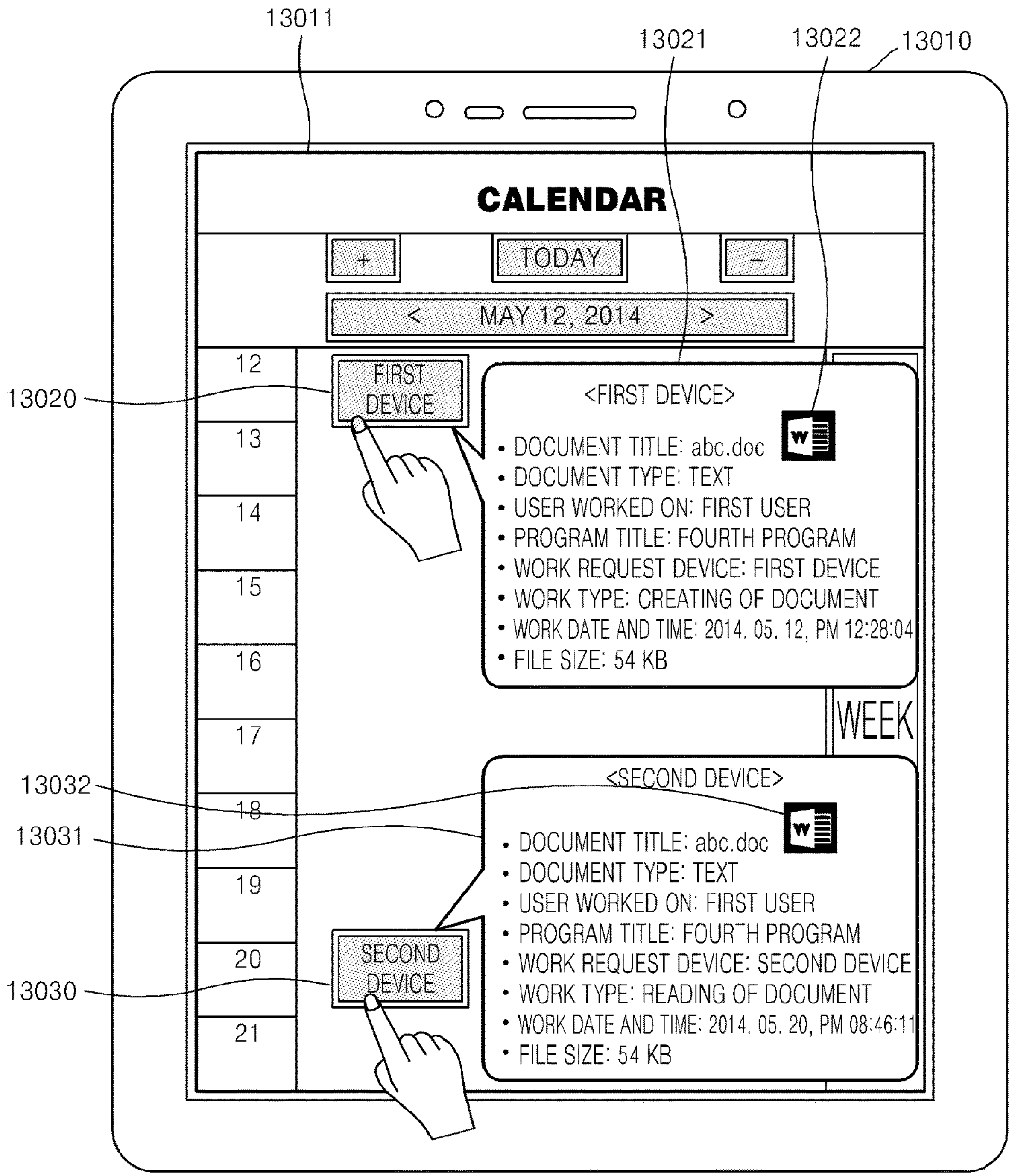
FIG. 130 illustrates another example of a daily calendar displayed on a screen of a device according to an exemplary embodiment.

FIG. 130 illustrates another example of a daily calendar 13011 displayed on a screen of a device 13010 according to an exemplary embodiment.

Referring to FIG. 130, the daily calendar 13011 is output on the screen of the device 13010. An indicator 13020 indicating a title of a document may be displayed on the calendar 13011. For example, if it is assumed that the first device 111 creates a document on May 12, 2014, the indicator 13020 indicating "first device" may be displayed on a region of the calendar 13011 corresponding to May 12, 2014.

The device 13010 may select the indicator 13020 indicating "first device" according to a user input received through the user input device 16510. When the indicator 13020 indicating "first device" is selected, the device 13010 may output work history information 13021 of the document on the screen. For example, if it is assumed that the server 100 stores a document entitled "abc.doc" having a size of 54 KB (kilobytes) at 12:28:04 p.m. on May 12, 2014 by using a fourth program according to a request of the first device 111, at least one of "abc.doc", text, fourth program, first device, 12:28:04 p.m. on May 12, 2014, and 54 KB may be output as the work history information 13021. Meanwhile, the device 13010 may output the work history information 13021 of the document on the screen as a popup window, although it is understood that one or more other exemplary embodiments are not limited thereto as described above.

An indicator 13022 that may output the document on the screen of the device 13010 may be displayed on the work history information 13021 of the document. For example, when the indicator 13022 that may output the document is selected according to the user input received through the user input device 16510, the device 13010 may output the document created by the first device 111 on the screen as the popup window separately from the calendar 13011, although it is understood that one or more other exemplary embodiments are not limited thereto as described above.

Likewise, a plurality of indicators indicating titles of documents may be displayed on the single calendar 13011. For example, if it is assumed that the server 100 reads the document entitled "abc.doc" on May 20, 2014 according to a request of the second device 112, an indicator 13030 indicating the "second device" may be displayed on a region of the calendar 13011 corresponding to May 20, 2014.

The device 13010 may select the indicator 13030 indicating the "second device" according to the user input received through the user input device 16510. When the indicator 13030 indicating the "second device" is selected, the device 13010 may output work history information 13031 of the document on the screen. For example, if the server 100 reads the document entitled "abc.doc" having the size of 54 KB (kilobytes) at 08:46:11 p.m. on May 20, 2014 by using the fourth program according to the request of the second device 112, at least one of "abc.doc", text, fourth program, second device, 08:46:11 p.m. on May 20, 2014, and 54 KB may be output as the work history information 13031. Meanwhile, the device 13010 may output the work history information 13031 of the document on the screen as the popup window, although it is understood that one or more other exemplary embodiments are not limited thereto as described above.

An indicator 13032 that may output the document on the screen of the device 13010 may be displayed on the work history information 13031 of the document. When an indicator 13032 that may output the document is selected according to the user input received through the user input device 16510, the device 13010 may output the document read by the second device 112 on the screen as the popup window separately from the calendar 13011, although it is understood that one or more other exemplary embodiments are not limited thereto as described above.

Hereinafter, examples in which when the server 100 creates a document according to a request of the first device 111 and edits the document according to a request of the second device 112, the server 100 interworks work history information with a calendar of a user will be described with reference to FIGS. 131A through 140.

Figure 131A:
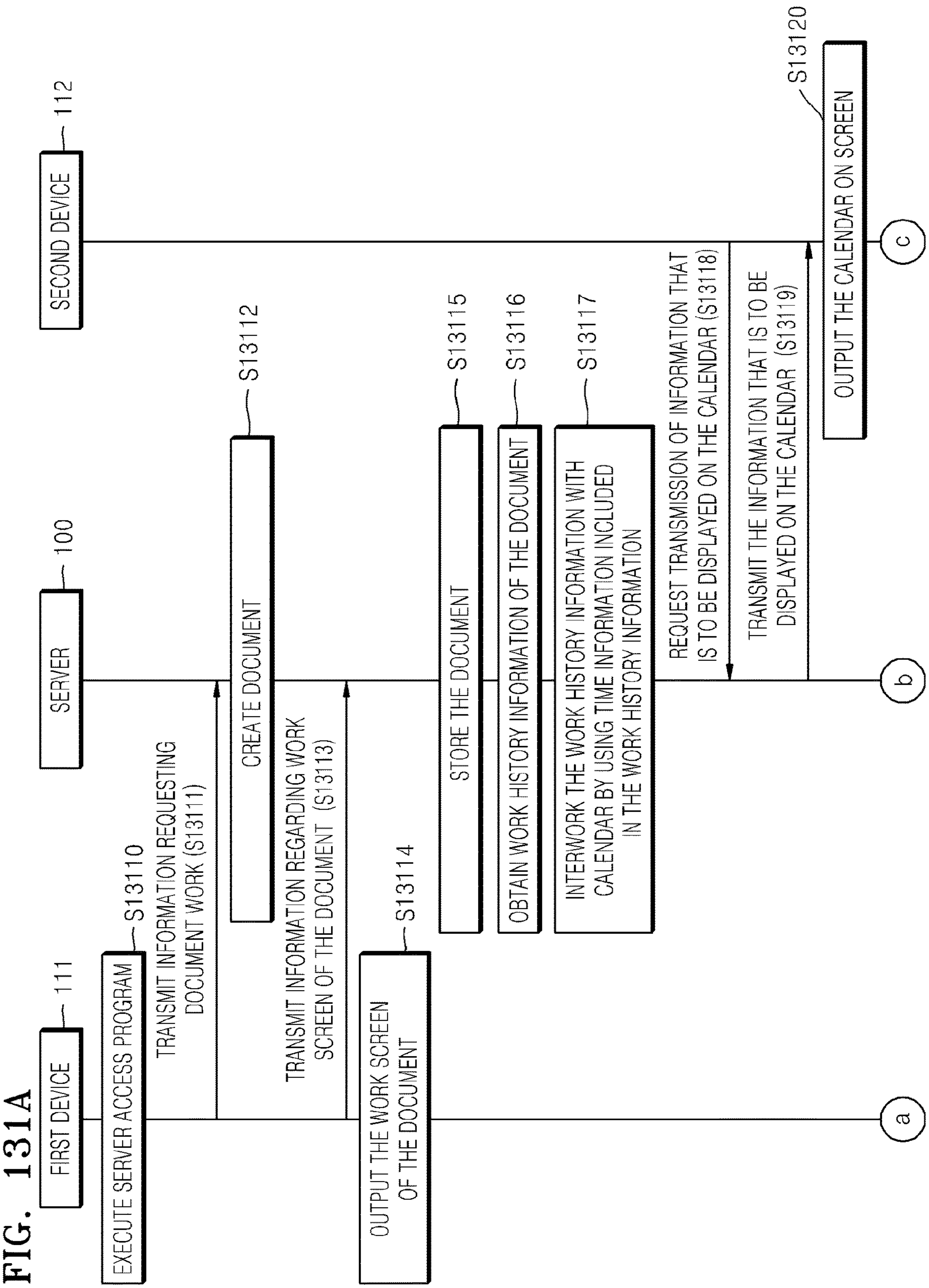
FIGS. 131A through 131C are flowcharts of examples in which when a server creates a document according to a request of a first device and edits the document according to a request of a second device, the server interworks work history information with a calendar of a user according to an exemplary embodiment.
Figure 131B:
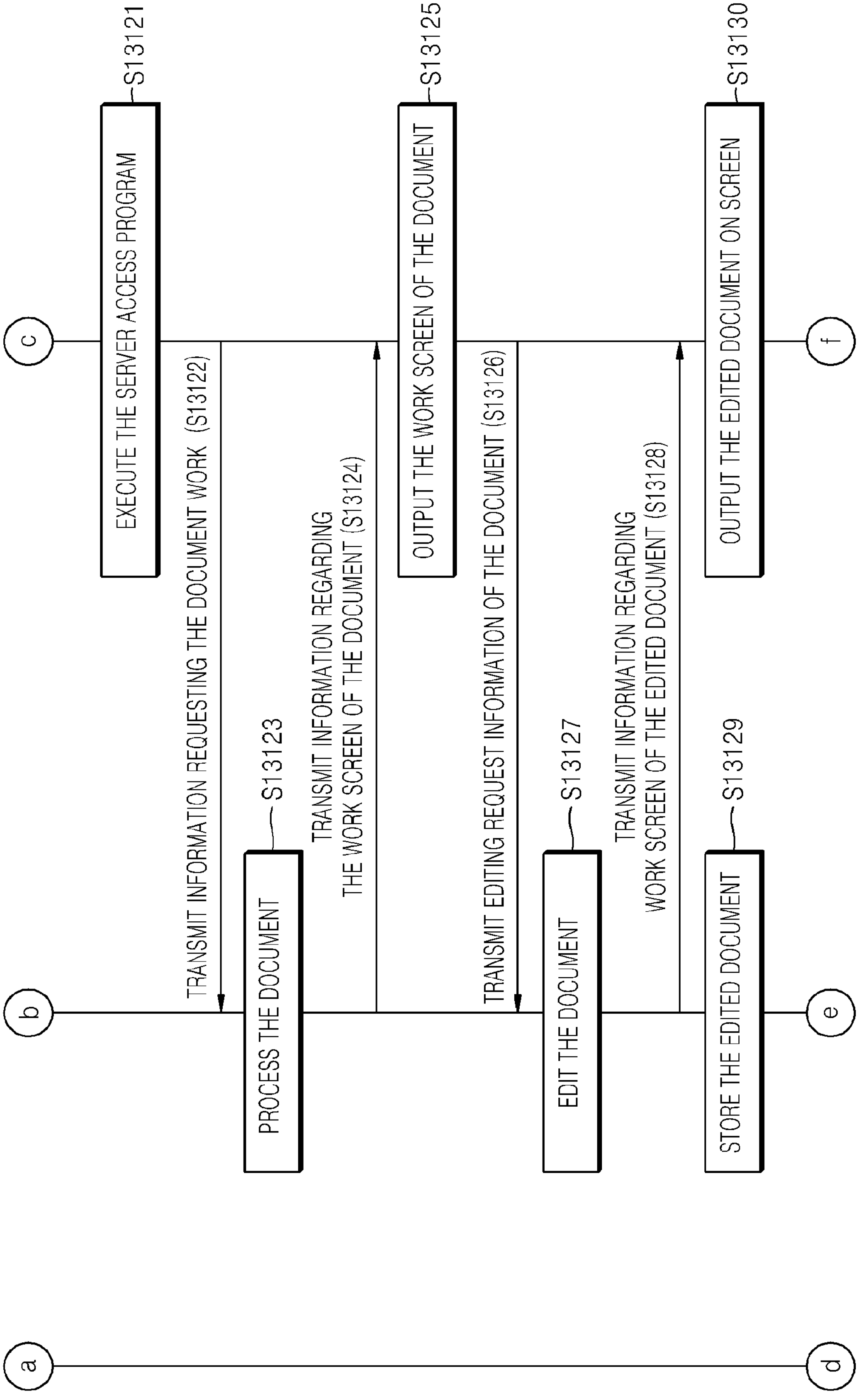
Figure 131C:
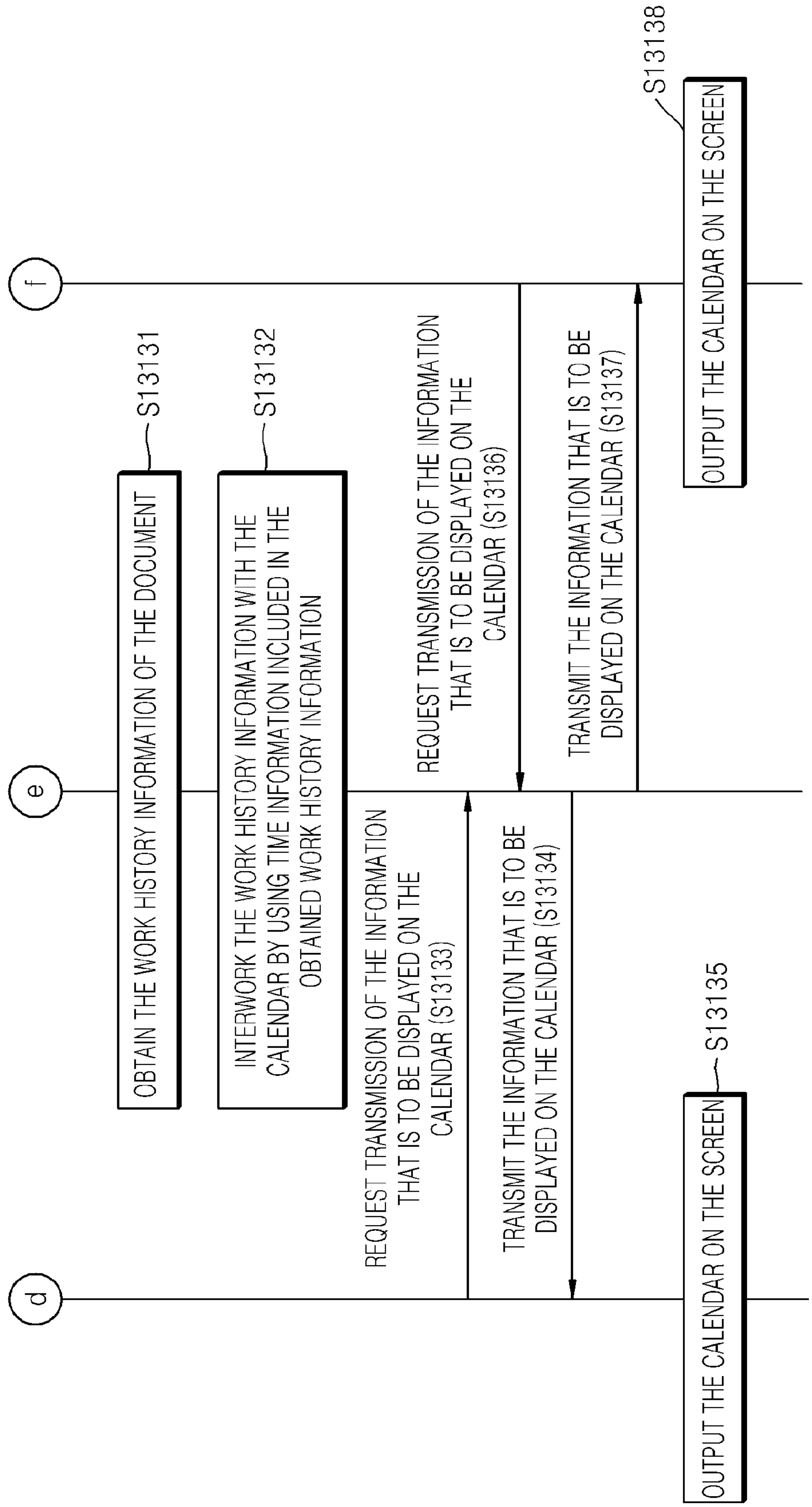

FIGS. 131A through 131C are flowcharts of examples in which when the server 100 creates a document according to a request of the first device 111 and edits the document according to a request of the second device 112, the server 100 interworks work history information with a calendar of a user according to an exemplary embodiment.

While the first device 111 requests the server 100 to create the document and the second device 112 requests the server 100 to edit the document in FIGS. 131A through 131C, it is understood that one or more other exemplary embodiments are not limited thereto. For example, according to another exemplary embodiment, the first device 111 may request the server 100 to create and edit the document.

There is also no limit to the number of devices in various exemplary embodiments. If it is assumed that the number of devices that request a document work is N (where N is greater than or equal to three), the operations of the first device 111 or operations of the second device 112 that will be described below may be performed by at least one of the third device 113 through the Nth device 114.

Operations S13110 through S13120 of FIG. 131A correspond to operations S10410 through S10420 of FIG. 104. Thus, although omitted below, the descriptions provided above with reference to FIGS. 104 through 120 may apply to descriptions that will be described with reference to operations S13110 through S13120 of FIG. 131A.

In operation S13110, the first device 111 executes a server access program. In order for the user to request the server 100 to work on the document, the first device 111 may execute the server access program. For example, the user of the first device 111 executes the server access program and may input the ID and passwords of the user.

In operation S13111, the first device 111 transmits information requesting the document work to the server 100.

In operation S13112, the server 100 creates the document according to a request received from the first device 111.

In operation S13113, the server 100 transmits information regarding a work screen of the document to the first device 111.

In operation S13114, the first device 111 outputs the work screen of the document.

In operation S13115, the server 100 stores the document.

In operation S13116, the server 100 obtains the work history information of the document. For example, the server 100 may obtain the work history information of the document at the time of storing the document, although it is understood that one or more other exemplary embodiments are not limited thereto as described above. For example, according to one or more other exemplary embodiments, the server 100 may obtain the work history information of the document in response to a predetermined event (e.g., saving, opening, etc., the document), and/or according to a prior setting or a default setting (e.g., receive or request the work history information at predetermined time intervals, at predetermined time points, and/or in accordance with a device setting such as only when connected to a local area network). For example, the server 100 may store the obtained work history information in the storage corresponding to the account of the user of the first device 111.

In operation S13117, the server 100 interworks the work history information with the calendar by using time information included in the work history information.

In operation S13118, the second device 112 requests the server 100 to transmit information that is to be displayed on the calendar. For example, the second device 112 may request the server 100 to transmit the information that is to be displayed on the calendar after executing a calendar output program installed in the second device 112 and performing user authentication.

In operation S13119, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed.

In FIG. 131A, when the second device 112 requests the server 100 to transmit the information that is to be displayed on the calendar in operation S13118, the server 100 transmits the information that is to be displayed on the calendar to the second device 112 in operation S13119, although it is understood that one or more other exemplary embodiments are not limited thereto. According to another exemplary embodiment, although there is no request from the second device 112, the server 100 may transmit (for example, push) the information that is to be displayed on the calendar to the second device 112. For example, if the second device 112 has previously requested the server 100 to transmit the information that is to be displayed on the calendar, the server 100 may automatically transmit the information that is to be displayed on the calendar although there is no request from the second device 112 at a later time. According to another example, the server 100 may automatically transmit the information according to a prior setting or a default setting to automatically transmit the information at predetermined time intervals or predetermined time points.

In operation S13120, the second device 112 outputs the calendar on the screen.

In operation S13121, the second device 112 executes the server access program. In order for the user to request the server 100 to work on the document, the second device 112 may execute the server access program. For example, the user of the second device 112 executes the server access program and may input the ID and passwords of the user.

In operation S13122, the second device 112 transmits information requesting the document work to the server 100.

In operation S13123, the server 100 processes the document.

In operation S13124, the server 100 transmits information regarding the work screen of the document to the second device 112.

In operation S13125, the second device 112 outputs the work screen of the document.

In operation S13126, the second device 112 transmits editing request information of the document to the server 100. For example, when the second device 11 receives a user input that edit the document through the user input device 16510, the second device 112 transmits the editing request information of the document to the server 100.

In operation S13127, the server 100 edits the document.

In operation S13128, the server 100 transmits information regarding a work screen of the edited document to the second device 112.

In operation S13129, the server 100 stores the edited document. In operation S13130, the second device 112 outputs the edited document on the screen.

Hereinafter, examples in which the server 100 edits the document will be described with reference to FIGS. 132 and 133.

Figure 132:
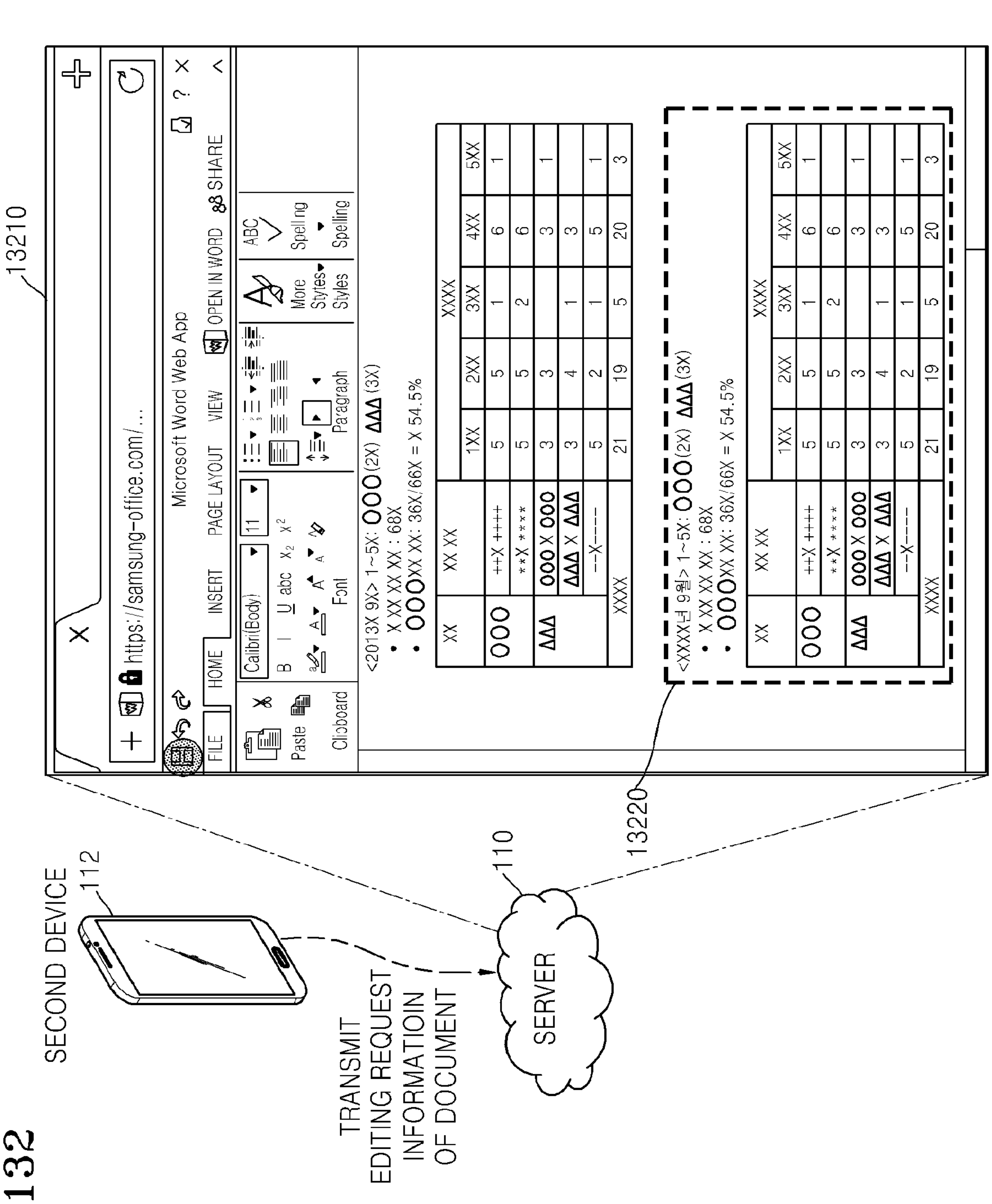
FIGS. 132 and 133 illustrate examples in which a server edits a document according to an exemplary embodiment.
Figure 133:
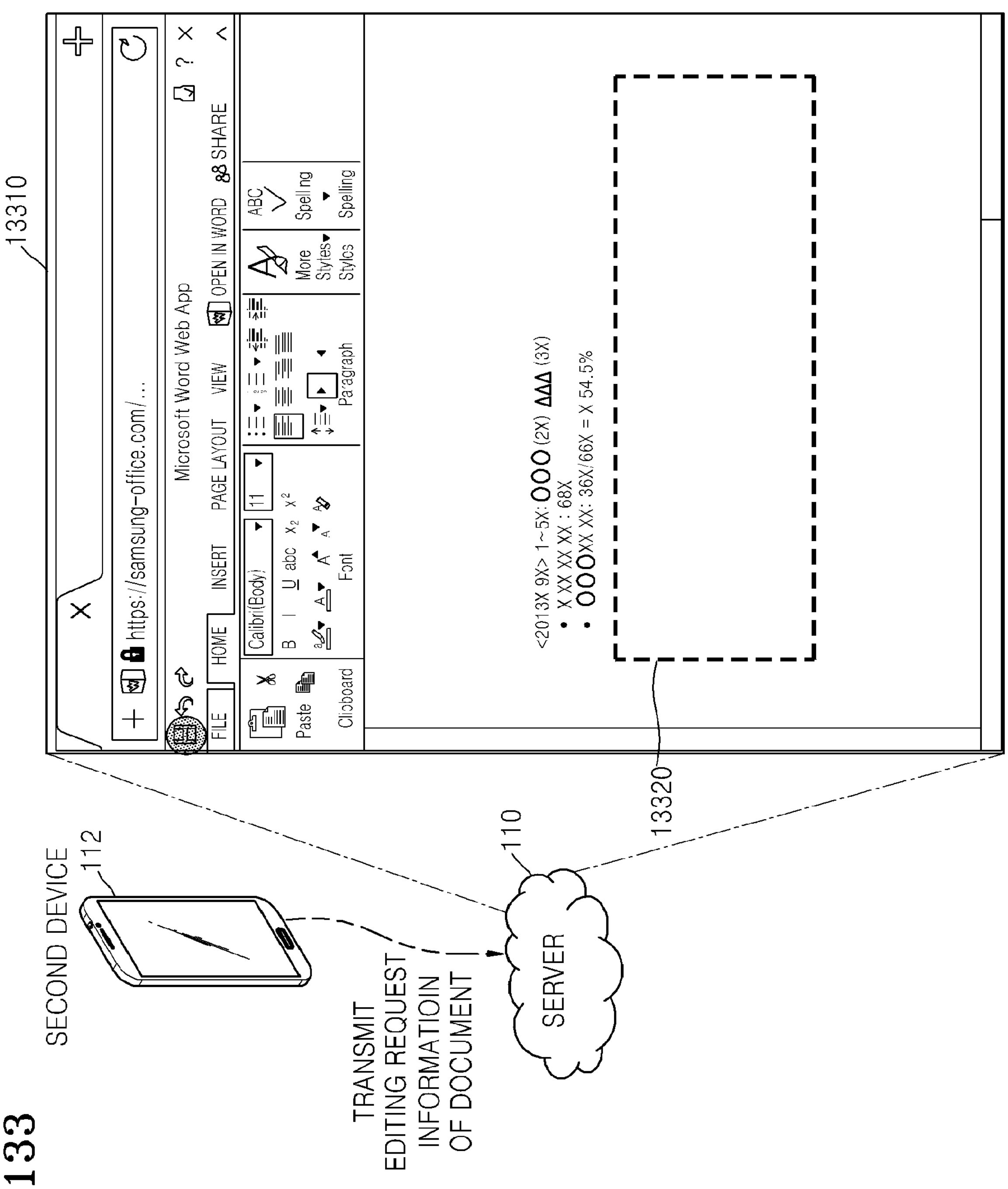

FIGS. 132 and 133 illustrate examples in which the server 100 edits a document according to an exemplary embodiment.

Referring to FIGS. 132 and 133, the second device 112 receives work screens 13210 and 13310 of the document from the server 100 and displays the work screens 13210 and 13310 on a screen. The second device 112 receives a user input that edits the document through the user input device 16510. For example, the user input may be used to add 13220 new content to the document or delete 13320 content of the document partly or wholly. Meanwhile, although not shown, the user input may be used to modify the content of the document partly or wholly.

Referring to FIG. 132, if the second device receives the user input to add the new content to the document, the second device 112 transmits editing request information of the document to request addition of the new content to the server 100, and the server 100 transmits the work screen 13310 of the document from which some content is deleted 13320 according to the received editing request information to the second device 112.

Referring to FIG. 133, if the second device 112 receives the user input to delete the content of the document partly, the second device 112 transmits editing request information of the document to request deletion of some content to the server 100, and the server 119 transmits the work screen 13310 of the document from which some content is deleted 13320 according to the received editing request information to the second device 112.

Referring back to FIGS. 131A through 131C, in operation S13131, the server 100 obtains the work history information of the document. For example, the server 100 may obtain the work history information of the document at the time of ending editing of the document (e.g., at the time of storing the document), although it is understood that one or more other exemplary embodiments are not limited thereto as described above. Hereinafter, an example in which the server 100 obtains work history information of a document will be described with reference to FIG. 134.

Figure 134:
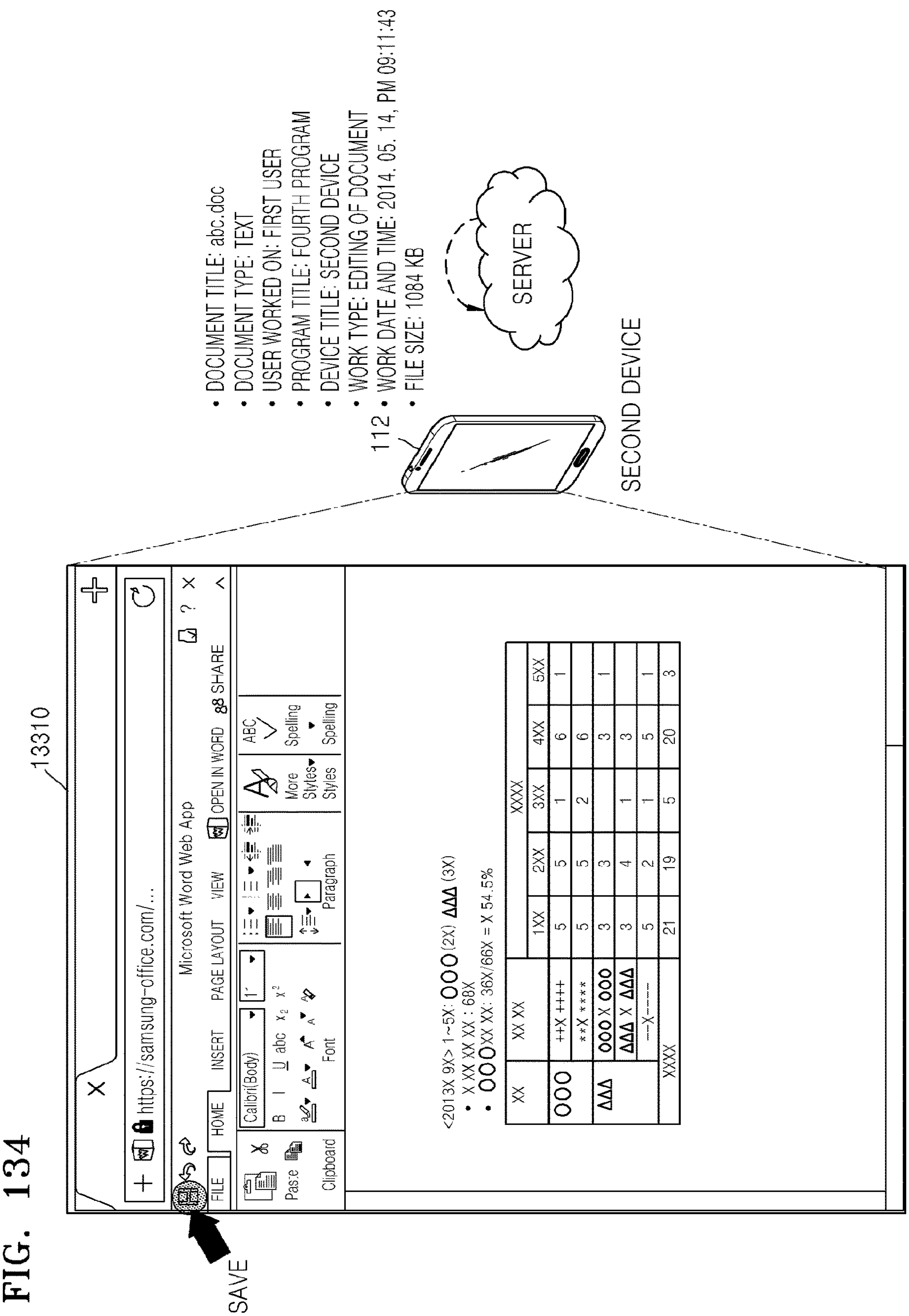
FIG. 134 is a diagram for explaining an example in which a server obtains work history information of a document according to an exemplary embodiment.

FIG. 134 is a diagram for explaining an example in which the server 100 obtains work history information of a document according to an exemplary embodiment.

As described with reference to FIGS. 132 and 133, the server 100 may add new content to the document or partially or wholly modify or delete content of the document if receiving editing request information of the document. When the server 100 stores the document after adding the new content to the document or partially or wholly modifying or deleting the content of the document, the server 100 determines that the document has been edited.

When the document is stored after being edited, the server 100 obtains the work history information of the document. In other words, the server 100 obtains information generated when editing the document.

For example, if the server 100 processes a document entitled "abc.doc" by using a second program, edits the document according to an editing request of the document received from the second device 112, and stores the edited document at 09:11:43 p.m. on May 14, 2014, and a size of the edited and stored document is 1084 KB (kilobytes), the server 100 may obtain at least one of "abc.doc", text, second program, second device, 09:11:43 p.m. on May 14, 2014, and 1084 KB as the work history information.

The encryption and storage of the work history information which requires a high level of security have been described with reference to FIG. 106.

Referring back to FIG. 131C, in operation S13132, the server 100 interworks the work history information with the calendar by using time information included in the obtained work history information. For example, the server 100 interworks the work history information obtained in operation S13116 with the calendar in operation S13117, and additionally interworks the work history information obtained in operation S13131 with the calendar in operation S13132.

In operation S13133, the first device 111 requests the server 100 to transmit the information that is to be displayed on the calendar. For example, the first device 111 may request the server 100 to transmit work history information that is to be output on the screen of the device when an indicator that is to be displayed on the calendar or an indicator that is displayed on the calendar is selected.

In operation S13134, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed. In the latter case, the first device 111 may set or determine which information is to be displayed on the calendar among received information. Here, the first device 111 may determine which information is to be displayed based on a prior setting or a default setting, or based on one or more user inputs (e.g., filter requests).

In operation S13135, the first device 111 outputs the calendar on the screen.

In FIG. 131C, when the first device 111 requests the server 100 to transmit the information that is to be displayed on the calendar in operation S13133, the server 100 transmits the information that is to be displayed on the calendar to the first device 111 in operation S13134, although it is understood that one or more other exemplary embodiments are not limited thereto. According to another exemplary embodiment, although there is no request from the first device 111, the server 100 may transmit (for example, push) the information that is to be displayed on the calendar to the first device 111, as described above.

Descriptions that will be provided with reference to operations S13136 through S13138 correspond to the descriptions provided above with reference to operations S13133 through S13135, respectively. In other words, the second device 112 requests the server 100 to transmit the information that is to be displayed on the calendar, receives the information that is to be displayed on the calendar from the server 100, and outputs the calendar on the screen. Thus, although omitted below, the descriptions provided above with reference to operations S13133 through S13135 may apply to descriptions that will be described below with reference to operations S13136 through S13138.

In operation S13136, the second device 112 requests the server 100 to transmit the information that is to be displayed on the calendar.

In operation S13137, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In operation S13138, the second device 112 outputs the calendar on the screen.

A specific example of the descriptions provided with reference to FIGS. S13132 through S13138 of FIG. 131C will be described with reference to FIGS. 135 through 140.

Figure 135:
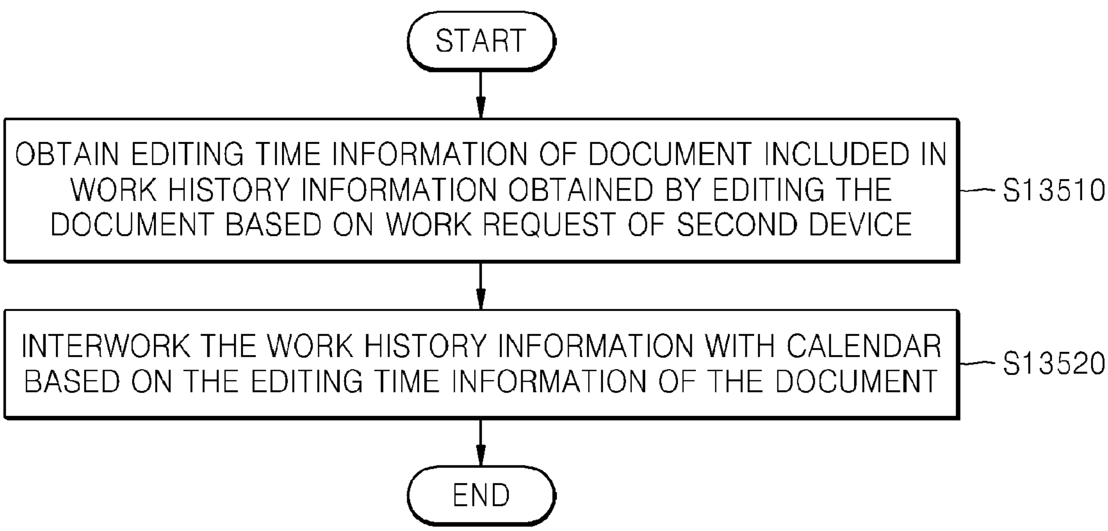
FIG. 135 is a flowchart of an example in which a server interworks work history information of a document with a calendar according to an exemplary embodiment.

FIG. 135 is a flowchart of an example in which the server 100 interworks work history information of a document with a calendar according to an exemplary embodiment.

The flowchart of FIG. 135 corresponds to a detailed flowchart of operation S13132 of FIG. 131C.

In operation S13510, the server 100 obtains editing time information of the document included in the work history information obtained by editing the document based on the work request of the second device 112. For example, according to the example described above with reference to FIG. 134, the server 100 obtains "May 14, 2014, 09:11:43 p.m." from the work history information.

Hereinafter, an example of work history information obtained by the server 100 will be described with reference to FIGS. 136 and 137.

FIGS. 136 and 137 are tables illustrating examples of work history information 13610 and 13710, respectively, of a document according to an exemplary embodiment.

The work history information 13610 of the document of FIG. 136 is updated from the work history information 10810 of the document of FIG. 108. In other words, the work history information 10810 of the document of FIG. 108 is generated when the server 100 that receives a document work request from a device creates the document. Meanwhile, the work history information 13610 of the document of FIG. 136 is generated by adding new work history information 13620 and 13630 when the server 100 creates and edits the document.

Referring to FIG. 136, the server 100 may arrange the obtained work history information according to a title 13611 of the document.

The work history information 13710 of the document of FIG. 137 is updated from the work history information 10910 of the document of FIG. 109. In other words, the work history information 10910 of the document of FIG. 109 is generated when the server 100 that receives a document work request from a device creates the document. Meanwhile, the work history information 13710 of the document of FIG. 137 is generated by adding new work history information 13720 and 13730 when the server 100 creates and edits the document.

Referring to FIG. 137, the server 100 may arrange the obtained work history information according to a title 13711 of the document.

Referring back to FIG. 135, in operation S13520, the server 100 interworks the work history information with the calendar of the user based on the editing time information of the document. Hereinafter, an example in which the server 100 interworks work history information with a calendar of a user will be described with reference to FIG. 138.

Figure 138:
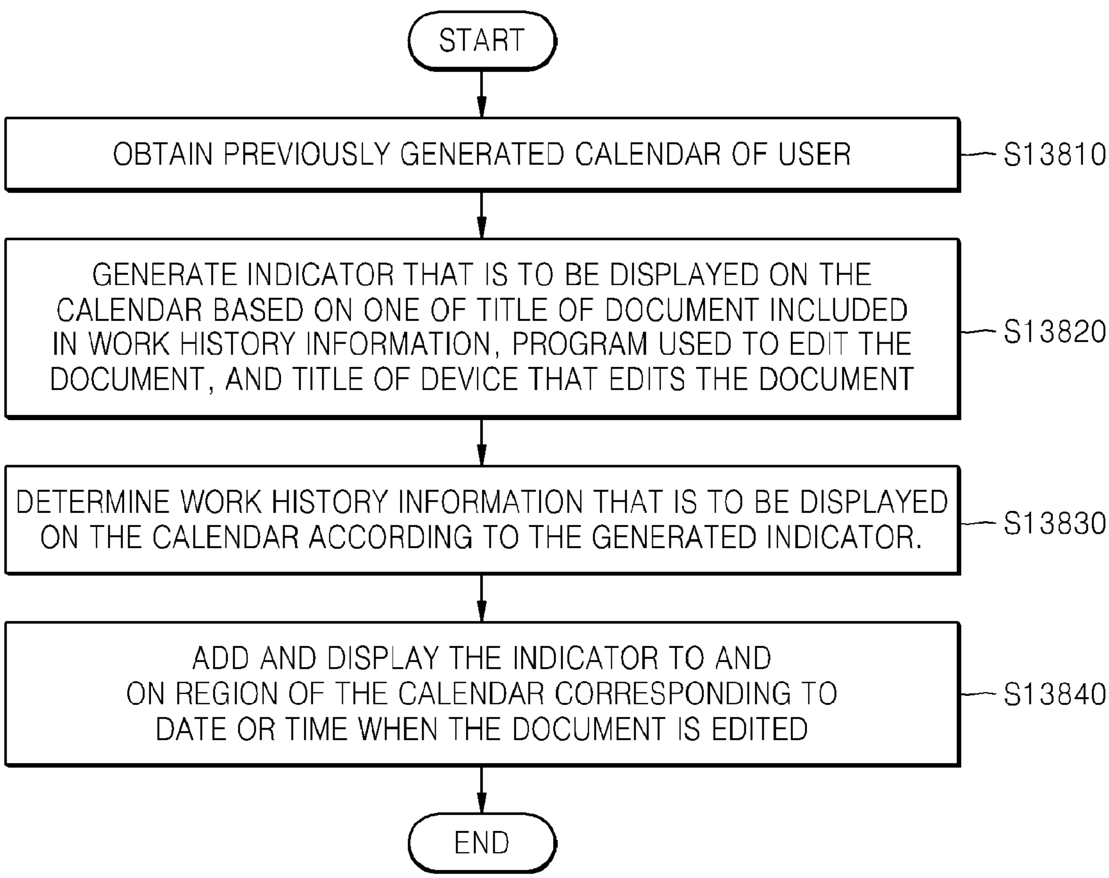
FIG. 138 is a flowchart of an example in which a server interworks work history information with a calendar of a user according to an exemplary embodiment.

FIG. 138 is a flowchart of an example in which the server 100 interworks work history information with a calendar of a user according to an exemplary embodiment.

In operation S13810, the server 100 obtains a previously generated calendar of the user. In this regard, the previously generated calendar of the user is a calendar generated when the server 100 interworks the obtained work history information with the calendar in operation S13117 of FIG. 131A.

In operation S13820, the server 100 generates an indicator that is to be displayed on the calendar based on at least one of a title of a document included in the work history information, a program used to edit the document, and a title of a device that edits the document. In this regard, the work history information is work history information obtained in operation S13131 of FIG. 131C. For example, the server 100 may determine at least one of the title of the document, the program used to edit the document, and the title of the device that edits the document as an item indicating the indicator and generate the indicator based on the determined item.

In operation S13830, the server 100 determines work history information that is to be displayed on the calendar according to the generated indicator.

In operation S13840, the server 100 adds and displays the indicator to and on a region of the calendar corresponding to a date or time when the document is edited.

Figure 139:
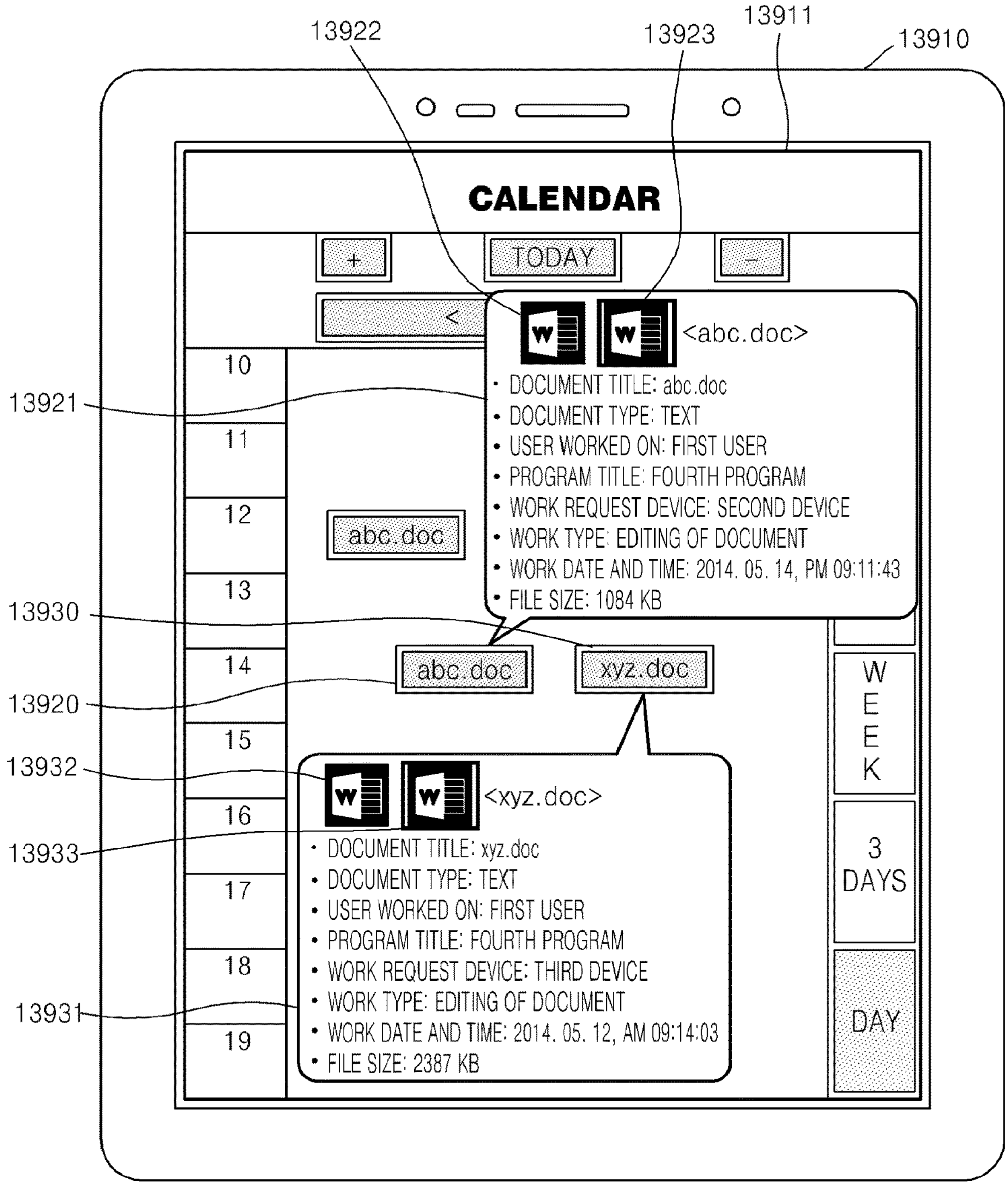
FIG. 139 illustrates an example of a daily calendar displayed on a screen of a device according to an exemplary embodiment.

FIG. 139 illustrates an example of a daily calendar 13911 displayed on a screen of a device 13910 according to an exemplary embodiment.

Referring to FIG. 139, the daily calendar 13911 is output on the screen of the device 13910. The calendar 13911 may include a region 13912 indicating dates and an indicator 13913 that may designate a date desired by a user. The calendar 13911 may also include an indicator 13914 that may display a calendar corresponding to a date "today". In addition to the above-described indicators 13913 and 13914, the calendar 13911 may include an indicator without limitation as long as the user may use the indicator to control a display type of the calendar.

An indicator 13920 indicating a title of a document may be displayed on the calendar 13911. For example, if it is assumed that the server 100 edits a document entitled "abc.doc" on May 14, 2014 according to a request of the first device 111, the indicator 13920 indicating "abc.doc" may be displayed on a region of the calendar 13911 corresponding to May 12, 2014.

The device 13910 may select the indicator 13920 indicating "abc.doc" according to a user input received through the user input device 16510. When the indicator 13920 indicating "abc.doc" is selected, the device 13910 may output work history information 13921 of the document on the screen. For example, if it is assumed that the server 100 edits the document entitled "abc.doc" having a size of 1084 KB (kilobytes) at 09:11:43 p.m. on May 14, 2014 by using a fourth program according to a request of the second device 112, at least one of "abc.doc", text, fourth program, second device, 09:11:43 p.m. on May 14, 2014, and 1084 KB may be output as the work history information 13921. Meanwhile, the device 13910 may output the work history information 13921 of the document on the screen as a popup window, although it is understood that one or more other exemplary embodiments are not limited thereto as described above. For example, the device 13910 may output the work history information 13921 on an entirety of the screen, on a designated region of the screen, etc., in one or more other exemplary embodiments.

Indicators 13922 and 13923 that may output the document on the screen of the device 13910 may be displayed on the work history information 13921 of the document. The indicator 13922 may indicate an original document at the time of creating the document or a document previous to a current work. The indicator 13923 may indicate a currently editing document.

The indicator 13923 indicating the editing document may be displayed distinguishably from the indicator 13922 indicating the original document or the document previous to the current work. For example, with regard to the indicator 13923 indicating the editing document, a border line may be additionally displayed on the indicator 13922 indicating the original document or the document previous to the current work. For example, when the indicator 13922 or 13923 that may output the document is selected according to the user input received through the user input device 16510, the device 13910 may output the original document or a document edited by the second device 112 on the screen as the popup window separately from the calendar 13911, although it is understood that one or more other exemplary embodiments are not limited thereto as described above.

Likewise, a plurality of indicators indicating titles of documents may be displayed on the single calendar 13911. For example, if it is assumed that the server 100 edits a document entitled "xyz.doc" on May 12, 2014 according to a request of the third device 113, an indicator 13930 indicating "xyz.doc" may be displayed on a region of the calendar 13911 corresponding to May 12, 2014.

The device 13910 may select the indicator 13930 indicating "xyz.doc" according to the user input received through the user input device 16510. When the indicator 13930 indicating "xyz.doc" is selected, the device 13910 may output work history information 13931 of the document on the screen. For example, if it is assumed that the server 100 edits the document entitled "xyz.doc" having a size of 2387 KB (kilobytes) at 09:11:43 a.m. on May 12, 2014 by using the fourth program according to a request of the third device 113, at least one of "xyz.doc", text, fourth program, third device, 09:11:43 a.m. on May 14, 2014, and 2387 KB may be output as the work history information 13931. Meanwhile, the device 13910 may output the work history information 13931 of the document on the screen as the popup window, although it is understood that one or more other exemplary embodiments are not limited thereto as described above.

Indicators 13932 and 13933 that may output the document on the screen of the device 13910 may be displayed on the work history information 13931 of the document. The indicator 13932 may indicate an original document at the time of creating the document or a document previous to a current work. The indicator 13933 may indicate a currently editing document.

The indicator 13933 indicating the editing document may be displayed distinguishably from the indicator 13932 indicating the original document or the document previous to the current work. For example, with regard to the indicator 13933 indicating the editing document, a border line may be additionally displayed on the indicator 13932 indicating the original document or the document previous to the current work. When the indicator 13932 or 13933 that may output the document is selected according to the user input received through the user input device 16510, the device 13910 may output the original document or a document edited by the third device 113 on the screen as the popup window separately from the calendar 13911, although it is understood that one or more other exemplary embodiments are not limited thereto as described above.

Figure 140:
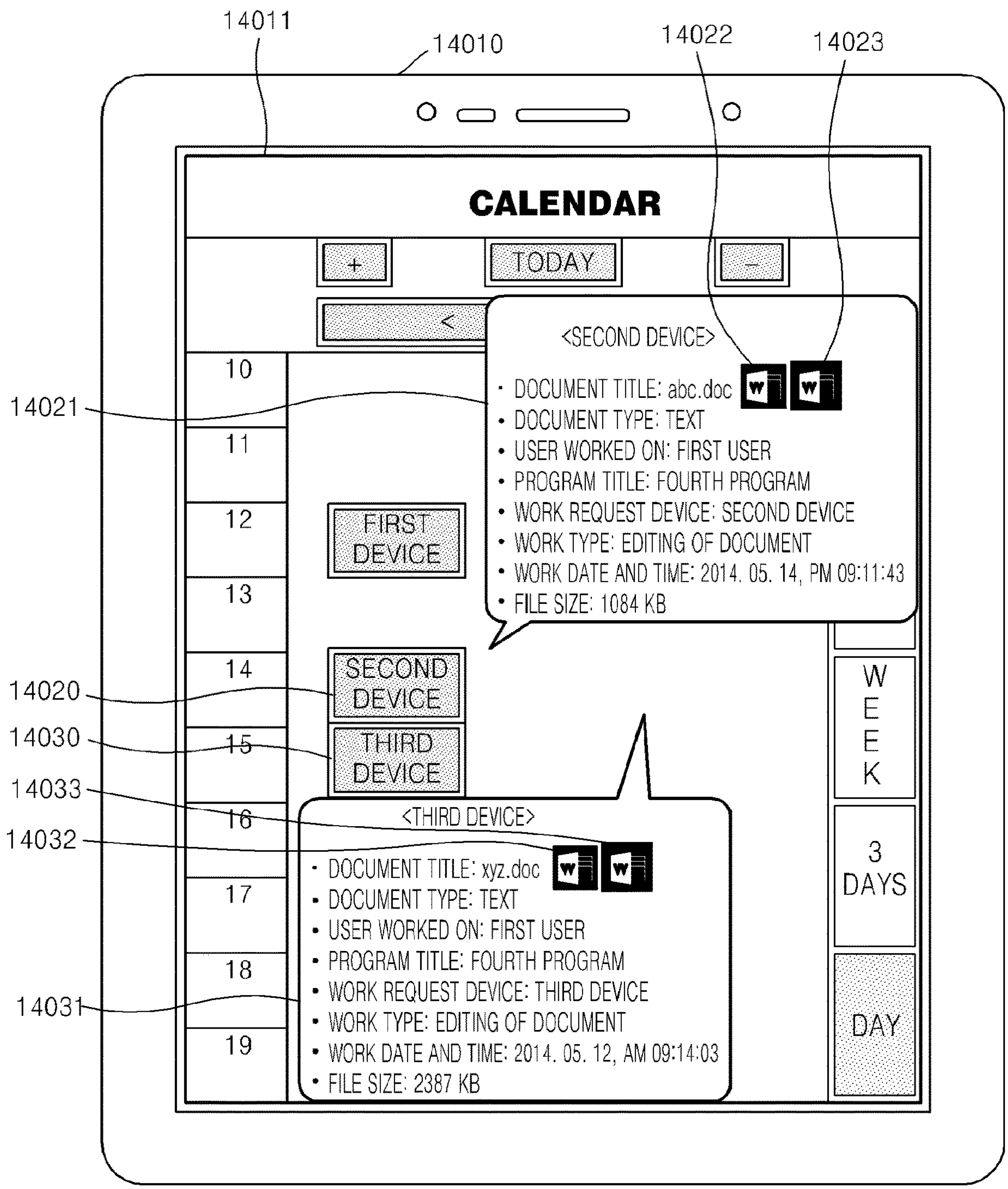
FIG. 140 illustrates another example of a daily calendar displayed on a screen of a device according to an exemplary embodiment.

FIG. 140 illustrates another example of a daily calendar 14011 displayed on a screen of a device 14010 according to an exemplary embodiment.

Referring to FIG. 140, the daily calendar 14011 may be output on the screen of the device 14010. The calendar 14011 of FIG. 140 has the same form as that of the calendar 13911 of FIG. 139. Thus, the descriptions of the indicators provided above with reference to FIG. 139 may apply to indicators that may be displayed on the calendar 14011 of FIG. 140.

An indicator 14020 indicating a title of a document may be displayed on the calendar 14011. For example, if it is assumed that the server 100 edits the document on May 14, 2014 according to a request of the second device 112, the indicator 14020 indicating the "second device" may be displayed on a region of the calendar 14011 corresponding to May 12, 2014.

The device 14010 may select the indicator 14020 indicating the "second device" according to a user input received through the user input device 16510. When the indicator 14020 indicating the "second device" is selected, the device 14010 may output work history information 14021 of the document on the screen. For example, if it is assumed that the server 100 edits a document entitled "abc.doc" having a size of 1084 KB (kilobytes) at 09:11:43 p.m. on May 14, 2014 by using a fourth program according to the request of the second device 112, at least one of "abc.doc", text, fourth program, second device, 09:11:43 p.m. on May 14, 2014, and 1084 KB may be output as the work history information 14021. Meanwhile, the device 14010 may output the work history information 14021 of the document on the screen as a popup window, although it is understood that one or more other exemplary embodiments are not limited thereto as described above.

Indicators 14022 and 14023 that may output the document on the screen of the device 14010 may be displayed on the work history information 14021 of the document. The indicator 14022 may indicate an original document at the time of creating the document or a document previous to a current work. The indicator 14023 may indicate a currently editing document.

The indicator 14023 indicating the editing document may be displayed distinguishably from the indicator 14022 indicating the original document or the document previous to the current work. For example, with regard to the indicator 14023 indicating the editing document, a border line may be additionally displayed on the indicator 14022 indicating the original document or the document previous to the current work. When the indicator 14022 or 14023 that may output the document is selected according to a user input received through the user input device 16510, the device 14010 may output the original document or a document edited by the second device 112 on the screen as the popup window separately from the calendar 14011, although it is understood that one or more other exemplary embodiments are not limited thereto as described above.

Likewise, a plurality of indicators indicating titles of documents may be displayed on the single calendar 14011. For example, if it is assumed that the server 100 edits a document entitled "xyz.doc" on May 12, 2014 according to a request of the third device 113, an indicator 14030 indicating the "third device" may be displayed on a region of the calendar 14011 corresponding to May 12, 2014.

The device 14010 may select the indicator 14030 indicating the "third device" according to the user input received through the user input device 16510. When the indicator 14030 indicating the "third device" is selected, the device 14010 may output work history information 14031 of the document on the screen. For example, if it is assumed that the server 100 reads the document entitled "xyz.doc" having a size of 2387 KB (kilobytes) at 09:14:03 a.m. on May 12, 2014 by using the fourth program according to the request of the third device 113, at least one of "xyz.doc", text, fourth program, third device, 09:14:03 a.m. on May 12, 2014, and 2387 KB may be output as the work history information 14031. Meanwhile, the device 14010 may output the work history information 14031 of the document on the screen as the popup window, although it is understood that one or more other exemplary embodiments are not limited thereto as described above.

Indicators 14032 and 14033 that may output the document on the screen of the device 14010 may be displayed on the work history information 14031 of the document. The indicator 14032 may indicate an original document at the time of creating the document or a document previous to a current work. The indicator 14033 may indicate a currently editing document.

The indicator 14033 indicating the editing document may be displayed distinguishably from the indicator 14032 indicating the original document or the document previous to the current work. For example, with regard to the indicator 14033 indicating the editing document, a border line may be additionally displayed on the indicator 14032 indicating the original document or the document previous to the current work. When the indicator 14032 or 14033 that may output the document is selected according to the user input received through the user input device 16510, the device 14010 may output the original document or a document edited by the second device 112 on the screen as the popup window separately from the calendar 14011, although it is understood that one or more other exemplary embodiments are not limited thereto as described above.

FIGS. 141A through 141D are flowcharts of examples in which when the server 100 creates a document according to a request of the first device 110 and provides reading of the document and edits the document according to a request of the second device 120, the server interworks work history information with a calendar of a user according to an exemplary embodiment.

Figure 141A:
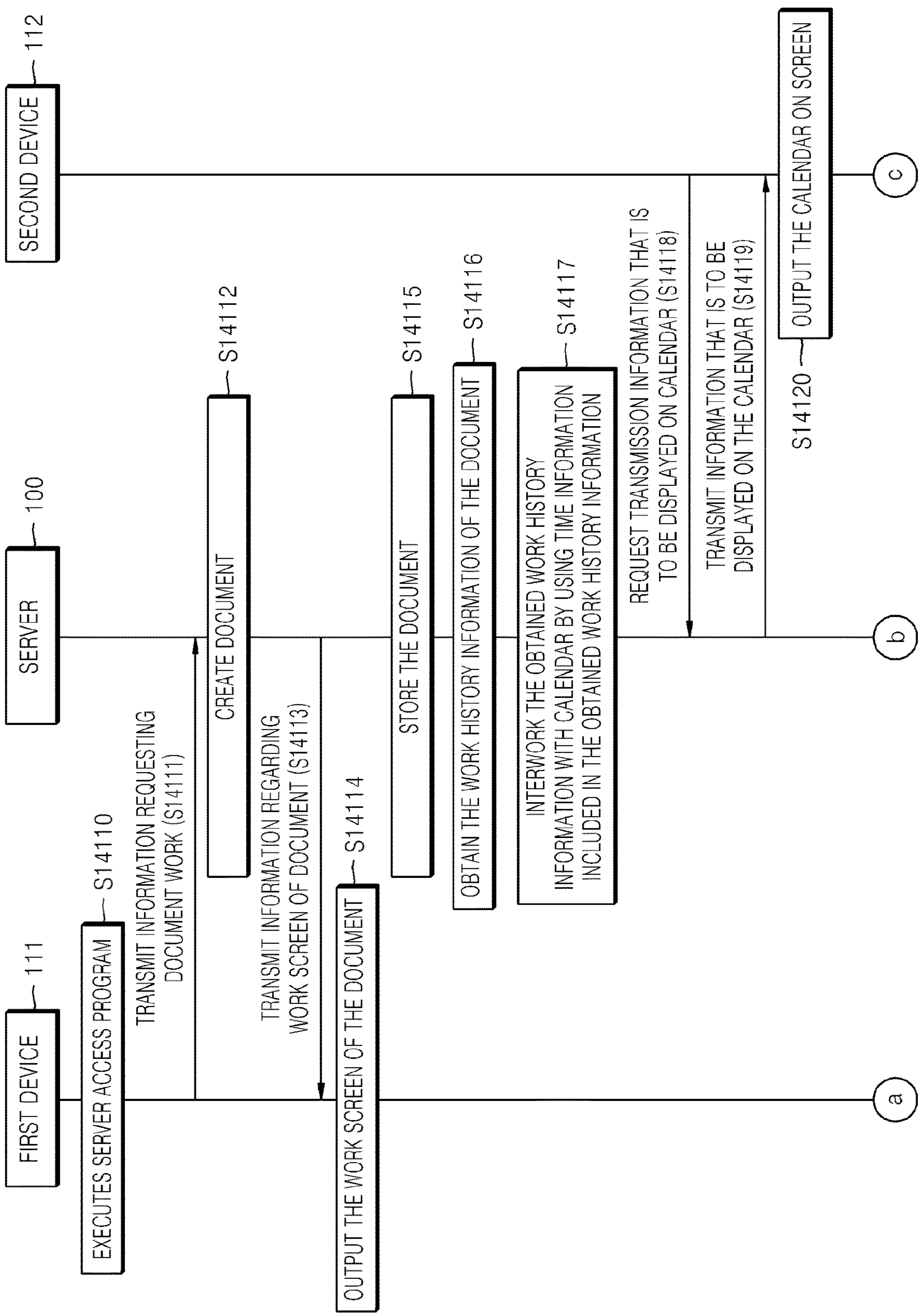
FIGS. 141A through 141D are flowcharts of examples in which when a server creates a document according to a request of a first device and provides reading of the document and edits the document according to a request of a second device, the server interworks work history information with a calendar of a user according to an exemplary embodiment.
Figure 141B:
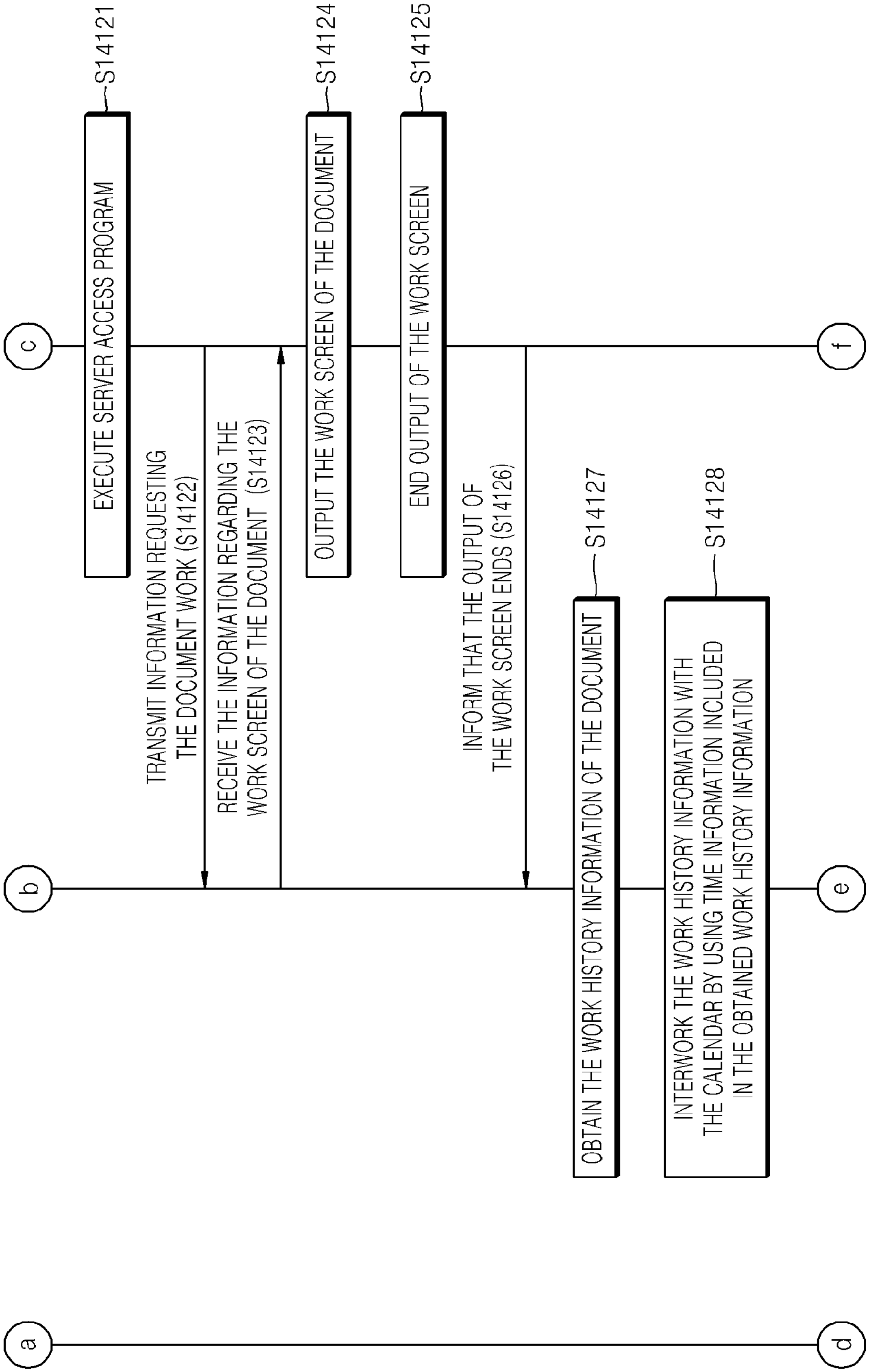
Figure 141C:
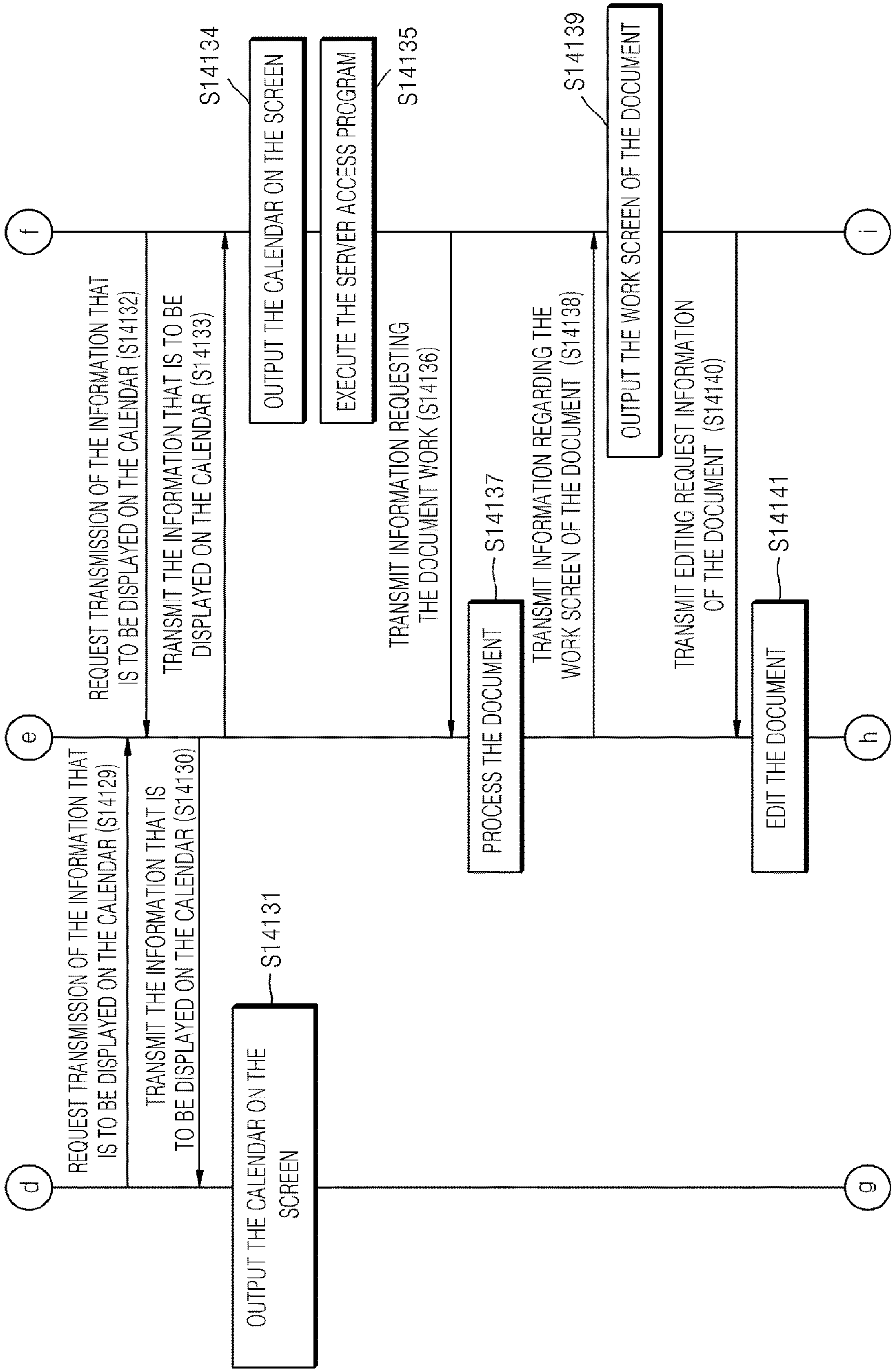

Operations S14110 through S14134 of FIGS. 141A through 141C relate to a process in which the server 100 interworks the work history information with the calendar of the user when the server 100 reads the document according to the request of the second device 112 are the same as or similar to operations S12110 through S12134 of FIGS. 141A through 141C. Thus, detailed descriptions of operations S14110 through S14134 of FIGS. 141A through 141C are omitted below.

Figure 141D:
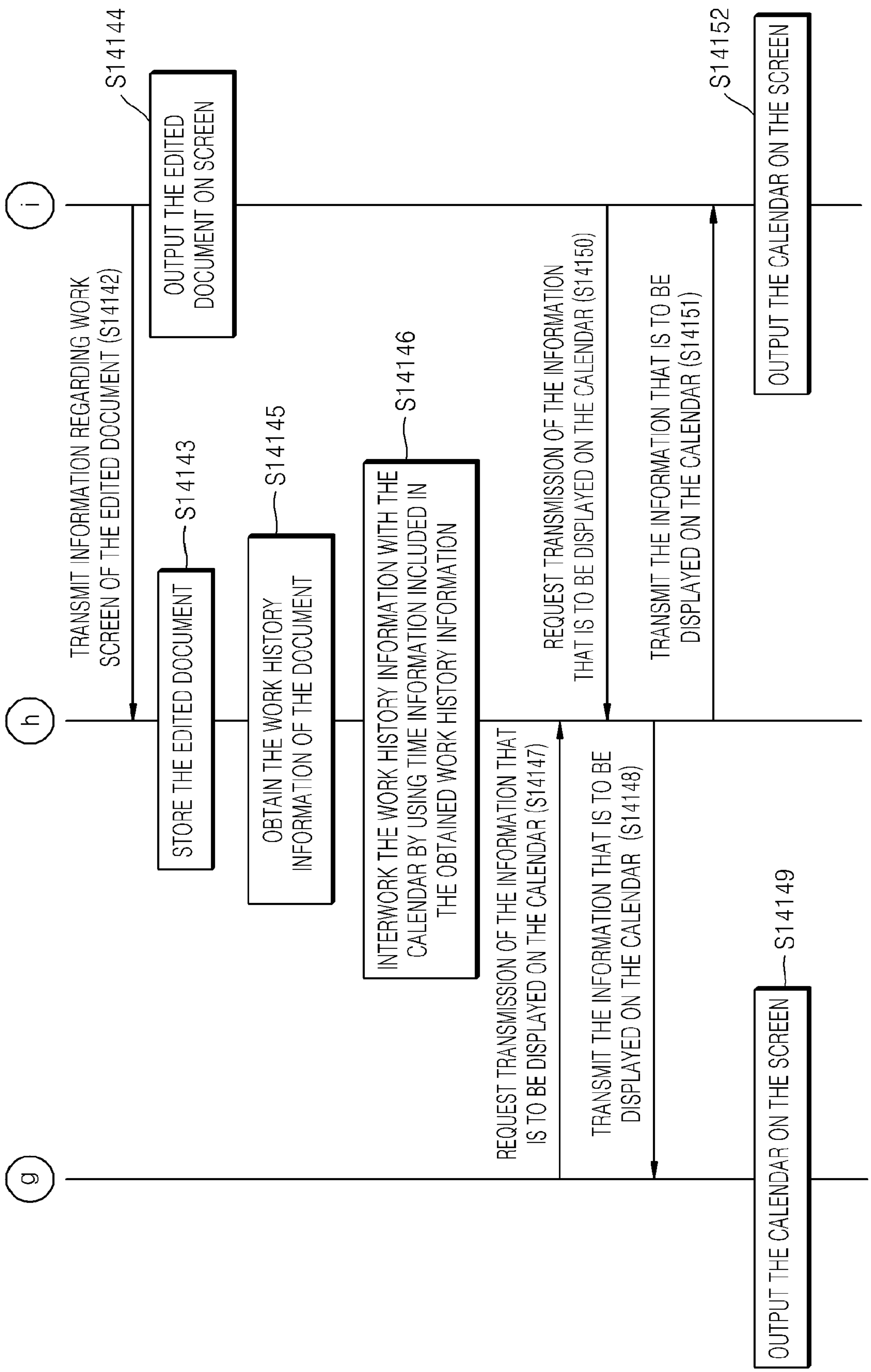

Meanwhile, operations S14135 through S14152 of FIGS. 141A through 141D relate to a process in which the server 100 interworks the work history information with the calendar of the user when the server 100 edits the document according to the request of the second device 112 are the same as or similar to operations S13121 through S13138 of FIGS. 131A through 131C. Thus, detailed descriptions of operations S14135 through S14152 of FIGS. 141C and 141D are omitted below.

Figure 142:
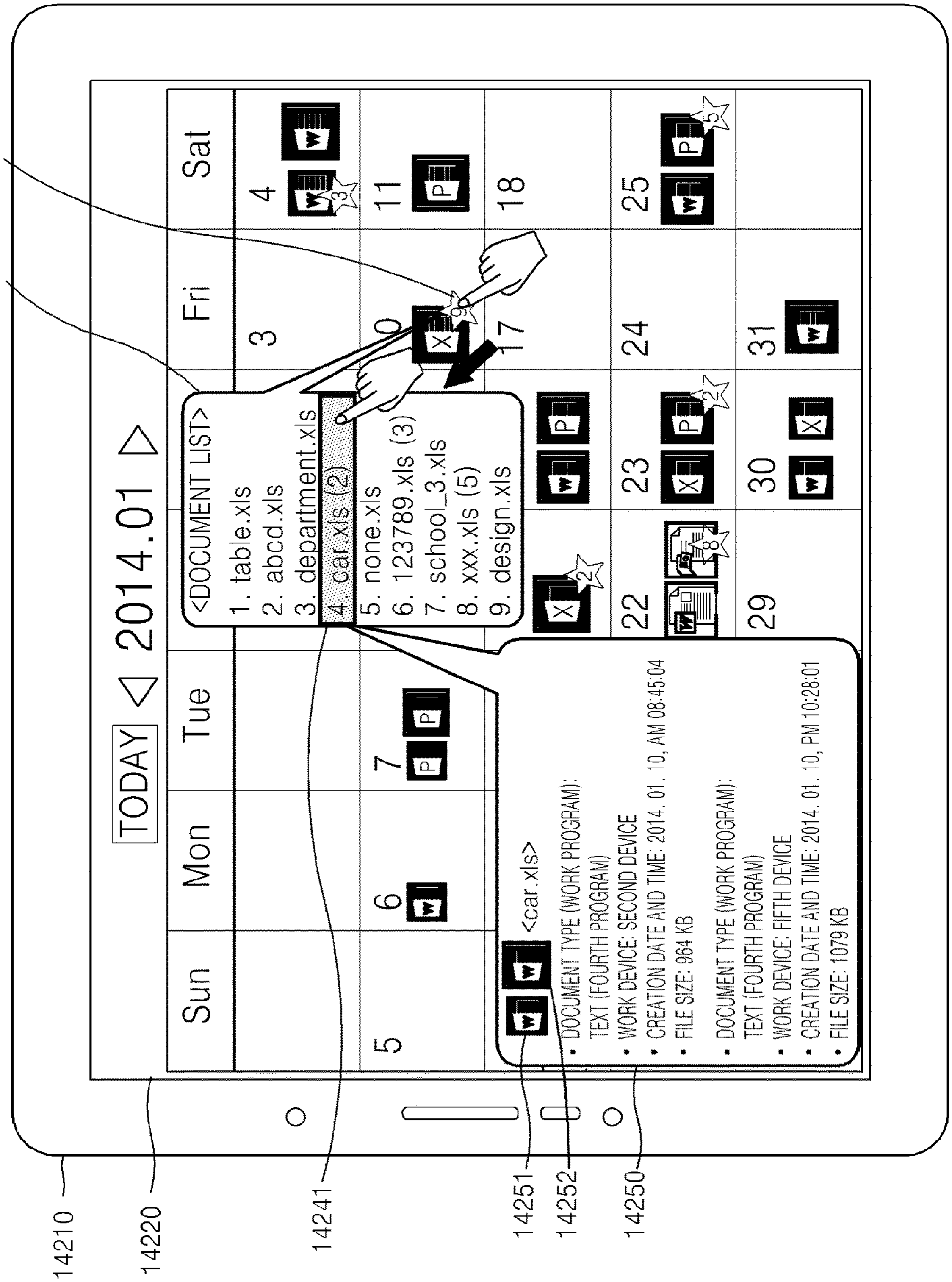
FIGS. 142 and 143 illustrate examples of calendars output on screens of devices according to an exemplary embodiment.
Figure 143:
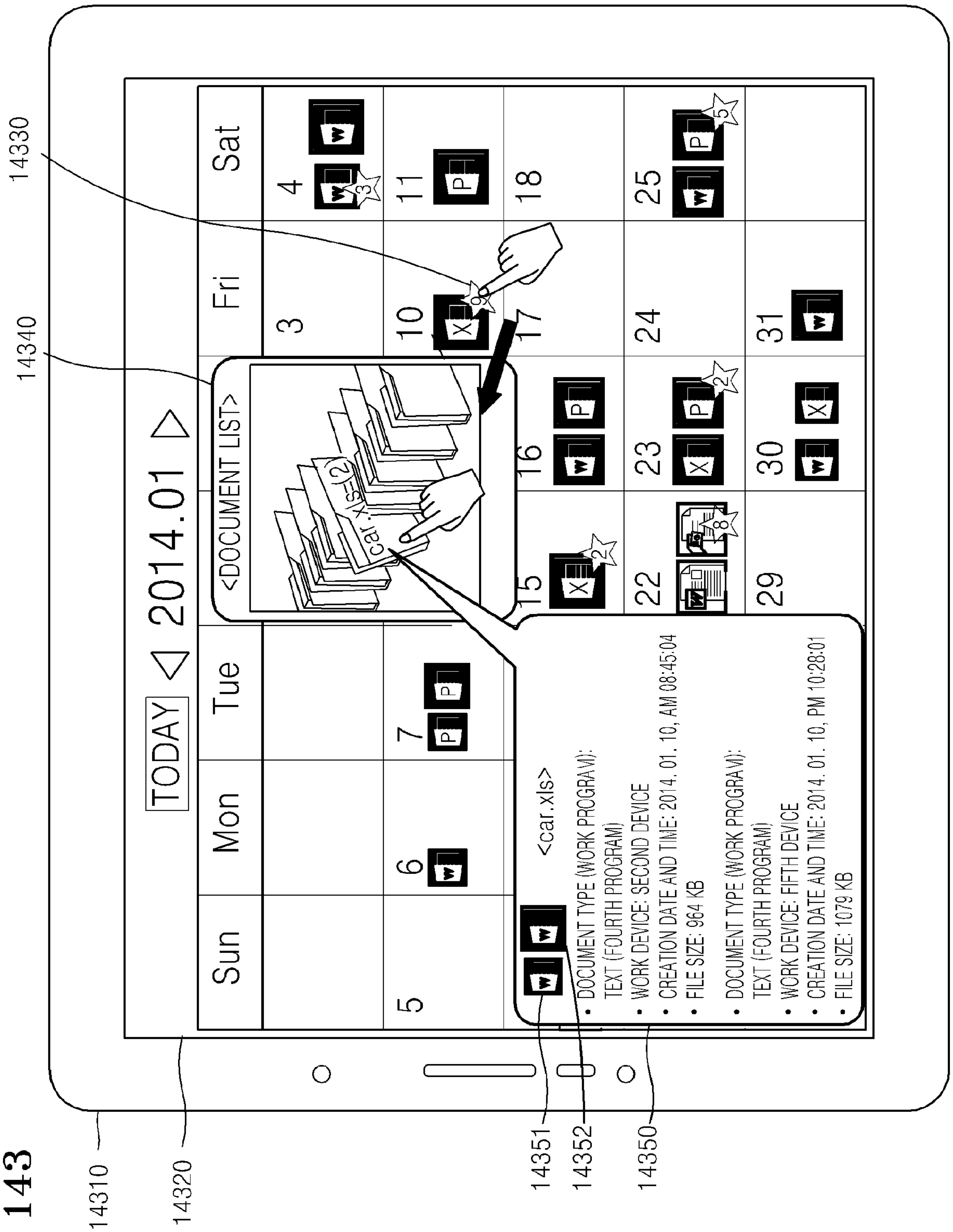

FIGS. 142 and 143 illustrate examples of calendars 14220 and 14320 output on screens of devices 14210 and 14310, respectively, according to an exemplary embodiment.

Referring to FIG. 142, an example of the calendar 14220 output on the screen of the device 14210 is illustrated. While the monthly calendar 14220 is output on the screen of the device 14210 in FIG. 142, it is understood that one or more other exemplary embodiments are not limited thereto. For example, other types of calendars may be displayed in one or more other exemplary embodiments.

When the server 100 works on a plurality of documents on a same date, an indicator 14230 indicating a number of the documents worked on may be displayed on the calendar 14220. For example, if it is assumed that the server 100 works on works on a total number of 9 documents on Jan. 10, 2014, the indicator 14230 indicating that the 9 documents have been worked on may be displayed on a region of the calendar 14220 showing Jan. 10, 2014.

The device 14210 may select the indicator 14230 indicating the number of the documents worked on according to a user input received through the user input device 16510. When the indicator 14230 indicating the number of the documents worked on is selected, the device 14210 may output a list 14240 of the documents worked on the screen.

After the list 14240 of the documents worked on is output, when one 14241 of the documents included in the list 14240 is selected, the device 14210 may output wok history information 14250 of the selected document 14241 on the screen. Indicators 14251 and 14252 that may output the document 14241 on the screen of the device 14210 may be displayed on the work history information 14250 of the document 14241. In this regard, the indicator 14251 may indicate an original document at the time of creating the document 14241 or a document previous to a current work. The indicator 14252 may indicate a currently editing document.

Referring to FIG. 143, another example of the calendar 14320 output on the screen of the device 14310 is illustrated. A list 14340 of documents of the calendar 14320 of FIG. 143 may have a different shape from that of the list 14240 of the documents of the calendar 14220 of FIG. 142. For example, the list 14340 of the documents, work history information 14350 of the documents, and indicators 14330, 14351, and 14352 that may be output on the screen of the device 14310 may have various shapes or colors in various exemplary embodiments.

Figure 144:
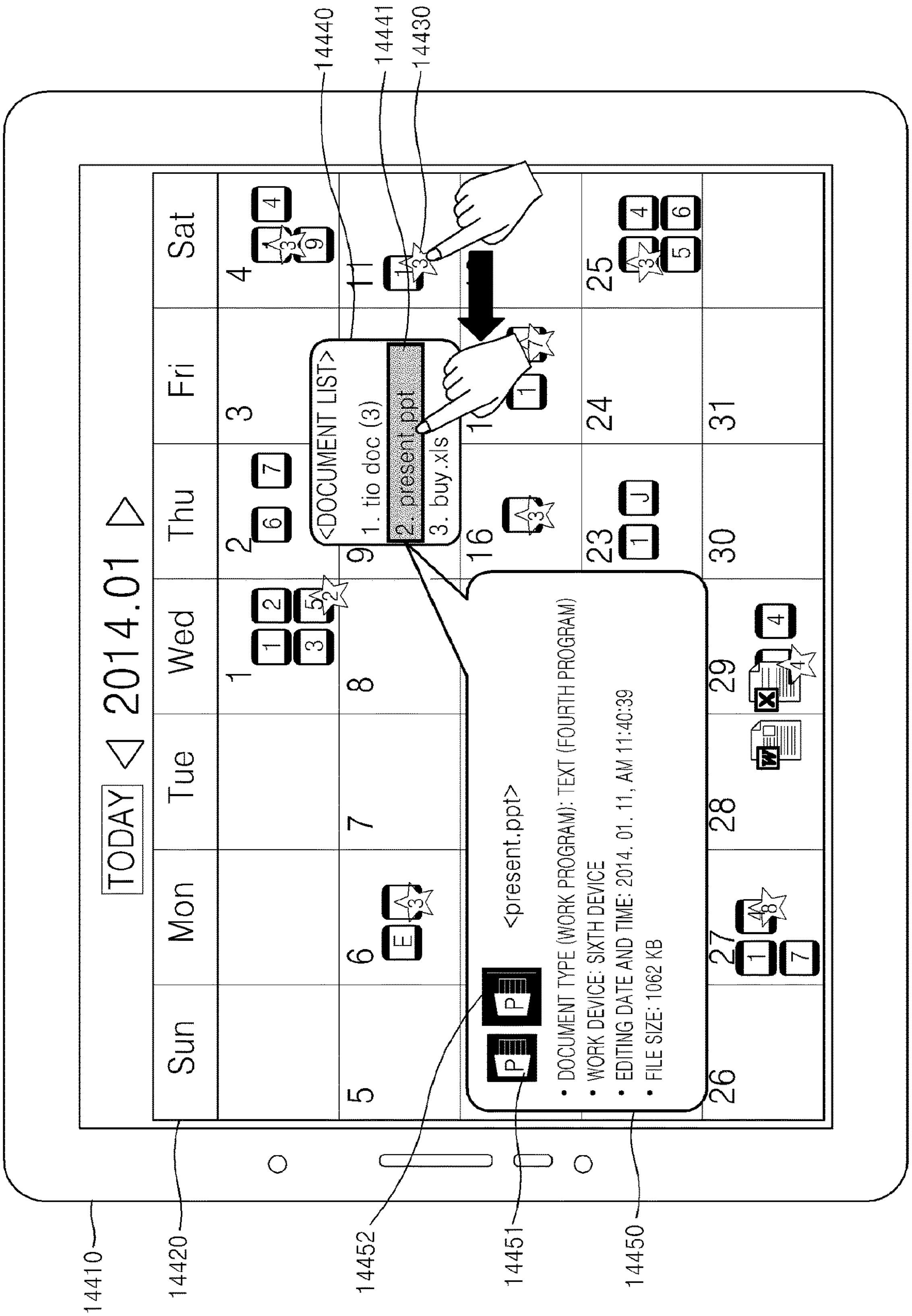
FIGS. 144 and 145 illustrate other examples of calendars output on screens of devices according to an exemplary embodiment.
Figure 145:
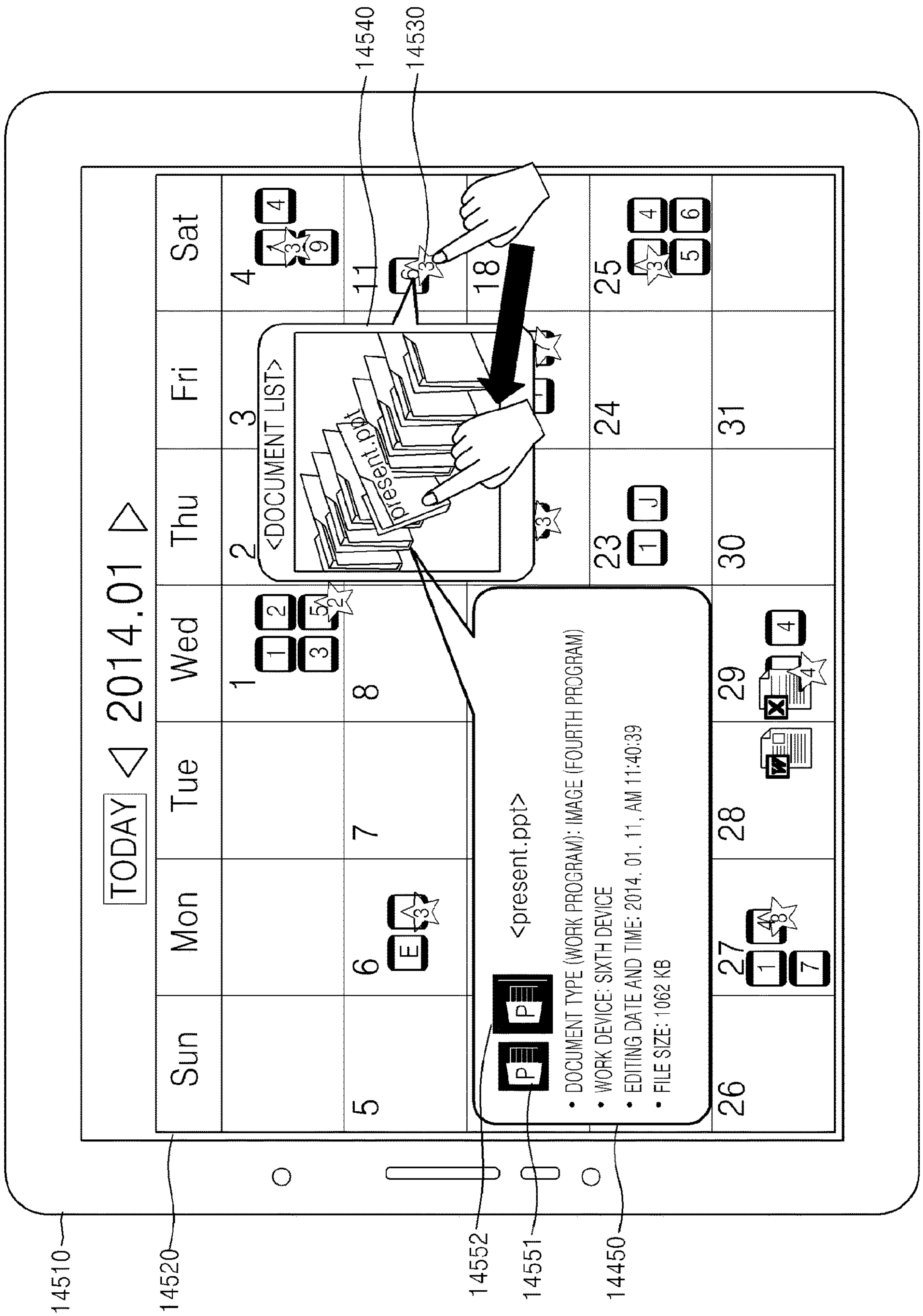

FIGS. 144 and 145 illustrate other examples of calendars 14420 and 14520 output on screens of devices 14410 and 14510, respectively, according to an exemplary embodiment.

Referring to FIG. 144, an example of the calendar 14420 output on the screen of the device 14410 is illustrated. While the monthly calendar 14420 is output on the screen of the device 14410 in FIG. 144, it is understood that one or more other exemplary embodiments are not limited thereto. For example, other types of calendars may be displayed in one or more other exemplary embodiments.

When the server 100 works on a plurality of documents on a same date according to a request of a same device, an indicator 14430 indicating a number of the documents worked on may be displayed on the calendar 14420. For example, if it is assumed that the server 100 works on a total number of 3 documents on Jan. 11, 2014 according to a request of the first device 111, the indicator 14430 indicating that the 3 documents have been worked on may be displayed on a region of the calendar 14420 showing Jan. 11, 2014.

The device 14410 may select the indicator 14430 according to a user input received through the user input device 16510. When the indicator 14430 is selected, the device 14410 may output a list 14440 of the documents worked on the screen.

After the list 14440 of the documents worked on is output, when one 14441 of the documents included in the list 14440 is selected, the device 14410 may output wok history information 14450 of the selected document 14441 on the screen. Indicators 14451 and 14452 that may output the document 14441 on the screen of the device 14410 may be displayed on the work history information 14450 of the document 14441. In this regard, the indicator 14451 may indicate an original document at the time of creating the document 14441 or a document previous to a current work. The indicator 14452 may indicate a currently editing document.

Referring to FIG. 145, another example of the calendar 14520 output on the screen of the device 14510 is illustrated. A list 14540 of documents of the calendar 14520 of FIG. 145 may have a different shape from that of the list 14440 of the documents of the calendar 14420 of FIG. 144. For example, the list 14540 of the documents, work history information 14550 of the documents, and indicators 14530, 14551, and 14552 that may be output on the screen of the device 14510 may have various shapes or colors in various exemplary embodiments.

Figure 146:
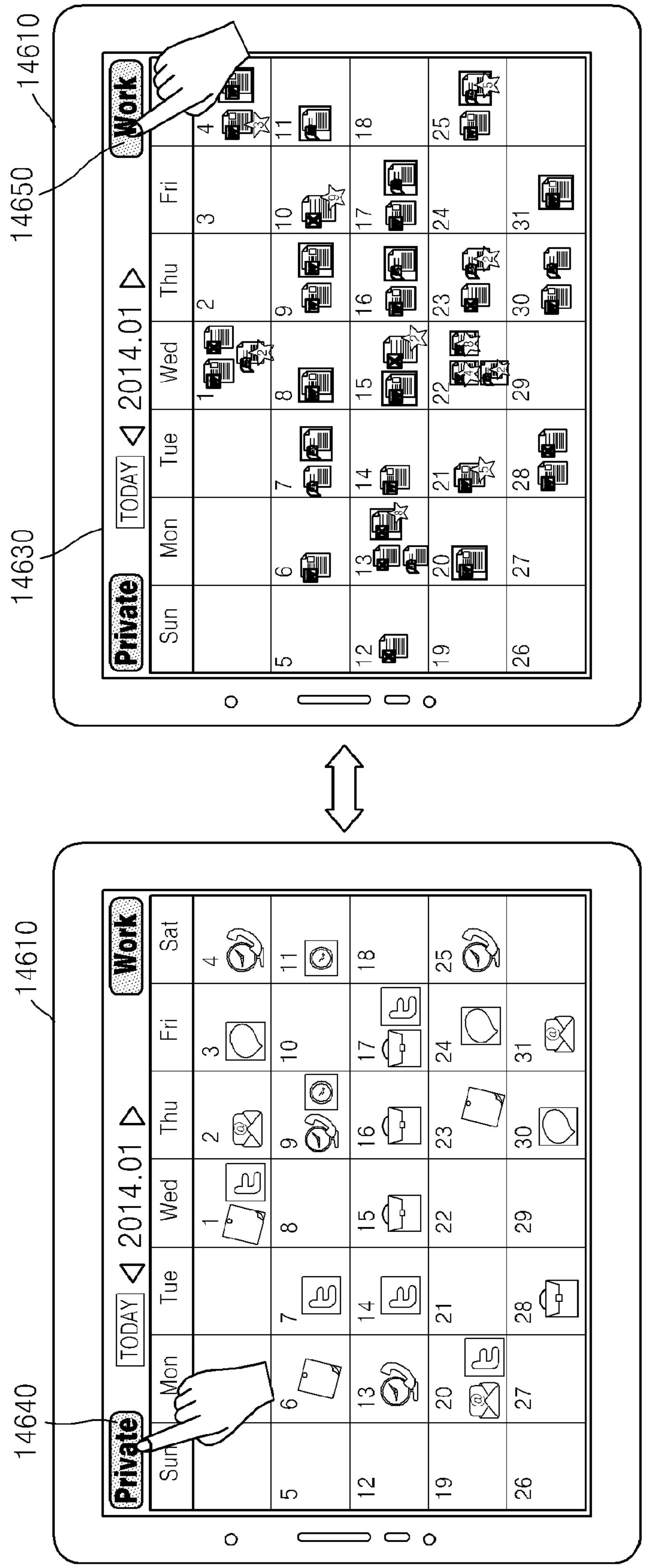
FIG. 146 is a diagram for explaining examples of switching modes of calendars according to an exemplary embodiment.

FIG. 146 is a diagram for explaining examples of switching modes of calendars according to an exemplary embodiment.

Referring to (a) of FIG. 146, an example of a first mode calendar 14620 output on a screen of a device 14610 is illustrated. In this regard, the first mode calendar 14620 may interwork with information related to a user's daily life. For example, the first mode calendar 14620 may interwork with information relating to a user's schedule or plan. The first mode calendar 14620 may interwork with history information of an operation of the device 14610 used by a user. For example, the first mode calendar 14620 may interwork with a history of calls that the user makes by using the device 14610, a history of photographing performed by using a camera included in the device 14610, a history of memos generated by using a memo program installed in the device 14610, a history of messages or emails transmitted and received by using the device 14610, a history of a SNS used by using an SNS program installed in the device 14610, etc.

Referring to (b) of FIG. 146, an example of a second mode calendar 14630 output on the screen of the device 14610 is illustrated. In this regard, the second mode calendar 14630 may interwork with work history information of a document.

Indicators 14640 and 14650 that may switch modes of the calendars 14620 and 14630 may be displayed on the calendars 14620 and 14630 that are output on the device 14610. For example, the indicator 14640 that requests output of the first mode calendar 14620 and the indicator 14650 that requests output of the second mode calendar 14630 may be displayed on the screen of the device 14610.

Schedule information relating to the work history information displayed on the second mode calendar 14630 may be displayed on the first mode calendar 14620 output on the device 14610. For example, it is assumed that the user works on a document "performance report of 2013.doc" on Dec. 23, 2013, and has a conference schedule relating to the document "performance report of 2013.doc" on Jan. 3, 2014. In this regard, an indicator informing the user of reviewing "performance report of 2013.doc" may be displayed on a field of Jan. 2, 2014 of the first mode calendar 14620.

According to one or more other exemplary embodiments, additional modes (e.g., based on additional users or additional types of calendars) may be provided. Furthermore, another mode may be provided that simultaneously displays calendars of two or more modes, according to another exemplary embodiment. In this case, the other mode may have its own corresponding indicator, or may be controlled by selecting plural indicators respectively corresponding to plural modes.

Hereinafter, an example in which when users of the devices 110 are different, and the devices 110 perform a document work according to requests of the devices 110, the server 100 interworks work history information with calendars of users will be described with reference to FIGS. 147 through 149.

Figure 147:
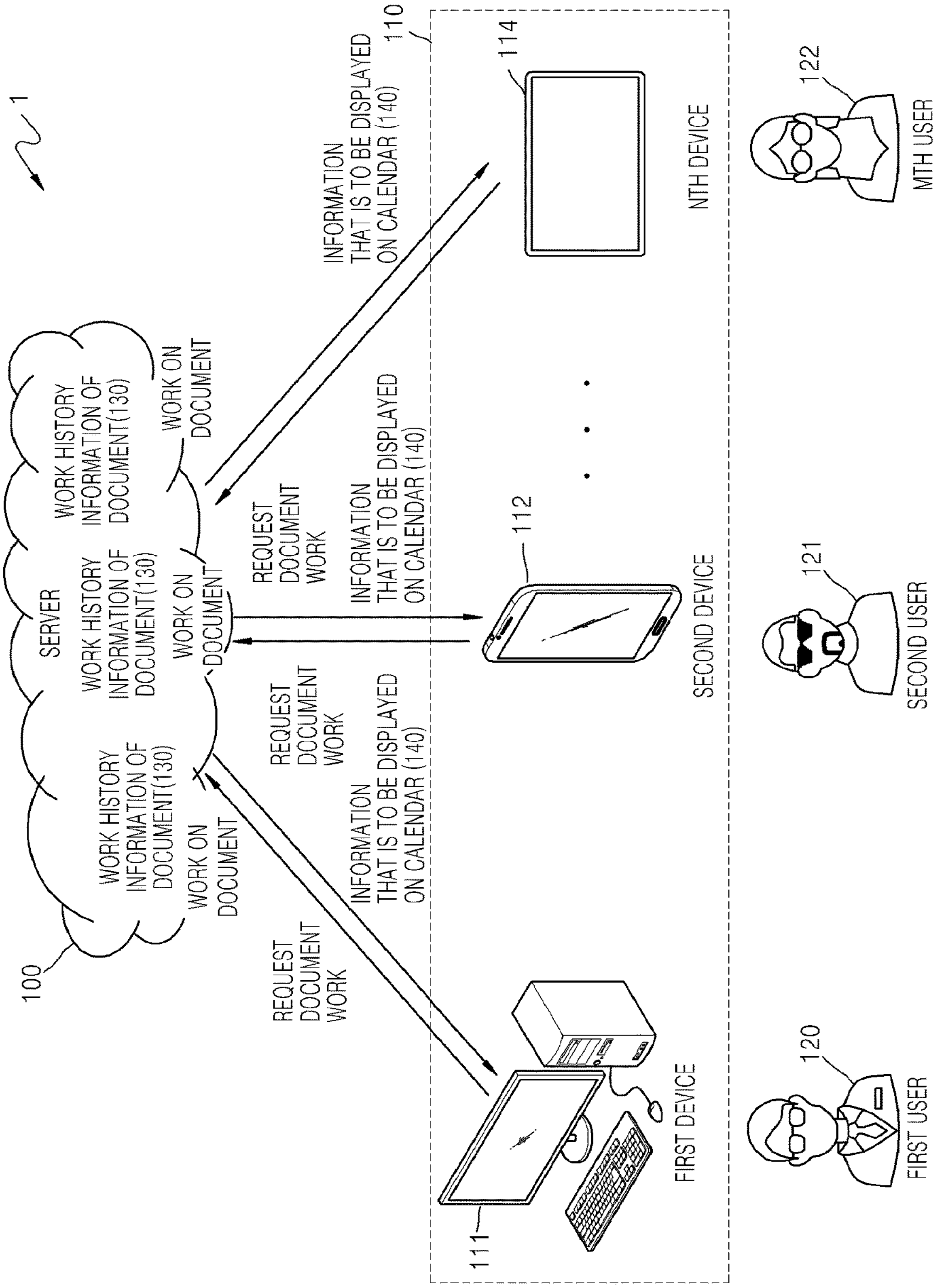
FIG. 147 is a diagram for explaining an example in which when users of devices are different, and the devices perform a document work according to requests of the devices, a server interworks work history information with calendars of users according to an exemplary embodiment.

FIG. 147 is a diagram for explaining an example in which when users of the devices 110 are different, and the devices 110 perform a document work according to requests of the devices 110, the server 100 interworks work history information with calendars of users according to an exemplary embodiment.

Referring to FIG. 147, the system 1 includes the server 100 and the devices 110. In this regard, the devices 110 refer to devices of different users. For example, the first device 111 may be a device of the first user 120, the second device 112 may be a device of the second user 121, and the Nth device 114 may be a device of the Nth user 122.

Compared to the example described above with reference to FIG. 84, a subject that performs the document work in FIG. 147 is not the devices 110, but the server 100. In other words, the program used to work on the document is executed by the devices 110 in FIG. 84, whereas a program used to work on a document is executed by the server 100 in FIG. 147.

The server 100 of FIG. 147 executes the program that is installed in the server 100 and is used to work on the document. Thus, although the program used to work on the document is not installed in a device, the first user 120 may perform the document work by accessing the server 100 in the device. A subject that performs the document work is the server 100, and thus the server 100 may not receive work history information of the document from the devices 110, but may obtain the work history information of the document from the server 100. However, it is understood that one or more other exemplary embodiments are not limited thereto. That is, according to one or more other exemplary embodiments, the server 100 may receive at least some of the work history information (e.g., user information, device information, time zone information, etc.) of the document from the devices 110.

Meanwhile, the devices 110 of FIG. 147 do not perform the document work but requests the server 100 to perform the document work. At least one of the devices 110 requests the server 100 to perform the document work. For example, the first device 111 of the first user 120 requests the server 100 to perform the document work. In the same manner, the second device 112 of the second user 121 through the Nth device 114 of the Nth user 122 request the server 100 to perform the document work.

The server 100 receives a request for the document work from at least one of the devices 110 and performs the document work. The server 100 obtains the work history information 130 of the document after completely performing the document work, although it is understood that one or more other exemplary embodiments are not limited thereto. For example, according to one or more other exemplary embodiments, the server 100 may obtain the work history information 130 of the document at predetermined intervals, in response to one or more predetermined events (e.g., a saving of the document work, a printing of the document work, an emailing of the document work, etc.), in response to a user request to obtain the work history information, etc.

The server 100 interworks the obtained work history information 130 of the document with the calendar of the user. The server 100 transmits the information 140 that is to be displayed on the calendar to the devices 110. In this regard, when the calendar is output on a screen of a device, the information 140 that is to be displayed on the calendar is information that is to be displayed on the output calendar. For example, the information 140 that is to be displayed on the calendar may include work history information that is to be output on the screen of the device when an indicator that is to be displayed on the calendar or an indicator that is displayed on the calendar is selected.

In this regard, the server 100 may transmit the information 140 that is to be displayed on the calendar to only a device that requests the server 100 to transmit the information 140 that is to be displayed on the calendar, among the devices 110. For example, the first device 111 executes a program that outputs the calendar, and authenticates the first user 120 based on a user account input via the user input device 16510, thereby requesting the server 100 to transmit the information 140 that is to be displayed on a calendar of the first user 120.

Meanwhile, although there is no request from the first device 111, the server 100 may automatically transmit (for example, push) the information 140 that is to be displayed on the calendar to the first device 111. For example, if the first device 111 has previously requested the server 100 to transmit the information 140 that is to be displayed on the calendar of the first user 120, the server 100 may automatically transmit the information 140 that is to be displayed on the calendar of the first user 120 although there is no request from the first device 111 at a later time. According to another example, the server 100 may automatically transmit the information according to a prior setting or a default setting to automatically transmit the information at predetermined time intervals or predetermined time points.

Hereinafter, an example in which the server 100 interworks work history information with a calendar of a user will be described with reference to FIG. 148.

Figure 148:
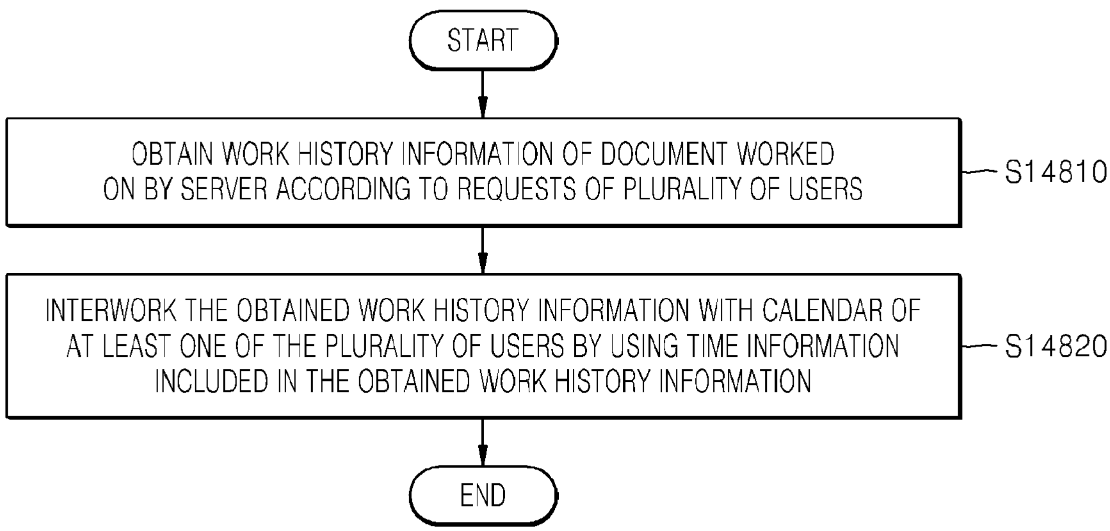

FIG. 148 is a flowchart of another example in which the server 100 interworks work history information with a calendar of a user according to an exemplary embodiment.

In operation S14810, the server 100 obtains the work history information of a document worked on by the server 100 according to requests of a plurality of users. In other words, the server 100 receives a request for a document work from devices of the plurality of users, performs the document work, and obtains the work history information.

In operation S14820, the server 100 interworks the obtained work history information with a calendar of at least one of the plurality of users by using time information included in the obtained work history information. In this regard, the time information is information indicating time taken for the server 100 to work on a document. For example, if it is assumed that the server 100 creates a document "abc.doc" at 12:28:04 p.m. of May 12, 2014 according to a request of the first device 111 of the first user 120, the server 100 may generate an indicator that is to be displayed on May 12, 2014 of a calendar of the first user 120, and, when the indicator displayed on May 12, 2014 is selected, may determine work history information that is to be output on a screen of the first device 111. In this regard, the server 100 may interwork only a portion of the work history information obtained in operation S14810 with the calendar of the user as described above with reference to FIG. 1.

Hereinafter, an example in which when the server 100 works on a document according to a document work request of the first device 111, the server 100 interworks work history information with calendars of the first user 120 and the second user 121 will be described with reference to FIG. 149.

Figure 149:
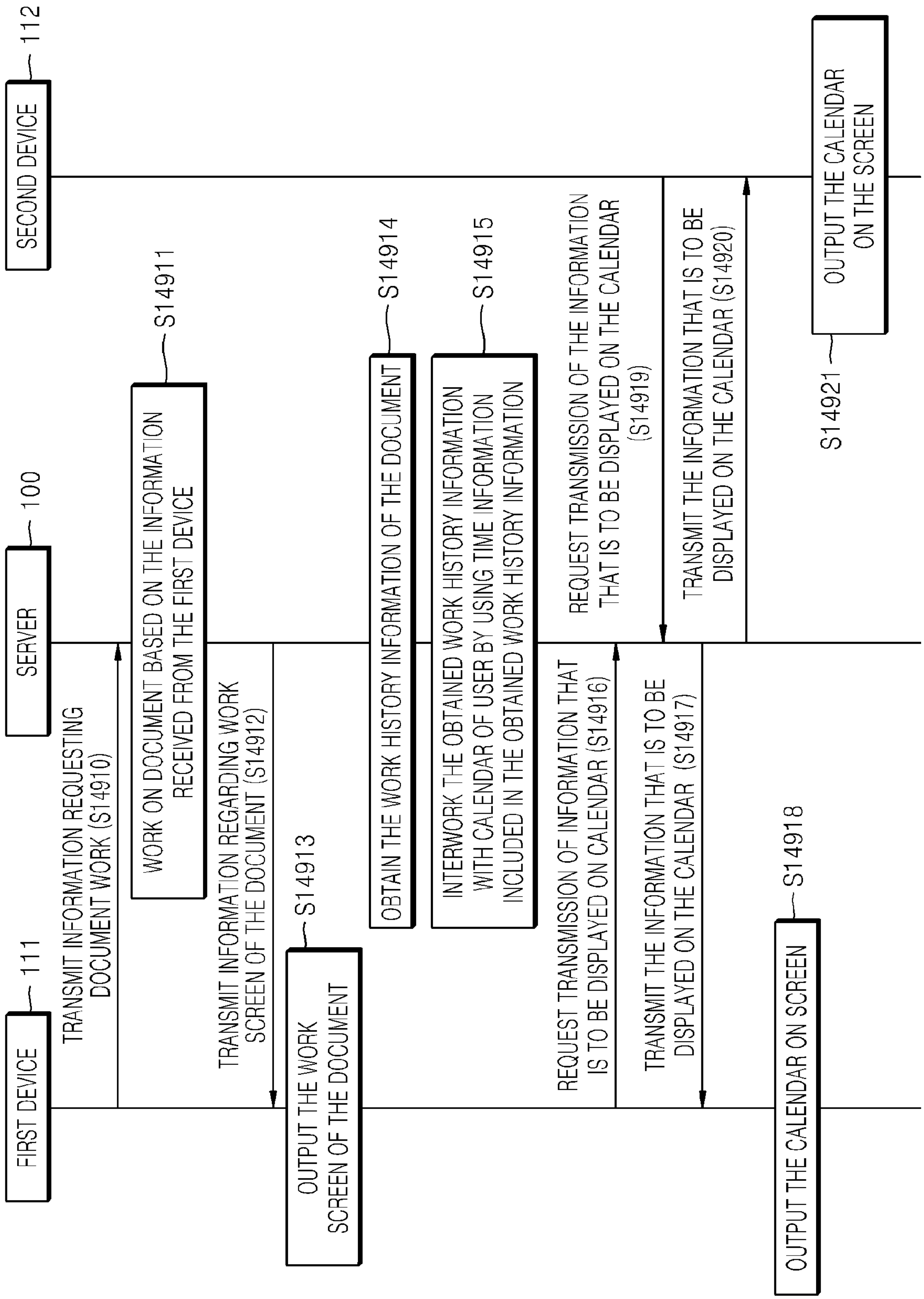

FIG. 149 is a flowchart of an example in which when the server 100 performs a document work according to a document work request of the first device 111, the server 100 interworks work history information with calendars of the first user 120 according to an exemplary embodiment.

While the server 100 works on a document according to the document work request of the first device 111 in FIG. 149, it is understood that one or more other exemplary embodiments are not limited thereto. In other words, there is no limit to the number of devices that request the document work in one or more other exemplary embodiments. There is also no limit to the number of devices that request the server 100 to transmit information that is to be displayed on the calendar in one or more other exemplary embodiments.

In operation S14910, the first device 111 transmits information requesting the document work to the server 100. For example, as the user of the first device 111 executes and logs into the fourth device, the first device 111 may transmit the information requesting the document work to the server 100. In this case, methods used by the user of the first device 111 to log into the fourth device may vary, the methods including a method of inputting an ID and passwords.

In operation S14911, the server 100 works on the document based on the information received from the first device 111. For example, the server 100 may execute a program used to work on the document and work on the document by using the program executed in the server 100. If it is assumed that a document that the server 100 works on is "abc.doc", and a program used to create, read, or edit "abc.doc" is a fourth program, the server 100 may execute the fourth program and create, read, or edit "abc.doc".

In operation S14912, the server 100 transmits information regarding a work screen of the document to the first device 111. For example, every time the server 100 works on the document based on the information received from the first device 111, the server 100 may transmit the information regarding the work screen of the document to the first device 111. In other words, the server 100 may transmit the information regarding the work screen of the document that is modified every time the document is worked on by using the program executed in the server 100 to the first device 111.

In operation S14913, the first device 111 outputs the work screen of the document. For example, the first device 111 may output the work screen of the document based on the information regarding the work screen of the document transmitted from the server 100.

In operation S14914, the server 100 obtains the work history information of the document. For example, the server 100 may obtain the work history information of the document at the time of ending execution of the program used to work on the document or storing the document. For example, the server 100 may obtain work history information of "abc.doc" at the time of storing "abc.doc" or ending execution of the fourth program, although it is understood that one or more other exemplary embodiments are not limited thereto as described above. For example, the server 100 may store the obtained work history information in the storage corresponding to the account of the user of the first device 111.

In operation S14915, the server 100 interworks the obtained work history information with the calendar of the user by using time information included in the obtained work history information. For example, if it is assumed that the server 100 stores "abc.doc" at 12:28:04 p.m. of May 12, 2014, the server 100 may generate an indicator that is to be displayed on a region of the calendar corresponding to May 12, 2014.

In operation S14916, the first device 111 requests the server 100 to transmit information that is to be displayed on the calendar. For example, the first device 111 may request the server 100 to transmit work history information that is to be output on a screen of a device when an indicator that is to be displayed on the calendar or an indicator displayed on the calendar is selected.

In operation S14917, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed.

In operation S14918, the first device 111 outputs the calendar on the screen. For example, the first device 111 may output the calendar that displays the indicator transmitted from the server 100 on the screen.

In operation S14919, the second device 112 requests the server 100 to transmit information that is to be displayed on the calendar. For example, the second device 112 may request the server 100 to transmit the work history information that is to be output on the screen of the device when the indicator that is to be displayed on the calendar or the indicator displayed on the calendar is selected.

In operation S14920, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed.

In operation S14921, the second device 112 outputs the calendar on the screen. For example, the second device 112 may output the calendar that displays the transmitted indicator on the screen.

Hereinafter, an example in which when the server 100 creates a document based on requests of the devices 110, the server 100 interworks work history information with a calendar of a user will be described with reference to FIGS. 150 through 161.

Figure 150:
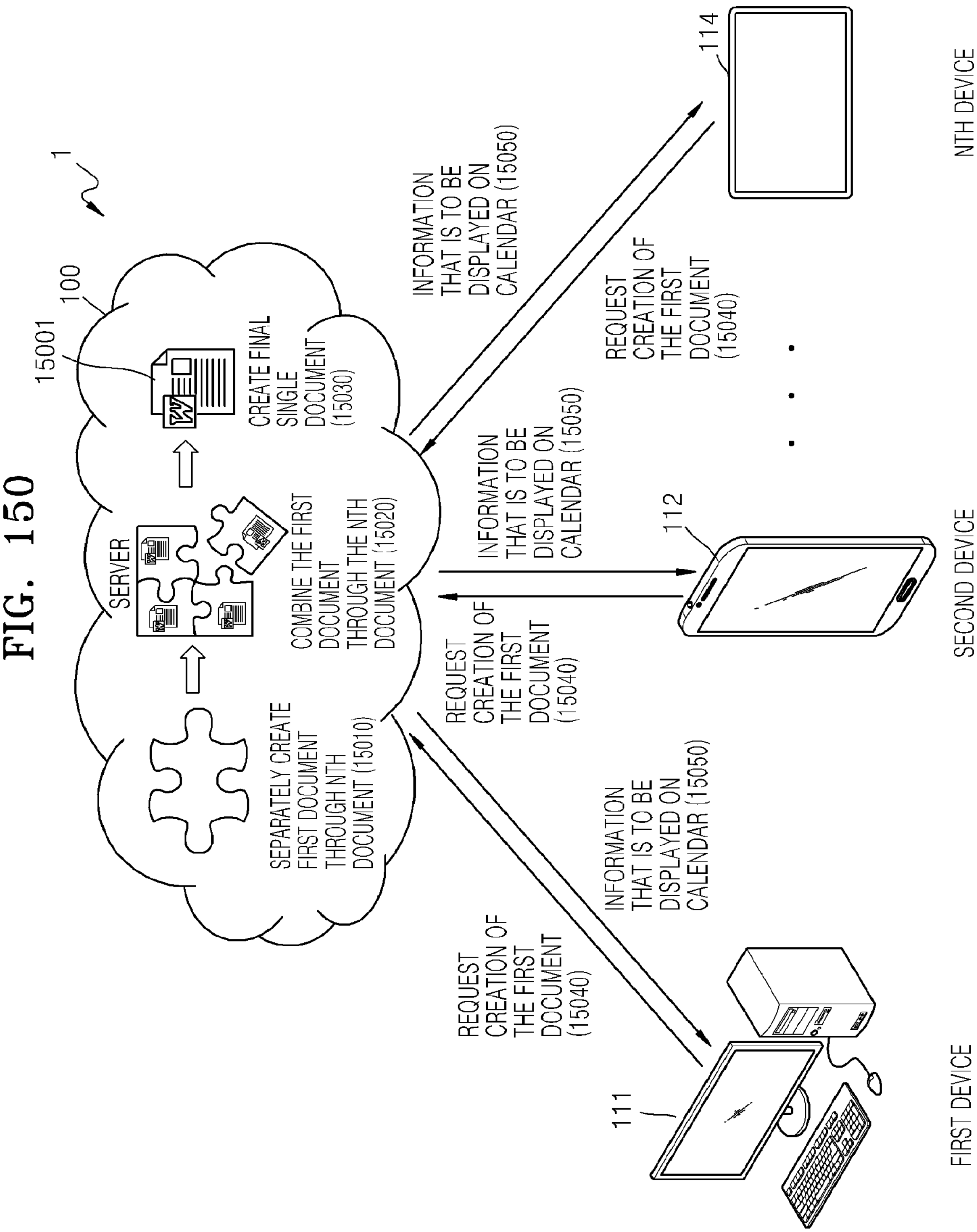

FIG. 150 is a diagram for explaining an example in which when the first through Nth devices 111 through 114 perform cooperation authoring on a document, the server 100 interworks work history information with a calendar of a user according to an exemplary embodiment.

As compared to the example described above with reference to FIG. 87, the system 1 of FIG. 87 uses a program installed in the first device 111, the second device 112, or the Nth device 114, whereas the system 1 of FIG. 10 uses a fourth program installed in the server 100 when the first device 111, the second device 112, or the Nth device 114 accesses the server 100. An example of the fourth program is a document editing program based on a cloud such as MS OFFICE 365, GLLGLE DOCS, etc.

Referring to FIG. 150, the system 1 includes the server 100, the first device 11, the second device 112, and the Nth device 114. In this regard, the devices 110 may correspond to devices used by the first user 120, the second user 121, and the Nth user 122 as in the example of FIG. 84. Alternatively, the devices 110 may correspond to devices by a user (for example, the first user 120) as in the example of FIG. 2. That is, the number of users who use the devices 111 is not limited by one of the users.

The first device 111 transmits a request 15040 to create a first document by using the fourth program to the server 100. The second device 112 the request 15040 to create a second document by using the fourth program to the server 100. The Nth device 114 transmits the request 15040 to create an Nth document by using the fourth program to the server 100. Thus, the server 100 may create 15010 the first through Nth documents.

As described above, the first device 111 through the Nth device 114 transmit the requests 15040 to create the first through Nth documents to the server 100, respectively, thereby performing cooperation authoring.

The server 100 creates 15030 a single document 15001 by combining 15020 the first through the Nth documents received from the devices 110. Thus, all of contents of the first document, contents of the second document, and contents of the Nth document may be included in the single document 15001.

When the single document 15001 is created, the server 100 may transmit creation history information of the single document 15001 to each of the devices 110 that join cooperation authoring of the single document 15001. The server 100 transmits information 15050 that is to be displayed on the calendar to the devices 110. In this regard, when the calendar is output on a screen of a device, the information 15050 that is to be displayed on the calendar is information that is to be displayed on the output calendar. For example, the work history information that is to be output on the screen of the device may be included in the information 15050 that is to be displayed on the calendar when an indicator that is to be displayed on the calendar or an indicator displayed on the calendar is selected. In this regard, the work history information may include the creation history information of the single document 15001.

In this regard, the server 100 may transmit the information 15050 that is to be displayed on the calendar to only a device that requests the server 100 to transmit the information 15050 that is to be displayed on the calendar, among the devices 110. For example, the first device 111 executes a program that outputs the calendar, and authenticates the first user 120 based on a user account input via the user input device 16510, thereby requesting the server 100 to transmit the information 15050 that is to be displayed on a calendar of the first user 120.

Meanwhile, although there is no request from the first device 111, the server 100 may automatically transmit (for example, push) the information 15050 that is to be displayed on the calendar to the first device 111. For example, if the first device 111 has previously requested the server 100 to transmit the information 15050 that is to be displayed on the calendar of the first user 120, the server 100 may automatically transmit the information 15050 that is to be displayed on the calendar of the first user 120 although there is no request from the first device 111 at a later time. According to another example, the server 100 may automatically transmit the information according to a prior setting or a default setting to automatically transmit the information at predetermined time intervals or predetermined time points.

Figure 151:
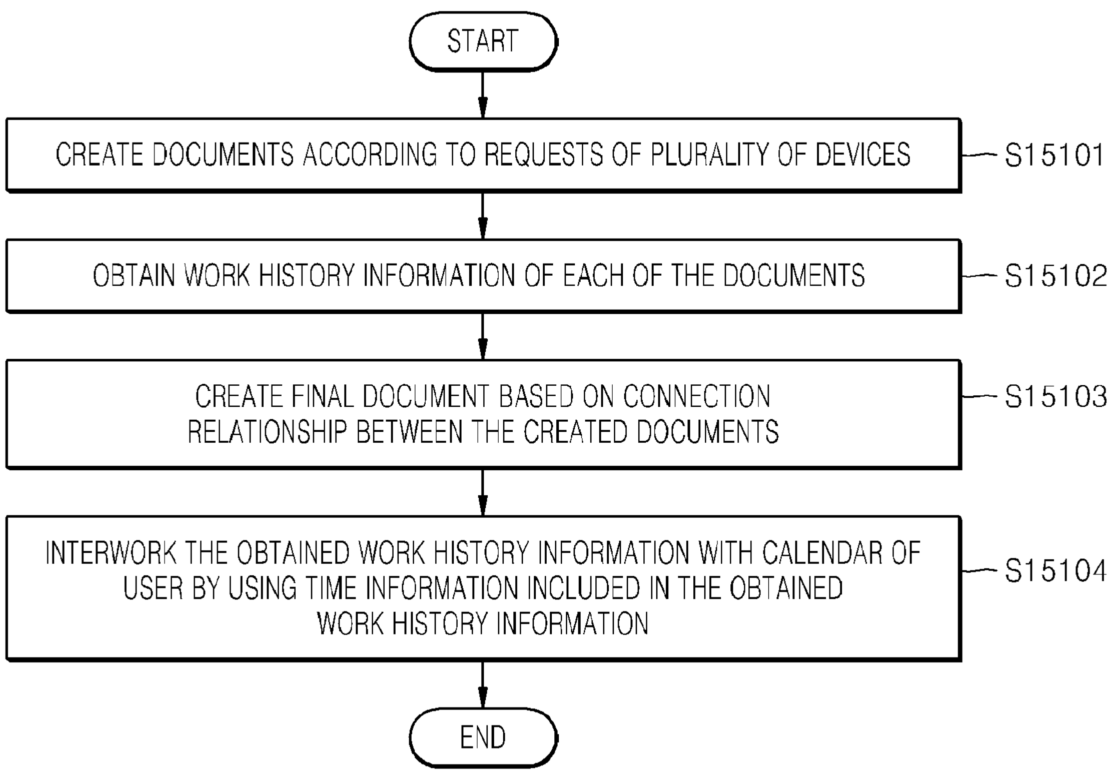

FIG. 151 is a flowchart of an example in which the server 100 interworks work history information with a calendar of a user according to an exemplary embodiment.

In operation S15101, the server 100 creates documents such as a first document, a second document, and an Nth document according to requests of the plurality of devices 110.

In operation S15102, the server 100 obtains work history information of each of the documents.

In operation S15103, the server 100 may create a final document based on a connection relationship between the created documents. In this regard, the final document may correspond to the single document 15001 described with reference to FIG. 150. The connection relationship between the documents is an order of seed documents that are to be connected and combined as the final document, for example, an order of a table of contents, an order of storage dates and time, etc.

In operation S15104, the server 100 interworks the obtained work history information with the calendar of the user by using time information included in the obtained work history information. In this regard, the time information is information indicating time taken for a device to work on a document. For example, if it is assumed that the first device 111 creates a document "abc.doc" at 12:28:04 p.m. of May 12, 2014, the server 100 may create an indicator that is to be displayed on May 12, 2014 of the calendar of a user of the first device 111, and, when the indicator displayed on May 12, 2014 is selected, determine work history information that is to be output on a screen of the first device 111.

Hereinafter, examples in which when the first device 111 and the second device 112 perform cooperation authoring, the server 100 interworks work history information with a calendar of a user will now be described with reference to FIGS. 152A through 152C.

Figure 152A:
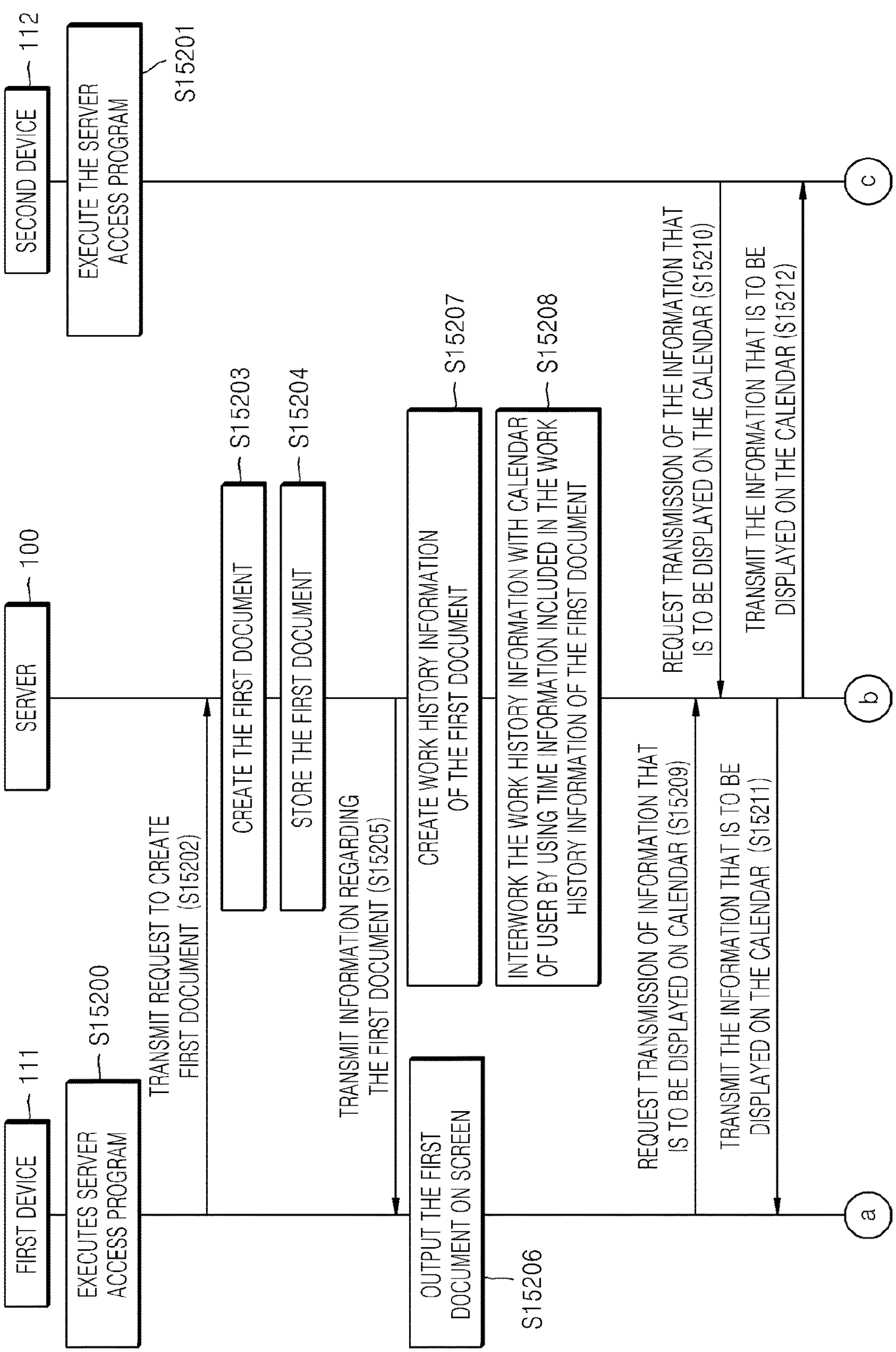
Figure 152B:
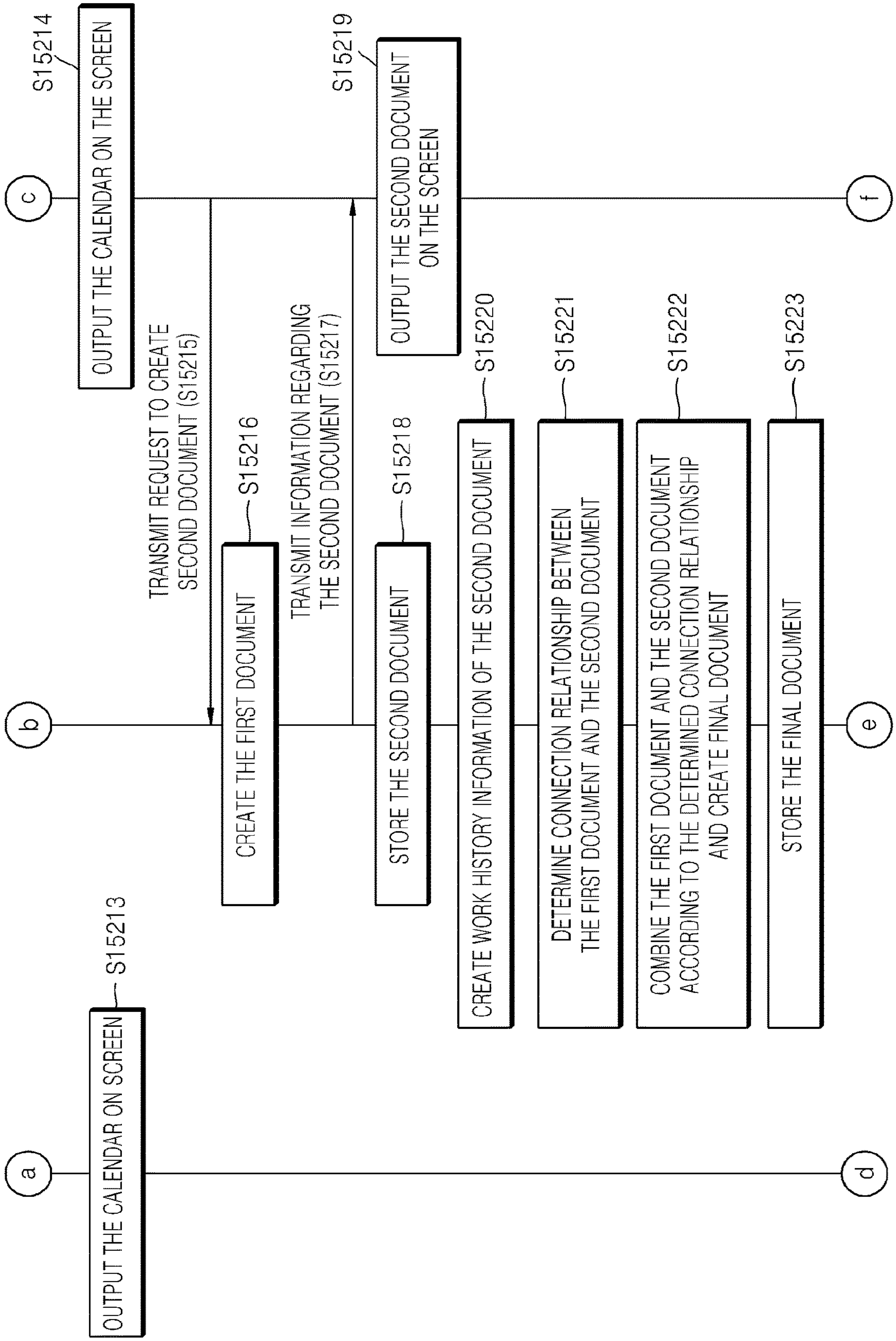
Figure 152C:
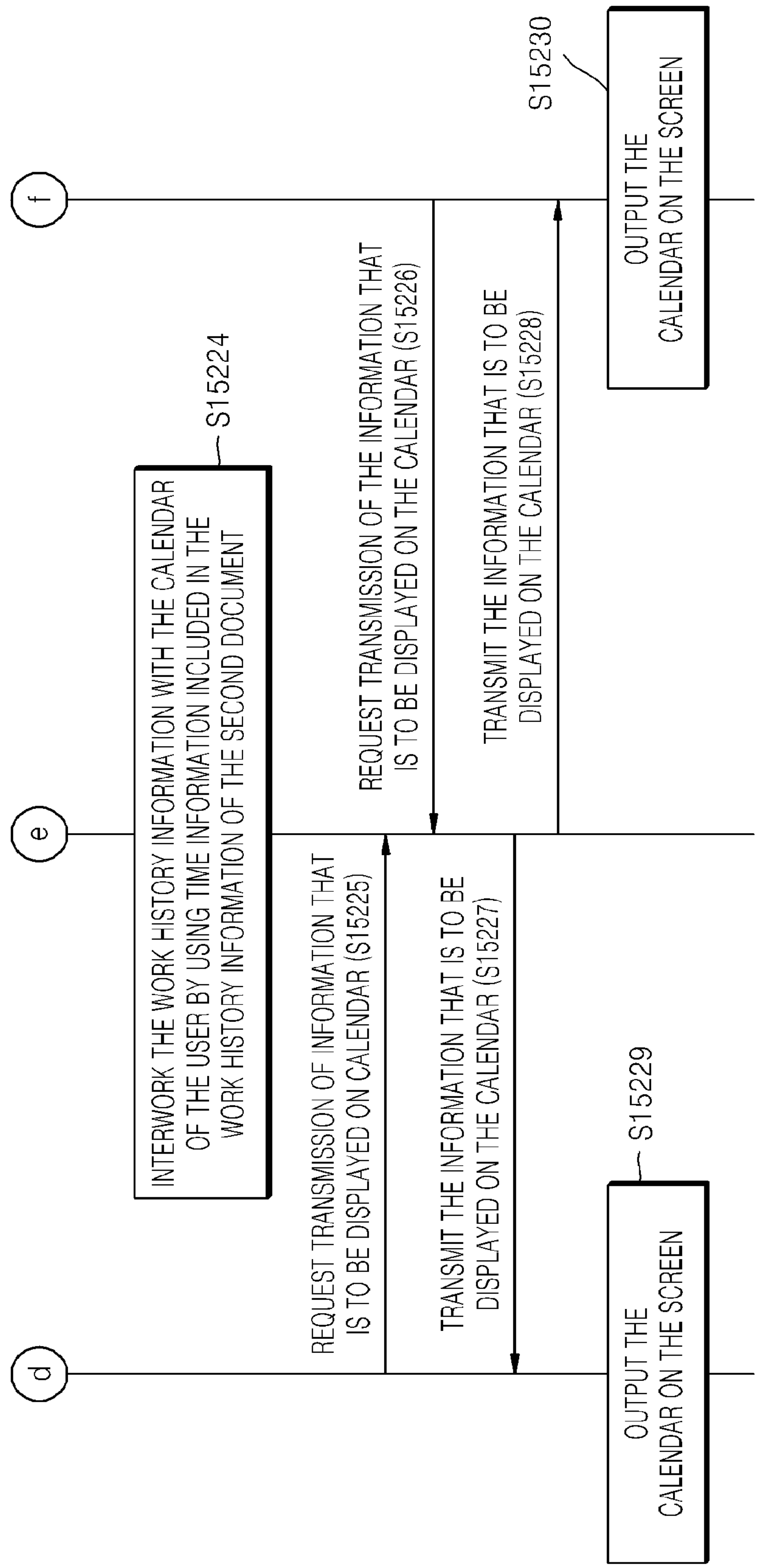

FIGS. 152A through 152C are flowcharts of examples in which when the first device 111 and the second device 112 perform cooperation authoring, the server 100 interworks work history information with a calendar of a user according to an exemplary embodiment.

While only two devices, i.e., the first device 111 and the second device 112, are illustrated in FIGS. 152A through 152C, it is understood that one or more other exemplary embodiments are not limited thereto and any number of devices may be used. If the number of devices is N (where N is greater than or equal to three), operations of the first device 111 or operations of the second device 112 that will be described below may be performed by at least one of the third device 113 through the Nth device 114.

In operation S15200, the first device 111 executes a server access program. In order for the user to request the server 100 to create a first document, the first device 111 may execute the server access program. In this regard, the server access program may correspond to a fourth program. For example, the user of the first device 111 executes the server access program and may include the ID and passwords of the user.

In operation S15201, the second device 112 executes the server access program. In order for the user to request the server 100 to create a second document, the second device 112 may execute the server access program. In this regard, the server access program may correspond to the fourth program. For example, the user of the second device 112 executes the server access program and may include the ID and passwords of the user.

In operation S15202, the first device 111 transmits a request to create the first document to the server 100.

In operation S15203, the server 100 creates the first document.

In operation S15204, the server 100 stores the first document.

In operation S15205, the server 100 transmits information regarding the first document to the first device 111.

In operation S15206, the first device 111 outputs the first document on a screen.

In operation S15207, the server 100 creates work history information of the first document. For example, the work history information may include a title of the document worked on, a document type, time taken to work on the document, a title of a device that performs a document work, a device user, a program used to work on the document, a document size, and a work type. For example, the server 100 may store the obtained work history information in the storages corresponding to the accounts of the users of the first device 111 and the second device 112.

In operation S15208, the server 100 interworks the work history information with the calendar of the user by using time information included in the work history information of the first document.

In operation S15209, the first device 111 requests the server 100 to transmit information that is to be displayed on the calendar. For example, the first device 111 may request the server 100 to transmit the information that is to be displayed on the calendar after executing a calendar output program installed in the first device 111 and authenticating the user.

In operation S15210, the second device 112 requests the server 100 to transmit information that is to be displayed on the calendar. For example, the second device 112 may request the server 100 to transmit the information that is to be displayed on the calendar after executing a calendar output program installed in the second device 112 and authenticating the user.

In operation S15211, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed.

In operation S15212, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed.

In operation S15213, the first device 111 outputs the calendar on the screen.

In operation S15214, the second device 112 outputs the calendar on the screen.

In operation S15215, the second device 112 transmits a request to create the second document to the server 100.

In operation S15216, the server 100 creates the second document.

In operation S15217, the server 100 transmits information regarding the second document to the second device 112.

In operation S15218, the server 100 stores the second document.

In operation S15219, the second device 112 outputs the second document on a screen.

In operation S15220, the server 100 creates work history information of the second document. For example, the server 100 may store the obtained work history information in the storages corresponding to the accounts of the users of the first device 111 and the second device 112.

In operation S15221, the server 100 determines a connection relationship between the first document and the second document. In this regard, the connection relationship between the first document and the second document may refer to an order of the first document and the second document that are to be connected and combined as a final document, for example, an order between a table of contents of the first document and a table of contents of the second document, an order between a storage date and time of the first document and a storage date and time of the second document, etc.

In operation S15222, the server 100 combines the first document and the second document according to the determined connection relationship and creates the final document.

In operation S15223, the server 100 stores the final document.

In operation S15224, the server 100 interworks the work history information with the calendar of the user by using time information included in the work history information of the second document.

In operation S15225, the first device 111 requests the server 100 to transmit the information that is to be displayed on the calendar. For example, the first device 111 may request the server 100 to transmit information that is to be displayed on the calendar after executing the calendar output program installed in the first device 111 and authenticating the user.

In operation S15226, the second device 112 requests the server 100 to transmit the information that is to be displayed on the calendar. For example, the second device 112 may request the server 100 to transmit the information that is to be displayed on the calendar after executing the calendar output program installed in the second device 112 and authenticating the user.

In operation S15227, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed. In the latter case, the first device 111 may set or determine which information is to be displayed on the calendar among received information. Here, the first device 111 may determine which information is to be displayed based on a prior setting or a default setting, or based on one or more user inputs (e.g., filter requests).

In operation S15228, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In FIG. 152C, when the first device 111 and the second device 112 transmit the information that is to be displayed on the calendar to the server 100 in operations S15225 and S15226, respectively, the server 100 transmits the information that is to be displayed on the calendar to the first device 111 and the second device 112 in operations S15227 and S15228, although it is understood that one or more other exemplary embodiments are not limited thereto. According to another exemplary embodiment, although there is no request from the first device 111 or the second device 112, the server 100 may automatically transmit (for example, push) the information that is to be displayed on the calendar to the first device 111 or the second device 112. For example, if the first device 111 or the second device 112 has previously requested the server 100 to transmit the information that is to be displayed on the calendar, the server 100 may automatically transmit the information that is to be displayed on the calendar although there is no request from the first device 111 or the second device 112 at a later time. According to another example, the server 100 may automatically transmit the information according to a prior setting or a default setting to automatically transmit the information at predetermined time intervals or predetermined time points.

In operation S15229, the first device 111 outputs the calendar on the screen.

In operation S15230, the second device 112 outputs the calendar on the screen.

Figure 153:
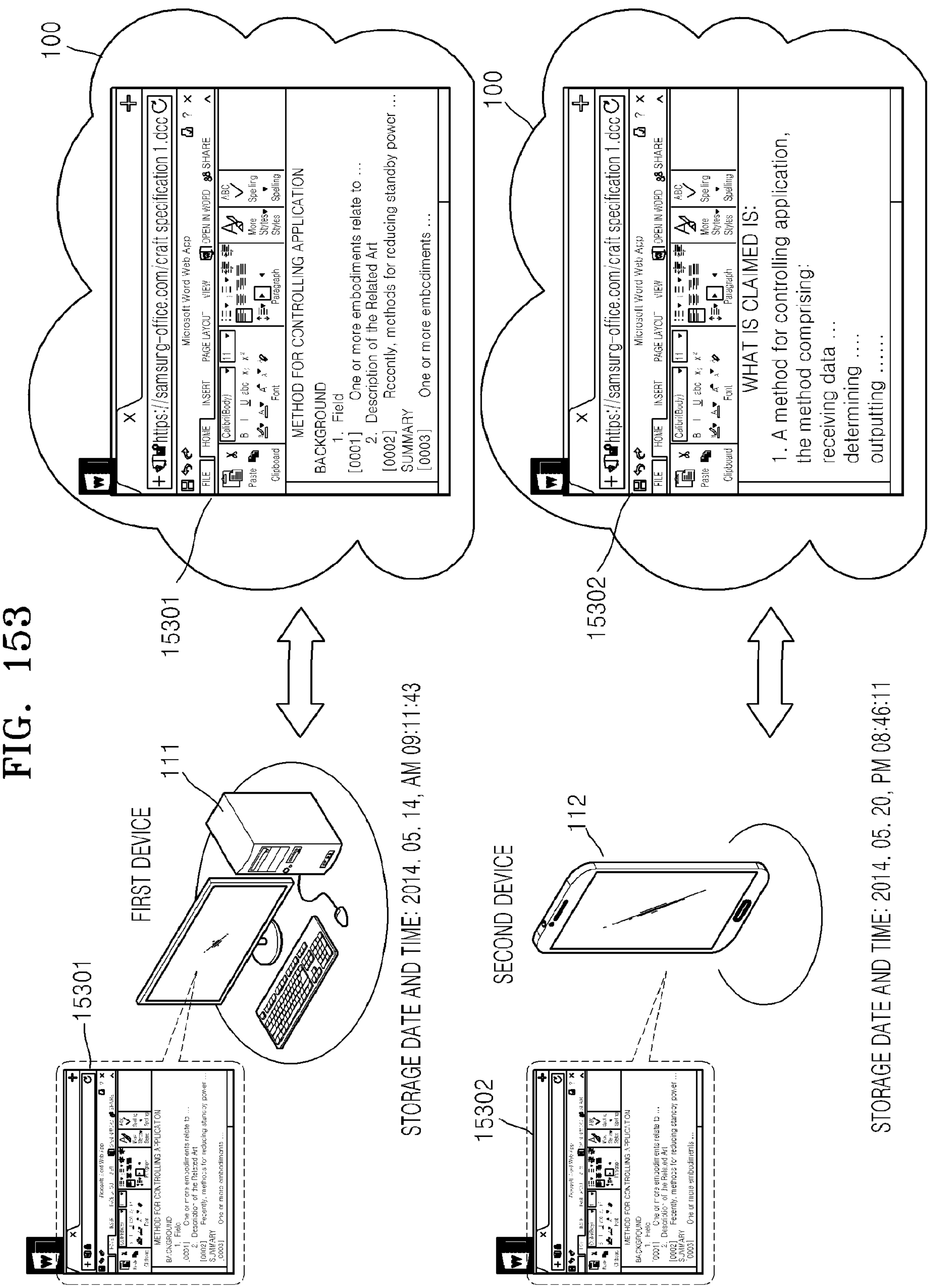

FIG. 153 is a diagram for explaining an example in which the server 100 creates a document according to an exemplary embodiment.

With regard to the first device 111, the first device 111 executes a fourth program 15301 by accessing a webpage "https://samsung-office.com".

A user may prepare texts by using the fourth program 15301 executed in the first device 111. For example, the first device 111 may transmit a request to create some contents of a patent specification entitled, "Method For Controlling Application", and prepared by the user through the fourth program 15301 to the server 100. When the patent specification is completely created, the first device 111 may store a first document having a web address "https://samsung-office.com/draft specification 1.doc" in the server 100. In this regard, a date and time of storing the first document "draft specification 1.doc" may be, for example, "09:11:43 a.m., May 14, 2014".

Meanwhile, with regard to the second device 112, the second device 112 executes a fourth program 15302 by accessing the webpage "https://samsung-office.com".

The user may prepare texts by using the fourth program 15302 executed in the second device 112. For example, the second device 112 may transmit a request to generate claims of a patent specification prepared by the user through the fourth program 15302. When the claims of the patent specification are completely generated, the second device 112 may store a second document having a web address "https://samsung-office.com/draft specification 2.doc" in the server 100. In this regard, a date and time of storing the document "draft specification 2.doc" may be, for example, "08:46:11 p.m., May 20, 2014".

Figure 154:
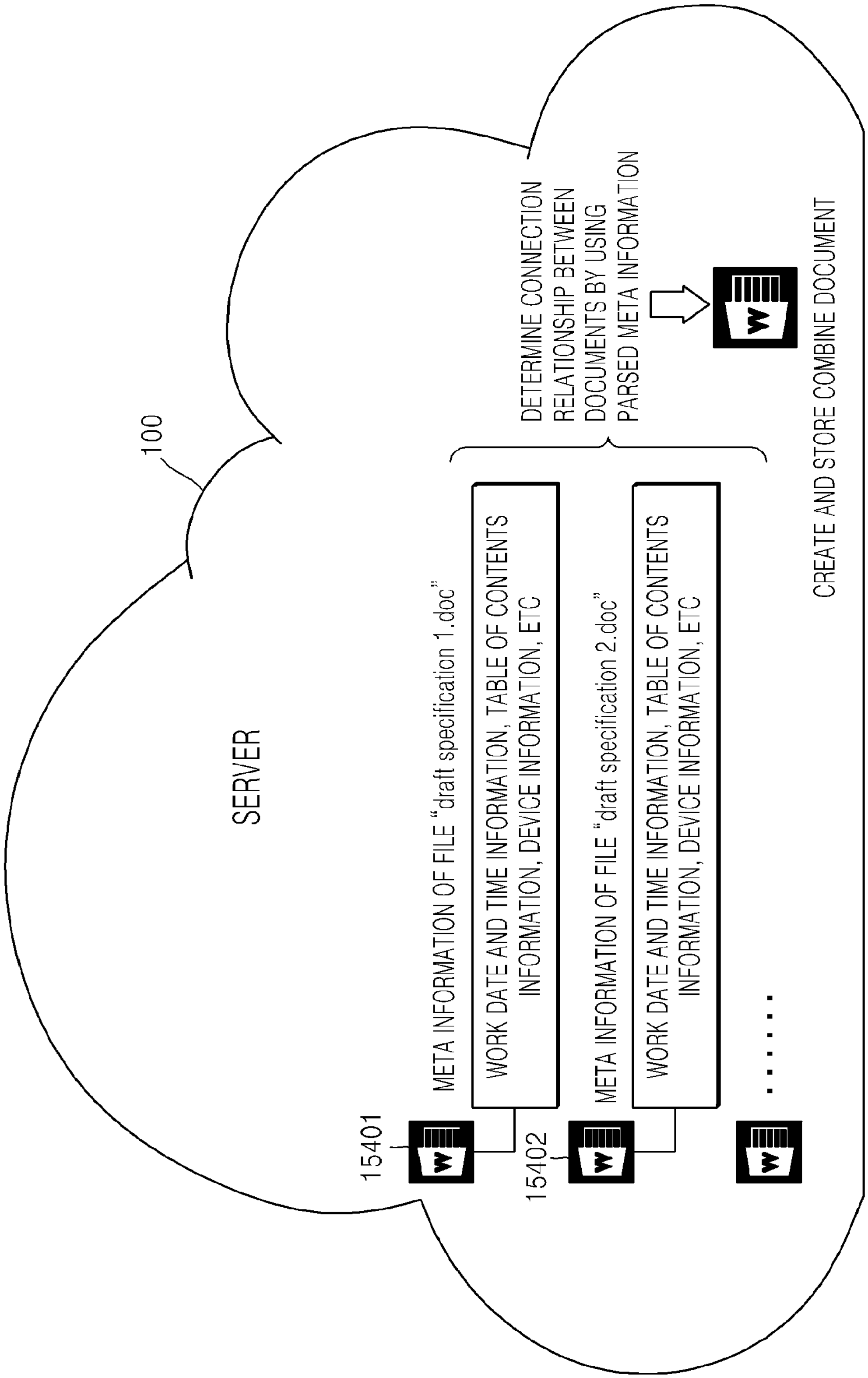

FIG. 154 is a diagram for explaining an example of documents and work history information of the documents created by the server 100 according to an exemplary embodiment.

The server 100 stores a first document 15401 "draft specification 1.doc" described above with reference to FIG. 153 and meta information of the first document 15401 "draft specification 1.doc", and a second document 15402 "draft specification 2.doc" described above with reference to FIG. 153 and meta information of the second document 15402 "draft specification 2.doc".

The meta information corresponds to work history information and may include work date and time information, a device title, a document writer, table of contents information of a document, etc.

Meanwhile, the first document 15401 "draft specification 1.doc" and the second document 15402 "draft specification 2.doc" are documents created for cooperation authoring performed by the first device 111 and the second device 112.

Figure 155:
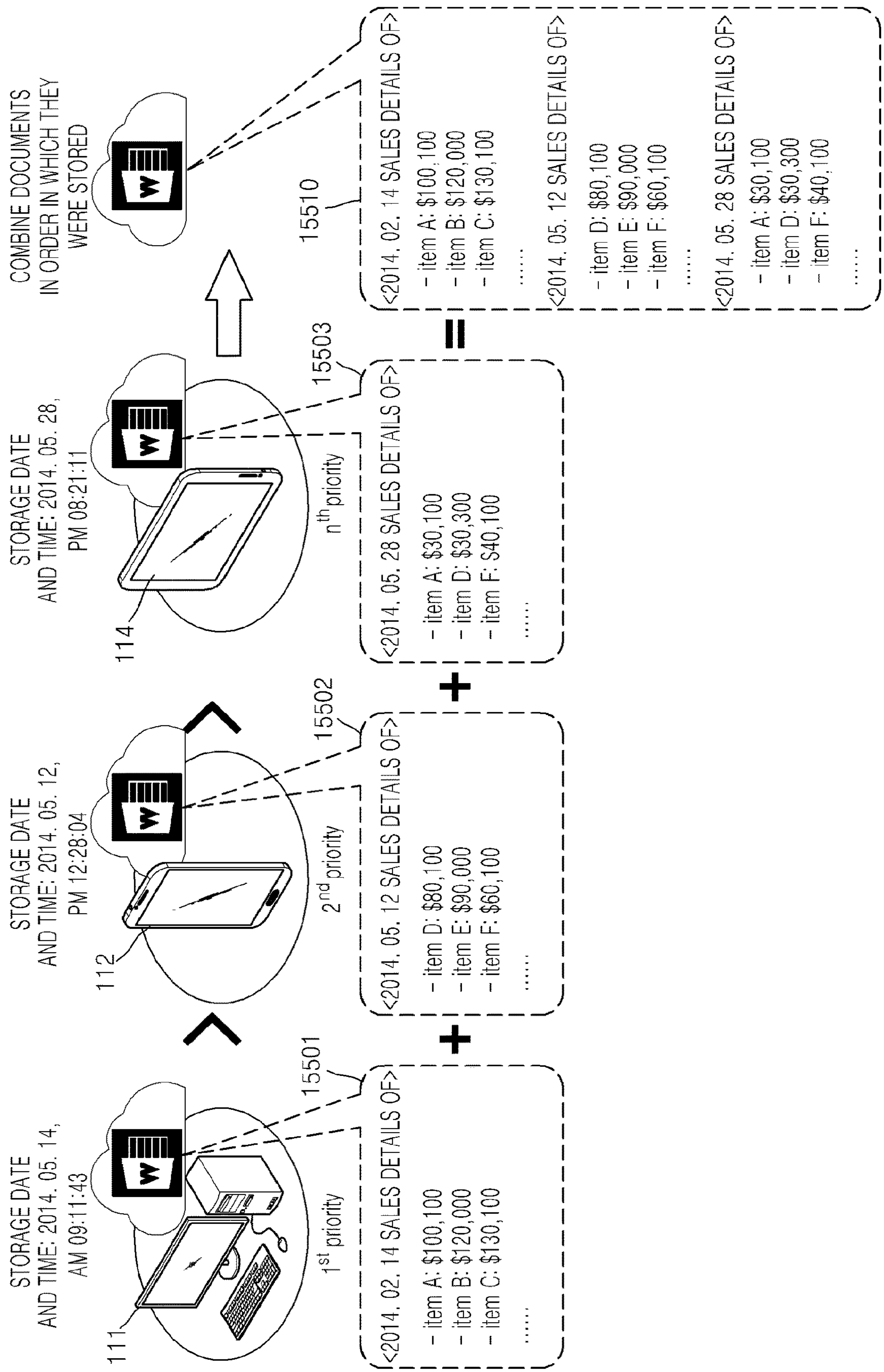

FIG. 155 is a diagram for explaining an example of a process of combining documents through cooperation authoring performed by the first device 111, the second device 112, and the Nth device 114 according to an exemplary embodiment.

The first device 111, the second device 112, and the Nth device 114 transmit requests to create documents for cooperation authoring by using a fourth program to the server 100. In more detail, the first device 111 may transmit a request to create a document 15501 regarding content of <sales details of May 14, 2014> that is to be stored at a date and time of "09:11:43 a.m., May 14, 2014" to the server 100, the second device 112 may transmit a request to create a document 15502 regarding content of <sales details of May 12, 2014> that is to be stored at a date and time of "12:28:04 p.m., May 12, 2014" to the server 100, and the Nth device 114 may transmit a request to create a document 15503 regarding content of <sales details of May 28, 2014> that is to be stored at a date and time of "08:21:11 p.m., May 28, 2014" to the server 100.

The server 100 stores the created documents 15501, 15502, and 15503.

The server 100 determines a connection relationship between the documents 15501, 15502, and 15503. In FIG. 155, the connection relationship is based on the dates and times for storing the documents 15501, 15502, and 15503.

The document 15501 is the first to be stored in the server 100 at the date and time of "09:11:43 a.m., May 14, 2014" among the documents 15501, 15502, and 15503, and thus the document 15501 has a first priority. The document 15502 is the second to be stored in the server 100 at the date and time of "12:28:04 p.m., May 12, 2014" among the documents 15501, 15502, and 15503, and thus the document 15502 has a second priority. The document 15503 is the last to be stored in the server 100 at the date and time of "08:21:11 p.m., May 28, 2014" among the documents 15501, 15502, and 15503, and thus the document 15503 has an Nth priority (where N is a natural number). Thus, the server 100 may determine that the connection relationship between the documents 15501, 15502, and 15503 is an order of the documents 15501, 15502, and 15503.

The server 100 creates a final document 15510 as a result of cooperation authoring performed by the first device 111, the second device 112, and the Nth device 114. In more detail, the server 100 may create the final document 15510 by combining the documents 15501, 15502, and 15503 by using the determined connection relationship between the documents 15501, 15502, and 15503. That is, the server 100 may create the final document 15510 by combining contents of the documents 15501, 15502, and 15503 in an order of the document 15501 having the first priority, the document 15502 having the second priority, and the document 15503 having the Nth priority.

Thus, the server 100 may create the final document 15510 that sequentially combines the content of <sales details of May 14, 2014>, the content of <sales details of May 12, 2014>, and the content <sales details of May 28, 2014> through cooperation authoring.

Figure 156:
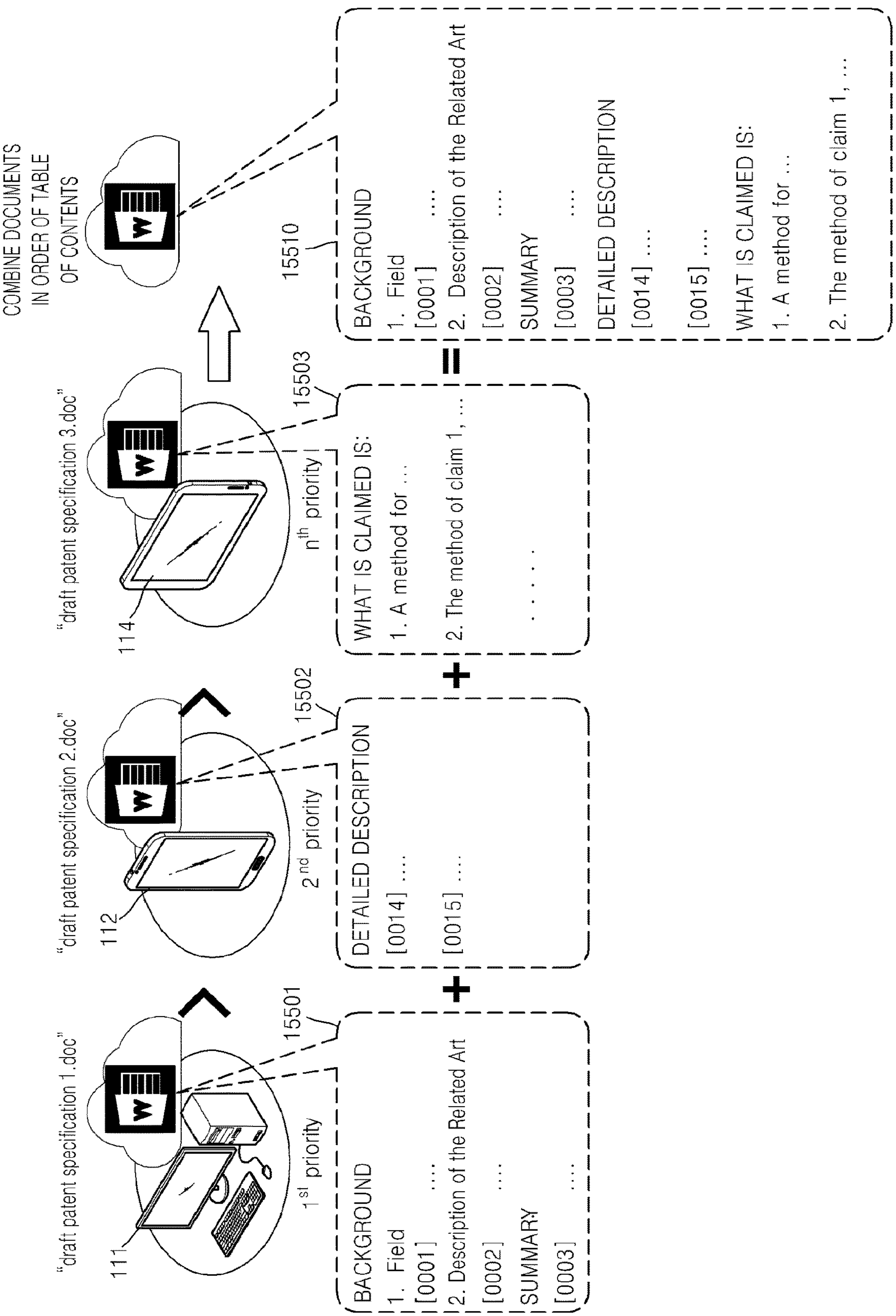

FIG. 156 is a diagram for explaining another example of a process of combining documents through cooperation authoring performed by the first device 111, the second device 112, and the Nth device 114 according to an exemplary embodiment.

The first device 111, the second device 112, and the Nth device 114 transmit requests to create documents for cooperation authoring by using a fourth program to the server 100. In FIG. 156, an example in which the first device 111, the second device 112, and the Nth device 114 perform cooperation authoring on a document of a patent specification will now be described. In general, an order of a table of contents is determined in the patent specification in advance. For example, the order of the table of contents of the patent specification is known as "BACKGROUND", "SUMMARY", . . . , "DETAILED DESCRIPTION", . . . and, "WHAT IS CLAIMED IS:", and the example is described based on the order stated above.

The first device 111 may transmit a request to create a document 15601 "draft patent specification 1.doc" of "BACKGROUND" and "SUMMARY" of the patent specification to the server 100. The second device 112 may transmit a request to create a document 15602 "draft patent specification 2.doc" of "DETAILED DESCRIPTION" of the patent specification to the server 100. The Nth device 114 may transmit a request to create a document 15603 "draft patent specification 3.doc" of "WHAT IS CLAIMED IS:" of the patent specification to the server 100.

The server 100 stores the created documents 15601, 15602, and 15603.

The server 100 determines a connection relationship between the documents 15601, 15602, and 15603. In FIG. 1563, the connection relationship is based on the table of contents contained in the documents 15601, 15602, and 15603.

The document 15601 contains content of a first table of contents "BACKGROUND" and "SUMMARY" compared to the documents 15602 and 15603, and thus the document 15601 has a first priority. The document 15602 contains content of a next table of contents "DETAILED DESCRIPTION", and thus the document 15602 has a second priority. The document 15603 contains content of a next table of contents "WHAT IS CLAIMED IS:", and thus the document 15603 has an Nth priority. Thus, the server 100 may determine that the connection relationship between the documents 15601, 15602, and 15603 is an order of the documents 15601, 15602, and 15603.

The server 100 creates a final document 15610 as a result of cooperation authoring performed by the first device 111, the second device 112, and the Nth device 114. In more detail, the server 100 may create the final document 15610 by combining the documents 15601, 15602, and 15603 by using the determined connection relationship between the documents 15601, 15602, and 15603. That is, the server 100 may create the final document 15610 by combining contents of the documents 15601, 15602, and 15603 in an order of the document 15601 having the first priority, the document 15602 having the second priority, and the document 15603 having the Nth priority.

Thus, the server 100 may create the final document 15610 of the patent specification that sequentially combines the contents of "BACKGROUND", "SUMMARY", . . . , "DETAILED DESCRIPTION", . . . and, "WHAT IS CLAIMED IS:" through cooperation authoring.

Figure 157A:
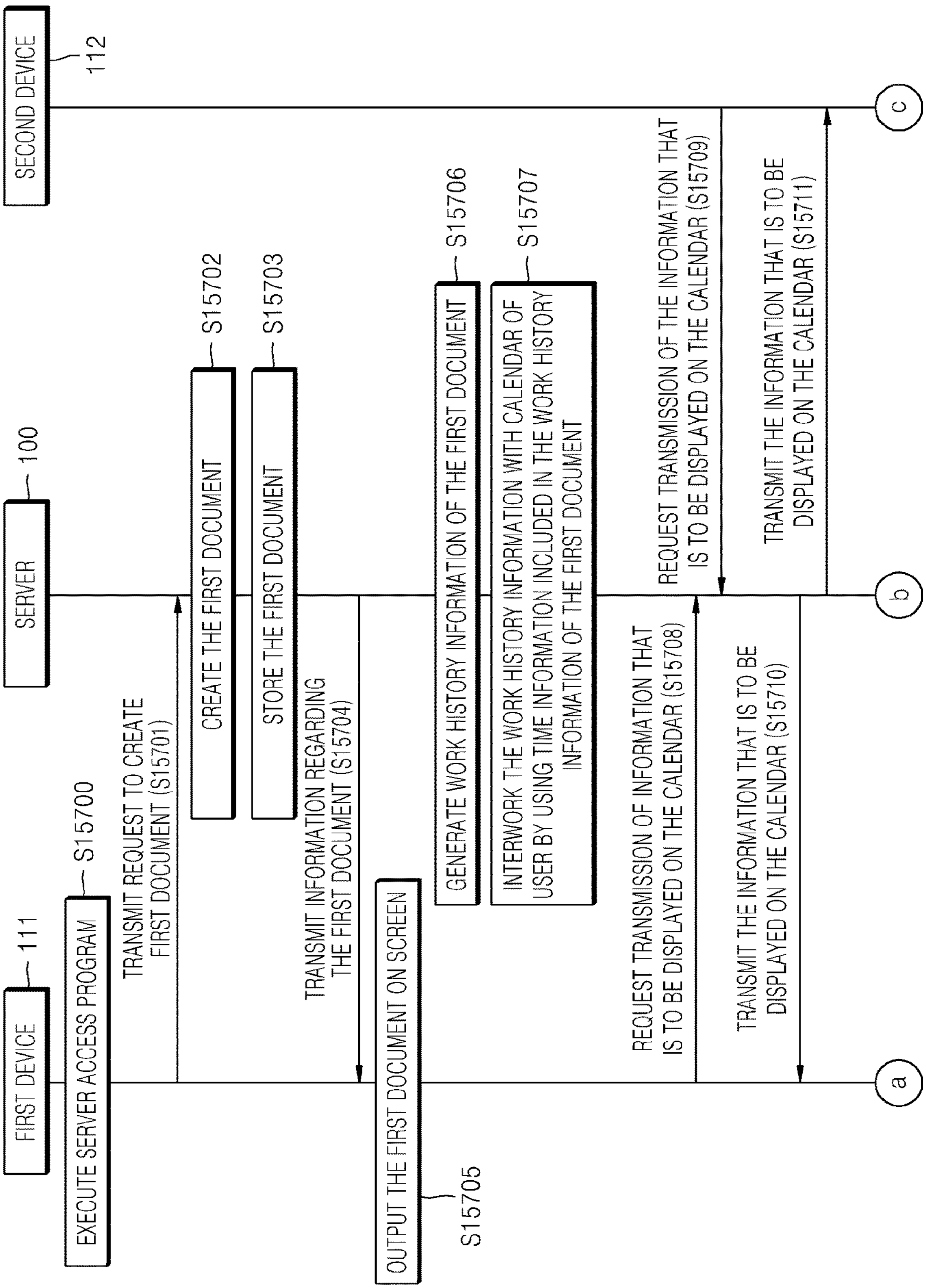
Figure 157B:
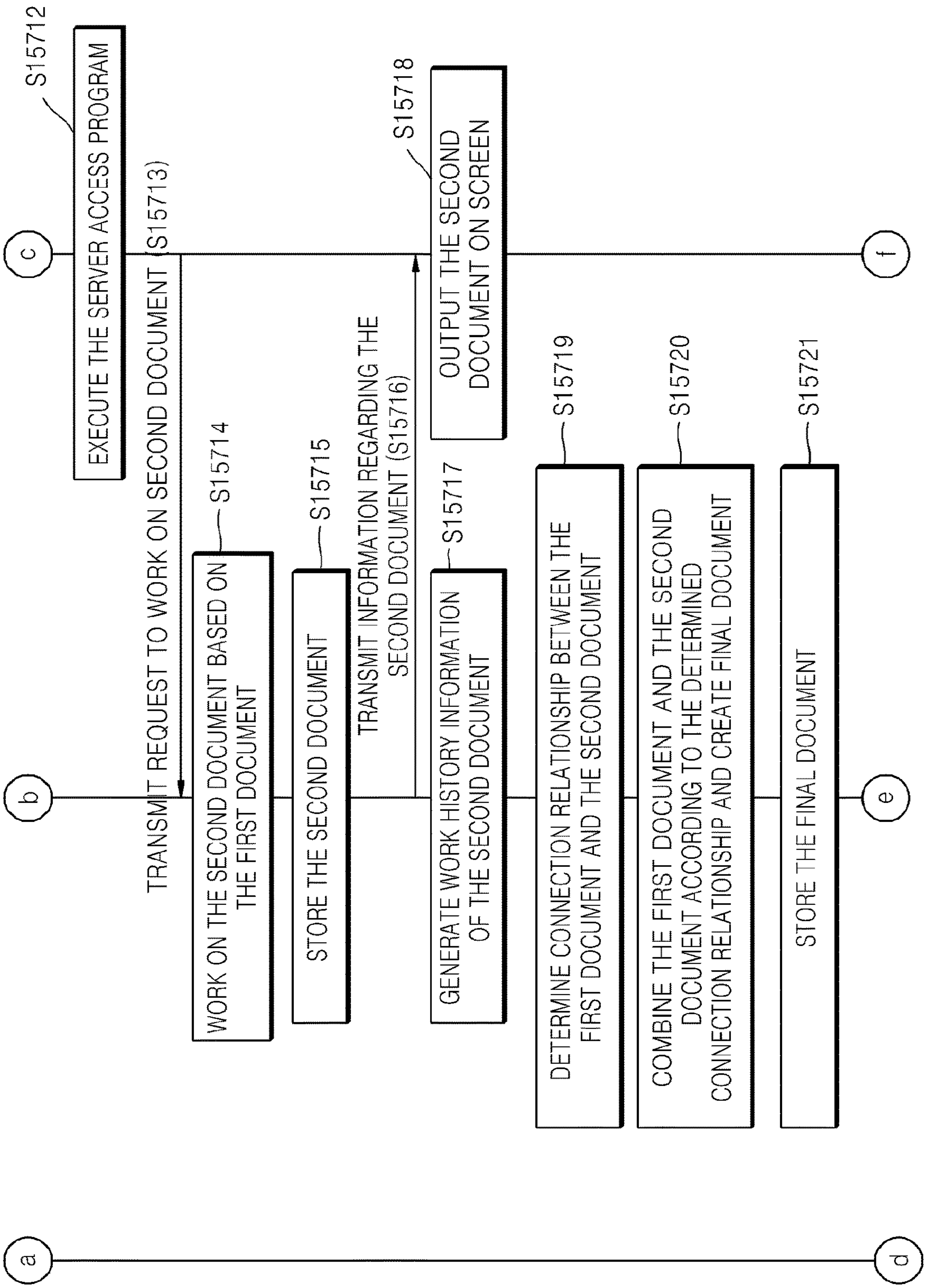
Figure 157C:
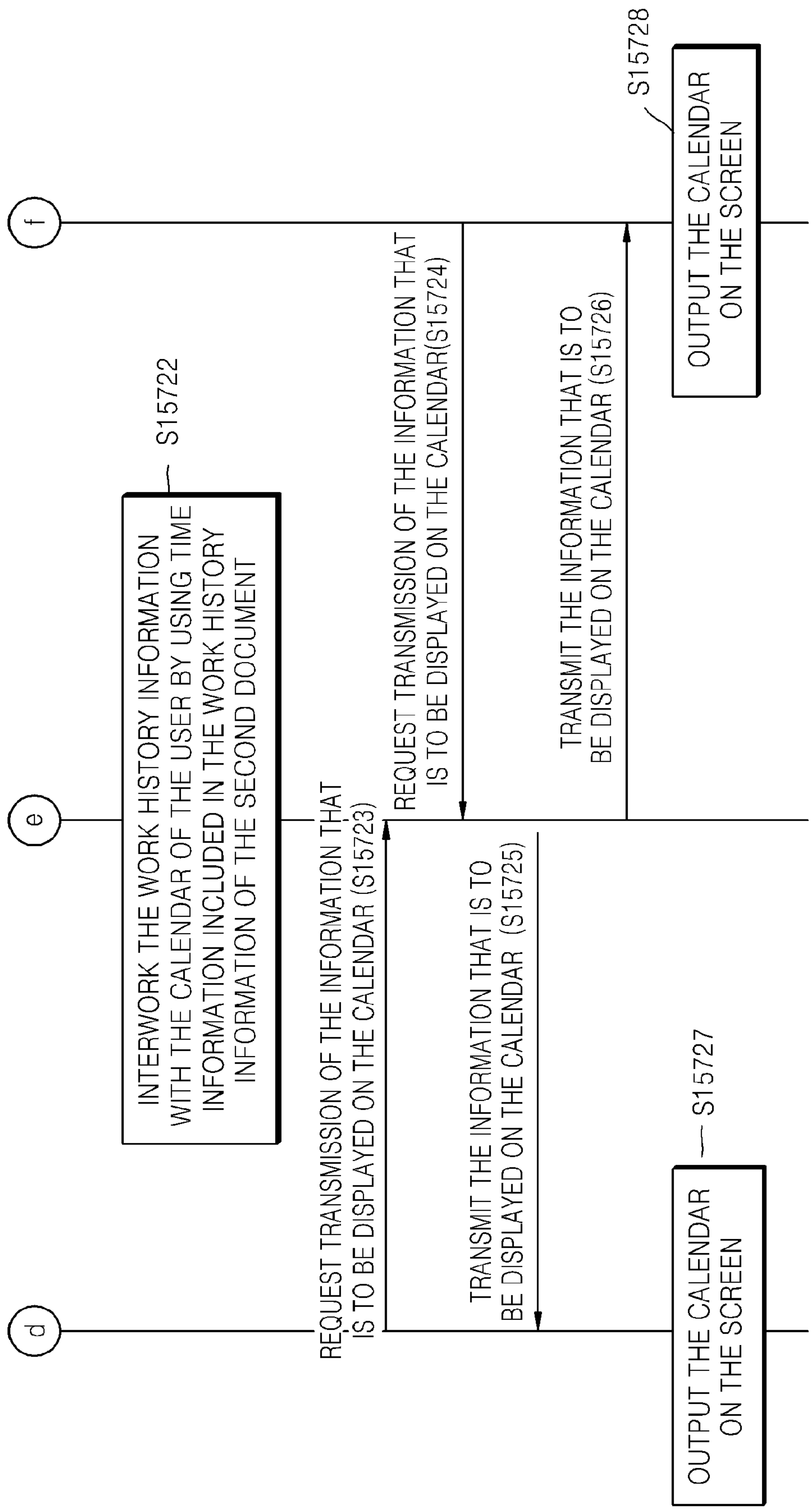

FIGS. 157A through 157C are flowcharts of an example in which when the first device 111 and the second device 112 perform cooperation authoring, the server 100 interworks work history information with a calendar of a user according to an exemplary embodiment.

While only two devices, i.e., the first device 111 and the second device 112, are illustrated in FIGS. 157A through 157C, it is understood that one or more other exemplary embodiments are not limited thereto, and any number of devices may be used. If the number of devices is N (where N is greater than or equal to three), operations of the first device 111 or operations of the second device 112 that will be described below may be performed by at least one of the third device 113 through the Nth device 114.

In operation S15700, the first device 111 executes a server access program. In order for the user to request the server 100 to create a first document, the first device 111 may execute the server access program. In this regard, the server access program may correspond to a fourth program. For example, the user of the first device 111 executes the server access program and may include the ID and passwords of the user.

In operation S15701, the first device 111 transmits a request to create the first document to the server 100.

In operation S15702, the server 100 creates the first document. In this regard, the first document is a document only including a table of contents of a final document that is to be created by the server 100 or a document only including some of all pages of the final document.

As an example, if it is assumed that the final document includes a table of contents "purpose of meeting", "preparations of meeting", and "discussion contents of meeting" and contents of each of the table of contents, the first document may be a document including only the table of contents stated above.

As another example, if it is assumed that the final document includes $1^{st}$ through $10^{th}$ pages, the first document may be a document including contents of the $1^{st}$ and $2^{nd}$ pages.

In operation S15703, the server 100 stores the first document.

In operation S15704, the server 100 transmits information regarding the first document to the first device 111.

In operation S15705, the first device 111 outputs the first document on a screen.

In operation S15706, the server 100 creates work history information of the first document. For example, the work history information may include a title of the document worked on, a document type, time taken to work on the document, a title of a device that performs a document work, a device user, a program used to work on the document, a document size, and a work type. For example, the server 100 may store the obtained work history information in the storage corresponding to the account of the user of the first device 111.

In operation S15707, the server 100 interworks the work history information with the calendar of the user by using time information included in the work history information of the first document.

In operation S15708, the first device 111 requests the server 100 to transmit information that is to be displayed on the calendar. For example, the first device 111 may request the server 100 to transmit the information that is to be displayed on the calendar after executing a calendar output program installed in the first device 111 and authenticating the user.

In operation S15709, the second device 112 requests the server 100 to transmit information that is to be displayed on the calendar. For example, the second device 112 may request the server 100 to transmit the information that is to be displayed on the calendar after executing a calendar output program installed in the second device 112 and authenticating the user.

In operation S15710, the server 100 transmits the information that is to be displayed on the calendar to the first device 111. According to various exemplary embodiments, the server 100 may transmit only the information, among the work history information, that is to be displayed on the calendar of the first device 111, or may transmit more of the work history information that that which is to be displayed. In the latter case, the first device 111 may set or determine which information is to be displayed on the calendar among received information. Here, the first device 111 may determine which information is to be displayed based on a prior setting or a default setting, or based on one or more user inputs (e.g., filter requests).

In operation S15711, the server 100 transmits the information that is to be displayed on the calendar to the second device 112. According to various exemplary embodiments, the server 100 may transmit only the information, among the work history information, that is to be displayed on the calendar of the second device 112, or may transmit more of the work history information that that which is to be displayed. In the latter case, the second device 112 may set or determine which information is to be displayed on the calendar among received information. Here, the second device 112 may determine which information is to be displayed based on a prior setting or a default setting, or based on one or more user inputs (e.g., filter requests).

In operation S15712, the second device 112 executes the server access program. In order for the user to request the server 100 to create a second document, the second device 112 may execute the server access program. In this regard, the server access program may correspond to the fourth program. For example, the user of the second device 112 executes the server access program and may include the ID and passwords of the user.

In operation S15713, the first device 111 transmits a request to work on the second document to the server 100.

In this regard, working of the second document may include creating of the second document, editing of the second document, or reading of the second document.

In operation S15714, the server 100 works on the second document based on the first document. In this regard, the second document is a document including a table of contents of a final document that is to be created by the server 100 in operation S15720 or a document only including some of all pages of the final document.

As an example, if it is assumed that the final document includes a table of contents "purpose of meeting", "preparations of meeting", and "discussion contents of meeting" and contents of each of the table of contents, the first document may be a document including contents of "purpose of meeting" stated above.

As another example, if it is assumed that the final document includes $1^{st}$ through $10^{th}$ pages, the first document may be a document including contents of the $3^{rd}$ through $5^{th}$ pages.

The server 100 may edit the first document created in operation S15702. For example, if it is assumed that the server 100 creates the document including the contents of the $1^{st}$ and $2^{nd}$ pages in operation S15702, the server 100 may correct, add, or delete the contents of the $1^{st}$ and $2^{nd}$ pages in operation S15714.

In operation S15715, the server 100 stores the second document.

In operation S15716, the server 100 transmits information regarding the second document to the second device 112.

In operation S15717, the server 100 creates work history information of the second document. For example, the work history information may include a title of the document worked on, a document type, time taken to work on the document, a title of a device that performs a document work, a device user, a program used to work on the document, a document size, and a work type. For example, the server 100 may store the obtained work history information in the storage corresponding to the account of the user of the second device 112.

In operation S15718, the server 100 outputs the second document on a screen.

In operation S15719, the server 100 determines a connection relationship between the first document and the second document. In this regard, the connection relationship between the first document and the second document may refer to an order of the first document and the second document that are to be connected and combined as a final document, for example, an order between a table of contents of the first document and a table of contents of the second document, an order between a storage date and time of the first document and a storage date and time of the second document, etc.

In operation S15720, the server 100 combines the first document and the second document according to the determined connection relationship and creates the final document.

In operation S15721, the server 100 stores the final document.

In operation S15722, the server 100 interworks the work history information with the calendar of the user by using time information included in the work history information of the second document.

In operation S15723, the first device 111 requests the server 100 to transmit the information that is to be displayed on the calendar. For example, the first device 111 may request the server 100 to transmit information that is to be displayed on the calendar after executing the calendar output program installed in the first device 111 and authenticating the user.

In operation S15724, the second device 112 requests the server 100 to transmit the information that is to be displayed on the calendar. For example, the second device 112 may request the server 100 to transmit the information that is to be displayed on the calendar after executing the calendar output program installed in the second device 112 and authenticating the user.

In operation S15725, the server 100 transmits the information that is to be displayed on the calendar to the first device 111.

In operation S15726, the server 100 transmits the information that is to be displayed on the calendar to the second device 112.

In FIG. 157C, when the first device 111 and the second device 112 transmit the information that is to be displayed on the calendar to the server 100 in operations S15723 and S15724, respectively, the server 100 transmits the information that is to be displayed on the calendar to the first device 111 and the second device 112 in operations S15725 and S15726, although it is understood that one or more other exemplary embodiments are not limited thereto. According to another exemplary embodiment, although there is no request from the first device 111 or the second device 112, the server 100 may automatically transmit (for example, push) the information that is to be displayed on the calendar to the first device 111 or the second device 112. For example, if the first device 111 or the second device 112 has previously requested the server 100 to transmit the information that is to be displayed on the calendar, the server 100 may automatically transmit the information that is to be displayed on the calendar although there is no request from the first device 111 or the second device 112 at a later time. According to another example, the server 100 may automatically transmit the information according to a prior setting or a default setting to automatically transmit the information at predetermined time intervals or predetermined time points.

In operation S15727, the first device 111 outputs the calendar on the screen.

In operation S15728, the second device 112 outputs the calendar on the screen.

Figure 158:
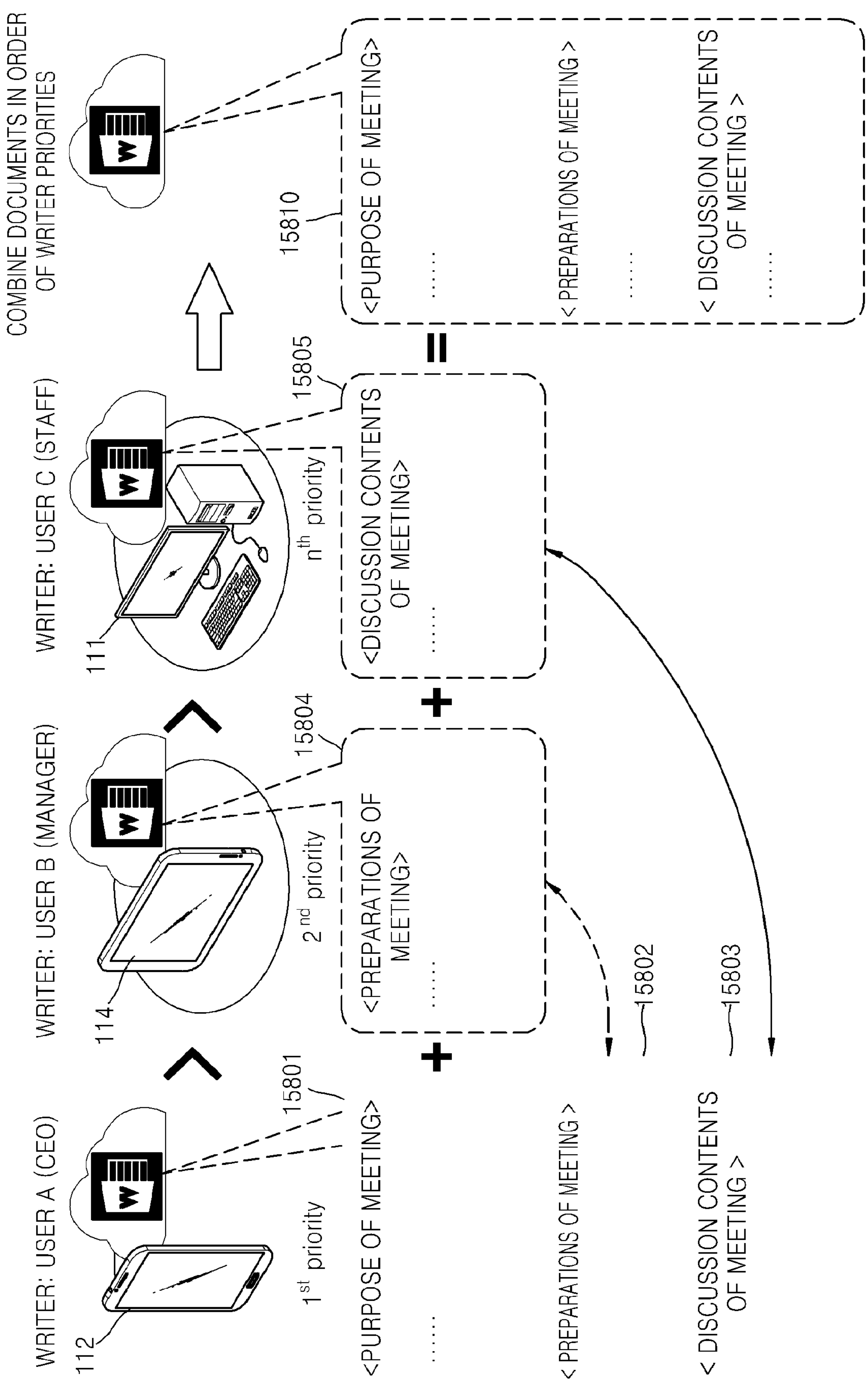

FIG. 158 is a diagram for explaining another example of a process of combining documents through cooperation authoring performed by the first device 111, the second device 112, and the Nth device 114 according to an exemplary embodiment.

The first device 111, the second device 112, and the Nth device 114 transmit requests to create documents for cooperation authoring by using a fourth program to the server 100. In FIG. 158, an example in which the first device 111, the second device 112, and the Nth device 114 perform cooperation authoring on minutes of a meeting will now be described. In FIG. 158, it is assumed that a table of contents of the minutes is determined in an order of <purpose of meeting>, <preparations of meeting> 15802, and <discussion content of meeting> 15803. Furthermore, it is assumed that the second device 112 is used by a CEO of a company, the Nth device 114 is used by a manager of the company, and the first device 111 is used by a staff of the company.

The CEO may transmit a request to create a document 15801 in which the table of contents of the meeting minutes is arranged by using the second device 112 of the CEO to the server 100 to hold the meeting for the <purpose of meeting> of a specific subject.

As described above with reference to FIG. 157, information regarding the document 15801 stored in the server 100 may be transmitted to the Nth device 114 of the manager and the first device 111 of the staff.

If the <purpose of meeting> is determined by the CEO, contents that are to be included in other items of the minutes <preparations of meeting> 15802 and <discussion content of meeting> 15803 may be prepared by staff of the CEO.

When the information regarding the document 15801 is transmitted to the N device 114 of the manager through the server 100, the manager may transmit a request to create a document 15804 regarding the <preparations of meeting> 158502 by using the Nth device 114. When the information regarding the document 15801 is transmitted to the first device 111 of the staff through the server 100, the staff may transmit a request to create a document 15805 regarding the <discussion content of meeting> 15803 by using the first device 111.

The server 100 determines a connection relationship between the documents 15801, 15804, and 15805. In FIG. 158, the connection relationship is based on a table of contents contained in the documents 15801, 15804, and 15805.

The document 15801 contains content of the first table of contents <purpose of meeting> compared to the documents 15804 and 15805, and thus the document 15801 has a first priority. The document 15804 contains content of the next table of contents <preparations of meeting> 15802, and thus the document 15804 has a second priority. The document 15805 contains content of the next table of contents <discussion content of meeting> 158503, and thus the document 15805 has an Nth priority. Thus, the server 100 may determine that the connection relationship between the documents 15801, 15804, and 15805 is an order of the documents 15801, 15804, and 15805.

The server 100 creates a final document 15810 as a result of cooperation authoring performed by the first device 111, the second device 112, and the Nth device 114. In more detail, the server 100 may create the final document 15810 by combining the documents 15801, 15804, and 15805 by using the determined connection relationship between the documents 9501, 9504, and 9505. That is, the server 100 may create the final document 15810 by combining contents of the documents 15801, 15804, and 15805 in an order of the document 15801 having the first priority, the document 15802 having the second priority, and the document 15803 having the Nth priority.

Thus, the server 100 may create the final document 15810 of the minutes of the meeting that sequentially combines the contents of "<purpose of meeting>, <preparations of meeting> 15802, and <discussion content of meeting> 15803 through cooperation authoring.

Meanwhile, the server 100 may determine that the connection relationship between the documents 15801, 15804, and 15805 is based on ranks of writers who create the documents 15801, 15804, and 15805.

In more detail, the document 15801 is created by the CEO with the highest rank compared to the documents 15804 and 15805, and thus the document 15801 has the first priority. The document 15804 is created by the manager with a next rank, and thus the document 15804 has the second priority. The document 15805 is created by the staff with a next rank, and thus the document 15805 has the Nth priority. Thus, the server 100 may determine that the connection relationship between the documents 15801, 15804, and 15805 is the order of the documents 15801, 15804, and 15805. Accordingly, the server 100 may create the final document 15810 that sequentially combines contents of the documents 15801, 15804, and 15805 in an order of the document 15801 having the first priority, the document 15804 having the second priority, and the document 15805 having the Nth priority.

Figure 159:
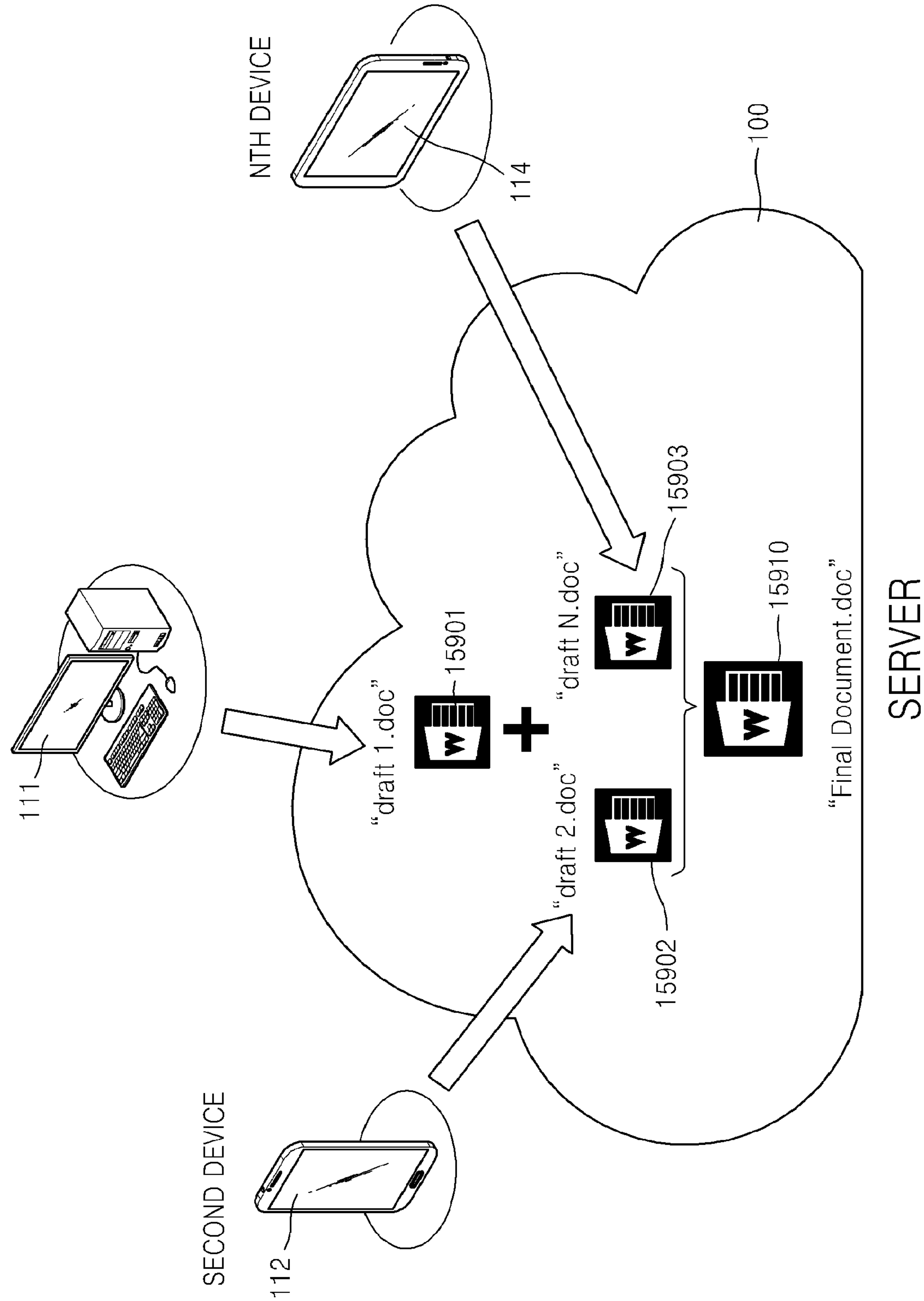

FIG. 159 is a diagram for explaining an example of creating a final document 15910 through cooperation authoring performed by the first device 111, the second device 112, and the Nth device 114 according to an exemplary embodiment.

To perform cooperation authoring, the first device 111 transmits a request to create a first document 15901 "draft 1.doc" to the server 100, the second device 112 transmits a request to create a second document 15902 "draft 2.doc" to the server 100, and the Nth device 114 transmits a request to create an Nth document 15903 "draft N.doc" to the server 100.

The server 100 determines a connection relationship between the first document 15901 through the Nth document 15903. In this regard, the connection relationship between the first document 15901 through the Nth document 15903 may refer to an order of the document 15901 through the Nth document 15903 that are to be connected and combined as the final document 15910, which was described in the examples above.

The server 100 creates the final document 15910 that combines the first document 15901 through the Nth document 15903 according to the determined connection relationship and stores the final document 15910.

FIG. 160 illustrates an example of displaying histories of documents created through cooperation authoring on a monthly calendar 16020 displayed on a screen of a device 16010 according to an exemplary embodiment.

Referring to FIG. 160, the monthly calendar 16020 is output on the screen of the device 16010. An indicator 16030 in a shape of "A" indicating a cooperation authoring document may be displayed on the calendar 16020. A number included in the shape "A" of the indicator 16030 may refer to a number of documents combined for cooperation authoring. For example, the indicator 16030 displayed on May 4, 2014 of the calendar 16020 may indicate 3 documents combined through cooperation authoring.

The device 16010 may select the indicator 16030 in the shape of "A" according to a user input received through the user input device 16510. When the indicator 16030 is selected, the device 16010 may output work history information 16040 of the cooperation authoring document on the screen.

The work history information 16040 of the cooperation authoring document includes information regarding a file name of the cooperation authoring document "workshop.doc" and information of a list of documents combined through cooperation authoring, "workshop_1.doc", "workshop_2.doc", and "workshop_3.doc". The work history information 16040 of the cooperation authoring document may also include information regarding dates and times when "workshop_1.doc", "workshop_2.doc", and "workshop_3.doc" are created, devices that create "workshop_1.doc", "workshop_2.doc", and "workshop_3.doc", etc. For example, the work history information 16040 of the cooperation authoring document may include information that a creation date and time of "workshop_2.doc" is "11:40:39 a.m., Dec. 26, 2013" and a device that creates "workshop_2.doc" is the first device 111.

The device 16010 may select an item 16550 of "workshop_2.doc" that is a portion of the cooperation authoring document according to the user input received through the user input device 16510. When the item 16050 is selected, the device 16010 may output work history information 16060 of "workshop_2.doc" corresponding to the item 16050 on the screen.

Meanwhile, work history information of the cooperation authoring document may be displayed in the same manner as described above with respect to another indicator 16070.

FIG. 161 illustrates another example of displaying histories of documents created through cooperation authoring on a monthly calendar 16120 displayed on a screen of a device 16110 according to an exemplary embodiment.

Referring to FIG. 161, the monthly calendar 16120 may be output on the screen of the device 16110.

The device 16110 may select an indicator 16130 in the shape of "A" displayed on Jan. 6, 2014 of the calendar 16120 according to a user input received through the user input device 16510. When the indicator 16130 is selected, the device 16110 displays an indicator 16140 on a date of Jan. 1, 2014 and displays an indicator 16150 on a date of Jan. 28, 2014.

When the indicator 16130 is selected, the indicators 16140 and 16150 displayed with the indicator 16130 are displayed to distinguish a document designated by the indicator 16130 with a cooperation authoring document. That is, the document designated by the indicator 16130 displayed on Jan. 6, 2014 is used to perform cooperation authoring, along with a document designated by the indicator 16140 displayed on Jan. 1, 2014 and the indicator 16150 displayed on Jan. 28, 2014.

Meanwhile, when the indicator 16130 is selected, the device 16110 may output work history information 16160 of the cooperation authoring document on the screen.

The work history information 16160 of the cooperation authoring document includes information regarding "party.doc" a file name of the cooperation authoring document, and information regarding of a list of documents combined for cooperation authoring "party_1.doc", "party_2.doc", and "party_3.doc". The work history information 16160 of the cooperation authoring document may also include information regarding dates and times when "party_1.doc", "party_2.doc", and "party_3.doc" are created, devices that create "party_1.doc", "party_2.doc", and "party_3.doc", etc. For example, the work history information 16160 of the cooperation authoring document may include information that a creation date and time of "party_2.doc" is "08:14:56 p.m., Jan. 6, 2014" and a device that creates "party_2.doc" is the third device 113.

The device 16110 may select an item 16170 of "party_2.doc" that is a portion of the cooperation authoring document according to the user input received through the user input device 16510. When the item 16170 is selected, the device 16110 may output work history information 16180 of "party_2.doc" corresponding to the item 16170 on the screen.

Hereinafter, examples in which when at least one of the devices 110 corresponds to the server 100, and a device that acts as the server 100 perform a document work based on requests of the devices 110, the device that acts as the server 100 interworks work history information with a calendar of a user will be described with reference to FIGS. 162 and 163.

FIG. 162 is a diagram for an example in which when at least one of the devices 110 corresponds to the server 100, and a device that acts as the server 100 perform a document work based on requests of the devices 110, the device that acts as the server 100 interworks work history information with a calendar of a user according to an exemplary embodiment.

Referring to FIG. 162, the system 1 includes the first device 111 and the second device 112 through the Nth device 114. In this regard, the first device 111 is a device acting as the server 100 of FIG. 99.

At least one of the second device 112 through the Nth device 114 requests the first device 111 to work on a document. The first device 111 creates the work history information 130 of the document. For example, the second device 112 requests the first device 111 to work on the document. The first device 111 creates work history information of the document. In the same manner, the third device 113 through the Nth device 114 request the first device 111 to work on the document. The first device 111 creates the work history information 130 of the document.

The first device 111 interworks the created work history information 130 with the calendar of the user. The first device 111 transmits information that is to be displayed on the calendar to at least one of the second device 112 through the Nth device 114. In this regard, when the calendar is output on a screen of a device, the information that is to be displayed on the calendar is information that is to be displayed on the output calendar. For example, the information that is to be displayed on the calendar may include work history information that is to be output on the screen of the device when an indicator that is to be displayed on the calendar or an indicator that is displayed on the calendar is selected.

In this regard, the first device 111 may transmit the information that is to be displayed on the calendar to only a device that requests the first device 111 to transmit the information that is to be displayed on the calendar, among the second device 112 through the Nth device 114. For example, the second device 112 executes a program that outputs the calendar, and authenticates the user based on a user account input via the user input device 16510, thereby requesting the first device 111 transmit the information that is to be displayed on a calendar of the user.

Meanwhile, although there is no request from the second device 112, the first device 111 may automatically transmit (for example, push) the information that is to be displayed on the calendar to the second device 112. For example, if the second device 112 has previously requested the first device 111 to transmit the information that is to be displayed on the calendar, the first device 111 may automatically transmit the information that is to be displayed on the calendar although there is no request from the second device 112 at a later time. According to another example, the first device 111 may automatically transmit the information according to a prior setting or a default setting to automatically transmit the information at predetermined time intervals or predetermined time points.

Hereinafter, an example in which when the second device 112 and the third device 113 perform a document work, the first device 111 interworks work history information with a calendar of a user will be described with reference to FIG. 163.

FIG. 163 is a flowchart of an example in which when the second device 112 and the third device 113 perform a document work, the first device 111 interworks work history information with a calendar of a user according to an exemplary embodiment.

While the first device 111 works on the document according to a document work request of the second device 112 in FIG. 163, it is understood that one or more other exemplary embodiments are not limited thereto. In other words, there is no limit to the number of devices that request the document work in one or more other exemplary embodiments. There is also no limit to the number of devices that request the first device 111 to transmit information that is to be displayed on the calendar in one or more other exemplary embodiments.

In operation S16310, the second device 112 transmits information requesting the document work to the first device 111. For example, as the user of the second device 112 executes and logs into the fourth device, the second device 112 may transmit the information requesting the document work to the first device 111. In this case, methods used by the user of the second device 112 to log into the first device 111 may vary, the methods including a method of inputting an ID and passwords.

In operation S16311, the first device 111 works on the document based on the information received from the second device 112. For example, the first device 111 may execute a program used to work on the document in the first device 111 and work on the document by using the program executed in the first device 111. If a document that the first device 111 works on is "abc.doc", and a program used to create, read, or edit "abc.doc" is a fourth program, the first device 111 may execute the fourth program and create, read, or edit "abc.doc".

In operation S16312, the first device 111 transmits information regarding a work screen of the document to the second device 112. For example, every time the first device 111 works on the document based on the information received from the second device 112, the first device 111 may transmit the information regarding the work screen of the document to the second device 112. In other words, the first device 111 may transmit the information regarding the work screen of the document that is modified every time the document is worked on by using the program executed in the first device 111 to the second device 112.

In operation S16313, the second device 112 outputs the work screen of the document. For example, the second device 112 may output the work screen of the document based on the information regarding the work screen of the document transmitted from the first device 111.

In operation S16314, the first device 111 obtains the work history information of the document. For example, the first device 111 may obtain the work history information of the document at the time of ending execution of the program used to work on the document or storing the document. For example, the first device 111 may obtain work history information of "abc.doc" at the time of storing "abc.doc" or ending execution of the fourth program, although it is understood that one or more other exemplary embodiments are not limited thereto as described above. For example, the first device 111 may store the obtained work history information in the storage corresponding to the account of the user of the second device 112.

In operation S16415, the first device 111 interworks the obtained work history information with the calendar of the user by using time information included in the obtained work history information. For example, if it is assumed that the first device 111 stores "abc.doc" at 12:28:04 p.m. of May 12, 2014, the first device 111 may generate an indicator that is to be displayed on a region of the calendar corresponding to May 12, 2014.

In operation S16316, the second device 112 requests the first device 111 to transmit information that is to be displayed on the calendar. For example, the second device 112 may requests the first device 111 to transmit work history information that is to be output on a screen of a device when an indicator that is to be displayed on the calendar or an indicator displayed on the calendar is selected.

In operation S16317, the first device 111 transmits the information that is to be displayed on the calendar to the second device 112.

In operation S16318, the second device 112 outputs the calendar on the screen. For example, the second device 112 may output the calendar that displays the indicator transmitted from the first device 111 on the screen.

In operation S16319, the third device 113 requests the first device 111 to transmit information that is to be displayed on the calendar. For example, the third device 113 may request the first device 111 to transmit the work history information that is to be output on the screen of the device when the indicator that is to be displayed on the calendar or the indicator displayed on the calendar is selected.

In operation S16320, the first device 111 transmits the information that is to be displayed on the calendar to the third device 113.

In operation S16321, the third device 113 outputs the calendar on the screen. For example, the third device 113 may output the calendar that displays the indicator transmitted from the first device 111 on the screen.

One or more exemplary embodiments may be implemented through computer readable code/instructions in/on a medium, e.g., a computer readable medium, to control at least one processing element to implement any above-described embodiment. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

FIG. 164 is a block diagram of a server 16400 according to an exemplary embodiment.

The server 16400 of FIG. 164 may correspond to the server 100 described above with reference to FIGS. 1 through 163.

Referring to FIG. 164, the server 16400 may include a transceiver 16410 (e.g., communication unit), a controller 16420, and a database 16430.

The transceiver 16410 transmits and receives data necessary for interworking work history information of a document with a calendar of a user to and from the devices 110. For example, the transceiver 16410 may transmit and receive the work history information of the document, information that is to be displayed on the calendar, or documents to and from the devices 110 but is not limited thereto.

The database 16430 stores information used for interworking the work history information of the document with the calendar of the user to and from the devices 110. For example, the database 16430 may store at least one of the work history information of the document, account information of the user, the calendar of the user, and the information that is to be displayed on the calendar is but is not limited thereto.

The controller 16420 controls an overall operation of the server 16400. The controller 16420 controls the transceiver 16410 and the database 16430 such that the server 16400 may interwork the work history information of the document with the calendar of the user.

In more detail, the controller 16420 interworks the work history information of the document with the calendar of the user. For example, the controller 16420 may control the transceiver 16410 to receive the work history information of the document from at least one of the devices 110. The controller 16420 may interwork the received work history information of the document with the calendar of the user by using time information included in the work history information of the document. In this regard, the time information is information indicating time taken for a device to work on the document.

For example, the controller 16420 may obtain the calendar of the user from the database 16430 or at least one of the devices 110. The controller 16420 may generate an indicator that is to be displayed on the calendar based on at least one of a title of the document included in the work history information of the document, a program used to create the document, and a title of a device. The controller 16420 may determine work history information that is to be displayed on the calendar according to the generated indicator. The controller 16420 may display the indicator on a region of the calendar corresponding to a date of time when the document is created.

For example, the controller 16420 may control the transceiver 16410 to receive documents created by the devices 110 and work history information of each of the documents from the devices 110. The controller 16420 may create a final document based on a connection relationship between the received documents. The controller 16420 may interwork the received work history information of the document with the calendar of the user by using time information included in the received work history information.

For example, the controller 16420 may work on the document according to a request of at least one of the devices 110. The controller 16420 may obtain work history information of the document when working on the document. The controller 16420 may interwork the obtained work history information of the document with the calendar of the user by using time information included in the obtained work history information.

FIGS. 165 and 166 are block diagrams of a device 16500 and according to an exemplary embodiment.

The device 16500 of FIGS. 165 and 166 may correspond to one of the devices 110 described above with reference to FIGS. 1 through 164.

Referring to FIG. 165, the device 16500 according to an exemplary embodiment may include an input device 16510 (e.g., input unit), an output device 16520 (e.g., output unit), a controller 16530 (e.g., control unit), and a transceiver 16540 (e.g., communication unit). According to one or more other exemplary embodiments, the device 16500 may be implemented by using more or less elements than those shown in FIG. 165.

For example, referring to FIG. 166, the device 16500 may further include a sensor 16550, an A/V input device 16560, and a memory 16570, in addition to the user input device 16510, the output device 16520, the controller 16530, and the transceiver 16540.

The user input device 16510 refers to a device used to input data for a user to control the device 16500. For example, the user input device 16510 may include at least one of a keypad, a keyboard, a track pad, a writing pad (i.e., through which a user may use a finger or electronic pen such as a stylus to handwrite for conversion by the device 16500), one or more buttons, a dome switch, a touchpad (e.g., a contact type electrostatic capacitive method, a pressure resistive layer method, an infrared ray sensing method, a surface ultrasonic wave conduction method, an integration type tension measurement method, a piezo effect method, or the like), a jog wheel, a jog switch, etc., but is not limited thereto.

The user input device 16510 may receive a user input that selects an indicator displayed on a calendar. The user input device 16510 may receive a user input that performs a document work. In this regard, the document work may mean creating, reading, or editing of a document.

The output device 16520 may output an audio signal, a video signal, or a vibration signal, and may include a display 16521, a sound output device 16522, and a vibration motor 16523.

The display 16521 displays and outputs information processed by the device 16500. For example, the display 16521 may display a user interface for selecting a virtual image, a user interface for setting an operation of the virtual image, and a user interface for purchasing an item of the virtual image.

When the display 16521 and the touch pad have a layer structure and are configured as a touch screen, the display 16521 may be used as an input device, as well as an output device. The display 16521 may include at least one of a liquid crystal display (LCD), a thin film transistor-liquid crystal display (TFT-LCD), an organic light-emitting diode (OLED) display, a flexible display, a three-dimensional (3D) display, an electrophoretic display (EPD), an active-matrix OLED (AMOLED) display, a plasma display panel, a cathode ray tube (CRT) display, etc. The device 16500 may include two or more displays 16521 according to an implementation type of the device 16500. In this regard, the two or more displays 16521 may be disposed to face each other by using a hinge.

The sound output device 16522 outputs audio data received from the transceiver 16540 or stored in the memory 16580. The sound output device 16522 may output a sound signal relating to a function (for example, a call signal receiving sound, a message receiving sound, and an alarm sound) performed by the device 16510. The sound output device 16522 may include a speaker, a buzzer, etc.

The vibration motor 16523 may output the vibration signal. For example, the vibration motor 16523 may output the vibration signal corresponding to an output of audio data or video data (for example, the call signal receiving sound, the message receiving sound, etc.). The vibration motor 16523 may output the vibration signal when a touch is input on the touch screen.

The controller 16530 generally controls an overall operation of the device 16500. For example, the controller 16530 generally controls the user input device 16510, the output device 16520, the transceiver 16540, the sensor 16550, and the A/V input device 16560 by executing programs stored in the memory 16580.

In more detail, the controller 16530 performs a document work according to the received user input. The controller 16530 generates work history information of the document by performing the document work.

The sensor 16550 may detect a state of the device 16500 or a state of the peripheral of the device 16500 and transfer detected information to the controller 16530.

The sensor 16550 may include at least one of a magnetic sensor 16551, an acceleration sensor 16552, a temperature/humidity sensor 16553, an infrared ray sensor 16554, a gyroscope sensor 16555, a positioning sensor (for example, a global positioning system (GPS), an atmospheric pressure sensor 16557, a proximity sensor 16558, and an RGB (illumination) sensor 16559, but is not limited thereto. One of ordinary skill in the art may intuitively infer an operation of each sensor from its title, and thus a detailed description thereof is omitted here.

The transceiver 16540 may include one or more elements for allowing communication between the device 16500 and another device or between the device 16500 and the server 100. For example, the transceiver 16540 may include at least one of a short-range wireless transceiver 16541, a mobile transceiver 16542, and a broadcasting receiver 16543.

The short-range wireless transceiver 16541 may include a Bluetooth transceiver, a Bluetooth low energy (BLE) transceiver, a near field transceiver, a wireless LAN (Wi-Fi) transceiver, a ZigBee transceiver, an infrared data association (IrDA) transceiver, a Wi-Fi Direct (WFD) transceiver, a ultra wideband (UWB) transceiver, an Ant+ transceiver, etc., but is not limited thereto.

The mobile transceiver 16542 transmits and receives a wireless signal with at least one of a base station, an external terminal, a server, etc. over a mobile communication network. In this regard, the wireless signal may include a voice call signal, a conference call signal, or diverse types of data according to transmission and reception of text/multimedia messages.

The broadcasting receiver 16543 receives a broadcasting signal and/or information relating to broadcasting from the outside over a broadcasting channel. The broadcasting channel may include a satellite channel and a terrestrial channel. According to one or more other exemplary embodiments, the device 16500 may not include the broadcasting receiver 16543.

The A/V input device 16560 is used to input the audio signal or the video signal and may include at least one of a camera 16561, a microphone 16562, etc. The camera 16561 may obtain an image frame such as a still image or a moving image through an image sensor in a conference call mode or a photographing mode. An image captured by the image sensor may be processed by the controller 16530 or an image processor.

The image frame processed by the camera 16561 may be stored in the memory 16580 or may be transmitted to the outside through the transceiver 16540. Two or more cameras 16561 may be included according to a configuration type of a terminal.

The microphone 16562 receives an external sound signal and processes the external sound signal as electrical voice data. For example, the microphone 16562 may receive the external sound signal from the external device or a speaker. The microphone 16562 may use diverse noise removal algorithms for removing noise that occurs when receiving the external sound signal.

The memory 16580 may store a program to process and to control the controller 16530, or may store data that is input to and output from the device 16500.

The memory 16580 may include at least one storage medium from among a flash memory-type storage medium, a hard disk-type storage medium, a multimedia card micro-type storage medium, card-type memories (e.g., an SD card, an XD memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc.

The programs stored in the memory 16580 may be classified into a plurality of modules according to their functions, for example, into a UI module 16581, a touch screen module 16582, a notification module 16583, etc.

The UI module 16581 may provide a UI or GUI which are synchronized with the device 16500 and specialized according to applications. The touch screen module 16582 may detect a user touch gesture on the touch screen and may transmit information regarding the touch gesture to the controller 16530. The touch screen module 16582 according to an embodiment of the present invention may recognize and analyze a touch code. The touch screen module 16582 may be configured as separate hardware including a controller.

Various sensors may be arranged in or near the touch screen so as to detect a touch or a proximate touch on the touch sensor. An example of the sensor to detect the touch on the touch screen may be a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect a touch on the touch screen may be a proximity sensor.

The proximity sensor is a sensor for detecting an object which is approaching a predetermined detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor. A touch gesture of the user may include a tap gesture, a touch & hold gesture, a double tap gesture, a drag gesture, a panning gesture, a flick gesture, a drag & drop gesture, or the like.

The notification module 16583 may generate a signal for notifying an occurrence of an event of the device 16500. Examples of the event that occurs in the device 16500 may include a call signal reception, a message reception, a key signal input, a schedule notification, etc. The notification module 16583 may output a notification signal in a video signal form through the display 16521, in an audio signal form through the sound output device 16522, and in a vibration signal form through the vibration motor 16523.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A server comprising:

a transceiver;

a storage storing a document which is created by the server, in response to a request from a first device; and at least one processor configured to:

control the transceiver to receive, from a second device, a work request for editing the stored document, edit the stored document based on the received work request, create work history information with respect to editing the document by the server, determine an item from among a title of the document and a title of a device that requests creating or editing of the document which are included in the created work history information, generate an indicator based on the determined item, arrange the indicator at a region, corresponding to a date or time by using work time information included in the work history information, in a calendar form, and control the transceiver to transmit, toward a third device, the work history information with the indicator, to cause the third device to display the indicator or the work history information to be linked with the region in the calendar form, wherein the indicator is displayed at a region in a calendar displayed by the third device, corresponding to date or time according to the work time information included in the work history information, and the indicator is displayed as one of the title of the document and the title of the device that requests creating or editing of the document.

2. The server of claim 1, wherein the created work history information further comprises at least one of title information of the edited document, user information related to the edited document, and file size information of the edited document.

3. The server of claim 2, wherein the user information related to the edited document comprises identification information of a user who edited the edited document.

4. The server of claim 1, wherein the at least one processor is further configured to control the transceiver to transmit, to the third device, the work history information in response to the indicator being selected by a user.

5. The server of claim 1, wherein the at least one processor is further configured to:

control the transceiver to receive, from the third device, a selection of a least one of a user, a type of document, and the document, filter the work history information in the calendar form according to the selection, and control the transceiver to transmit, to the third device, the filtered work history information.

6. A method for managing work history information of a document while co-authoring the document by a server, the method comprising:

storing a document which is created by the server, in a storage of the server, in response to a request from a first device;

receiving, from a second device, a work request for editing the stored document;

editing the stored document in the storage of the server based on the received work request;

creating work history information with respect to editing the document in the server;

determining an item from among a title of the document, and a title of a device that requests creating or editing of the document which are included in the created work history information;

generating an indicator based on the determined item;

arranging the indicator at a region corresponding to a date or time by using work time information included in the work history information in a calendar form; and transmitting, toward a third device, the work history information with the indicator, to cause the third device to display the indicator or the work history information to be linked with the region in the calendar form, wherein the indicator is displayed at a region in a calendar displayed by the third device, corresponding to date or time according to the work time information included in the work history information, and the indicator is displayed as one of the title of the document and the title of the device that requests creating or editing of the document.

7. The method of claim 6, wherein the created work history information further comprises at least one of title information of the edited document, user information related to the edited document, and file size information of the edited document.

8. The method of claim 7, wherein the user information related to the edited document comprises identification information of a user who edited the edited document.

9. The method of claim 6, further comprising:

transmitting, to the third device, work history information in response to the indicator being selected by a user.

10. The method of claim 6, further comprising:

receiving, from the third device, a selection of a least one of a user, a type of document, and the document, filtering the work history information in the calendar form according to the selection, and transmitting, to the third device, the filtered work history information.

11. A non-transitory computer-readable storage medium storing a computer program for managing work history information of a document while co-authoring the document by a server, wherein the computer program comprises instructions executable by a processor to perform:

storing a document which is created by the server, in a storage of the server, in response to a request from a first device;

receiving, from a second device, a work request for editing the stored document;

editing the stored document in the storage of the server based on the received work request;

creating work history information with respect to editing the document in the server;

determining an item from among a title of the document and a title of a device that requests creating or editing of the document which are included in the created work history information;

generating an indicator based on the determined item;

arranging the indicator at a region corresponding to a date or time by using work time information included in the work history information in a calendar form; and transmitting, toward a third device, the work history information with the indicator, to cause the third device to display the indicator or the work history information to be linked with the region in the calendar form, wherein the indicator is displayed at a region in a calendar displayed by the third device, corresponding to date or time according to the work time information included in the work history information, and the indicator is displayed as one of the title of the document and the title of the device that requests creating or editing of the document.

12. The non-transitory computer-readable storage medium of claim 11, wherein the created work history information further comprises at least one of title information of the edited document, user information related to the edited document, and file size information of the edited document.

13. The non-transitory computer-readable storage medium of claim 12, wherein the user information related to the edited document comprises identification information of a user who edited the edited document.

14. The non-transitory computer-readable storage medium of claim 11, wherein the instructions are executable by the processor to further perform:

transmitting, to the third device, the work history information in response to the indicator being selected by a user.

* * * * *